US009891907B2

(12) United States Patent
Searle et al.

(10) Patent No.: US 9,891,907 B2
(45) Date of Patent: Feb. 13, 2018

(54) DEVICE COMPONENT STATUS DETECTION AND ILLUSTRATION APPARATUSES, METHODS, AND SYSTEMS

(71) Applicant: HARMAN CONNECTED SERVICES, INC., Stamford, CT (US)

(72) Inventors: Mark Douglas Searle, Wokingham (GB); Owen James Griffin, Reading (GB); Robert Franz Klaus Kempf, Eggolsheim (DE)

(73) Assignee: Harman Connected Services, Inc., Stamford, CT (US)

( * ) Notice: Subject to any disclaimer, the term of this patent is extended or adjusted under 35 U.S.C. 154(b) by 12 days.

(21) Appl. No.: 14/989,717

(22) Filed: Jan. 6, 2016

(65) Prior Publication Data

US 2016/0291959 A1 Oct. 6, 2016

Related U.S. Application Data

(63) Continuation-in-part of application No. 14/793,679, filed on Jul. 7, 2015, now Pat. No. 9,747,096.

(Continued)

(30) Foreign Application Priority Data

Jul. 7, 2015 (WO) ..................... PCT/US15/39457

(51) Int. Cl.

*G06F 9/44* (2006.01)
*G06F 9/445* (2006.01)

(Continued)

(52) U.S. Cl.

CPC ............ *G06F 8/65* (2013.01); *G06F 3/04842* (2013.01); *H04L 41/082* (2013.01); *H04L 63/10* (2013.01);

(Continued)

(58) Field of Classification Search

CPC ... G06F 3/04842; G06F 8/65; H04L 41/0206; H04L 41/0233; H04L 41/069;

(Continued)

(56) References Cited

U.S. PATENT DOCUMENTS

2003/0064718 A1* 4/2003 Haines .................. H04W 48/16 455/423
2004/0128320 A1* 7/2004 Grove .................... G06Q 30/08

(Continued)

FOREIGN PATENT DOCUMENTS

KR 100648817 B1 11/2006
KR 20080037450 A 4/2008

OTHER PUBLICATIONS

ISA Korean Intellectual Property Office, International Search Report and Written Opinion Issued in Application No. PCT/US2015/039457, dated Nov. 23, 2015, WIPO, 11 pages.

(Continued)

*Primary Examiner* — Qing Chen
(74) *Attorney, Agent, or Firm* — McCoy Russell LLP

(57) ABSTRACT

Device component status detection and illustration apparatuses, methods, and systems determine and generate visualizations of updates timelines indicating device components associated with a remote connected device at different times. A device component status detection and illustration apparatus may include a memory and processor with instructions to: obtain device selection parameters, determine one or more remote connected devices that satisfy the device selection parameters, and identify a remote connected device selected from one or more remote connected devices by a user. The instructions may further be executed to generate visualizations of updates timelines associated with the remote connected device, including information regarding device components associated with the identified remote connected device as of selected update times. This allows (Continued)

EXEMPLARY REDUP SCREENSHOT the apparatus to present information regarding the status of a particular device at different points in time.

21 Claims, 151 Drawing Sheets

Related U.S. Application Data

(60) Provisional application No. 62/021,672, filed on Jul. 7, 2014.

(51) Int. Cl.

| | |
|---|---|
| ***G06F 3/0484*** | (2013.01) |
| ***H04L 12/24*** | (2006.01) |
| ***H04L 29/06*** | (2006.01) |
| ***H04L 29/08*** | (2006.01) |
| *H04L 12/26* | (2006.01) |

(52) U.S. Cl.

CPC .............. *H04L 67/10* (2013.01); *H04L 67/34* (2013.01); *H04L 41/0206* (2013.01); *H04L 41/0233* (2013.01); *H04L 41/069* (2013.01); *H04L 41/0873* (2013.01); *H04L 43/0817* (2013.01); *H04L 43/16* (2013.01)

(58) Field of Classification Search

CPC ............... H04L 41/082; H04L 41/0873; H04L 43/0817; H04L 43/16; H04L 63/10; H04L 67/10; H04L 67/34

USPC .................................................. 717/168–173

See application file for complete search history.

(56) References Cited

U.S. PATENT DOCUMENTS

2007/0245333 A1* 10/2007 Ferlitsch .................. G06F 8/65 717/168
2008/0148248 A1 6/2008 Volkmer et al.
2009/0210868 A1* 8/2009 Parthasarathy ........... G06F 8/71 717/169
2009/0217247 A1* 8/2009 Kamigata ........... G06F 11/3612 717/131
2009/0222804 A1 9/2009 Aufman et al.
2009/0260000 A1* 10/2009 Pilant ........................ G06F 8/71 717/170
2009/0260004 A1 10/2009 Alta et al.
2009/0319848 A1 12/2009 Haper
2010/0235491 A1* 9/2010 Purdy ............... G06F 17/30038 709/224
2011/0061082 A1* 3/2011 Heo .......................... G06F 8/68 725/87
2011/0154135 A1* 6/2011 Tyhurst ..................... G06F 8/61 714/57
2011/0216067 A1* 9/2011 Schorr .................. G06F 3/0486 345/440
2011/0231834 A1* 9/2011 Kim ...................... G06F 1/3212 717/173
2011/0289495 A1 11/2011 Ulligan et al.
2012/0079403 A1* 3/2012 Schorr .................. G06T 11/206 715/764
2012/0137308 A1* 5/2012 Agarwal ........... G06F 17/30994 719/318
2013/0157558 A1 6/2013 Wiatrowski
2013/0179600 A1* 7/2013 Fujii ..................... G06F 9/4411 710/8
2013/0298104 A1* 11/2013 Kletsky ..................... G06F 8/70 717/102

OTHER PUBLICATIONS

ISA Korean Intellectual Property Office, International Search Report and Written Opinion Issued in Application No. PCT/US2016/012393, dated Jun. 17, 2016, WIPO, 13 pages.

* cited by examiner

EXEMPLARY REDUP ARCHITECTURE

EXEMPLARY REDUP WORKFLOW

EXEMPLARY REDUP DATA FLOW

EXEMPLARY REDUP DEVICE SEGMENT DETERMINING (DSD) COMPONENT

EXEMPLARY REDUP UPDATE DOWNLOAD ADMINISTERING (UDA) COMPONENT

EXEMPLARY REDUP PACKAGE DOWNLOAD ADMINISTERING (PDA) COMPONENT

EXEMPLARY REDUP UPDATE INSTALLATION ADMINISTERING (UIA) COMPONENT

EXEMPLARY REDUP MODEL

EXEMPLARY REDUP ARCHITECTURE

EXEMPLARY REDUP ARCHITECTURE

EXEMPLARY REDUP ARCHITECTURE

EXEMPLARY REDUP ARCHITECTURE

EXEMPLARY REDUP PRODUCT SEGMENT CONFIGURING (PSC) COMPONENT

EXEMPLARY REDUP ARCHITECTURE

EXEMPLARY REDUP ARCHITECTURE

EXEMPLARY REDUP SCREENSHOT

EXEMPLARY REDUP SCREENSHOT

EXEMPLARY REDUP UPDATE PACKAGE CONFIGURING (UPC) COMPONENT

EXEMPLARY REDUP MODEL

EXEMPLARY REDUP MODEL

EXEMPLARY REDUP SCREENSHOT

EXEMPLARY REDUP SCREENSHOT

EXEMPLARY REDUP SCREENSHOT

EXEMPLARY REDUP ARCHITECTURE

EXEMPLARY REDUP DATA FLOW

EXEMPLARY REDUP EVENT LOGGING ADMINISTERING (ELA) COMPONENT

EXEMPLARY REDUP ANALYTICS CONDUCTING (AC) COMPONENT

EXEMPLARY REDUP LOG EVENT NOTIFICATION (LEN) ONTOLOGY

EXEMPLARY REDUP EMBEDDED SYSTEMS (ESM) ONTOLOGY

FIGURE 32

```
# Base Model
ex:CarA4B8Saloon  a coo:BaseModel, vso:Automobile;
    gr:isVariantOf ex:A4 ;
    gr:isVariantOf ex:B8 ;
    rdfs:label "A4 B8 (2012)"@en ;
    rdfs:comment "A4 with Saloon body style"@en ;
    gr:hasManufacturer ex:CarManufacturer;
    vso:modelDate "2012-01-01"^^xsd:date ;
    vso:bodyStyle <http://en.wikipedia.org/wiki/Sedan_automobile> ;
    vso:axles [ a gr:QuantitativeValueInteger ;
                  gr:hasValueInteger "2"^^xsd:int ;
                  gr:hasUnitOfMeasurement "C62"^^xsd:string ] ;
    vso:fuelTankVolume [ a gr:QuantitativeValueFloat ;
                           gr:hasValueFloat "50"^^xsd:float ;
                           gr:hasUnitOfMeasurement "LTR"^^xsd:string ] ;
    vso:height [ a gr:QuantitativeValueFloat ;
                   gr:hasValueFloat "142.7"^^xsd:float ;
                   gr:hasUnitOfMeasurement "CMT"^^xsd:string ] ;
    vso:length [ a gr:QuantitativeValueFloat ;
                   gr:hasValueFloat "470.3"^^xsd:float ;
                   gr:hasUnitOfMeasurement "CMT"^^xsd:string ] ;
    vso:width [ a gr:QuantitativeValueFloat ;
                  gr:hasValueFloat "182.6"^^xsd:float ;
                  gr:hasUnitOfMeasurement "CMT"^^xsd:string ] ;
    vso:wheelbase [ a gr:QuantitativeValueFloat ;
                      gr:hasValueFloat "280.8"^^xsd:float ;
                      gr:hasUnitOfMeasurement "CMT"^^xsd:string ] ;
```

EXEMPLARY REDUP RESOURCE DESCRIPTION FRAMEWORK (RDF) FILE

FIGURE 33

```
PREFIX imdb: <http://data.linkedmdb.org/resource/movie/>
PREFIX dcterms: <http://purl.org/dc/terms/>
PREFIX dbpo: <http://dbpedia.org/ontology/>
PREFIX rdfs: <http://www.w3.org/2000/01/rdf-schema#>

SELECT ?birthDate ?spouseName ?movieTitle ?movieDate {
  { SERVICE <http://dbpedia.org/sparql>
    { SELECT ?birthDate ?spouseName WHERE {
        ?actor rdfs:label "Arnold Schwarzenegger"@en ;
               dbpo:birthDate ?birthDate ;
               dbpo:spouse ?spouseURI .
        ?spouseURI rdfs:label ?spouseName .
        FILTER ( lang(?spouseName) = "en" )
      }
    }
  }
  { SERVICE <http://data.linkedmdb.org/sparql>
    { SELECT ?actor ?movieTitle ?movieDate WHERE {
      ?actor imdb:actor_name "Arnold Schwarzenegger".
      ?movie imdb:actor ?actor ;
             dcterms:title ?movieTitle ;
             dcterms:date ?movieDate .
      }
    }
  }
}
```

EXEMPLARY REDUP FEDERATED QUERY

EXEMPLARY REDUP FAILURE MODE ANALYTICS MODEL

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

SEQ027 – NOTIFY A USER LOGGED INTO THE DEVICE

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

FIGURE 53

User Table

| user_id | alias | pin | secure_token | profile | expires_at |
|---|---|---|---|---|---|
| joe.bloggs | Joe | 1234 | AN_EXISTING_TOKEN | N/A | 2013-03-19 08:10 |
| mary.bloggs | Mary | 4321 | ANOTHER_TOKEN | N/A | 2013-03-19 08:10 |

Zone Table

| id | zone_id | type |
|---|---|---|
| 1 | zone1 | ZONE_TYPE_INTERNAL |
| 2 | zone2 | ZONE_TYPE_VIRTUAL |
| 3 | zone3 | ZONE_TYPE_VIRTUAL |

EXEMPLARY REDUP ALTERNATIVE EMBODIMENT

FIGURE 54

User Zone State Table

| zone_id | user_id | state | timestamp | remember_me |
|---|---|---|---|---|
| zone1 | joe.bloggs | USER_ZONE_STATE_ACTIVE | 2013-03-19 08:00 | FALSE |
| zone1 | mary.bloggs | USER_ZONE_STATE_OFF | 2013-03-19 07:00 | FALSE |
| zone2 | joe.bloggs | USER_ZONE_STATE_OFF | 2013-03-19 09:00 | TRUE |
| zone2 | mary.bloggs | USER_ZONE_STATE_ACTIVE | 2013-03-19 11:00 | TRUE |

EXEMPLARY REDUP ALTERNATIVE EMBODIMENT

FIGURE 55

User Table

Upon receipt of the HTTP response, the secure_token field of the User Table will be updated.

| user_id | alias | pin | secure_token | profile | expires_at |
|---|---|---|---|---|---|
| joe.bloggs | Joe | 1234 | 76ef1a0f1b63f0445d09315236cd7f97 | N/A | 2013-03-19 08:10 |

EXEMPLARY REDUP ALTERNATIVE EMBODIMENT

FIGURE 56

User Table

| user_id | alias | pin | secure_token | profile | expires_at |
|---|---|---|---|---|---|
| joe.bloggs | Joe | 1234 | N/A | N/A | 2013-03-19 08:10 |
| mary.bloggs | Mary | 4321 | N/A | N/A | 2013-03-19 08:10 |
| paul.potts | Paul | 2323 | N/A | N/A | 2013-03-20 00:00 |
| henry.eighth | Henry | 0815 | N/A | N/A | 2013-03-20 00:00 |

Zone Table

| id | zone_id | type |
|---|---|---|
| 1 | zone1 | ZONE_TYPE_INTERNAL |
| 2 | zone2 | ZONE_TYPE_VIRTUAL |
| 3 | zone3 | ZONE_TYPE_VIRTUAL |

EXEMPLARY REDUP ALTERNATIVE EMBODIMENT

FIGURE 57

User Zone State Table

| zone_id | user_id | state | timestamp | remember_me |
|---|---|---|---|---|
| zone1 | joe.bloggs | USER_ZONE_STATE_ACTIVE | 2013-03-19 08:00 | FALSE |
| zone2 | joe.bloggs | USER_ZONE_STATE_OFF | 2013-03-19 09:00 | TRUE |
| zone1 | mary.bloggs | USER_ZONE_STATE_OFF | 2013-03-19 07:00 | FALSE |
| zone2 | mary.bloggs | USER_ZONE_STATE_ACTIVE | 2013-03-19 11:00 | TRUE |
| zone3 | paul.potts | USER_ZONE_STATE_OFF | 2013-03-19 09:00 | TRUE |
| zone3 | henry.eighth | USER_ZONE_STATE_OFF | 2013-03-19 10:00 | FALSE |

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

Vehicle Relationship Management

The value is not in the connectivity, but in what it enables

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

FIGURE 87

| | |
|---|---|
| Software Over-The-Air | • Delivery and update of Firmware, Software and Applications Support for arbitrary number of connected modules |
| Management Console | • Configure and manage devices including OTA campaigns<br>• Access to system reports and analytics |
| Rules Engine | • Define update file dependencies |
| Synchronization Protocols | • Multiple synchronization protocols support<br>• Support for OMA DM and restAPI based Sync |
| Notifications | • Push, Background, and Deferred Update support<br>• Client initiated polling and installation |
| Event Reporting | • Log file and Event collection with centrally managed reporting<br>• Custom reports capability e.g. Fault Identification |
| Big Data Analytics | • Data storage in Scalable RDF based Graph Database<br>• Analytics capabilities using semantic web technology |
| Security | • Role and profile based security model<br>• Support for HTTPS and standard encryption algorithms |
| Delta File Support | • Support for delta file updates<br>• Prepared for delta-file handling through plug-in mechanism |

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP
ALTERNATIVE EMBODIMENT

EXEMPLARY REDUP ALTERNATIVE EMBODIMENT

DOAP AND REMOTE PARTS MANAGEMENT

EXEMPLARY REDUP
ALTERNATIVE EMBODIMENT

SEGMENTS AND VERSIONS EXAMPLE

SUM ATTRIBUTES FLOW – PROBLEM STATEMENT

EXEMPLARY REDUP
ALTERNATIVE EMBODIMENT

FOTA Module Preparation

EXEMPLARY REDUP ALTERNATIVE EMBODIMENT

Uploading FOTA SUM Modules

EXEMPLARY REDUP ALTERNATIVE EMBODIMENT

Uploading FOTA SUM Modules

EXEMPLARY REDUP ALTERNATIVE EMBODIMENT

FOTA and Venturo Interworking

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

M2M Services

EXEMPLARY REDUP ALTERNATIVE EMBODIMENT

M2M Services and InSight Connect

EXEMPLARY REDUP ALTERNATIVE EMBODIMENT

EXEMPLARY REDUP ALTERNATIVE EMBODIMENT

FIGURE 107

Feature Overview

| Area | Features | Area | Features |
|---|---|---|---|
| **Software Updates** | Firmware & Software Over the Air<br>Application delivery and updates<br>Business rule driven management of software inter-dependencies for single package updates | **Rules Engine** | Rules engine based identification, packaging and deployment of updates |
| **Delta File Creation** | Support for multiple delta file creation algorithms<br>Support for data file creation custom algorithms | **Management Console** | Comprehensive management console to handle update file upload, specify vehicles to deploy the updates to; define segments; access system reports and analytics |
| **Notifications** | Push Updates Client Polling<br>Background Update<br>Deferred Update support | **Security** | Role and profile based security model ensuring that only authorized users can upload and distribute updates<br>Support for HTTPS and standard encryption algorithms according to business rules |
| **Event Reporting** | Log file and event collection capability<br>Centrally managed event reporting through configurable<br>Make, Model, Trim or Custom segments | **Sync Protocols** | Multiple synchronization protocols support to ensure the most efficient synchronization for the task, including OMA DM and Synch |
| **Big Data Analytics** | Fully scalable, high performance graph database<br>Standard reports on connected devices status<br>Advanced Analytics using semantic web technology to expose inferred information<br>Custom reports capability | | |

EXEMPLARY REDUP ALTERNATIVE EMBODIMENT

EXEMPLARY REDUP ALTERNATIVE EMBODIMENT

APPLICATION REPORTS AN EVENT ON BEHALF OF ANOTHER APPLICATION

EXEMPLARY REDUP ALTERNATIVE EMBODIMENT

LOGGING AN ISSUE – APPLICATION EXECUTION ENVIRONMENT CREATES A LOG

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

FIGURE 131
File version upload
Progress
Application hash (MD5)
Install size (bytes)
Back
Next

| *Value name* | *Meaning* |
|---|---|
| **Application UUID** | Unique id for the file |
| **Application Hash** | Pre-generated hash value for the file contents |
| **Initial Size** | Size of download |

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

FIGURE 141

| OMA-DM path | Value |
|---|---|
| /Vendor/Components/Nodes/746/DID/F110/Value | Hirondel ABS |
| /Vendor/Components/Nodes/746/DID/F111/Value | ASBBD-H445-WM |
| /Vendor/Components/Nodes/746/DID/F112/Value | KS-112312112 |
| /Vendor/Components/Nodes/746/DID/F180/Value | TYT-HHG-CCV-WSA-SA |
| /Vendor/Components/Nodes/746/DID/F181/Value | 2015 |
| /Vendor/Components/Nodes/746/DID/F183/Value | ABS module for Hirondel |
| /Vendor/Components/Nodes/746/DID/F184/Value | ACME HW |
| /Vendor/Components/Nodes/746/DID/F185/Value | ABS Hardware |
| /Vendor/Components/Nodes/746/DID/F186/Value | ACME |
| /Vendor/Components/Nodes/746/DID/F187/Value | 192832732 |

EXEMPLARY REDUP ALTERNATIVE EMBODIMENT

EXEMPLARY REDUP ALTERNATIVE EMBODIMENT

FIGURE 143

| OMA-DM path | Value |
|---|---|
| /Vendor/Components/Nodes/746/DID/F111/Value | {null} |
| /Vendor/Components/Nodes/746/DID/F187/Value | 445676733 |

EXEMPLARY REDUP ALTERNATIVE EMBODIMENT

EXEMPLARY REDUP ALTERNATIVE EMBODIMENT

FIGURE 145

| OMA-DM path | Value |
|---|---|
| /Vendor/Components/Nodes/746/DID/F110/Value | Hirondel ABS |
| /Vendor/Components/Nodes/746/DID/F111/Value | ASBBD-H445-WM |
| /Vendor/Components/Nodes/746/DID/F112/Value | KS-112312112 |
| /Vendor/Components/Nodes/746/DID/F180/Value | TYT-HHG-CCV-WSA-SA |
| /Vendor/Components/Nodes/746/DID/F181/Value | 2015 |
| /Vendor/Components/Nodes/746/DID/F183/Value | ABS module for Hirondel |
| /Vendor/Components/Nodes/746/DID/F184/Value | ACME HW |
| /Vendor/Components/Nodes/746/DID/F185/Value | ABS Hardware |
| /Vendor/Components/Nodes/746/DID/F186/Value | ACME |
| /Vendor/Components/Nodes/746/DID/F187/Value | 192832732 |
| /Vendor/Components/Nodes/798/DID/F110/Value | Hirondel GPS |
| /Vendor/Components/Nodes/798/DID/F111/Value | F111 |
| /Vendor/Components/Nodes/798/DID/F112/Value | GPS-12312 |
| /Vendor/Components/Nodes/798/DID/F180/Value | F180 |
| /Vendor/Components/Nodes/798/DID/F181/Value | 2015 |
| /Vendor/Components/Nodes/798/DID/F183/Value | GPS module for Hirondel |
| /Vendor/Components/Nodes/798/DID/F184/Value | ACME HW |
| /Vendor/Components/Nodes/798/DID/F185/Value | GPS Hardware |
| /Vendor/Components/Nodes/798/DID/F186/Value | ACME |
| /Vendor/Components/Nodes/798/DID/F187/Value | 343223 |

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

FIGURE 149

| OMA-DM path | Value |
|---|---|
| /Vendor/Components/Nodes/746/DID/F110/Value | Hirondel ABS |
| /Vendor/Components/Nodes/746/DID/F111/Value | ASBBD-H445-WM |
| /Vendor/Components/Nodes/746/DID/F112/Value | KS-112312112 |
| /Vendor/Components/Nodes/746/DID/F180/Value | TYT-HHG-CCV-WSA-SA |
| /Vendor/Components/Nodes/746/DID/F181/Value | XX-YY-ZZ |
| /Vendor/Components/Nodes/746/DID/F183/Value | ABS module for Hirondel |
| /Vendor/Components/Nodes/746/DID/F184/Value | ACME HW |
| /Vendor/Components/Nodes/746/DID/F185/Value | ABS Hardware |
| /Vendor/Components/Nodes/746/DID/F186/Value | ACME |
| /Vendor/Components/Nodes/746/DID/F187/Value | 192832732 |
| /Vendor/Components/Nodes/746/DID/F188/Value | 2015 |

EXEMPLARY REDUP ALTERNATIVE EMBODIMENT

EXEMPLARY REDUP ALTERNATIVE EMBODIMENT

EXEMPLARY REDUP ALTERNATIVE EMBODIMENT

DEVICE COMPONENT STATUS DETECTION AND ILLUSTRATION APPARATUSES, METHODS, AND SYSTEMS

PRIORITY CLAIM

Applicant hereby claims benefit to priority under 35 USC § 120 as a continuation-in-part of: U.S. patent application Ser. No. 14/793,679, filed Jul. 7, 2015, entitled "REMOTE EMBEDDED DEVICE UPDATE PLATFORM APPARATUSES, METHODS AND SYSTEM," and which in turn claims benefit to priority under 35 USC § 119 as a non-provisional conversion of: U.S. provisional patent application Ser. No. 62/021,672, filed Jul. 7, 2014, entitled "Remote Embedded Device Update Platform Apparatuses, Methods and Systems".

Applicant hereby claims benefit to priority under 35 USC 119, 365 as a national stage entry and continuation-in-part of: Patent Cooperation Treaty application, serial no. PCT/US15/39457, filed Jul. 7, 2015, entitled "REMOTE EMBEDDED DEVICE UPDATE PLATFORM APPARATUSES, METHODS AND SYSTEMS," and which in turn claims benefit to priority under 35 USC § 119 as a non-provisional conversion of: U.S. provisional patent application Ser. No. 62/021,672, filed Jul. 7, 2014, entitled "Remote Embedded Device Update Platform Apparatuses, Methods and Systems,".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address embedded software, and more particularly, include Remote Embedded Device Update Platform Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Many devices have embedded software, such as cars and appliances. Sometimes, the embedded software may be upgraded by a technician who physically connects to the device and runs special updating software.

BRIEF DESCRIPTION OF THE DRAWINGS

Appendices and/or drawings illustrating various, non-limiting, example, innovative aspects of the Remote Embedded Device Update Platform Apparatuses, Methods and Systems (hereinafter "REDUP") disclosure, include:

FIG. 32 shows an exemplary resource description framework (RDF) file;

FIG. 33 shows an exemplary federated query for the REDUP;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Remote Embedded Device Update Platform Apparatuses, Methods and Systems (hereinafter "REDUP") transforms telemetry inputs, via REDUP components (e.g., DSD, UDA, PDA, UTA, PSC, UPC, ELA, AC, etc. components), into remote embedded updates outputs. The REDUP components, in various embodiments, implement advantageous features as set forth below.

INTRODUCTION

REDUP helps manage and update embedded devices that traditionally have been inaccessible and impracticable to update. Via its update and communication mechanisms, REDUP may also obtain data, both real-time and deferred, and perform analysis as feedback to determine existing problems, but also to diagnose potential and future problems. This feedback and analytics component may then be used to create updates that may be sent to the affected devices to fix the problem, in many instances, before any problem manifests itself. Also, REDUP allows for the determination of what other devices may similarly be affected and similarly provide updates to those, as yet, unaffected devices. In turn, all those other devices may also be examined, and each, may also contribute to the refinement of embedded devices in aggregate. Also, REDUP may obtain and use telemetry and device usage data streams, by first tagging the information with device features, model, serial number, subsystem and other metadata, and then storing that information for post processing analytics.

REDUP

Figure 1:
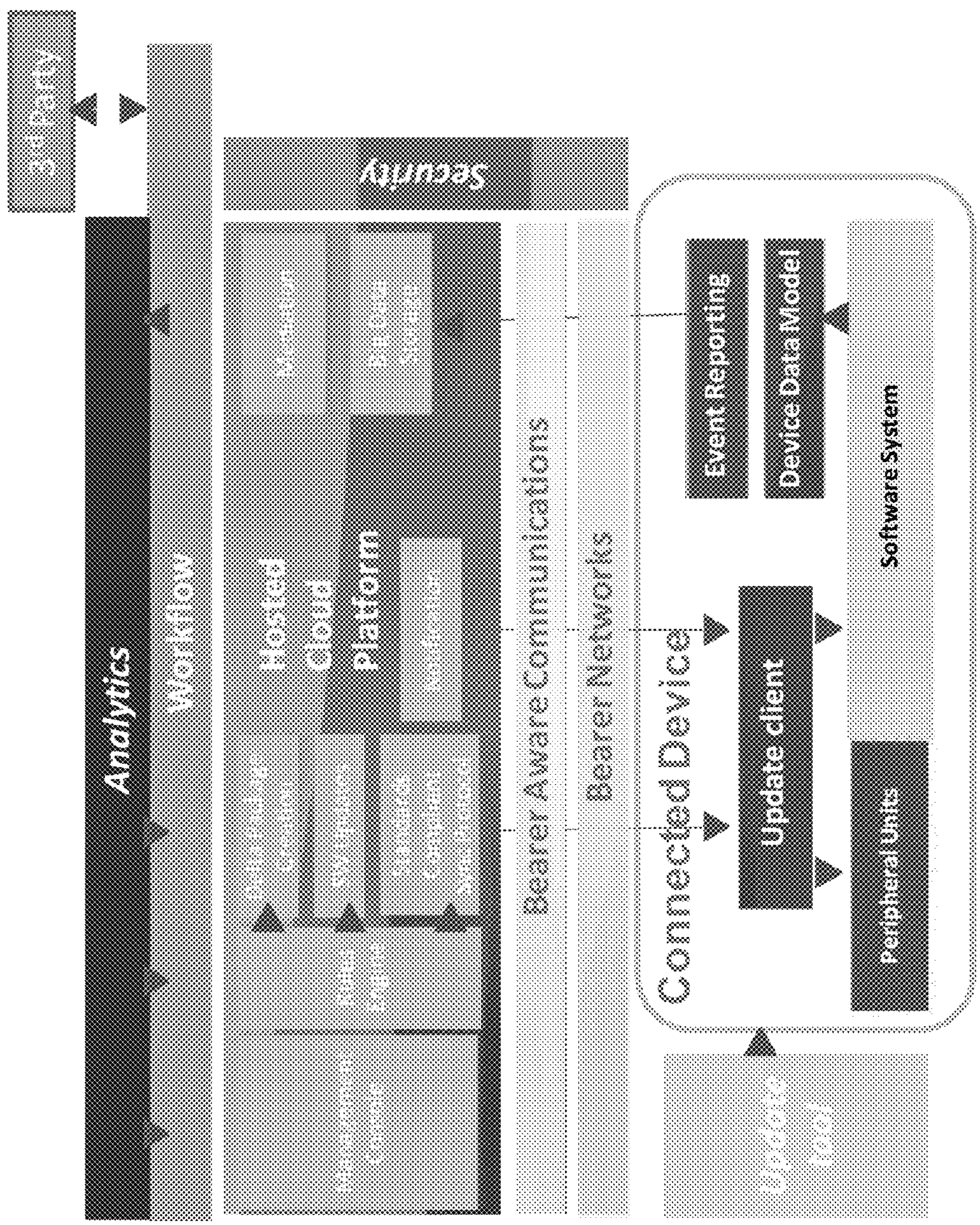
FIG. 1 shows an exemplary architecture for the REDUP.

FIG. 1 shows an exemplary architecture for the REDUP. In FIG. 1, a suite of client/server components supporting remote cloud software management server, client reporting and analytics is shown. A hosted cloud platform is utilized to facilitate remote management of connected devices via network. In one implementation, a J2EE application that operates in a clustered configuration for resilience, performance and scalability, utilizing a relational database that may also be clustered may be utilized. For example, the live system may sit in the cloud and may be hosted in a variety of environments (e.g., Amazon EC2).

A connected device (e.g., a vehicle, a smartphone, an appliance, a smart lock, and/or the like device that is capable of network connectivity) is configured to log specified events. For example, logged events may include software and configuration updates events, system fault and performance events, system service usage notifications, telematic data, and/or the like. These events may be logged by the device's software system or by individual device components (e.g., peripheral units or electronic control units (ECUs)) and may be securely delivered in a structured data format to the cloud platform for storage in a big data storage repository and/or databases of individual analytics applications. In one implementation, events data may be structured based on a graph format that facilitates flexible and configurable logging without having to tightly couple the data model to the back end system.

Various analytics applications may utilize subsets of logged events data to conduct analytics. Such analytics may also utilize third party data (e.g., information regarding vehicle components obtained from manufacturers, environmental data, information regarding users and/or user preferences) in combination with the logged events data. For example, predictive analytics may be utilized to provide answers to a range of questions, from small-scale questions around individual devices to large-scale questions at a product level. In some implementations, analytics results may be utilized to create updates for the connected device.

The device may be notified (e.g., on start up, periodically, upon update availability) when updates are available. For example, updates may include software updates, firmware updates, application updates, and/or the like. In one implementation, a notification may be sent to the device when updates are available for one or more segments associated with the device. The device may download updates (e.g., in the form of update packages) via network (e.g., via LTE, via WiFi) from the cloud platform server and install them using an update client. A rules engine may be utilized to configure updates for specific segments and to ensure that dependencies and restrictions associated with update package components (e.g., modules) are satisfied.

Figure 2:
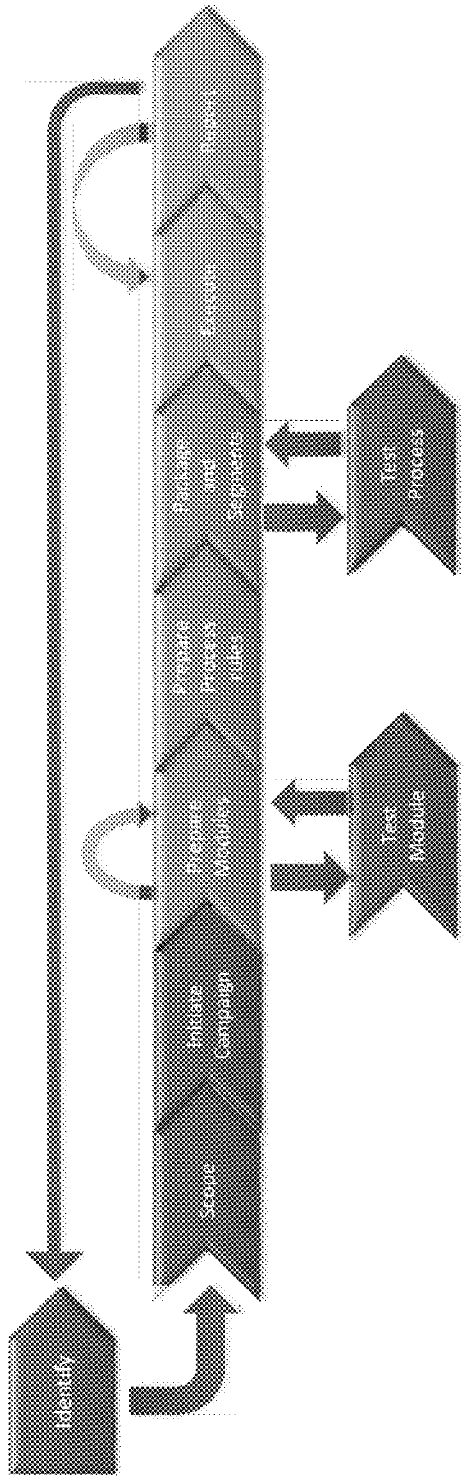
FIG. 2 shows an exemplary workflow for the REDUP.

FIG. 2 shows an exemplary workflow for the REDUP. In FIG. 2, an issue may be identified with a device (e.g., it is detected that a higher than average number of drivers are turning off adaptive steering for a certain vehicle model). The architecture described above in FIG. 1 may be utilized to facilitate delivery of an update to the device to address the issue. A campaign may be initiated to determine why customers are choosing to turn off adaptive steering for the vehicle model. For example, it may be determined that adaptive steering is too sensitive making it difficult to operate the vehicle model. Accordingly, an update to the adaptive steering component (e.g., ECU) may be prepared. The update may be tested on a segment that includes manufacturer owned test vehicles used to test changes to the vehicle model. Once the update has been tested and finalized (e.g., adaptive steering operates better, installation package is configured properly) devices (e.g., vehicles) in a segment that includes vehicles of the vehicle model that include the adaptive steering option (e.g., including the device) may be notified to install the update. Log data from vehicles that have the updated adaptive steering component may be collected and analyzed to determine whether drivers are now using adaptive steering. Any additional issues may also be similarly determined and addressed.

Figure 3:
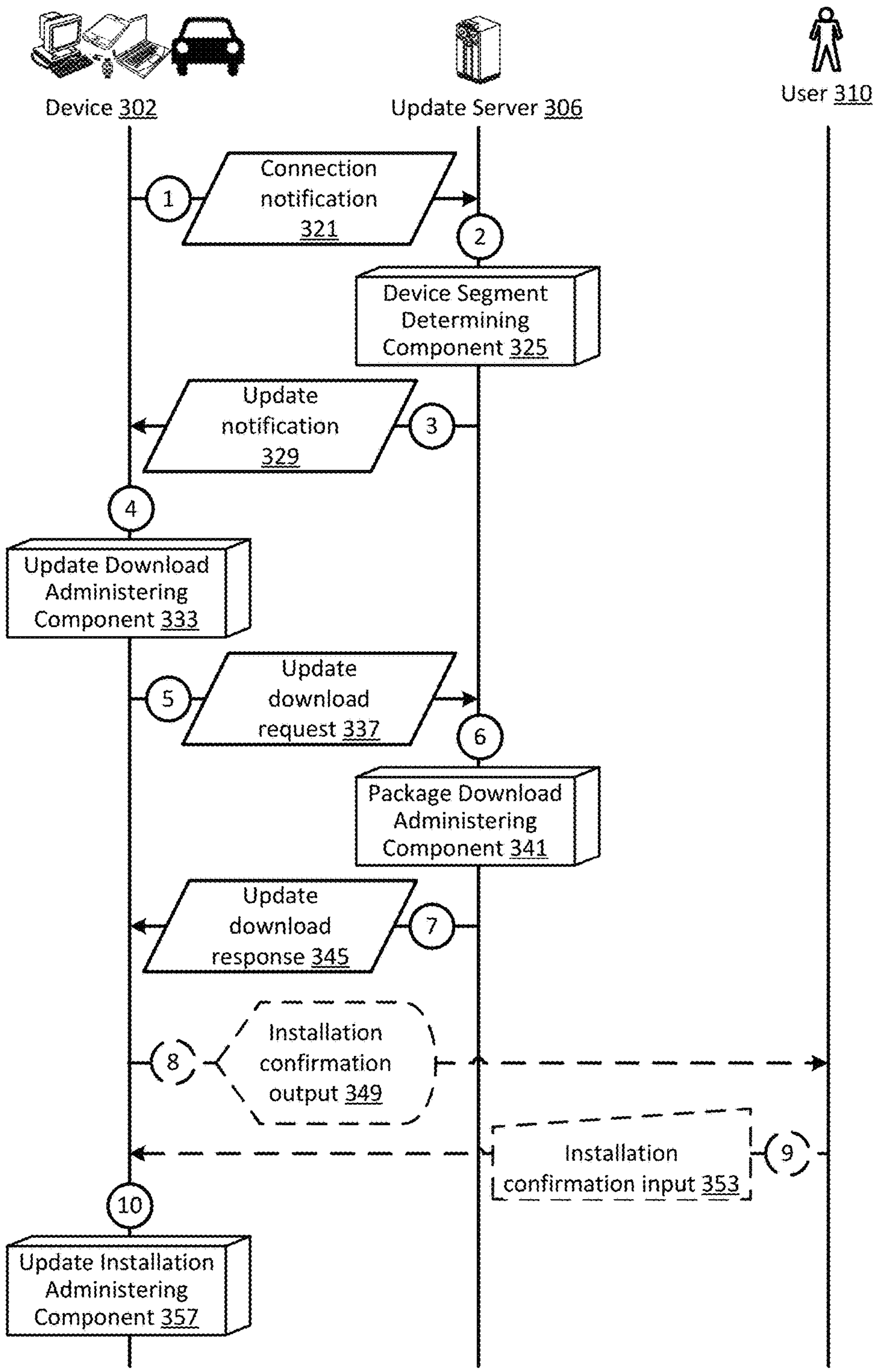
FIG. 3 shows a datagraph diagram illustrating embodiments of a data flow for the REDUP.

FIG. 3 shows a datagraph diagram illustrating embodiments of a data flow for the REDUP. In FIG. 3, dashed arrows indicate data flow elements that may be more likely to be optional. In FIG. 3, a connected device 302 may send a connection notification 321 to an update server 306. For example, a vehicle may connect to the update server (e.g., using the update server's URL or IP address) when it is turned on and/or when the vehicle enters an area with network connectivity. The vehicle may opportunistically look to establish a communicative connection to the update server (e.g., to check for updates, to download updates, to upload event data). For example, the vehicle may periodically check whether a WiFi, cellular, Bluetooth, and/or the like network connection is available and may attempt to establish a communicative connection to the update server when a network connection is available. In one implementation, the connection notification may include authentication information, client details, a timestamp, and/or the like. For example, the device may provide the following example connection notification, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth__request>
    <timestamp>2020-12-31 23:59:59</timestamp>
    <user__accounts__details>
        <user__account__credentials>
            <user__name>JohnDaDoeDoeDoooe@gmail.com</account__name>
            <password>abc123</password>
            //OPTIONAL <cookie>cookieID</cookie>
            //OPTIONAL <digital__cert__link>www.mydigitalcertificate.com/
JohnDoeDaDoeDoe@gmail.com/mycertifcate.dc</digital__cert__link>
            //OPTIONAL <digital__certificate>__DATA__</digital__certificate>
        </user__account__credentials>
    </user__accounts__details>
    <client__details> //iOS Client with App and Webkit
            //it should be noted that although several client details
            //sections are provided to show example variants of client
            //sources, further messages will include only one to save
            //space
        <client__IP>10.0.0.123</client__IP>
        <user__agent__string>Mozilla/5.0 (iPhone; CPU iPhone OS 7__1__1 like Mac
OS X) AppleWebKit/537.51.2 (KHTML, like Gecko) Version/7.0 Mobile/11D201
Safari/9537.53</user__agent__string>
        <client__product__type>iPhone6,1</client__product__type>
        <client__serial__number>DNXXX1X1XXXX</client__serial__number>
        <client__UDID>3XXXXXXXXXXXXXXXXXXXXXXXXD</client__UDID>
        <client__OS>iOS</client__OS>
        <client__OS__version>7.1.1</client__OS__version>
        <client__app__type>app with webkit</client__app__type>
        <app__installed__flag>true</app__installed__flag>
        <app__name>REDUP.app</app__name>
        <app__version>1.0 </app__version>
        <app__webkit__name>Mobile Safari</client__webkit__name>
        <client__version>537.51.2</client__version>
    </client__details>
    <client__details> //iOS Client with Webbrowser
        <client__IP>10.0.0.123</client__IP>
        <user__agent__string>Mozilla/5.0 (iPhone; CPU iPhone OS 7__1__1 like Mac
OS X) AppleWebKit/537.51.2 (KHTML, like Gecko) Version/7.0 Mobile/11D201
Safari/9537.53</user__agent__string>
        <client__product__type>iPhone6,1</client__product__type>
        <client__serial__number>DNXXX1X1XXXX</client__serial__number>
        <client__UDID>3XXXXXXXXXXXXXXXXXXXXXXXXD</client__UDID>
        <client__OS>iOS</client__OS>
        <client__OS__version>7.1.1</client__OS__version>
        <client__app__type>web browser</client__app__type>
        <client__name>Mobile Safari</client__name>
        <client__version>9537.53</client__version>
    </client__details>
    <client__details> //Android Client with Webbrowser
        <client__IP>10.0.0.123</client__IP>
        <user__agent__string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user__agent__string>
        <client__product__type>Nexus S</client__product__type>
        <client__serial__number>YXXXXXXXXZ</client__serial__number>
        <client__UDID>FXXXXXXXXX-XXXX-XXXX-XXXX-XXXXXXXXXXXXX</client__UDID>
        <client__OS>Android</client__OS>
        <client__OS__version>4.0.4</client__OS__version>
        <client__app__type>web browser</client__app__type>
        <client__name>Mobile Safari</client__name>
        <client__version>534.30</client__version>
    </client__details>
    <client__details> //Mac Desktop with Webbrowser
        <client__IP>10.0.0.123</client__IP>
        <user__agent__string>Mozilla/5.0 (Macintosh; Intel Mac OS X 10__9__3)
AppleWebKit/537.75.14 (KHTML, like Gecko) Version/7.0.3
Safari/537.75.14</user__agent__string>
        <client__product__type>MacPro5,1</client__product__type>
        <client__serial__number>YXXXXXXXXZ</client__serial__number>
        <client__UDID>FXXXXXXXXX-XXXX-XXXX-XXXX-XXXXXXXXXXXXX</client__UDID>
        <client__OS>Mac OS X</client__OS>
```

-continued

```
        <client_OS_version>10.9.3</client_OS_version>
        <client_app_type>web browser</client_app_type>
        <client_name>Mobile Safari</client_name>
        <client_version>537.75.14</client_version>
    </client_details>
</auth_request>
```

The update server may determine segments associated with the device and whether any updates are available for device components using a device segment determining (DSD) component 325. See FIG. 4 for additional details regarding the DSD component.

The update server may send an update notification 329 to the device. For example, the update server may send the update notification to notify the device regarding any applicable updates. In one implementation, the update notification may include the device's identifier (e.g., a device token used to identify the device anonymously), a list of updates available for the device, description of each update, an update package identifier associated with each update, priority associated with each update, and/or the like. For example, the update server may provide the following example update notification, substantially in the form of a HTTP(S) POST message including XML-formatted data, as provided below:

```
POST /update_notification.php HTTP/1.1
Host: www.server.com
Content-Type: Application/XML
Content-Length: 667
<?XML version = "1.0" encoding = "UTF-8"?>
<update_notification>
    <device_identifier>ID_Device1</device_identifier>
    <updates>
        <update>
            <update_identifier>ID_Update1</update_identifier>
            <description>description of update</description>
            <update_package_identifier>ID_Package1</update_package_identifier>
            <priority>critical</priority>
        </update>
        <update>
            <update_identifier>ID_Update2</update_identifier>
            <description>description of update</description>
            <update_package_identifier>ID_Package2</update_package_identifier>
            <priority>normal</priority>
        </update>
        ...
    </updates>
</update_notification>
```

The device may determine available updates and administer downloading of updates using an update download administering (UDA) component 333. See FIG. 5 for additional details regarding the UDA component.

The device may send an update download request 337 to the update server. For example, the device may send the update download request to request update download from the update server. In one implementation, the update download request may include the device's identifier, an update identifier, an update package identifier, and/or the like. For example, the device may provide the following example update download request, substantially in the form of a HTTP(S) POST message including XML-formatted data, as provided below:

```
    POST /update_download_request.php HTTP/1.1
    Host: www.server.com
```

-continued

```
    Content-Type: Application/XML
    Content-Length: 667
    <?XML version = "1.0" encoding = "UTF-8"?>
    <update_download_request>
        <device_identifier>ID_Device1</device_identifier>
        <update>
            <update_identifier>ID_Update1</update_identifier>
            <update_package_identifier>ID_Package1
            </update_package_identifier>
        </update>
    </update_download_request>
```

The update server may facilitate sending the requested update package to the device using a package download administering (PDA) component 341. See FIG. 6 for additional details regarding the PDA component.

The update server may send an update download response 345 to the device. For example, the update server may send the requested update package to the device. In one implementation, the package file may be sent to the device. For example, the package file may include package parameters (e.g., package name, package version, package priority, package segment identifier, package rules, package checksum), software update modules (SUMs) and associated rules, and/or the like.

Installation confirmation output 349 may be provided to a user 310. For example, installation confirmation output may be provided in cases where a user approval should be obtained before installing an update (e.g., an update to an app downloaded by the user to the device from an app store). In another example, installation confirmation may be skipped if an update is mandatory and/or critical. In one implementation, a confirmation dialog may be displayed to the user (e.g., on the screen of the vehicle's infotainment system). In another implementation an audio notification may be played back to the user (e.g., a voice recording or a beep to alert the user that updates are awaiting installation confirmation). The user may provide installation confirmation input 353 to the device. For example, the user may confirm that the update should be installed (e.g., using a touchscreen or a button of the vehicle's infotainment system, using a voice command) or indicate that the update should be installed at a later time.

The device may administer update installation using an update installation administering (UIA) component 357. See FIG. 7 for additional details regarding the UIA component.

Figure 4:
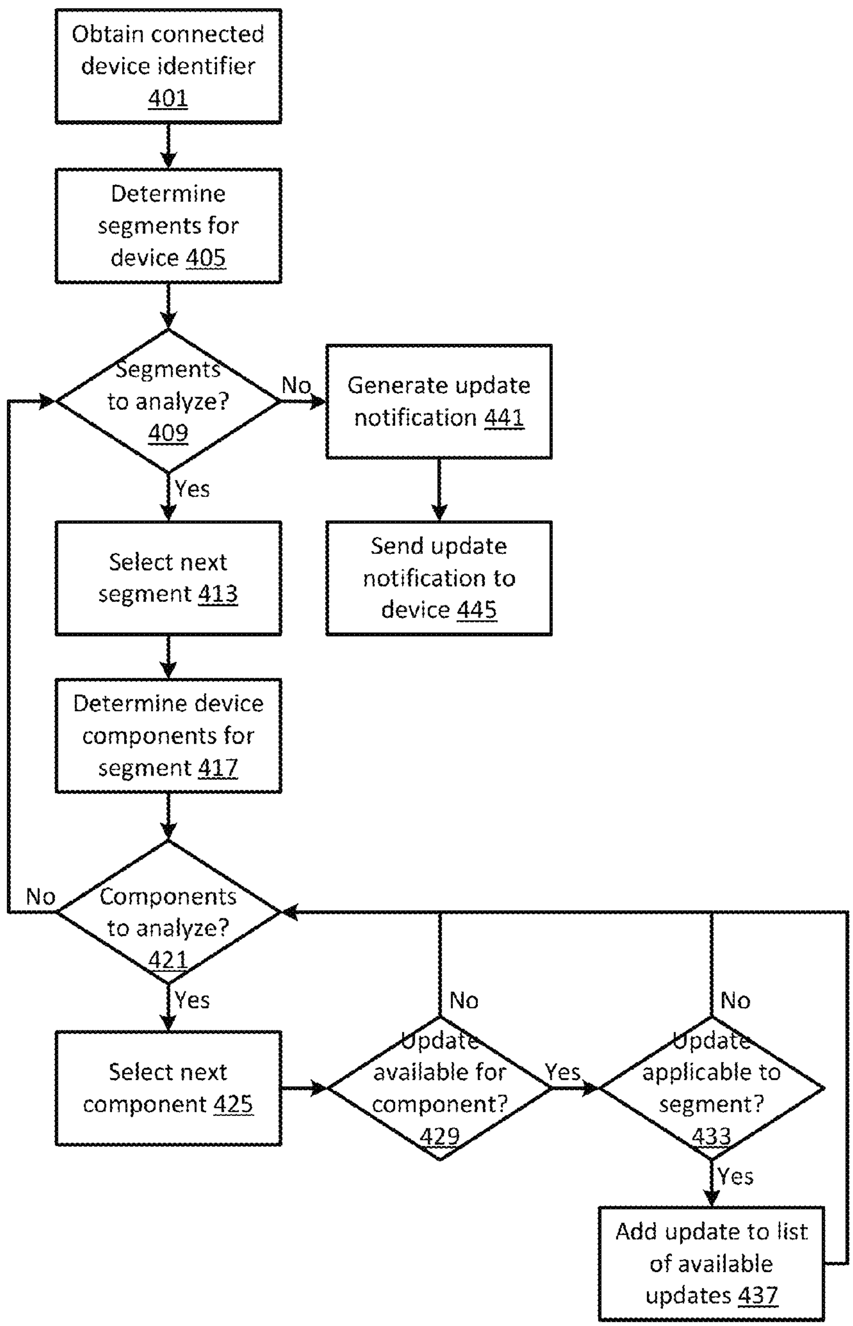
FIG. 4 shows a logic flow diagram illustrating embodiments of a device segment determining (DSD) component for the REDUP.

FIG. 4 shows a logic flow diagram illustrating embodiments of a device segment determining (DSD) component for the REDUP. In FIG. 4, an identifier of a connected device may be obtained at 401. For example, the identifier of the device may be obtained based on data received in the connection notification sent by the device.

Segments for the device may be determined at 405. A segment may be configured to link a group of devices that are a set (e.g., a set of vehicles with specified VINs), and/or that have specified components (e.g., vehicles that utilize a specified ECU) and/or component attributes (e.g., the ECU utilizes a specified firmware version). A device may be associated with one or more segments. In one embodiment, information regarding the device (e.g., the device's bill of materials, versions of components) may be analyzed (e.g., when the device is added to the REDUP) to determine segments associated with the device. Updates installed on the device may be tracked and segments associated with the device may be updated accordingly (e.g., if the ECU is updated with a new firmware version, the device may be placed in the segment associated with the new firmware version and removed from the segment associated with the old firmware version). In one implementation, segments associated with the device may be determined via a MySQL database command similar to the following:

```
SELECT segmentIDs
FROM Devices
WHERE deviceID="identifier of the device";
```

A determination may be made at 409 whether there remain segments to analyze. In one embodiment, each of the segments associated with the device may be analyzed. If there remain segments to analyze, the next segment may be selected at 413. Device components for the segment may be determined at 417. In one implementation, components associated with the segment may be determined via a MySQL database command similar to the following:

```
SELECT componentList
FROM Segments
WHERE segmentID="identifier of the currently analyzed
  segment";
```

A determination may be made at 421 whether there remain components to analyze. In one embodiment, each of the components associated with the segment may be analyzed. If there remain components to analyze, the next component may be selected at 425. A determination may be made at 429 whether an update is available for the component. For example, if a manufacturer of the component released a software update, a data field associated with the component may be set to indicate that an update is available, and this data field may be checked to make this determination. If an update for the component is available, a determination may be made at 433 whether the update is applicable to the segment. For example, a component may utilize different firmware versions (e.g., the component manufacturer may utilize a different firmware version for each vehicle manufacturer that uses the component) and it may be determined whether the update is applicable to the firmware version associated with the segment (e.g., by checking a data field associated with the component update that indicates firmware versions to which the update is applicable). If the update is applicable to the segment, the update may be added to a list of available updates at 437.

If there are no more segments to analyze, an update notification may be generated at 441 that includes the list of available updates. The update notification may be sent to the device at 445. For example, the update notification may be sent via network (e.g., LTE, WiFi).

Figure 5:
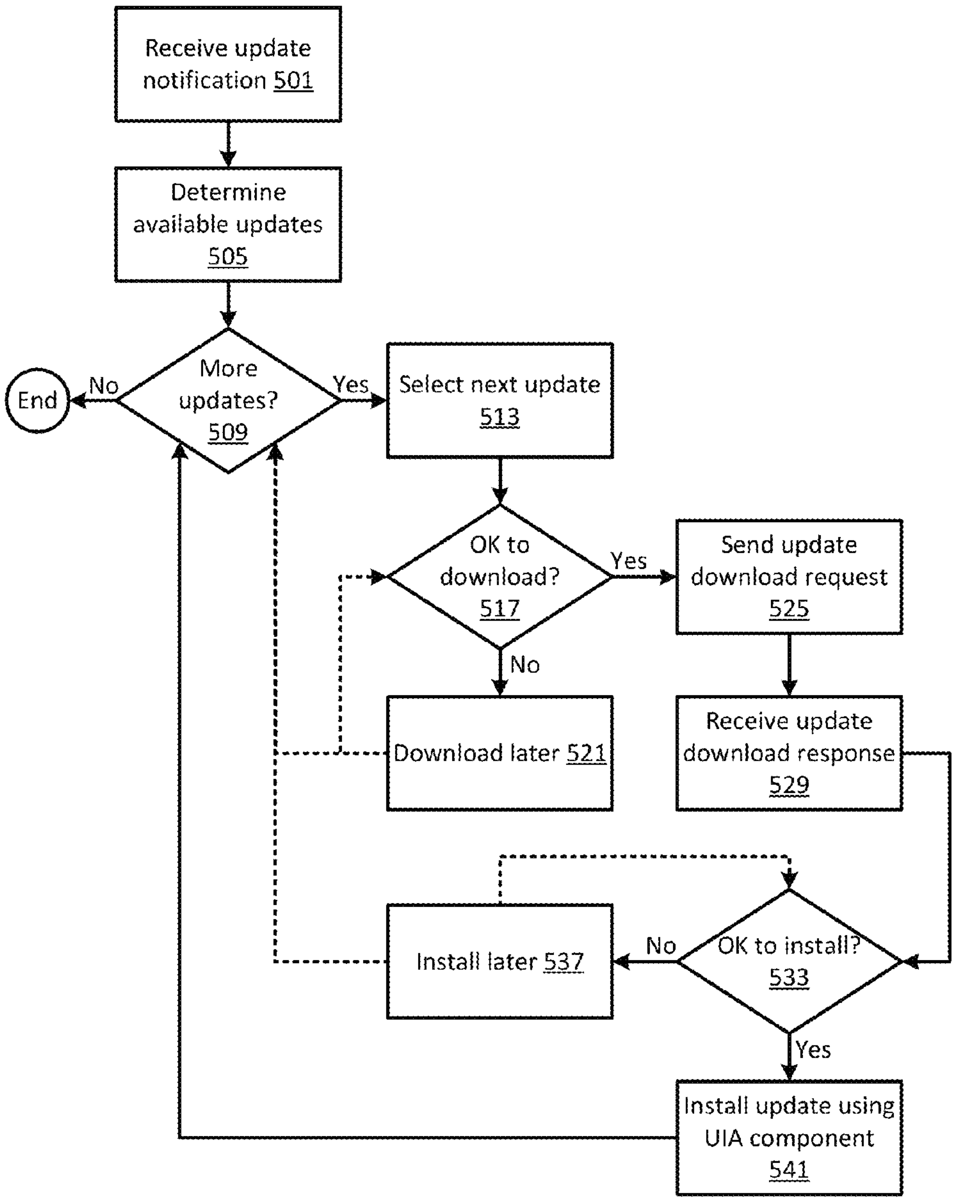
FIG. 5 shows a logic flow diagram illustrating embodiments of an update download administering (UDA) component for the REDUP.

FIG. 5 shows a logic flow diagram illustrating embodiments of an update download administering (UDA) component for the REDUP. In FIG. 5, an update notification may be received at 501. For example, the update notification may be received by a device from an update server. Available updates may be determined at 505. In one embodiment, the received update notification may be parsed (e.g., using PHP commands) to determine available updates.

A determination may be made at 509 whether there remain more updates to process. In one embodiment, each of the available updates may be processed. If there remain updates to process, the next update may be selected at 513. For example, the next highest priority is update may be selected. In another example, the next update in a list of available updates may be selected. A determination may be made whether it is OK to download the update (e.g., based on network connection status). For example, if connection is available and free, it may be OK to download the update. In another example, if connection is unavailable or if connection is busy (e.g., the driver is streaming a movie for occupants of a vehicle), it may not be OK to download the update. If it is not OK to download the update now, the update may be downloaded later 521. In one implementation, a specified period of time may be allowed to elapse and then a check may be made whether it is OK to download the update. In another implementation, the update may be skipped for now and another update may be processed, and a check may be made at a later time whether it is OK to download the update.

If it is OK to download the update, an update download request may be generated and sent at 525. An update download response may be received at 529. In one embodiment, the update download response may include a package with contents of the update. For example, the package may be a file.

A determination may be made at 533 whether it is OK to install the update (e.g., based on package rules). For example, an update to an engine component may be configured to be installable upon vehicle startup while the vehicle is stationary. Accordingly, if the vehicle is currently in motion, it may not be OK to install the update, and the update may be installed the next time the vehicle is turned on. If it is not OK to install the update now, the update may be installed later 537. In one implementation, a specified period of time may be allowed to elapse and then a check may be made whether it is OK to install the update. In another implementation, the update may be skipped for now and another update may be processed, and a check may be made at a later time whether it is OK to install the update.

If it is OK to install the update, the update may be installed at 541 using the UIA component. See FIG. 7 for additional details regarding the UIA component.

Figure 6:
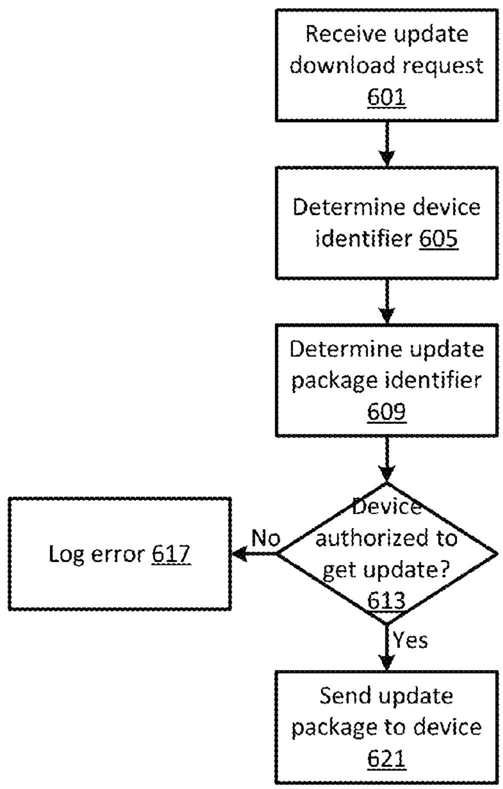
FIG. 6 shows a logic flow diagram illustrating embodiments of a package download administering (PDA) component for the REDUP.

FIG. 6 shows a logic flow diagram illustrating embodiments of a package download administering (PDA) component for the REDUP. In FIG. 6, an update 1*a* download request may be received at 601. For example, the update download request may be received by an update server from a device. In one implementation, the update server may be dedicated to a particular OEM product provider (e.g., vehicle manufacturer). For example, data collected (e.g., logs) and/or provided (e.g., updates) by such update server may not be shared with other OEMs. In another implementation, the update server may be shared among multiple OEM product providers. For example, data collected and/or provided by such update server may be shared among the OEMs.

A device identifier associated with the update download request may be determined at 605. In one embodiment, the update download request may be parsed (e.g., using PHP commands) to determine the device identifier. An update identifier and/or an update package identifier associated with the update download request may be determined at 609. In one embodiment, the update download request may be parsed (e.g., using PHP commands) to determine the update identifier and/or the update package identifier.

A determination may be made at 613 whether the device associated with the device identifier is authorized to get the update associated with the update identifier and/or the update package identifier. In one embodiment, a segment associated with the update may be determined (e.g., based on the update identifier, based on the update package identifier), and a determination may be made whether the device is associated with the segment. A device associated with the segment may be authorized to get the update, while a device not associated with the segment may not be authorized to get the update.

If the device is not authorized to get the update, an error event may be logged at 617. If the device is authorized to get the update, the update package associated with the update may be sent to the device at 621.

Figure 7:
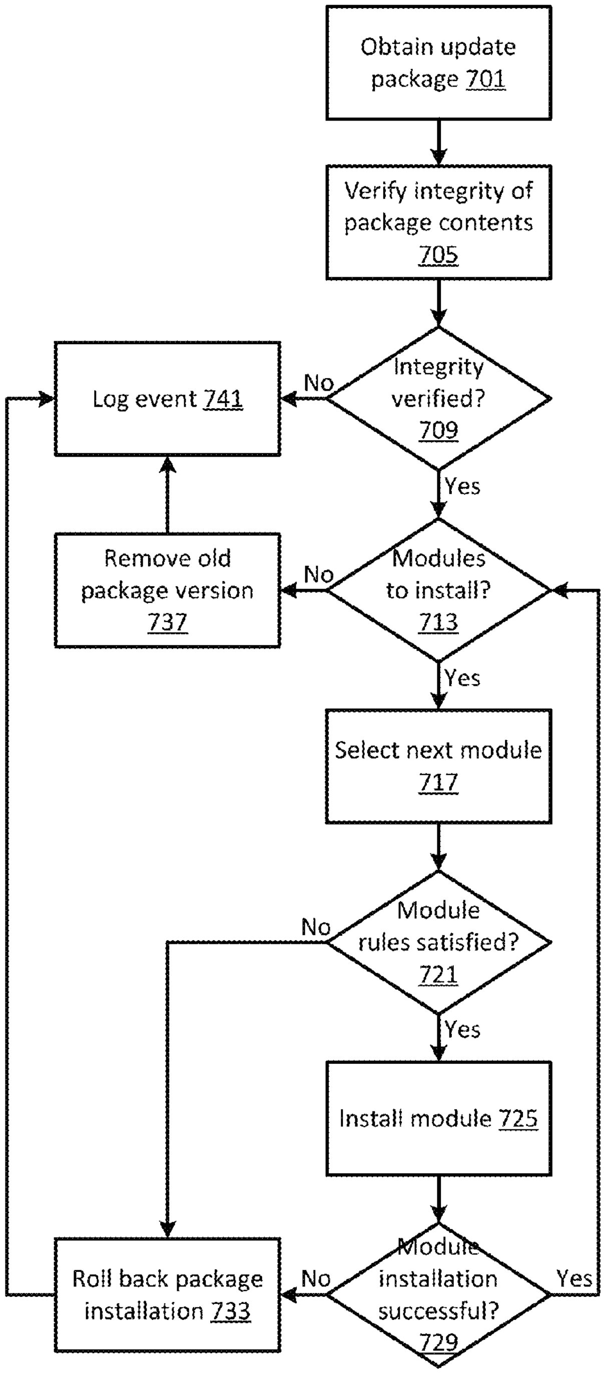
FIG. 7 shows a logic flow diagram illustrating embodiments of an update installation administering (UTA) component for the REDUP.

FIG. 7 shows a logic flow diagram illustrating embodiments of an update installation administering (UTA) component for the REDUP. In FIG. 7, an update package may be obtained at 701. For example, the update package requested by a device may be obtained from an update server.

The integrity of package contents may be verified at 705. In one embodiment, a is checksum associated with the package may be calculated and checked against the package checksum included with the package. If the checksums match, the integrity of the package may be verified. In another embodiment, integrity of individual SUMs may be similarly verified. Accordingly, a determination may be made at 709 whether the integrity is verified. If the integrity is not verified, a corresponding event may be logged at 741.

If the integrity is verified, a determination may be made at 713 whether there remain SUMS to install. In various embodiments, a SUM may comprise a firmware image, a binary application, middleware, drivers, end user applications (e.g., HTML5, Android, QT), configuration files, libraries, scripts, user profiles, and/or the like. For example, a SUM may be a ZIP file that includes SUM contents. In another example, a SUM may be an RPM file. In yet another example, a SUM may be a script file (e.g., that specifies the order in which other SUMs should be installed). In one embodiment, each of the applicable modules may be installed. If there remain modules to install, the next module may be selected at 717. For example, if there are rules that specify how modules in the package depend on each other, a module may be installed after modules on which it depends are installed. In another example, if there are no dependencies, modules may be installed in any order.

A determination may be made at 721 whether rules associated with the module are satisfied. For example, a rule may be to verify whether dependent SUMs have been installed. In another example, a rule may be to check for presence or absence of a specified device component (e.g., ECU) and/or for a specified state of the device component (e.g., the component is turned off, the component uses a specified firmware version). In yet another example, a rule may be to check the state of the device (e.g., the vehicle is stationary) If it is determined that module rules are not satisfied, package installation may be rolled back (e.g., to the old package version using backup files) at 733 and a corresponding event may be logged at 741.

If it is determined that module rules are satisfied, the module may be installed at 725. For example, installation files for the SUM may be executed. A determination may be made at 729 whether the module was installed successfully. If it is determined that the module was is not installed successfully, package installation may be rolled back (e.g., to the old package version using backup files) at 733 and a corresponding event may be logged at 741.

If it is determined that the module was installed successfully, the next module, if any, may be installed. If it is determined that there are no SUMs remaining to be installed, the old package version (e.g., backup files) may be removed from the device at 737. A corresponding event indicating successful installation may be logged at 741.

Figure 8:
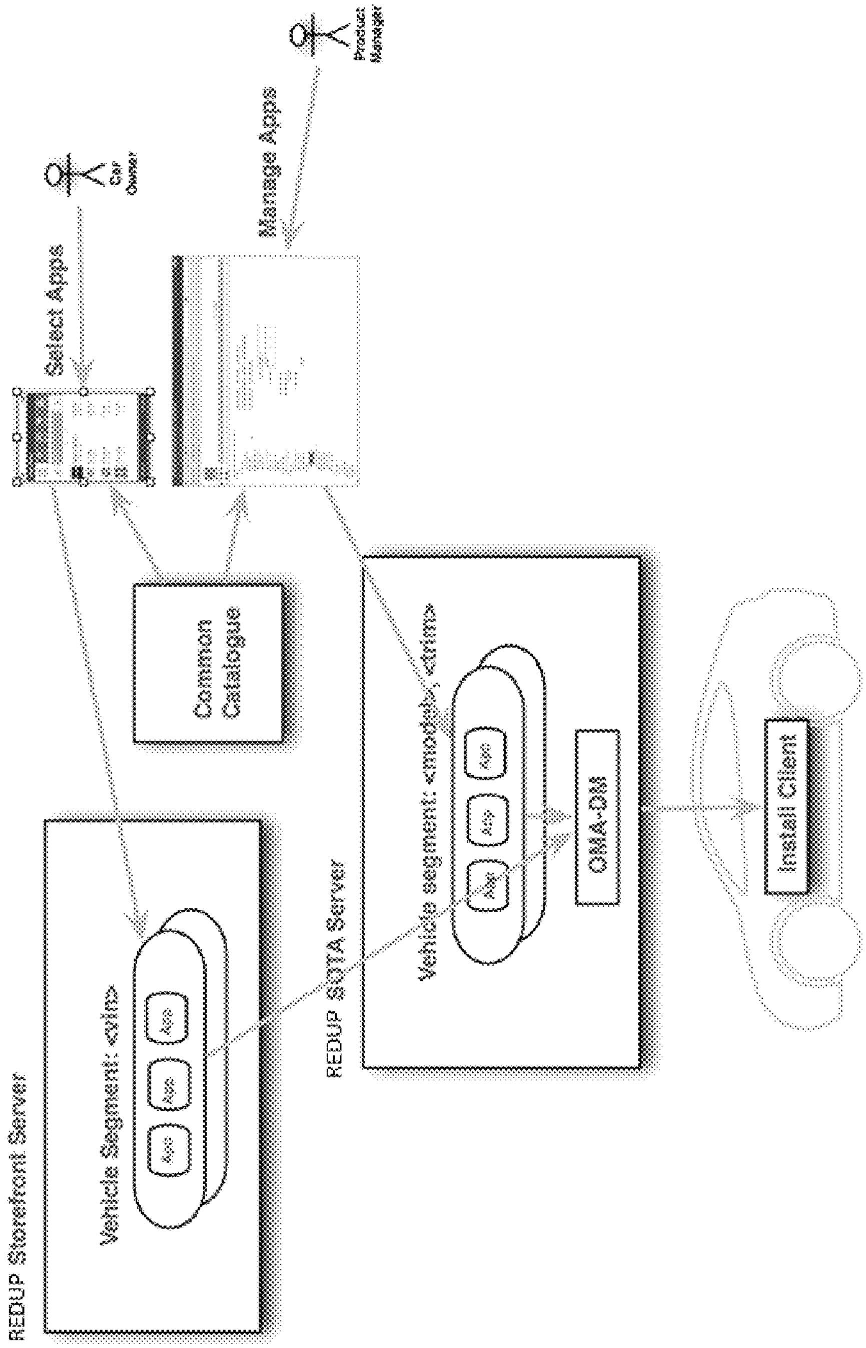
FIG. 8 shows an exemplary model for the REDUP.

FIG. 8 shows an exemplary model for the REDUP. In FIG. 8, a connected device, such as a vehicle, utilizes an install client to facilitate installation of updates from a software over the air (SOTA) server, which may be a part of the hosted cloud platform utilized to facilitate remote management of connected devices via network. In addition, the SOTA server may facilitate distribution and updates of apps that may be obtained by a user (e.g., a car owner) for the connected device. For example, OMA-DM protocol may be utilized to facilitate such remote management (e.g., utilized to synchronize information regarding the vehicle's state between the SOTA server and the vehicle).

The connected device may be associated with one or more segments (e.g., based on the vehicle's model and trim). A REDUP administrator (e.g., a product manager) may define which apps are available for which segments. Accordingly, the user may install apps, which are approved for segments associated with the connected device, on the connected device. In one embodiment, the user may utilize the connected device (e.g., the user interface of the vehicle's infotainment system) to select a desired app available from a storefront server (e.g., a separate cloud hosted storefront, a part of the hosted cloud platform).

An app selected by the user may be delivered from the storefront server via the SOTA server and installed on the device. Updates to the app may similarly be delivered via the SOTA server and installed on the device.

Figure 9:
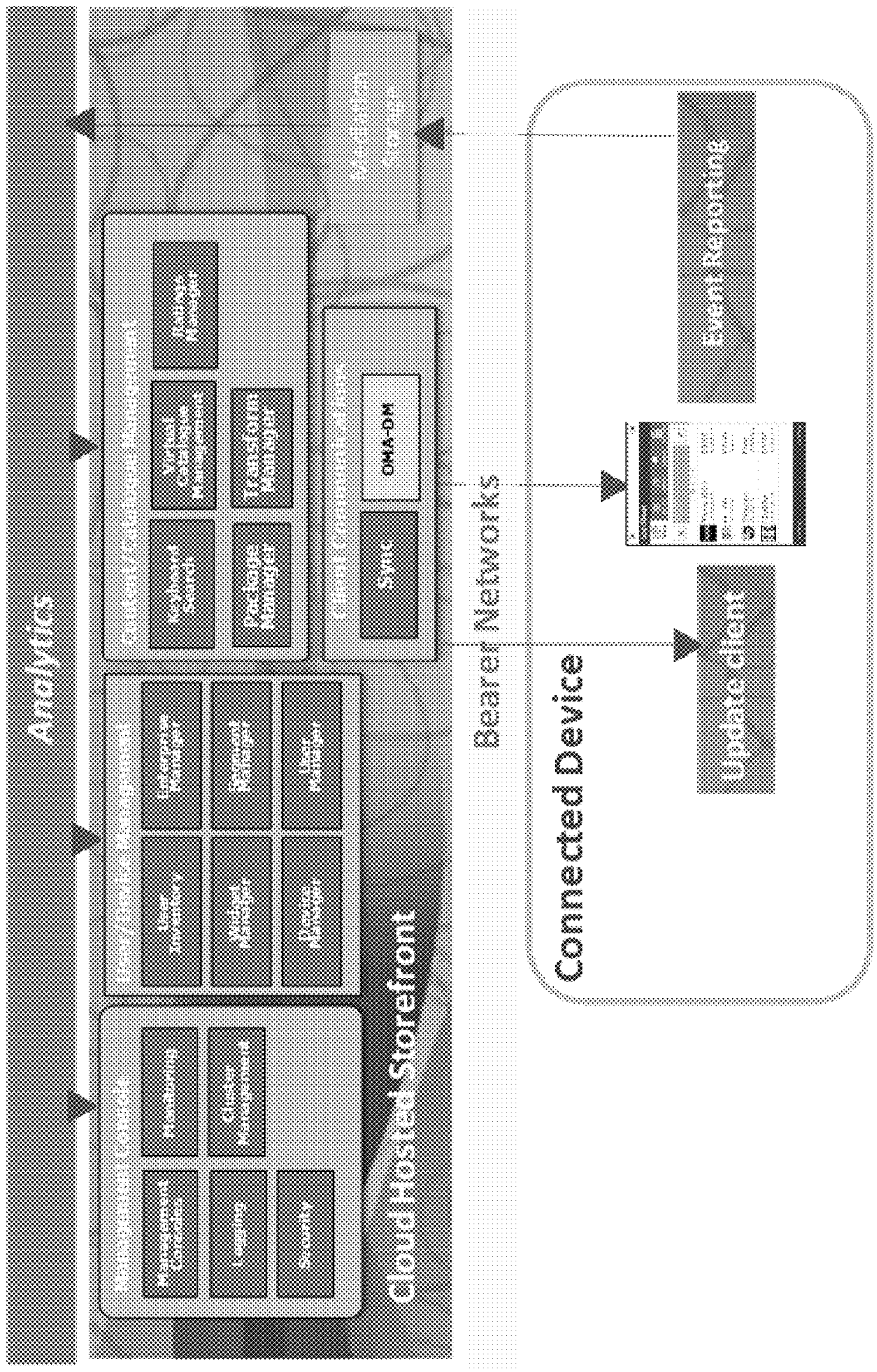
FIG. 9 shows an exemplary architecture for the REDUP.

FIG. 9 shows an exemplary architecture for the REDUP. In FIG. 9, a suite of client/server components supporting a remote app management server, client reporting and analytics is shown. A cloud hosted storefront is utilized to facilitate remote management of apps on connected devices via network. In one implementation, a J2EE application that operates in a clustered configuration for resilience, performance and scalability, utilizing a relational database that may also be clustered may be utilized. For example, the live system may sit in the cloud and may be hosted in a variety of environments (e.g., Amazon EC2).

A connected device may be notified (e.g., on start up, periodically, upon update availability) when updates (e.g., new apps approved for the device, updates to installed apps) are available. In one implementation, a notification may be sent to the device when updates are available for one or more segments associated with the device. The device may download updates (e.g., in the form of update packages) via network (e.g., via LTE, via WiFi) from the cloud hosted storefront and install them using an update client. A rules engine may be utilized to configure updates for specific segments and to ensure that dependencies and restrictions associated with update package components (e.g., modules) are satisfied.

The device may log specified events associated with apps. For example, logged events may include installation and configuration events, app usage data, app error events, telematic data, and/or the like. Logged events data may be securely delivered in structured data format via the cloud hosted storefront to various analytics applications.

Figure 10:
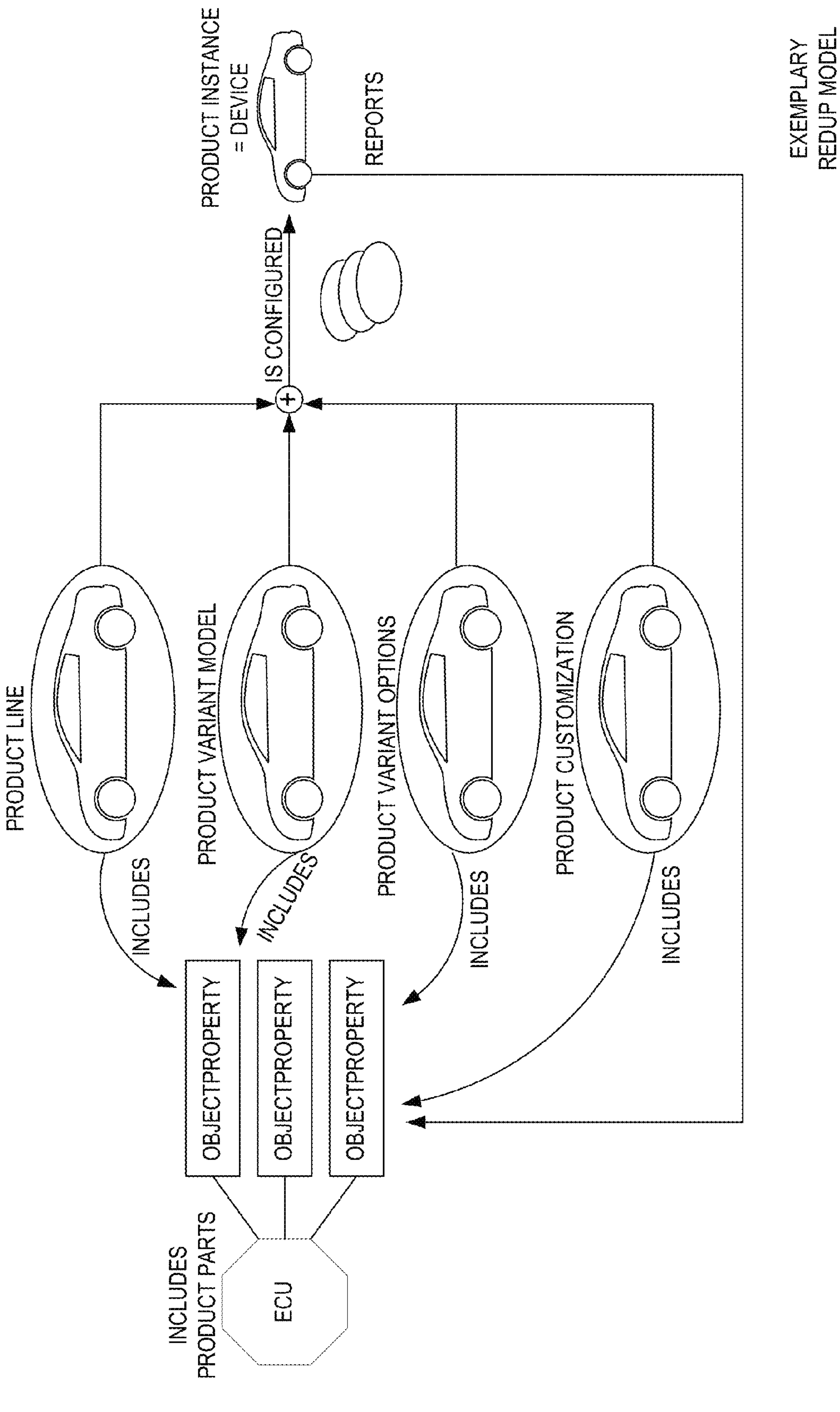
FIG. 10 shows an exemplary model for the REDUP.

FIG. 10 shows an exemplary model for the REDUP. In FIG. 10, segments associated with a connected device (e.g., a vehicle) are shown. In this example, there are four segments associated with the vehicle—a product line segment, a product variant model segment, a product variant options segment, and a product customization segment. These segments may be additive. Each segment may include one or more specified product parts (e.g., ECUs) and/or attribute values (e.g., firmware versions, configuration options) of product parts. In this way each vehicle may be defined by the collection of segments it belongs to. When an update package is published it may be associated with a segment and any vehicle associated with the segment may be notified regarding the update. Thus, every vehicle does not have to contact an update server (e.g., each day) to check for updates. Instead, this targeted notification allows the server to notify appropriate vehicles to check for updates, and to control the priority, ordering and load spreading for updates.

Figure 11:
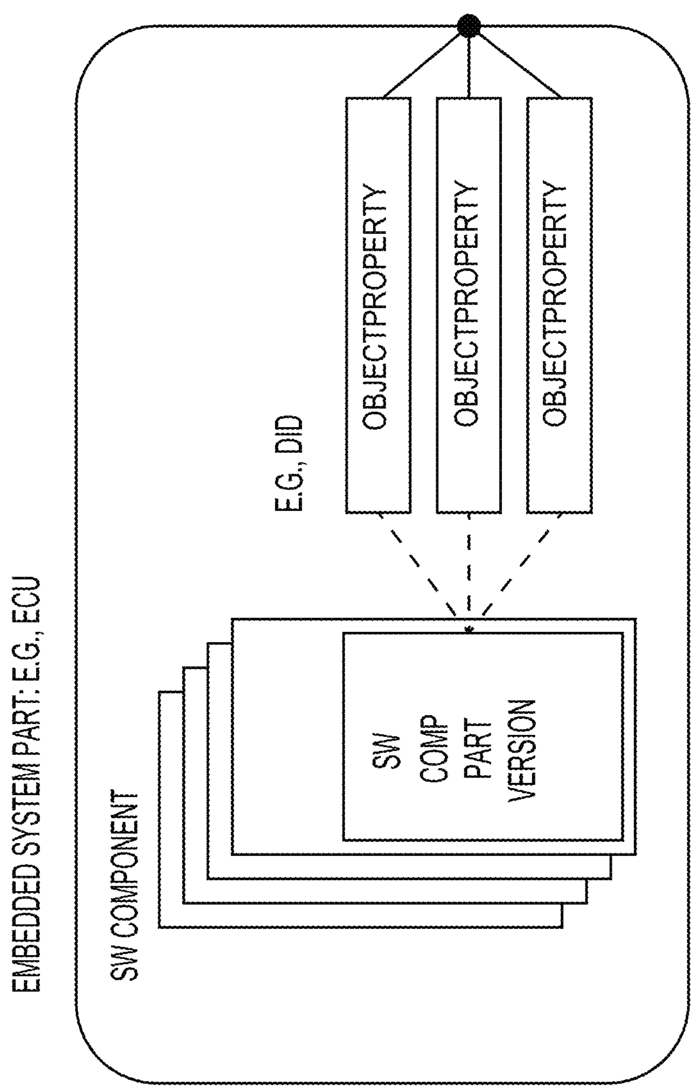
FIG. 11 shows an exemplary architecture for the REDUP.

FIG. 11 shows an exemplary architecture for the REDUP. In FIG. 11, an is embedded system part (e.g., ECU) is shown. In one embodiment, ECUs may be vehicle parts comprising one or more hardware and/or software components. In various implementations, a software component may be an embedded system, a binary application, middleware, a user application, user content, and/or the like. A set of attributes may also be associated with an ECU. The ECU may report attribute values (e.g., via data identifiers (DIDs), via an RPM database, via an HTML5 execution environment). Attribute values may be communicated to an update server and utilized to define dependencies between SUMs and the state of the vehicle.

Figure 12:
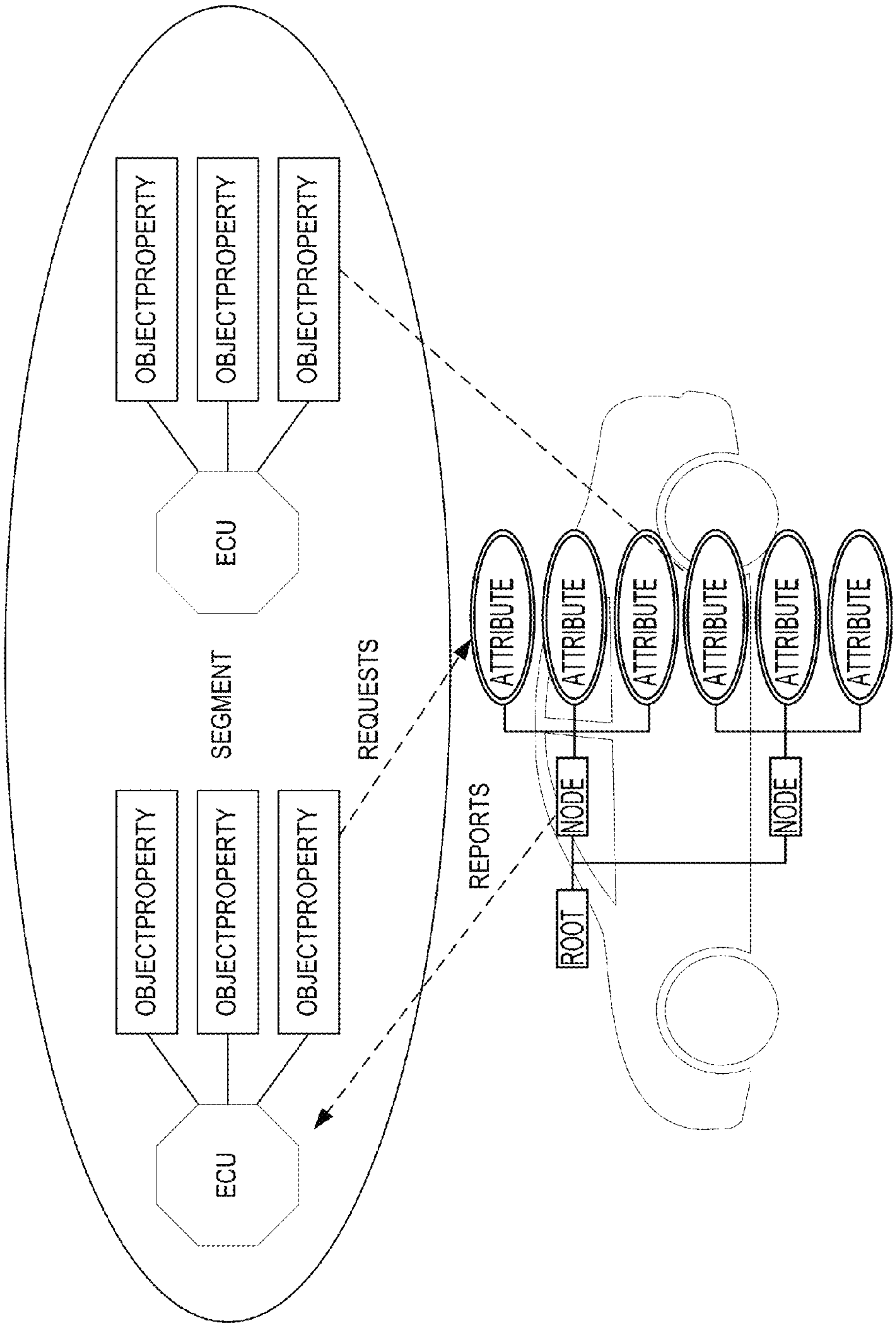
FIG. 12 shows an exemplary architecture for the REDUP.

FIG. 12 shows an exemplary architecture for the REDUP. In FIG. 12, an OMA-DM tree is used to model the current state of device components (e.g., ECUs and their attributes) for a device (e.g., a vehicle). OMA-DM may be used to synchronize information (e.g., data regarding a vehicles state) between a server and vehicles. Segments may manage specific ECUs. Accordingly, a SUM may utilize reported attributes to resolve dependencies on the target ECU and any dependent ECUs.

Figure 13:
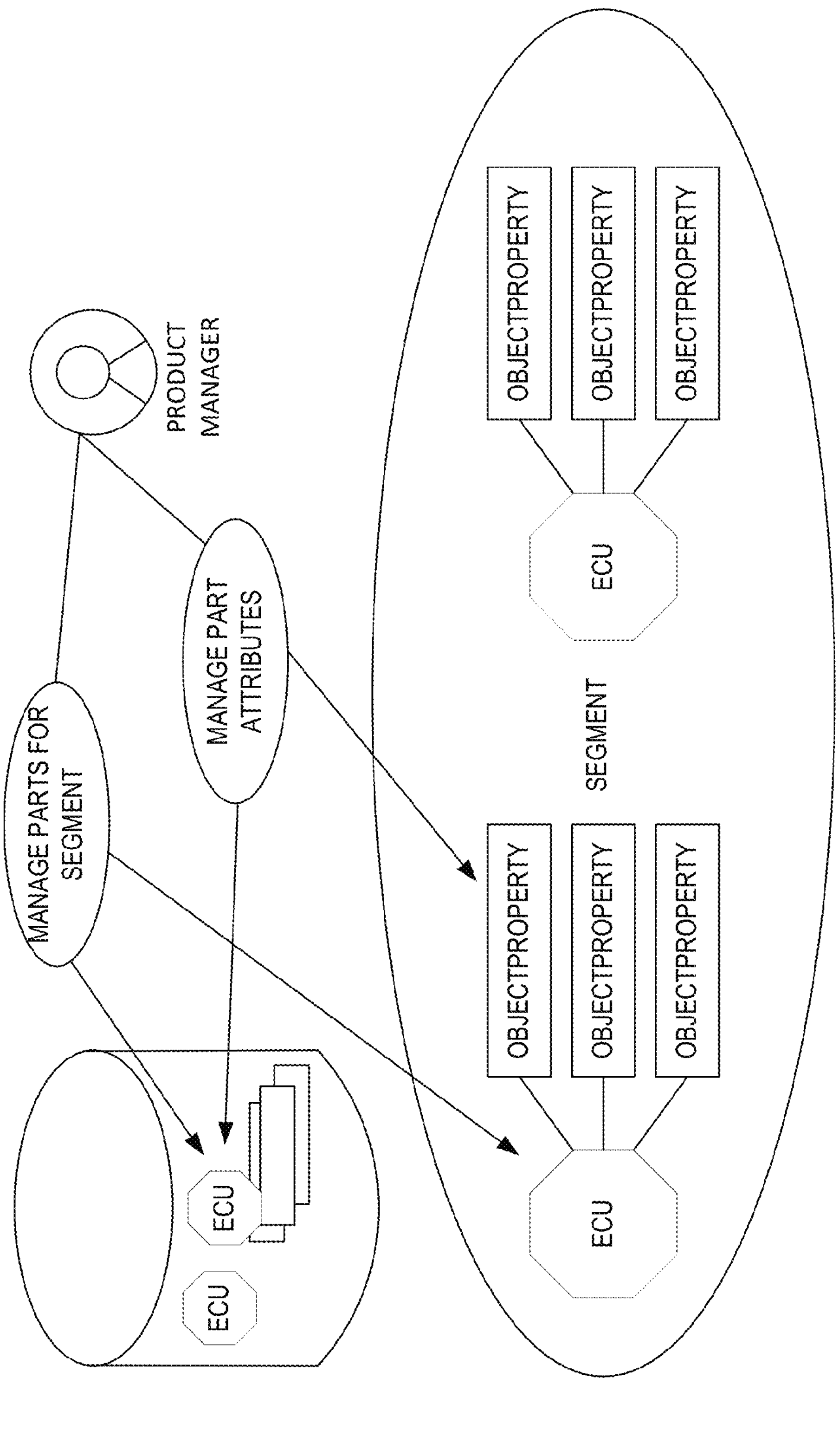
FIG. 13 shows an exemplary architecture for the REDUP.

FIG. 13 shows an exemplary architecture for the REDUP. In FIG. 13, a REDUP administrator (e.g., a product manager) may define (e.g., via a REDUP user interface) parts (e.g., ECUs) that should be associated with a segment. The REDUP administrator may also define attributes for each part that are associated with the segment. This data may be stored in a database and utilized to determine whether a device belongs to a segment.

Figure 14:
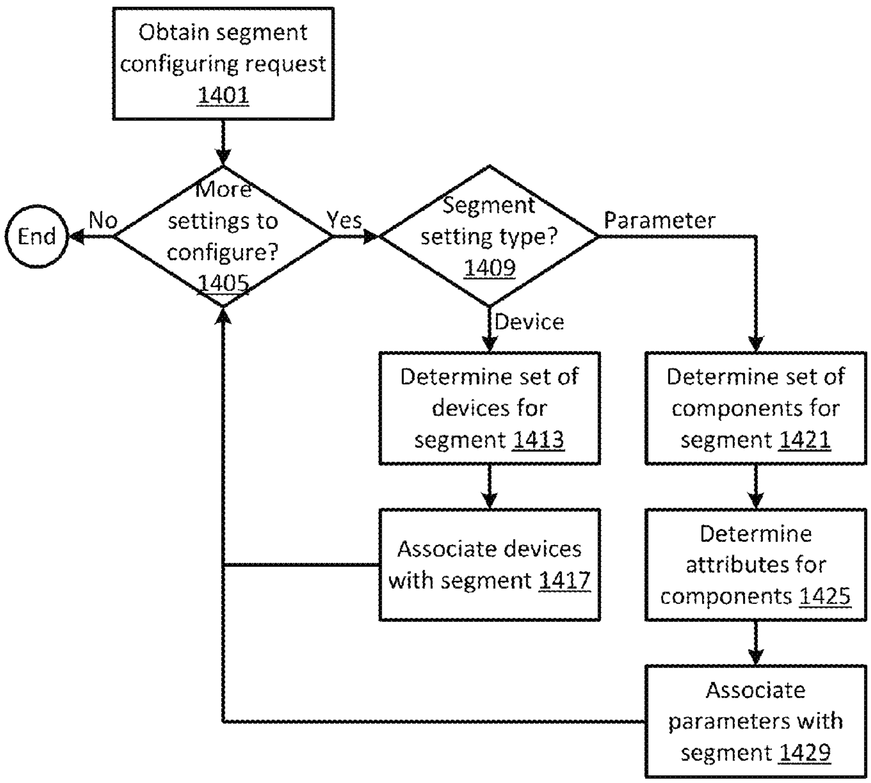
FIG. 14 shows a logic flow diagram illustrating embodiments of a product segment configuring (PSC) component for the REDUP.

FIG. 14 shows a logic flow diagram illustrating embodiments of a product segment configuring (PSC) component for the REDUP. In FIG. 14, a segment configuring request may be obtained at 1401. For example, the segment configuring request may be obtained when a REDUP administrator initiates configuration of a segment.

A determination may be made at 1405 whether there remain more settings to configure For example, there may be more settings to configure until the REDUP administrator indicates otherwise. If there remain more settings to configure, a determination may be made at 1409 regarding a segment setting type.

In one embodiment, a segment setting may be specified based on a set of devices. For example, the set of devices may be a set of vehicles that are used by a manufacturer for testing purposes. In another example, the set of devices may be a set of vehicles that may have been manufactured using an older part number and may have to utilize a custom software fix. In yet another example, the set of devices may be a set of vehicles that are associated (e.g., located in, sold in) with a geographic location (e.g., a country, a state). A set of devices for the segment may be determined at 1413. For example, the set of devices may be specified as a list of vehicle VIN numbers (e.g., provided by the REDUP administrator). Specified devices may be associated with the segment at 1417. For example, a database record associated with the segment may be updated to include the list of specified vehicles. In one implementation, specified devices may be associated with the segment via a MySQL database command similar to the following:

```
UPDATE Segments
SET segmentDevicesList="list of specified devices"
WHERE segmentID="identifier of the segment";
```

In another embodiment, a segment setting may be specified based on a set of parameters. For example, the set of parameters may be a collection of components and attributes associated with the components. A set of components for the segment may be determined at 1421. For example, the set of components may be specified as a set of ECUs (e.g., provided by the REDUP administrator). Attributes for components may be determined at 1425. For example, one segment may be defined for vehicles utilizing ECU with version one of the firmware and another segment may be defined for vehicles utilizing ECU with version two of the firmware. In another example, one segment may be defined for vehicles utilizing ECU configured to use normal settings and another segment may be defined for vehicles utilizing ECU configured to use sports settings. Specified parameters may be associated with the segment at 1429. For example, a database record associated with the segment may be updated to include the parameters. In one implementation, specified parameters may be associated with the segment via a MySQL database command similar to the following:

```
UPDATE Segments
SET segmentParameters="specified parameters"
WHERE segmentID="identifier of the segment";
```

Figure 15:
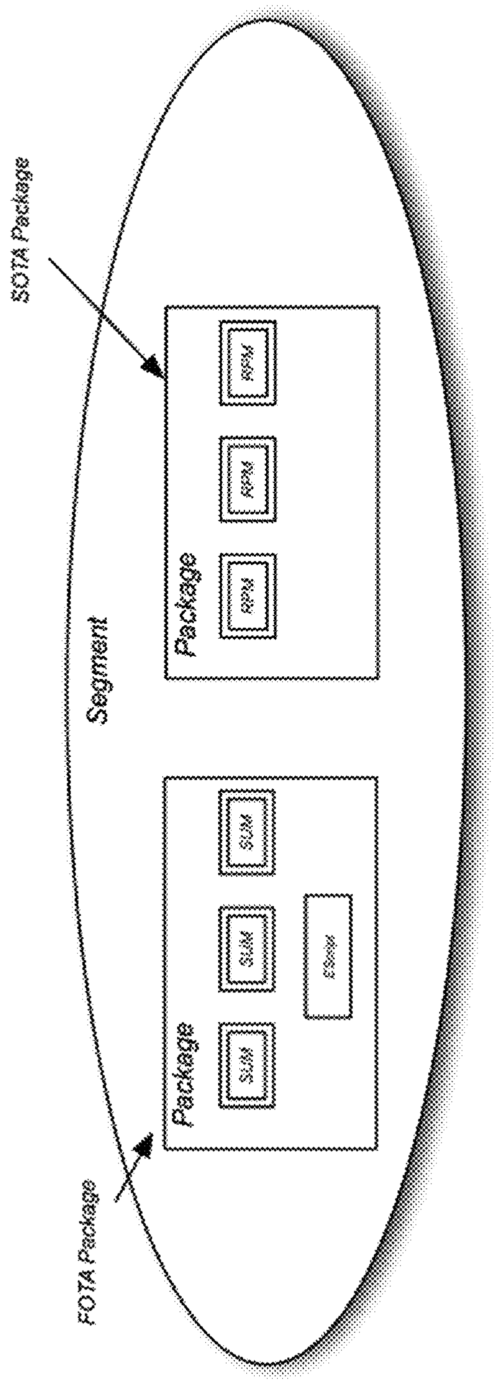
FIG. 15 shows an exemplary architecture for the REDUP.

FIG. 15 shows an exemplary architecture for the REDUP. In FIG. 15, two updates are available for a segment. An update to firmware of device components may be delivered using a firmware over the air (FOTA) update package. An update to software running on the device may be delivered using a software over the air (SOTA) package. In one embodiment, update packages may be independent from each other for installation purposes. Each update package includes a plurality of SUMs. For example, the FOTA package may include three ZIP files and a script file. In another example, the SOTA package may include three RPM files.

Figure 16:
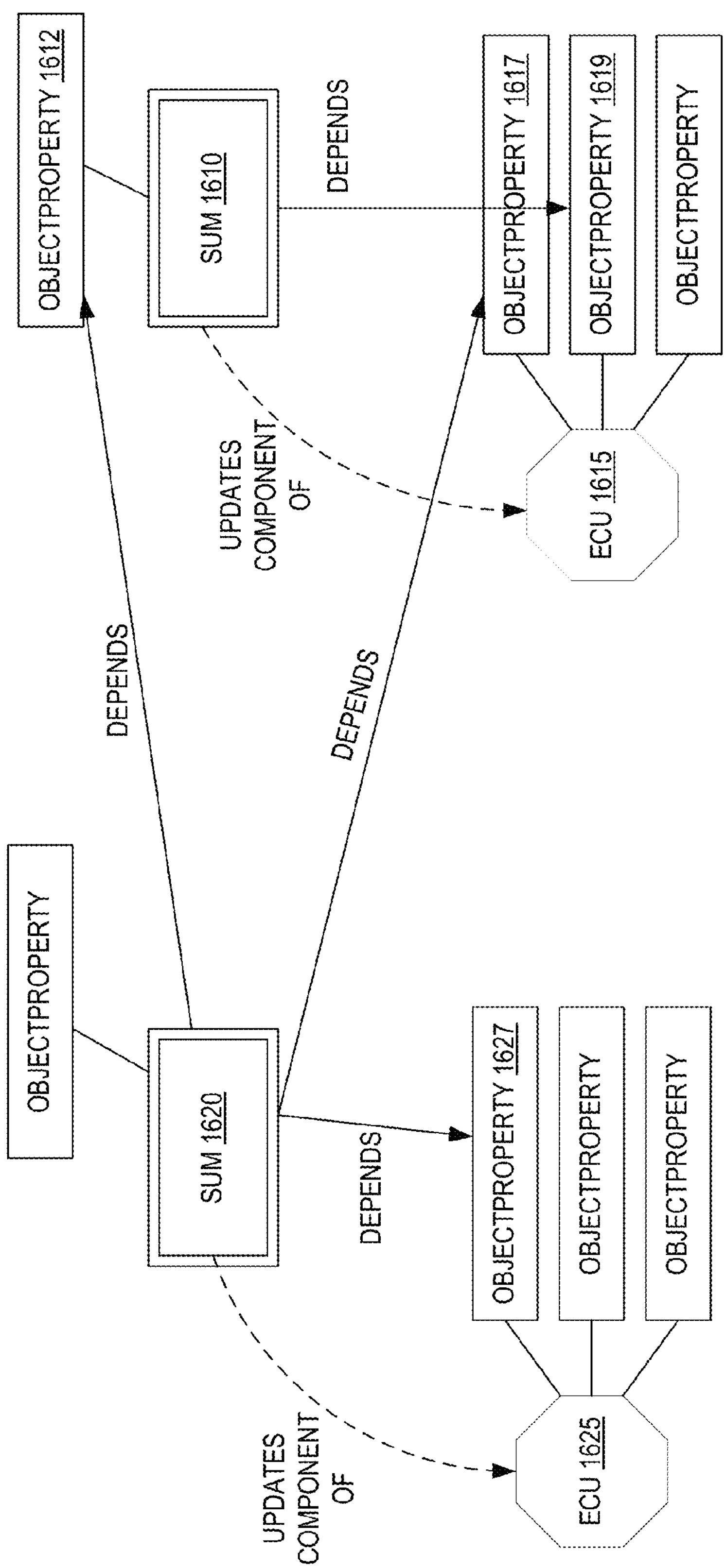
FIG. 16 shows an exemplary architecture for the REDUP.

FIG. 16 shows an exemplary architecture for the REDUP. In FIG. 16, two SUMs that are a part of an update package are shown. A SUM takes a component (e.g., an ECU) from one version to another. SUM rules (e.g., whether a SUM may be installed on a component, how a SUM should be installed on a component) may depend on component attributes and/or on other SUMs. For example, SUM 1610 is utilized to upgrade ECU 1615. The way in which SUM 1610 is installed depends on the value of attribute 1619 of ECU 1615. In another example, SUM 1620 is utilized to upgrade ECU 1625. SUM rules specify that SUM 1620 may be installed after SUM 1610 is installed. Whether SUM 1610 has been installed may be determined based on the value of attribute 1612 of SUM 1610. The way in which SUM 1620 is installed depends on the value of attribute 1617 of ECU 1615 and on the value of attribute 1627 of ECU 1625.

Figure 17:
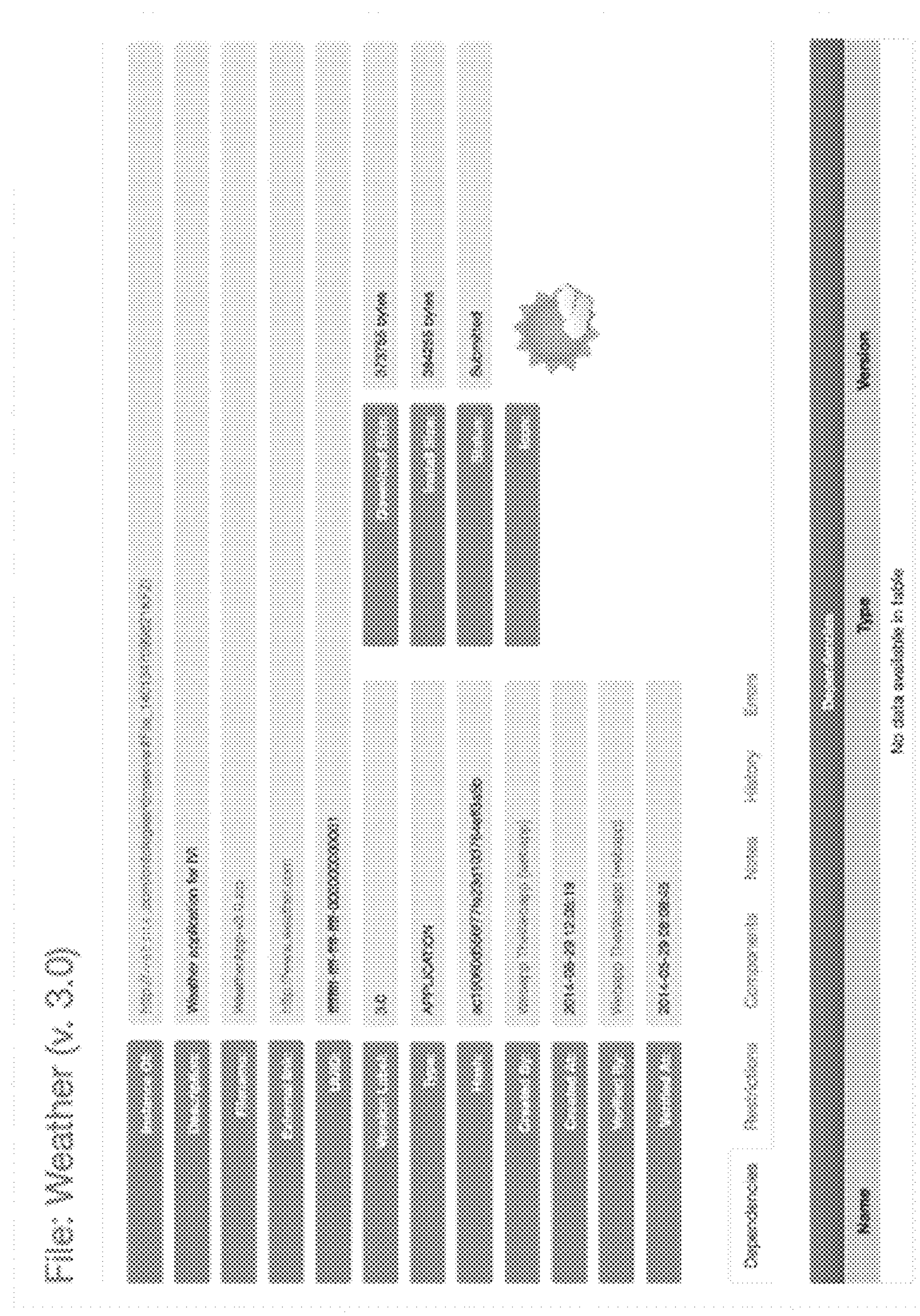
FIG. 17 shows a screenshot diagram illustrating embodiments of the REDUP.

FIG. 17 shows a screenshot diagram illustrating embodiments of the REDUP. In FIG. 17, a summary page showing parameters associated with a SUM to upgrade a weather application (e.g., utilized by a vehicle's infotainment system) to version 3.0 is shown. For example, parameters associated with a SUM may include a name (e.g., weather application), a filename (e.g., WeatherApp-v3.0.zip), an identifier (e.g., a universally unique identifier (UUID)), a version label (e.g., 3.0), a type (e.g., application), a checksum (e.g., a hash), a timestamp, download size, an icon, applicable components (e.g., infotainment system), and/or the like. In another example, parameters associated with a SUM may include rules such as dependencies (e.g., a SUM may depend on other SUMs, on device attributes, on component (e.g., ECU) presence and/or attributes), restrictions (e.g., update is available if version 2.0 is already installed, update is available for premium tier users), and/or the like.

Figure 18:
FIG. 18 shows a screenshot diagram illustrating embodiments of the REDUP.

FIG. 18 shows a screenshot diagram illustrating embodiments of the REDUP. In FIG. 18, a summary page showing parameters associated with a package to upgrade a set of initial applications (e.g., utilized by a vehicle's infotainment system) to version 3.0 is shown. For example, parameters associated with a package may include a name (e.g., initial applications), a version label (e.g., 3), a priority (e.g., not critical), a segment (e.g., identifiers of segments for which the package is applicable), a checksum (e.g., a hash), a timestamp, download size, and/or the like. In another example, parameters associated with a package may include SUMs associated with the package (e.g., a SUM for the weather application, other SUMs that are part of the set of initial applications such as for Spotify and Facebook).

Figure 19:
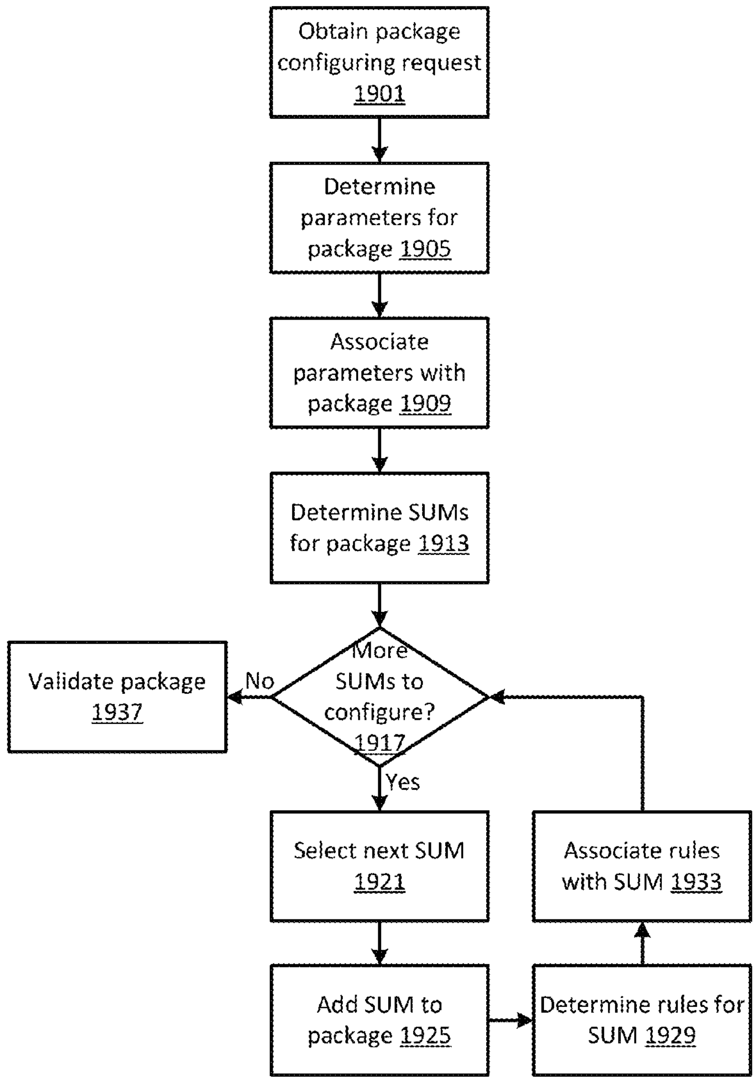
FIG. 19 shows a logic flow diagram illustrating embodiments of an update package configuring (UPC) component for the REDUP.

FIG. 19 shows a logic flow diagram illustrating embodiments of an update package configuring (UPC) component for the REDUP. In FIG. 19, a package configuring request may be obtained at 1901. For example, the package configuring request may be obtained when a REDUP administrator initiates configuration of an update package.

Parameters for the package may be determined at 1905. In one embodiment, parameters for the package may be specified by a REDUP administrator. For example, the REDUP administrator may specify a priority associated with the package. In another embodiment, parameters for the package may be calculated. For example, a checksum may be calculated for the package. The determined parameters may be associated with the package at 1909. For example, the parameters may be saved as part of the package file.

SUMs associated with the package may be determined at 1913. In one embodiment, SUMs for the package may be specified by a REDUP administrator. For example, the REDUP administrator may specify a list of SUMs associated with the package. In another embodiment, SUMs for the package may be determined based on dependencies. For example, if a first SUM is included in the package and depends on a second SUM, the second SUM may be included in the package. In some implementations, packages may be configured based on attributes of a device requesting an update. Accordingly, if the second SUM was previously installed on the device, the second SUM may not be included in the package, but if the second SUM was not previously installed on the device, the second SUM may be included in the package.

A determination may be made at 1917 whether there remain more SUMs to configure For example, there may be more SUMs to configure until the REDUP administrator indicates otherwise. If there remain more SUMs to configure, the next SUM may be selected at 1921. The SUM (e.g., a ZIP file) may be added to the package at 1925. Rules for the SUM may be determined at 1929. For example, the REDUP administrator may specify rules (e.g., dependencies, restrictions) associated with the SUM. The determined rules may be associated with the SUM at 1933. For example, the rules may be saved in a rules file and included in the ZIP file associated with the SUM.

If it is determined that there are no SUMs remaining to be configured, the package may be validated at 1937. In one embodiment, dependencies and/or restrictions may be checked. For example, a check may be performed to ensure that SUMs upon which other SUMs depend are included in the package. In another example, a check may be performed to ensure that a component (e.g., ECU) upon which a SUM in the package depends is a part of each segment to which the package is applicable. In another embodiment, a confirmation may be obtained from a REDUP administrator (e.g., via a REDUP user interface) that parameters have been specified correctly.

Figure 20:
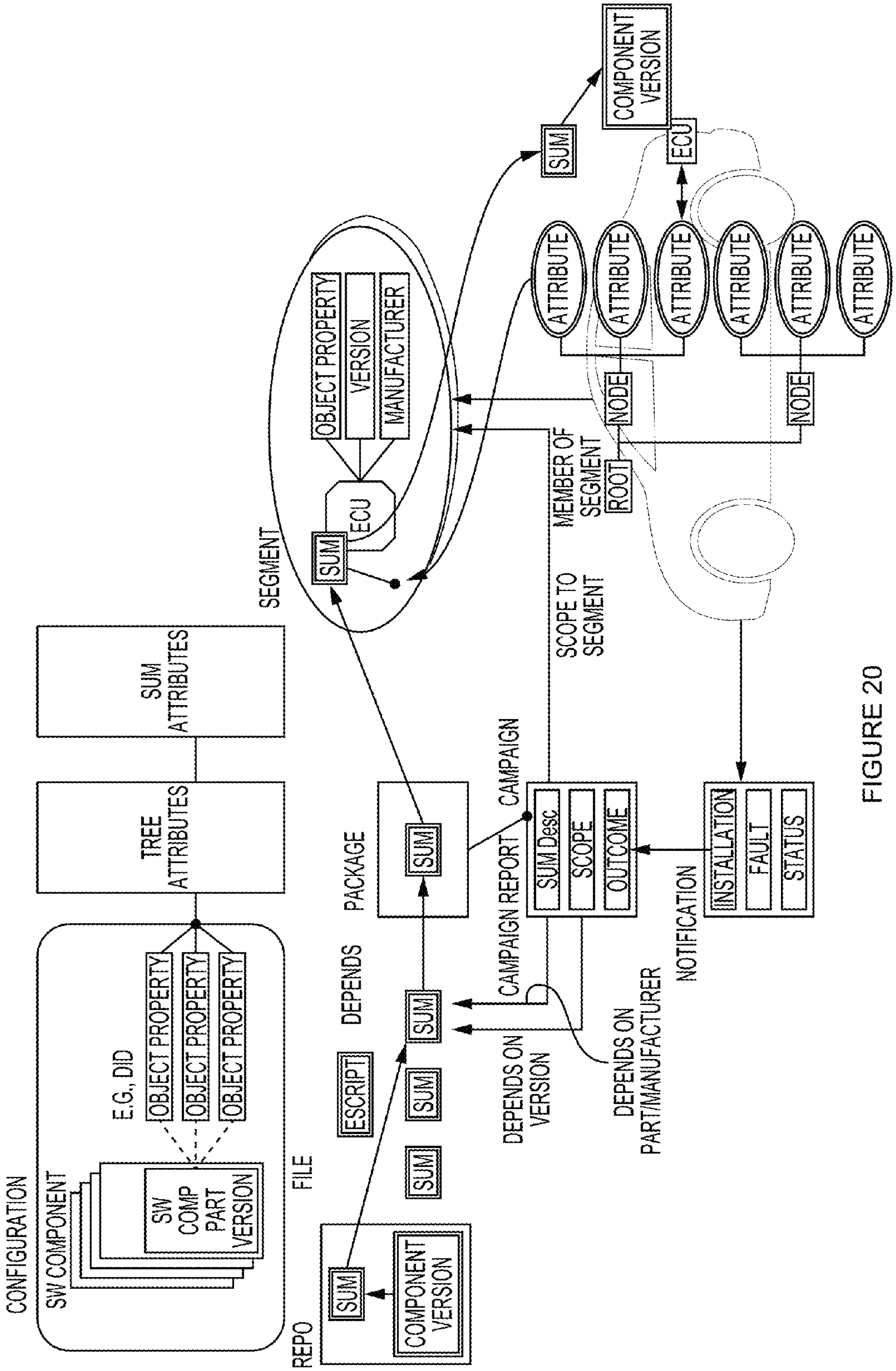
FIG. 20 shows an exemplary architecture for the REDUP.

FIG. 20 shows an exemplary architecture for the REDUP. In FIG. 20, an overview illustrating relationships between products, update packages and SUMs, and product segments is shown. Component software versions are managed via software lifecycle management processes on the backend (e.g., by third party vendors).

SUMs are created to facilitate changing the version of a product component from one to another. In one embodiment, SUMs may be created via a REDUP workflow (e.g., as described with regard to FIG. 2). In another embodiment, SUMs may be created by third party vendors (e.g., third party vendors may sign their SUMs for security purposes). A SUM may have dependencies that link the SUM to product components (e.g., ECUs) and/or to other SUMs and/or to parameters of the OMA-DM tree (e.g., vehicle VIN number).

SUMs may be organized into packages. Packages may provide a convenient bag for SUMs managed and published at the same time. Packages may be published onto segments. The segment may manage components (e.g., ECUs) for the SUMs in a package. Packages may be linked to update campaigns. A campaign for a software update may facilitate publishing packages from the cloud to a product (e.g., a vehicle) and results of the campaign may be subsequently reported back to the cloud. Publishing a package may involve sending out notifications to products (e.g., vehicles) that are members of the segment. When notified, the products may request installers to update the attributes in the tree and then request the server to download any SUMs. SUMs are routed to the correct installers (e.g., different components may utilize different installers) and executed. An installation report may be delivered back to the cloud indicating success of failure of the update session. This also facilitates measuring the effectiveness of the campaign.

Figure 21:
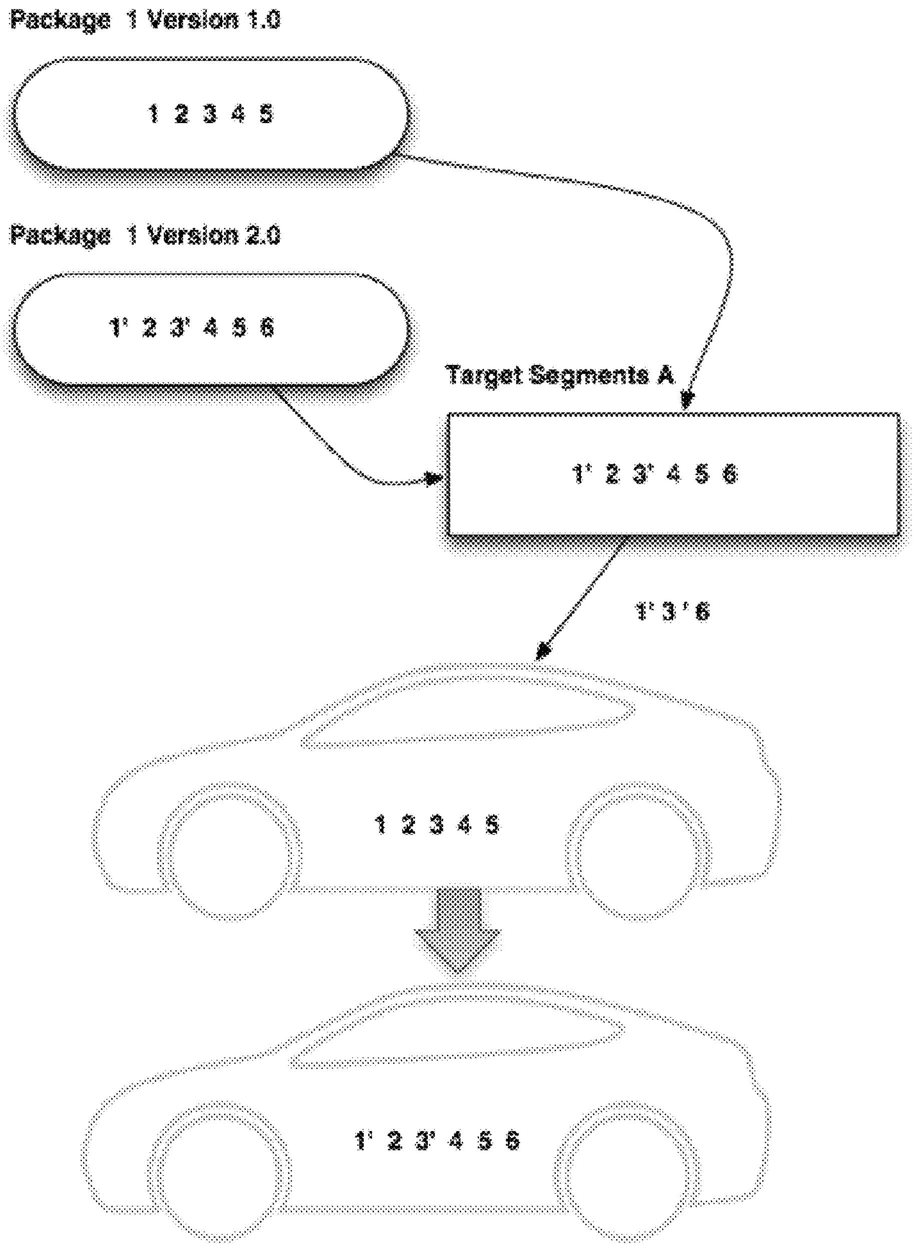
FIG. 21 shows an exemplary model for the REDUP.

FIG. 21 shows an exemplary model for the REDUP. In FIG. 21, an example illustrating how a device (e.g., a vehicle) may be updated using the REDUP is shown. In this example, the vehicle is associated with segment A and starts in a specified state. As shown, the vehicle starts with an initial versions of components (e.g., a set software applications) 1, 2, 3, 4, and 5. For example, these components may have been delivered to the vehicle in package 1 version 1.0. An update for segment A may be provided using package 1 version 2.0 with components 1', 2, 3', 4, 5, and 6. The ' character denotes an updated version of the previous version of software (e.g., 2' is an update version of component 2, while 6 is an initial version of a new component). Based on the initial state reported by the vehicle to an update server, the server may determine that the vehicle should download components 1', 3', and 6. Components 2, 4, and 5 are not downloaded because they are already installed. After the update the vehicles includes components 1', 2, 3', 4, 5, and 6.

Figure 22:
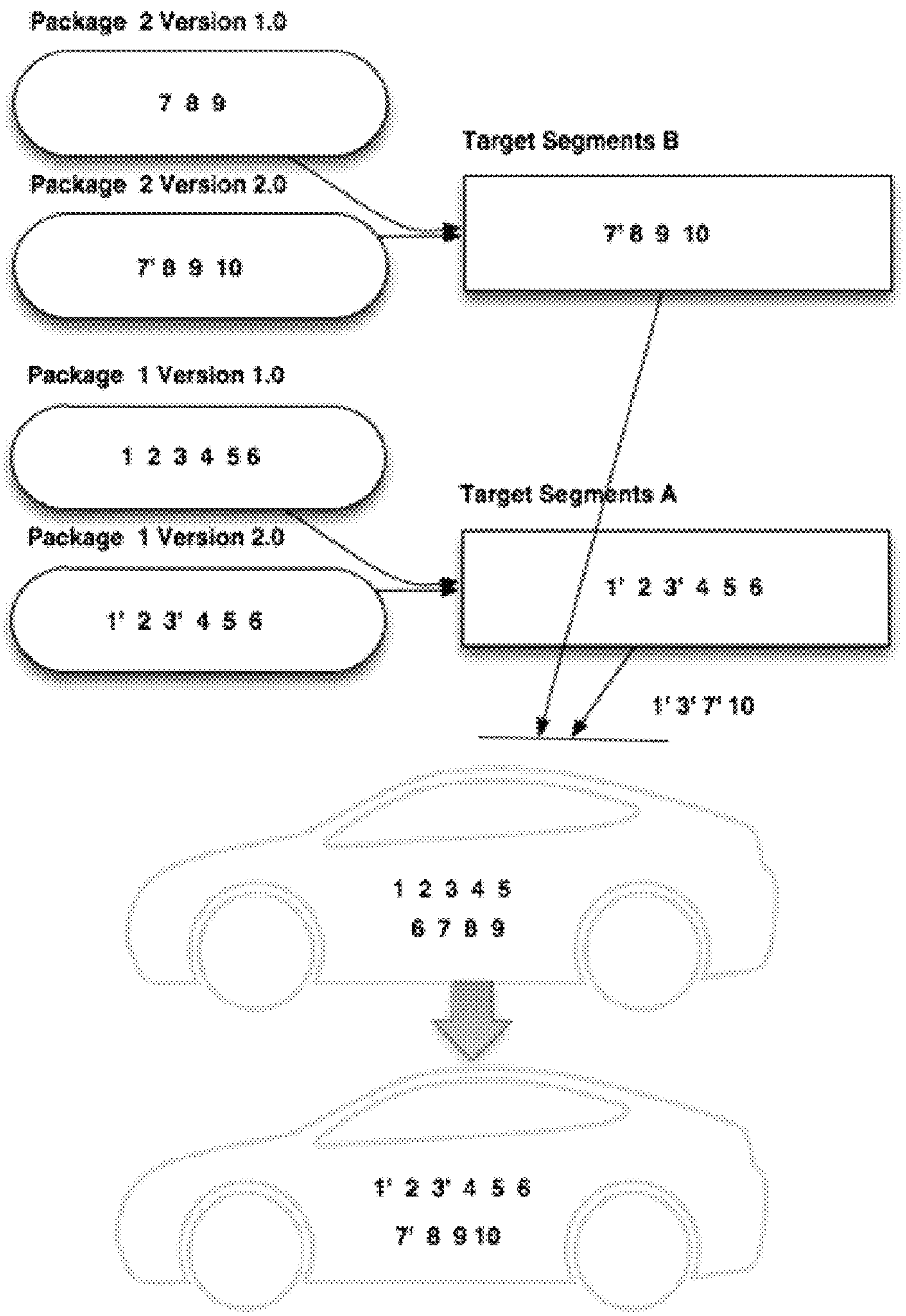
FIG. 22 shows an exemplary model for the REDUP.

FIG. 22 shows an exemplary model for the REDUP. In FIG. 22, an example illustrating how a device (e.g., a vehicle) may be updated using the REDUP is shown. In this example, the vehicle is associated with segments A and B and starts in a specified state. As shown, the vehicle starts with initial versions of components (e.g., a set software applications) 1, 2, 3, 4, 5, 6, 7, 8, and 9. For example, these components may have been delivered to the vehicle in package 1 version 1.0 and in package 2 version 1.0. An update for segment A may be provided using package 1 version 2.0 with components 1', 2, 3', 4, 5, and 6. An update for segment B may be provided using package 2 version 2.0 with components 7', 8, 9, and 10. Based on the initial state reported by the vehicle to an update server, the server may determine that the vehicle should download components 1', 3', 7', and 10. Components 2, 4, 5, 6, 8, and 9 are not downloaded because they are already installed. After the updates the vehicles includes components 1', 2, 3', 4, 5, 6, 7', 8, 9, and 10. The components could be delivered and installed in the vehicle via multiple installers.

Figure 23:
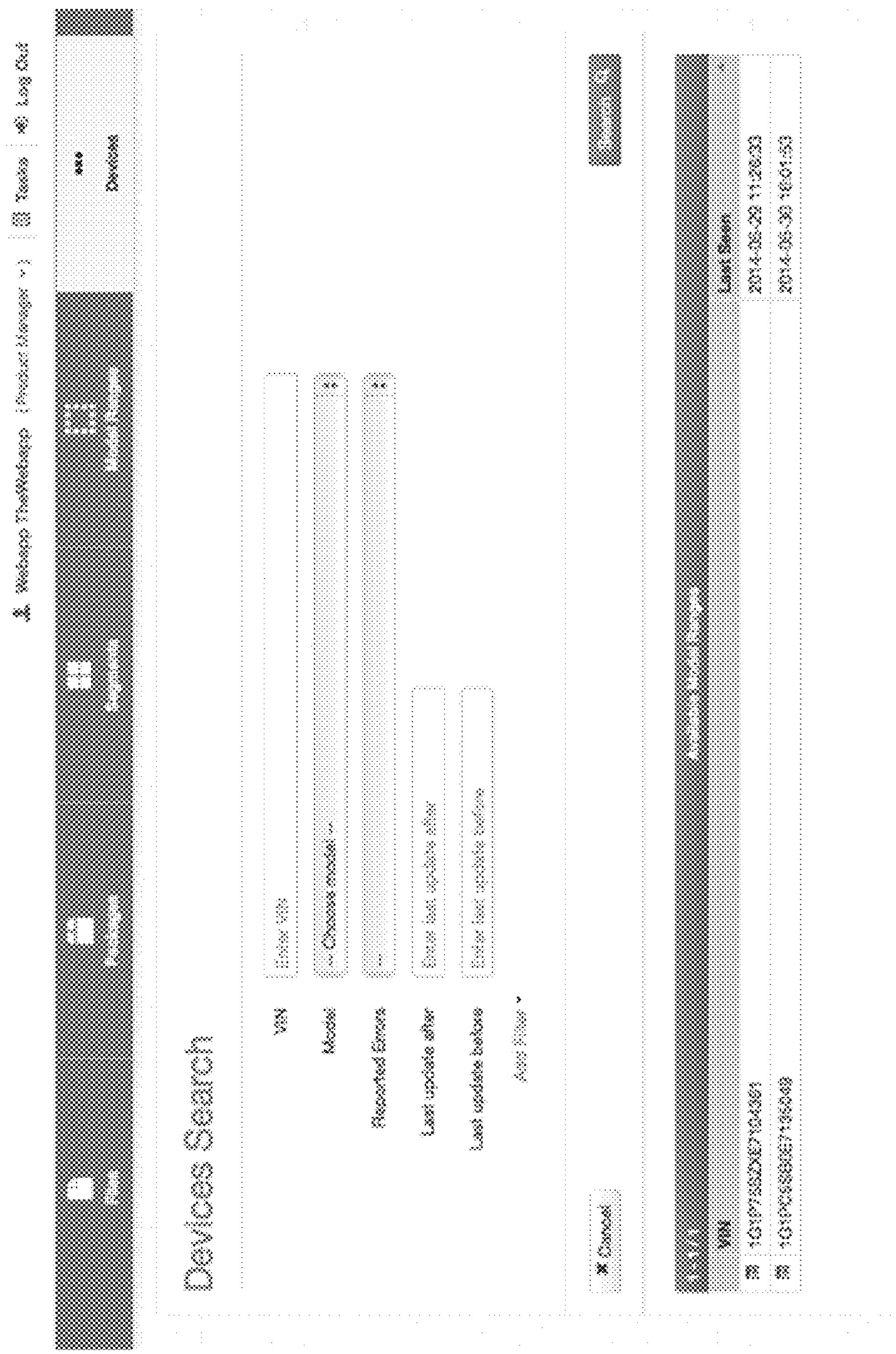
FIG. 23 shows a screenshot diagram illustrating embodiments of the REDUP.

FIG. 23 shows a screenshot diagram illustrating embodiments of the REDUP. In FIG. 23, an exemplary REDUP user interface is shown that allows a REDUP administrator to search for devices (e.g., vehicles) satisfying specified criteria. In various implementations, criteria may include a vehicle VIN number, a vehicle model, reported errors associated with the vehicle, date and/or time when the device was last updated, segments associated with the vehicle, components and/or component versions associated with the vehicle, and/or the like. For example, a vehicle with a VIN ending in digits 361 may be selected for analysis.

Figure 24:
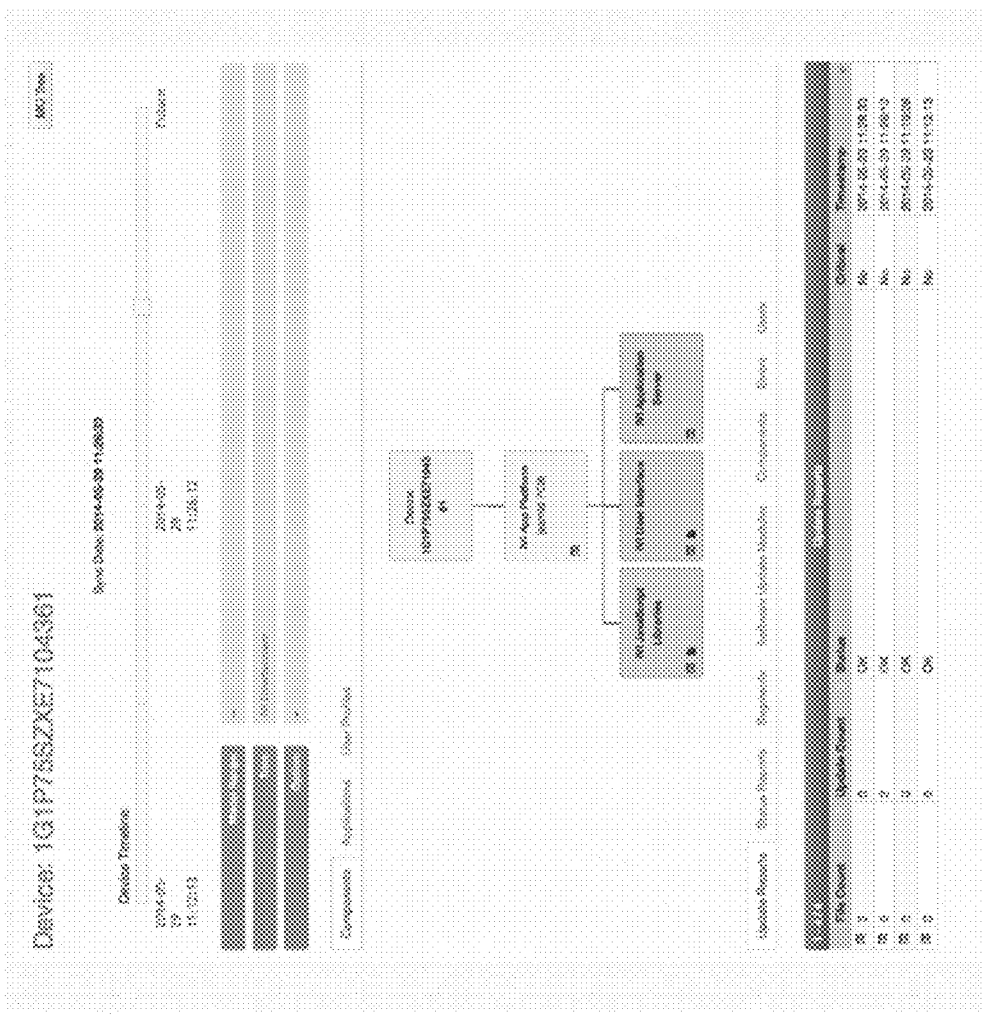
FIG. 24 shows a screenshot diagram illustrating embodiments of the REDUP.

FIG. 24 shows a screenshot diagram illustrating embodiments of the REDUP. In FIG. 24, a tool that showcases vehicle status as of different updates is illustrated. For example, the tool may be utilized to show that status of the vehicle with a VIN ending in digits 361 as of different update times. In one embodiment, this may be accomplished by clicking on different points on the device timeline (e.g., a slider widget) to see a diagram of device components as of selected point in time. In one implementation, the tool may show a future status as of the next anticipated update. For example, this may facilitate testing of an update package by verifying that the future status of device components that results due to the update is correct.

Figure 25:
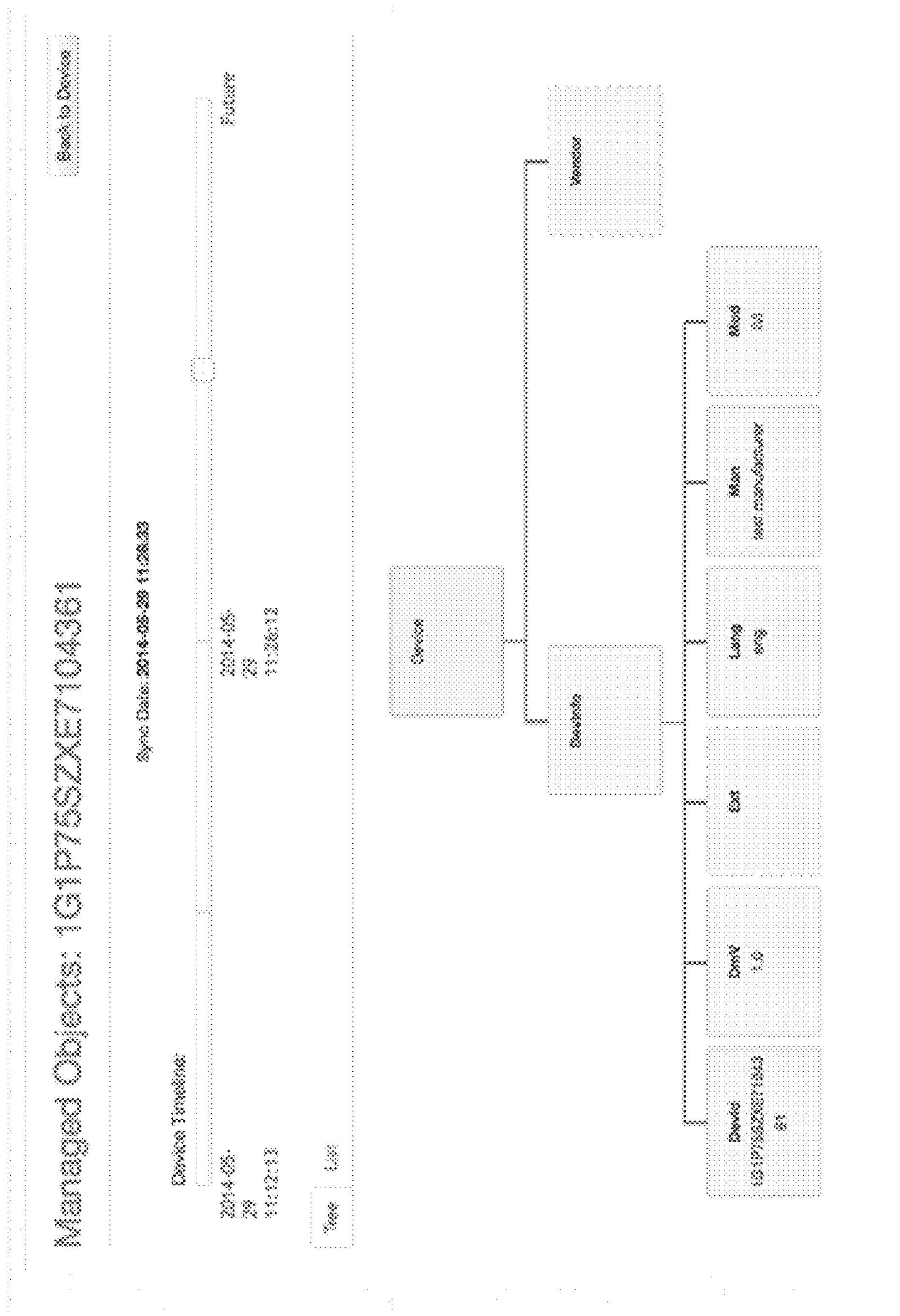
FIG. 25 shows a screenshot diagram illustrating embodiments of the REDUP.

FIG. 25 shows a screenshot diagram illustrating embodiments of the REDUP. In FIG. 25, a tool that showcases vehicle status as of different updates is illustrated. For example, the tool may be utilized to show that status of the vehicle with a VIN ending in digits 361 as of different update times. In one embodiment, this may be accomplished by clicking on different points on the device timeline (e.g., a slider widget) to see a diagram of managed objects as of selected point in time. In one implementation, the tool may show a future status as of the next anticipated update. For example, this may facilitate testing of an update package by verifying that the future status of managed objects that results due to the update is correct.

Figure 26:
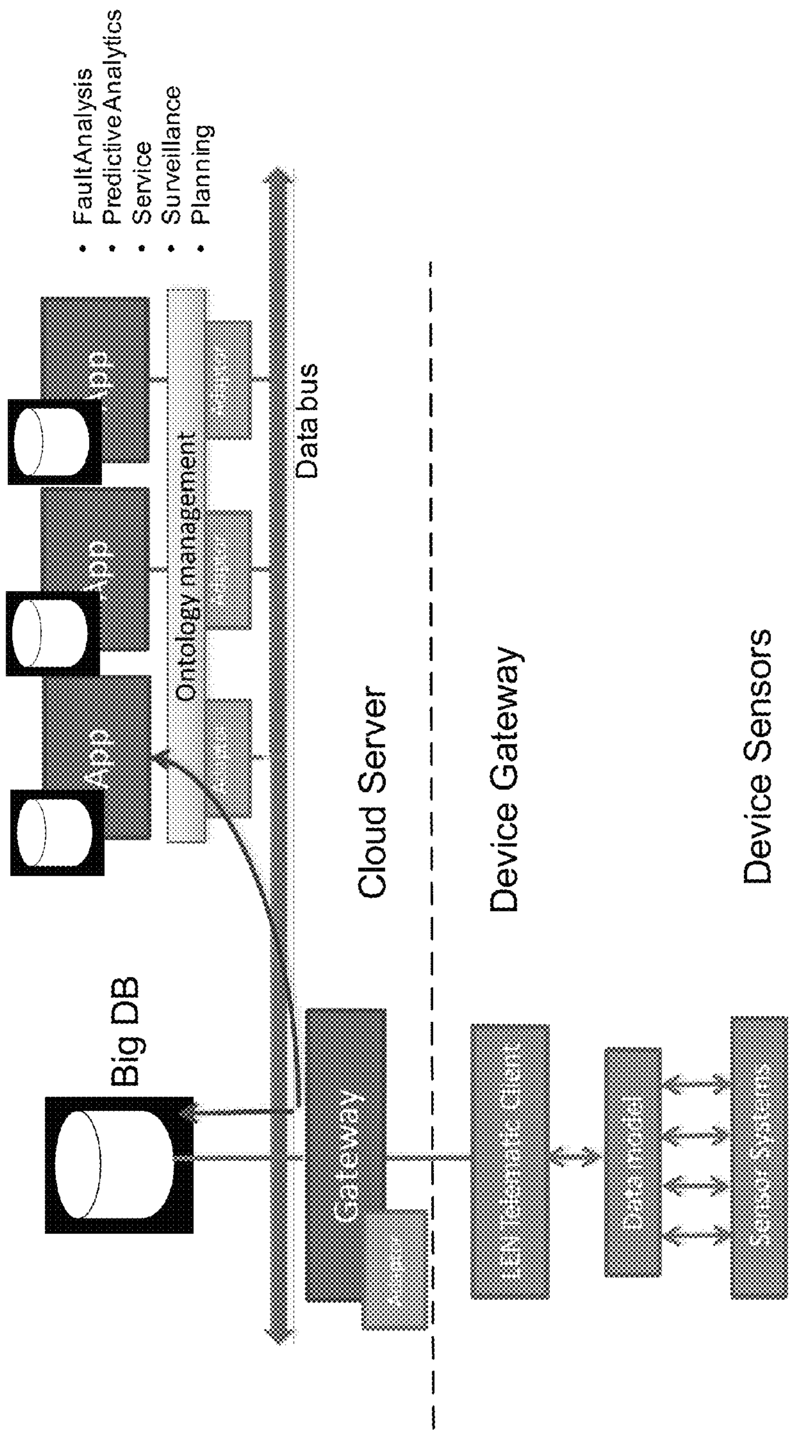
FIG. 26 shows an exemplary architecture for the REDUP.

FIG. 26 shows an exemplary architecture for the REDUP. In FIG. 26, sensors of a connected device may provide a variety of event data. Events maybe logged in accordance with a data model. In one embodiment, the data model may be specified by ontologies. See FIGS. 30 and 31 for examples of ontologies. Logged events may be delivered by a log event notification (LEN) client to a cloud server for storage in a big data storage repository and/or databases of individual analytics applications. Adapters may be utilized to filter and/or format logged events data in accordance with each database's specifications. Logged events data may be utilized in a variety of analytics applications including fault analysis, predictive analytics, service (e.g., warranty repair predictions), surveillance, planning (e.g., future products), inference-based analytics, and/or the like. In one implementation, the cloud server may be dedicated to a particular OEM product provider (e.g., vehicle manufacturer). For example, data collected by such cloud server may not be shared (e.g., isolates data for vehicle makes and models not to be shared with other OEMs) with other OEMs. In another implementation, the cloud server may be shared among multiple OEM product providers. For example, data collected by such cloud server may be shared (e.g., a user profile for a driver may mix and match info from multiple vehicle makes and models) among the OEMs.

Figure 27:
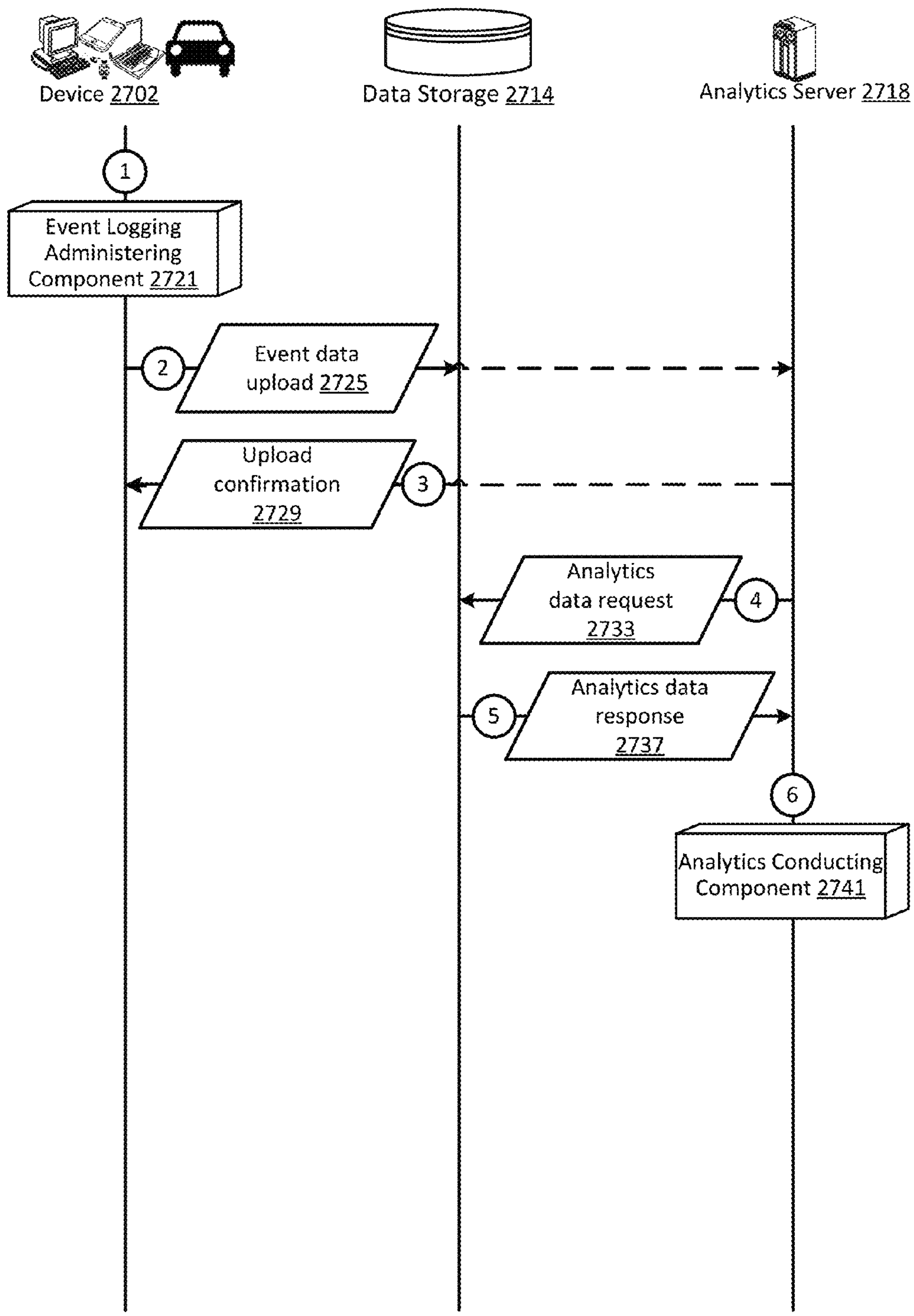
FIG. 27 shows a datagraph diagram illustrating embodiments of a data flow for the REDUP.

FIG. 27 shows a datagraph diagram illustrating embodiments of a data flow for the REDUP. In FIG. 27, dashed arrows indicate data flow elements that may be more likely to be optional. In FIG. 27, a connected device 2702 may log events and upload logged events data using an even logging administering (ELA) component 2721. See FIG. 28 for additional details regarding the ELA component.

The device may upload logged events data 2725 to a data storage 2714 and/or to an analytics server 2718. For example, logged events data may be uploaded to the data storage comprising a cloud data storage repository. In another example, logged events data may be uploaded to a database of the analytics server, which is associated with an analytics application. In one implementation, logged events data may be uploaded using a resource description framework (RDF) file format. See FIG. 32 for an example of a RDF file. In some embodiments, the data storage and/or the analytics server may send an upload confirmation 2729 to confirm receipt of uploaded logged events data.

The analytics server may send an analytics data request 2733 to the data storage or to a third party database. For example, the analytics data request may be utilized to obtain additional data utilized in conducting analytics. In some implementations, data from a variety of databases (e.g., logged events data, third party data) may be obtained and combined (e.g., by combining graphs) by the analytics server to conduct analytics. For example, the analytics server may provide the following example analytics data request, substantially in the form of a HTTP(S) POST message including XML-formatted data, as provided below:

```
POST /analytics_data_request.php HTTP/1.1
Host: www.server.com
Content-Type: Application/XML
Content-Length: 667
<?XML version = "1.0" encoding = "UTF-8"?>
<analytics_data_request>
    <analytics_server_identifier>ID_AnalyticsServer1
</analytics_server_identifier>
    <requested_data>"specification of requested data"</requested_data>
</analytics_data_request>
```

The data storage or the third party database may send an analytics data response 2737 with the requested data (e.g., in RDF file format) to the analytics server.

The analytics server may conduct analytics using an analytics conducting (AC) component 2741. See FIG. 29 for additional details regarding the AC component.

Figure 28:
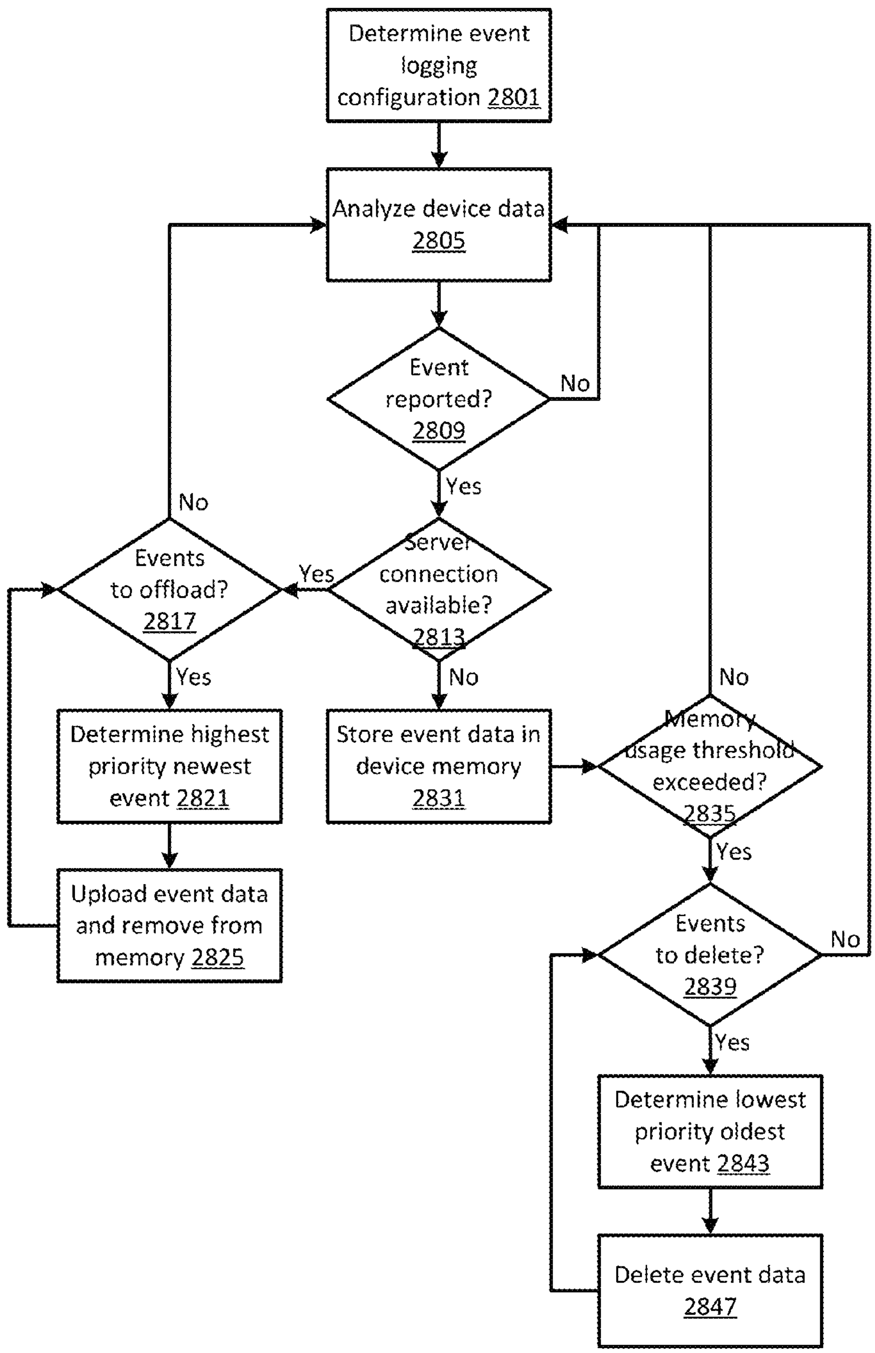
FIG. 28 shows a logic flow diagram illustrating embodiments of an event logging administering (ELA) component for the REDUP.

FIG. 28 shows a logic flow diagram illustrating embodiments of an event logging administering (ELA) component for the REDUP. In FIG. 28, event logging configuration may be determined at 2801. For example, settings associated with a connected device may be examined to determine what kinds of events to log, the format in which to log events data, memory usage thresholds, and/or the like.

Device data may be analyzed at 2809. For example, device data may be analyzed to determine software and configuration updates events, system fault and performance events, system service usage notifications, installation and configuration events, app usage data, app error events, telematic data, and/or the like events that should be logged.

A determination may be made at 2809 whether an event that should be logged was reported (e.g., by an ECU, by an application). If so, a determination may be made at 2813 whether a connection to a server is available. For example, it may be determined whether a connection with the server has been established, and, if not, an attempt to establish a connection with the server may be made. In another example, it may be determined that there is no network connectivity, and, therefore, a connection with the server is not available. The connected device may opportunistically look to establish a communicative connection to the server (e.g., to check for updates, to download updates, to upload event data). For example, the connected device may periodically check whether a WiFi, cellular, Bluetooth, and/or the like network connection is available and may attempt to establish a communicative connection to the server when a network connection is available.

If it is determined that a connection with the server is available, a determination may be made at 2817 whether there are events to offload to the server. In one implementation, the currently reported event may be offloaded to the server. In another implementation, previously reported events that have not yet been offloaded to the server (e.g., because there was no network connectivity until now) may be offloaded to the server. If there remain events to offload to the server, the highest priority newest event may be determined (e.g., based on the value of a priority data field associated with the event) at 2821. In various implementations, a variety of ways may be utilized to determine the highest priority newest event. For example, first, events with a timestamp within the last hour may be offloaded with the highest priority events offloaded first; second, events with a timestamp within the last day may be offloaded with the highest priority events offloaded first; third, events with a timestamp within the last week may be offloaded with the highest priority events offloaded first; and so on. Thus, if network connectivity is lost during offloading, the more important events have a higher chance of being offloaded to the server. Data for the determined event may be uploaded to the server and removed from device memory at 2825. In one implementation, event data may be uploaded using RDF file format. In various implementations, event data may be stored on the device in volatile memory or in non-volatile memory (e.g., when the volatile memory is too full).

If it is determined that a connection with the server is not available, event data may be stored in device memory at 2835 so that it may be offloaded to the server at a later time. In one implementation, event data may be stored in faster volatile memory. In another implementation, if the volatile memory is too full, some of the data (e.g., data for lowest priority oldest events) may be transferred to slower non-volatile memory. A determination may be made at 2835 whether a memory usage threshold for events data has been exceeded. For example, the memory usage threshold may be exceeded for volatile memory (e.g., if the device does not use non-volatile memory to store events). In another example, the memory usage threshold may be exceeded for non-volatile memory (e.g., if the device uses non-volatile memory to store events). If it is determined that the memory usage threshold has been exceeded, a determination may be made at 2839 whether there remain events to delete. In one implementation, events may be deleted until memory usage falls below the memory usage threshold. If there remain events to delete, the lowest priority oldest event may be determined at 2843. In various implementations, a variety of ways may be utilized to determine the lowest priority oldest event. For example, first, events with a timestamp older than within the last week may be deleted with the lowest priority events deleted first; second, events with a timestamp older than within the last day may be deleted with the lowest priority events deleted first; third, events with a timestamp older than within the last hour may be deleted with the lowest priority events deleted first; and so on. Thus, if there is not enough memory to store events data, the less important events may be deleted first. Data for the determined event may be deleted from device memory (e.g., volatile memory, non-volatile memory) at 2847.

Figure 29:
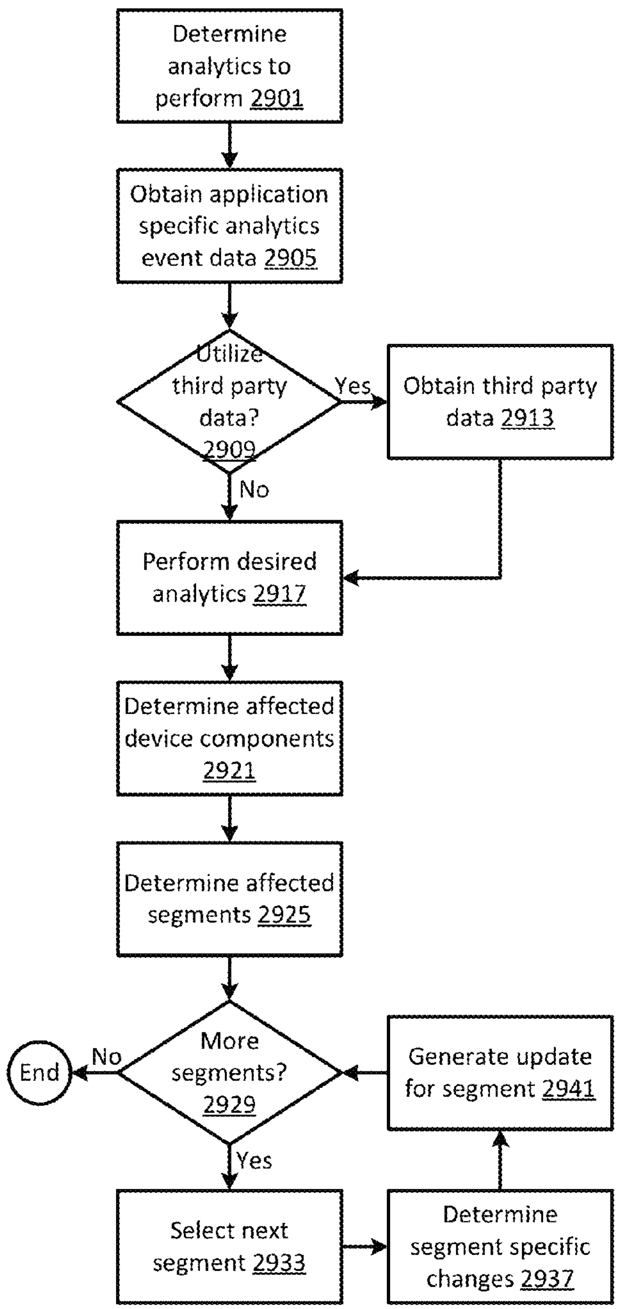
FIG. 29 shows a logic flow diagram illustrating embodiments of an analytics conducting (AC) component for the REDUP.

FIG. 29 shows a logic flow diagram illustrating embodiments of an analytics conducting (AC) component for the REDUP. In FIG. 29, analytics to perform may be determined at 2901. In various implementations, analytics to perform may include fault analysis, predictive analytics, service (e.g., warranty repair predictions), surveillance, planning (e.g., future products), inference-based analytics, and/or the like.

Application specific analytics event data may be obtained at 2905. In one implementation, application specific analytics event data may be obtained from a database associated with the application. In another implementation, application specific analytics event data may be obtained from a big data storage repository. In some implementations, federated querying (e.g., using SPARQL standard) may be used to obtain and combine data from a plurality of sources. See FIG. 33 for an example of federated querying.

A determination may be made at 2909 whether to utilize third party data. For example, this determination may be made based on parameters of the analytics application. If it is determined that third party data should be utilized, third party data may be obtained at 2913. In one implementation, third party data may be obtained from one or more third party databases. In some implementations, federated querying (e.g., using SPARQL standard) may be used to obtain and combine data from a plurality of sources (e.g., from a plurality of application specific and third party sources). See FIG. 33 for an example of federated querying.

Desired analytics may be performed at 2917. In one embodiment, analytics may be performed to determine issues with devices and/or with device components. See FIG. 34 for an example of analytics. Affected device components may be determined based on performed analytics at 2921. For example, an ECU with a bug in the firmware may be detected. Segments affected by the issue may be determined at 2925. In one implementation, segments affected by the issue may be determined via a MySQL database command similar to the following:

```
SELECT segmentID
FROM Segments
WHERE componentList LIKE "identifier of the ECU
  with a bug";
```

A determination may be made at 2929 whether there remain more affected segments to process. In one embodiment, each of the affected segments may be processed (e.g., in a priority order based on the severity of the issue with regard to the segment, in a priority order based on the importance (e.g., size, value) of the segment). If it is determined that there remain more affected segments to process, the next segment may be selected at 2933. Segment specific changes to fix the issue may be determined at 2937 and an update for the segment may be generated at 2941. The update may be distributed to devices using the REDUP.

Figure 30:
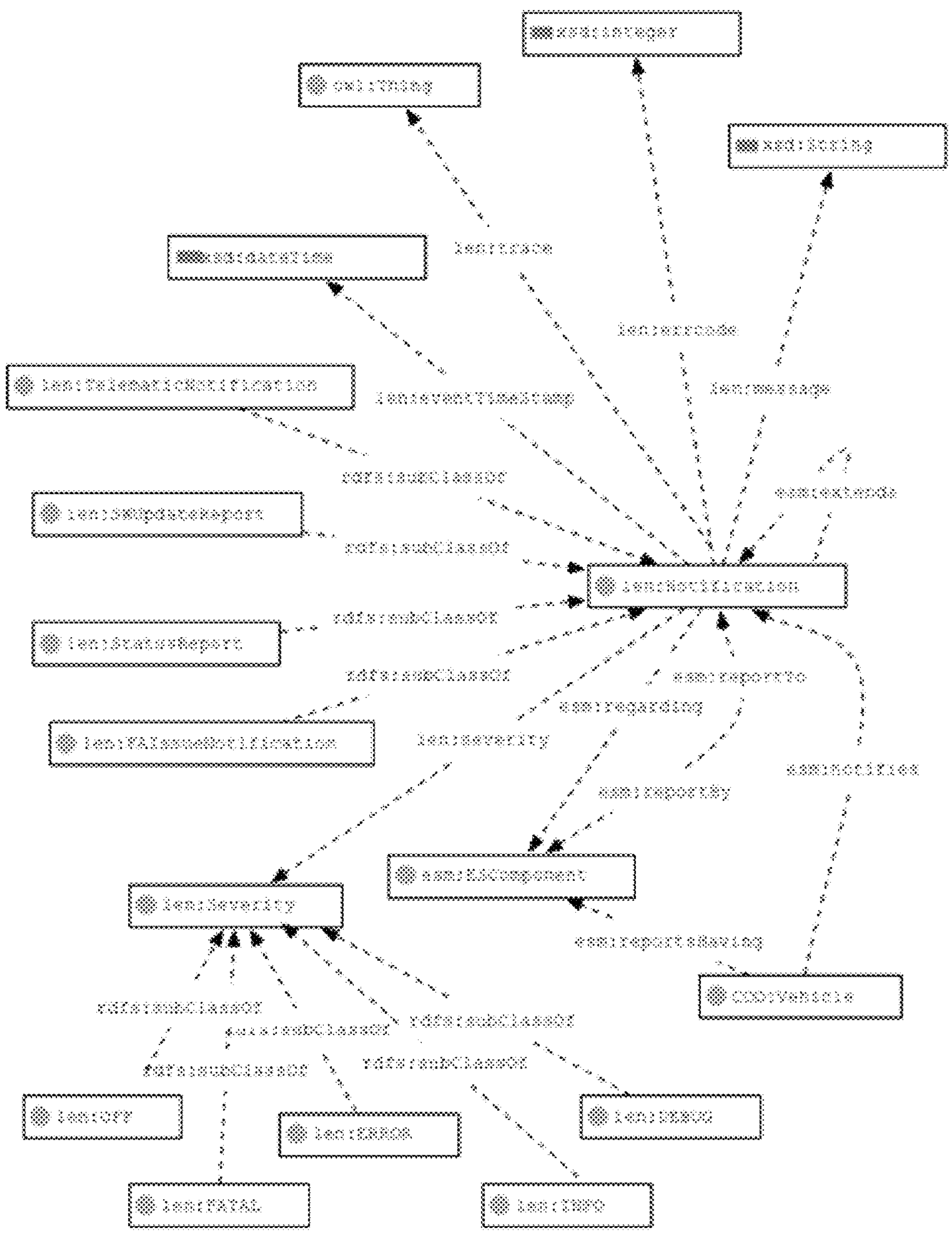
FIG. 30 shows an exemplary log event notification (LEN) ontology.

FIG. 30 shows an exemplary log event notification (LEN) ontology. In FIG. 30, the LEN ontology describes log reports. For example, log reports may be used to convey the status of embedded systems software. In one embodiment, notifications may be raised by one component on another component. In various implementations, reports may include a SWUpdateReport type that provides information on status of a software update, a StatusReport type that provides a general status update on a component of a device (e.g., a vehicle), a TelematicNotification type that provides logs of data such as location, a FAIssueNotification type that provides an indication of a function affecting fault in a device, and/or the like. A report may have multiple components. For example, a SWUpdateReport for an update may have a LogReport that gives more information on the status after the update.

Figure 31:
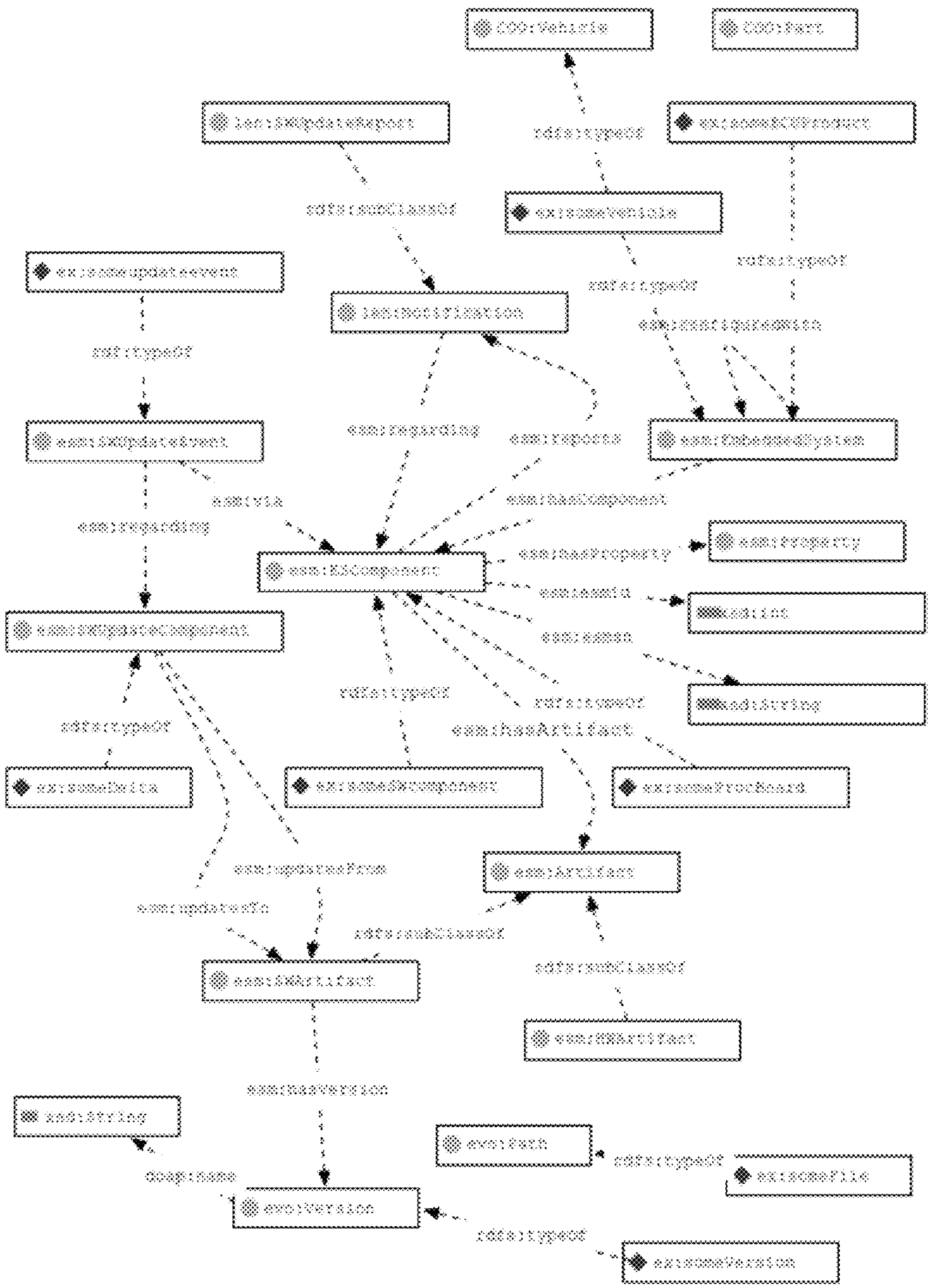
FIG. 31 shows an exemplary embedded systems (ESM) ontology.

FIG. 31 shows an exemplary embedded systems (ESM) ontology. In FIG. 31, the ESM ontology describes the structure of components and their update status. In one embodiment, the ESM ontology allows specification of versioned components. The range of notification may be something of type ESComponent (e.g., components of CI and HTML5 applications). Components may be versioned so that a cloud server may link individual classes and components to versions stored in a repository. In various implementations, an application (e.g., an HTML5 application) may log event data using RDF file format, strings, and/or the like. The cloud server may search for logs relating to the application or to a version of the application, and apply an application specific ontology to the event data to give it meaning.

FIG. 32 shows an exemplary resource description framework (RDF) file. In FIG. 32, a RDF file describes the base model of a sedan. RDF files may be used to transfer data between a connected device and a server.

FIG. 33 shows an exemplary federated query for the REDUP. In FIG. 33, a federated query may be utilized to obtain data from two different services provided by dbpedia.org and linkedmdb.org. Various ontologies (e.g., specified in the PREFIX lines) may be applied to transform the data into a desired format.

Figure 34:
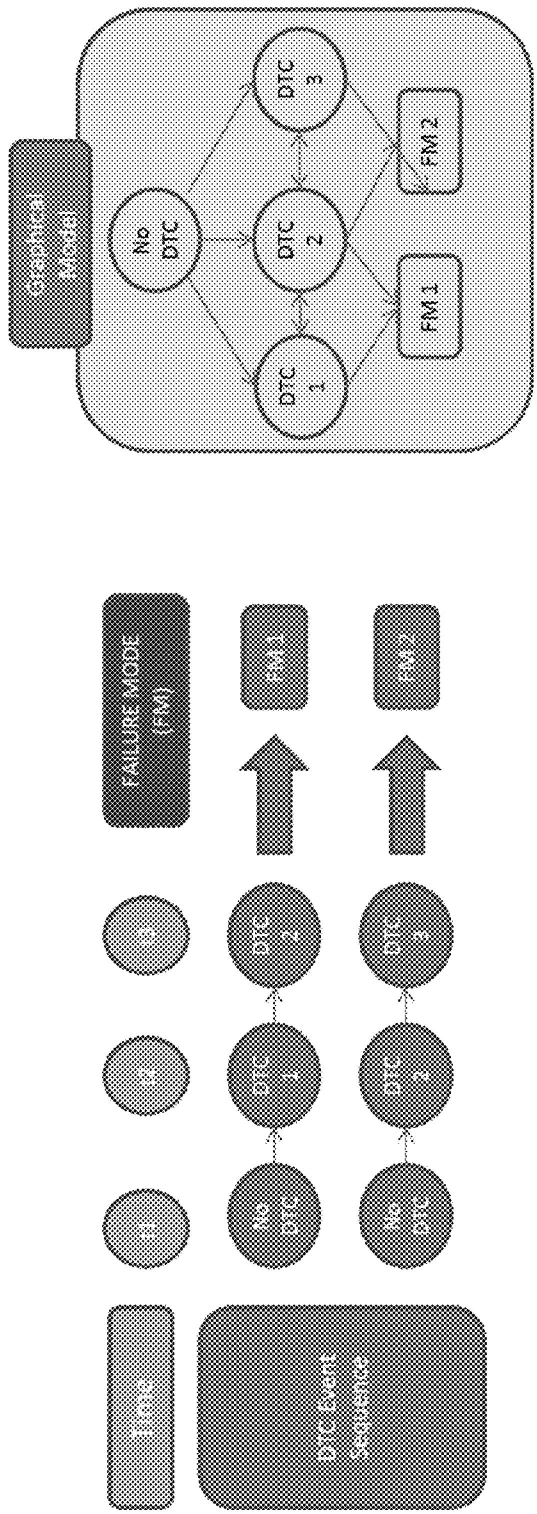
FIG. 34 shows an exemplary failure mode analytics model for the REDUP.

FIG. 34 shows an exemplary failure mode analytics model for the REDUP. In FIG. 34, the value of analyzing event data collected by the REDUP is illustrated. Various failure modes associated with a vehicle may be determined based on analysis of diagnostic trouble codes (DTCs) event data logged by the vehicle. For example, if the vehicle logged DTC 1 and subsequently DTC 2, failure mode 1 may be detected. In another example, if the vehicle logged DTC 2 and subsequently DTC 3, failure mode 2 may be detected. Thus, depending on the detected failure mode, an issue with the vehicle may be identified and an update to fix the issue may be generated.

Additional Alternative Embodiment Examples

The following 8 alternative example embodiments provide a number of variations of some of the core principles already discussed for expanded color on the abilities of the REDUP.

Alternative Embodiment 1

Figure 36:
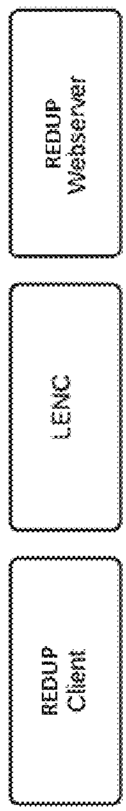
FIGS. 36-151 show diagrams illustrating alternative embodiments for the REDUP.

In some alternative embodiments, the REDUP includes a cloud hosted server application and a device-based client platform. As shown in FIG. 36, on the client-side there are three areas of functionality.

Figure 37:
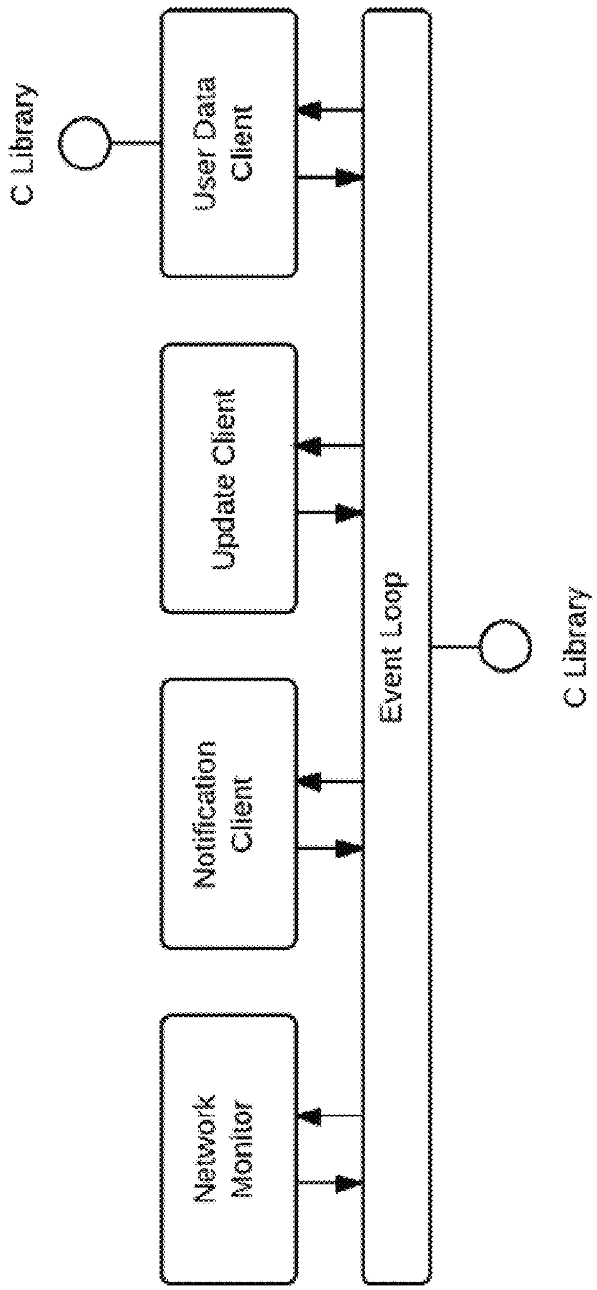

1. Notification and Software Update Client
2. LENC—Logging and Event Notification Client
3. Examples, Such as the Console Application and a Webserver Historically the Notification and Software update client is known as the REDUP Client. As shown in FIG. 37, described are the high level design and components of this client (REDUP Client) and the interfaces which can be used to integrated with on a device or platform.

1. Event-based Architecture

The REDUP Client architecture is heavily based on the Observer software design pattern. The REDUP client utilizes an event loop into which different modules emit "events". Functions and routines from other modules can "observe" the events created by a single module.

For example, if a network connection is lost, then any download will need to be cancelled, and the client should stop listening for notifications. In this case the EVENT_TYPE_NETWORK_DISCONNECTED event is emitted by the Network Monitor and is observed by both the Notification Client and the Downloader.

REDUP Client uses libev to manage which event is currently being processed. Each observing function is executed synchronously by the event loop, requiring that any observing function not to block the path of execution. If the observing function waits upon a response it should either break out and use a separate thread or preferably use the libev APIs to wait for a change.

Elements of REDUP such as the Downloader use the libev extensively to simulate synchronous activity by waiting upon IO handles.

1.1. Event Emitter API 1.1.1. event_emitter_on: Register a Callback Function to be Invoked when a Specified Event Happens The event_emitter_on function registers a function to be invoked when an event is fired by XXX.

1.1.1.1. Parameters event_type event_type_id—the type of event event_emitter_callback_fn callback A function which will be invoked when the event occurs 1.1.1.2. Returns Nothing 1.1.2. event_emitter_invoke_and_free: Invoke All Callback Functions that are Associated with a Specified Event_Type 1.1.2.1. Parameters event_type event_type_id—the type of event void * data Custom data that will be sent to the callback functions in event_emitter_on event_emitter_free_fn free_fn A function invoked once all the callback functions for the event have been invoked and the event data can be de-allocated 1.1.3. Greeting Example

```
ADD_EVENT(EVENT_TYPE_HELLO, 0)
ADD_EVENT(EVENT_TYPE_GOODBYE, 1)
static void on_hello_en(event_type event_type_id, void *data) {
printf("Hello %s\n", (char *) data);
}
static void on_hello_fr(event_type event_type_id, void *data) {
printf("Bonjour %s\n", (char *) data);
}
static void on_goodbye_en(event_type event_type_id, void *data) {
printf("Goodbye %s\n", (char *) data);
}
static void free_greeting_data(void *data) {
free(data);
}
event_emitter_on(EVENT_TYPE_HELLO, on_hello_en);
event_emitter_on(EVENT_TYPE_HELLO, on_hello_fr);
event_emitter_on(EVENT_TYPE_GOODBYE, on_goodbye_en);
event_emitter_invoke_and_free(EVENT_TYPE_HELLO,
strdup("Joe"),
free_greeting_data);
event_emitter_invoke_and_free(EVENT_TYPE_GOODBYE,
strdup("Mary"),
free_greeting_data);
```

2. Network Monitor

The Network Monitor is responsible for monitoring the availability of a network connection. It is intended that this component is replaced by a platform-specific component.

The default implementation polls the network interfaces of the device using the POSIX APIs and if a preconfigured network interface has a change of IP address then issues a network connected or disconnected event.

These events are heavily used by the other modules in REDUP.

2.1. Events 2.1.1. EVENT_TYPE_NETWORK_CONNECTED: Network Connected

EVENT_TYPE_NETWORK_CONNECTED is emitted whenever network connectivity is established.

2.1.1.1. Event Data struct nimon_nif name (optional)

The name of the network interface E.g. "eth0"

last_seen_at (optional)

The time at which the network interface was last seen.

connected

A boolean flag indicating if at the last_seen_at time this interface was connected or not 2.1.2. EVENT_TYPE_NETWORK_DISCONNECTED: Network Disconnected EVENT_TYPE_NETWORK_DISCONNECTED is emitted whenever network connectivity is no longer available.

2.1.2.1. Event Data

Same as EVENT_TYPE_NETWORK_CONNECTED 2.2. Nimon API 2.2.1. nimon_init: Initialize the Network Interface Monitor The nimon_init method will start a timer which periodically queries the available network interfaces on the system. If the status of a network interface has changed then either EVENT_TYPE_NETWORK_CONNECTED or EVENT_TYPE_NETWORK_DISCONNECTED is invoked.

2.3. Disabling the Network Interface Monitor

In most cases the Network Monitor will need to be disabled in order to integrate with a platform connectivity manager. To disable the default Network Monitor ensure that nimon_init is not called.

The other modules in REDUP still require the EVENT_TYPE_NETWORK_CONNECTED or EVENT_TYPE_NETWORK_DISCONNECTED events to be emitted. This is demonstrated in the following example:

```
struct nimon_nif ni_item=(struct nimon_nif*) malloc
(sizeof(struct nimon_nif));
ni_item->name=NULL; // Not required
ni_item->last_seen_at =(time_t*) malloc(sizeof(time_t));
ni_item->connected=0;
event_emitter_invoke_and_free(EVENT_TYPE_CONNECTED, ni_item,
prv_free_network_connected_data_cb);
```

3. Notification Client

The purpose of the Notification Client is to provide a notification system that can be used to inform the system of available software updates and to provide a mechanism for applications to receive custom notifications.

Device Notifications

Figure 38:
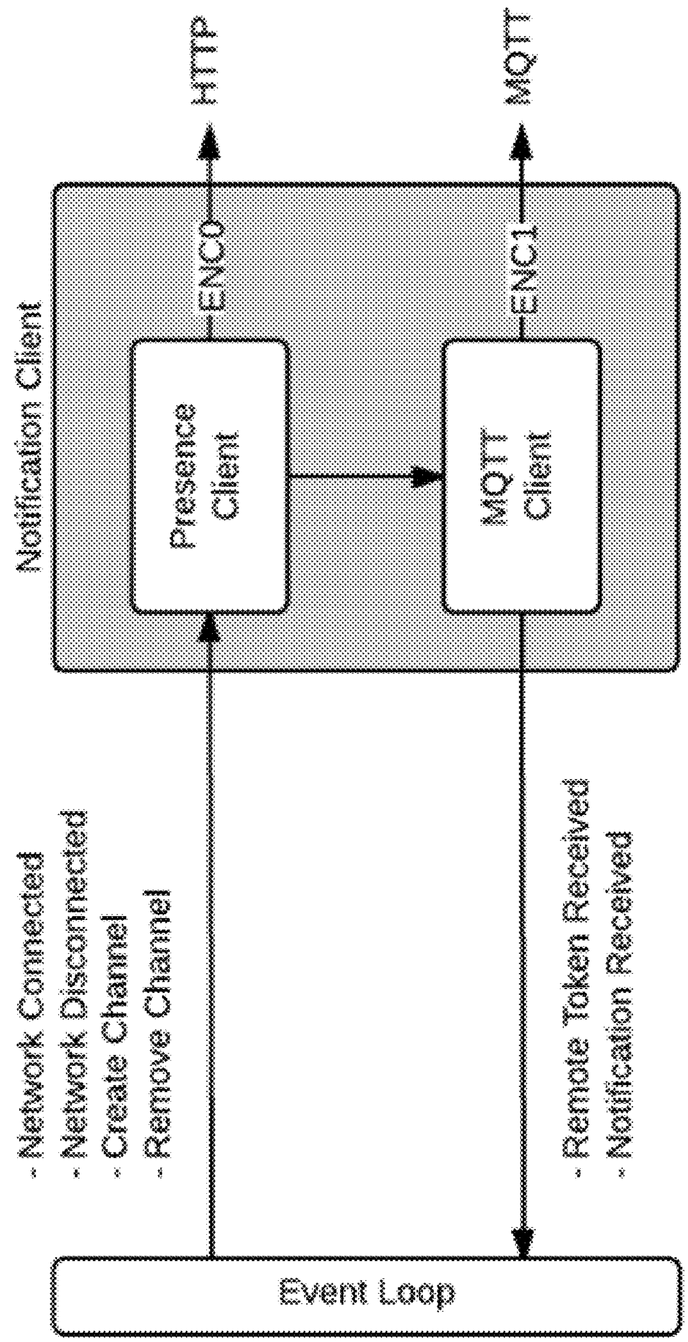

Application Notifications 3.1. Architecture—Shown in FIG. 38

3.2. Subcomponents

The Notification Client includes 2 sub-components:

3.2.1. Presence Client

The Presence Client is responsible for the informing the Notification Server that the REDUP client is available to receive messages for a given user and application.

This includes the receipt of a device identity from the Notification Server which will be used by the MQTT client to subscribe to device notification topics. The Presence Client is invoked by the User Manager when a user authenticates with the device, this allows the Presence Client to request a user identity that can be used to subscribe to user notification topics.

Requests by the Presence Client to the Notification Server should include a timestamp which will be used to ensure that duplicate and invalid requests are ignored.

3.2.2. MQTT Client

The MQTT Client is responsible for subscribing to topics published by the off-board MQTT Broker.

This component is based on the libmosquitto C/C++ library.

3.3. Sequence Diagrams 3.3.1. SEQ030—Device Presence & Notification

Step Description

1 By default the device the device identity is stored in the configuration file. This can be overridden by the set_device_identity API.

3 The Presence Client is notified when the network is connected. This will also happen when the device first starts.

4 If the Installer is currently installing (not downloading) an update then the PresenceClient should wait until it has completed.

5 The Presence Client registers the device with the Update Server based on the previously acquired identity, device_identity, and a secret password device_password. A timestamp is also generated and sent to the server to prevent replay attacks.

6 A unique remote token is generated for the device. The remote device token is used to identify the device anonymously. This prevents the device being sent notifications based on knowledge of the device identity.

7 The Update Server creates a notification topic based on the generated device token that will be used to send messages to the device.

8 The remote device token is sent back to the client

9 If the server responds with an error, or with invalid JSON (i.e. no token) then report the error and wait for a pre-configured time period

10 If the server is not available, or network connectivity has been lost then wait for a preconfigured time period

11 If the server returns with the HTTP status code 403, then the configured device identity is invalid, and the device presence registration will not continue until next restart.

12 If connectivity is lost whilst waiting for a valid token, then the timer associated to the delay needs to be cancelled.

14 The client subscribes to the previously created topic, based on the received remote device token

16 The Update Server sends a message to the device using the remote device token

17 The client receives the message and interprets the payload. The payload can be used to determine the type of message. For example an application update is available, or that a user profile update is available.

3.3.2. SEQ031—Connection Lost

If the internet connection is lost, then the client should re-subscribe to the notification topic.

Step Description

1 The client is informed that the connection has been lost, through either the MQTT Keep-Alive timeout, or from the Network Monitor

3 The client re-subscribes to the previously created topic, based on the received remote device token, that has been stored

5 The Update Server sends a message to the device using the remote device token

6 The client receives the message and interprets the payload. The payload can be used to determine the type of message. For example an application update is available, or that a user profile update is available.

3.3.3. SEQ033—Application Notification

Step Description

1 The application generates a local token, which can be used to identify the notification messages

2 The application invokes the EVENT_TYPE_CREATE_CHANNEL API passing the generated local token.

4 The notification server responds with a token that matches the local token

5 The Notification server creates a messaging topic named after the remote token

8 The Presence client subscribes to the application topic

10 On receipt of the remote token, the client issues the 3 EVENT_TYPE_REMOTE_TOKEN_RECEIVED event

11 Alternatively the Presence Client invokes the callback passed by the initial EVENT_TYPE_CREATE_CHANNEL event

18 The Application sends the EVENT_TYPE_REMOVE_CHANNEL with the remote token and a callback to be invoked when the operation has completed

20 The MQTT client unsubscribes from the application topic

Figure 39:
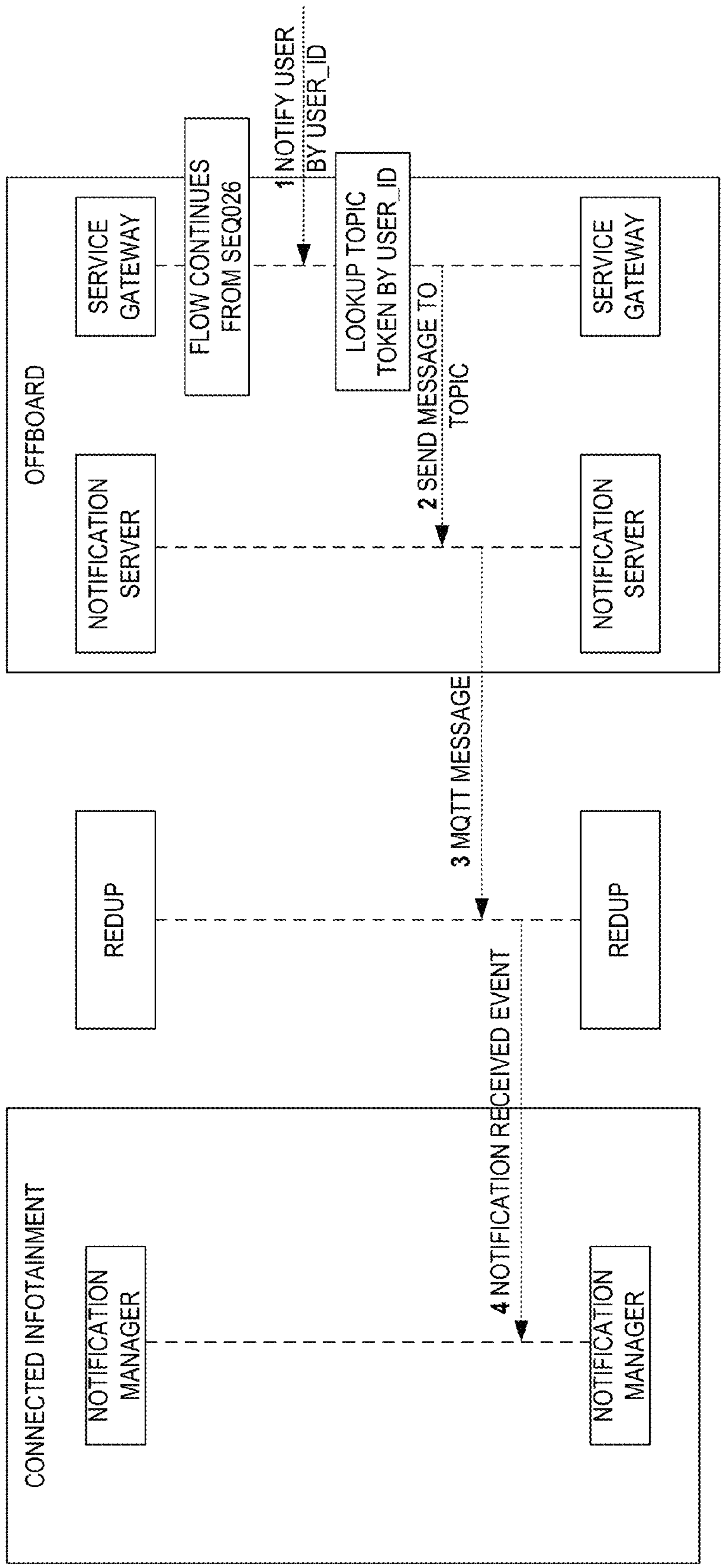

21 Finally the callback is invoked indicating that it was successful 3.3.4. SEQ026—Notify an Off-board Server of a User's Presence on the Device This sequence is Connected Infotainment specific 3.3.5. SEQ027—Notify a User Logged into the Device—Shown in FIG. 39

This sequence is Connected Infotainment specific 3.4. Events 3.4.1. Presence Client 3.4.1.1. Create Channel Register an application with the off-board presence service.

Event Data:

localtoken—used to register the application, as a result of registration remote token will be received remotetoken—a unique value, received after registering application id—a message id, usually NULL, otherwise will unregisters a specific (with given id) message callback—a function which will be called after creating/removing the channel 3.4.1.2. Remove Channel Unregister an application with the off-board presence service.

3.4.1.2.1. Event Data localtoken—used to register application, as result of registration remotetoken will be received.

remotetoken—unique value, received after registering application. Should be provided to remove channel (unregister application)

id—message id, usually NULL, otherwise will unregisters specific (with given id) message.

callback—callback function, which will be called after creating/removing channel, parameter passed to the function indicates operation status 3.4.1.3. Remote Token Received Emitted when a new remote token has been acquired by the Notification Client.

This event can be used as an alternative to Create Channel 3.4.1.3.1. Event Data remote_token—a unique value used to identify the channel in which all notifications for an application are received 3.4.2. MQTT Client 3.4.2.1. Notification Received Emitted when a new application notification is received.

Event Data:

msg—the payload of the notification message remote_token—the remote token to which the message is associated topic—the name of the MQTT topic from which the message was received 3.5. Observed Events Network Connected/Network Disconnected Presence Client listens to the Network Connected and Network Disconnected events from the Network Monitor in-order to determine whether an TCP/IP connection is available.

If a connection is made available then the Presence Client will subscribe to device notifications. If a previous connection is re-established then it will reconnect to any existing topics subscribed to.

If no network connection is available, then no notifications will be received.

Figure 40:
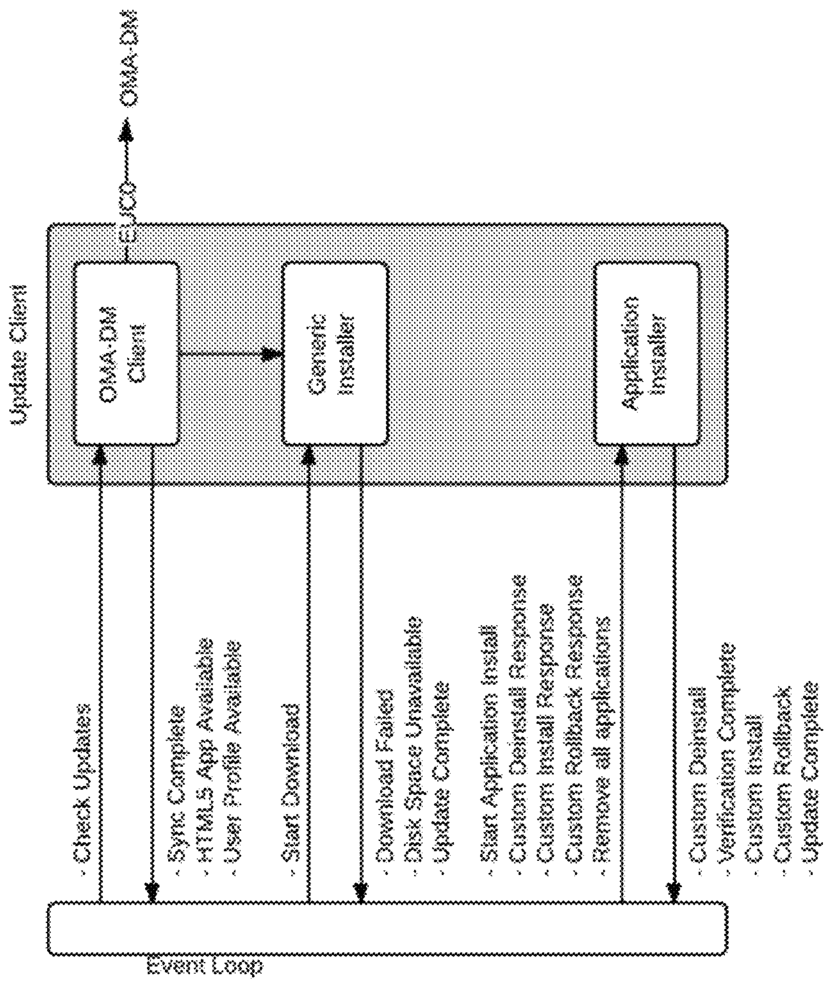

4. Update Client—Shown in FIG. 40

The purpose of the Update Client is to provide software updates in an atomic fashion.

4.1. Data Model 4.1.1. Types of Update

HTML applications

A ZIP distribution of a HTML application.

Integrity is assured by comparing a hash of the extracted ZIP files and a value in the OMA-DM tree Custom installation module User Profiles A plain JSON document downloaded and placed into the User Table 4.1.2. FUMO Nodes Node Path—Description x—An interior node used for the placement of a FUMO object. A node of this type will be created for every update module The name of this node is designated by the server and is not used in the software installation process.

x/PkgName—The name of the file being installed. The value of this node is used to determine the parent folder into which versions of the application are installed. It should not contain any forward-slash characters. The client expects that the OMA-DM tree only contains a single FUMO node matching the PkgName value. If the PkgName changes between different versions of the application, then the application files will be placed in a different filesystem directory. The user will not see any noticeable change, because the UUID is provided to the Connected Infotainment Application Manager.

x/PkgVersion—The version of the file being installed x/Download—Not currently used by REDUP x/Download/PkgURL—This node specifies the URL where the update module can be downloaded from x/Update—Not currently used by REDUP x/Update/PkgData—Not currently used by REDUP x/DownloadAndUpdate—An interior node that describes an update module that will be installed by the REDUP client. The server will indicate that this FUMO node should be installed by applying the EXEC command to this node.

x/DownloadAndUpdate/PkgURL—This node specifies the URL where the update module is located, that is to be downloaded and installed at the next practical opportunity.

x/State—This contains a value that indicates the current state of the device with respect to this FUMO node. See FUMO State Property.

x/Ext—A node containing vendor specific extensions 4.1.3. States Available in the x.State FUMO Property States marked transient indicate the Client is still processing the update, and are not normally visible in the x/State property during a sync.

State—Description—Transient

Idle/Start—No pending operation or user rejected update 10

Download Failed—Download failed 20

Download Progressing—Download has started—yes 30

Download Complete—Download has been completed successfully—yes 40

Ready to Update—Have data and awaiting command to start update—yes 50

Update Progressing—Update has started—yes 60

Update Failed/Have Data—Update failed but have update package 70

Update Failed/No Data—Update failed and no update package available 80

Update Successful/Have Data—Update complete and data still available 90

Update Successful/No Data—Data deleted or removed after a successful Update 100

4.1.4. FUMO Extensions

For each FUMO node the REDUP has metadata associated with the file that is going to be downloaded. This is held within the Ext node, which is provided by the OMA-DM specification for vendor customization.

4.1.5. Application Extensions to FUMO Node

All application FUMO nodes are placed within the ./Vendor/Website/Packages/directory.

Node Path—Description

Ext/ApplicationHash—A hash of a concatenated list of hashed contents of the application file. This is used for verifying the integrity of the extracted application files.

Ext/ApplicationUUID—The unique identifier of the application. Passed to the Connected Infotainment Application Manager during installation.

Ext/ApplicationDownloadSize—The amount of disk space that the distributed application file requires to be downloaded Ext/ApplicationInstallSize—The amount of disk space that this application requires to be installed once uncompressed and stored in the local filesystem.

Ext/UpdateId—A field used solely by the client to distinguish the installation process in which this update was applied. Each client will report a different Ext/UpdateId based on when the synchronization changes are applied. This field should not be modified by the server component.

Ext/State—Used by the client as an extension to the FUMO State node. If during synchronization the Ext/State does not mirror the State node then the client installation has an error.

Ext/FileVersionID—A unique identifier assigned by the server for the file. Used for event reporting. This node value is not modified by the client.

4.1.5.1. Application Hash

The ApplicationHash value can be generated using the following Linux command:

find \'%s\' –type f|LC_COLLATE=C sort|xargs md5sum|awk \'{printf $1}\'|md5sum

The hash generated will be used to designate the name of the folder which contains the version of the application installed.

4.1.6. User Profile Extensions to FUMO Node

All User Profile FUMO nodes are placed within the ./Vendor/Website/Profiles/directory.

Node Path—Description

Ext/ExpiryDate—The timestamp at which the user profile should expire. Format: /Ext/ExpiryDate Ext/UserID—The unique identifier of the user profile Ext/State—Same as Application FUMO extension 4.1.7. Configuration File Extensions to FUMO Node All Configuration File FUMO nodes are placed within the ./Vendor/Website/Files/directory.

Node Path—Description

Ext/Hash—An md5sum of the file. This will be compared against the file downloaded Ext/Location—The location on disk which will contain this file Ext/OldLocation—The old location on disk which will contains a backup of the file during installation.

Ext/State—Same as Application FUMO extension 4.1.8. Session Extensions to Packages Node Information which is related entirely to the session is stored within the ./Vendor/Website/Session directory structure.

The current use for this is to indicate if an update is critical, and should be installed without user confirmation. This flag is stored in the Session/Critical node, using string values "true" and "false". The lack of a Session/Critical node also indicates a false value.

Connected Infotainment uses the /Session/Critical flag to indicate that updates require no user confirmation.

4.1.9. FUMO Ext/State

State—Description

READY_TO_DOWNLOAD—The file related to this FUMO node is ready to download 110

READY_TO_REMOVE—The file and associated tree structure should be removed. This state exists so that custom deinstallation code can be invoked before the node is removed from the tree structure. 111

DOWNLOAD FAILED—The file related to this FUMO node has failed to download. 120

DOWNLOAD_PROGRESSING—The file related to this FUMO node is currently downloading. 130

DOWNLOAD_COMPLETE—The file related to this FUMO node has downloaded. 140

SIBLING_DOWNLOAD_FAILED—Unused 125

VERIFY_FAILED—The file has failed verification, and has caused the update to fail verification 170

VERIFY_OK—The file has verified successfully 172

CUSTOM_INSTALL_IN_PROGRESS—The file is going through a custom installation process 161

CUSTOM_INSTALL_FAIL—The file has failed the custom installation process 162

CUSTOM_INSTALL_OK—The custom installation process has completed successfully 163

CUSTOM_ROLLBACK_IN_PROGRESS—The file is undergoing a custom rollback process 164

CUSTOM_ROLLBACK_FAIL—The custom rollback process for a file has failed 165

CUSTOM_ROLLBACK_OK—The custom rollback process for the file has completed successfully 166

POST_CUSTOM_INSTALL_OK—The post-custom installation process was successful 167

CUSTOM_DEINSTALL_IN_PROGRESS—The file is being uninstalled by an external process 168

WALKING_DEAD—The file has successfully been de-installed by the custom de-installation code 169

ZOMBIE—The file has failed to be de-installed by the custom de-installation code 171

ERROR—An error has occurred during the installation 121

REMOTE REMOVE—Indicates that this FUMO node should be removed on the next OMA-DM sync 173

4.1.10. DevInfo Node

The DevInfo node specifies the unique object id of the OMA-DM DevInfo management object. Management Object Identifier for the DevInfo MO should be urn:oma:mo:oma-dm-devinfo:1.1.

Current meaningful nodes are listed below:

Node Path—Description

./DevInfo/DevId—Device Identity. Default based on configuration file, but overridden by a Connected Infotainment API.

./DevInfo/IMC—By default empty. Overridden by Connected Infotainment set_icm_version API.

4.2. Sub Components 4.2.1. OMA-DM Client

The OMA-DM client is responsible for handing the OMA-DM communication and updating the OMA-DM tree.

4.2.2. Application Installer

The Application Installer is responsible for installing HTML5 applications.

4.2.3. RPM Installer

No rollback of installation

Figure 41:
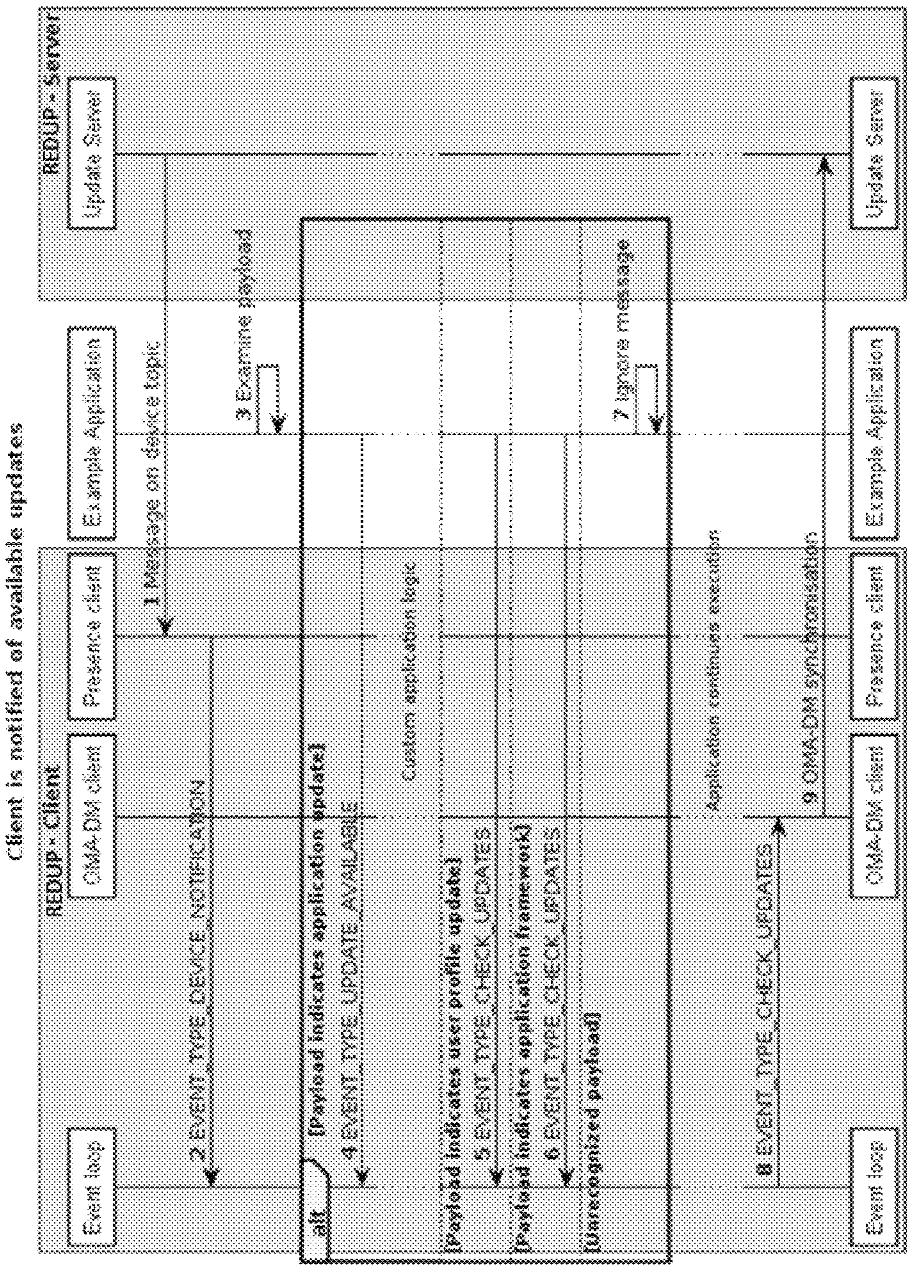

Preferred mechanism for removal is for a new version of the file to render the old obsolete No disk space check No verification of update 4.2.4. File Installer Replacement of file on-disk No encryption of file 4.2.5. LENC Configuration Installer As per File Installer, but informs LENC to reload 4.3. Sequence Diagrams 4.3.1. SEQ001—Client is Notified of Available Updates—Shown in FIG. 41

This sequence diagram describes the events that are emitted when the client receives a notification that there are updates available to install. It shows how the payload of the message determines the type of the update, and that the example application determines whether a synchronization should take place immediately, or after custom application logic.

Step Description

1 The Presence Client receives a message on the device topic, from the server indicating that updates are available.

2 The Presence Client invokes the EVENT_TYPE_DEVICE_NOTIFICATION event including the payload of the message.

3 The example application examines the payload of the message in order to determine the type of update.

4 If the payload indicates that an application update is available then the example application invokes the EVENT_TYPE_UPDATE_AVAILABLE event type.

5 If the payload indicates that a user profile update is available then the example application invokes the EVENT_TYPE_CHECK_UPDATES immediately

6 If the payload indicates that an application framework is available then the example application invokes the EVENT_TYPE_CHECK_UPDATES immediately

7 When the example application does not recognize the payload, then it is ignored

8 On receipt of the EVENT_TYPE_CHECK_UPDATES event, the DM client will perform a OMADM synchronization 4.3.2. SEQ002—Confirmation Received to Check for Updates This sequence diagram describes the events that are emitted when the client is asked to check for updates. The client will perform an OMA-DM synchronization, and collect all the application and user profile updates together. Once the synchronization is complete, then different events will be emitted based on the type of updates received.

Step Description

1 On receipt of the EVENT_TYPE_CHECK_UPDATES event, the DM client will perform a OMADM synchronization

2 If the download of an update is in-progress, then it is cancelled. If the cancelled download is still valid then it will resume once the update has completed.

3 The DM Client sends a copy of the local tree structure to the remote server

4 The OMA-DM server responds with EXEC, ADD, UPDATE or REMOVE operations to the local tree

5 For updates, the DM Client will collect all nodes that have an EXEC operation. These will be the ./DownloadAndUpdate child node of the FUMO object. All FUMO nodes with REMOVE operation identify applications that should be removed from the device. The DM client then generates an update identifier, that ensures that all of the updates received in this sync are applied at the same time, and that the installation events are issued in the correct order.

7 Mark the Ext/PreviousState to be Ext/State. This will be used if the update has to be rolled back.

15 Mark the Ext/State to be READY_TO_REMOVE this will allow the nodes that should be removed to be identified later on in the update processing.

16 Once the synchronization has completed, the DM-Client invokes the EVENT_TYPE_SYNC_COMPLETE event

17 The Installer listens to EVENT_TYPE_SYNC_COMPLETE event and processes the new FUMO nodes

18 If any application updates have been downloaded as part of the sync, then the EVENT_TYPE_HTML5_APP_AVAILABLE event is emitted.

19 The Installer listens for the EVENT_TYPE_HTML5_APP_AVAILABLE update and extracts the application UUIDs. The application UUIDs uniquely identify the application within the scope of the platform.

21 Once the Application UUIDs have been extracted, the EVENT_TYPE_READY_TO_DOWNLOAD event is emitted the list of application UUIDs

22 If any user profile updates have been downloaded as part of the sync, then the EVENT_TYPE_USER_PROFILE_AVAILABLE event is emitted.

4.3.3. SEQ003—Client Downloads Available Updates

This sequence diagram describes the actions after a EVENT_TYPE_START_DOWNLOAD event is invoked. When this event is received the client will attempt to download all known updates.

Step Description

1 On receipt of the EVENT_TYPE_START_DOWNLOAD event, the installer will prepare to download updates The event contains a reference to the update which needs to be applied

4 A downloader_id is generated for every group of files handled by the Downloader. The Installer can use the update_id.

7 The Installer queues the download

8 Inform the Downloader that it should start downloading the files matching a given update_id.

9 The Downloader downloads the file from the DM-Server

14 If the EVENT_TYPE_CANCEL_DOWNLOAD is received whilst a file download is in progress, then all downloads should be cancelled.

16 Once a file has completed download, the Downloader invokes the EVENT_TYPE_FILE_DOWNLOAD_COMPLETE event

22 If all the downloads in the update complete without interruption or failure the client emits the EVENT_TYPE_DOWNLOAD_COMPLETE event

23 If any of the files in the update fail to complete immediately then the client emits the EVENT_TYPE_DOWNLOAD_FAILED event. This will occur if the URL is invalid, the server is unavailable or the network is disconnected and the download fails before it can be cancelled. For a single update containing multiple files which fail, the EVENT_TYPE_DOWNLOAD_FAILED will be invoked once for all files, regardless of how many of them have failed to download. It should be possible for a failed download to be resumed by using the update_id provided with the callback parameters. This will allow a download to be re-attempted if the server is unavailable. This callback should not be used to determine if an installation should proceed or not—it should only be used as a status report.

24 If there is not enough disk space available on the storage medium for download then the Installer will emit the EVENT_TYPE_DISK_SPACE_UNAVAILABLE event.

Figure 42:
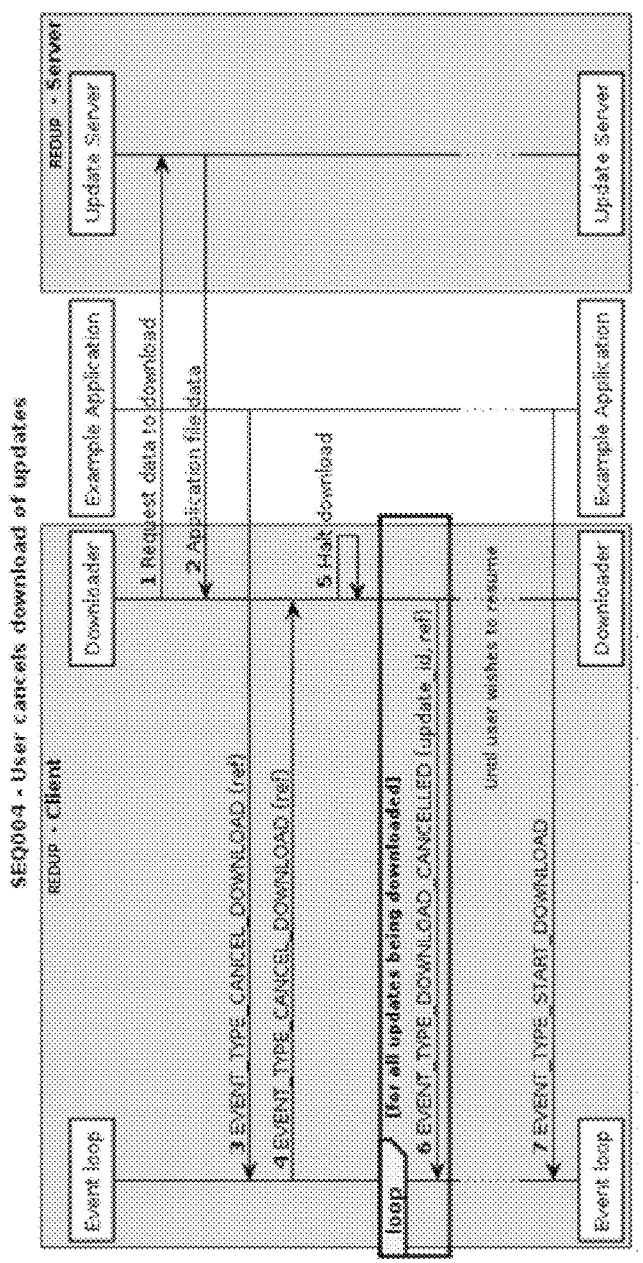

4.3.4. SEQ004—User Cancels Download of Updates—Shown in FIG. 42

This sequence diagram describes how an example application of the client can cancel the download of applications. During the download of an update the user can issue the EVENT_TYPE_CANCEL_DOWNLOAD event, which will stop the download. The example application can resume the download by issuing the EVENT_TYPE_START_DOWNLOAD event.

Step Description

1 The Downloader component is continually downloading data from all of the files in the update concurrently.

2 The server responds with the file data for the application to be installed. A file on disk will continually be updated with data from the server. If a file already exists then the Downloader will resume from the last point of the file written to disk.

3 At any point the Example Application can issue a EVENT_TYPE_CANCEL_DOWNLOAD event, which will be handled by the event loop.

4 The Event Loop will pass the event onto the Downloader component which will discontinue all of the downloads.

6 The Downloader invokes the EVENT_TYPE_DOWNLOAD_CANCELLED event with the previously supplied reference, and the update_id of the update cancelled. This event will be invoked for every concurrent update being downloaded. Each update, includes a number of files. So if downloading a user profile and 3 applications, then EVENT_TYPE_DOWNLOAD_CANCELLED will only be invoked twice.

Figure 43:
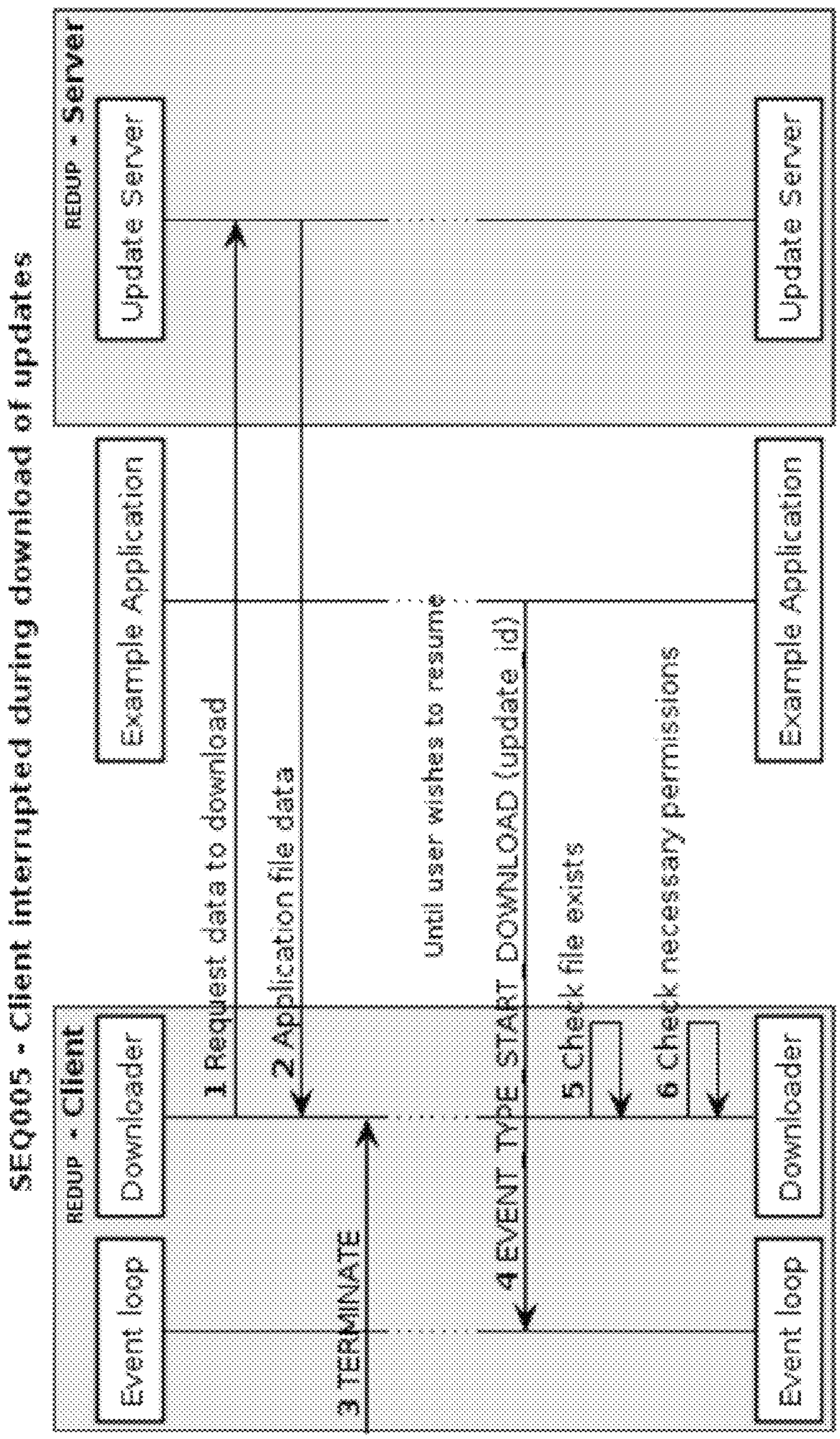

7 The Example application invokes the START_DOWNLOAD event 4.3.5. SEQ005—Client Interrupted During Download of Updates—Shown in FIG. 43

The client will store the state of the current installation process, so that it can be continued when it next starts. The state of the FUMO will be set to DOWNLOAD_IN_PROGRESS when the download starts, and will be remain so when the EVENT_TYPE_START_DOWNLOAD is re-invoked. The client will not have the opportunity to change the state on receipt of a kill/terminate signal.

Step Description

1 The Downloader component is continually downloading data from all of the files in the update concurrently.

2 The server responds with the file data for the application to be installed. A file on disk will continually be updated with data from the server. If a file already exists then the Downloader will resume from the last point of the file written to disk.

4 The Download invokes the EVENT_TYPE_START_DOWNLOAD event 4.3.5.1. Scenario: Client Resumes Update on Restart at the Point where Downloads have Completed The REDUP client itself is not responsible for restarting the download after the process has been killed.

4.3.5.2. Scenario: Client Receives Server Instruction to Update a FUMO Node which has Previously Failed Download This behavior occurs when the server updates an existing FUMO node. The server should send a new FUMO node for every change.

4.3.5.2.1. Sync 1: Server Informs Client of App1 as {random1}

Server->Client: Request List of Packages Node

GET ./Vendor/Website/Packages

Client->Server: Client Responds with Empty Local FUMO OMA-DM Tree

[empty]

Server->Client: Server Adds FUMO Node Representing App1

ADD ./Vendor/Website/Packages/{random1}

ADD ./Vendor/Website/Packages/{random1}/State: IDLE

EXEC ./Vendor/Website/Packages/{random1}/DownloadAndUpdate 4.3.5.2.2. Client Fails to Download App1

ADD App1 v.1 @ ./Vendor/Website/Packages/{random1}: OK

SET ./Vendor/Website/Packages/{random1}/State: DOWNLOAD_FAILED 4.3.5.2.3. Sync 2: Client Indicates Download has Failed Server->Client: Request List of Packages Node GET ./Vendor/Website/Packages Client->Server: Client Responds with a {random1} Node that Shows Download Failed ./Vendor/Website/Packages/{random1}/PkgName: App1

./Vendor/Website/Packages/{random1}/PkgVersion: 1

./Vendor/Website/Packages/{random1}/State: DOWNLOAD_FAILED

Server->Client: Server Updates URL and Informs Client to Retry

WARNING This demonstrates the server updating an existing FUMO node. If the server wishes to retrieve the previous./State of the FUMO node when the rollback fails, then it should create a new FUMO node instead of updating the existing one.

ADD ./Vendor/Website/Packages/{random1}

UPDATE ./Vendor/Website/Packages/{random1}/State: IDLE

UPDATE ./Vendor/Website/Packages/{random1}/DownloadAndUpdate/PkgURL

EXEC ./Vendor/Website/Packages/{random1}/DownloadAndUpdate 4.3.5.2.4. Client downloads App1 Successfully but Fails to Perform Custom Installation So Rollbacks ADD App1 v.1 @ ./Vendor/Website/Packages/{random1}: OK SET ./Vendor/Website/Packages/{random1}/State: UPDATE_FAILED_HAVE_DATA SET ./Vendor/Website/Packages/{random1}/Ext/State: CUSTOM_ROLLBACK_OK The previous values of DownloadAndUpdate/PkgURL and ./State are not reverted.

The values of the child nodes for the first FUMO node sent by the client is no longer stored in the by the client local tree.

4.3.6. SEQ006 & SEQ007—Client Installs Available Updates

This sequence diagram describes the actions of the client after a EVENT_TYPE_START_INSTALL event is invoked. When this event is received the client will attempt to install all of the downloaded updates. The installation is split into two steps:

1. Extract and Verify All Applications

The ZIP file for every application is extracted into a directory that is named after a hash of all of its contents. The hash is compared against a value stored in the FUMO tree. On completion of all hash calculations EVENT_TYPE_VERIFICATION_COMPLETE is invoked with either VERIFICATION_OK or VERIFICATION_FAILED.

2. Perform Custom Installation for Each Application

For every application installed explicit platform-specific code will need to be run. This will be called using the EVENT_TYPE_CUSTOM_INSTALL event. The second part of the application install process invokes the custom installation code and handles any failures. If any failure occurs, then the client will attempt to rollback the updates.

Figure 44:
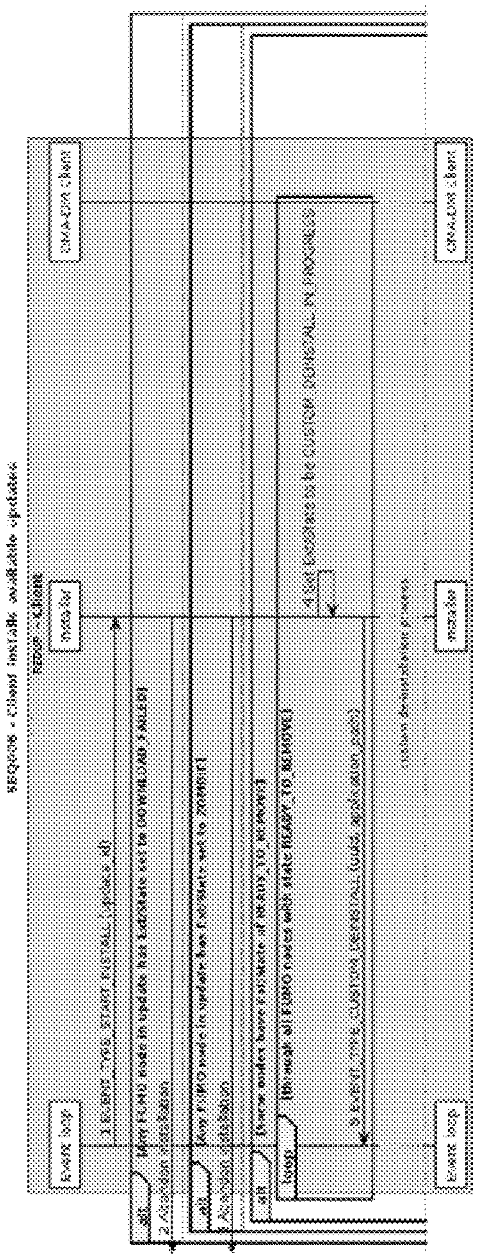

4.3.7. SEQ006—Client Installs Available Updates—Shown in FIG. 44

Step Description

1 On receipt of the EVENT_TYPE_START_INSTALL event, the installer will prepare to install updates as all downloads should have been completed

2 If any FUMO node has the Ext/State of DOWNLOAD_FAILED then the update has failed, and the installation should be abandoned. None of the FUMO nodes that are marked to be removed should have been applied at this point, so it should be safe to abandon the installation. It should be possible for user to restart the download by recalling EVENT_TYPE_START_DOWNLOAD

3 If any FUMO node has the Ext/State of ZOMBIE then the custom de-installation of the update has failed. The Installer should not proceed with application of any more updates.

4 The Installer checks to see if any FUMO nodes are ready to be removed by seeing if any node has the Ext/State of READY_TO_REMOVE. The Installer should only continue to perform installation of new applications, or updates if all the nodes that are to be removed have the state of WALKING_DEAD, which means that the custom removal code has been invoked for all of the updates. The Installer sets the FUMO Ext/State value to be CUSTOM_DEINSTALL_IN_PROGESS

5 The Installer invokes the EVENT_TYPE_CUSTOM_DEINSTALL event with the Application UUID and the path of the currently installed application

6 Once all the required custom de-installation events have been invoked, the Installer will wait until the EVENT_TYPE_START_INSTALL handler is called again—at which point, all the EVENT_TYPE_CUSTOM_DEINSTALL_RESPONSE events corresponding to the EVENT_TYPE_CUSTOM_DEINSTALL issued will have returned

7 The custom de-installation of a node has been successful, so set the Ext/State to be READY_TO_REMOVE. This indicates that the file associated with the update has been partially removed, but not completely.

8 The custom de-installation of a node has failed, so set the Ext/State to be ZOMBIE. This will prevent the installation of updates from proceeding any further.

9 If the Installer is no longer waiting for any de-installation responses, then the EVENT_TYPE_START_INSTALL event is re-invoked. This time, no custom de-installation should occur, because the states are correctly set.

25 The extension state or the FUMO nodes should be set indicating that the FUMO failed to verify, or that another FUMO node part of the update failed.

26 If there is not enough disk space available on the storage medium for installation then the installer will emit the EVENT_TYPE_DISK_SPACE_UNAVAILABLE event.

4.3.8. SEQ007—Client Invokes Custom Installer—Shown in FIGS. 53-56

Step Description

1 On receipt of the EVENT_TYPE_START_APPLICATION_INSTALL event, the installer will prepare to install all applications using the custom platform installer.

3 If any of the FUMO nodes with the specified Ext/UpdateId of update_id have the =Ext/State' of either 'VERIFY_—FAILED' will be abandoned.

4 The installer will iterate over all application updates and emit the EVENT_TYPE_CUSTOM_INSTALL event which informs the custom platform installer that it is ready to install, and has been verified. The Application UUID and the path to the new version of the application are provided with the event.

8 If the custom installation was successful then the installer will remove the old versions of the application

11 All of the files that have the Ext/State of WALKING_DEAD have successfully been removed by the custom de-installation code. Now that all installations have been completed the application folders and the local DM tree should be updated.

13 The installer emits the EVENT_TYPE_UPDATE_COMPLETE event indicating that the installation of the update was successful

15 If the custom installation was unsuccessful then all of the applications in the update should be reverted. This should include the updates that have not returned a EVENT_TYPE_CUSTOM_INSTALL_RESPONSE

18 If the update contains any nodes that have the Ext/State of WALKING_DEAD then some files have been removed as part of the update At this point the files have not been removed from the disk, so they only the custom installation needs to be applied—it should be the same as resuming the installation after the verification has been completed. The Installer will simulate a new update into which all of the partially de-installed updates will belong to. It will then invoke the START_APPLICATION_INSTALL with the new pseudo-update. The Installer creates a new updateidentifier that will identify the pseudo-update

19 For all the FUMO nodes that are part of the update assign the Ext/UpdateId to be the update identifier

20 Once all of the WALKING_DEAD FUMO nodes have been assigned the pseudo-then invoke the START_APPLICATION_INSTALL.

23 The ./State should revert to its previous state before the update was applied

27 The ./State should indicate that the FUMO node is not installed 4.3.9. Scenario: Client Resumes Update on Restart at the Point where Applications have Been Verified The REDUP client itself is not responsible for restarting the application installation after the process has been killed.

4.3.10. Scenario: FUMO States are Restored after Rollback of Installation 4.3.10.1. Sync 1: Server Informs Client of App1 as {random1}

4.3.10.1.1. Server->Client: Request List of Packages Node

GET ./Vendor/Website/Packages 4.3.10.1.2. Client->Server: Client Responds with Empty Local FUMO OMA-DM Tree

[empty]

4.3.10.1.3. Server->Client: Server Adds FUMO Node Representing App1

ADD ./Vendor/Website/Packages/{random1}

ADD ./Vendor/Website/Packages/{random1}/State: IDLE

EXEC ./Vendor/Website/Packages/{random1}/DownloadAndUpdate 4.3.10.2. Client Successfully Installs App1

./Vendor/Website/Packages/{random1}/State: UPDATE_SUCCESSFUL_HAVE_DATA

./Vendor/Website/Packages/{random1}/Ext/State: CUSTOM_INSTALL_OK 4.3.10.3. Sync 2: Client Indicates Installation is Successful, and Server Provisions App2

4.3.10.3.1. Server->Client: Request List of Packages Node

GET ./Vendor/Website/Packages 4.3.10.3.2. Client->Server: Client Responds with Local FUMO OMA-DM Tree Showing App1 Installed ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

4.3.10.3.3. Server->Client: Server Provisions App2

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App2 v.1}

EXEC ./Vendor/Website/Packages/{random2}/DownloadAndUpdate 4.3.10.4. Client Fails to Download App2

SET ./Vendor/Website/Packages/{random2}/State: DOWNLOAD_FAILED 4.3.10.5. Sync 3: Client Reports Failure of Download to App2, and Server Deletes App2, App1 and Adds App3

The client reports that App2 failed to download

For some un-described reason, the App1 and App2 are no longer valid, and should be removed The server distinguishes that App3 should now be sent to the device 4.3.10.5.1. Server->Client: Request List of Packages Node GET ./Vendor/Website/Packages 4.3.10.5.2. Client->Server: Client Responds with Local FUMO OMA-DM Tree Showing App2 Failed to Download ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

./Vendor/Website/Packages/{random2}/PkgName: App2

./Vendor/Website/Packages/{random2}/PkgVersion: 1

./Vendor/Website/Packages/{random2}/State: DOWNLOAD_FAILED

./Vendor/Website/Packages/{random2}/EXT/FileVersionID: {uri: App2 v.1}

4.3.10.5.3. Server->Client: Delete App1 and App2, and Install App3

DEL ./Vendor/Website/Packages/{random1}

DEL ./Vendor/Website/Packages/{random2}

ADD ./Vendor/Website/Packages/{random3}

ADD ./Vendor/Website/Packages/{random3}/State: IDLE

ADD ./Vendor/Website/Packages/{random3}/EXT/FileVersionID: {uri: App3 v.1}

EXEC ./Vendor/Website/Packages/{random3}/DownloadAndUpdate 4.3.10.6. Client Successfully Download App3, but Fails During Installation So Needs to Rollback Client Should Show that App1 is Still Installed Should Client Show that App2 has Still Failed to Download ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

./Vendor/Website/Packages/{random2}/PkgName: App2

./Vendor/Website/Packages/{random2}/PkgVersion: 1

./Vendor/Website/Packages/{random2}/State: DOWNLOAD_FAILED

./Vendor/Website/Packages/{random2}/EXT/FileVersionID: {uri: App2 v.1}

./Vendor/Website/Packages/{random2}/PkgName: App3

./Vendor/Website/Packages/{random2}/PkgVersion: 1

./Vendor/Website/Packages/{random3}/State: UPDATE_FAILED_HAVE_DATA

./Vendor/Website/Packages/{random2}/EXT/FileVersionID: {uri: App2 v.1}

Figure 45:
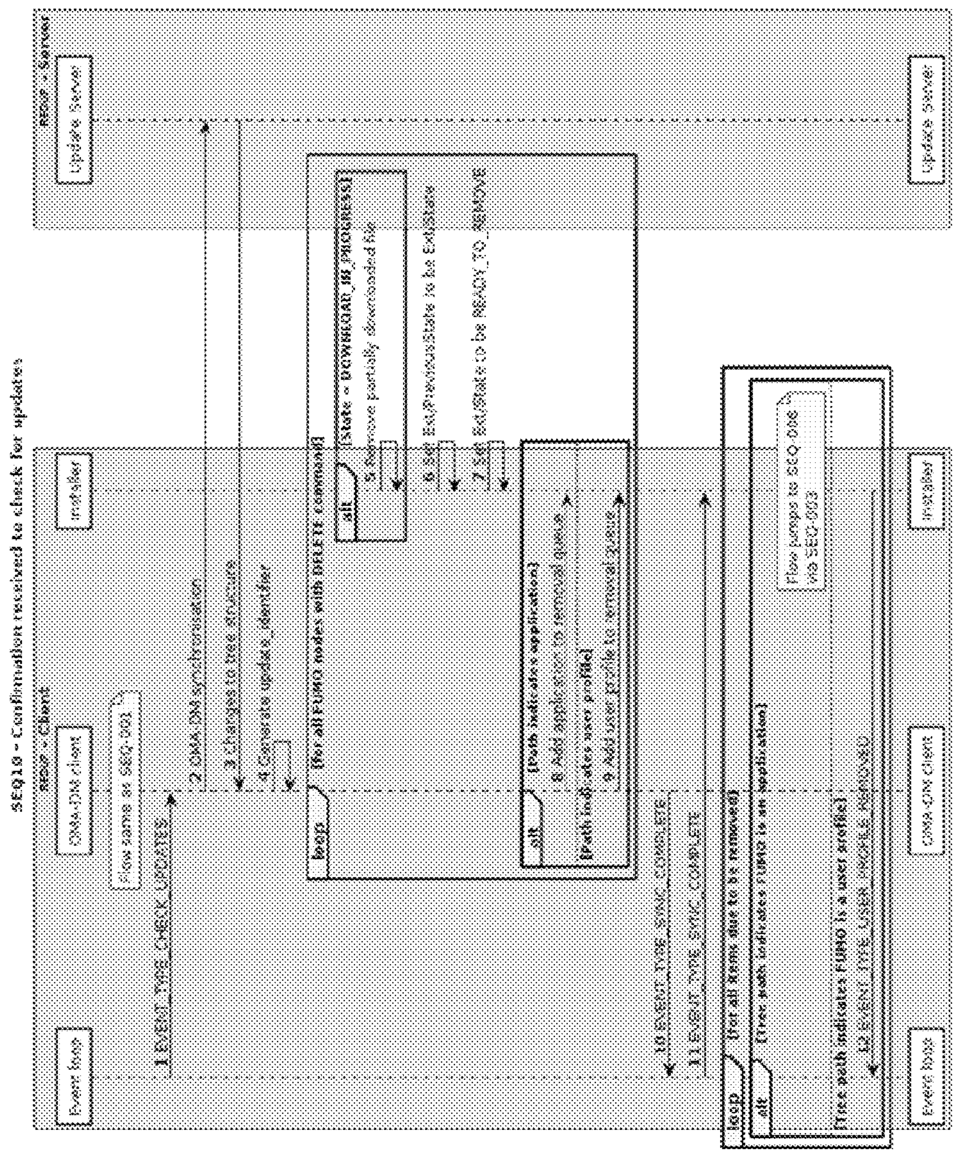

4.3.11. SEQ010—Remote Removal of Installed Applications—Shown in FIG. 45

Step Description

1 On receipt of the EVENT_TYPE_CHECK_UPDATES event, the DM client will perform a OMADM synchronization

2 The DM Client sends a copy of the local tree structure to the remote server

3 The OMA-DM server responds with EXEC, ADD, UPDATE, or REMOVE operations to the local tree

4 For removal the DM Client will collect all nodes that have an REMOVE operation. These will be the root node of each FUMO object. FUMO nodes with REMOVE operation identify applications that should be removed from the device. The DM client then generates an update identifier, that ensures that all of the updates received in this sync are applied at the same time, and that the installation events are issued in the correct order.

5 Any partially downloaded file content will need to be removed from disk

6 Mark the Ext/PreviousState to be Ext/State. This will be used if the update has to be rolled back.

7 Mark the Ext/State to be READY_TO_REMOVE this will allow the nodes that should be removed to be identified later on in the update processing.

10 Once the synchronization has completed, the DM-Client invokes the EVENT_TYPE_SYNC_COMPLETE event

11 The Installer listens to EVENT_TYPE_SYNC_COMPLETE event and processes the FUMO nodes that should be removed

12 The Installer will attempt to download all applications that are due to be installed by the same update_identifier. Once this has been completed the EVENT_TYPE_START_INSTALL is invoked. The Installer will the invoke the platform component that is responsible for removing the application If any used profile updates have been downloaded as part of the sync, then the EVENT_TYPE_USER_PROFILE_REMOVED event is emitted 4.3.12. SEQ012—Application Framework Installation Flow is the same as SEQ001-SEQ-009.

Figure 46:
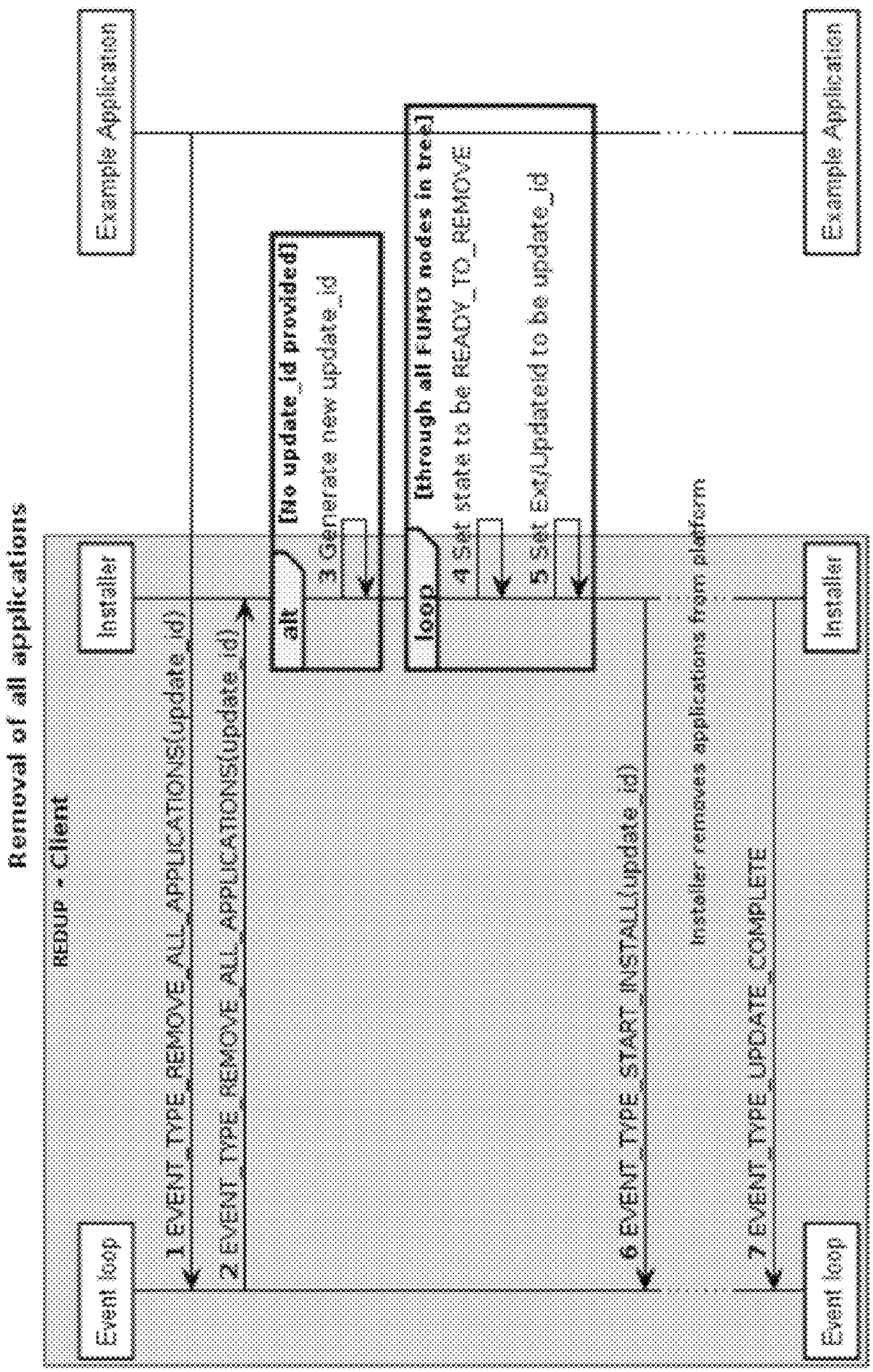

4.3.13. SEQ014—Removal of All Applications—Shown in FIG. 46

Step Description

1 The example application issues a message on the event loop which indicates that all application should be removed. The application can pass an update identifier with the event data, which will be used to identify this request.

2 The Installer listens for the message, and begins to process the removal of applications

3 A new pseudo update identifier is generated in which all of the applications will be added

4 Set the state for all of the FUMO nodes to be READY_TO_REMOVE

5 Set the update identifier for all of the FUMO nodes to be the update identifier

6 Invoke the installation procedure, during which all of the applications with the generated update id will be removed from the system

Figure 47:
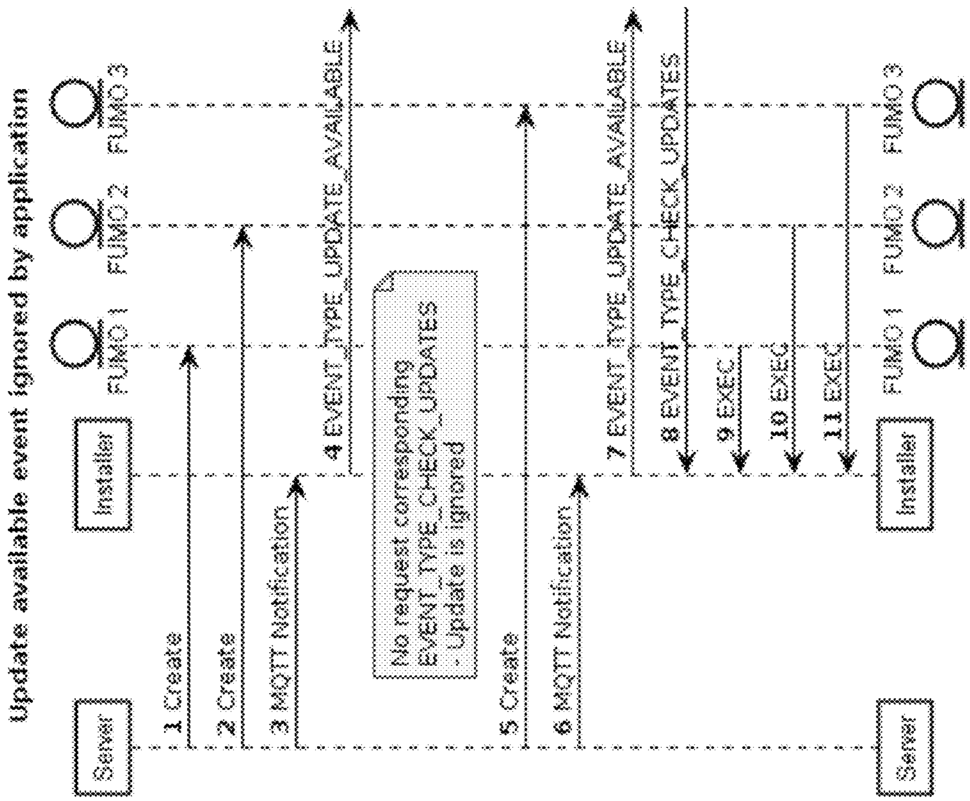

7 The successful removal of applications from the device will be indicated by the EVENT_TYPE_UPDAT_COMPLETE message 4.3.14 SEQ015—Update Available Event Ignored by Application—Shown in FIG. 47

It is possible to receive an update notification and issue the EVENT_TYPE_UPDATE_AVAILABLE but not to receive a corresponding EVENT_TYPE_CHECK_UPDATES event. The FUMO nodes which would be associated to the update notification would be sent on the subsequent OMA-DM sync request.

Step Description

1 File#1 is uploaded on the server and results in FUMO#1

2 File#2 is uploaded on the server and results in FUMO#2

3 The server sends an MQTT notification to the client indicating that a new update is available.

4 The Installer sends the EVENT_TYPE_UPDATE_AVAILABLE event. This event is usually followed by the receipt of a EVENT_TYPE_CHECK_UPDATES event, but in this case, none is received. This scenario would occur if the event observing application decides not to process the update, for example if a connection is not allowed or unavailable.

5 File#3 is uploaded on the server and results in FUMO#3

6 The server sends an MQTT notification to the client indicating that another new update is available.

7 This time the EVENT_TYPE_UPDATE_AVAILABLE event is responded with a EVENT_TYPE_CHECK_UPDATES event, so an OMA-DM sync is performed.

9 Since none of the FUMO nodes have been created on the client, they are all sent by the server to the client and added to the local OMA-DM tree. Any execute command is processed. Even though the server published the files separately, resulting in two notifications, the client only performed one sync request, but received all of the files.

4.3.14.1. Scenario: Notification of New Updates Received During Download of Existing Update If FUMO nodes are assigned a new update id, then the "old" update id should not be used and the downloads associated to it cancelled Step Description

1 File#1 is uploaded on the server and results in FUM0#1

2 File#2 is uploaded on the server and results in FUM0#2

3 The server sends an MQTT notification to the client indicating that a new update is available.

4 The Installer sends the EVENT_TYPE_UPDATE_AVAIABLE event indicating that some updates are available on the server.

5 Permission is granted by the system to perform an OMA-DM sync to find out what the updates are.

6 An update identifier is generated for the OMA-DM sync

7 The OMA-DM sync returns two FUMO nodes that have an EXEC command associated to them. Each is assigned the update identifier #1.

11 Once the OMA-DM sync has completed, the EVENT_TYPE_HTML5_APP_AVAILABLE event is issued.

12 The system indicates that the update should be installed by issuing the EVENT_TYPE_START_DOWNLOAD event with the previously generated update id.

13 As the Installer starts the downloads, the FUMO ./State node is set to DOWNLOAD_IN_PROGRESS.

15 On the server a new file is uploaded and made available to clients

16 During the download of the FUMO nodes an MQTT notification is received indicating

17 The Installer send the EVENT_TYPE_UPDATE_AVAILABLE event for the new update.

18 Permission is granted immediately to perform an OMA/DM sync

19 A new update identifier is generated for the OMA/DM sync

20 The server re-sends the EXEC command for the existing two FUMO nodes

21 Every FUMO node affected by the update is assigned the new update identifier

24 The server creates a new FUMO node which was not part of the previous update

26 Update identifier #1 is no longer valid, i.e. if a EVENT_TYPE_START_INSTALL request is received, then it will not match any FUMO nodes, so the install will not proceed. All the current downloads should be cancelled, so that they can be resumed using the latest update identifier. See alternative flow.

27 The EVENT_TYPE_HTML5_APP_AVAILABLE event is issued with the new update identifier

28 It is possible for the system to send a EVENT_TYPE_START_INSTALL for the original update identifier. In this case, no updates will be processed.

4.3.15. SEQ016—Download of an Application Fails

It is possible for the download of a file to fail. This can occur in the following situations:

An incorrect URL has been provided by the server in the OMA-DM tree

The server is inaccessible due to network conditions

The server rejects the download request, this could be caused by over-capacity

On failure the client will set the FUMO State value to be DOWNLOAD_FAILED and the Ext/State to DOWNLOAD_FAILED.

At this point the client can either receive another START_APPLICATION_INSTALL prompting the download to be attempted again, or the client will wait for the next synchronization request. The subsequent changes to the OMA-DM tree may result in the download being re-attempted.

Step Description

31 The state of the failed download is reset to READY_TO_DOWNLOAD

37 The download is processed as per normal 4.3.16. SEQ017—Download Partially Completes When the client downloads a file from the server it will keep a copy of the bytes downloaded on disk, so that it can resume the download at a later date. However if the FUMO node associated with the download is removed during a remote removal request, then the partially downloaded file should be removed.

See SEQ010.

4.3.17. SEQ018—User Rejects Installation of Updates

1. If the FUMO node associated with that application is not changed in subsequent synchronization requests, it will not be installed, it will be ignored.

It is highly likely that the server will re-send the EXEC command so that the update will be installed. This will result in the user being asked to install the application again.

2. If the FUMO node associated with that application is changed, for example the download URL changes, or the ApplicationHash changes, both of which would result in a increment of the version number, then it will be installed as part of a new update, and the user would be asked to re-confirm.

4.3.17.1. Scenario: User Rejects Installation of Updates—Re-use of Same FUMO Node 4.3.17.1.1. Sync 1: Initial Attempt to Update App1 from Version 1 to Version 2

Server->Client: Request List of Packages Node

The server requests the nodes within /Vendor/Website/Packages/.

GET ./Vendor/Website/Packages

Client->Server: Client Responds with {random1} Representing App1 v.1

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_NO_DATA

./Vendor/Website/Packages/{random1}/Ext/FileVersionID: {uri: App1 v.1}

./Vendor/Website/Packages/{random1}/Ext/State: POST_ CUSTOM_INSTALL_OK

Server->Client: Servers Updates FUMO Node Representing App1 v.1 and Changes Details Representing App1 v.2

UPDATE ./Vendor/Website/Packages/{random1}/State: IDLE

UPDATE ./Vendor/Website/Packages/{random1}/PkgVersion: 2

UPDATE ./Vendor/Website/Packages/{random1}/Ext/FileVersionID: {uri: App1 v.2}

UPDATE ./Vendor/Website/Packages/{random1}/DownloadAndUpdate/PkgURL: URL to download App1 v.2

EXEC ./Vendor/Website/Packages/{random1}/DownloadAndUpdate 4.3.17.1.2. Client Rejects Installation Based on User Input The ./State Node will Remain Set to IDLE.

The ./Ext/State will be Set to READY_TO_DOWNLOAD.

./Vendor/Website/Packages/{random1}/State: IDLE

./Vendor/Website/Packages/{random1}/Ext/State: READY_TO_DOWNLOAD 4.3.17.1.3. Sync 2: Server Discovers Update has Failed and Re-applies App1

Server->Client: Request List of Packages Node

The server requests the nodes within /Vendor/Website/Packages/.

GET ./Vendor/Website/Packages

Client->Server: Client Responds with the New States of App1

The server knows that App1 v.2 has failed to install, and that App1 v.1 was previously installed.

./Vendor/Website/Packages/{random1}/PkgName: App1

./Vendor/Website/Packages/{random1}/PkgVersion: 2

./Vendor/Website/Packages/{random1}/State: UPDATE_FAILED_HAVE_DATA

./Vendor/Website/Packages/{random1}/Ext/State: READY_TO_DOWNLOAD

./Vendor/Website/Packages/{random1}/Ext/FileVersionID: {uri: App1 v.2}

Server->Client: Re-send Execute Command to {random1}

If there are no additional changes to the software for the device, then only the EXEC command for the {random1} node should be sent.

EXEC ./Vendor/Website/Packages/{random1}/DownloadAndUpdate

Figure 48:
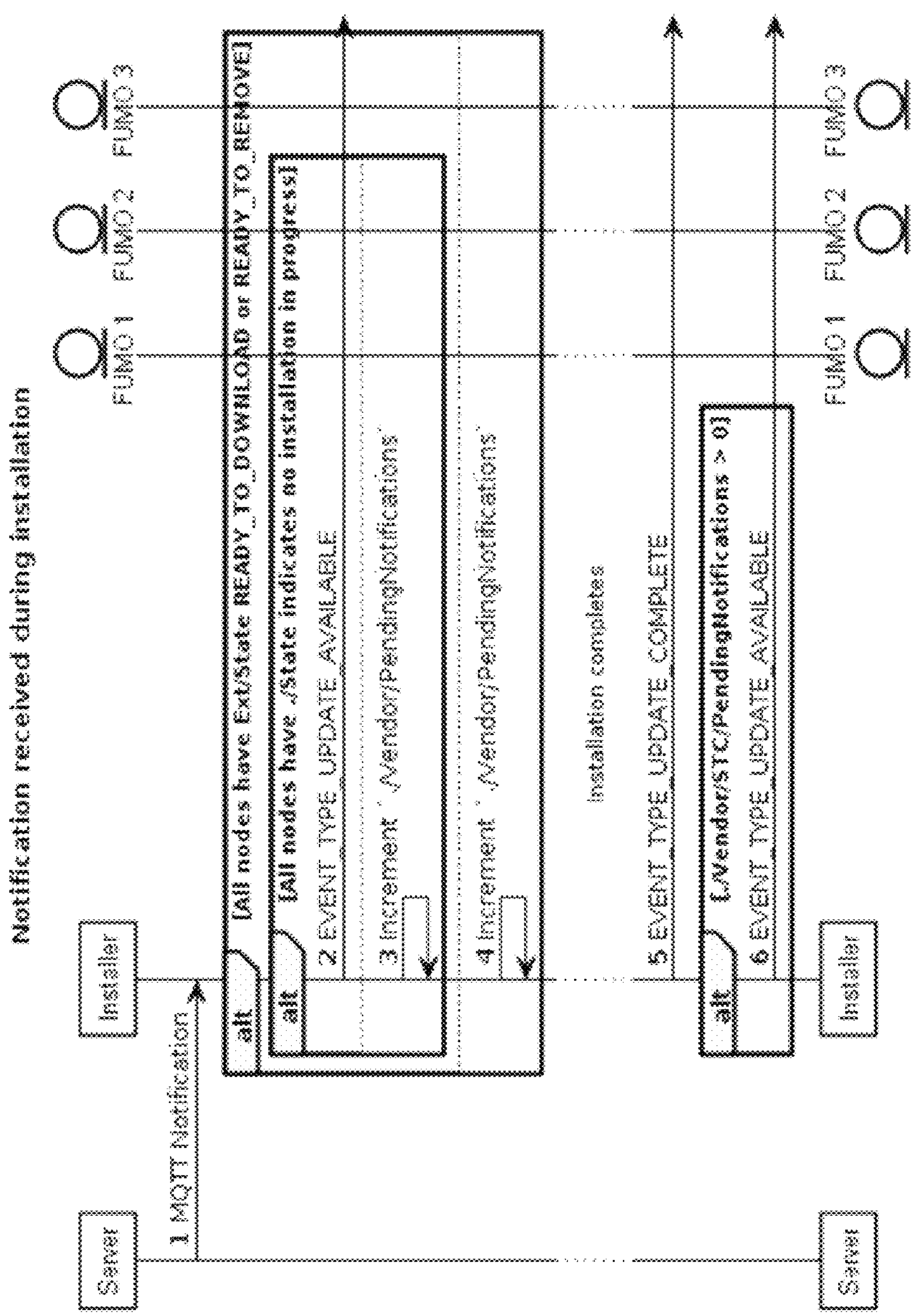

4.3.18. SEQ019—Notification of Updates Received During Installation—Shown in FIG. 48

Step Description

2 If the Ext/State of any FUMO node is either READY_TO_DOWNLOAD or READY_TO_REMOVE then it is safe to proceed with the installation of an update. If the ./State of the FUMO node is either IDLE, UPDATE_FAILED_NO_DATA, UPDATE_FAILED_HAVE_DATA, UPDATE_SUCCESSFUL_HAVE_DATA or UPDATE_SUCCESSFUL_NO_DATA then no update is in progress

5 At the end of the installation process the Installer will emit the EVENT_TYPE_UPDATE_COMPLETE event.

6 After the EVENT_TYPE_UPDATE_COMPLETE evet is sent the Installer should check to se if the value of ./Vendor/Website/PendingNotifications is greater than 0, if so, then it should send the EVENT_TYPE_UPDATE_AVAILABLE event as if the Installer has just received the MQTT notification 4.3.1. SEQ041—Whilst Downloading an Application the Corresponding FUMO Node Removed by a OMA-DM Sync Step Description

1 An MQTT notification is sent by the update server informing the client that updates are available

2 The client emits the EVENT_TYPE_UPDATE_AVAILABLE event

3 The Client proceeds with installation on receipt of the EVENT_TYPE_CHECK_UPDATES event

4 A unique identifier is generated for all updates received in the upcoming OMA-DM sync

6 Duringthe OMA-DM sync the client receives a new FUMO node and an execute command for the DownloadAndUpdate node.

8 The initial state for the FUMO node is set to READY_TO_DOWNLAD

9 The FUMO node is associated to the OMA-DM sync by using the previously generated update identifier U1

11 Once the OMA-DM sync is complete the client will emit the EVENT_TYPE_SYNC_COMPLETE. At this point the process could be stalled indefinitely as the client waits for user interaction.

12 The client proceeds with installation on receipt of the EVENT_TYPE_START_DOWNLOAD

13 The client selects all the FUMO nodes which have are associated with the generate update identifier U1

14 For every FUMO node which is downloaded the state is set to DOWNLOAD_IN_PROGREE

17 The download of the FUMO node is completed successfully and the DOWNLOAD_COMPLETE state is set

18 The existing update is partially complete, with the FUMO nodes set to the DOWNLOAD_COMPLETE state when a new MQTT notification is received from the update server.

21 A new update identifier is generated for the new OMA-DM sync request.

23 The server dictates that the FUMO node received in the first OMA-DM session should be deleted. This FUMO node should have been partially downloaded.

24 A new, unrelated FUMO node is added to the client

30 The downloaded file for the FUMO node which is no longer resident in the OMA-DM tree is deleted from the filesystem

31 The download is processed as per a normal 4.3.20. SEQ042—Whilst Downloading an Application an Additional FUMO is Added 32 by a OMA-DM Sync Step Description

1 An MQTT notification is sent by the update server informing the client that updates are available

2 The client emits the EVENT_TYPE_UPDATE_AVAILABLE event

3 The client proceeds with installation on receipt of the EVENT_TYPE_CHECK_UPDATES event

4 A unique identifier is generated for all updates received in the upcoming OMA-DM sync

6 During the OMA-DM sync the client receives a new FUMO node and an execute command for the DownloadAndUpdate node.

8 The initial state for the FUMO node is set to READY_TO_DOWNLOAD

9 The FUMO node is associated to the OMA-DM sync by using the previously generated update identifier U1

11 Once the OMA-DM sync is complete the client will emit the EVENT_TYPE_SYNC_COMPLETE. At this point the process could be stalled indefinitely as the client waits for user interaction.

12 The client proceeds with installation on receipt of the EVENT_TYPE_START_DOWNLOAD

13 The client selects all the FUMO nodes which have are associated with the generated update identifier U1

14 For every FUMO node which is downloaded the state is set to DOWNLOAD_IN_PROGRESS

16 The existing update is partially complete, with the FUMO nodes set to the DOWNLOAD_COMPLETE state when a new MQTT notification is received from the update server.

18 The Installer will cancel or pause the download of the FUMO nodes which were received in Sync#1. If unmodified in the subsequent sync, then they will need to be resumed.

20 A new update identifier is generated for the new OMA-DM sync request.

22 Because the state of the original FUMO node is not FUMO_STATE_UPDATE_SUCCESSFUL_HAVE_NO_DATA the server re-sends the execute command

23 The state of the original FUMO node is reset to READY_TO_DOWNLOAD

24 The original FUMO node has the Updateld set to the new update identifier U2

25 A new, unrelated FUMO node is added to the client

30 The second OMA-DM sync is completed, and the server emits the EVENT_TYPE_SYNC_COMPLETE event

31 On receipt of the EVENT_TYPE_START_DOWNLOAD the client will start to download both FUMO nodes resident in the client database.

36 Since the download for the first FUMO node was completed, the client will use this file buy attempting to resume it but finding that it is already complete. If this file has been altered between the first download attempt and the second, then the errors will be visible during the verification process.

38 The state of the first FUMO node should be set to DOWNLOAD_COMPLETE immediately

41 Once the download of the new second FUMO node, then the state is set to DOWNLOAD_COMPLETE

42 The download is processed as per normal 4.3.21. SEQ043—Whilst Downloading an Application an Additional FUMO of Type 2 User Profile is Added by a OMA-DM Sync Step Description

1 An MQTT notification is sent by the update server informing the client that updates are available

2 The client emits the EVENT_TYPE_UPDATE_AVAILABLE event

3 The client proceeds with installation on receipt of the 8 EVENT_TYPE_CHECK_UPDATES event

4 A unique identifier is generated for all updates received in the upcoming OMA-DM sync

6 During the OMA-DM sync the client receives a new FUMO node and an execute command for the DownloadAndUpdate node.

8 The initial state for the FUMO node is set to READY_TO_DOWNLOAD

9 The FUMO node is associated to the OMA-DM sync by using the previously generated update identifier U1

11 Once the OMA-DM sync is complete the client will emit the EVENT_TYPE_SYNC_COMPLETE. At this point the process could be stalled 18 indefinitely as the client waits for user interaction.

12 The client proceeds with installation on receipt of the EVENT_TYPE_START_DOWNLOAD

13 The client selects all the FUMO nodes which have are associated with the generated update identifier U1

14 For every FUMO node which is downloaded the state is set to DOWNLOAD_IN_PROGRESS

16 The existing update is partially complete, with the FUMO nodes set to the DOWNLOAD_COMPLETE state when a new MQTT notification is received from the update server.

20 Because the state of the original FUMO node is not FUMO_STATE_UPDATE_SUCCESSFUL_HAVE_DATA the server re-sends the execute command

21 A new update identifier is generated for the application updates associated to the new OMADM sync request

22 The state of the original FUMO node is reset to READY_TO_DOWNLOAD

23 The original FUMO node has the Updateld set to the new update identifier U2

24 A new, unrelated FUMO node is added to the client

25 A new update identifier is generate for the user profile updates associated to the OMA-DM sync request

28 Because the second FUMO node is a User Profile it is assigned the U3 update identifier

30 The second OMA-DM sync is completed, and the server emits a EVENT_TYPE_SYNC_COMPLETE event for each of the updates that are grouped together.

32 The client will receive a EVENT_TYPE_START_DOWNLOAD for each of update identifier generated by the sync requests.

4.3.22. SEQ045—Installer Registers with OMA-DM Client

Step Description

2 Each different type of installer registers with the OMA-DM client indicating which areas of the OMA-DM tree should be interpreted as containing FUMO nodes

5 Each installer registers with the OMA-DM client indicating that it should be informed when an OMA-DM sync has completed.

8 On receipt of the EVENT_TYPE_CHECK_UPDATES event, the DM client will perform a OMADM synchronization

9 The DMClient emits the EVENT_TYPE_SYNC_COMPLETE event indicating which subtrees containing FUMO nodes has been updated

10 The EVENT_TYPE_SYNC_COMPLETE is observed by the RPM Installer

11 The EVENT_TYPE_SYNC_COMPLETE is observed by the App Installer

12 The EVENT_TYPE_SYNC_COMPLETE is observed by the User Profile Installer

13 If any application updates have been downloaded as part of the sync, then the EVENT_TYPE_HTML5_APP_AVAILABLE event is emitted.

14 The Installer listens for the EVENT_TYPE_HTML5_APP AVAILABLE_update and extracts the application UUIDs. The application UUIDs uniquely identify the application within the scope of the platform.

16 Once the Application UUIDs have been extracted, the EVENT_TYPE_READY_TO_DOWNLOAD event is emitted the list of application UUIDs

17 If the OMA-DM tree containing FUMO nods for User Profiles has been updated then the EVENT_TYP_E USER_PROFILE_AVAILABLE event is emitted.

18 If the OMA-DM tree containing FUMO nodes for RPM installations has been updated, then the EVENT_TYPE_RPM_AVAILABLE event is emitted.

Figure 49:
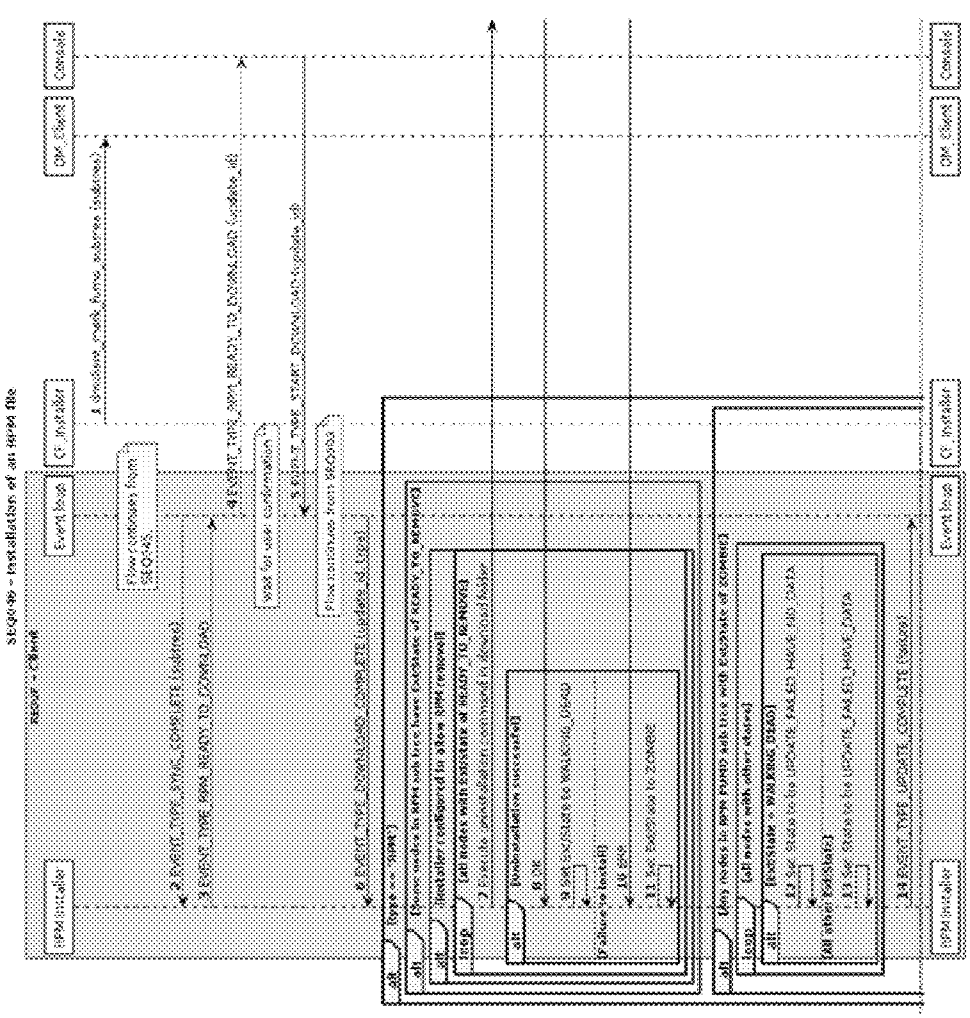
Figure 50:
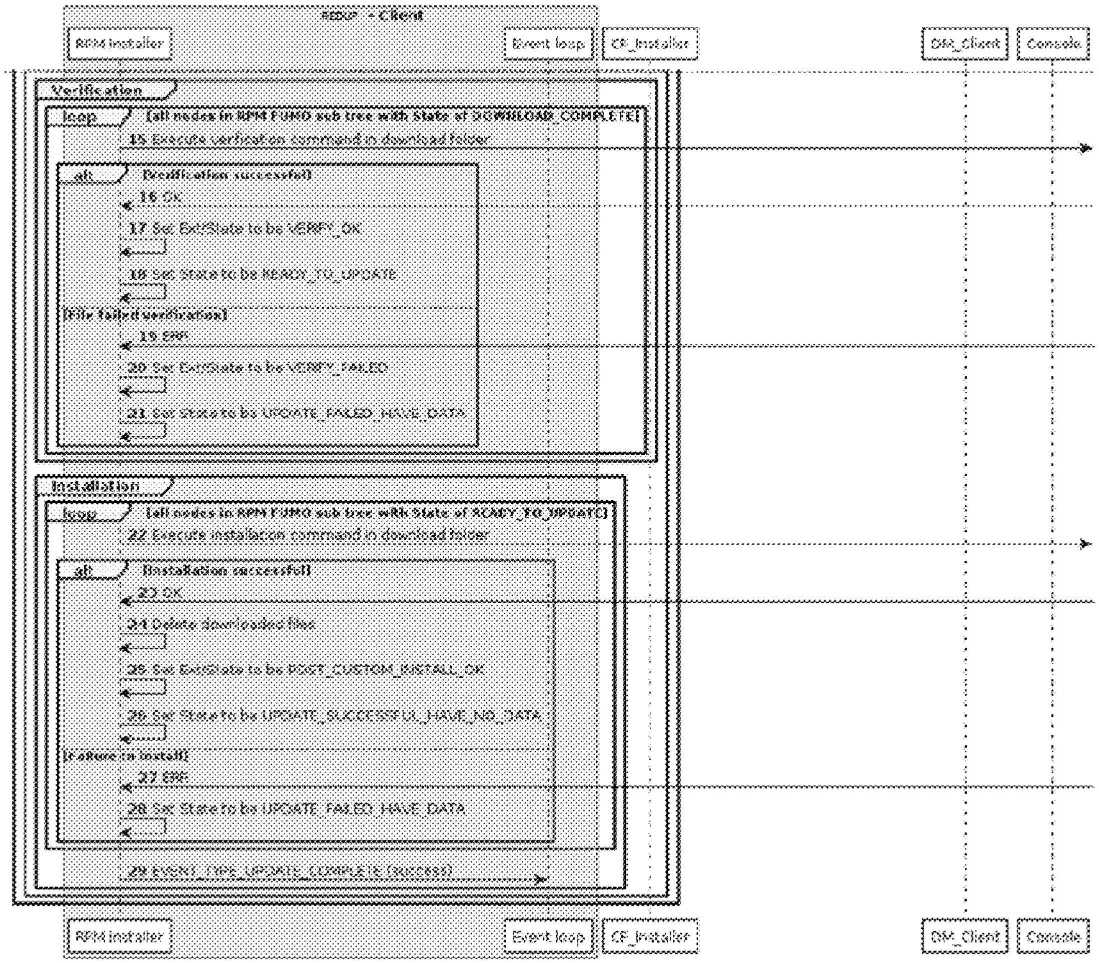

4.3.23. SEQ046—Installation of an RPM File—Shown in FIGS. 49 and 50

Step Description

1 Before any installation begins the RPM Installer informs the OMA-DM client that any changes in a specified sub-tree should be interpreted as FUMO nodes.

2 On completion of an OMA-DM synchronization to EVENT_TYPE_SYNC_COMPLETE event is thrown, which includes information indicating that the subtree which contains RPM files to be installed has been changed.

3 The RPM installer emits the EVENT_TYPE_RPM_READY_TO_DOWNLOAD event in order to get permission to download the RPMs in the update. 4 The Console application observes the EVENT_TYPE_RPM_READY_TO_DOWNLOAD event and asks the user for confirmation of installation. 5 If the user provides confirmation that they want to download the update then the Console application emits the EVENT_TYPE_START_DOWNLOAD event which is processed by the Generic Installer and Downloader components.

6 Once the download of all of the RPM files has been completed, the EVENT_TYPE_DOWNLOAD_COMPLETE message will be invoked.

7 If some of the nodes have a state of READY_TO_REMOVE then they should be uninstalled by the RPM Installer. The RPM Installer should only attempt to uninstall RPM files if explicitly configured to do so. Another option to remove an RPM files is to create a new RPM file and install that instead -known as a "Redeemer". Loop through all of the FUMO nodes that have the Ext/State of READY_TO_REMOVE For each of the FUMO nodes execute the pre-configured RPM uninstallation command within the folder into which the RPMs were downloaded. The uninstallation command is configure by the rpminstaller-uninstallcmd

8 The exit code of the uninstallation command will indicate if it was successful.

9 The RPM Installer sets the Ext/State to be WALKING_DEAD

11 The RPM Installer sets the Ext/State to be ZOMBIE

12 If any nodes in the RPM FUMO subtree have the Ext/State of ZOMBIE then the installation has failed. This means that if the RPM installer is unable to remove a file, and it is configured to do so, it will not proceed with any further updates. The RPM Installer sets the FUMO state of all nodes which don't have the state of ZOMBIE to UPDATE_FAILED_HAVE_DATA—because the installation has not been attempted. In the case of nodes with the WALKING_DEAD Ext/State, then UPDATE FAILED_HAVE_NO_DATA is set—No file downloaded before the uninstallation failed, and the state of the file on the System is not the same as before the update began, so it cannot use Ext/State.

16 The success of the installation command is determined based on the exit code

17 The FUMO Ext/State is set to VERIFY_OK

18 The RPM Installer sets the State of the FUMO node to be READY_TO_UPDATE

19 If the verification command returns an error exit code then it is assumed that the file failed verification.

20 The RPM Installer sets the Ext/State of the FUMO node to VERIFY_FAILED

21 The RPM Installer marks the single file in the update as UPDATE_FAILED_HAVE_DATA

22 The RPM installer executes the installation command in the download folder. Any dependencies should be resolved by virtue of being in the same folder. This may mean that the RPM could be installed twice. If RPM A depends on RPM B, and A is installed first, it will also install B, but the RPM Installer will also attempt to install B once it has completed the installation of A and B. The command used to install the RPM file is configured by the rpm_installer-install_cmd configuration option.

23 The success of the installation command is determined based on the exit code

24 The RPM Installer removes the downloaded RPM file

25 The FUMO Ext/State is set to POST_CUSTOM_INSTALL_OK

26 The RPM Installer sets the State of the FUMO node to be UPDATE_SUCCESSFUL_HAVE_NO_DATA 6 27 If the installation command returns an error exit code, then it is assumed that the installation has failed. There is no rollback, so the installation of other updates will continue.

28 The RPM Installer marks the single file in the update as UPDATE_FAILED_HAVE_DATA

Figure 51:
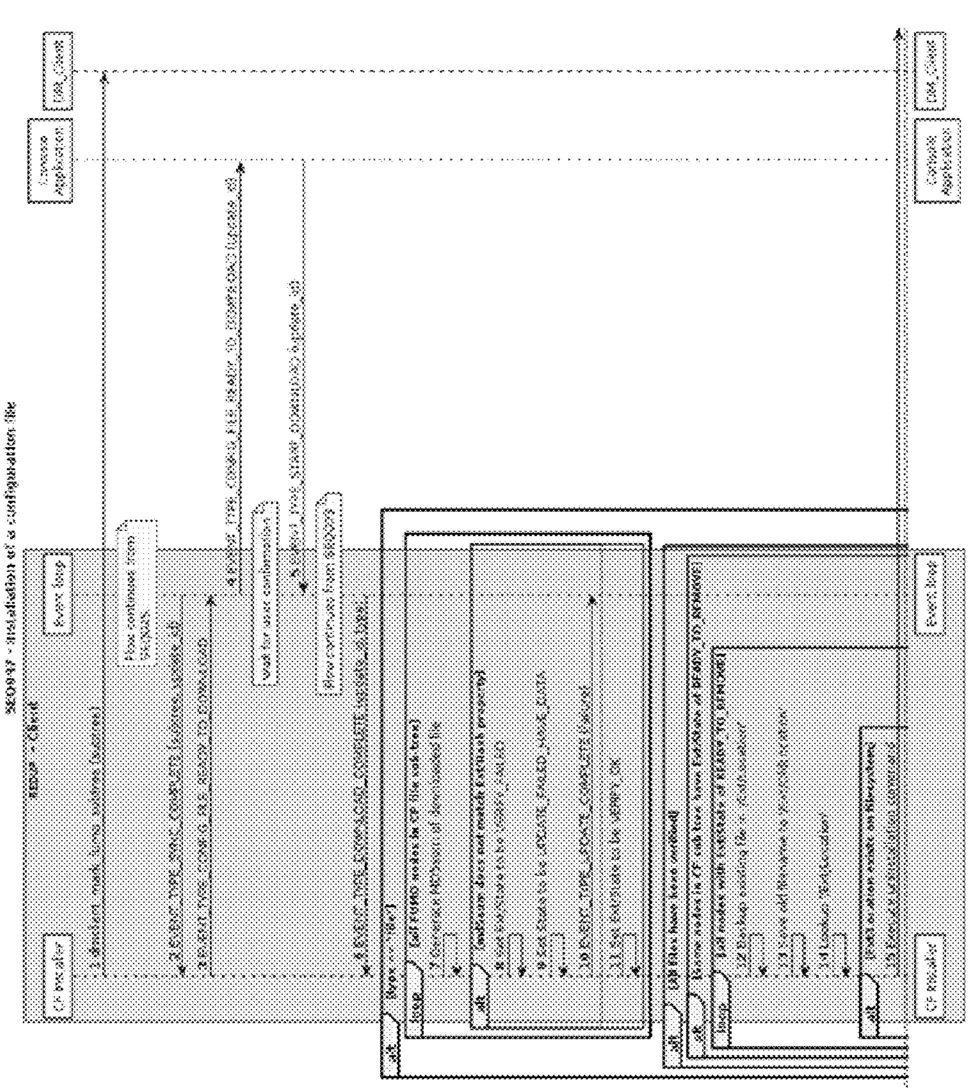

29 Finally the RPM Installer issues the EVENT_TYPE_UPDATE_COMPLETE with an indicator if the installation was successful or not 4.3.24. SEQ047—Installation of a Configuration File—Shown in FIG. 51

Step Description

1 Before any installation begins the Configuration File Installer informs the OMA-DM client that any changes in a specified sub-tree should be interpreted as 17 FUMO nodes.

2 On completion of an OMA-DM synchronization to EVENT_TYPE_SYNC_COMPLETE event is thrown, which includes information indicating that the subtree which contains configuration files to be installed has been changed.

3 If the sub-tree matches that which was supplied to dmclient_mark_fumo_subtree then the CF installer emits the EVENT_TYPE_CONFIG_FILE_READY_TO_DOWNLOAD event in order to get permission to download the Configuration Files in the update.

4 The Console application observes the EVENT_TYPE_CONFIG_FILE_READY_TO_DOWNLOAD event and asks the user for confirmation of installation.

5 If the user provides confirmation that they want to download the update then the Console application emits the EVENT_TYPE_START_DOWNLOAD event which is processed by the Generic Installer and Downloader components.

6 Once the download of all of the files has been completed, the EVENT_TYPE_DOWNLOAD_COMPLETE message will be invoked.

7 Ensure that the hash of every file downloaded matches the hash stored within the Ext/Hash property. The verification should come before the processing of any FUMO nodes which need to be removed, because otherwise you will unnecessarily uninstall valid updates.

12 If some of the nodes have a state of READY_TO_REMOVE then they should be uninstalled by the Configuration File Installer. Loop through all of the FUMO nodes that have the Ext/State of READY_TO_REMOVE

14 For each of the FUMO nodes make a backup of the file currently installed

16 The exit code of the uninstallation command will indicate if it was successful.

17 The Configuration File Installer sets the Ext/State to be WALKING_DEAD

18 If the command fails to execute then it will return a failure error code this may occur if the file no longer exists, or has incorrect permissions.

19 The Configuration File Installer sets the Ext/State to be ZOMBIE

20 If the location of the Configuration File does not exist on the filesystem then the Configuration File Installer sets the Ext/State to be WALKING_DEAD. It is assumed that if the file does not exist then it has already been removed by another process, and that it is safe to proceed with the update.

21 If the current user does not have permission to write to the location described by Ext/Location then the Configuration File Installer sets the Ext/State to be ZOMBIE

22 If any nodes in the CF FUMO subtree have the Ext/State of ZOMBIE then the removal of file has failed. This means that if the CF installer is unable to remove a file, and it is configured to do so, it will not proceed with any further updates. The CF Installer copies the file from the location in 'Ext/OldLocation' to the 'Ext/Location' path.

23 The CF Installer sets the FUMO state of all nodes which don't have the state of WALKING_DEAD to UPDATE_FAILED_HAVE_NO_DATA—no files were required for installation

24 The CF Installer sets the FUMO state of all nodes which don't have the state of WALKING_DEAD to UPDATE_FAILED_HAVE_DATA—the files required for installation are available, but have not been installed

28 The CF installer "installs" the FUMO node by copying the downloaded file over the location in '/Ext/Location'

29 The success of the installation command is determined based on the exit code

30 The FUMO Ext/State is set to POST_CUSTOM_INSTALL_OK

31 The Configuration File Installer sets the State of the FUMO node to be UPDATE_SUCCSSEFUL_HAVE_DATA The State is marked as HAVE data because the old configuration file has not been deleted.

32 If the copy command returns an error exit code, then it is assumed that the installation has failed. There is no rollback, so the installation of other updates will continue.

33 The CF Installer marks the single file in the update as UPDATE_FAILED_HAVE_DATA

34 If any file fails to install, then the CF Installer should not process the next

35 If any node failed to install, then the update is reverted. The nodes which match the current update_id and have the State of UPDATE_SUCCSSEFUL_HAVE_DATA are identified as nodes which required reverting. The CF Installer copies the file from the location in 'Ext/OldLocation' to the 'Ext/Location' path.

36 Once the previous version of the Configuration File has been restored, then the FUMO node state is set to Ext/PreviousState so that the FUMO node now represents what it was previously described as.

37 If all of the FUMO nodes installed successfully then the final states are set and any clean-up required is done. For all of the nodes which have been successfully deleted i.e. WALKING_DEAD the Configuration File saved on the filesystem at Ext/OldLocation is removed. The CF Installer deletes the file in the location specified by 'Ext/OldLocation'

38 The CF Installer removes the FUMO node with the WALKING_DEAD state

39 If the installation of a FUMO node has been successful then the Configuration File Installer deletes the backup of the file.

40 The "Ext/OldLocation" node is no longer valid, since it has been deleted, so it can also be deleted

41 The backup of the previous FUMO "State" is no longer needed so it can be deleted 42 Finally the CF Installer issues the EVENT_TYPE_UPDATE_COMPLETE with an indicator if the installation was successful or not 4.4. Events 4.4.1. OMA-DM Client 4.4.1.1. EVENT_TYPE_SYNC_COMPLETE: An OMA-DM Synchronization has Completed Emitted when a OMA-DM sync has completed.

4.4.1.1.1. Event Data (FR1.2.*)

None 4.4.1.1.2. Event Data (FR1.3.*)

status

A status code indicating if the OMA-DM synchronization had completed successfully or not.

completed_at

The time at which the OMA-DM synchronization was completed subtrees

A list of OMA-DM sub-trees that contain FUMO nodes which have been modified in the OMA-DM sync.

If the OMA-DM sync did not contain any updates to subtrees with FUMO nodes then this value is set to NULL.

Each item in the list includes:

subtree_path

The location in the OMA-DM tree which contains FUMO nodes that have changed.

For example:

Applications—/Vendor/Website/Packages/

User Profiles—/Vendor/Website/Profiles/ exec_count

A count of the number of nodes in the OMA-DM sub-tree which have received an EXEC command.

delete_count

A count of the number of nodes in the OMA-DM sub-tree which have received a DELETE command.

update_id

A string identifier which is used to identify the FUMO nodes in the sub-tree. This identifier can be used to extract the relevant FUMO nodes from the OMA-DM tree.

4.4.1.2. EVENT_TYPE_HTML5_APP_AVAILABLE: New or Changed HTML Applications are Available This event indicates that new HTML5 application/s are available for download. This event is normally emitted as at the end of OMA-DM sync, if new/updated HTML5 applications are available.

At this point the Update Client has not parsed the OMA-DM tree to expose what the applications are, only that the sub-tree containing applications has been modified.

4.4.1.2.1. Event Data

An update_id identifier used to identify the files which have been changed during an update 4.4.1.3. EVENT_TYPE_USERPROFILE_AVAILABLE: New or Changed User Profiles are Available This event indicates that an User Profile should be downloaded by the client. This event is normally emitted as at the end of OMA-DM sync, if a new/updated User Profile has been made available.

Event Data:

An update_id identifier used to identify the files which have been changed during an update 4.4.2. Generic Installer 4.4.2.1. EVENT_TYPE_DOWNLOAD_FAILED: The Download of an Update has Failed Emitted if any of the files in the update fail to complete.

4.4.2.2. EVENT_TYPE_DISK_SPACE_UNAVAILABLE: Not Enough Storage Space to Install an Update There is not enough storage space on the configured medium to install updates.

The data associated with this event should be a structure that contains:

- the amount of disk space required
- the amount of disk space available 4.4.2.3. EVENT_TYPE_UPDATE_COMPLETE: The Installation of an Update has Completed This event is emitted by the client when an application update has been completed.

Event Data:

update_complete_response_t a structure containing a status code and message

- message—an optional message describing the actions taken place by the update
- status
- indicates the status of a complete update, including all files as part of the update
  - UPDATE_COMPLETE_INSTALL_OK—update was installed successfully
  - UPDATE_COMPLETE_ROLLBACK_OK—update failed to install correctly, but was reverted successfully. The system should be at the same state as it was prior to the update being installed.
  - UPDATE_COMPLETE_DELETE_OK—successful delete applied
  - UPDATE_COMPLETE_ROLLBACK_ERROR—update failed to install correctly, and the rollback mechanism also failed 4.4.2.4. EVENT_TYPE_APPLICATION_DOWNLOAD_COMPLETE: Download of All Applications have Completed Event Data:

An update_id identifier used to identify the files which have been changed during an update 4.4.2.5. EVENT_TYPE_USERPROFILE_DOWNLOAD_COMPLETE: Download of All User Profiles have Completed Event Data:

An update_id identifier used to identify the files which have been changed during an update 4.4.3. Application Installer 4.4.3.1. EVENT_TYPE_VERIFICATION_COMPLETE: Update has Been Verified Successfully The EVENT_TYPE_VERIFICATION_COMPLETE event is emitted by the client when the verification process has been completed for all applications in the update. If any of the applications that form part of this update fail, then this event will be emitted.

The data associated with this event should be a structure that contains:

- a boolean flag indicating if the verification passed or not
- a list of application UUIDs for which the verification failed If the verification has been successful, then the system should respond by emitting a Error: Reference source not found event.

Event Data:

update_complete_response_t a structure containing a status code, an optional message and the update identifier

- status
- indicates the status of the verification
  - UPDATE_VERIFICATION_OK—update verification successful
  - UPDATE_VERIFICATION_FAILED—update verification failed
- message—an optional message describing the actions taken place by the update
- update_id—the update identifier 4.4.3.2. EVENT_TYPE_CUSTOM_DEINSTALL: Perform a Custom De-installation of an Application EVENT_TYPE_CUSTOM_DEINSTALL is emitted by the client when an application has been deinstalled from disk This event allows the system to extend the deinstallation process by reacting to this event.

Once the system has deinstalled the application, then it should emit the Error: Reference source not found event.

Event Data:

custom_deinstall_request_t a structure representing the application which needs to be removed

- uri—the URI to the application within the OMA-DM tree
- update_id—the update identifier to which this de-installation request is associated
- uuid—for the application
- filename—the existing path for the application 4.4.3.3. EVENT_TYPE_CUSTOM_INSTALL: Perform Custom Installation of an Application EVENT_TYPE_CUSTOM_INSTALL is emitted by the client when an application has been installed onto disk but has not been activated by the system. This event allows the system to extend the installation process by reacting to this event.

Once the system has installed the application, then it should emit the EVENT_TYPE_CUSTOM_INSTALL_RESPONSE event.

Event Data:

custom_install_request_t a structure representing the application which needs to be installed

- uuid—the Application UUID for the application which needs to be installed
- filename—the new path for the application
- update_id—the update identifier to which this installation request is associated 4.4.3.4. EVENT_TYPE_CUSTOM_ROLLBACK: A Custom Application Rollback Request EVENT_TYPE_CUSTOM_ROLLBACK is emitted by the client when the installation of the application has failed and client is attempting to rollback the procedure. This event allows the system to revert any custom installation taken place during a EVENT_TYPE_CUSTOM_INSTALL.

Event Data:

custom_rollback_request_t a structure representing the application which needs to be rolled back uuid—the Application UUID for the application which needs to be installed filename—the new path for the application update_id—the update identifier to which this installation request is associated 4.4.3.5. EVENT_TYPE_READY_TO_DOWNLOAD: Details of Updates are Known, and are Ready to be Downloaded Once a OMA-DM synchronization has completed, then the resulting FUMO nodes are processed.

If there are any FUMO nodes that require download and installation then the EVENT_TYPE_READY_TO_DOWNLOAD event is emitted.

The data associated with this event is a ready_to_download_request_t that contains list of Application UUIDs in a application_uuid_t structure, and the update identifier.

Event Data:

update_id—the update identifier critical_update—indicates if this update is critical or not uuid list a list of HTML applications which are to modified in this update. Each item in this list contains the following properties:

uuid—the uuid name—the name of the application version—the version of the application to be changed action the action that will be performed on the application APPLICATION_UUID_ACTION_UPDATE—the update process will download and install a new version of the application APPLICATION_UUID_ACTION_REMOVE—a version of this application already exists, but will be removed during the installation process APPLICATION_UUID_ACTION_INSTALL—the update process will only install a new version of the application, the application data is already downloaded 4.4.4. RPM Installer 4.4.4.1. EVENT_TYPE_RPM_READYTODOWNLOAD: An RPM-based Update is Available for Download 4.4.4.1.1. Event Data update_id An identifier for all of the FUMO nodes which are RPM files 4.4.4.1.2. Event Data rpm_file_available_t update_id The update identifier used to identify the FUMO nodes which have changed during the OMA-DM sync rpm_file_changes_list_t name—the name of the RPM File version—the version of the application to be changed action The action that will be performed on the application RPM_INSTALLER_ACTION_UPDATE—the update process will download and install a new version of the RPM RPM_INSTALLER_ACTION_REMOVE—a version of this RPM already exists, but will be removed during the installation process RPM_INSTALLER_ACTION_INSTALL—the update process will only install a new version of the RPM 4.4.5. Configuration File Installer 4.4.5.1. EVENT_TYPE_CONFIG_FILE_READY_TO_DOWNLOAD: New or Changed Configuration Files are Available for Download Once the OMA-DM synchronization has completed then the Configuration File Installer processes the changed FUMO nodes.

If any of the FUMO nodes require download and installation then the EVENT_TYPE_CONFIG_FILE_AVAILABLE event is issued with information about all of the configuration files updated.

4.4.5.1.1. Event Data config_file_available_t update_id

The update identifier used to identify the FUMO nodes which have changed during the OMA-DM sync configuration_file_changes_list_t name—the name of the Configuration File version—the version of the application to be changed location The location of the Configuration File which will be updated. This is stored in the Ext/Location FUMO field.

action

The action that will be performed with Configuration File

CONFIG_INSTALLER_ACTION_UPDATE—the update process will download and install a new version of the Configuration File CONFIG_INSTALLER_ACTION_REMOVE—a version of this Configuration File already exists, but will be removed during the installation process CONFIG_INSTALLER_ACTION_INSTALL—the update process will only install a new version of the Configuration File 4.5. Observed Events 4.5.1. OMA-DM Client 4.5.1.1. EVENT_TYPE_CHECK_UPDATES: Inform the Client that it Should Check for Updates When the EVENT_TYPE_CHECK_UPDATES event is invoked when the client should check the nature of any updates. Typically this is an OMA-DM synchronization, but is implementation dependent. This event should be emitted as a result of some user interaction prompted by the EVENT_TYPE_UPDATE_AVAILABLE event.

4.5.2. Generic Installer 4.5.2.1. EVENT_TYPE_START_INSTALL: Updates are Available, have Been Downloaded but not Verified The EVENT_TYPE_START_INSTALL event is issued when the application has confirmed that it wishes to install the update after it has been downloaded. At the point of entry the update has not been verified, so verification will normally take place in the listener for this event.

Event Data:

update_id—the update identifier 4.5.3. Application Installer 4.5.3.1. EVENT_TYPE_START_APPLICATION_INSTALL: Inform the Client that it Should Begin the Installation of Updates EVENT_TYPE_START_APPLICATION_INSTALL indicates that the system is ready to install applications. This should be the response from EVENT_TYPE_VERIFICATION_COMPLETE.

Event Data:

update_id—the update identifier 4.5.3.2. EVENT_TYPE_CUSTOM_DEINSTALL_RESPONSE: Inform the Client that Custom Deinstallation of Application is Complete EVENT_TYPE_CUSTOM_DEINSTALL response is sent by the custom installer once it has completed the custom de-installation procedure started by EVENT_TYPE_CUSTOM_DEINSTALL.

Event Data:

custom_deinstall_response_t a structure containing information about an application de-installation request uri—the URI to the application within the OMA-DM tree update_id—the update identifier to which this de-installation request is associated uuid—the Application UUID for the application status A status code indicating the success/failure of the operation CUSTOM_DEINSTALL_SUCCESS—custom de-installation was successful CUSTOM_DEINSTALL_FAILURE—custom de-installation encountered and error and the update should be reverted 4.5.3.3. EVENT_TYPE_CUSTOM_ROLLBACK_RESPONSE: Inform the Client that the Custom Rollback of the Application is Complete.

Sent by the system, or other library once the EVENT_TYPE_CUSTOM_ROLLBACK has been processed.

Event Data:

custom_rollback_response_t

This indicates if the custom rollback procedure was completed successfully or not. If it was not successful then the message field is populated.

status

Indicates if the rollback was successful, or failed

CUSTOM_ROLLBACK_SUCCESS—custom roll-back was successful

CUSTOM_ROLLBACK_FAILURE—custom roll-back failed message—an optional message that describes the success or failure uuid—The Application UUID that has been rolled back, or not update_id—the update identifier to which this de-installation request is associated 4.5.3.4. EVENT_TYPE_REMOVE_ALL_APPLICATIONS: Remove All Applications Installed on the Device The EVENT_TYPE_REMOVE_ALL_APPLICATIONS is issued when the user wishes to remove all applications currently installed by the client.

Event Data:

remove_all_applications_request_t a structure containing a pre-generated update_id update_id—an update identifier to use to identify events generated as a result of this request. If NULL then an update_id will be generated 4.6. DM Client API 4.6.1. $dmclient_{markfumosubtree}$: Mark an Area of the OMA-DM Tree as Containing FUMO Nodes (FR1.3.*)

Inform the OMA-DM client that a sub tree contains FUMO nodes. Any EXEC or DELETE OMA-DM commands to this sub-tree are interpreted as commands to install or remove software components, and will be included in the event data to EVENT_TYPE_SYNC_COMPLETE.

4.6.1.1. Parameters subtree_path

A path within the OMA-DM tree which contains FUMO nodes 4.6.1.2. Returns status—indicates success or failure 5. Download Client 5.1. Events 5.1.1. EVENT_TYPE_START_DOWNLOAD: Inform the Client that it Should Download Updates.

The EVENT_TYPE_START_DOWNLOAD event indicates that an update should be downloaded by the client. This event is normally emitted as a result of some user interaction prompted by the EVENT_TYPE_READY_TO_DOWNLOAD event.

5.1.1.1. Event Data update_id

An identifier used to group the files which needed to be downloaded. Typically this is an identifier generated during the post-processing of an OMA-DM sync.

5.1.2. EVENT_TYPE_DOWNLOAD_COMPLETE: All Downloads in the Update have Completed

The EVENT_TYPE_DOWNLOAD_COMPLETE event is fired when all the files matching an update_id have finished downloading.

Event Data:

update_id

An identifier used to group the files which needed to be downloaded. Typically this is an identifier generated during the post-processing of an OMA-DM sync.

type

The type of files being downloaded. Either:

DOWNLOAD_TYPE_USERPROFILE—for User Profile downloads

DOWNLOAD_TYPE_APPLICATION—for Application downloads 5.1.3. EVENT_TYPE_FILE_DOWNLOAD_PROGRESS: Indicates the Download Progress of a File Emitted during a file download when the percentage of the file complete meets a pre-configured interval. E.g. If configured to 20, then this event is emitted at 20%, 40%, 60%, and 80%

The pre-configured interval is defined by the configuration option download_progress_interval.

Event Data:

file_download_progress_t url—the URL which is being downloaded update_id—the update to which this file belongs filename—the filename to which the data is being saved to current_bytes—the number of bytes currently downloaded total_bytes—the total number of bytes of the file—if unknown then −1 per—the percentage complete 5.1.4. EVENT_TYPE_DOWNLOAD_CANCELLED: Indicate that an Ongoing Download has Been Cancelled The EVENT_TYPE_DOWNLOAD_CANCELLED is issued for every group of downloads which are cancelled as a result of the EVENT_TYPE_CANCEL_DOWNLOAD event.

5.1.4.1. Event Data ref—the reference supplied to the EVENT_TYPE_CANCEL_DOWNLOAD event update_id—the update_id for the group of downloads which were cancelled 5.1.5. EVENT_TYPE_UPDATE_DOWNLOAD_PROGRESS: Indicates the Download Progress of an Update Emitted during a update download when the percentage of the update complete meets a pre-configured interval. E.g. If configured to 20, then this event is emitted at 20%, 40%, 60%, and 80%

The pre-configured interval is defined by the configuration option download_progress_interval.

Event Data:

update_download_progress_t a structure which contains information related to the download of an update update_id—the update to which this file belongs current_bytes—the number of bytes currently downloaded total_bytes—the total number of bytes to download per—the percentage complete 5.1.6. EVENT_TYPE_DOWNLOAD_CANCELLED: Indicate that an Ongoing Download has Been Cancelled The EVENT_TYPE_DOWNLOAD_CANCELLED is issued for every group of downloads which are cancelled as a result of the EVENT_TYPE_CANCEL_DOWNLOAD event.

5.1.6.1. Event Data ref—the reference supplied to the EVENT_TYPE_CANCEL_DOWNLOAD event update_id—the update_id for the group of downloads which were cancelled 5.1.7. EVENT_TYPE_FILE_DOWNLOAD_COMPLETE: An Individual File in the Update has Completed Download (FR1.3.*)

The EVENT_TYPE_FILE_DOWNLOAD_COMPLETE is emitted when an individual file with a given update_id has completed download.

5.2. Observed Events 5.2.1. EVENT_TYPE_CANCEL_DOWNLOAD: Cancel any On-going Download The EVENT_TYPE_CANCEL_DOWNLOAD event is issued when the application or user wishes to cancel any on-going download.

It will cancel all downloads, regardless of type.

5.2.1.1. Event Data ref—A reference which is passed to EVENT_TYPE_DOWNLOAD_CANCELLED when a download has been successfully cancelled 5.2.2. EVENT_TYPE_DOWNLOAD_FILE: Queue a URL to be Downloaded (FR1.3.*)

5.2.2.1. Event Data url—the URL to download file_location—the location on the filesystem where the URL contents will be saved expected_download_size update_id The update to which this file belongs. This can also be used to identify the type of file which is being downloaded.

The URL will start to be downloaded when the EVENT_TYPE_DOWNLOAD_UPDATE event is invoked.

The EVENT_TYPE_DOWNLOAD_COMPLETE will be issued when all of the files matching a given update_id have been completed.

5.2.3. EVENT_TYPE_DOWNLOAD_UPDATE: Download All the Files in an Update (FR1.3.*)

The EVENT_TYPE_DOWNLOAD_UPDATE event starts the download of all the files in an update.

5.2.3.1. Event Data update_id

An identifier which is used to aggregate a collection of files which needed to be downloaded at the same time. This would typically by an update identifier, and can be used to identify the type of file which is being downloaded.

5.3. API 5.3.1. downloader_init: Initialize the Downloader 5.3.1.1. Parameters

None 5.3.1.2. Return

None 5.3.2. downloader_cleanup: Remove any Download Timers 5.3.2.1. Parameters

None 5.3.2.2. Return

None 5.3.3. downloadFile: Download a URL and Place it in the Specified Location deprecated This function is replaced with EVENT_TYPE_DOWNLOAD_FILE.

5.3.3.1. Parameters url—the URL to download file_location—the location on the filesystem where the URL contents will be saved expected_download_size update_id—the update to which this file belongs type The type of file being downloaded. This parameter determines if either EVENT_TYPE_APPLICATION_DOWNLOAD_COMPLETE or EVENT_TYPE_USERPROFILE_DOWNLOAD_COMPLETE events are fired on completion.

6. User Data Client

The purpose of the User Data Client provides an API to manage and authenticate Users on a system.

Figure 52:
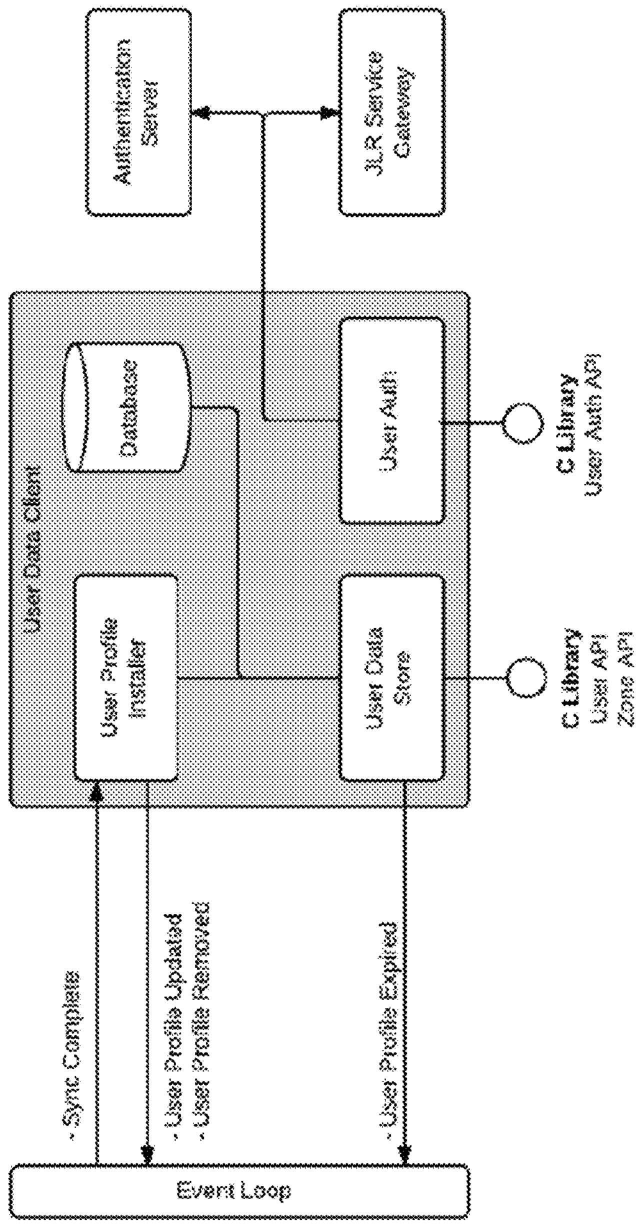

6.1. Sub Components—Shown in FIG. 52

6.1.1. User Profile Installer

The User Profile Installer component interacts with the Update Client to receive and install User Profiles.

6.1.2. User Data Store

The User Data Store component provides a C Library for managing user data which is stored in an SQLite3 database.

6.1.3. User Auth

The User Auth component provides a C Library used to authenticate a user with an off-board server.

6.1.4. JLR Service Gateway

The JLR Service Gateway is an off-board HTTP server capable of handing presence requests of a user on the device. It is used with the set_user_presence API.

6.1.5. Authentication Server

The Authentication Server is and off-board HTTP server capable of handling OAuth requests. It is used with the authenticate_user API.

6.2. Events 6.2.1. User Profile Installer 6.2.1.1. $EVENT_{TYPEUSERPROFILEUPDATED}$: User Profile Updated This event is issued by the User Profile Installer when the User Profile specified by the event data has been updated.

6.2.1.1.1. Event Data user_id—the unique user identifier zone_list—a list of zones which the specified user is currently active in 6.2.1.2. $EVENT_{TYPEUSERPROFILEREMOVED}$: User Profile Removed This event is issued by the User Profile Installer when the User Profile specified by the event data has been updated.

6.2.1.2.1. Event Data

See User Profile Updated—Event Data 6.2.2. User Data Store 6.2.2.1. $EVENT_{TYPEUSERPROFILEEXPIRED}$: User Profile Expired This event is issued by the User Data Store when the User Profile specified by the event data has expired.

6.2.2.1.1. Event Data

See User Profile Updated—Event Data 6.3. Observed Events 6.3.1. User Profile Available The User Profile Available event indicates that an User Profile should be downloaded by the client. This event is normally emitted as at the end of OMA-DM sync, if a new/updated User Profile has been made available.

6.4. Data Model 6.4.1. User Table

The User Table contains information related to a user that has successfully authenticated with a remote authentication server. Once remote authentication was successful, this table contains information allowing the user to be authenticated locally, through the use of an alias and pin number.

user_id

The user identity that is globally (both local to the system and remotely) unique.

The maximum length for user_id is defined by the constant MAX_USERID_LENGTH. By default this is set to 1024.

alias

An alias that is assigned to a user for local authentication

The maximum length for alias is defined by the constant MAX_ALIAS_LENGTH. By default this is set to 1024.

pin

A secret number used with an alias for local authentication

The maximum length for pin is defined by the constant MAX_PIN_LENGTH. By default this is set to 1024.

secure_token

A token obtained during first-time remote authentication that is used as a credential for remote servers other than the remote authentication server.

The maximum length for secure_token is defined by the constant MAX_USER_PROFILE_SECURE_TOKEN_LENGTH. By default this is set to 1024.

profile

A string of text that contains custom application information. This column is only populated once a User Profile has been downloaded from a remote server, after a successful remote authentication.

No maximum length of the profile is defined. The constant MAX_USER_PROFILE_LENGTH is deprecated.

expires_at

A timestamp which indicates what time the user profile should be removed from the database The maximum length for expires_at is defined by the constant MAX_USER_PROFILE_EXPIRES_AT_TIMESTAMP. By default this is set to 1024.

6.4.2. Zone Table

The Zone Table contains information related to a "zone" which a user can authenticate to. Zones are roughly equivalent to any device which can be connected to the system.

id

An identifier for the zone that is locally (restricted to system) unique zone_id An identifier for the zone that is specified by the application (such as Connected Infotainment) of the client type

ZONE_TYPE_INTERNAL

An internal zone is a pre-defined static location. In the case of Connected Infotainment this could be the head-unit or any other display which is permanently connected to the platform.

ZONE_TYPE_VIRTUAL

A "virtual" zone is a location that has been created dynamically based on a platform-specific property. In the case of Connected Infotainment this is the IP Address of a consumer device connected to the vehicle's WiFi network 6.4.3. User Zone State Table The User Zone State Table contains information regarding a user in a given zone. It is a link table between User Table and Zone Table.

zone_id

A foreign key to the zone_id column in the zone table user_id

A foreign key to the user_id column in the user table state

Specifies the state of the user in the zone defined by zone_id which is either:

USER_ZONE_STATE_ACTIVE

Indicates that the user is actively using the zone

USER_ZONE_STATE_SUSPENDED deprecated

Specified by Connected Infotainment

USER_ZONE_STATE_OFF

Indicates that the user is not authenticated to the specified zone (default)

USER_ZONE_STATE_EXPIRED deprecated

Indicates that the user has been suspended due to inactivity, and may require local authentication timestamp A timestamp indicating when the user last authenticated with the off-board server 6.5. User Auth API 6.5.1. authenticate_user: Authenticates a User Against a Remote Authentication Server The authenticate_user function attempts to authenticate a user against a remote OAuth server that supports "Resource Owner Password Credentials Grant".

On receipt of the access token it will be stored against the user in the User Data Table 6.5.1.1. Parameters username—the User's username, probably an email address password—the User's password in plain text device_identity—the identity of the device—if NULL then the configuration value device_identity is used 6.5.1.2. Returns (FR1.2.3)

authenticate_user_result_t—a structure that contains the user identity and any error conditions ic_error_code err—a status code indicating if the operation was successful or not

EBAD_PARAMETER username is NULL password is NULL

Server URL is not set in the configuration options

EINVALID_GRANT—Invalid password or username

EINVALID_CLIENT—The client_id passed to the OAuth server is invalid and the server has responded with a HTTP 400 error code with the message "invalid client".

ETOO_MANY_TRIES—The Authentication Server has responded with a HTTP 400 error code with the message too_many_tries.

ESERVER_ERROR—a server problem has prevented authentication (e.g. back end SSO service is down). The user should try again later.

EINVALID_JSON_MESSAGE—Response from the server is not JSON

EEMPTY_SERVER_RESPONSE—Nothing received from the server

EMAX_NUMBER_PROFILES_EXCEEDED—The maximum number of users has been reached

EDATABASE_ERROR

Unable to count the number of users in the database

Unable to update the timestamp field in the User Table for the matching user

EOK—Operation was successful user_id—A pointer to the user identity of a successfully authenticated user 6.5.1.3. Returns (FR1.2.5)

authenticate_user_result_t—a structure that contains the user identity and any error conditions authenticate_user_response_e status A status code indicating if the operation was successful or not.

AUTHENTICATE_USER_OK

Operation was successful and the secure_token field has been updated

EAUTHENTICATE_USER_INVALID_USERNAME username is either empty or NULL

EAUTHENTICATE_USER_INVALID_PASSWORD password is either empty or NULL

EAUTHENTICATE_USER_INTERNAL_ERROR

Set when the OAuth response is either:

OAUTH_STATUS_INVALID_CLIENT

OAUTH_STATUS_INVALID_REQUEST

OAUTH_STATUS_UNAUTHORIZED_CLIENT

OAUTH_STATUS_WRONG_USER

This will also be set if there are any database or memory allocation errors.

EAUTHENTICATE_USER_INVALID_GRANT

The username and password parameters do not match those on the Authentication Server.

EAUTHENTICATE_USER_RESPONSE_ERROR

The Authentication Server has responded with a HTTP 400 error code and the message "server_error". Or the Authentication Server has responded with invalid JSON.

The oauth_response_e should be set to either:

OAUTH_STATUS_SERVER_ERROR

OAUTH_STATUS_TOO_MANY_TRIES

OAUTH_STATUS_UNSUPPORTED_GRANT_TYPE

OAUTH_STATUS_INVALID_SCOPE

EAUTHENTICATE_USER_MAX_PROFILES_EXCEEDED

The maximum number of users has been reached.

oauth_response_e oauth_status

An enumeration containing the different possible states of an OAuth response.

If no OAuth request has been made then oauth_status is set to NULL.

OAUTH_STATUS_OK

The username and password parameters match the ACUserID parameter. authenticate_user_response should be set to AUTHENTICATE_USER_OK.

EOAUTH_STATUS_INVALID_GRANT

The username and password parameters do not match. authenticate_user_response_e should be set to EAUTHENTICATE_USER_INVALID_GRANT.

EOAUTH_STATUS_INVALID_CLIENT

The client_id passed to the OAuth server is invalid and the server has responded with a HTTP 400 error code with the message invalid_client.

authenticate_user_response_e should be set to EAUTHENTICATE_USER_INTERNAL_ERROR.

EOAUTH_STATUS_TOO_MANY_TRIES

The Authentication Server has responded with a HTTP 400 error code with the message too_many_tries.

authenticate_user_response_e should be set to EAUTHENTICATE_USER_RESPONSE_ERROR.

EOAUTH_STATUS_SERVER_ERROR

There is a problem with the Authentication Server. This can occur in the following conditions:

Server has responded with a HTTP 500 or unrecognized error code

Server has returned the "server_error" in the JSON response

Server has returned invalid JSON

No data has been returned from the server authenticate_user_response_e should be set to EAUTHENTICATE_USER_RESPONSE_ERROR.

EOAUTH_STATUS_INVALID_REQUEST

The generated request is missing a required parameter and the server has returned a invalid_request error in the JSON object. authenticate_user_response_e should be set to EAUTHENTICATE_USER_INTERNAL_ERROR.

EOAUTH_STATUS_WRONG_USER

The server has incorrectly matched a ACUserID HTTP parameter against the username and password. The authenticate_user method should not include the ACUserID parameter.

authenticate_user_response_e should be set to EAUTHENTICATE_USER_INTERNAL_ERROR because the method is behaving incorrectly.

EOAUTH_STATUS_UNAUTHORIZED_CLIENT

The client is not allowed to use the "Resource Owner Password Credentials Grant" mechanism of authentication. No other forms of authentication are supported by the client, so this is an internal error.

authenticate_user_response_e should be set to EAUTHENTICATE_USER_INTERNAL_ERROR.

EOAUTH_STATUS_UNSUPPORTED_GRANT_TYPE

The server does not support "Resource Owner Password Credentials Grant" mechanism of authentication.

authenticate_user_response_e should be set to EAUTHENTICATE_USER_RESPONSE_ERROR.

EOAUTH_STATUS_INVALID_SCOPE

The requested OAuth scope is invalid, unknown, malformed or exceeds the scope generated by the resource owner.

authenticate_user_response_e should be set to EAUTHENTICATE_USER_RESPONSE_ERROR.

6.5.2. change_pin_by_user_id: Authenticate a User and then Change the PIN

The change_pin_by_user_id function changes the PIN number for a given username. Performs an OAuth request to the off-board server which verifies that the username and password are correct and match the provided user_id.

If the username and password are correct, and the server responds with HTTP 200 (OK) then the PIN number for that alias is changed.

The OAuth request uses includes the HTTP parameter ACUserID which is populated by the method parameter user_id. This method expects this value to be the same as the user_id in the result of authenticate_user.

6.5.2.1. Parameters username—the off-board username for the user, probably an email address password—the off-board password for the user in plain text device_identity—the identity of the device—if NULL then the configure device identity is used alias—the alias of the user pin—the new PIN number for the user 6.5.2.2. Returns change_pin_by_user_id_result_t a structure containing a status code and the user_id of the user updated user_id—a point to the user identity of a successfully authenticated user change_pin_by_user_id_result_e status—a status code indicating if the PIN was changed or not

CHANGE_PIN_BY_USER_ID_OK if PIN was changed successfully.

ECHANGE_PIN_BY_USER_ID_INVALID_ALIAS if parameter alias is invalid if alias does not exist if alias matches multiple users

ECHANGE_PIN_BY_USER_ID_INVALID_PIN if new_pin is invalid if unable to set pin for the alias

ECHANGE_PIN_BY_USER_ID_RESPONSE_ERROR invalid response from the server oauth_response_e can be either:

EOAUTH_STATUS_TOO_MANY_TRIES

EOAUTH_STATUS_UNSUPPORTED_GRANT_ TYPE

EOAUTH_STATUS_SERVER_ERROR

EOAUTH_STATUS_INVALID_SCOPE

ECHANGE_PIN_BY_USER_ID_INVALID_ CREDENTIALS the username and password do not match. The oauth_response_e should be set to EOAUTH_STATUS_INVALID_GRANT the user_id parameter does not match the username and password. The oauth_response_e should be set to EOAUTH_STATUS_WRONG_USER.

the user_id is invalid

ECHANGE_PIN_BY_USER_ID_INTERNAL_ERROR

Database error or memory allocation failure

Or oauth_response_e can be either:

EOAUTH_STATUS_INVALID_CLIENT

EOAUTH_STATUS_INVALID_REQUEST

EOAUTH_STATUS_UNAUTHORIZED_CLIENT oauth_response_e oauth_status

An enumeration containing the different possible states of an OAuth response. If no OAuth request has been made then oauth_status is set to NULL.

OAUTH_STATUS_OK

The username and password parameters match the ACUserID parameter.

change_pin_by_user_id_result_e should be set to CHANGE_PIN_BY_USER_ID_OK.

EOAUTH_STATUS_INVALID_GRANT

The username and password parameters do not match.

change_pin_by_user_id_result_e should be set to ECHANGE_PIN_BY_USER_ID_INVALID_CREDENTIALS.

EOAUTH_STATUS_INVALID_CLIENT

The client_id passed to the OAuth server is invalid and the server has responded with a HTTP 400 error code with the message invalid_client.

change_pin_by_user_id_result_e should be set to ECHANGE_PIN_BY_USER_ID_INTERNAL_ERROR.

EOAUTH_STATUS_TOO_MANY_TRIES

The Authentication Server has responded with a HTTP 400 error code with the message too_many_tries.

change_pin_by_user_id_result_e should be set to ECHANGE_PIN_BY_USER_ID_RESPONSE_ERROR.

EOAUTH_STATUS_SERVER_ERROR

There is a problem with the Authentication Server. This can occur in the following conditions:

Server has responded with a HTTP 500 or unrecognized error code

Server has returned the "server_error" in the JSON response

Server has returned invalid JSON

No data has been returned from the server change_pin_by_user_id_result_e should be set to ECHANGE_PIN_BY_USER_ID_RESPONSE_ERROR.

EOAUTH_STATUS_INVALID_REQUEST

The generated request is missing a required parameter and the server has returned a invalid_request error in the JSON object.

change_pin_by_user_id_result_e should be set to ECHANGE_PIN_BY_USER_ID_INTERNAL_ERROR.

EOAUTH_STATUS_WRONG_USER

The ACUserID HTTP parameter does not match the provided username and password.

change_pin_by_user_id_result_e should be set to ECHANGE_PIN_BY_USER_ID_INVALID_CREDENTIALS.

EOAUTH_STATUS_UNAUTHORIZED_CLIENT

The client is not allowed to use the "Resource Owner Password Credentials Grant" mechanism of authentication. No other forms of authentication are supported by the client, so this is an internal error.

change_pin_by_user_id_result_e should be set to ECHANGE_PIN_BY_USER_ID_INTERNAL_ERROR.

EOAUTH_STATUS_UNSUPPORTED_GRANT_TYPE

The server does not support "Resource Owner Password Credentials Grant" mechanism of authentication.

change_pin_by_user_id_result_e should be set to ECHANGE_PIN_BY_USER_ID_RESPONSE_ERROR.

EOAUTH_STATUS_INVALID_SCOPE

The requested OAuth scope is invalid, unknown, malformed or exceeds the scope generated by the resource owner.

change_pin_by_user_id_result_e should be set to ECHANGE_PIN_BY_USER_ID_RESPONSE_ERROR.

6.5.3. renew_access_token: Request a New Access Token from the Authentication Server As per authenticate_user, renew_access_token makes a request to the off-board Authentication Server.

The OAuth request uses includes the HTTP parameter ACUserID which is populated by the user_id of the active user in the zone identified by zone_id. This method expects this value to be the same as the user_id in the result of authenticate_user.

On success, this function should update the secure_token for the user in the User Table.

6.5.3.1. Parameters username—the off-board username for the user, probably an email address password—the off-board password for the user in plain text zone_id—the zone identifier from which SSO token renewal request was received. The user with state USER_ZONE_STATE_ACTIVE; this will be used by the client to query the user_id of the active user in that zone 6.5.3.2. Returns renew_access_token_response_t A structure containing the result of the operation and an updated user identifier user_id—the user_id for which new SSO token was stored or NULL in case of an error renew_access_token_response_e status—a status code indicating success/failure RENEW_ACCESS_TOKEN_OK—Operation successful. The secure_token field for the user should be updated.

ERENEW_ACCESS_TOKEN_RESPONSE_ERROR

The Authentication Server has responded with a HTTP 400 error code and the message "server_error". Or the Authentication Server has responded with invalid JSON.

The oauth_response_e should be set to either:

OAUTH_STATUS_SERVER_ERROR

OAUTH_STATUS_TOO_MANY_TRIES

OAUTH_STATUS_UNSUPPORTED_GRANT__TYPE

OAUTH_STATUS_INVALID_SCOPE

ERENEW_ACCESS_TOKEN_INVALID_CREDENTIALS the user_id parameter does not match user_id associated to provided credentials with the Authentication Server the user_id returned by the off-board service does not match the zone user_id. oauth_response_e should be set to OAUTH_STATUS_WRONG_USER the username and password parameters do not match those recorded on the Authentication Server. oauth_response_e should be set to OAUTH_STATUS_INVALID_GRANT

ERENEW_ACCESS_TOKEN_INVALID_USER

There are multiple users for the zone_id in the User Zone State Table which have the state USER_ZONE_STATE_ACTIVE.

ERENEW_ACCESS_TOKEN_INVALID_PARAMETER

No Zone matches the zone_id parameter zone_id parameter is NULL or empty username parameter is NULL or empty password parameter is NULL or empty

ERENEW_ACCESS_TOKEN_INTERNAL_ERROR

Set when the OAuth response is either:

OAUTH_STATUS_INVALID_CLIENT

OAUTH_STATUS_INVALID_REQUEST

OAUTH_STATUS_UNAUTHORIZED_CLIENT

This will also be set if there are any database or memory allocation errors.

oauth_response_e oauth_status

An enumeration containing the different possible states of an OAuth response. If no OAuth request has been made then oauth_status is set to NULL.

OAUTH_STATUS_OK

The username and password parameters match the ACUserID parameter.

EOAUTH_STATUS_INVALID_GRANT

The username and password parameters do not match.

renew_access_token_response_e should be set to ERENEW_ACCESS_TOKEN_WRONG_USER.

EOAUTH_STATUS_INVALID_CLIENT

The client_id passed to the OAuth server is invalid and the server has responded with a HTTP 400 error code with the message invalid_client.

renew_access_token_response_e should be set to ERENEW_ACCESS_TOKEN_INTERNAL_ERROR.

EOAUTH_STATUS_TOO_MANY_TRIES

The Authentication Server has responded with a HTTP 400 error code with the message too_many_tries.

renew_access_token_response_e should be set to ERENEW_ACCESS_TOKEN_RESPONSE_ERROR.

EOAUTH_STATUS_SERVER_ERROR

There is a problem with the Authentication Server. This can occur in the following conditions:

Server has responded with a HTTP 500 or unrecognized error code

Server has returned the "server_error" in the JSON response

Server has returned invalid JSON

No data has been returned from the server renew_access_token_response_e should be set to ERENEW_ACCESS_TOKEN_RESPONSE_ERROR.

EOAUTH_STATUS_INVALID_REQUEST

The generated request is missing a required parameter and the server has returned a invalid_request error in the JSON object.

renew_access_token_response_e should be set to ERENEW_ACCESS_TOKEN_INTERNAL_ERROR.

EOAUTH_STATUS_WRONG_USER

The provided ACUserID HTTP parameter does not match the username and password.

renew_access_token_response_e should be set to ERENEW_ACCESS_TOKEN_INVALID_CREDENTIALS

EOAUTH_STATUS_UNAUTHORIZED_CLIENT

The client is not allowed to use the "Resource Owner Password Credentials Grant" mechanism of authentication. No other forms of authentication are supported by the client, so this is an internal error.

renew_access_token_response_e should be set to ERENEW_ACCESS_TOKEN_INTERNAL_ERROR.

EOAUTH_STATUS_UNSUPPORTED_GRANT_TYPE

The server does not support "Resource Owner Password Credentials Grant" mechanism of authentication.

renew_access_token_response_e should be set to ERENEW_ACCESS_TOKEN_RESPONSE_ERROR.

EOAUTH_STATUS_INVALID_SCOPE

The requested OAuth scope is invalid, unknown, malformed or exceeds the scope generated by the resource owner.

renew_access_token_response_e should be set to ERENEW_ACCESS_TOKEN_RESPONSE_ERROR.

6.5.3.3. Examples 6.5.3.3. Example Data—Shown in FIGS. 53 and 54

Configuration

[user_auth]
client_id=MyClientId
auth_dev_id=MyDeviceId
auth_secret=MySecretToken 6.5.3.3.2. Username and Password Match Active User in Zone In this example the Authentication Server confirms that the username and password belong to the user who is active in zone 1.

```
renew__access__token("joe.bloggs@example.com", "valid__password",
1) = {
user__id: "joe.bloggs@example.com",
err: RENEW__ACCESS__TOKEN__OK,
oauth__err: OAUTH__STATUS__OK
}
```

HTTP Request
POST /authorization-server/token HTTP/1.1
Host: localhost
Accept: */*
Content-Length: 121
Content-Type: application/x-www-form-urlencoded
ACUserId=joe.bloggs&username=joe.bloggs@example.com&client_secret=MySecretToken&grant_type=password&device_id=MyDeviceId&client_id=MyClientId&password=valid_password HTTP Response

```
HTTP/1.1 200 OK
Date: Thu, 16 Jan 2014 16:09:17 GMT
Content-Type: application/json;charset=UTF-8
{
"access__token":"76ef1a0f1b63f0445d09315236cd7f97",
"expires__in":3600,
"user__id":joe.bloggs
}
```

User Table—Shown in FIG. 55

Upon receipt of the HTTP response, the secure_token field of the User Table will be updated.

6.5.3.3.3. Incorrect Username and Password for Active User in Zone

In this example the Authentication Server indicates that the active user in zone 2, "mary.bloggs", is not identified by using the username "joe.blogg@example.com".

```
renew\__access\__token("joe.bloggs@example.com", "valid\__password",
2) = {
user__id: "joe.bloggs@example.com",
err: ERENEW__ACCESS__TOKEN__WRONG__USER,
oauth__err: NULL
}
```

oauth_err is set to NULL because no OAuth request has been made.

HTTP Request
POST /authorization-server/token HTTP/1.1
Host: localhost
Accept: */*
Content-Length: 121
Content-Type: application/x-www-form-urlencoded
ACUserId=mary.bloggs&username=joe.bloggs@example.com&client_secret=MySecretToken&grant_type=password&device_id=MyDeviceId&client_id=MyClientId&password=valid_password HTTP Response

```
HTTP/1.1 400
Date: Thu, 16 Jan 2014 16:09:17 GMT
Content-Type: application/json;charset=UTF-8
{
"error": "wrong__user"
}
```

6.5.3.3.4. Invalid Password for Active User in Zone

In this example the username matches the user_id for the given zone, but the password parameter is incorrect.

```
renew__access__token("joe.bloggs@example.com", "invalid__password",
1) = {
user__id: "joe.bloggs@example.com",
err: ERENEW__ACCESS__TOKEN__INVALID__CREDENTIALS,
oauth__err: OAUTH__STATUS__INVALID__GRANT
}
```

HTTP Request
POST /authorization-server/token HTTP/1.1
Host: localhost

Accept: */*
Content-Length: 121
Content-Type: application/x-www-form-urlencoded
ACUserId=joe.bloggs&username=joe.bloggs@example.com&client_secret=MySecretToken&grant_type=password&device_id=MyDeviceId&client_id=MyClientId&password=invalid_password
HTTP Response

```
HTTP/1.1 400
Date: Thu, 16 Jan 2014 16:09:17 GMT
Content-Type: application/json;charset=UTF-8
{
"error": "invalid_grant"
}
```

6.5.4. set_user_presence: Set the User Presence on the Off-board Server

The set_user_presence API makes a request to the JLR Service Gateway with a notification token indicating that a user has authenticated on the device, and is able to receive notifications.

See External Interfaces fr1.2.2.18 Section 5.1.3: HTTP POST/rest/presence/user/register 6.5.4.1. Parameters device_id—the Identity of the Device—if NULL then the Configuration Option device_identity is Used user_id the user identity of the user whose presence needs to be updated channel_id—the notification "Channel ID". This is the "Remote Token" of the Notification Client.

presence—a boolean indicator of presence 6.5.4.2. Returns ic_error_code—a status code indicating if the operation was successful or not
- EBAD_PARAMETER
  - user_id parameter was NULL or empty
  - channel_id parameter was NULL or empty
  - The configuration option service_gateway_url is missing
  - device_id parameter is empty
- EINTERNAL_ERROR
  - Unable to allocate enough memory
  - Unable to create the JSON request
- ERESPONSE_ERROR—invalid response from JLR Service Gateway
- EOK—Operation was successful 6.6. User API 6.6.1. create_alias: Create an Alias for a User Used for Local Authentication 6.6.1.1. Parameters user_id—the unique identity for the user alias—the alias for the user pin—the pin for the user 6.6.1.2. Returns create_alias_result_e An enumeration value indicating the outcome of the operation
- EALIAS_INVALID—Either the alias or pin parameter is NULL or empty
- EALIAS_USER_NOT_FOUND—the user_id parameter does not match a user_id in the User Table
- EALIAS_EXISTS—the alias already belongs to an existing user
- EALIAS_INVALID—the alias is invalid
- ALIAS_OK—the alias was created successfully 6.6.2. get_secure_token: Retrieve the Secure Access Token for a User The secure access token is used to authenticate a user with the off-board server. It is stored in the secure_token field of the User Table.

6.6.2.1. Parameters user_id—the user identity which matches a user_id in the User Table.

6.6.2.2. Returns char *—the secure token which corresponds to the secure_token field in the User Table for the specified user NULL if no user found 6.6.3. get_user_profile: Return the User Profile for a User (FR1.2.4)

6.6.3.1. Parameters user_identity—the user identity which matches a user_id in the User Table.

result_buffer

A zero initialized buffer that will be updated with profile data from the User Table. Supplied by the calling function. Size should be set to hold 1024 ascii values or greater.

6.6.3.2. Returns ic_error_code—Enumeration value indicating the outcome of the operation
- EBAD_PARAMETER
  - user_identity parameter is NULL or empty
  - result_buffer is NULL
- EVALUE_NOT_FOUND—No user exists in the User Table with the matching user_identity
- EDATABASE_ERROR—Unable to obtain a database handle
- EOK—Operation successful 6.6.4. get_user_profile: Return the User Profile for a User (FR1.2.5)

Return the User Profile for a given User. This will return the contents of the profile field in the User Table.

6.6.4.1. Parameters user_id—the user identity which matches a user_id in the User Table.

profile

A pointer to a character buffer. The character buffer will be allocated memory by the get_user_profile method. The user of this API is responsible for de-allocating the memory associated to this pointer.

When the get_user_profile method returns the profile character buffer will contain the contents of the profile column of the User Table with the matching user_id.

6.6.4.2. Returns get_user_profile_result_e

Enumeration value indicating the outcome of the operation
- EGET_USER_PROFILE_INVALID_USER_ID—the user_id parameter is NULL or invalid
- EGET_USER_PROFILE_INVALID_PROFILE—the profile parameter is NULL or invalid
- EGET_USER_PROFILE_USER_NOT_FOUND—No user exists in the User Table with the matching user_id
- EGET_USER_PROFILE_INTERNAL_ERROR—An internal error has occurred.
- GET_USER_PROFILE_OK—Operation was successful 6.6.5. set_remember_me: Set the "Remember Me" Flag for a User in a Given Zone Updates the remember_me column for a matching User and Zone.

6.6.5.1. Parameters zone id—The Zone ID to use user_id—The User ID to use flag—The value of the "Remember Me" flag to set 6.6.6. get_remember_me: Return the "Remember Me" Flag for a User in a Given Zone 6.6.6.1. Returns An integer representing the "Remember Me" flag 6.6.7. change_pin: Modify the PIN Number for a Given Alias Allows the application to change the PIN number for a specified alias. If the user does not currently have a PIN number then the old_pin should be set to NULL.

6.6.7.1. Parameters alias—The alias of a user which corresponds to alias in the User Table old_pin—the current PIN number associated with the user which corresponds to pin in the User Table new_pin—the new PIN number for the user which corresponds to pin in the User Table 6.6.7.2. Returns set_pin_result_e Enumeration value indicating the outcome of the operation SET_PIN_OK—if PIN was changed successfully.

ESET_PIN_INVALID_ALIAS—if parameter alias is invalid.

ESET_PIN_INVALID_PIN—if either oldpin or newpin is invalid.

ESET_PIN_INVALID_ALIAS—if alias does not exist.

ESET_PIN_INVALID_PIN—if unable to set pin for given alias.

6.6.8. set_pin: Set the PIN Number for a Given Alias

If an error occurs, the enum will be a negative value. This allows a simple if(set_pin( . . . )) { } check.

6.6.8.1. Parameters user_id—the identity of the user which corresponds to the "id" column in the User Table alias—the alias of a user which corresponds to alias in the User Table new_pin—the new PIN number for the user which corresponds to pin in the User Table 6.6.8.2. Returns set_pin_result_e Enumeration value indicating the outcome of the operation ESET_PIN_INVALID_ALIAS—the alias of the user with user_id does not match the alias parameter, or if the alias does not exist ESET_PIN_INVALID_PIN—the PIN provided does not meet the PIN constraints——which are MAX_PIN_LENGTH and non-blank ESET_PIN_INVALID_PARAMS—the provide parameters are invalid, or the user_id does not exist SET_PIN_CHANGED—the PIN was updated successfully 6.6.9. get_user_id_for_alias: Returns a User Id for a Given Alias 6.6.9.1. Parameters alias—the user alias which corresponds to alias field in the User Table 6.6.9.2. Returns char *—Either:

the user_id which corresponds to the user_id field in User Table

NULL on error alias is empty or NULL alias does not match an entry in the User Table 6.6.10. get_alias_for_user_id: Return an Alias Matching a Specified User Id 6.6.10.1. Parameters user_id—the user identifier which corresponds to user_id field in the User Table 6.6.10.2. Returns char *—Either:

the alias identifier which corresponds to the alias field in User Table

NULL on error user_id is empty or NULL user_id does not match an entry in the User Table 6.6.11. add_user: Add the given User ID to the database.

6.6.11.1. Parameters user_identity—the unique user identity of the User 6.6.11.2. Returns ic_error_code—a status code indicating the success or failure of the operation EOK—operation successful

EBAD_PARAMETER user_identity parameter is NULL or empty

EALREADY_EXISTS a user already exists with a user_id matching the user_identity parameter. See User Table.

EDATABASE_ERROR

Invalid database handler

Invalid SQL executed

EINTERNAL_ERROR

Unable to allocated memory 6.6.12. delete_user: Delete a User from the Database 6.6.12.1. Parameters user_id—the user identifier which corresponds to user_id field in the User Table 6.6.12.2. Returns ic_error_code—Enumeration value indicating the outcome of the operation EBAD_PARAMETER—user_id parameter is NULL or empty EOK—Operation was successful

ENOT_FOUND

No user found with given user_id

Unable to find a FUMO node for the User. In this case, the user is still deleted from the database EDATABASE_ERROR—Unable to obtain a database handle EINTERNAL_ERROR—Invalid SQL statement generated 6.6.13. delete_all_users: Delete All Users from the Database and the OMA-DM Tree Deletes all user information from the local SQLite database. All data in the User Table, Zone Table and User Zone State table will be removed.

Deletes all User Profile FUMO nodes in the OMA-DM tree. The nodes will be deleted without any communication with the server, so the REMOTE_REMOVE state will not be used.

This method will be invoked on start-up if the configuration option user-is set.

6.6.13.1. Parameters

None 6.6.13.2. Returns delete_all_users_result_e—Enumeration value indicating the outcome of the operation EOK—Operation was successful

EINTERNAL_ERROR

Unable to obtain a database handle

Invalid SQL statement generated

Unable to allocate memory 6.6.14. delete_user_by_alias

Deletes a user with the matching alias from the User Table. Marks the corresponding FUMO node in the OMA-DM tree with the REMOTE REMOVE state.

6.6.14.1. Parameters alias—the user alias which corresponds to alias field in the User Table 6.6.14.2. Returns ic_error_code—Enumeration value indicating the outcome of the operation EBAD_PARAMETER—alias parameter is NULL or empty EOK—Operation was successful

ENOT_FOUND

No user found with given alias

Unable to find a FUMO node for the User. In this case, the user is still deleted from the database EDATABASE_ERROR—Unable to obtain a database handle EINTERNAL_ERROR—Invalid SQL statement generated 6.6.15. authenticate_alias: Authenticate Alias Based on a PIN Authenticate a user against the alias and pin fields in the User Table.

If provided pin and alias parameters match an entry in the User Table then reset the number of failed authentication attempts. If the parameters do not match then increment the number of failed authentication attempts. The number of failed authentication attempts is held in the failed count field of the User Table.

6.6.15.1. Parameters alias—the user alias which corresponds to alias field in the User Table pin—a pin which corresponds to the field in the User Table 6.6.15.2. Returns ic_error_code—Enumeration value indicating the outcome of the operation EOK—Operation was successful

EBADPARAMETER

NULL or empty alias

NULL or empty pin

EVALUE_NOT_FOUND

Unable to find User matching alias parameter

EINTERNAL_ERROR

Unable to perform SQL query 6.6.16. create_alias: Create an Alias Used for Local Authentication 6.6.16.1. Parameters user_id—the user identifier which corresponds to user_id field in the User Table alias—the user alias which corresponds to alias field in the User Table pin—a pin which corresponds to the field in the User Table 6.6.16.2. TODO Returns Enumeration value indicating the outcome of the operation 6.6.17. change_alias: Change the Alias for a Given User 6.6.17.1. Parameters user_id—the user identifier which corresponds to user_id field in the User Table new alias—the new alias for the user 6.6.17.2. Returns change_alias_result_e An enumeration value indicating the success or failure of the operation CHANGE_ALIAS_OK—Alias was changed successfully CHANGE_ALIAS_USER_INACTIVE—The user for this user is currently inactive CHANGE_ALIAS_EXISTS—This alias cannot be used because it is already in-use CHANGE_ALIAS_INVALID—The alias provided is invalid 6.7. Zone API 6.7.1. create_zone: Create a New Zone in the Database 6.7.1.1. Parameters zone_id The application zone id which corresponds to the zone_id field in Zone Table type The type of the zone; either 6.7.1.2. Returns create_zone_result_t a structure containing a status code and the zone_id of the created zone err—an error code indicating if the operation was successful or not zone_id—the zone identifier which corresponds to the zone_id field in the Zone Table an indicator of success along with any id—the zone identifier which corresponds to the id field in the Zone Table 6.7.2. list_internal_zones: List Internal Zones from the Database 6.7.2.1. Parameters None 6.7.2.2. Returns a list of zones which have the type of ZONE_TYPE_INTERNAL 6.7.3. list_virtual_zones: List Virtual Zones from the Database 6.7.3.1. Parameters None 6.7.3.2. Returns a list of zones which have the type of ZONE_TYPE_VIRTUAL 6.7.4. list_suspended_users: List Suspended Users for a Given Zone 6.7.4.1. Parameters zone_id—Modifies the result set so that only suspended users in the zone matching zone_id are returned. See Zone Table.

6.7.4.2. Returns list_user_zone_state_result_t a structure containing a status code and a list of users err—Enumeration value indicating the outcome of the operation EOK—Operation was successful EDATABASE_ERROR—Unable to obtain a database handle EINTERNAL_ERROR—Unable to execute SQL query users A list of users which have the state of USER_ZONE_STATE_SUSPENDED or NULL if none were found This is an un-ordered list.

Each item in the list includes:

user_id—a user identifier which matches the user_id in the User Table alias—the alias for the user which matches the alias column in the User Table or NULL if no alias exists for the user_id state—the state for the user that corresponds to the state column in the User Zone State Table and the zone_id parameter.

remember_me—the "Remember Me" flag for the given user that corresponds to the remember_me column in the User Zone State table and the zone_id.

timestamp—timestamp for the last known authentication attempt of that user 6.7.5. get_active_user: Find the Active User in a Given Zone Returns the user_id of an active user in a given zone, in case of an error it returns NULL.

6.7.5.1. Parameters zone_id—a zone identifier which matches the zone_id column in the Zone Table.

6.7.5.2. Returns char *—Either:

the user_id of the active user

NULL on error zone_id is empty or NULL zone_id does not match an entry in the Zone Table 6.7.6. set_user_state: Set the Current State of a User in a Given Zone 6.7.6.1. Parameters zone_id—a zone identifier which matches the zone_id column in the Zone Table.

user_id—a user identifier which matches the user_id column in the User Table.

state—the current state of a user in a given zone. Either:

USER_ZONE_STATE_ACTIVE—Indicates that the user is actively using the zone

USER_ZONE_STATE_SUSPENDED—Specified by Connected Infotainment

USER_ZONE_STATE_OFF—Indicates that the user is not authenticated to the specified zone (default)

USER_ZONE_STATE_EXPIRED—Indicates that the user has been suspended due to inactivity, and may require local authentication 6.7.6.2. Returns ic_error_code—a status code indicating if the operation was successful or not

EBAD_PARAMETER user_id is NULL or empty zone_id is NULL or empty

EVALUE_NOT_FOUND

No zone matches zone_id

No user matches user_id

EDATABASE_ERROR

Invalid database handler

Invalid SQL executed

EINTERNAL_ERROR

Unable to allocate memory

EALREADY_EXISTS

Only one user with state USER_ZONE_STATE_ACTIVE is allowed per zone\return an error code indicating success or failure 6.7.7. get_user_state: Set the Current State of a User in a Given Zone 6.7.7.1. Parameters zone_id—a zone identifier which matches the zone_id column in the Zone Table.

user_id—a user identifier which matches the user_id column in the User Table.

6.7.7.2. Returns user_state_result_t a structure containing a status code and the state of a user in a given zone err

EVALUE_NOT_FOUND

No zone matches zone_id

No user matches user_id

EBAD_PARAMETER user_id is NULL or empty zone_id is NULL or empty

EOK—operation was successful state—the current state of the user in the zone

USER_ZONE_STATE_ACTIVE—Indicates that the user is actively using the zone

USER_ZONE_STATE_SUSPENDED—Specified by Connected Infotainment

USER_ZONE_STATE_OFF—Indicates that the user is not authenticated to the specified zone (default)

USER_ZONE_STATE_EXPIRED—Indicates that the user has been suspended due to inactivity, and may require local authentication 6.7.8. list_aliases_for_zone: List the Aliases which have Been Created on the System Return a list of all users which have been created on the system and the state which they are in for a given zone and the remember_me flag.

6.7.8.1. Parameters zone_id—Modifies the result set so that user information is given according to the zone matching zone_id are returned. See Zone Table.

6.7.8.2. Returns list_aliases_result_t a structure containing a status code and a list of aliases which are associated with that zone err—a status code indicating if the operation was successful or not EOK—the operation was successful EBAD_PARAMETER not implemented zone_id parameter was NULL or empty No Zone matched the zone_id users A list of users in User Table. The user list shall list the users that have ever been logged into that zone first (i.e. that have an entry in the User Zone State table for that zone), sorted by timestamp for the given zone. The rest of the users shall be sorted by the latest timestamp for any zone.

Each item in the lists includes:

user_id—a user identifier which matches the user_id in the User Table alias—the alias for the user which matches the alias column in the User Table or NULL if no alias exists for the user_id state—the state for the user that corresponds to the state column in the User Zone State Table and the zone_id parameter. If there is no user information for that zone, the state is set to USER_ZONE_STATE_OFF remember_me—the "Remember Me" flag for the given user that corresponds to the remember_me column in the User Zone State table and the zone_id. If there is no user information for that zone, remember_me should be FALSE.

timestamp—timestamp for the last known authentication attempt of that user. If there is no user information for that zone then it should be the latest timestamp for that user.

6.7.8.3. Example—Shown in FIGS. 56 and 57

6.7.8.3.1. list_aliases_for_zone(zone1)

{
err: EOK
users: [
{
user__id: joe.bloggs
alias: Joe
state: USER__ZONE__STATE__ACTIVE
timestamp: 2013-03-19 08:00
remember__me: FALSE
},{
user__id: mary.bloggs
alias: Mary
state: USER__ZONE__STATE__OFF
timestamp: 2013-03-19 07:00
remember__me: FALSE
},{
user__id: paul.potts
alias: Paul
state: USER__ZONE__STATE__OFF
timestamp: 2013-03-19 09:00
remember__me: TRUE
},{
user__id: henry.eighth
alias: Henry
state: USER__ZONE__STATE__OFF
timestamp: 2013-03-19 10:00
remember__me: TRUE
}
]
}

6.7.8.3.2. list_aliases_for_zone(zone2)

{
err: EOK
users: [
{
user__id: mary.bloggs
alias: Mary
state: USER__ZONE__STATE__ACTIVE
timestamp: 2013-03-19 11:00
remember__me: TRUE
},{
user__id: joe.bloggs
alias: Joe
state: USER__ZONE__STATE__OFF
timestamp: 2013-03-19 09:00
remember__me: TRUE
},{
user__id: henry.eighth
alias: Henry
state: USER__ZONE__STATE__OFF
timestamp: 2013-03-19 10:00
remember__me: TRUE
},{
user__id: paul.potts
alias: Paul
state: USER__ZONE__STATE__OFF
timestamp: 2013-03-19 09:00
remember__me: TRUE
}
]
}

6.7.8.3.3. list_aliases_for_zone(zone3)

{
err: EOK
users: [
{

-continued user__id: henry.eighth
alias: Henry
state: USER__ZONE__STATE__ACTIVE
timestamp: 2013-03-19 10:00
remember__me: TRUE
},{
user__id: paul.potts
alias: Paul
state: USER__ZONE__STATE__OFF
timestamp: 2013-03-19 09:00
remember__me: TRUE
},{
user__id: mary.bloggs
alias: Mary
// Mary is not in zone 3 - so set to off
state: USER__ZONE__STATE__OFF
// The latest for any zone - so zone 2
timestamp: 2013-03-19 11:00
remember__me: TRUE
},{
user__id: joe.bloggs
alias: Joe
// Joe is not in zone 3 - so set to off
state: USER__ZONE__STATE__OFF
// The latest for any zone - so zone2
timestamp: 2013-03-19 09:00
remember__me: TRUE
}]
}

6.7.8.3.4. list_aliases_for_zone(zone4)

{
err: EBAD__PARAMETER
users: NULL
}

Figure 58:
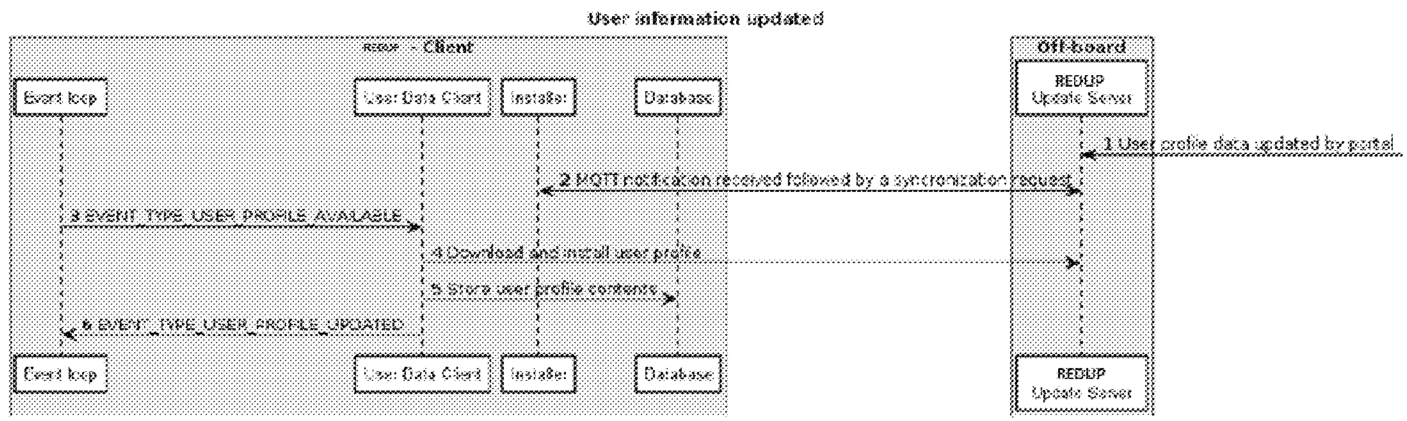

6.8. Sequence Diagrams 6.8.1. SEQ020—User Information is Updated—Shown in FIG. 58

This sequence diagram displays the intended flow for when a user profile is updated by a remote server and the applications that are using the profile are informed.

Step Description

2 A notification is sent by the Update Server to the REDUP client indicating that an update is available for the device. This results in a synchronization request, that will collate any user profile updates.

3 The User data client listens to the event EVENT_TYPE_USER_PROFILE_AVAILABLE which is thrown when a synchronization has completed that contains user profile updates

4 The daemon downloads all the changed FUMO nodes and detects any new User Profiles. The User Profiles are then downloaded and placed in to the REDUP database

Figure 59:
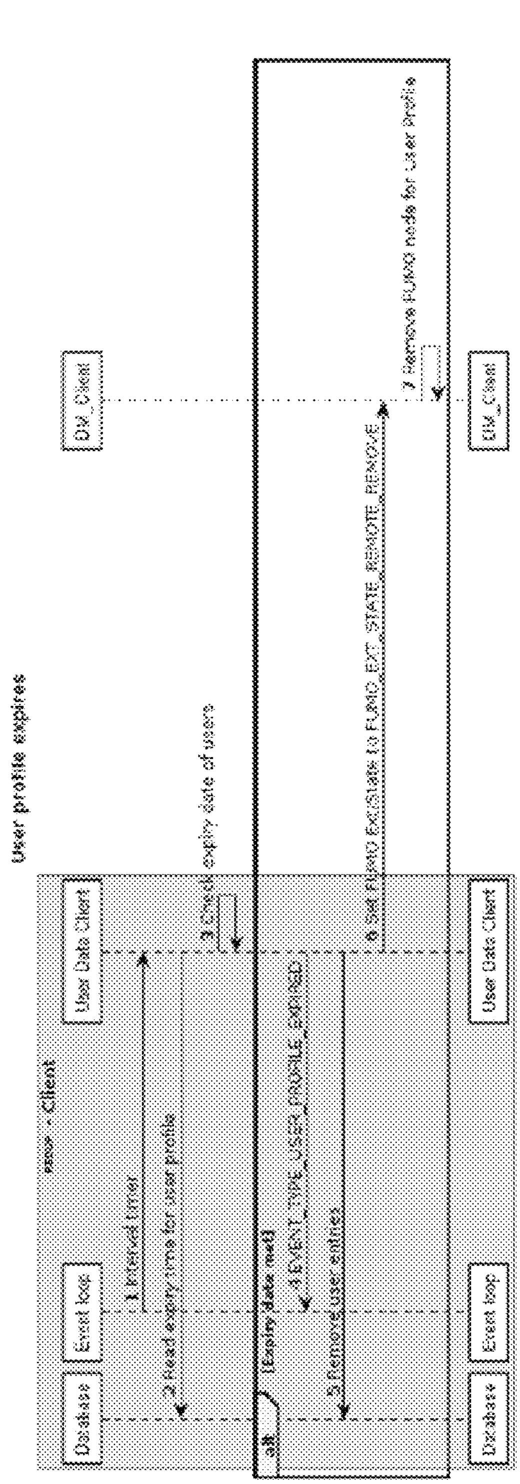

6 The EVENT_TYPE_USER_PROFILE_UPDATED event is called which includes the user identity of the profile that has changed 6.8.2. SEQ021—User Profile Expires—Shown in FIG. 59

This diagram describes how the client monitors the expiry time of a user profile, and if the expiry time is reached, then it is removed from the system.

Step Description

2 The expiry time for the user profile is read from the database. It was previously populated by the installation of the user profile.

3 The User Data Client checks the expiry of the user profile against the system clock

4 The EVENT_TYPE_USER_PROFILE_EXPIRED event is issued. It is intended that any application using the user information will cease to use it on receipt of this event, and that if the user is logged in to the device, then they will be automatically logged out.

5 The user information is removed from the database

6 The FUMO node associated with the User Profile is marked for removal.

7 On the next synchronization event the node will be removed by the server.

Figure 60:
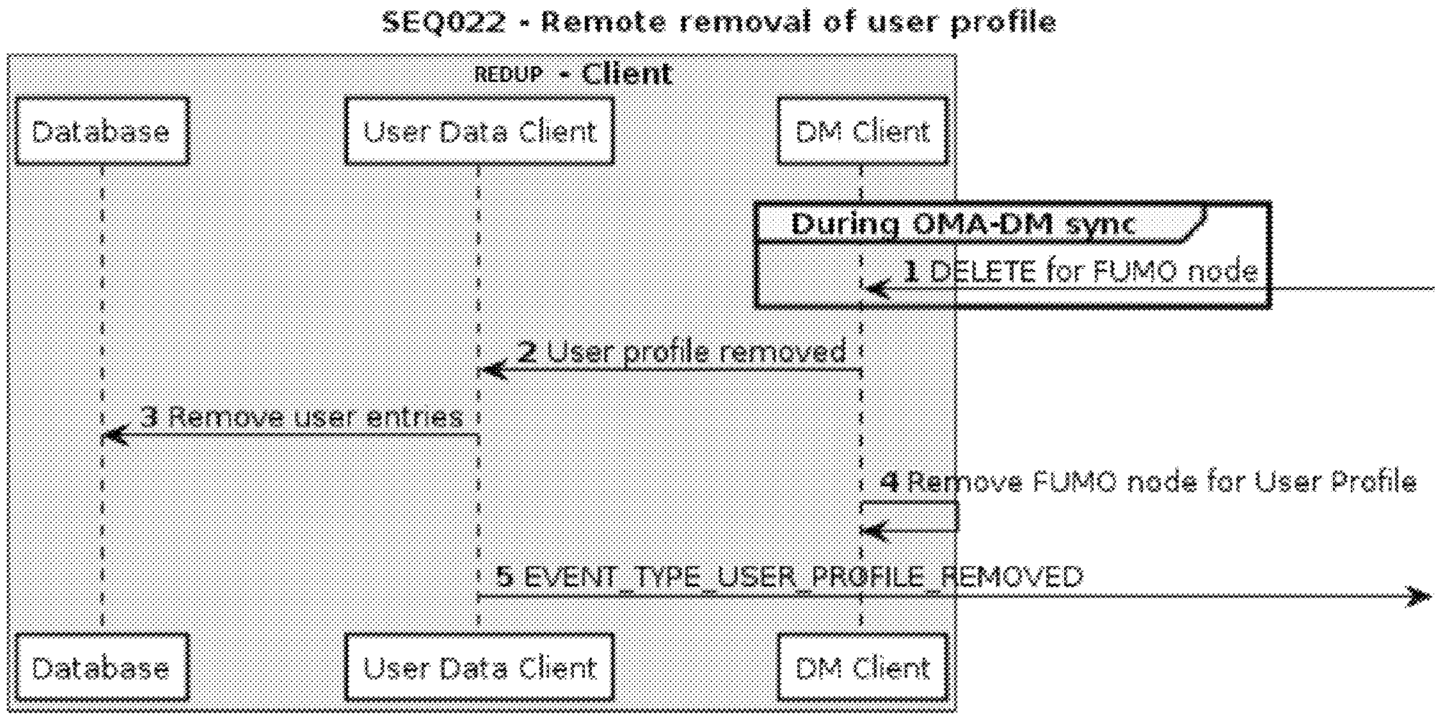

6.8.3. SEQ022—Remote Removal of User Profile—Shown in FIG. 60

The update server can send an OMA-DM command that removes the User Profile from the device. On receipt of this command, the users data will be removed.

Step Description

1 During an OMA-DM sync a DELETE command is received for a FUMO node in the ./Vendor/Website/Profiles subtree

2 The User Profile data is removed from the database

4 The local FUMO node representing the user is removed, as a result of the OMA-command

5 The EVENT_TYPE_USER_PROFILE_REMOVED event is issued. It is intended that any application using the user information will cease to use it on receipt of this event, and that if the user is logged in to the device, then they will be automatically logged out.

Figure 61:
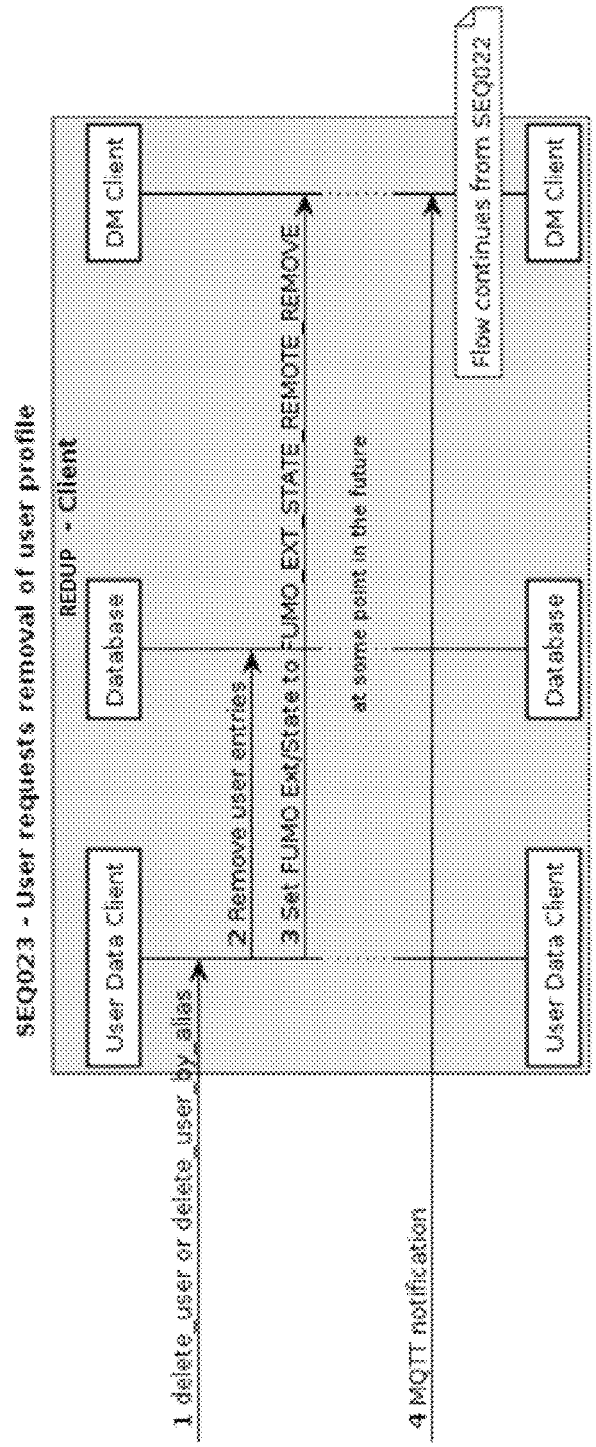

6.8.3. SEQ023—User Requests Removal of User Profile—Shown in FIG. 61

The application may wish to manually remove the user data from the device. The delete_user method supports this.

Ensure that on the next synchronization request, that the server doesn't deliver the user profile back to the device Step Description

1 A Connected Infotainment component calls the User Data Client via the shared C library

2 The user information is removed from the database

3 The FUMO node associated with the User Profile is marked for removal.

4 At some point in the future a notification will be received that will prompt an OMA-DM sync. This is described in SEQ022.

Figure 62:
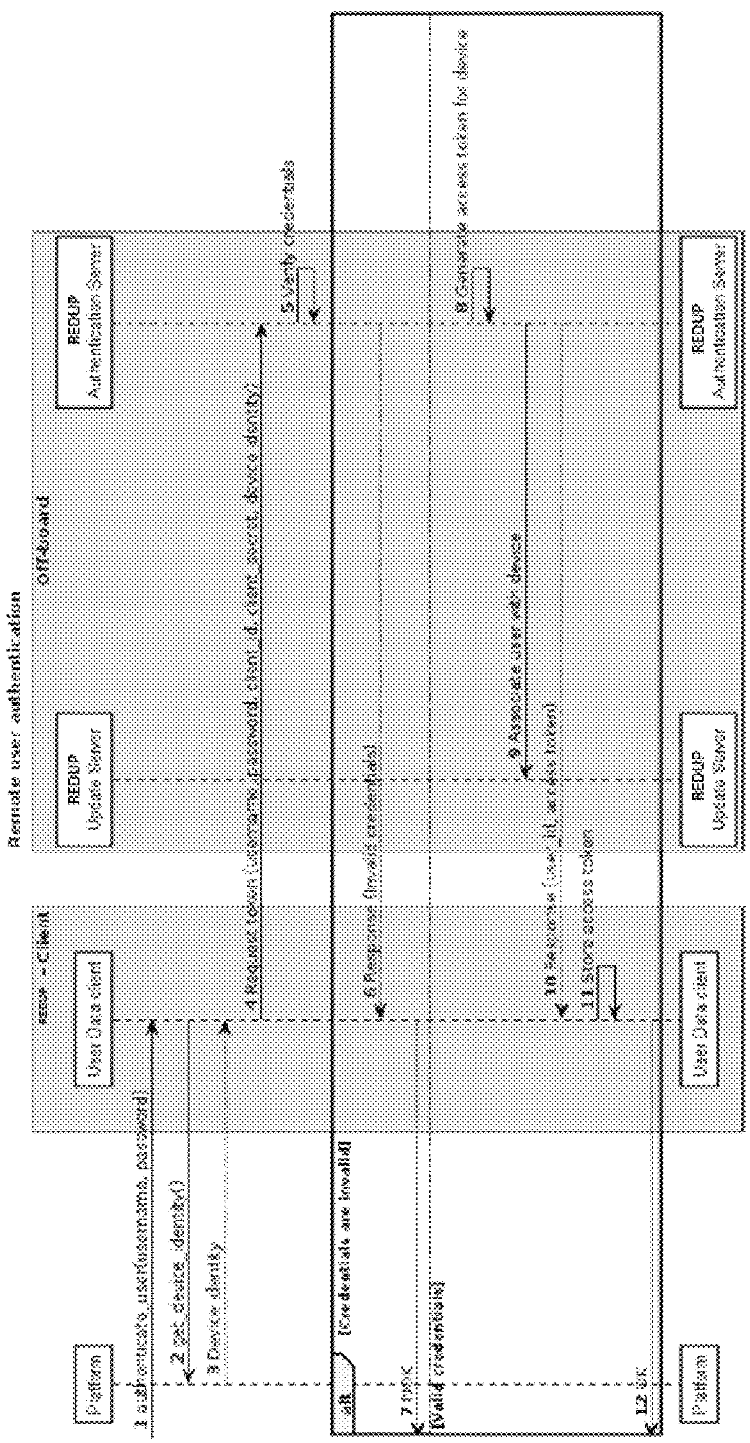

6.8.5. SEQ024—Remote User Authentication—Shown in FIG. 62

The authentication of a user takes place in two steps; retrieval of an access token, and, creation of a user alias The retrieval of an access token uses the OAuth Resource Owner Password Credentials flow.

The second part of remote user authentication is to create local authentication credentials 7. Configuration 7.1. Config API 7.1.1. set_device_identity: Modify the Device Identity The set_device_identity function modifies the device_identity configuration value.

7.1.1.1. Parameters device_identity—a string to be used as the device identity 7.1.2. set_imc_version: Modify the DevInfo/IMC Value The set_imc_version function sets the value in the OMA-DM tree which is used for identifying the version of the Connected Infotainment framework.

7.1.2.1. Parameters imc_ver—a string to be used as the IMC version 7.1.3. set_device_manufacturer: Set the Device Manufacturer The set_device_manufacturer function sets the value in the OMA-DM tree for the DevInfo/Man node.

This will override the configuration value omadm-device_man.

7.1.3.1. Parameters man—a string to be used as the Manufacturer identifier 7.1.4. set_device_model: Sets the Device Model The set_device_model function sets the value in the OMA-DM tree for the DevInfo/Mod node.

This will override the configuration value omadm-device_mod.

7.1.4.1. Parameters model—a string to be used as the Model identifier 7.1.5. set_device_language: Sets the Device Model The set_device_language function sets the value in the OMA-DM tree for the DevInfo/Lang node.

This will override the configuration value omadm-device_lang.

7.1.5.1. Parameters lang—a string to be used as the Language identifier 7.2. General 7.2.1. device_identity: The Identity of the Device The device_identity configuration parameter stores the pre-configured identity of the device.

device_identity is used by all modules of the REDUP client. It is not subject to any restrictions, however since it is used by the DevInfo/DevId OMA-DM tree node it should be a globally unique URN, but the client does not enforce this restriction.

7.2.2. server-use_ssl: Use SSL for All HTTP and MQTT Requests

If server-use_ssl is set to true, the client will use SSL for connections to the server.

```
[server]
use_ssl=true
```

7.2.3. server-ca_file: Filename of CA Certificate File

The server-ca_file specifies the name of a file which contains PEM encoded Certificate Authority certificates that have signed the server certificate.

Either server-ca_file or server-ca_path should be defined if server-use_ssl is set to true.

```
[server]
ca_file=myca.pem
```

7.2.4. server-ca_path: Folder Containing CA Certificate

The server-ca_path specifies a directory which will be searched for files containing a contains PEM encoded Certificate Authority certificates that have signed the server certificate.

Either server-ca_file or server-ca_path should be defined if server-use_ssl is set to true.

```
[server]
ca_path=/etc/ssl/
```

7.2.5. server-trust_unknown_certificates: Trust Certificates that have not Been Verified by the CA The server-trust_unknown_certificates will allow the SSL connections to skip the hostname verification against the common name in the server certificate.

This can be useful when testing initial server configurations but makes it possible for a malicious third party to impersonate your server through DNS spoofing, for example. Use this option in testing only. If you need to resort to using this option in a production environment, your setup is at fault and there is no point using encryption.

```
[server]
trust_unknown_certificates=0
```

7.2.6. server-client_cert_path: Path to Client Certificate

The server-client_cert_path allows the specification of a client SSL certificate for authentication. The value of this option should be a path to a file on the filesystem. It should be used in conjunction with serverclient_key_path.

Ignore this option if client certificates are not required.

This option only affects the MQTT interface.

[server]

client_cert_path=/opt/certificates/my_cert.pem 7.2.7. server-client_key_path: Path to the Client Private Key The server-client_key_path allows the specification of client private SSL key. The value of this option should be a path to a file on the fileystem. It should be used in conjunction with server-client_cert_path.

Ignore this option if client certificates are not required.

This option only affects the MQTT interface.

[server]

client_key_path=/opt/certificates/my_key.pem 7.2.8. mqtt-tls_version: Version of TLS Protocol for Use with MQTT Connection The mqtt-tls_version option defines the version of the TLS protocol to use for the client. The default value will be the highest version that is available for the version of openssl that the broker was compiled against. For openssl>=1.0.1 the valid values are tlsv1.2 tlsv1.1 and tlsv1. For openssl<1.0.1 the valid values are tlsv1.

This option only affects the MQTT interface.

[mqtt]

tls_version=

7.3. Notification 7.3.1. presence-register_device_wait_period: Number of Seconds to Wait Before Retrying a Device Registration Request

[presence]

register_device_wait_period=30

7.4. OMA-DM 7.4.1. omadm-device_man: Manufacturer of the Device Reported in OMADM Tree The omadm-device_man configuration value changes the value of the DevInfo/Man OMA-DM tree node.

[omadm]

device_man=MyManufacturer 7.4.2. omadm-device_model: Model of the Device Reported in the OMADM Tree The omadm-device_mod configuration value changes the value of the DevInfo/Mod OMA-DM tree node.

[omadm]

device_mod=MyModel 7.4.3. omadm-device_lang: Language of the Device Reported in the OMADM Tree The omadm-device_lang configuration value changes the value of the DevInfo/Lang OMA-DM tree node.

[omadm]

device_lang=eng 7.4.4. omadm-restart_downloads_in_progress_without_exec: Restart Downloads with DOWNLOAD_PROGRESSING Even Without an EXEC Command The mechanism whereby the server indicates to the client that a FUMO node should be installed is by sending an OMA-DM EXEC command Some servers may not send the EXEC command if the State is set to DOWNLOAD_PROGRESSING.

This omadm-restart_downloads_in_progress_without_exec option will treat any node which has the DOWNLOAD_PROGRESSING state after the sync has completed as having received the EXEC command too. Thus the installation for this FUMO node will be continued.

[omadm]

restart_downloads_in_progress_without_exec=1

7.5. RPM Installer 7.5.1. rpm_installer-verify_cmd: Command Used to Verify a Downloaded RPM File

[rpm_installer]

verify_cmd=rpm –K 7.5.2. rpm_installer-install_cmd: Command Used to Install and RPM File

[rpm_installer]

verify_cmd=rpm –i 7.5.3. rpm_installer-uninstall_cmd: Command Used to Uninstall an RPM File

[rpm_installer]

verify_cmd=rpm –E 7.6. User Data Client 7.6.1. user_auth-max_auth_users_allowed: Maximum Users Allowed The maximum number of users allowed to be authenticated to the device.

7.6.2. user-service_gateway_url: URL of the JLR Service Gateway

The user-service_gateway_url is the URL of the JLR Service Gateway.

7.6.3. user-auth_client_id: OAuth Client Identity

The user_auth-client_id configuration value changes the client_id parameter for all OAuth requests made by the User Data client.

[user_auth]

client_id=REDUP_Client 7.6.4. user-enable_remove_all: Remove All Users in the Database and OMA-DM Tree When set to 1 the user-enable_remove_all configuration option will invoke the delete_all_users method on start-up.

[user]

enable_remove_all=1

Alternative Embodiment 2

1. Introduction

In some alternative embodiments, REDUP M2M Cloud is a product designed to provide the capability to remotely manage and update connected devices in scenarios where an M2M gateway is used. The M2M gateway acts as a proxy to connected devices, providing local services. REDUP Cloud provides Enterprise services for multiple M2M gateways. The main services are remote software management and event data collection and analysis. There are two objectives. The first is to remove the need to handle devices on-site, which obfuscates the expense incurred through returning devices to service centers for maintenance and upgrade. The second is to provide an aggregation point for streams of data into a Big Data processing environment as a platform for predictive analytics.

The product's features may include: Cloud service to remotely manage, deliver and install software updates and configuration files; Secure distribution and installation of software updates to M2M gateway, Secure intelligent device software management and delivery to gateway for installation; Cloud to gateway notifications; Standards compliant OMA-DM/IETF software update client server protocol; Segmentation service to enable targeted software delivery to intelligent device groups; Rules Engine for software version checking; Network agnostic client-server communication; Efficient use of managed connection resource; Optional device client for telematic event reporting; Optional back-end big data solution. Reporting, predictive and diagnostic analytics platform; Workflow enabled platform.

The product may be compatible with REDUP M2M Gateway; REDUP Cloud Software Manager; REDUP Analytics; REDUP Update Client—Client to download and install updates and configuration files into the devices; REDUP Event Notification Client; REDUP Big Data reporting and Analytics.

The Value of REDUP M2M Cloud

Benefits for the OEM may include: Secure cloud storage and delivery of software updates and configuration to the M2M gateway and Intelligent Devices; Secure throughout: communications, authentication and integrity; Over the air updates delivery reduces the cost of management; Single enterprise environment for remotely managing updates to devices; Customizable software delta creation tools; Bearer aware cost efficient software download process; Multiple module updates installed according to version and sequencing rules; Aggregation point for reported data for processing and analytics.

Benefits for the device administrator may include: Admin Console; Aggregated data analytics; Safe remote updates; Less device downtime; Software updating for new features and configuration; Prognostic reporting prevents serious faults developing; Reduces cost of ownership.

2. Product Description 2.1 REDUP M2M Overview

The M2M Cloud product is build using REDUP technology. This is a suite of client/server components supporting remote cloud software management server, client reporting and analytics. The product is highly customizable and can be readily integrated into various scenarios.

Figure 63:
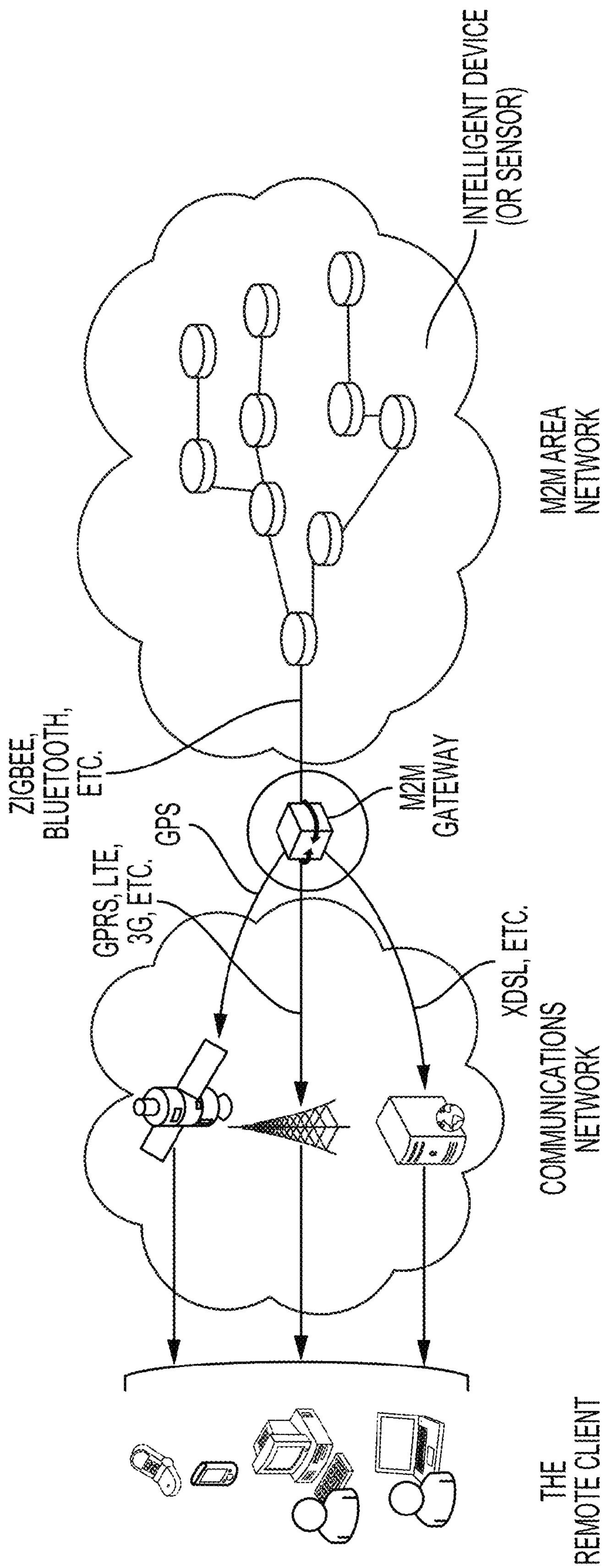

A typical M2M deployment scenario is shown in FIG. 63. The M2M gateway acts as a proxy, providing services for the M2M area network.

Figure 64:
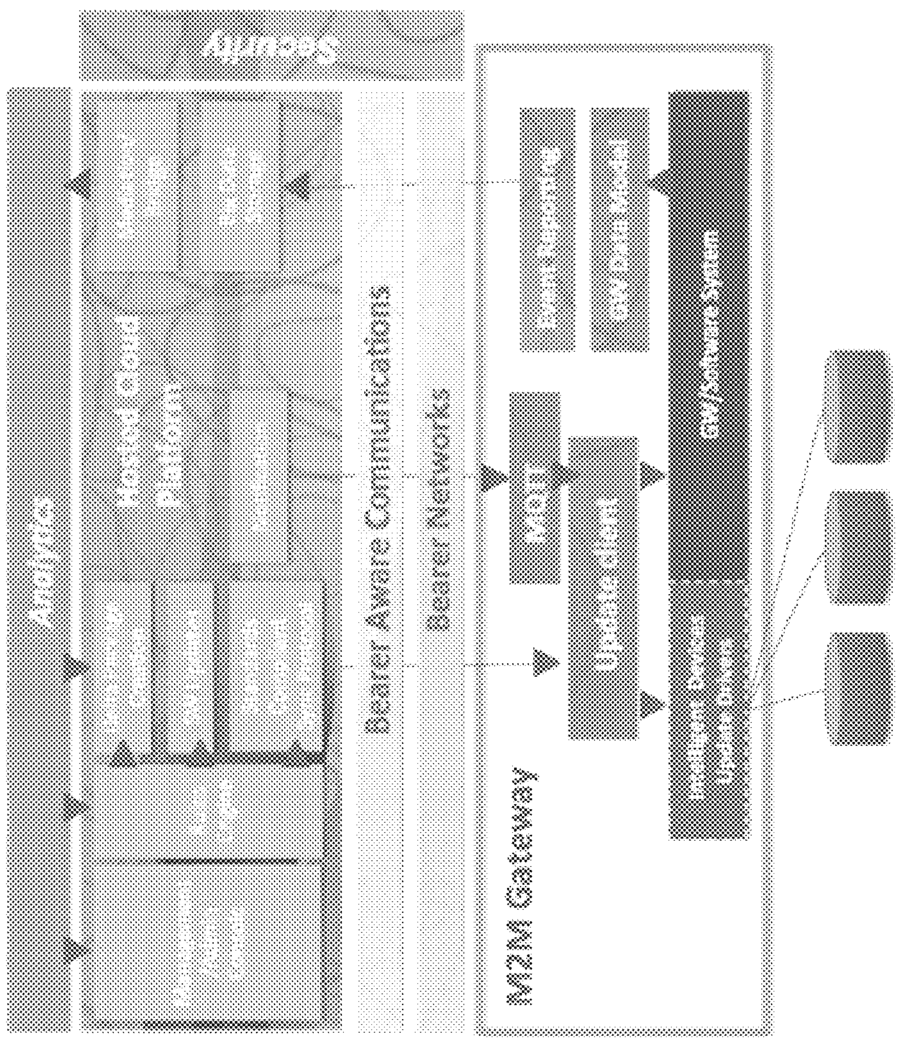

Many embedded systems are now connected devices. Cloud connectivity means that many functions, previously requiring manual intervention, can now be performed remotely. The sophistication of services provided by the Internet of Things increases as the cost and availability of processing improves. Software-based features are much more flexible than hardware but the downside is that the complexity of the solution increases. With complexity comes the risk that software is delivered without every feature interaction being tested fully. This can mean product recalls or expensive field visits. However, with cloud connectivity, remote software management can substantially mitigate this problem. See FIG. 64.

Figure 65:
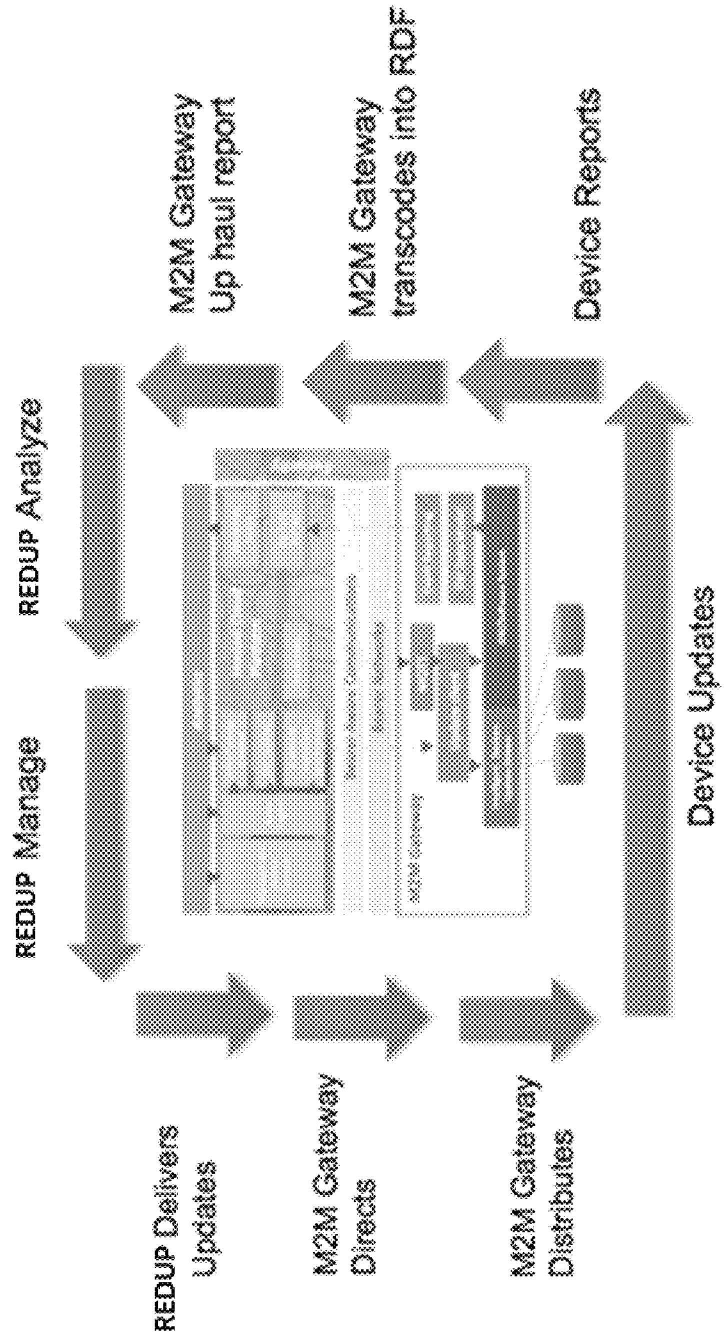

Using the M2M Cloud, device network administrators can remotely monitor the state of the network and analyze collected data to proactively plan and deploy software and configuration updates. This prognostic approach to software mean that faults can be corrected before they become a serious problem and, potentially, before network administrators are aware of emerging issue. The REDUP M2M Cloud solution enables updates to be securely downloaded and installed onto devices. See FIG. 65.

In a typical deployment, devices report events regarding activity including software faults. The M2M gateway transcodes sensor data into a format conforming to the Resource Description Framework (RDF). The event reports are uploaded to the server. Product and device related analytics helps to manage the devices and analyze device data. This helps software updates to be planned and deployed via the REDUP Cloud Software Manager. Updates are triggered via notifications and delivered to the Gateways over secure channel using one of a number of types of secure link (VPN, IPSEC, TLS). The M2M gateway distributes updates to devices according to device specific update mechanisms.

2.2 Software and Configuration Management

Devices can be segmented into groups to enable the targeted application of updates. Updates can be applied to the device according to rules based on a flexible configuration of parameters including version numbers and other model dependencies.

Figure 66:
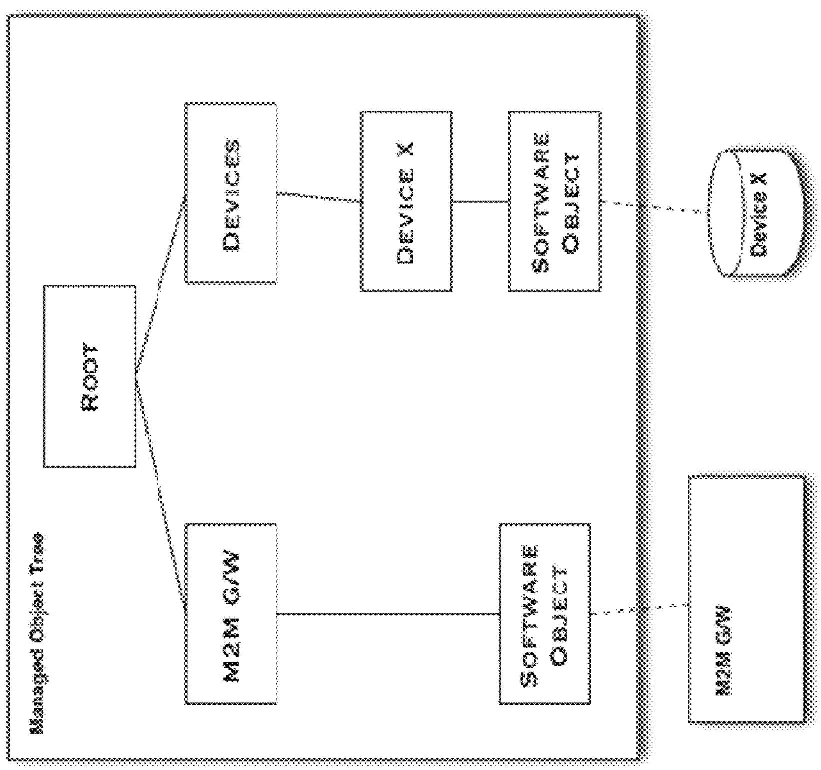

The Cloud gateway software update process is based on the OMA-DM protocol. The REDUP Update client manages the download of software updates via a Managed Object tree. See FIG. 66.

The managed object tree is part of the update client in the M2M gateway. The MO tree helps the update client to manage software objects on behalf of each connected device.

The Cloud Software Manager supports devices using a sophisticated package management process. Intelligent device products are mapped to segments. Each segment is a structure that get be use to target software updates to specific collections of devices that match the product.

Figure 67:
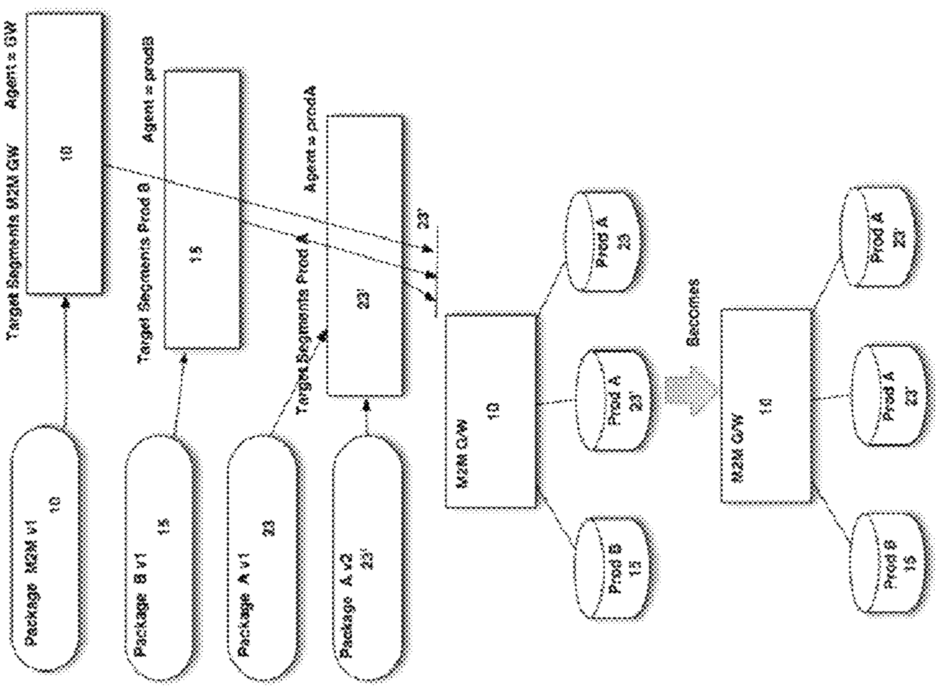

Packages of software updates and configuration are assigned to segments. In this way an M2M gate can pick up software changes for any device connected to it by passing the device agents back to the Cloud Software Manager as part of a software update request. This is shown in FIG. 67.

In a typical scenario like that shown, the gateway is responsible for multiple devices and the cloud server is set up to handles each device product as a separate segment. In the case above, the system is managing three just devices. Two are product A types and one Product B. Three segments are therefore set up on the server, corresponding to product A and B and one for the gateway itself. Versioned packages of software updates and configuration are managed for the devices and these are assigned to the proper segments.

When software changes are published, notifications are sent to gateways and server rules decide which versions of software are delivered to the devices by acting through the OMA-DM managed object tree.

2.3 REDUP Client

The REDUP M2M Cloud solution includes client products that are incorporated into the M2M gateway. This section outlines the services of the clients.

2.3.1 Client Architecture

The M2M client comprises three main components: the Update Client, the Cloud Notification Client and the Log Event Notification Client. These can be separately deployed as appropriate in different scenarios.

The update client is responsible for coordinating with the cloud server to download the latest updates that are appropriate for the segments to which gateway-managed devices belong. Segment management is a feature of the cloud server (see section [00725]).

The notification client allows the M2M gateway to notify of software updates. In addition it can act as a general publish/subscribe service to the gateway.

The event notification client is responsible for collecting and passing device data to a big data repository. The Event notification client is able to augment the logging event with additional supporting information extracted from the M2M gateway. For example, a software installation event can trigger the event notification engine to collect the complete manifest of software components so that the complete software state of the device can be updated to the sever after a software change is made. The design and implementation of logging scenarios is specified as part of a deployment project.

2.3.2 REDUP Update Client

Figure 68:
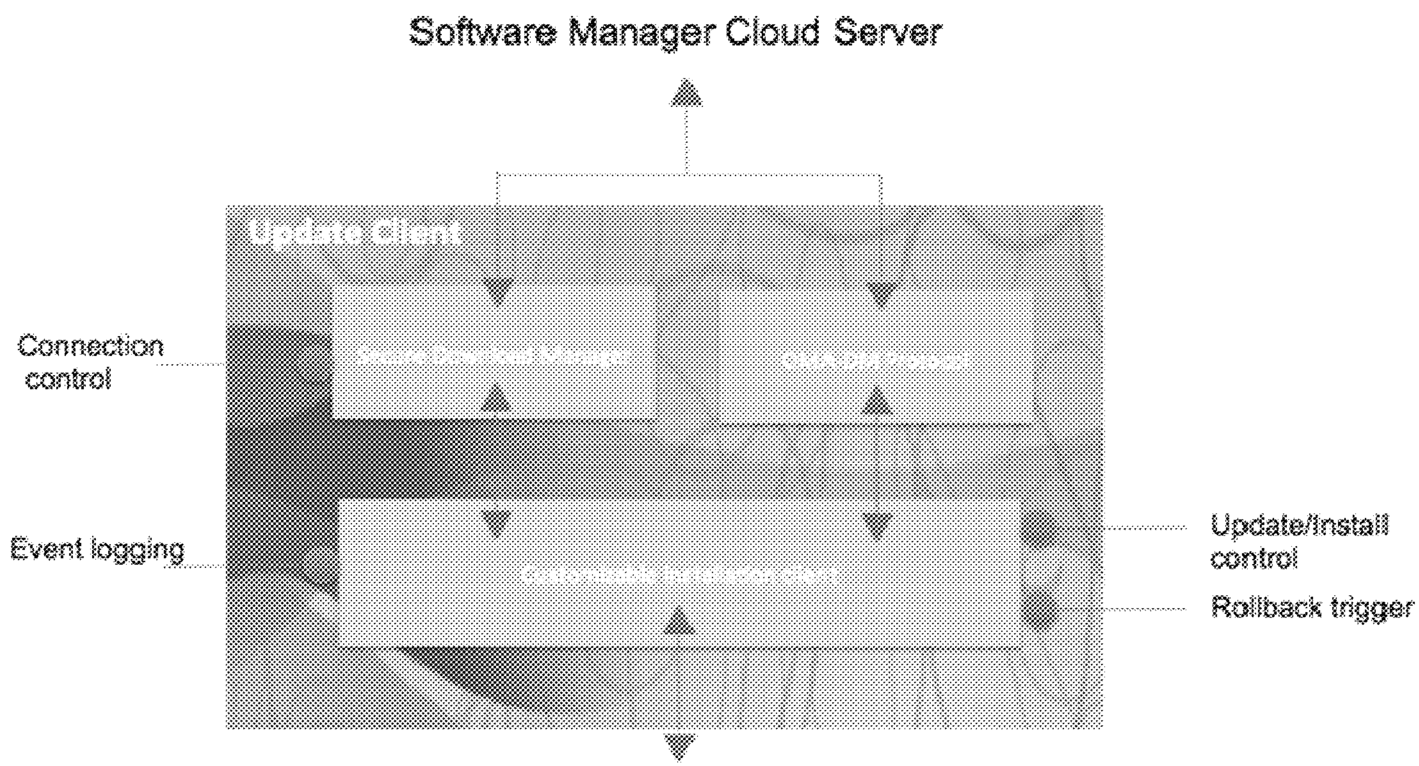

The REDUP Client is a component resident on the M2M gateway. It provides the capability for device component software, media or configuration to be updated remotely and for the device to report installation and software faults via the M2M gateway. The update client can be configured to run as part of the M2M gateway. See FIG. 68.

The product provides the following client side features: OMA-DM compliant download; Secure download of update package; Rollback; External System control of download and install; Connection control and resume download; Customizable installation client for updates.

Figure 69:
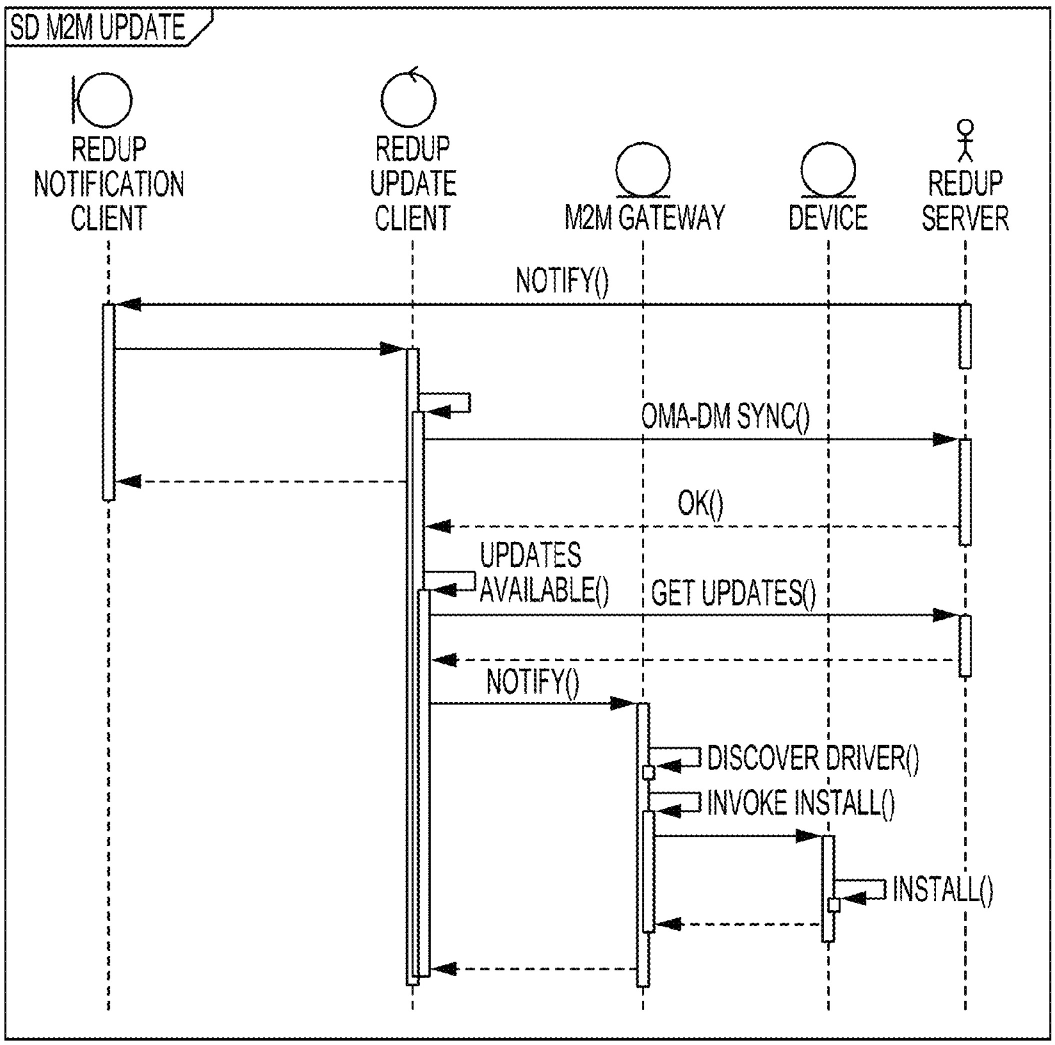

A typical update sequence is shown in FIG. 69. The actual implementation is part of a project and is built around client product libraries. In a typical installation sequence the OMA DM client is notified of possible updates and synchronizes with the server. If there are updates to download these are pulled off a remote server. The download can be automatic or controlled by the device. Similarly, installation can be automatic or controlled by device logic.

2.3.3 Supported Platforms

The supported platforms operating systems (Oss) include: Linux; Android.

2.3.4 Typical Client Size

The deployed size of the update client varies on the complexity of updates but a typical size of the complete update client is around 20 k, not including libraries.

Figure 70:
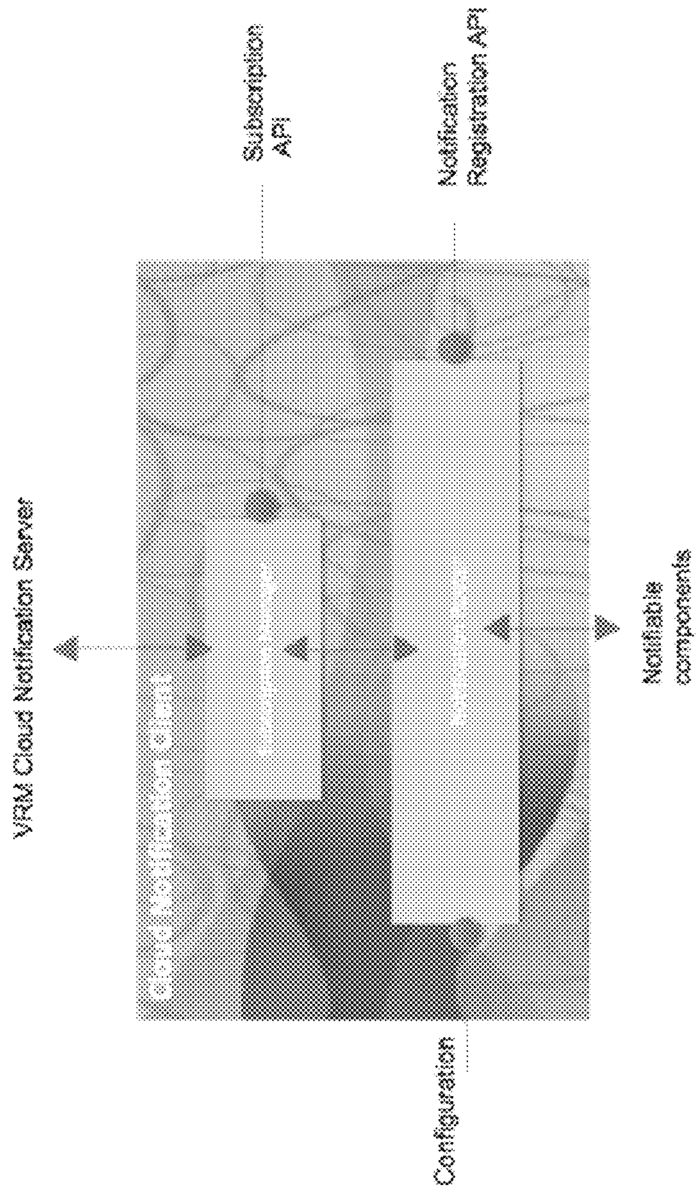

2.3.5 Libraries:

libdmclient, libxml2, libwbxml, libsoap, sqlite, libcurl 2.3.6 REDUP Cloud Notification Client The REDUP Cloud Notification Client is a publish-and-subscribe-based notification service. It can be installed as part of the gateway. The gateway business logic is able to create subscriptions via an API to the subscription manager. See FIG. 70.

Notifications from the cloud server are delivered to the client. A notification registration API allows notifiable components to register a class of notifications. A notification router component of the client is able to identify the subscribing component and deliver notifications via a callback.

2.3.7 Libraries:

MQTT 2.3.8 REDUP Log Event Notification Client

Figure 71:
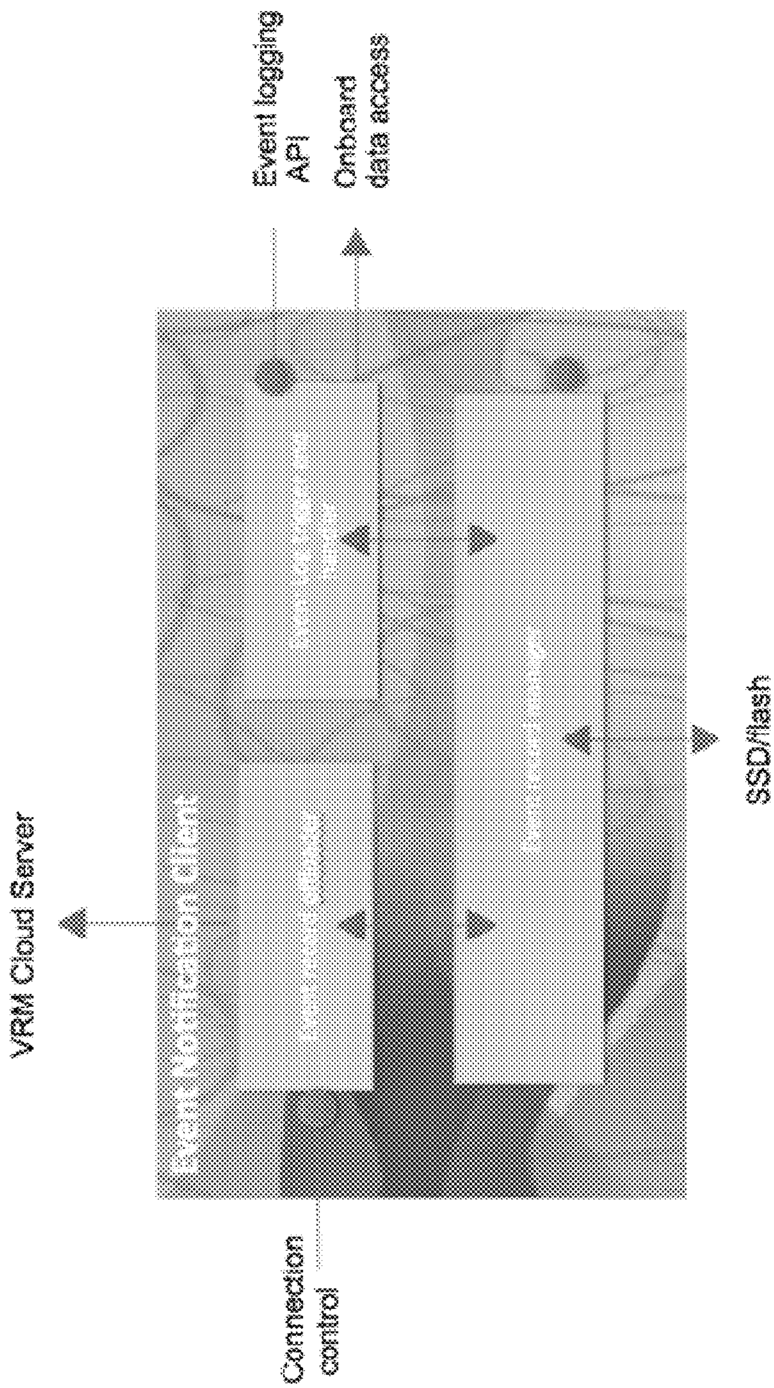

The log even notification client (LEN) is a flexible component installed in the gateway that accepts log event and processes these for uploading into a cloud big data storage repository. The LEN provides logging in a graph format that facilitates very flexible and configurable logging without the need to tightly couple the gateway's data model into the back end system. See FIG. 71.

Events are triggered within the gateway or within intelligent devices. In the gateway events may be triggered for any number of reasons. These include: Software and configuration updates events; System fault and performance events; System service usage notifications; Gateway Telematic data.

In addition intelligent devices that produce telematic data can deliver the data via the gateway and the LEN. Gateways will normally transcode intelligent device reported data into a homogeneous data model such as RDF before passing it onto the LEN.

The client records events according to rules and caches the records onto the solid state or flash storage device. The records are offloaded to the cloud server under the control of connectivity business logic. For example, on a project basis, the upload logic may be on a schedule basis, business logic control or available connectivity.

2.3.9 Supported Platforms

The supported platforms OSs include: Linux; Android.

Figure 83:
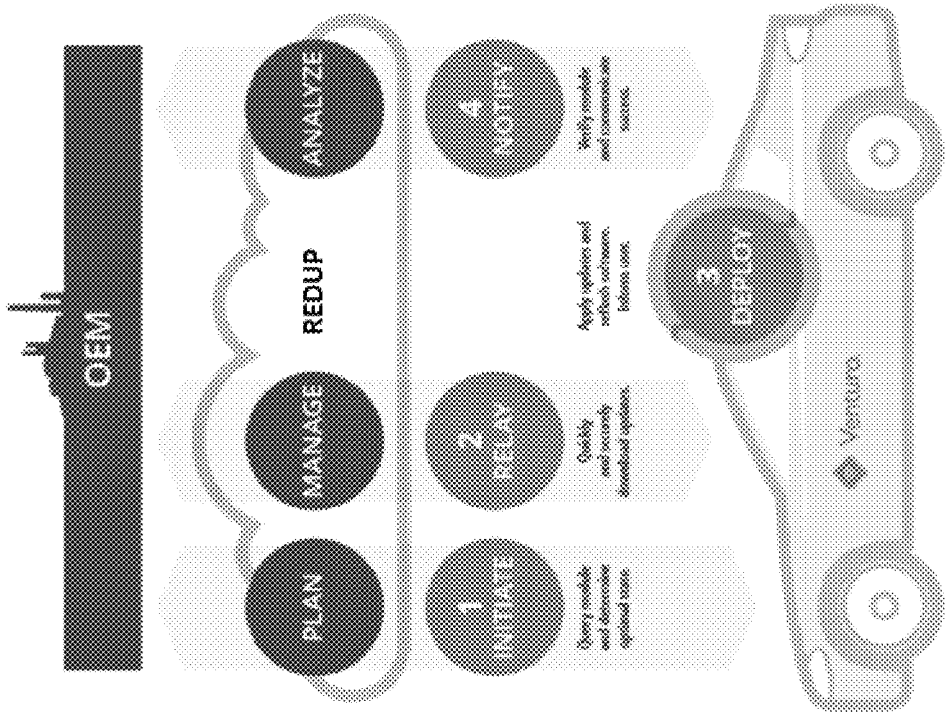

2.4 The REDUP VRM Server—Shown in FIG. 83

2.4.1 The M2M Cloud Server

The REDUP Cloud Server solution is a J2EE application that operates in a clustered configuration for resilience, performance and scalability, utilizing a relational database that may also be clustered.

The live system sits in the cloud and can be hosted in many environments including Amazon EC2. Typical installations include a reference (or pre-live) installation and a test installation to support system staging, acceptance and upgrades.

3.1 Standard Server Support

The REDUP Server is available to be installed on server platforms including the following:

REDUP Server—Supported systems

Application Server—JBoss/Tomcat

Relational Database—Oracle or MySQL

Operating System—Linux

REDUP Server is typically implemented on industry standard Web Server class servers—dual processor, 4 Gbytes RAM, local disk for OS and application installation and shared network storage or SAN for shared data access. The REDUP Server application scales horizontally according to the number of devices supported.

Figure 72:
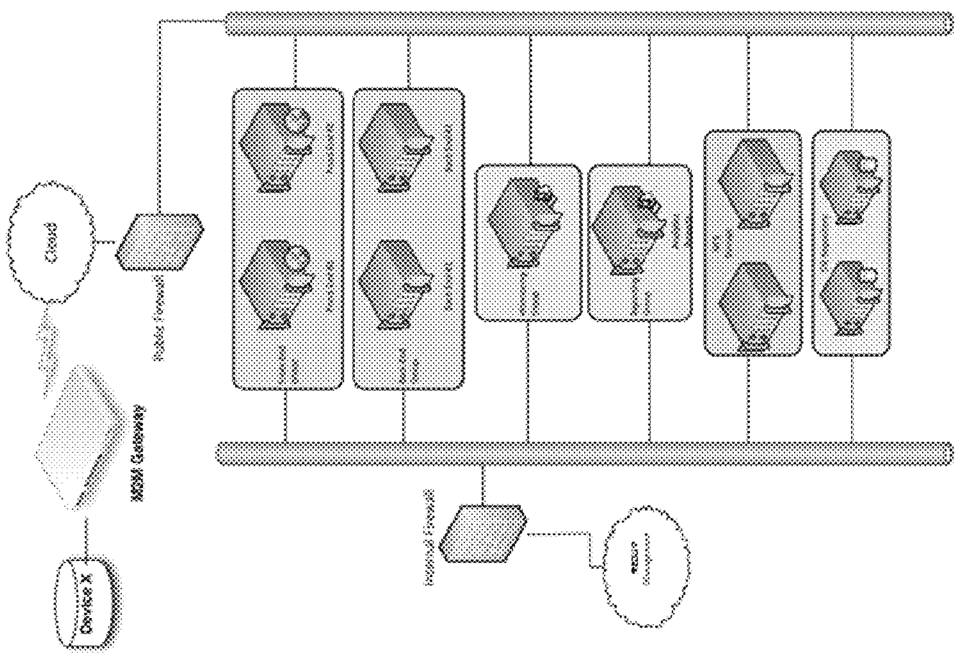

3.2 Physical Deployment—Shown in FIG. 72.

Alternative Embodiment 3

1 Introduction

In some alternative embodiments, REDUP Vehicle Relationship Management (VRM) is a product designed to provide the capability to remotely manage and update vehicle software, and to collect vehicle telematic data for the purpose of predictive analytics. Vehicle Relationship Management is akin to customer relationship management except that the managed relationship is with the car itself. The overall objective is to maintain remote post-sales contact with the vehicle in order to understand the state of functioning of individual cars and, by extension, to understand the state of the product as a whole. The car as a connected device is used for these services.

Features may include:

Software and Asset Update Management

The product facilitates the remote management and update of software and other assets. A console allows the upload and configuration of packages of files targeted for OTA download into connected devices. Packages are managed via a flexible work-flow process appropriate to the type of update. Processes includes: Application Store (Appshop), Software Component Updates (SOTA) and Firmware over the air (FOTA).

The product manager is provided with a selection of tools for the processing of update modules as part of the package upload workflow. For example, the cloud server has a collection of delta algorithm tools, which can be applied to reduce the download size.

Notifications

A cloud based notification service allows the server to inform devices of the availability of software updates. This service can also be used by the OEM as a generalized device or device-user notification service.

The notification service is multimodal, meaning that the cloud service can deliver notifications via a consistent interface to multiple push interfaces supporting mobile devices, connected devices etc.

Analytics

A feature of REDUP is a powerful framework for device-centric predictive analytics. A Log Event Notification Client (LENC) can be integrated into devices to provide a managed data model similar to SNMP but in a Big Data graph format. This allows events to be configured that trigger devices to upload specific information into a big data repository. The system is thus capable of predictive analytics with a wide domain of intelligence, from small-scale questions around individual devices to large-scale questions at a product level.

Telematic Event Reporting

One service of the LEN client is to manage vehicle telematic data in a configurable manner. For example, location and vehicle status information can be managed and delivered back to the repository. Standard reports on vehicle status are available.

Standards Compliant Updates

The REDUP Client supports OMA-DM/IETF protocols for installable content synchronization and download. The system also supports REST and other protocols as a customization.

Secured Distribution

REDUP maintains confidentiality of software and data through a number of techniques. TLS and other protocols are used to secure transactions; Devices are identified and authorized to download software modules via parameters; The integrity of updates is maintained via checksums and certificates.

Vehicle Segmentation

Vehicles are grouped and handled using manager defined segments. A segment is linked to vehicle parameters. Packages of update can be assigned to segments. The result is that a vehicle will potentially download the files within the segments to which the vehicle belongs. The selection of actual files downloaded will be subject to rules.

Rules Engine

Rules Engine is a component of REDUP that facilitates software version and other dependency checking between the files in each segment.

Big Data

REDUP uses a Big Data repository to provide the scale needed to store and manage the volumes of data associated with large numbers of connected vehicles.

This repository is specifically designed to provide the flexibility needed to accommodate new data types as the complexity of the Connected Devices and the way in which they are used develops.

Workflow Enabled Platform

A workflow enabled cloud platform provides the flexibility to be able to customize the processes for software management and delivery. For example, the server can be integrated with an existing quality assurance (QA) process or be used to define a process specific to the solution. The workflow enables pluggable components such as delta algorithms or content handlers.

The product may be compatible with: REDUP Cloud Software Manager—Remote managed software delivery; REDUP Update Client—Vehicle client supporting software download, install and rollback; REDUP Event Notification Client; REDUP Big Data reporting and Analytics.

The Value of REDUP Vehicle Relationship Management

Benefits for the OEM may include: Over the air updates reducing the need to visit dealer; Single enterprise environment for remotely managing software updates to the vehicle; Update of vehicles applications, software components and ECU firmware; Remote upload of vehicle software manifest for targeted updates; Flexible models for user control of software downloads and installation; Backend software update management; Customizable software delta creation tools; Bearer aware cost efficient software download process; Secure cloud storage and delivery of software-supporting package integrity, authentication and authorization; Multiple module updates installed according to version and sequencing rules.

Benefits for Tier 1 may include: Provides managed update service; Reporting of tier 1 product updates; Product management makes informed decisions based on live vehicle data; Vehicle fault event notification forwarding for diagnostic and predictive analytics.

Benefits for the Vehicle Owner may include: Safe remote updates; Fewer trips to dealer; Software updating for new features and applications; Prognostic reporting prevents serious faults developing; Reduces cost of ownership.

2 Product Description 2.1 REDUP VRM Overview

Figure 73:
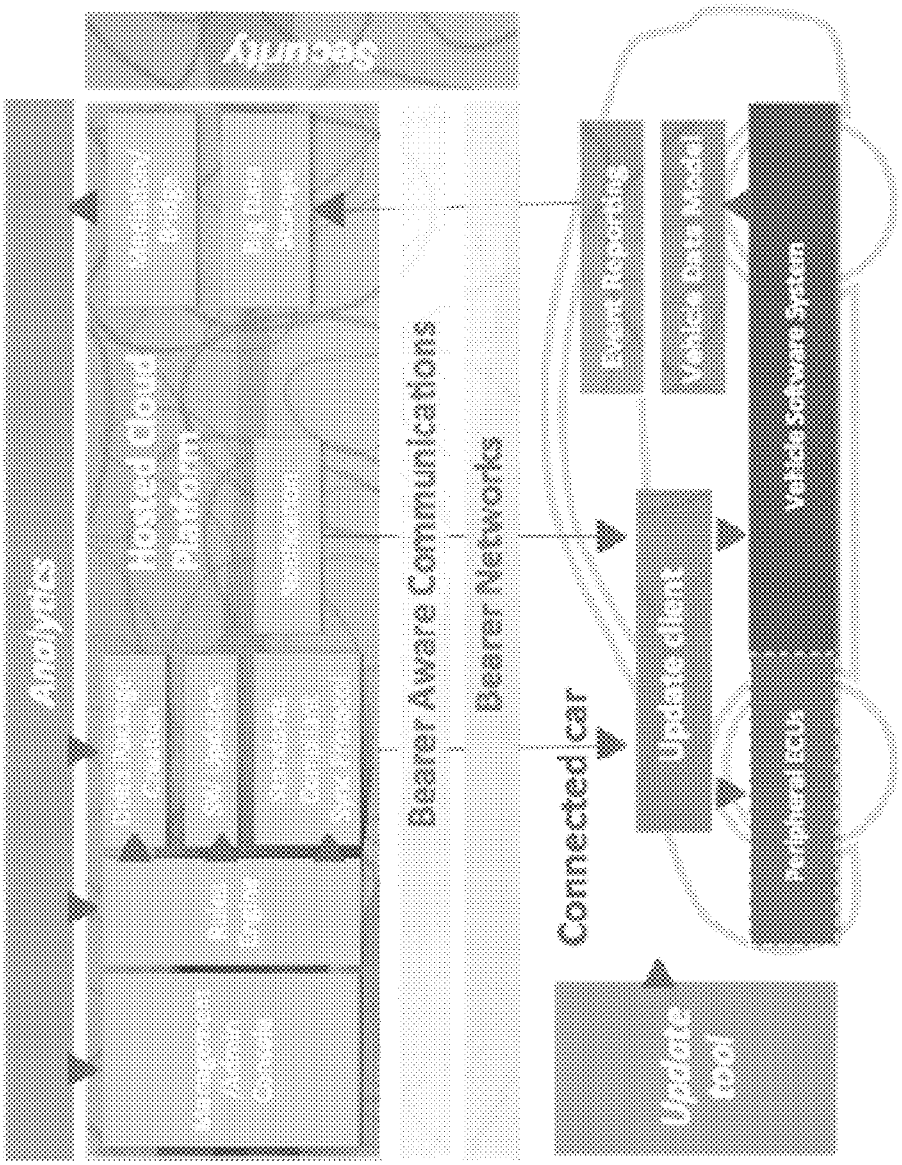

The REDUP VRM product is built using REDUP technology. This is a suite of client/server components supporting remote cloud software management server, client reporting and analytics. The product is highly customizable and can be readily integrated into various scenarios. See FIG. 73.

Many OEMs produce vehicles today that provide the capability to work with mobile devices. The marriage of the mobile device with the vehicle provides a much-needed means of connectivity, which is an enabler for powerful in-vehicle applications and services. The present situation is, however, only the precursor to the vehicle as a connected device with its own SIM/WIFI access. The connected car heralds a revolution in VRM services. The is vehicle is able to report the configuration of installed software and how well the software is functioning Product Managers and analysts are able to process the data collected and proactively plan and deploy software updates. This prognostic approach to software mean that faults can be corrected before they become a serious problem and potentially before the driver is aware of an issue arising. The REDUP VRM solution enables updates to be downloaded securely to the vehicle where either the driver or the dealer is able to apply the update.

2.2 REDUP In-Vehicle Client 2.2.1 Client Architecture

The REDUP VRM client comprises three main components: the Update Client, the Cloud Notification Client and the Log Event Notification Client. These can be separately deployed as appropriate in different scenarios.

The update client is responsible for coordinating with the cloud VRM server to download the latest updates. The REDUP cloud VRM server is described in section 2.3.

The notification client allows the VRM cloud to notify vehicles of software updates. In addition is can act as a general publish/subscribe service to the gateway.

The event notification client is responsible for logging events to the big data repository. Event notification is able to augment the logging event with additional supporting information extracted from the vehicle. For example a software installation event can trigger the event notification engine to collect the complete manifest of software components so that the complete software state of the vehicle can be updated to the sever after a software change is made.

2.2.2 REDUP Update Client

Figure 74:
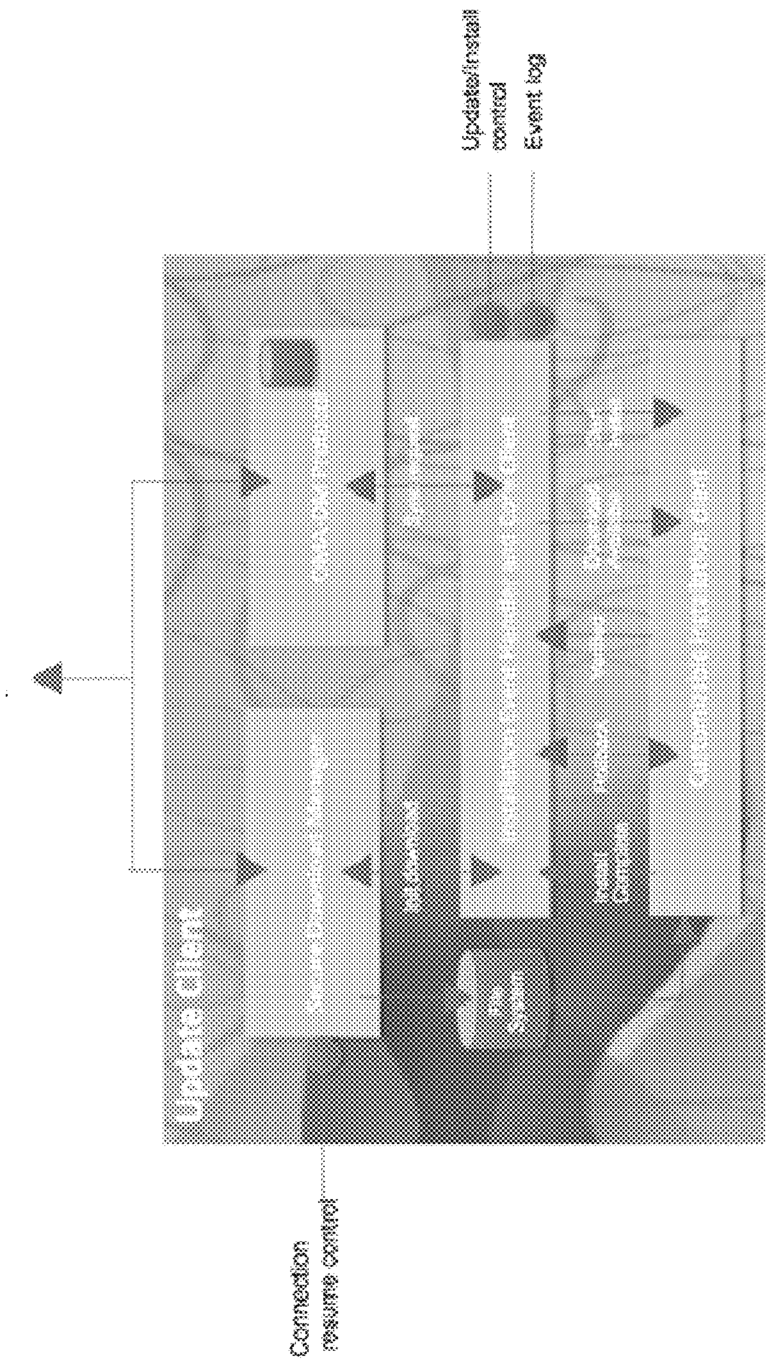

The REDUP Client is a client resident on the vehicle. It provides the capability for the vehicle software to be updated remotely and for the vehicle to report installation and software faults. The update client can be configured to run as part of the vehicle head unit or as a dedicated updated ECU. See FIG. 74.

The product provides the following client side features: OMA-DM compliant download; Secure download of update package; Rollback; Driver/System control of download and install; Connection control and resume download; Customizable installation client for firmware/component/application updates.

The Update Client

Figure 75:
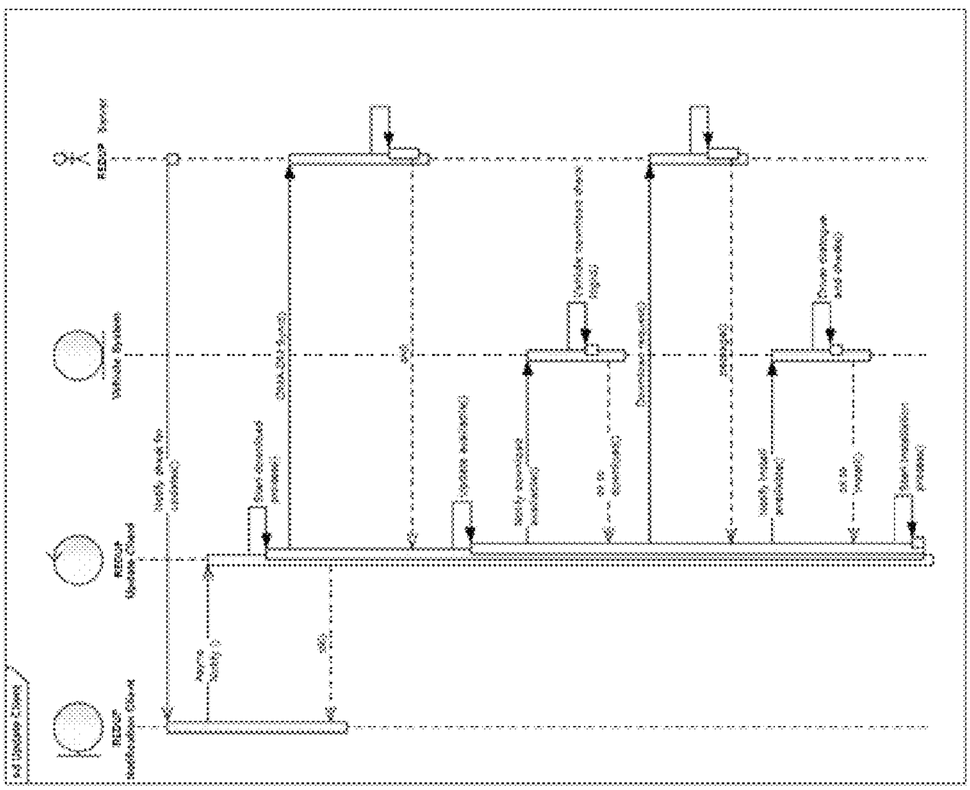

A typical update sequence is shown in FIG. 75. The actual implementation is part of a project and is built around client product libraries. In a typical installation sequence the OMA DM client is notified of possible updates and synchronizes with the server. If there are updates to download these are pulled off a remote server. The download can be automatic or controlled by the device. Similarly, installation can be automatic or controlled by device logic.

Types of updates supported include: In car applications; Software components; ECU Firmware.

2.2.3 Supported Platforms

The supported platform Operating Systems (OSs) include: Linux; Android.

2.2.4 Typical Client Size

The deployed size of the update client varies based on the complexity of updates.

Figure 89:
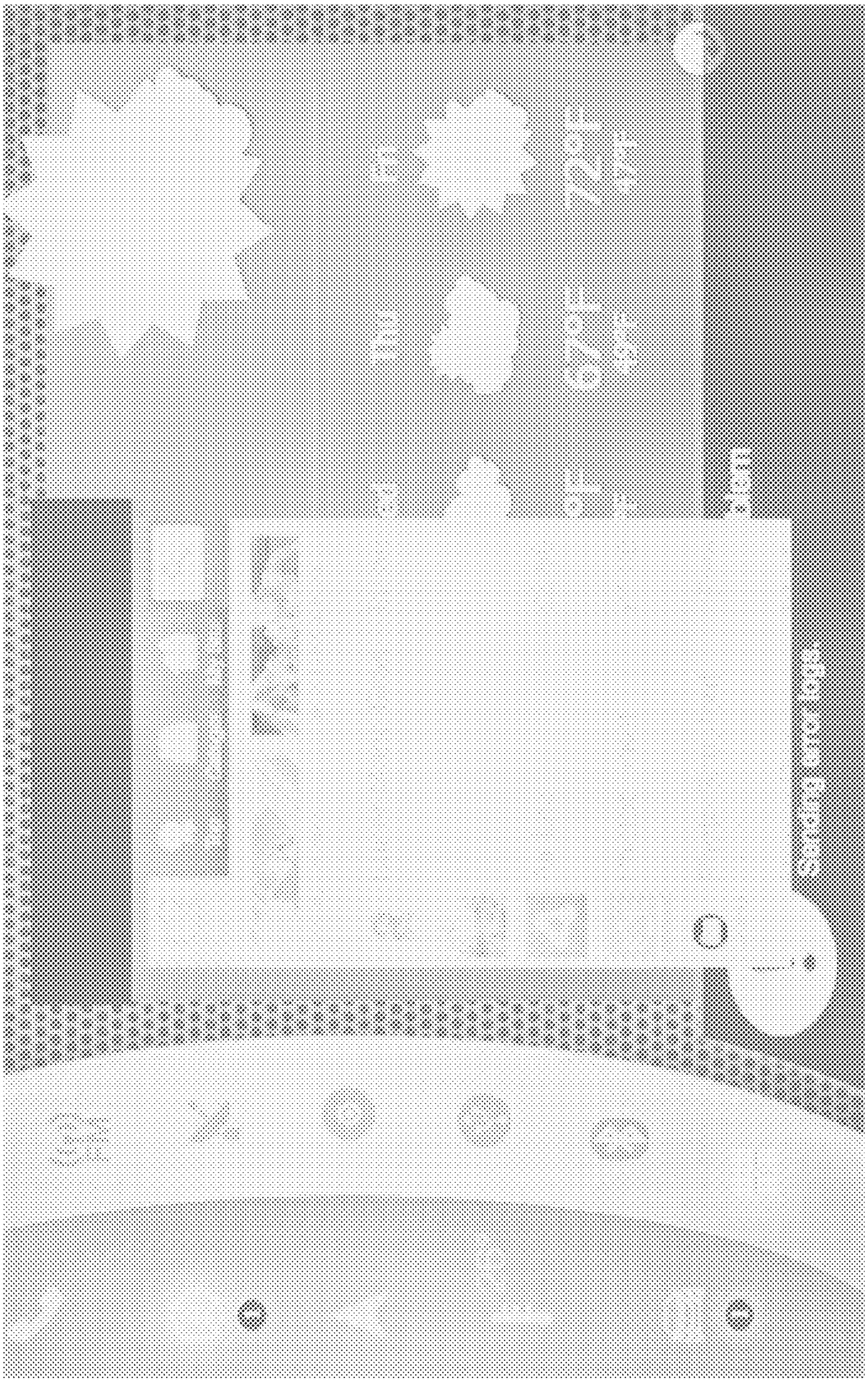

2.2.5 Libraries libdmclient, libxml2, libwbxml, libsoap, sqlite, libcurl 2.2.6 REDUP Cloud Notification Client The REDUP Cloud Notification Client is a publish-and-subscribe-based notification service. It can be installed as part of the gateway. The gateway business logic is able to create subscriptions via an API to the subscription manager. See FIG. 89.

Notifications from the cloud server are delivered to the client. A notification registration API allows notifiable components to register a class of notifications. A notification router component of the client is able to identify the subscribing component and deliver notifications via a callback.

2.2.7 REDUP Log Event Notification Client

Figure 90:
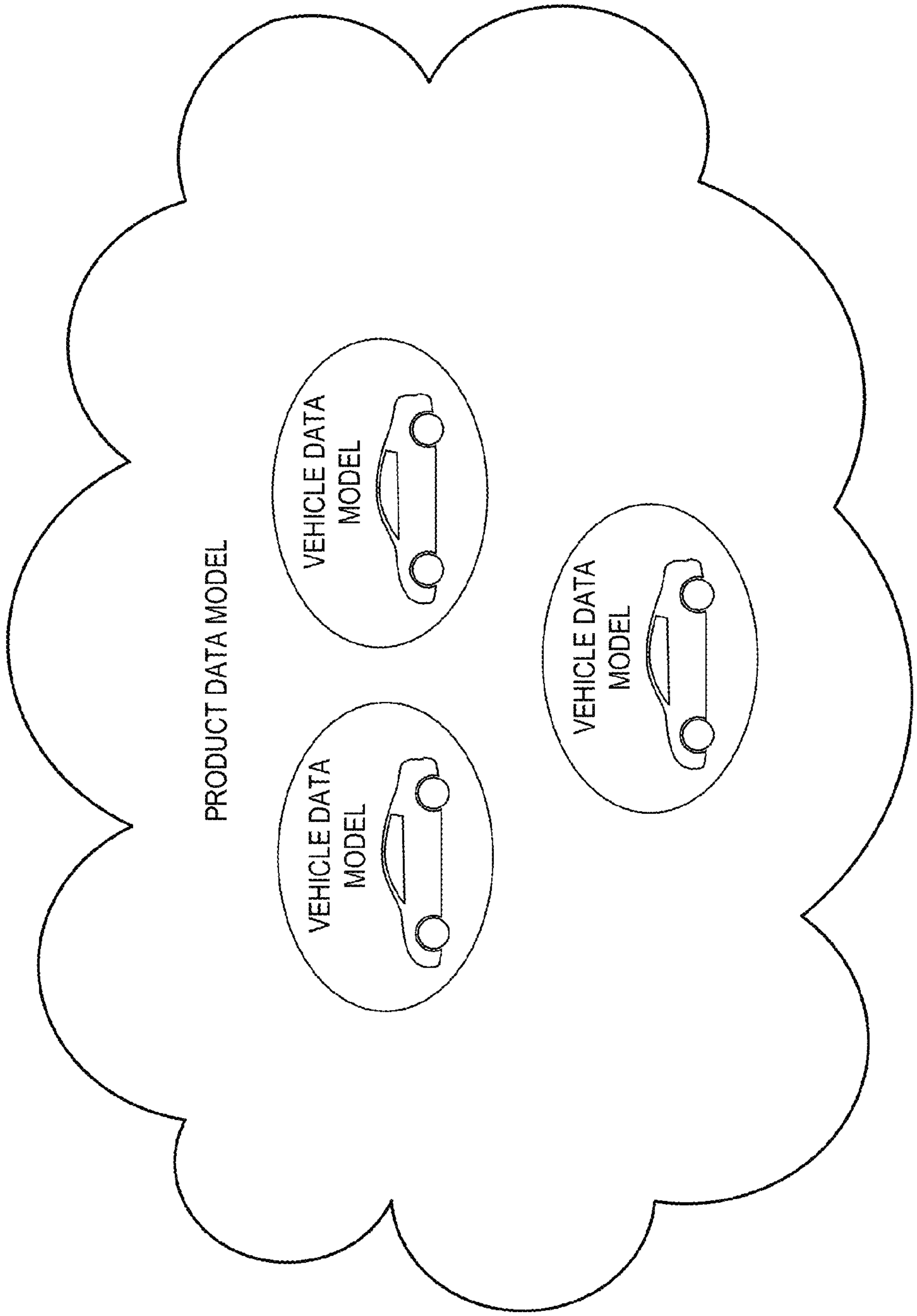

The log event notification client (LEN) is a flexible component installed in the gateway that accepts log event and processes these for uploading into a cloud big data storage repository. The LEN provides logging in a graph format that facilitates very flexible and configurable logging without the need to tightly couple the gateway's data model into the back end system. See FIG. 90.

Events are triggered within the gateway or within intelligent devices. In the gateway events may be triggered for any number of reasons. These include: Software and configuration updates events; System fault and performance events; System service usage notifications; Gateway Telematic data.

In addition intelligent devices that produce telematic data can deliver the data via the gateway and the LEN. Gateways will normally transcode intelligent device reported data into a homogeneous data model such as RDF before passing it onto the LEN.

The client records events according to rules and caches the records onto the solid state or flash storage device. The records are offloaded to the cloud server under the control of connectivity business logic. For example, on a project basis, the upload logic may be on a schedule basis, vehicle driver control or available connectivity.

2.3 The REDUP VRM Server—Shown in FIG. 83

2.3.1 The VRM Server

The REDUP VRM Server solution is a J2EE application that operates in a clustered configuration for resilience, performance and scalability, utilizing a relational database that may also be clustered.

The live system sits in the cloud and can be hosted in many environments including Amazon EC2. Typical installations include a reference (or pre-live) installation and a test installation to support system staging, acceptance and upgrades.

2.3.2.1 Standard Server Support

The SurfKit Server is available to be installed on server platforms including the following:

SurfKit Server—Supported systems

Application Server—JBoss/Tomcat

Relational Database—Oracle 10i or MySQL

SurfKit Server is typically implemented on industry standard Web Server class servers—dual processor, 4 Gbytes RAM, local disk for O/S and application installation and shared network storage or SAN for shared data access. The SurfKitchen application scales horizontally according to the number of devices supported.

Figure 76:
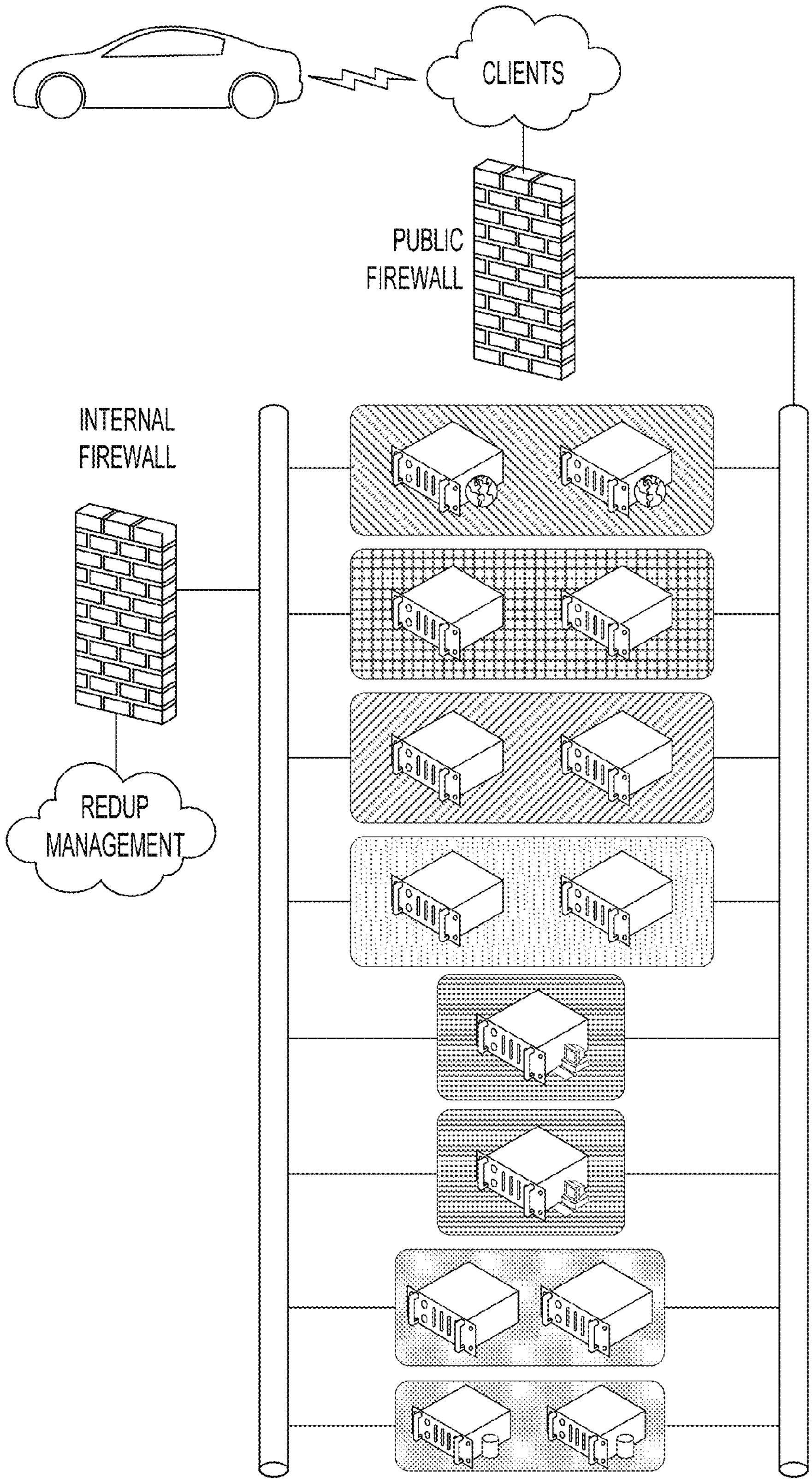

2.3.2.2 Physical Deployment—Shown in FIG. 76

2.4 Hosting

There are options for hosting. For example, the system can be hosted on Amazon EC2 or in the customers own hosting.

2.4.1 The Solution

In one implementation, the solution involves two discrete environments called LIVE and REFERENCE. The description of these is given below.

Environment—Description

Reference (REF)—An environment shared between Quality Assurance and Motion Computing to perform testing of software releases. It will not have the same service level as the PROD environment. Service levels referred to refer to the PROD environment.

Production (PROD)—The main production (live) environment serving all regions globally. In one implementation, this environment includes a single non-geo-redundant server cluster. In another implementation, geo-redundant solutions may be utilized.

Additional environments may be used internally during development (DEV for development and TEST for internal testing).

2.4.2 SLA (Service Level Agreement)

The system will be managed. The Cloud infrastructure will have a standard monthly availability of 99.99% excluding scheduled downtime. Higher levels of availability are supported.

The Monthly Availability Service Level percentage will be calculated by dividing the total number of minutes in a month ("Monthly Minutes"), excluding Scheduled Maintenance, minus Downtime by Monthly Minutes (excluding Scheduled Maintenance) and multiplying the resulting amount by 100.

For example, in a month where there are thirty (30) days, the total Monthly Minutes are 43,200 minutes. If Downtime is 75 minutes and Scheduled Maintenance is 30 minutes, then the Monthly Availability Service Level is 99.9%, which is calculated as follows:

$=(100-99.99)/100*30*24*60=4.23$ minute per month 2.5 Managed Services and Operations An Operations service proactively manages the system once it is live. Operating system and application server/database platform monitoring is performed.

2.5.1 Managed Services

Managed services include: Monitoring; Log file rotation; Internal Ticket management and resolution; Customer review meetings; Scaling reviews.

2.5.2 Monitoring

Service Monitoring is implemented using Icinga, which is a system and network monitoring application. Icinga watches hosts and services specified, alerting to alarms and when they are resolved.

Monitoring allows for a prompt detection of system, platform and service fault(s), reducing uncertainty around the health of the service via dashboards and similar An Icinga setup is delivered with a set of predefined host and service checks, additional checks can be added as the service evolves. Monitoring will cover these elements of each host/instance:

The monitoring application also includes where applicable a mobile interface for a customer facing interface.

System Level Monitoring may include Hardware/Resources Monitoring (e.g., Ping, CPU Load, CPU Usage, Disk Free Space).

Network Monitoring may include monitoring levels of network traffic.

Platform Level Monitoring may include monitoring of software components.

2.5.3 Notification

All monitoring checks are defined by thresholds; Critical and Warning. Thresholds are thus used to determine the status of alarm(s): OK—Indicates everything is okay, within both thresholds; Warning—Indicates check has exceeded the warning threshold; Critical—Indicates check has exceeded the critical threshold.

Monitoring alarms are distributed via notification mail alerts to REDUP Support engineers at Warning, Critical and Recovery points. The distributions list can be updated to include additional users.

2.5.4 Dashboards

Figure 77:
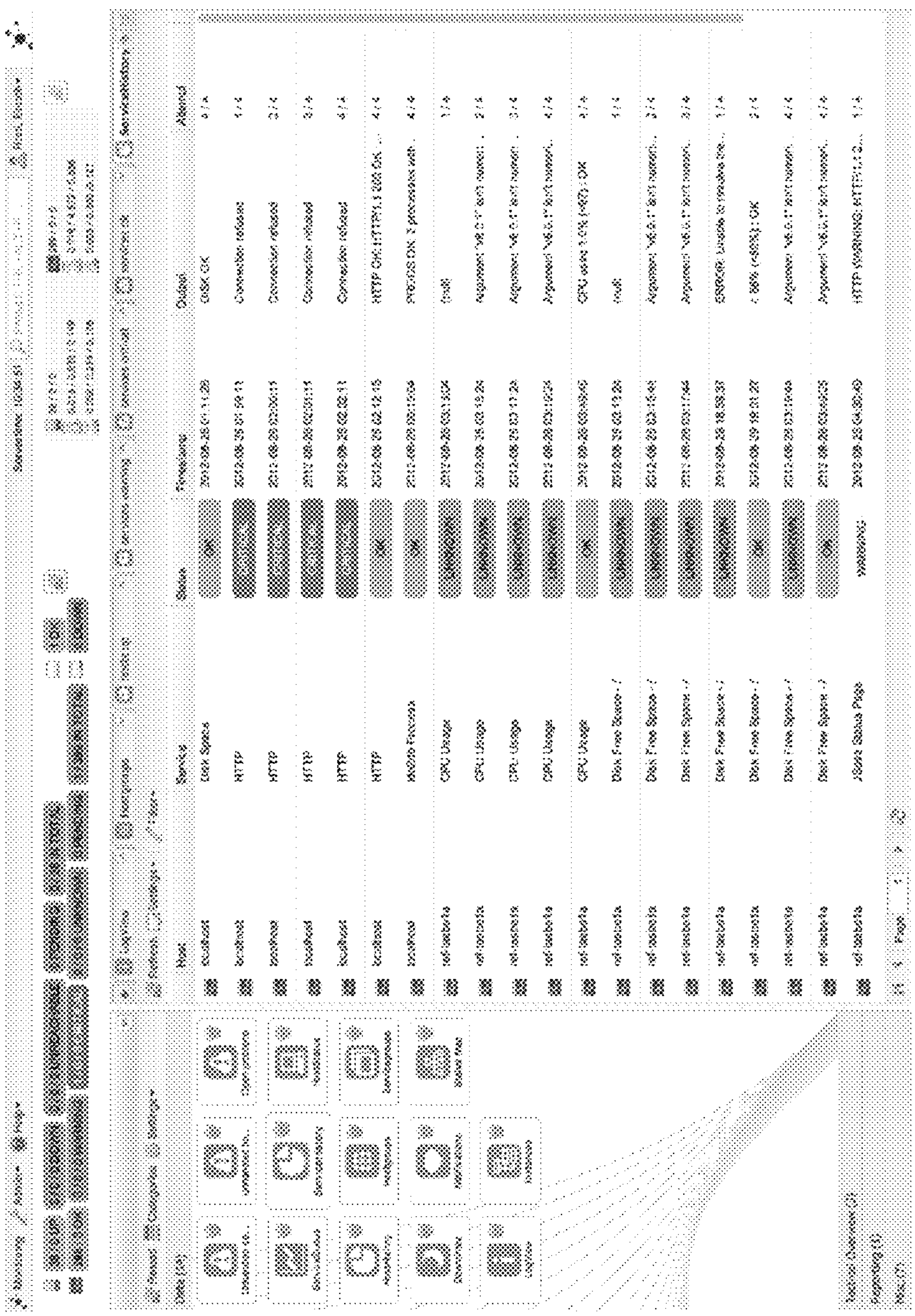
Figure 78:
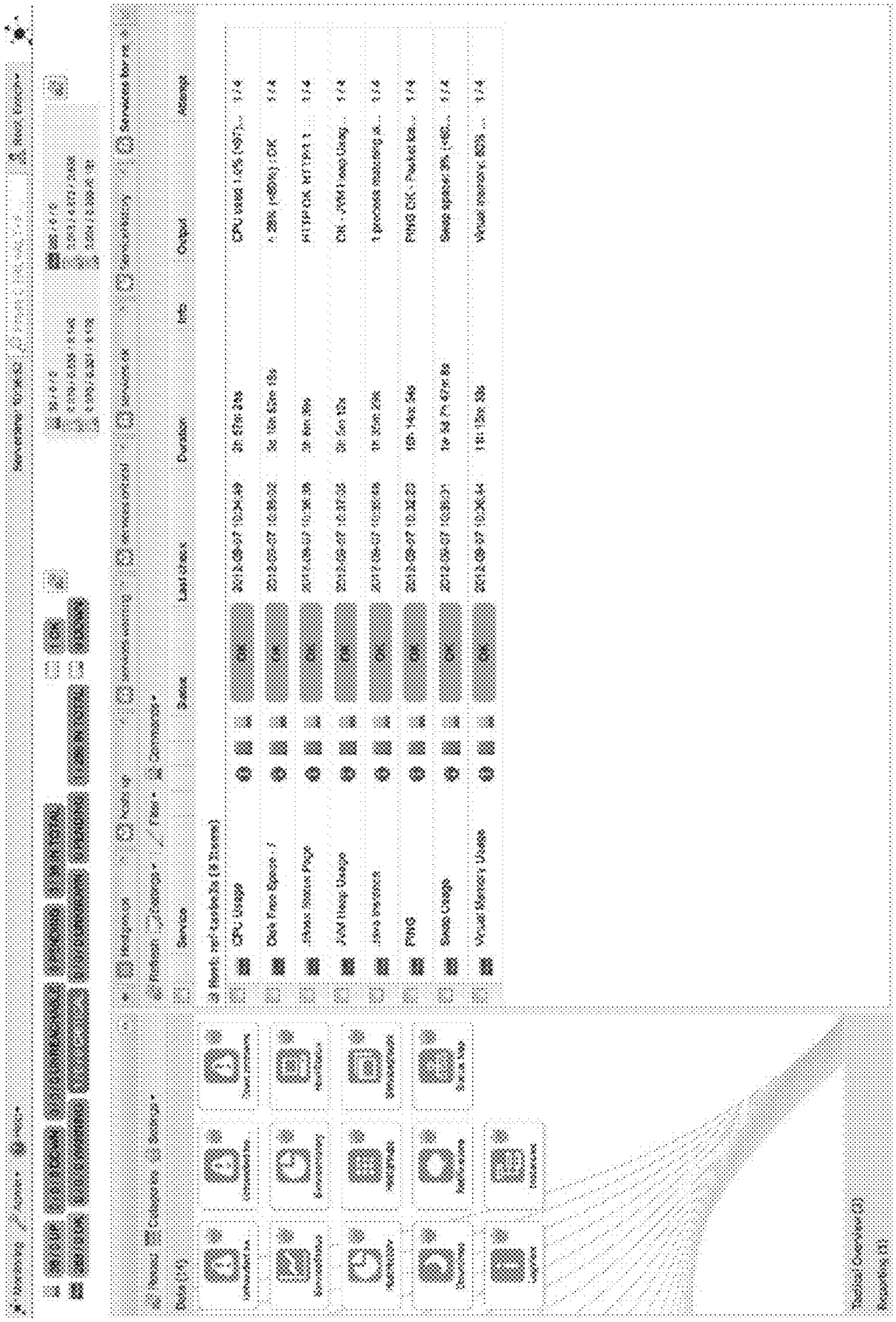

Monitoring (Icinga) dashboards indicate the health of the service in real time, some example dashboards are shown in FIGS. 77 and 78.

Each interactive dashboard can be controlled to expand monitoring status for the entire service, host(s) or an individual check/alarm. See FIG. 78.

2.5.5 Reporting

Figure 79:
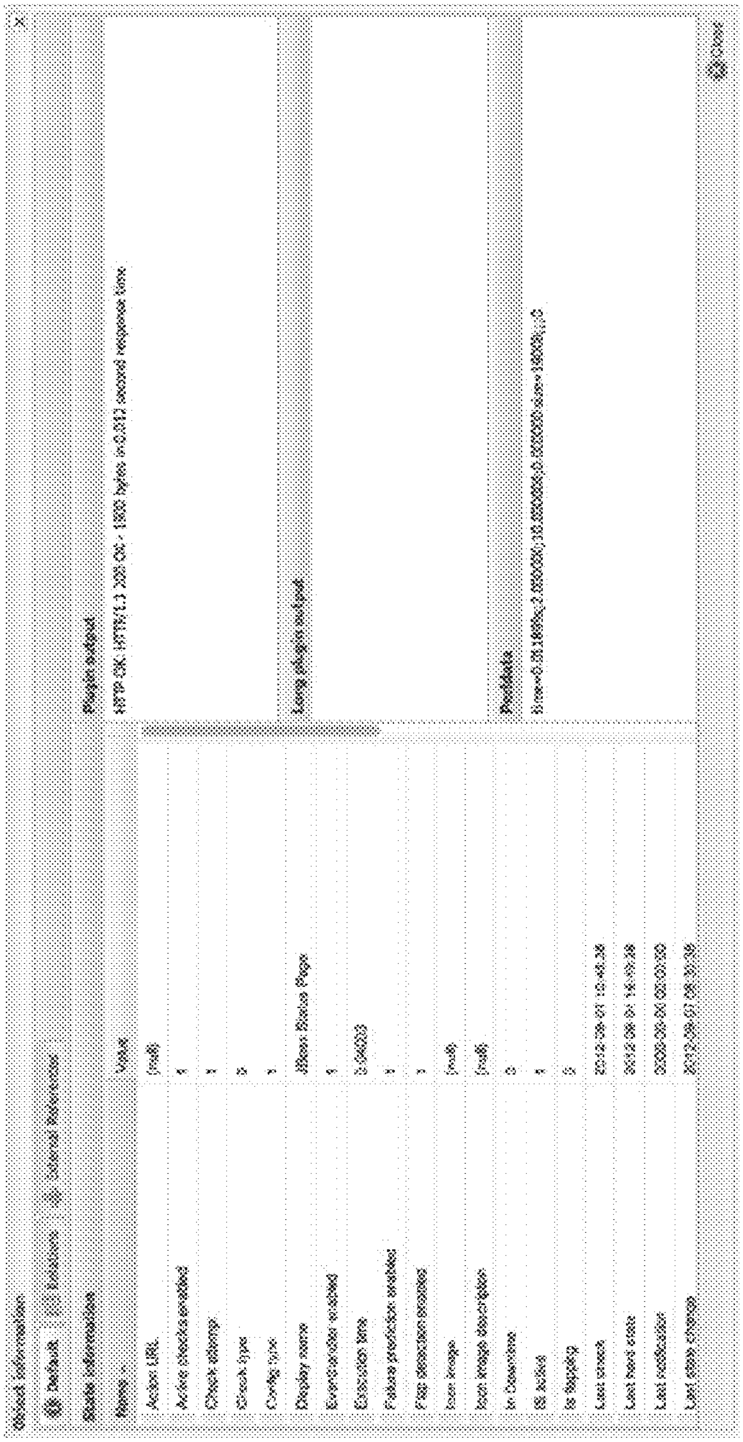

Inbuilt reporting functionality is available allowing administrators and assigned users the rights to configure reports based upon predefined filters. Reporting is specific to the monitoring checks/alarms only, not to be confused with usage data. The example shown in FIG. 79 shows the number of alarms to a specific host over time.

Figure 80:
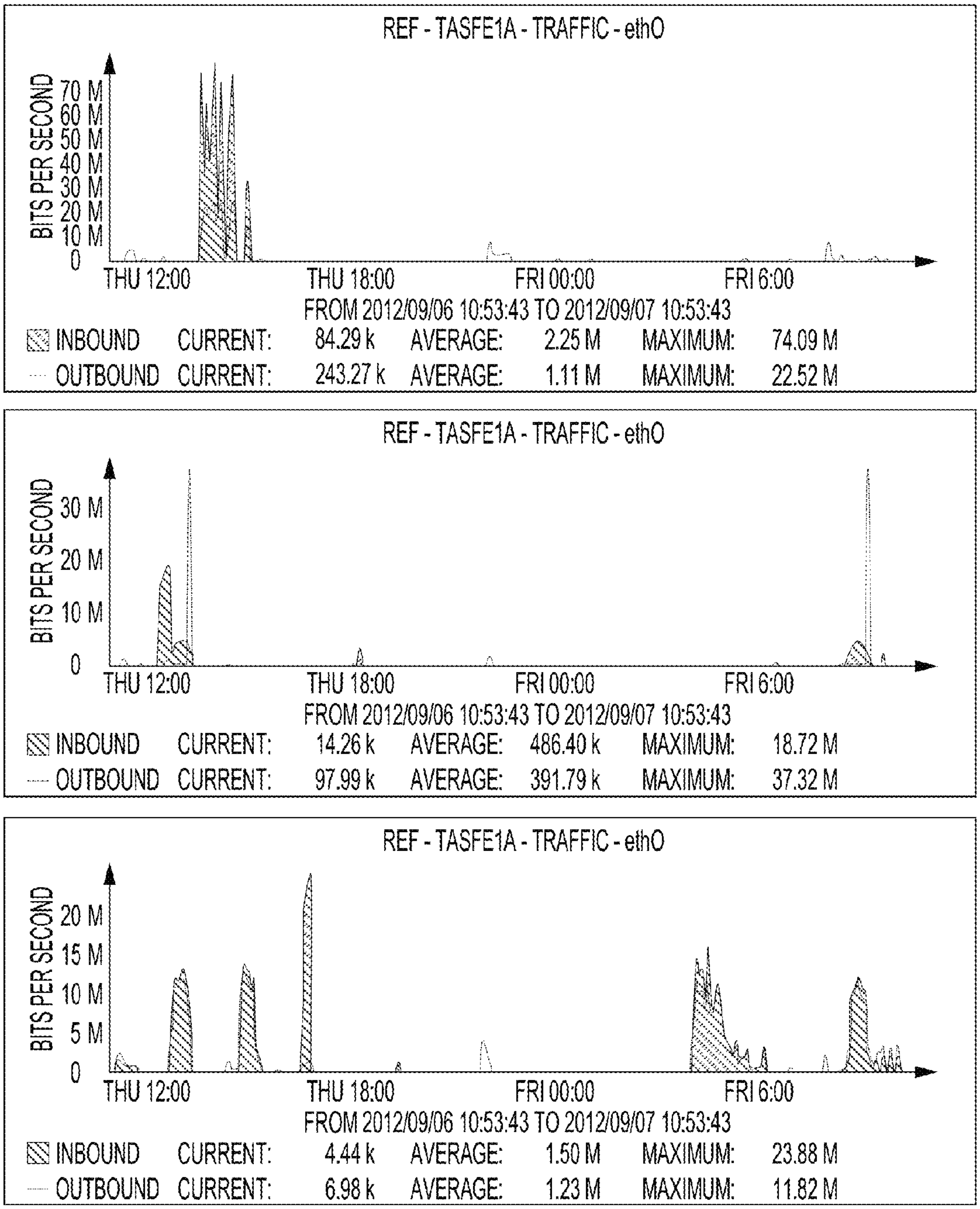

Historical data is also kept for reporting and trend analysis. See FIG. 80. The defaults for this includes: CPU Load, Memory Usage, Disk Usage and Network Usage; Additional metrics are available as an option.

2.5.6 Backup

Snapshots are used that allow the solution to have a very quick turn around on recovery—typically around 2 hours for a downed instance (This does not include re-integration with the application architecture). Snapshots are taken once a week as a default, and also taken before any system or application upgrades for roll back purposes.

2.5.7 Additional Managed Services

Additional services provided include: Applying new CSS; Accommodating upgrades to ensure continuing operation of the Managed Software, and assisting the REDUP Support Services organization in the installation and configuration of the upgrades on a time available basis; Assisting with system capacity planning and forecasting for the current architecture of the production system running the Software, including interfacing with Motion Computing to understand potential loads on the system due to Motion computing-planned events, marketing campaigns; Managing the addition of necessary additional system resources, such as servers and storage, including for backup and recovery; Managing configuration of the system to accommodate changes by Motion Computing and required third-party software providers.

2.6 Support Services

Support services include the following: Active monitoring of system; Incident ticket management; Fault correction; Help desk services.

Alternative Embodiment 4

In some alternative embodiments, REDUP facilitates harnessing the potential of data in connected and interconnected devices, and addressing the associated growing markets that are transforming businesses. REDUP end-2-end tools and services help companies not only make great products but to make products which are not left behind in the fast pace of change. REDUP facilitates extracting data from connected devices, merging this data with other big data sets and driving this via business solutions into improving customer's product, device and end user relationships.

Figure 81:
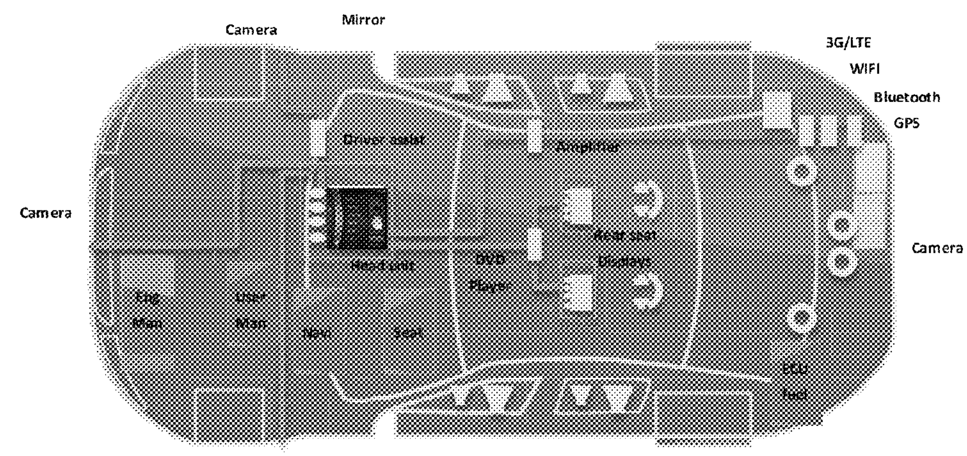

Tag Line: The Internet of Vehicles. Consumers expect a Smartphone like mobile services experience in their car. Car Manufacturers want to learn more about their products and how it is used. See FIG. 81.

Figure 82:
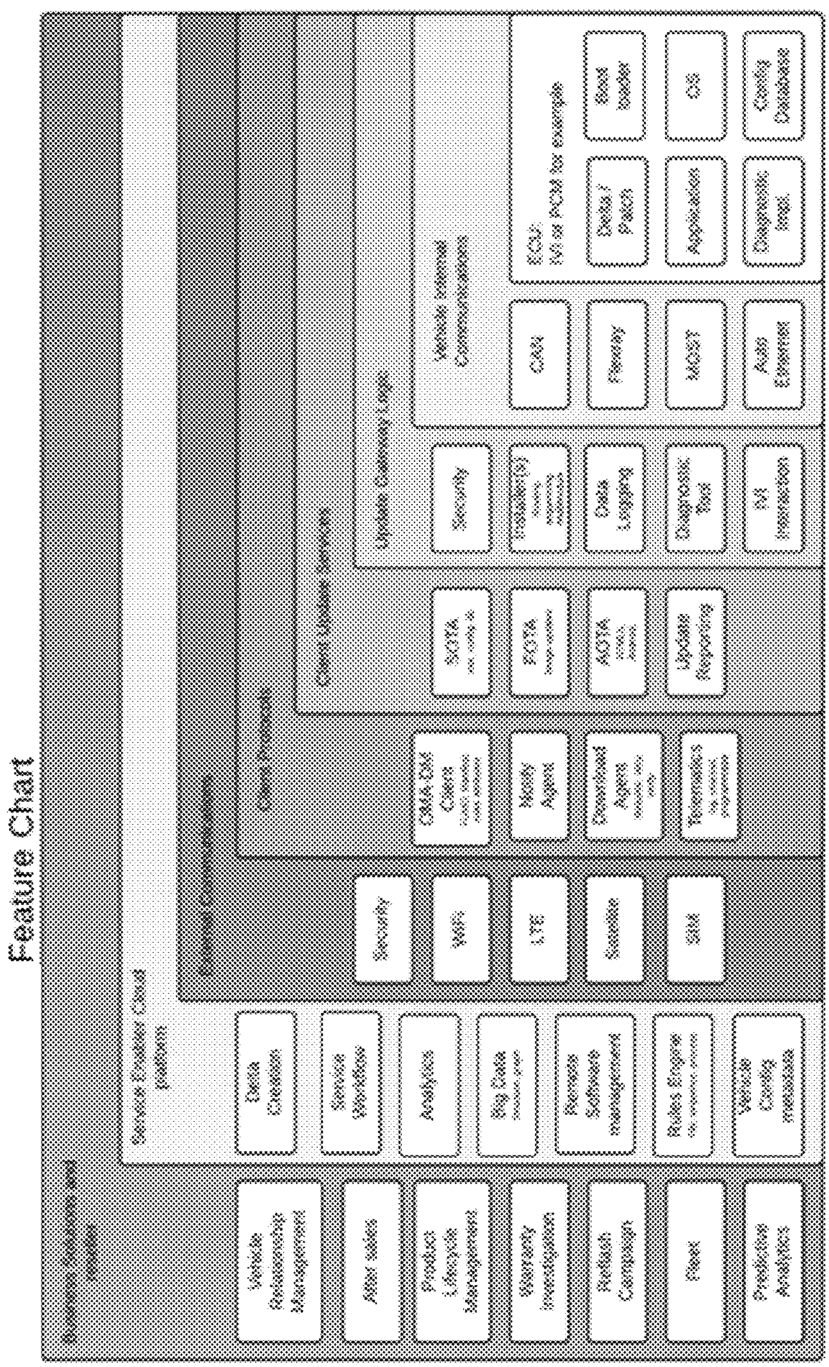

Auto Case. See FIG. 82.

FOTA/SOTA Experience—Joint Solution Scope. REDUP provides the integrated, cloud-based solution for remote vehicle software configuration management. Movimento Venturo provides the market leading vehicle software reflash technology. Together we deliver secure and robust in-vehicle software updates with a proven end-to-end workflow for creating, verifying, packaging, and installing software updates to any Electronic Control Unit (ECU) of a connected car. Supports all possible automotive communication technologies, including CAN, USB, Ethernet, FlexRay, LIN, MOST. See FIG. 83.

Figure 84:
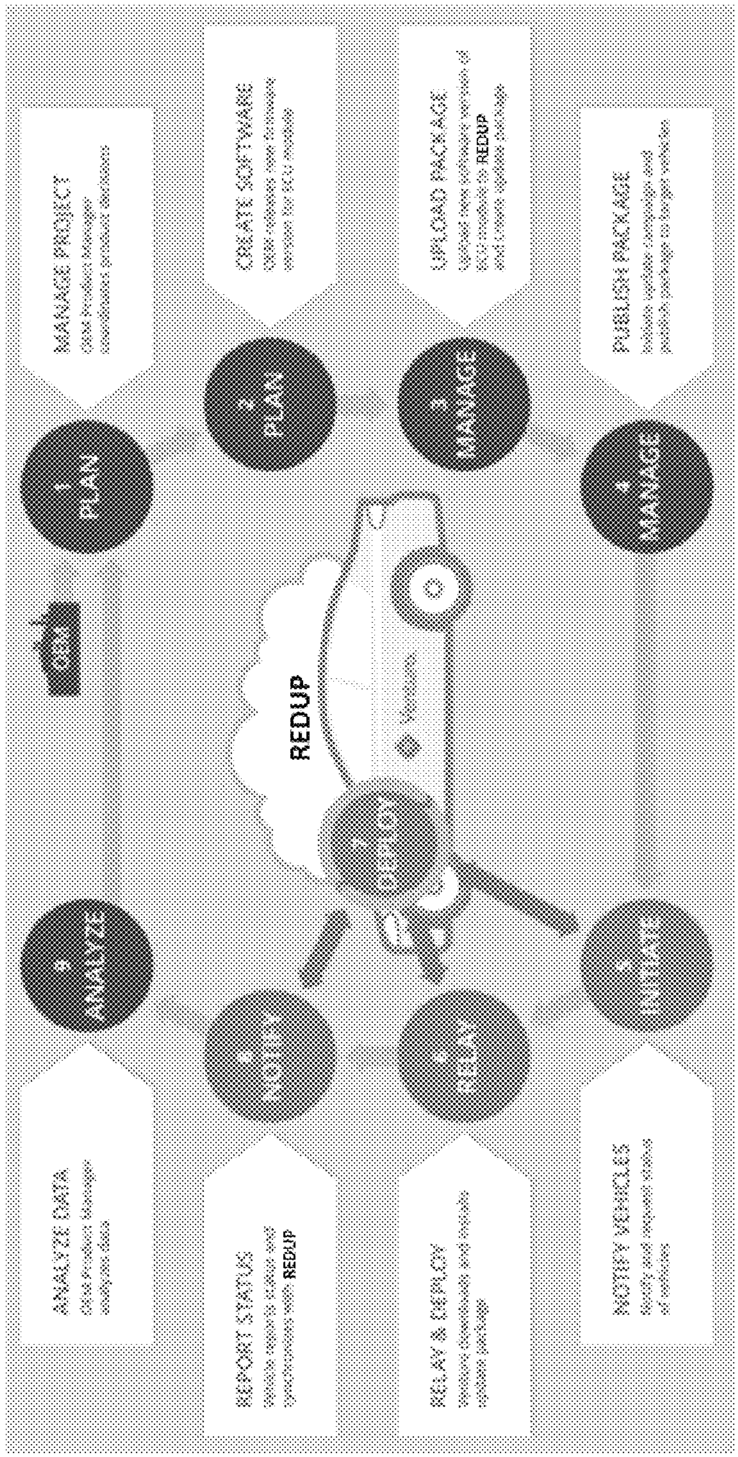

FOTA/SOTA Experience—Principle Workflow. See FIG. 84.

Figure 85:
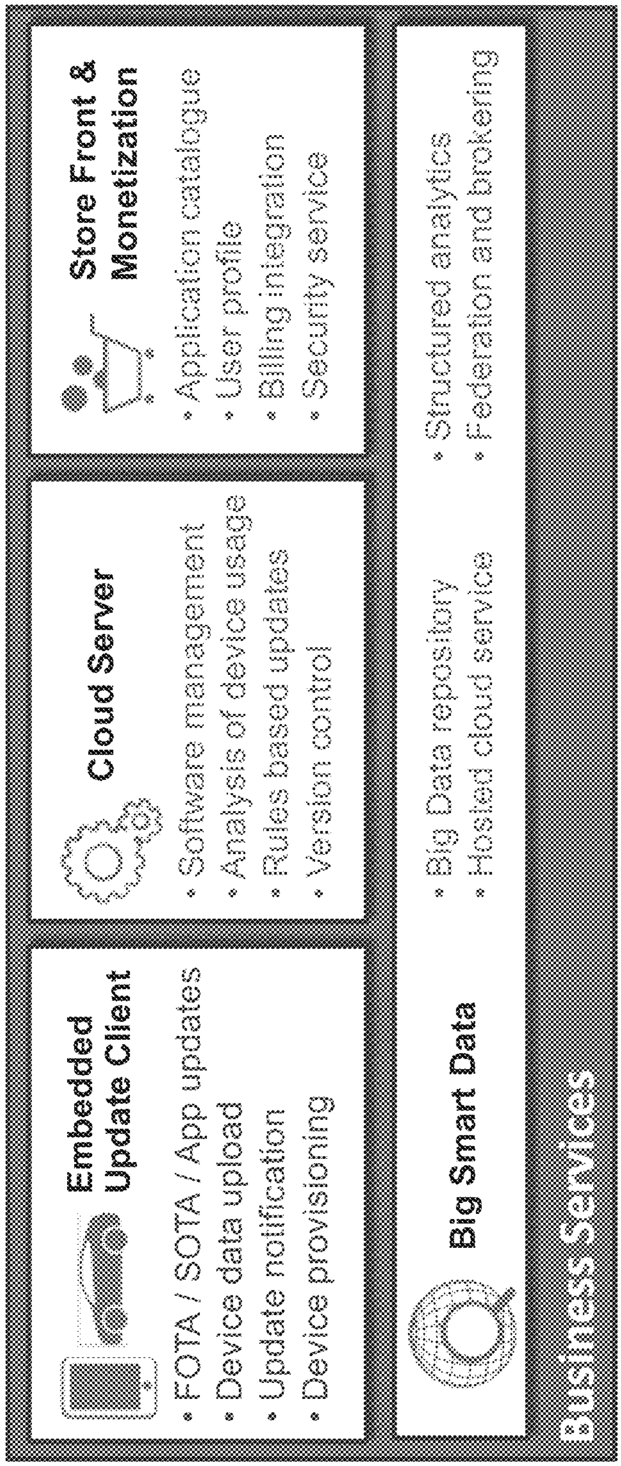
Figure 86:
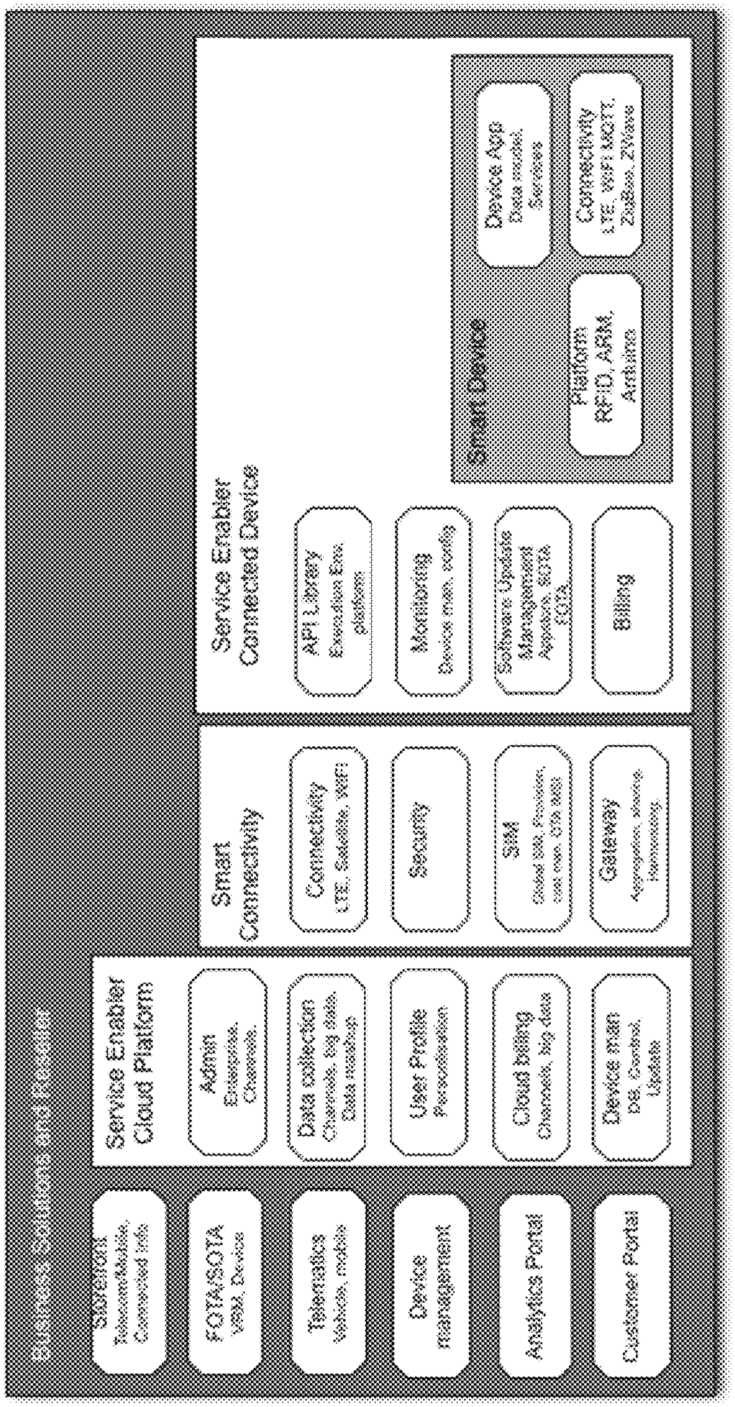
Figure 88:
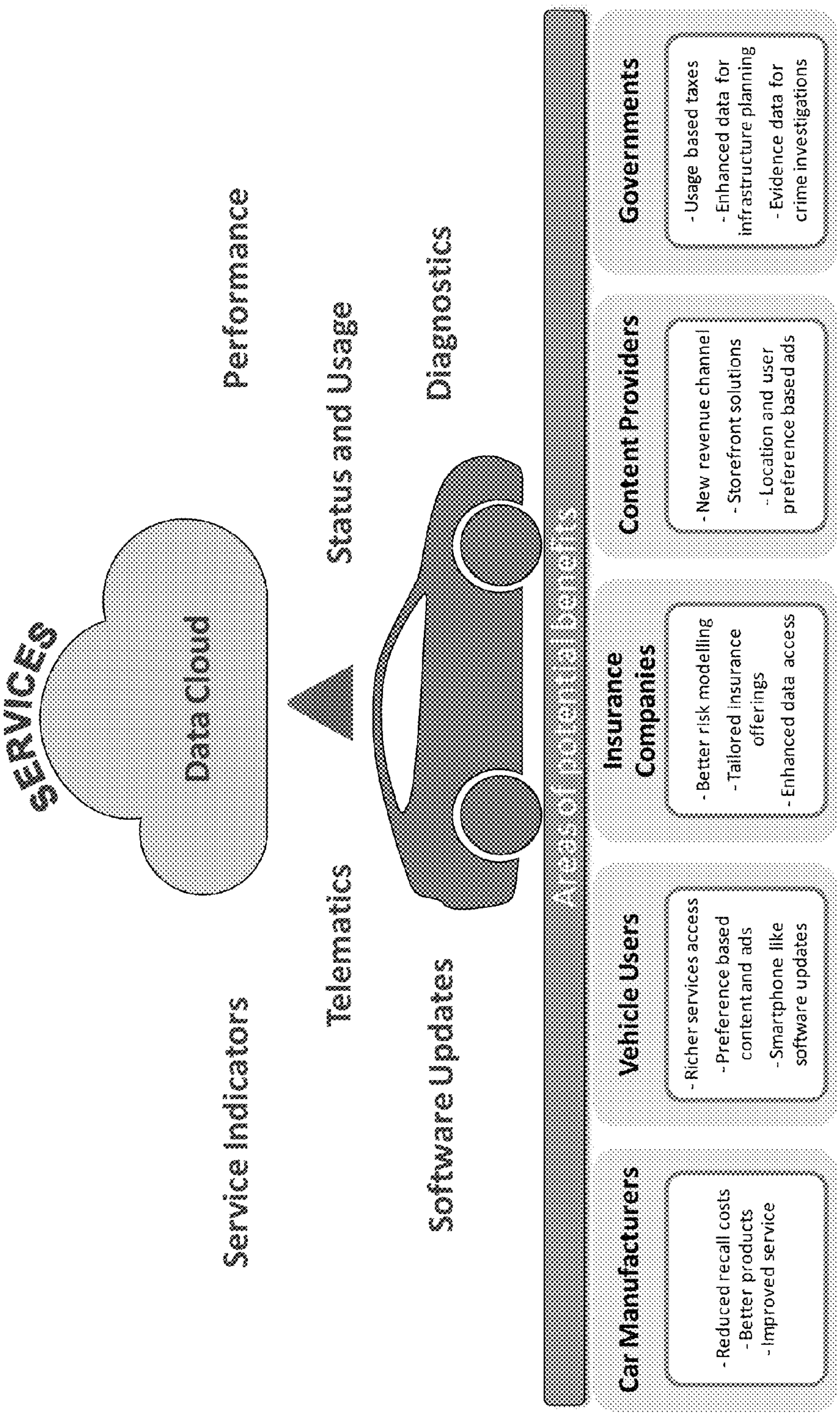

The REDUP Solution. See FIG. 85. Benefits include:

- Designed as a holistic solution for managing connected devices and services
- Highly flexible using common protocols for all REDUP services
- Integrated analytics backend for harnessing the value of data Architectural Overview. See FIG. 86.

REDUP Feature Summary. See FIG. 87.

Target Customer.

Initial TARGET SEGMENT is Automotive for REDUP VRM

- Primary target customers are Automotive OEMs (enabling Connected Car)
- Secondary targets are Tiers (as white labeled solution)
- Second Target are Players in Other M2M Verticals
- Operating a network of devices with connectivity
- Providing services to connected device networks
- This covers industrial, healthcare, retail and other appliances
- Third Focus are Carriers and Infrastructure Vendors
- Entering the automotive space or providing value added M2M services Planning to provide a white labeled solution to the M2M/Auto market Enablers for REDUP Technology Sales are Silicon Suppliers Pre-integration of REDUP in latest Automotive/M2M silicon platforms Joint demo showcases widely leveraged in trade-shows and customer meetings Sell with/through approach Example: The Connected Car Market—Potential Customers and Value. See FIG. 107.

Example of visualization of data.

Business Value of REDUP

Customer Challenges

Remote managing diverse sets of connected devices using different technologies

Accessing device software, applications and user/usage data from these devices

Structuring and processing data to extract monetizable value and insight

Providing application and content access to users of these devices

Managing technology from different suppliers to provide a full solution

REDUP Business Value

Offers a holistic approach to address the aforementioned customer challenges

Uses a common standards based foundation for providing these services

Prepared to support any kind of connected device and operating environment

Uses a future proven semantic web technology approach for data handling

Supports flexible business and deployment models based on customer needs

REDUP Addresses Typical Immediate Customer Requirements

Centralised Management FOTA/SOTA/AOA updates

Log file/Telematics data uploads

Management of update packages

REDUP is a Solution that Addresses the Need to Enable Customers to Maximise the Monetization Potential of Their Devices Cloud based end to end management of their Connected Devices Advanced data collection and monitoring of devices Analytics of device data to drive quality and innovation, monetize on services Automotive Tagline: Enabling the Internet of Vehicles. With REDUP we have a platform that can respond with a clear value proposition to various types of expressed customer needs including:

Vehicle Relationship Management (VRM): Product management and software focused management of vehicle. Minimizes recall Firmware over the air (FOTA): Addition of over-the-air capabilities to firmware updates Software over the air (SOTA): Software updates to file-based high end PC-type ECUs such as IVI Device Management for Vehicles: Application of device management techniques to the vehicle industry Connected Services/Connected Infotainment: Combination of cloud or in-vehicle technologies supporting offboard interactions including apps/execution env, content, download and update clients, hosting Vehicle Application Store: Delivery of application in the automotive case. Specialist app store Big Data Data and Structured Data analytics: Offloading and processing telematic data as part of a big data strategy Vehicle Relationship Management Business challenges:

Between 60 and 70% of vehicle recalls are due to software faults

Typically, recall involves 100 k to 1 million cars—and huge cost

Remote software management and updates solution needed

Solution:

REDUP supports remote software management

Client/Server solution with telematic client delivering structure data to the backend in a Big Data Graph format Vehicle configuration and cached vehicle telematic data provide picture of state of car and enables targets updates to vehicles Data can also be use to drive additional Value added services Benefits:

End to end solution for software update incorporating FOTA/SOTA and App-store solutions Reduced time to release, deliver and apply fixes Subsequent reduced recall rates Reduced need to revisit service centers and happier customers Vehicle FOTA. See FIG. 83.

Business challenges:

Many OEMs are investigating the ability to update ECUs over the air.

Existing tool-base services

OEM have a steep learning curve with OTA and SW in general

Massive emerging market

Solution:

Provides leadership in this area

Partner with Movimento to provide a cloud managed ECU update service

Centralized approach puts connected services proxy in the vehicle to manage and install updates Customized Delta algorithm (Redbend strength)

OMA-DM compliant solution

Benefits:

Strong partnership with Movimento bring industry credibility. Movimento flash as a service Venturo provides centralized CAN update strategy REDUP provides powerful and proven cloud services for an end to end platform Vehicle App Store. See FIG. 89.

Business challenges:

Vehicles increasingly providing personalization

Downloadable applications and per-user experience

Vehicle not like mobile device but should deliver much of the experience of the mobile industry Solution:

Cloud server manages versioned applications

Segmentation of vehicle markets

Monetization with purchase manager component

REDUP Storefront client for Android, HTML5, QT, Tizen

Benefits:

REDUP Storefront built on successful mobile application store.

Vehicle Device Management

Figure 91:
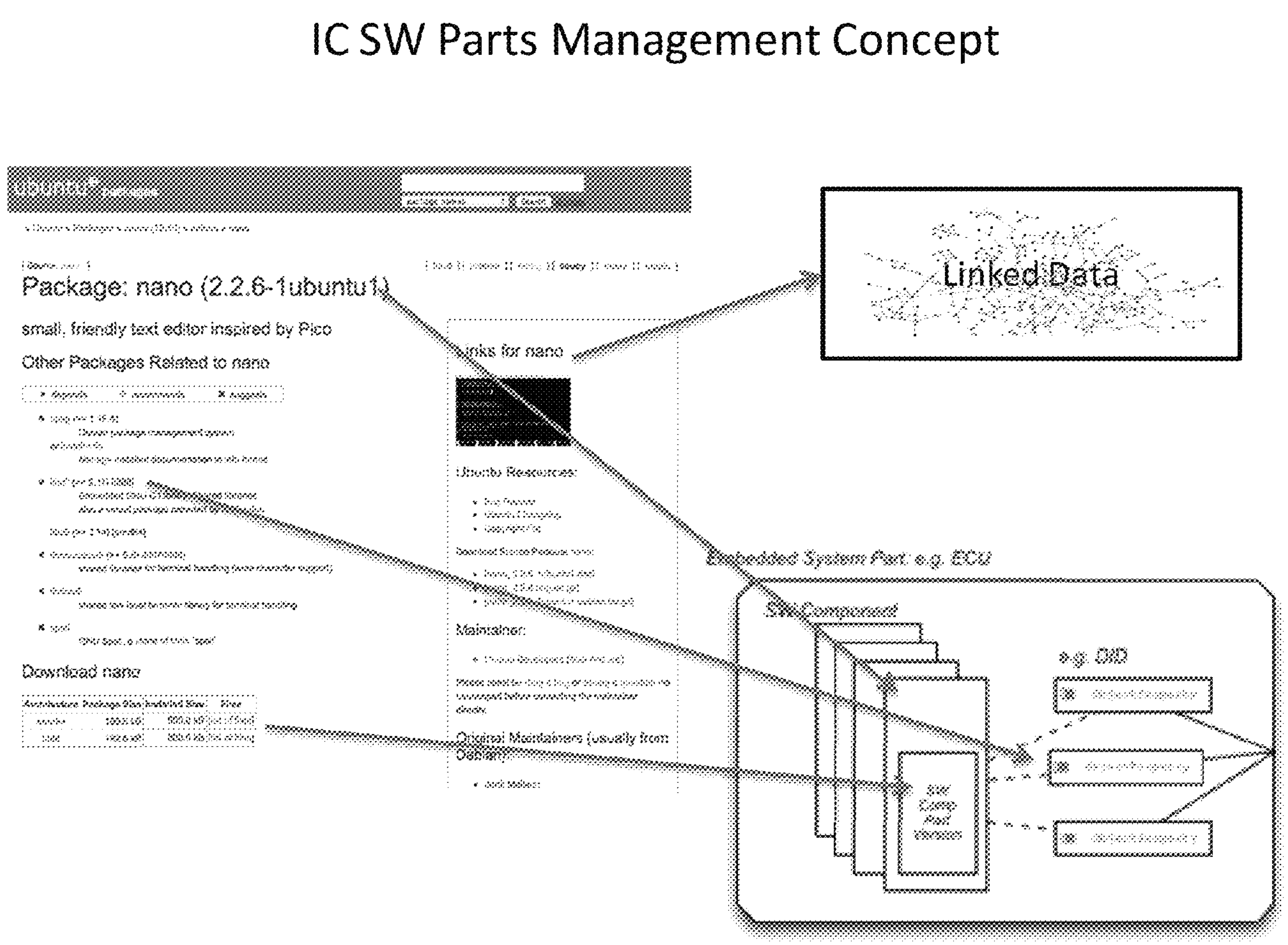
Figure 92:
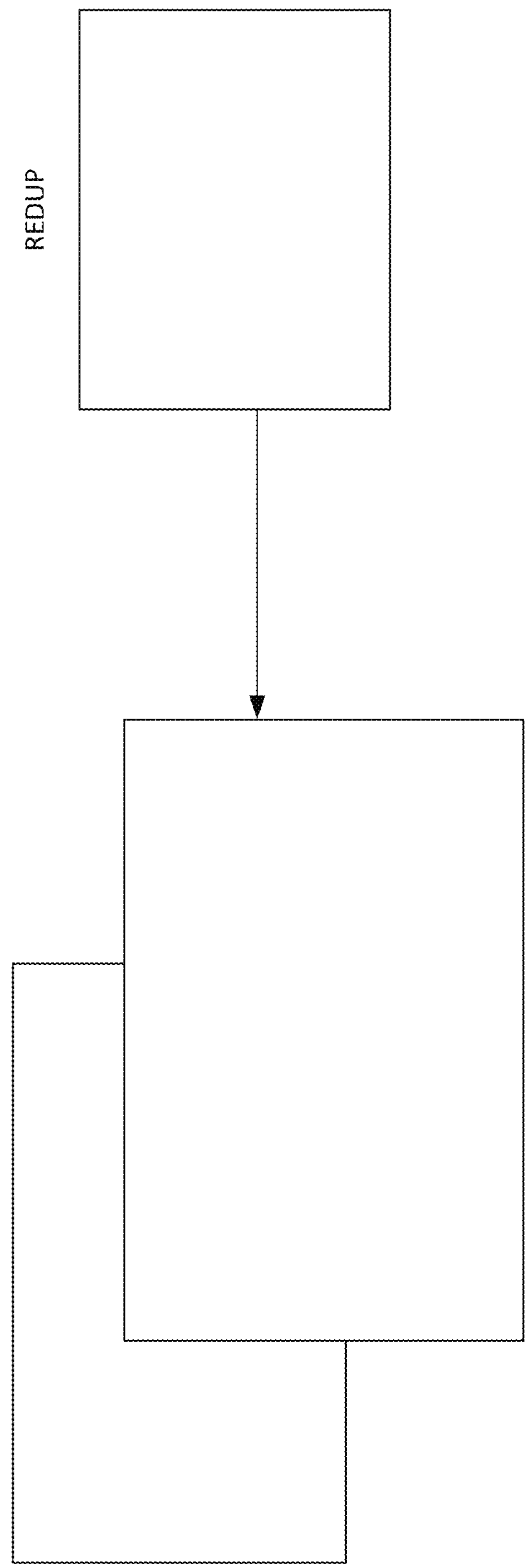
Figure 93:
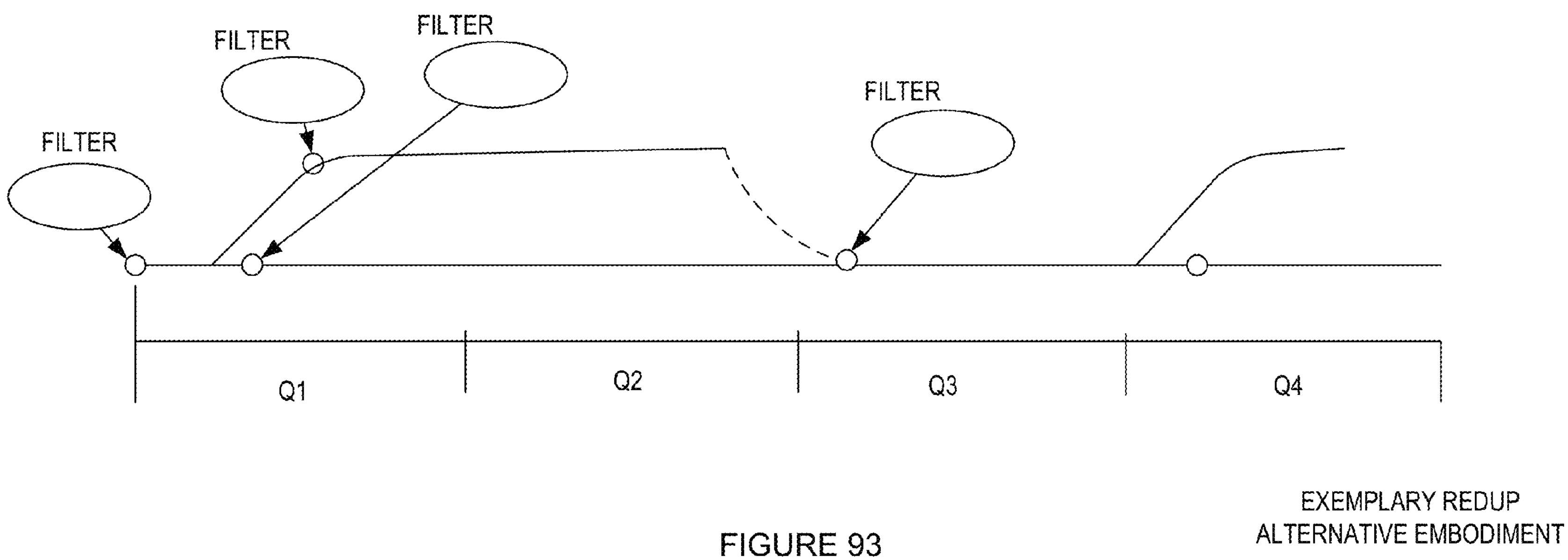
Figure 94:
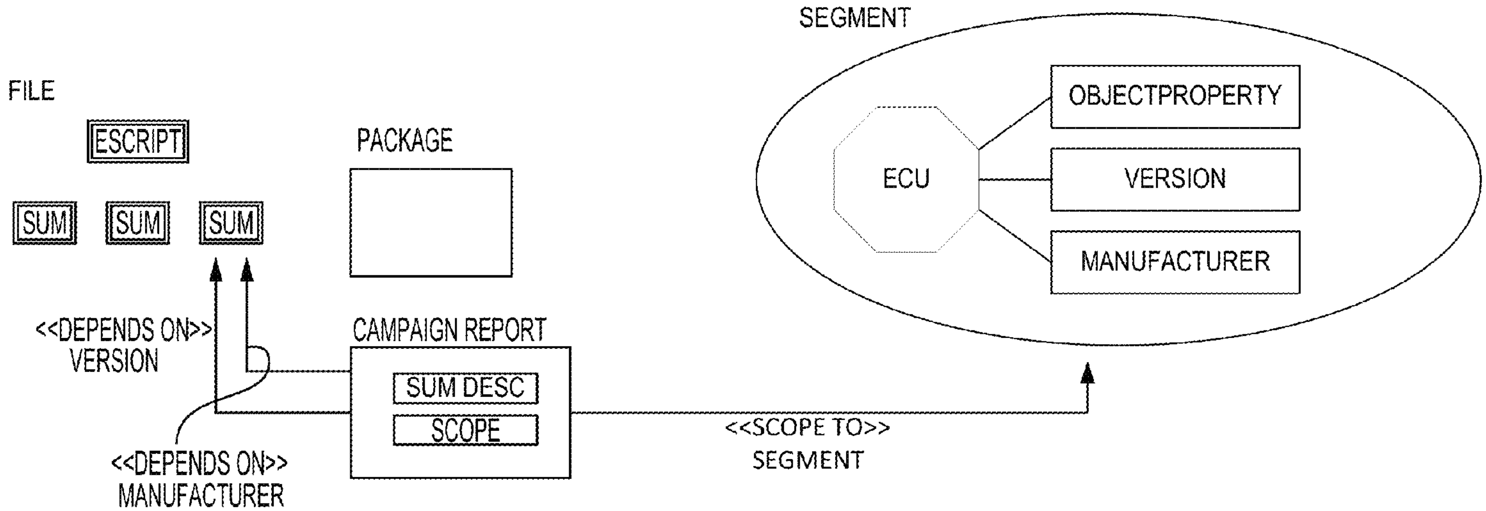
Figure 95:
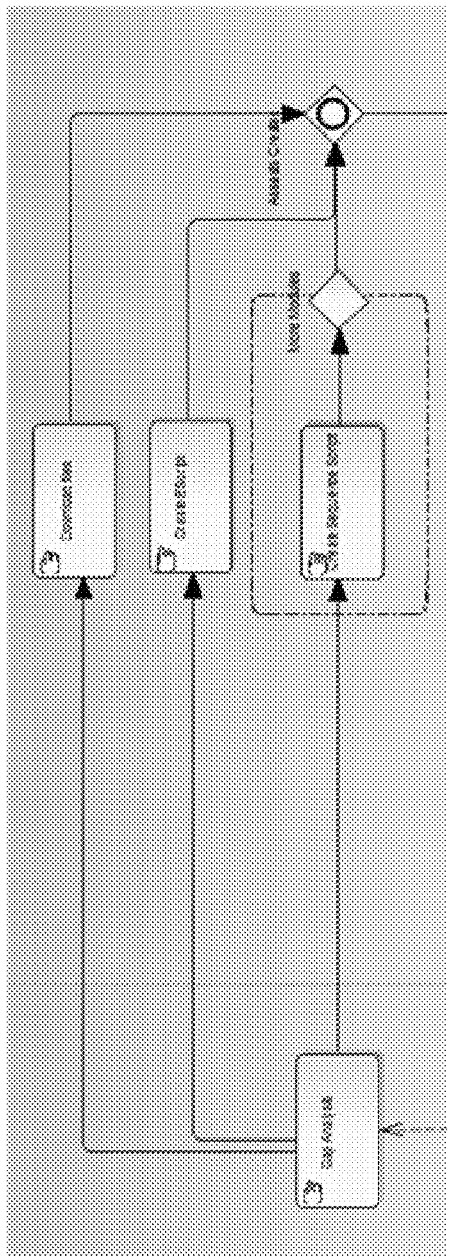
Figure 96:
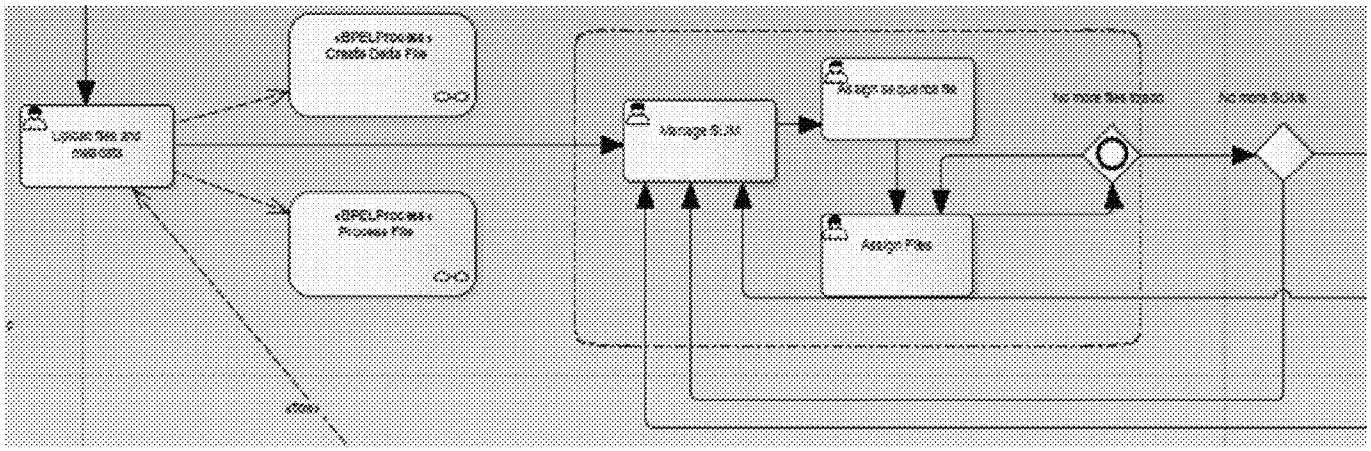
Figure 97:
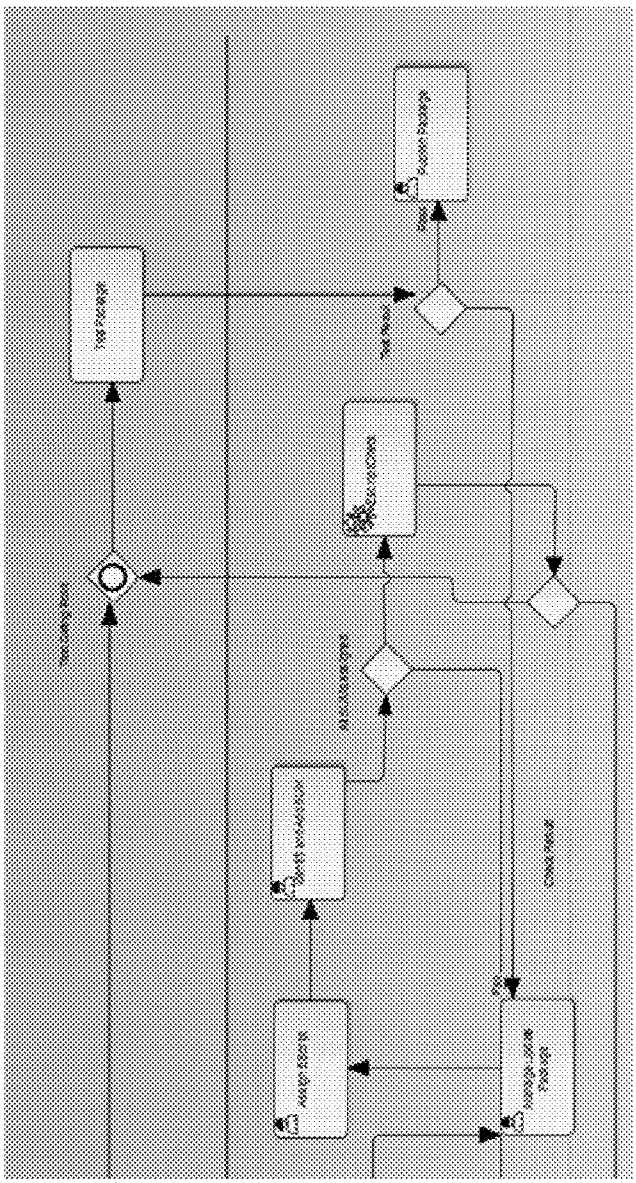
Figure 98:
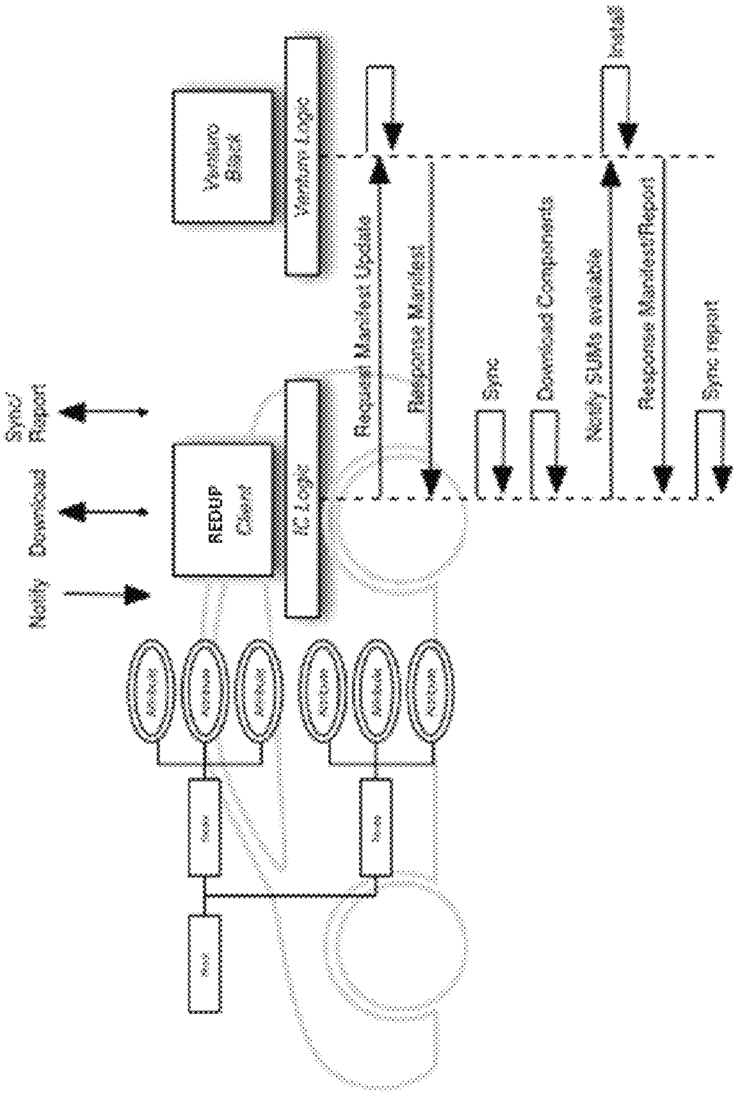
Figure 99:
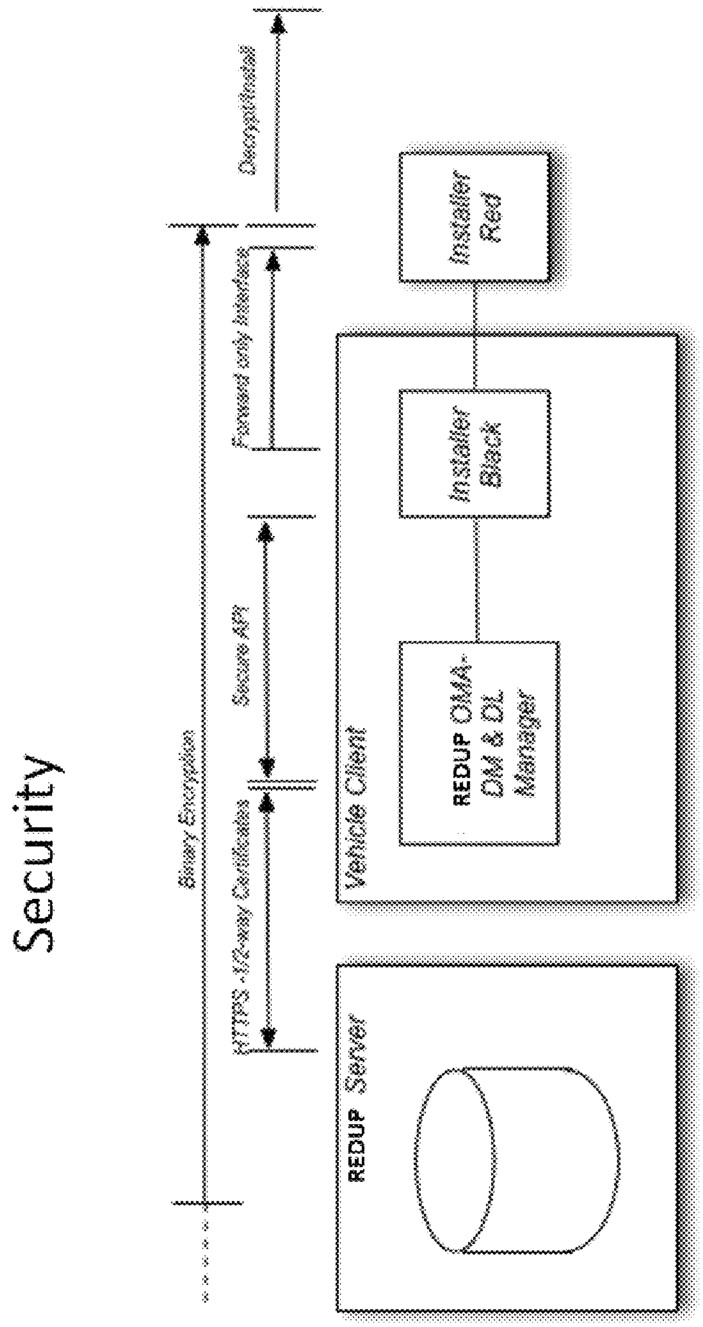
Figure 100:
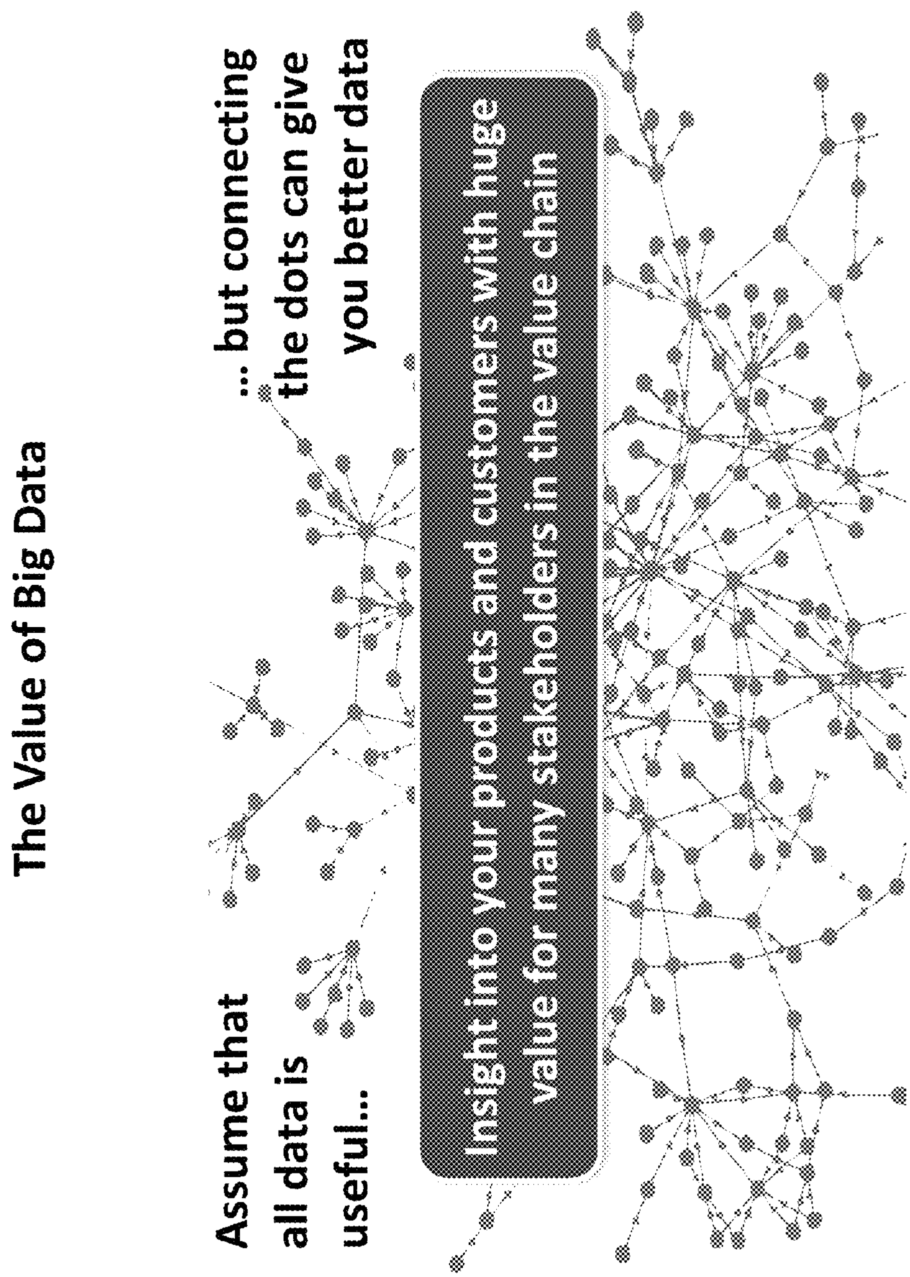
Figure 101:
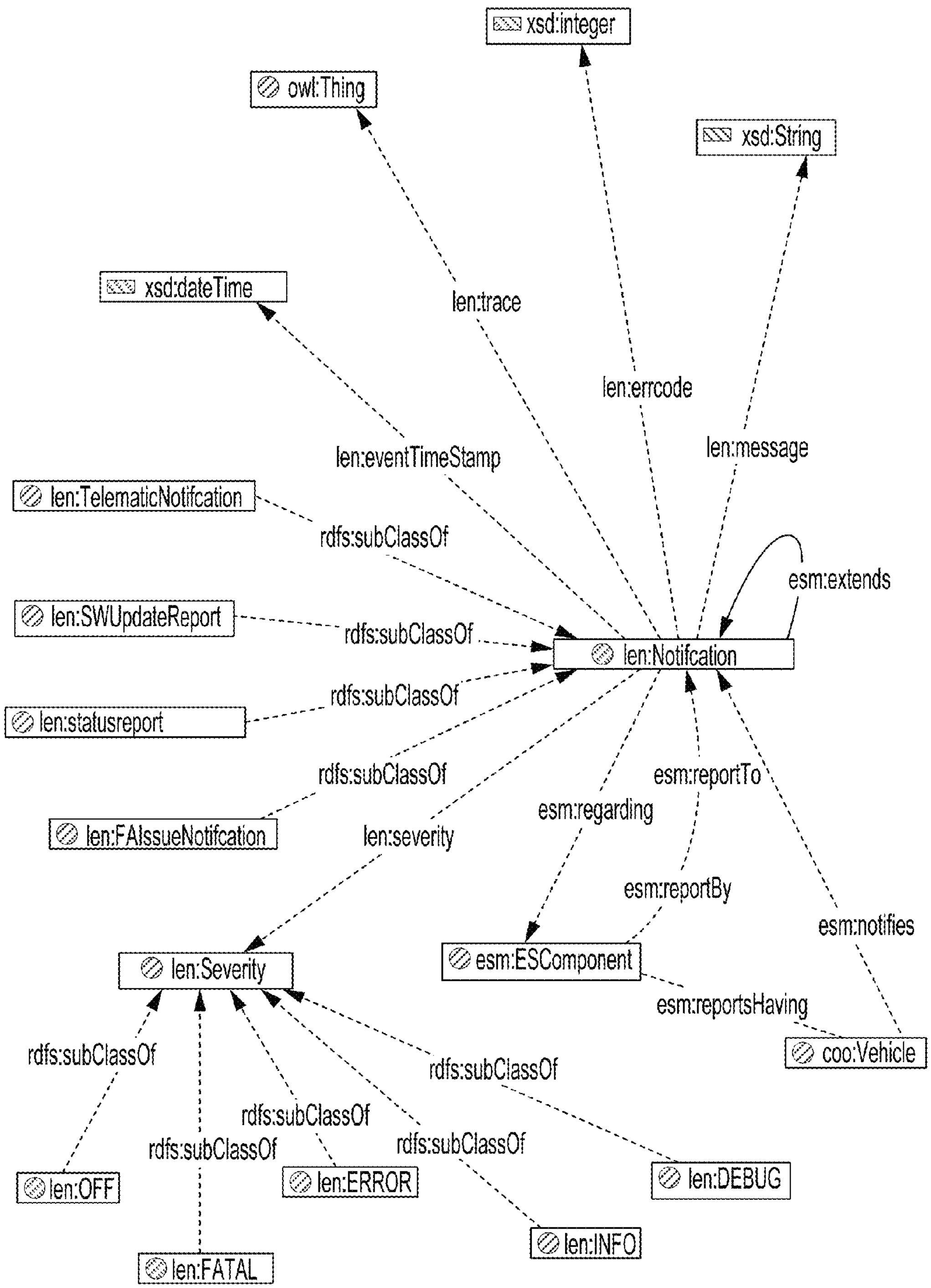
Figure 102:
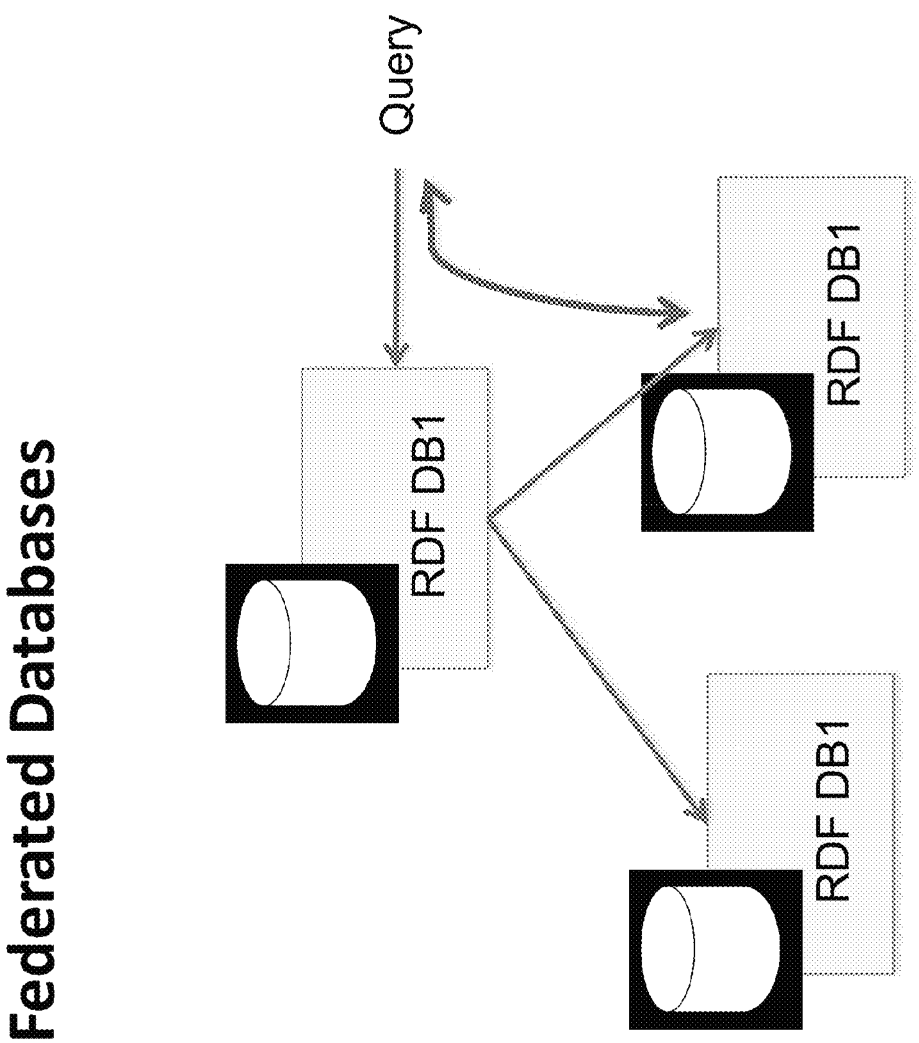
Figure 103:
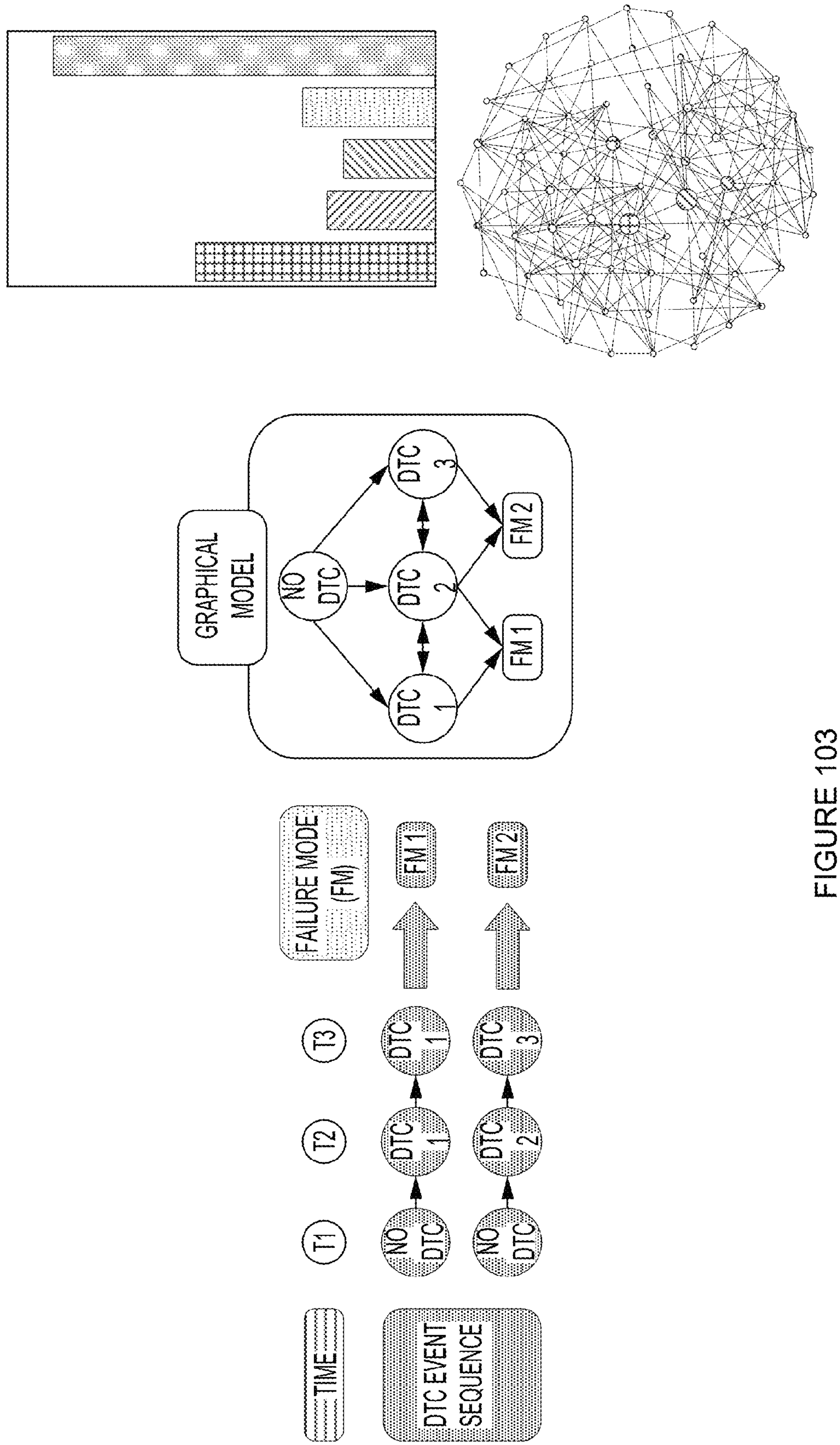
Figure 104:
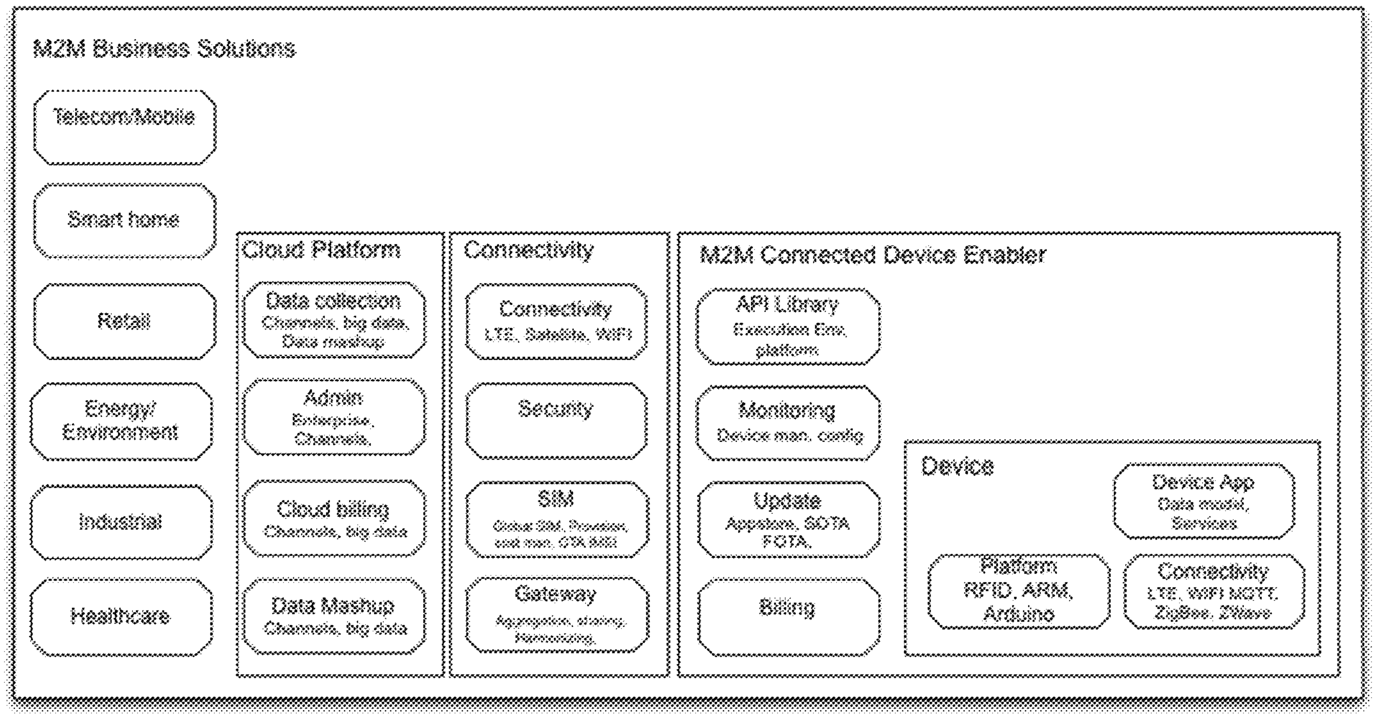
Figure 105:
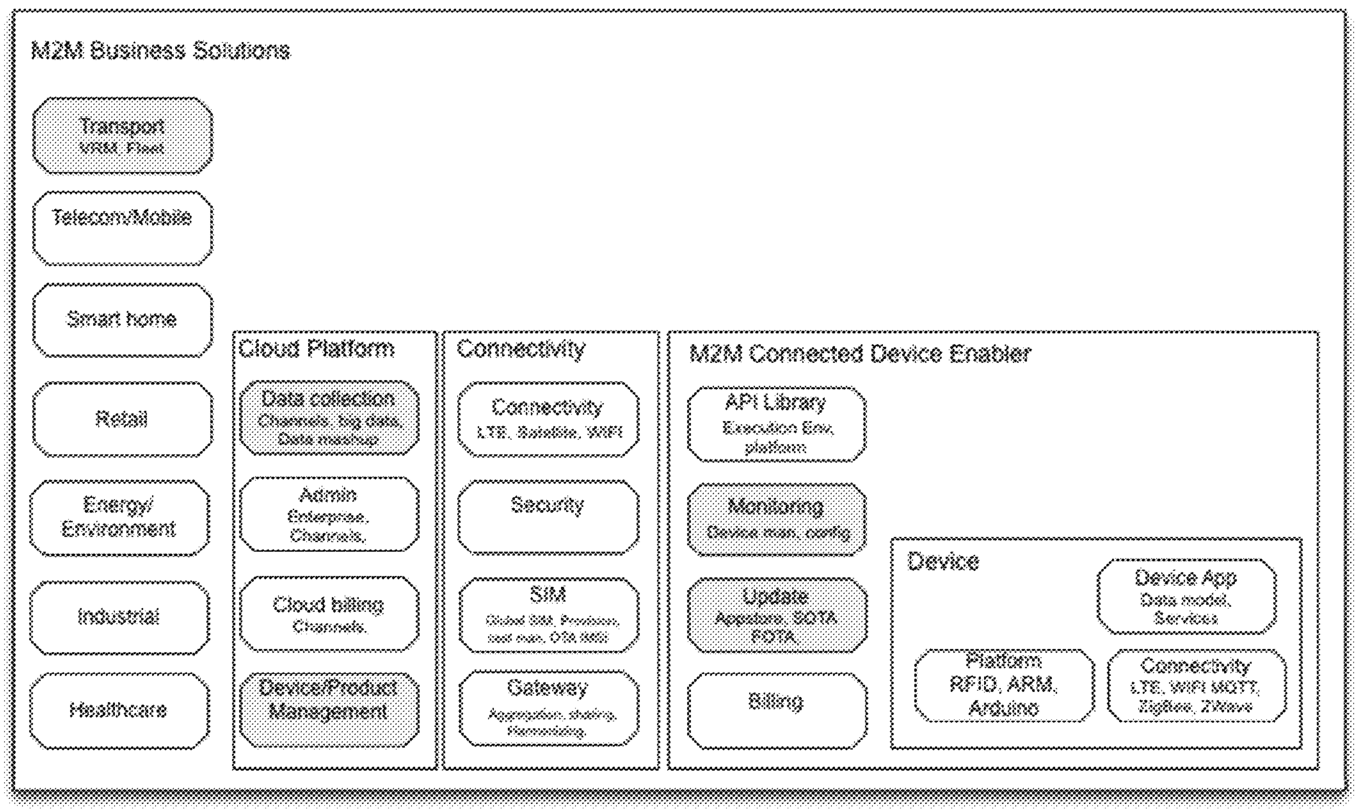
Figure 106:
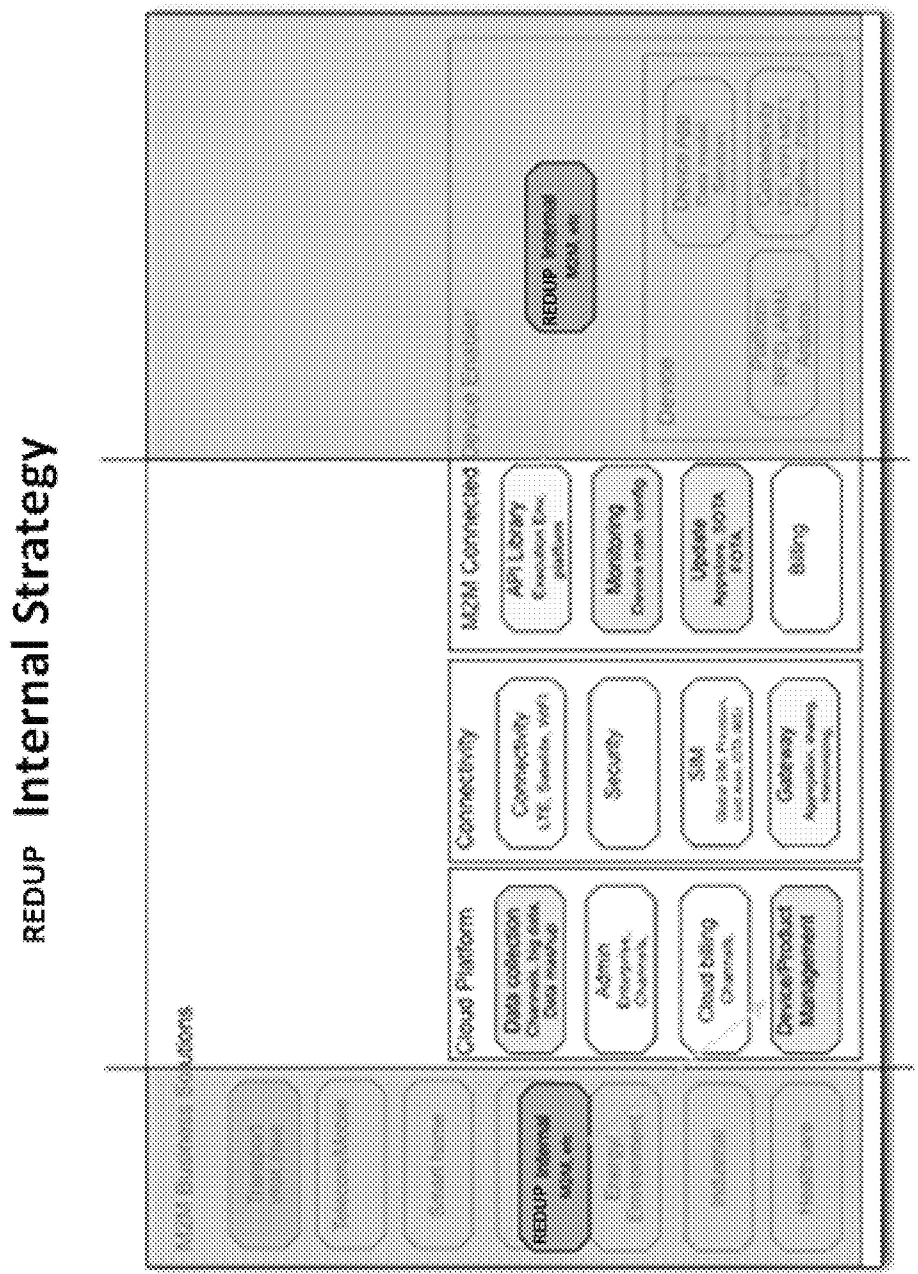

Business challenges:
Fleet markets demand increasingly sophisticated tools for monitoring vehicle state
Fleet as a managed services requires telematic information to reduce vehicle downtime and emergency maintenance
Requires new tools for developing markets
Solution:
REDUP supports remote vehicle monitoring
Telematic client can pick up any exposed data
Client configurable notifications
Cloud server collects and distributes data
Benefits:
Client server can be used as a component of a range of device management applications
Vehicle configuration can be updated remotely for a range of outcomes
Data can be linked readily to other data sets—Internet of Things
REDUP Technical Overview. See FIG. 90.
Specifications:
Devices report data in an extensible format
Data drives applications including VRM
Vehicle relationship management:
SW management application
VRM Workflow drives main use cases:
FOTA/SOTA/AOTA end to end processes
Vehicle model configuration and attribute management
Identification of parts
Vehicle device search
Software management organization
Cloud Hosted SOTA Platform. See FIG. 1.
Cloud Hosted Storefront Platform. See FIG. 9.
Overview of Remote SW Management
Product: Manufactured System
Product variations: lines, model variants etc
Includes parts
Embedded System Parts: Separately manufactured units. E.g. Auto ECUs
Software systems
Include SW components
Include attributes
SW/HW Components
Smallest manage entity
Software component parts identified by version number
ES Parts Management Model—Auto Case. See FIG. 11.
REDUP SW Parts Management Concept. See FIG. 91.
DOAP And Remote Parts management. See FIG. 92.
What to update
SOTA: File-based updates within a partition file system
Libraries
Binaries
Scripts
Configuration files
HTML5 applications
FOTA: Partition Image Update
CAN module images
Self update
AOTA: Catalogue-based Selection and Install
HTML5 applications
Android apps
Product Management Model—Auto Case. See FIG. 10.
How it works. See FIG. 2.
Identify: Analytics and roadmap (enhancement and feature) processes of software change triggering.
Scope-initiate: leading to campaign launch
Prepare: Collect artifacts for update
Execute and report: Campaign of notification, download and application of updates, workflow reporting
Modules, Packages and Segments. See FIG. 21.
Software Update Modules
Versions installation files
Delta files
SOTA/FOTA/AOTA
Can include sequence rules
File dependency rules
Packages
Collections of installation files
Versioned
Can include process files
Multiple packages per segment
Interfile dependencies
Segments
Targets packages to devices
Mix Mode—XOTA. See FIG. 8.
Multi-Segment example. See FIG. 22.
Devices can report parameters that place them in multiple segments
Packages can have update versions which are clones of the existing package
Segment Details
Role of the Segment
Describe products and product variants as segments. Products can identify themselves as belonging to multiple segments.
Create managed device groups linked to products and variants. Limits notifications and module rules checking
Manage updatable components and associated rules attributes within products and variants
Container for packages of updates
Segments filter device members according to immutable product attributes, VIN, model etc.
Core (root) segment
Segment branches further constrain members but keep attribute lists
Segments support complex device software management
Devices can belong to multiple segments
Segments are additive
Segments Link Managed Components and Managed Parameters
Parameters selected from overall ECU reported attributes
Used in rules
Reported by client
Segments and Versions Example. See FIG. 93.
Segments contain versioned packages of SUMS. Similar to code management.
Branching a segment enables the management of different package versions for subsets of vehicle within the parent segment
Package testing
Targeting small sets of specialized vehicles: preproduction, factory, test rigs, etc.
Adding VINs to branch segments takes them out of the root branch management
Branched can be merged
VINs can rejoin root
Segments and Attributes
Segments allow the partitioning of devices to groups of managed components that they may include
Managed SW components are elements of ECUs
Software update modules update the components
Software update modules have dependencies on reported ECU attributes Therefore segments declare the ECUs and ECU attributes that are reported by devices
Attribute Model. See FIG. 12.
Managing Parts and Attributes. See FIG. 13.
Packages. See FIG. 15.
Packages separate concerns
Via workflows: FOTA, SOTA, AOTA
Functionality: E.g. Attached devices for a gateway
Product: Model, Trim
Multiple packages may exist in a segment
Packages should be independent for the purposes of installation
E.g. CAN process, AOTA etc
SUM Attributes Flow—problem statement. See FIG. 94.
Package Templates—the Solution
Role of PTs:
To pre-associate a package with a Segment. Package picks up attributes of the segment
To allow files to be added to package without the binary being present: files can be added later
To enable FOTA sequence files to be associated: This allows the package to assert file requirements. Packages can only be enabled in a package if all the file requirements are met
To 'test' the package to identify the files to be downloaded to devices
Software Update Modules (SUM)
SUMs take a component from one version to another
SUM type workflows are as similar as possible: FOTA/SOTA
SUM Attributes for Rules. See FIG. 16.
Software Update Module (SUM) Rules depend on vehicle attributes linked to the segment
Can also depend on other SUMs
FOTA Module Preparation. See FIG. 95.
Sequence file: coordinates the CAN install of the component
SUM can contain multiple modules for the ECU
Gap Analysis: identifies changes to the existing sequence file for the ECU
Create sequence script
Create EScript. Process file used for orchestrating multiple SUMs.
Download files. From external SW vendor
Uploading FOTA SUM Modules. See FIG. 96.
User uploads all files to the server: SW update, EXE, SBL, Sequence, EScript
Workflow can plugin delta creating and other file processing tasks
System read sequence files and requests user to upload/associate Modules
Uploading FOTA SUM Modules. See FIG. 97.
Package
FOTA and Venturo Interworking. See FIG. 98.
Overall FOTA Module workflow.
Security. See FIG. 99.
Security is an end-to-end issue
We use a combination of techniques to secure packages—see above FOTA case
Encryption can start from Tier 1.
Delta can only be applied to unencrypted filed on the Installer sandboxed side (Red)
The Value of Big Data. See FIG. 100.
Benefits of Semantically Tagged Data
Semantically tagged and unstructured data
Concept of storing data in an unstructured database
Data can be organized in graphs using ontologies
Represent the data using the Resource Description Framework (RDF)
Open standard: World Wide Web Consortium (W3C) specification
Basis of linked data
Gives Big Data meaning
But what does it do for us:
Vehicles can self describe—say anything
Separates changes in connected device data model from the DB
Supports back end management of data via Ontologies
Supports Analytics with built in inference
REDUP Data Strategy.
Separate connected devices from the DB
Provide ability to collect any type of data
Link device data with other data sets:
Environment
Product
Use a data format that supports sharing
Create a virtual single repository
Let analytics discover the relevance of the links between data sets
Big Data Architecture. See FIG. 26.
Example of Graph Data & Ontologies. See FIG. 101.
Federated Databases. See FIG. 102.
Supported by SPARQL standard
Can be used in distributed DB cases
Big Data and analytics. See FIG. 103.
A probabilistic graphical diagnosis model to capture the causality between DTC occurrences and various failure modes
A combination of DTCs could be symptom for multiple failure modes. The timing and the sequence of the DTCs could be leveraged to predict the occurrence of a specific failure.
M2M
Emerging practice of Interworking between connected devices directly.
Less direct user interaction
M2M Business 2 business services
M2M and the Internet of Things
M2M smart connectivity
REDUP and M2M
REDUP is an M2M platform
M2M Services. See FIG. 104.
M2M Services and REDUP. See FIG. 105.
REDUP Internal Strategy. See FIG. 106.
Feature Overview. See FIG. 107.

Alternative Embodiment 5

1. Terminology

In some alternative embodiments, the following terminology may be used:

Platform
The OS or environment on which LENC executes. The Platform should provide various interfaces for LENC to function
Event
Either a fault notification, a status report, or any other logging notification that is recorded by LENC
RDF
Data stored in a series of Subject-Predicate-Object triplets
Session
Describes the events that are recorded during the execution of a process Application A program or process that requires the reporting of log events Message A string of text provided by the application as part of a log event Payload Any additional RDF data associated with an event provided by the application Context Additional RDF data supplied by LENC to add additional meaning to an event. E.g. device identity 2. Event Logging Methods LENC allows events to be logged in two ways; via a long-running process, called a Daemon; or by an application directly invoking the Logger API using the shared C library.

Daemon

Log events are sent via an IPC mechanism to a daemon, which is responsible for storing them into an RDF database. The events that are logged during the execution of a daemon belong to a session.

Direct

The use of the shared library directly does not invalidate the use of a Daemon process. The Daemon may still be responsible for the storing log events, upload and reduction of log files.

Figure 108:
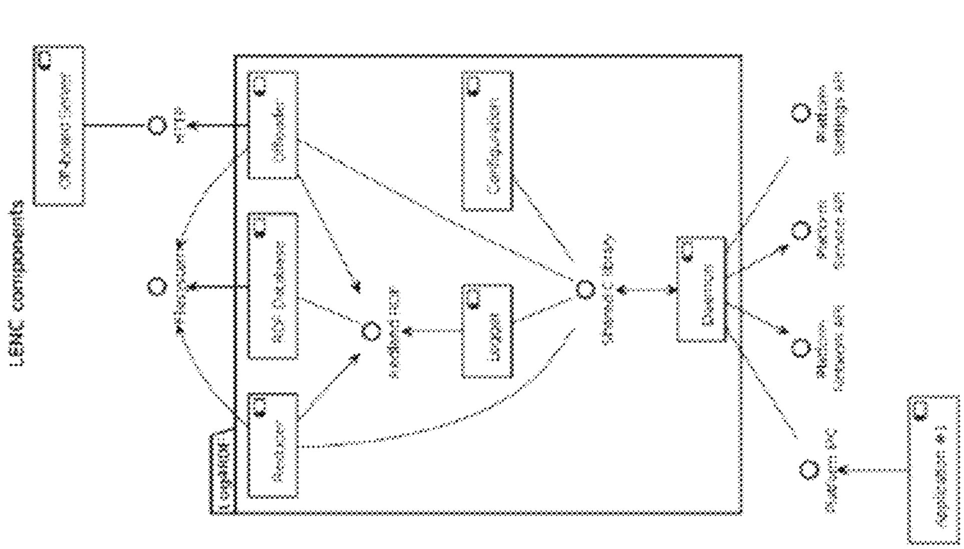

3. Components—Shown in FIG. 108.

3.1. RDF Database

The RDF database is used as a store for RDF triplets. The database exists in two forms;

1. In memory

All RDF data is stored in-memory by the Redland RDF library

2. Filesystem

There are three options for storing RDF data on the filesystem:

1. SQLite database.
2. Exported RDF/Turtle files. This option may be used for some files (like configuration) that may be changed by LENC in runtime.
3. Compressed or ZIP RDF files. This option will be used to reduce the statements from the in-memory DB before sending to the server.

3. Interface: Redland RDF

Redland RDF is a C library which offers an RDF storage and query API.

4. Redland RDF->Filesystem

The RDF database will be persisted to disk periodically, prompted by business logic determined by the Daemon or Offloader. Also, Reducer may persists statements from in-memory DB to the filesystem according its own business logic.

3.2. Offloader

The Offloader is responsible for uploading RDF triplets extracted from DB to a remote web service. If Offloader was triggered by Reducer to reduce the amount of disk space taken by reduced triplets, it may delete the oldest files in order to free some space.

Interface: Shared C Library

The Offloader interface is described in offloader.h.

Offloader->Reducer (via Shared C Library)

Once the Offloader has uploaded RDF triplets, or remove some files per Reducer request it reports to the Reducer to check for memory or disk limitations.

Offloader->Filesystem

The Offloader utilizes a temporary location in the filesytem to store exported RDF log files before they are uploaded to the server.

Offloader->HTTP

Offloader pushes this data exported to FS by Reducer to the Off-board server HTTP endpoint.

The Offloader will provide all headers and authentication to the HTTP endpoint.

Offloader->Platform Network API

Offloader uses needs to determine if there is an active internet connection before uploading log files. Also, Offloader has an interface function to be notified about network connection state.

3.3. Off-board Server

The Off-board server exposes a HTTP endpoint that allows log files to be uploaded when a network connection is available.

Interface: HTTP

A HTTP interface that accepts HTTP POST requests to upload compressed (gzip'd) RDF data in Turtle format from devices Log will be uploaded as files in multipart/formdata encoding. The filename format will be: <Device ID><delimiter><timestamp>.ttl.gz The REDUP server will ignore the format of the uploaded log files.

One file can be uploaded to the server at a time. Any additional files supplied in the multipart request will be ignored.

The endpoint should accept both content types of text/turtle and application/gzip. In the case of application/gzip the GZIP'd content is assumed to be text/turtle.

Where:

Device ID is the unique device identity For Connected Infotainment this is the vehicle VIN. This will be communicated to the LENC client, so will utilize a configuration interface.

delimiter is a character that does not occur in a Device ID timestamp is unix time. Timestamp is included to ensure filename uniqueness This interface should support HTTP re-directs.

The maximum length of time a request can take should be configurable.

3.3.1. Authentication

The Off-board server HTTP(S) endpoint used by the Offloader is secured by either one of the following mechanisms:

3.3.1.1. Basic Authentication

The device identity (or VIN for Connected Infotainment) will be used as the username.

The password will be the pre-configured shared secret.

3.3.1.2. HMAC Encryption

New HTTP header

Authorization: REDUP <DeviceId>:<HMAC>

Where:

DeviceId is provided by the external configuration

HMAC is a standard (RFC2104) HMAC-SHA1 implementation HMAC formula

Examples:

key—message—hmacSHA1 secret1—message1—62f67a18c098cb6f617318aad163d7fb7ce623e2 secret1—message2—04ed6dfeb47975426c18cac968f87dc534f2c30a secret2—message1—ec4566ea0d96d0febf4759d6b54beea0edb74703 secret2—message2—2666af5e7c9aad99872435b4fa9a813db9676cff secret3—9c14dd4606dd55f7ffb57104c0c17f657616efa4 key—The quick brown fox jumps over the lazy dog—c9685b8b78aa6bc8a7a36f70a90701c9db4d9

Where:

key—device sha1(password) provided by the same source as for DeviceId message—request body. If the request was a plain turtle upload whole request body is going to be used for hmaSHA1 calculations. In case of mulitpart uploads only the encoded file is considered a message (not full content of the request body)

Server code calculates hmacSHA1 of uploaded files using command:

openssl dgst –sha1 –hmac "% s" % s where first % s stands for sha1(password) and second % s is a path to file The same command can be used on the client side or for test purposes.

3.3.2. Example Responses

The JSON body is optional and should contain.

status—indicating the success of the operation. For a successful response this will be "OK". Otherwise "ERR"

requestId—only be used for debugging and tracking purposes

The client should output the requestId to its own internal log output.

3.3.2.1. Successful Response

The HTTP error code 200 should be used for a successful response.

```
{
"status": "OK",
"requestId": "XXX"
}
```

3.3.2.2. Invalid Request/Failed Response

The HTTP error code 4XX indicates an invalid request or failure.

```
{
"status": "ERR",
"requestId": "XXX",
"data": "Problem with data insertion"
}
```

3.3.2.3. Server Fault

The HTTP error code 5XX indicates a server fault. In this case the HTTP response body is assumed to be untrustworthy.

3.4. Reducer

The Reducer is responsible for ensuring that the RDF database meets the storage requirements of the device by reducing the amount of RDF triplets held by the device.

Interface: Shared C Library

The Reducer interface is described in reducer.h.

Reducer->Redland RDF

The Reducer queries the Redland RDF interface for RDF triplets that no longer need to be stored by the device. Reducer may delete the triplets when they are persistently reduced, sent to the server or if there is no other way to meet the memory requirements.

Reducer->Filesystem

The Reducer exports the triplets from the RDF database prior to uploading to the server. The export is done in Turtle format according the events priorities. The output is.gz compressed before storing.

Export may also happen if number of statements in in-memory DB reaches the limit.

The Reducer needs to monitor the storage space available to store log files. If the amount of space available reaches a configurable limit, then the reducer will delete unused triplets.

3.5. Daemon

The Daemon is a long-running process that is customized to the platform. It is responsible for applying the business logic that determines when the Reducer and Offloader are invoked. The Reducer, Offloader and RDF Database are embedded within the Daemon process.

The Daemon uses the C library interface defined by the Logger, Offloader and Reducer.

The Daemon can expose a platform-specific IPC endpoint that can be used by applications to log events. If this is not present then the Daemon will only be responsible for invoking the Reducer or Offloader business logic.

Interface: Shared C Library

The Daemon C interface is described by daemon.h

The Daemon process uses needs to determine if there is an active Internet connection before using the Offloader to upload log files.

Daemon->Platform Service API

When the device powers down, the in-memory RDF database needs to be flushed to disk. The Daemon will receive this signal through the Platform Service API.

Daemon<->Platform IPC

The Daemon exposes the Logger API through the Platform's IPC mechanism. E.g. D-Bus/Sockets/etc.

Daemon->Platform Device API

The device requires contextual information about the system. At a minimum this is the identity of the device. If no single device identity can be derived it will need to be composed of multiple elements, E.g. MAC addresses of all network interfaces Daemon->Platform Settings API The Daemon allows the reporting and verbosity of logging to be configurable. The Daemon exposes the Configuration API. This can either be done by exposing methods using the Platform IPC or by querying a Platform Settings API directly. The Platform Settings API could be, for example, a configuration file, or even another method on the Platform IPC.

3.6. Logger

Interface: Shared C Library

The Daemon C interface is described by logger.h 3.7. Configuration

The Configuration component contains options and settings that change the behavior of LENC at runtime. The configuration is itself an in-memory RDF database, that is loaded from a file on start-up.

Configuration parameters are organized into groups based on the components they alter the behavior of.

3.7.1. Configuration Group: General

LencInternalLogPath—The path to LENC log file. To turn off logging this setting should be empty string.

3.7.2. Configuration Group: Reducer

MaxStatementInMem—The maximum amount of statements logged to RDF, before the Reducer starts;

ReducerMinDiskSpaceHigh—The minimum disk space for high event, in bytes;

ReducerMinDiskSpaceLow—The minimum disk space for low event, in bytes;

MaxDiskSpaceLimit—The maximum disk space which can be used, in bytes;

ReducerLogSize—The max size of one log record, in bytes;

PackageStoragePath—The path to log packages storage;

PackagePrefix—The package file name prefix;

PackageSuffix—The package file name suffix;

PackageMaxPriority—The package max priority;

ReducerAgeHiEventToDelete—The minimum age for high event, in seconds;

ReducerAgeLowEventToDelete—The minimum age for low event, in seconds;

ExportToDisk—The flag which means the packages to be uploaded should be stored to the disk first.

3.7.3. Configuration Group: Offloader

OffloadPeriodicTimer—The time after which the reducer will flush RDF data to file/memory and periodic offload will be started, in seconds;

OffloadRetryTimer—The time after which the offloader will retry to start the regular offload process (in case the previous attempt was unsuccessful), in seconds;

ReduceRetryTimer—The time after which the offloader will retry to start the reduce process (in case the previous attempt was unsuccessful), in seconds;

NifmonUpdateTimer—The time after which the offloader will update information about network interfaces status, in seconds;

PendingNetworkTimer—The time after which the offloader cancels waiting for network connection and tries to reduce the oldest low priority log package, in seconds;

UploadRetryTimerUpload—The time after which the offloader will retry to upload a package (in case the previous attempt for this package was unsuccessful), in seconds;

UploadRetryTimerReduce—The time after which the offloader will retry to reduce a package (in case the previous attempt for this package was unsuccessful), in seconds;

AbortUploadTimer—The time after which the offloader will abort the upload operation due to time expiration, in seconds;

NifsAmountMax—The max network interfaces amount;

RetriesAmountMaxUpload—The max amount of retries to upload;

RetriesAmountMaxReduce—The max amount of retries to reduce;

UploadAmountMax—Simultaneous uploads max amount;

LencServerURL—The LENC server URL;

UsePostRequest—The flag which means POST request should be used;

UseBasicAuthentication—The flag which means basic authentication should be used;

BasicLogin—The basic authentication login;

BasicPassword—The basic authentication password;

UseExternalConnectionManager—The flag which indicates the offloader should use an external network connectivity status monitor;

UseSSL—The flag which means SSL should be used to upload the logs to the server;

SSLTrustUnknownCertificates—The flag which means the Offloader will trust the server SSL certificate even if it has not been generated by a known certificate authority;

CAFile—Specifies a path to a file which contains the Certificate Authority certificates;

CAPath—Specifies a directory which will be searched for files containing a Certificate Authority certificate;

OffloaderDataPathName—The pathname to store the Offloader internal data;

3.7.4. Configuration Group: Logger

LogIdPath—The path to store logId;

LogStringMaxLength—The max string length for log message.

3.7.5. Interfaces

Interface: Shared C Library

The Configuration interface is described by config.h 3.8. Application #1

Application #1 in the component diagram represents an application using the Platform IPC mechanism to record a log event.

3.9. Application #2

Application #2 in the component diagram represents an application using the Shared C Library to record a log event.

Figure 109:
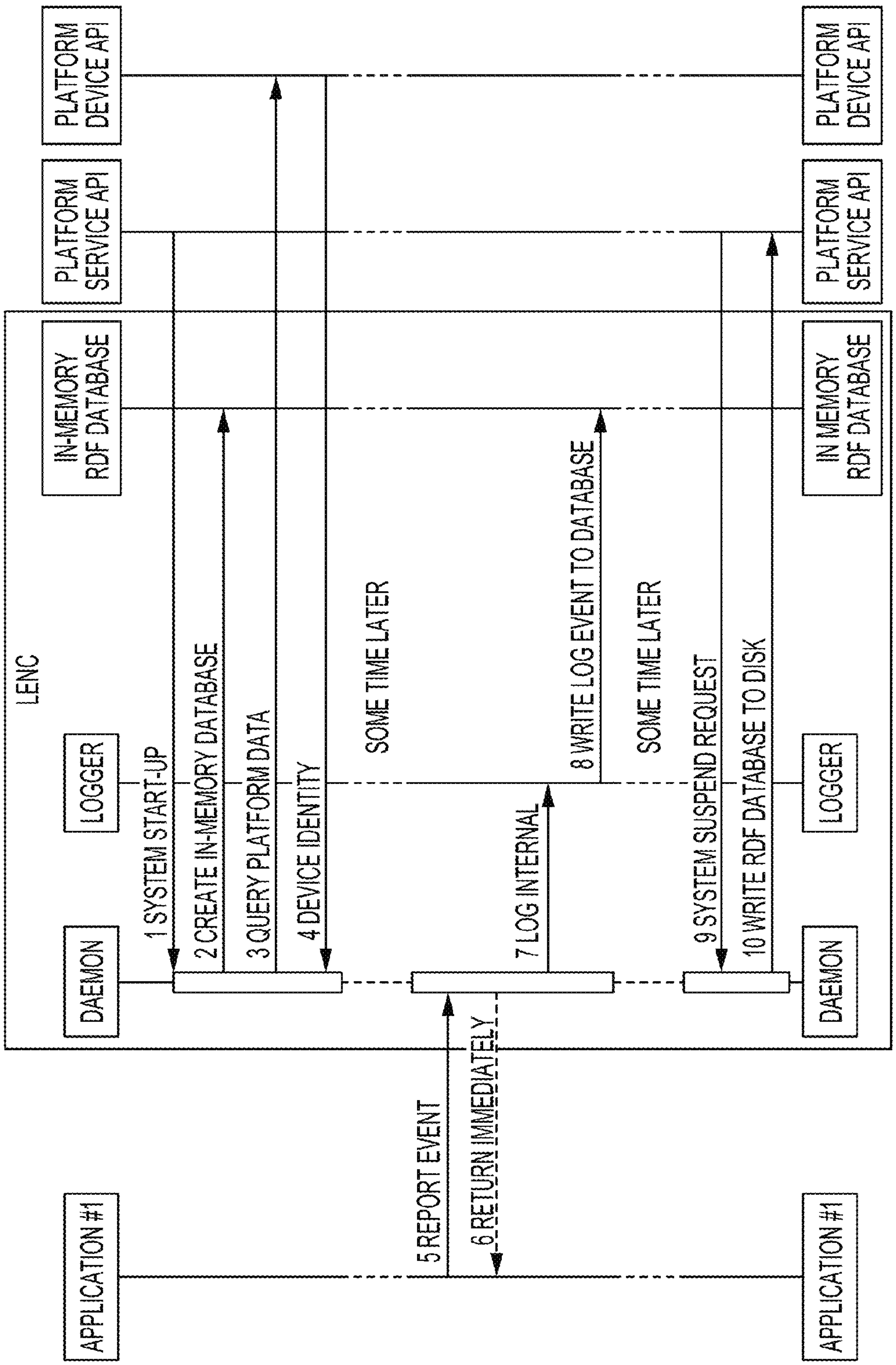

4. Sequence Diagrams 4.1. SEQ-001: Application reports an event using the daemon—Shown in FIG. 109.

4.2. SEQ-002: Reduce Triplets in Memory Database

Log events received by the Daemon are stored in the in-memory RDF database. If the Daemon runs for a long period, then the log events may be unnecessarily allocated memory space.

If the system loses power unexpectedly then all in-memory triplets will be lost. By periodically reducing the triplets in-memory by flushing to disk, it ensures that not all logging events are lost on power failure.

4.3. SEQ-003: Replace Triplets in Filesystem Database

If the free space in the filesytem becomes limited, then the Reducer should remove any extraneous log events that have been stored on disk. These should only be the log files that have not yet been uploaded to a remote server by the Offloader.

Figure 110:
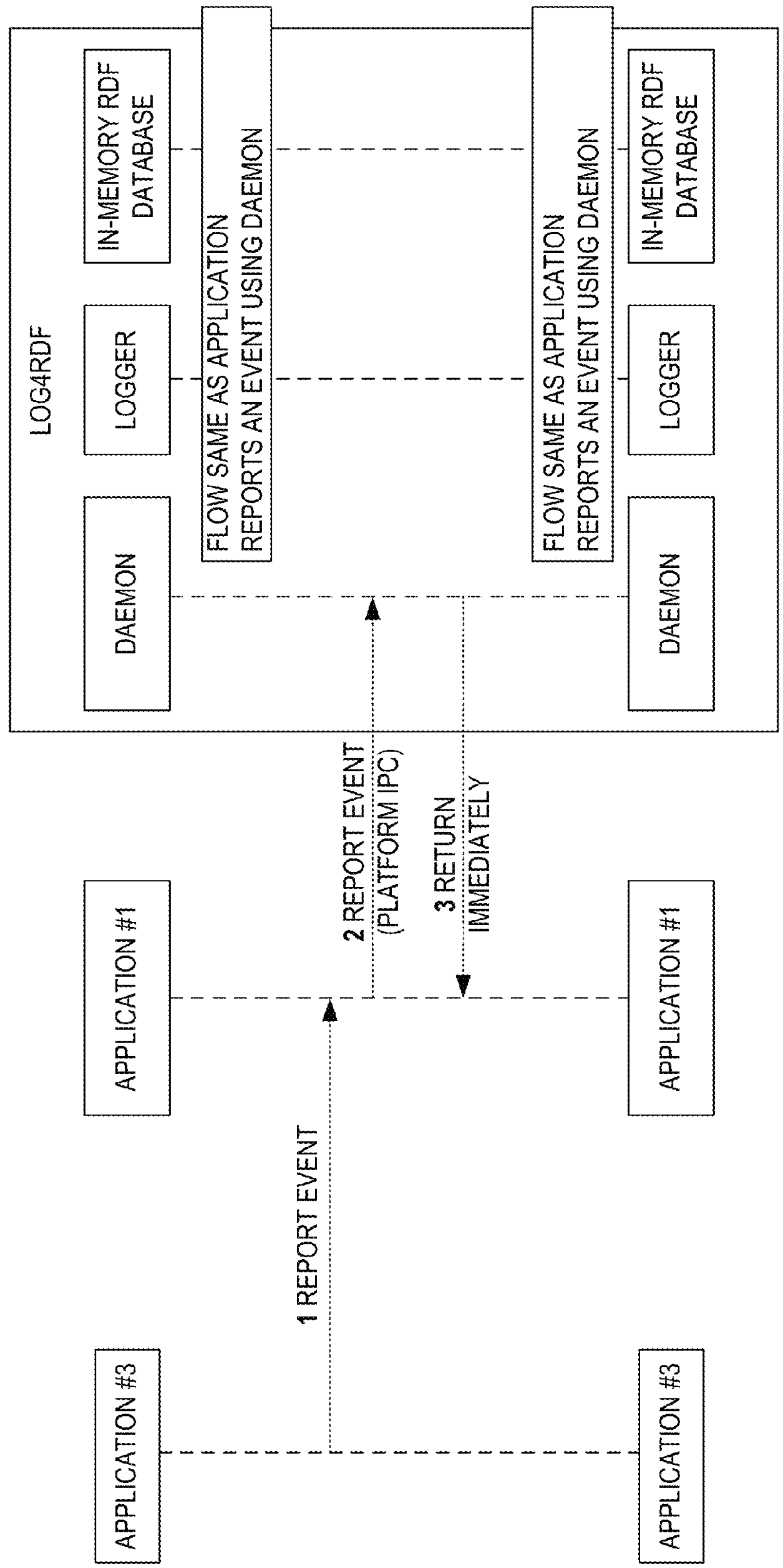

4.4 SEQ-004: Application Reports Logs on Behalf of Another Application—Shown in FIG. 110.

4.5. SEQ-005: Upload Log Events to Offboard Server 4.6. SEQ-006: Network Availability and Timers Management Sometimes there may be a situation when pre-configured periodic timer had no time to complete between LENC startup/shutdown sequence and therefore the upload operation will not be performed. To prevent this case LENC stores the timestamp of the latest successful operation to use it to decide when then next upload should be started.

5. RDF Ontologies

Two ontologies are provided one is for logging and the other describes the components that are logged.

Esm.owl—Embedded systems ontology. This describes the structure of components and their update status.

Log2rdf.owl—Logging ontology. This describes log reports which will be used to convey the status of embedded systems software.

5.1. Logging Ontology

Log events are reported in an RDF format ontology. This is shown in FIG. 30.

Notifications are raised by one component on another component. Notifications effectively report on the software status of connected infotainment, Reports can be one of four types:

1. SWUpdateReport: Provides information on status of a software update.
2. StatusReport: Provides any status update on a component of the vehicle. This is a general status reporting component.
3. TelematicNotification: Provides logs of data value such as location.
4. FAIssueNotification: Provides indication of a function affecting fault in the vehicle.

A report can have multiple components. For example a software update report can have a LogReport giving more information on the status after update.

5.2. Embedded System Ontology

Components report according to an embedded systems ontology. The ESM ontology are supplied in the documentation.

The embedded system ontology allows the specification of versioned components. The range of notification is something of type ESComponent. This includes components of CI and HTML5 applications. Components can be versioned so that the server can link individual classes and components to versions stored in the repository.

HTML5 applications may log RDF or just simple strings. It should be possible for the cloud server to search for logs relating to a specific applications or a version of an application and apply an application specific ontology to the data to give it meaning.

6. API 6.1. Device Identity

The device identity needs to be set via the DeviceId configuration value.

6.1.1. lenc_device_identity: Returns the current device identity.

Implemented by the proxy component or example application this API will return the current device identity. If the device identity cannot be found, or is empty, then NULL shall be returned.

6.2. LENC Iface API

This API should be used by applications wishing to report an error.

6.2.1. lenc_init: Initialize lenc-iface

This method opening a message queue for sending messages to lenc-daemon.

Parameters:

None

Returns: lenc_handle_t which is used for message queue descriptor if success and −1 if fails 6.2.1.1. Definition extern lenc_handle_t lenc_init( );

6.2.1.2. Example Usage lenc_init( );

6.22 lenc_report_event: Allow a Component to Report a Log Event on Behalf of Another Component This method sends a REPORT_MESSAGE message to lenc-daemon.

Parameters:

handle—the handle to message queue category—the type of event being reported. Caller is responsible for de-allocating the memory allocated to this pointer.

reported_by—the component that is reporting the event

Supports two formats:

1. <URI> (ex. http://website.com/components/componentName), symbols: '<' and '>' are required
2. component in turtle format (ex. "comp:componentName", "ciapps:appName", "dlapps:appName")

Caller is responsible for de-allocating the memory allocated to this pointer.

reported_at—the time at which this component reported the event component—the component from which the log event originates Supports two formats:

1. <URI>(ex. http://website.com/components/componentName), symbols: '<' and '>' are required
2. component in turtle format (ex. "comp:componentName", "ciapps:appName", "dlapps:appName") Caller is responsible for de-allocating the memory allocated to this pointer.

occurred_at—the time at which the log event occurred severity—the severity level of the log message message—the log message as string. Caller is responsible for de-allocating the memory allocated to this pointer.

Returns: 0 if success and −1 if fails 6.2.2.1. Definition extern int lenc_report_event(lenc_handle_t *handle, char* category, char* reported_by, time_t reported_at, char* component, time_t occurred_at, lenc_severity_e severity, char *message);

6.2.2.2. Example Usage lenc_report_event(
handle,
"StatusReport",
"comp:componentName",
1373891691000,
<http://website.com/components/WebserverV1>,
1373891691000,
4,
"OMA-DM sync completed."
);

6.2.2.3. RDF Result not:WAUZZZ8DZWA123456-1
esm:regarding comp:WebserverV1;
log:Timestamp "1373891691000"^^xsd:long;
log:message "OMA-DM sync completed."^^xsd:string;
log:reportedAt "1373891691000"^^xsd:long;
log:reportedBy comp:componentName;
log:severity log:WARNING;
a esm:StatusReport.

6.2.3. lenc_report_event_with_data: Allow a Component to Report a Log Event on Behalf of Another Component with Additional Data Associated with Log This method sends a REPORT_MESSAGE message to lenc-daemon.

Parameters:

handle—the handle to message queue category—the type of event being reported. Caller is responsible for deallocating the memory allocated to this pointer.

reported_by—the component that is reporting the event

Supports two formats:

1. <URI>(ex. http://website.com/components/componentName), symbols: '<' and '>' are required
2. component in turtle format (ex. "comp:componentName", "ciapps:appName", "dlapps:appName")

Caller is responsible for deallocating the memory allocated to this pointer.

reported_at—the time at which this component reported the event component—the component from which the log event originates Supports two formats:

1. <component URI>(ex. http://website.com/components/componentName), symbols: '<' and '>' are required
2. component in turtle format (ex. "comp:componentName")

Caller is responsible for deallocating the memory allocated to this pointer.

occurred_at—the time at which the log event occurred severity—the severity level of the log message message—the log message as string. Caller is responsible for deallocating the memory allocated to this pointer.

data—additional data associated with log in turtle format. ex. "log:extends log:data". Caller is responsible for deallocating the memory allocated to this pointer.

Returns: 0 if success and −1 if fails 6.2.3.1. Definition extern int lenc_report_event_with_data(lenc_handle_t *handle, char* category, char* reported_by, time_t reported_at, char* component, time_t occurred_at, lenc_severity_e severity, char* message, char* data);

6.2.3.2. Example Usage lenc_report_event_with_data( &ds,
"SoftwareUpdateReport",
"comp:LENC", 1234567801,
"dlapps:Application1",
1234567802,
4,
"Application Weather has been updated",
"log:Offset \"−4\"^^xsd:integer; log:Other_integer 789;
log:subcategory \"_lifecycle\"^^xsd:string;
log:other_string \"_my_String\"^^xsd:string;
log:float_value \"−3.14\"^^xsd:double"
);

6.2.3.3. RDF Result not: DWAUZZZ8DZWA123456-2
esm:regarding dlapps:Application1;
log:Offset—4;
log:Other_integer 789;
log:Timestamp "1234567802"^^xsd:long;
log:float_value −3.14;
log:message "Application Weather has been updated"^^-xsd:string;
log:other_string "_my_String"^^xsd:string;
log:reportedAt "1234567801"^^xsd:long;
log:reportedBy comp:LENC;
log:severity log:WARNING;
log:subcategory "_lifecycle"^^xsd:string;
a esm:SoftwareUpdateReport.

6.2.3.4. Example Usage lenc_report_event_with_data(
&ds,
"SoftwareUpdateReport",
"comp:LENC",
1234567801,
"dlapps:Application1",
1234567802,
4,
"Application Weather has been updated",
"log:Offset \"−4\"^^xsd:int; log:Other_integer 789;
log:long_value \"1373891691000\"^^xsd:long; log:Other_long 1373891691000;
log:subcategory \"_lifecycle\"^^xsd:string; log:other_string \"my String\";
log:float_value \"−3.14\"^^xsd:double; log:other_float −3.14"
);

6.2.3.5. RDF Result not: DWAUZZZ8DZWA123456-3
esm:regarding dlapps:Application1;
log:Offset "−4"^^xsd:int;
log:Other_integer 789;
log:Other_long 1373891691000;
log:Timestamp "1234567802"^^xsd:long;
log:float_value −3.14;
log:long_value "1373891691000"^^xsd:long;
log:message "Application Weather has been updated"^^-xsd:string;
log:other_float −3.14;
log:other_string "my String";
log:reportedAt "1234567801"^^xsd:long;
log:reportedBy comp:LENC;
log:severity log:WARNING;
log:subcategory "_lifecycle"^^xsd:string;
a esm:SoftwareUpdateReport.

6.2.4. lenc_suspend: Allow a Component to Suspend Lenc-demon

This method sends a SUSPEND_MESSAGE message to lenc-daemon.

Deletes all events from in-memory RDF database.

Deletes all already reduced events from disk.

Stops recording log events

Parameters:

handle—the handle to message queue

Returns: 0 if success and −1 if fails 6.2.4.1. Definition extern int lenc_suspend(lenc_handle_t *handle);

6.2.5. lenc_resume: Allow a Component to Resume Lenc-demon

This method sends a RESUME_MESSAGE message to lenc-daemon.

Start recording log events after suspend

Parameters:

handle—the handle to message queue

Returns: 0 if success and −1 if fails 6.2.5.1. Definition extern int lenc_resume(lenc_handle_t *handle);

6.2.6. lenc_shutdown: Allow a Component to Shutdown Lenc-demon

This method sends a SHUTDOWN_MESSAGE message to lenc-daemon.

Parameters:

handle—the handle to message queue

Returns: 0 if success and −1 if fails 6.2.6.1. Definition extern int lenc_shutdown(lenc_handle_t *handle);

6.2.7. lenc_close: Close Lenc-iface

This method closes a message queue which used for sending messages to lenc-daemon.

Parameters:

handle—the handle to message queue

Returns: 0 if success and −1 if fails 6.2.7.1. Definition extern int lenc_close(lenc_handle_t *handle);

6.3. LENC Daemon API

This API should be used by processes wishing to implement the LENC daemon.

6.3.1. DaemonInit: Initialize the Daemon (was lenc_deamon_startup)

This API should be called when the LENC Daemon process starts.

Initialize the database handlers

Provides the Daemon with DeviceId and path to configuration file

Starts the event timers for Offloader and Reducer

Parameters:

loop—the pointer to ev_loop structure. Caller should create this object and pass it to the daemon devId—zero-terminated ASCII-string which contains Device Id. If NULL, pre-configured value will be used by the Daemon.

configFile—the path to the directory which contains lenc-config.ttl file to be used for the LENC configuration 6.3.1.1. Definition void DaemonInit(struct ev_loop* loop, const char* devId, const char* configPath);

6.3.2. DaemonShutdown: Shutdowns the Daemon (was lenc_daemon_shutdown)

This API should be called before the LENC Daemon process is halted.

Invokes the Reducer—persisting logs to disk if ExportToDisk enabled

Deallocates any memory

Closes any database handles 6.3.2.1. Definition void DaemonShutdown( );

6.3.3. DaemonNetworkStatusChanged: Indicate Network Connectivity has Changed void DaemonNetworkStatusChanged(bool connected)

Figure 111:
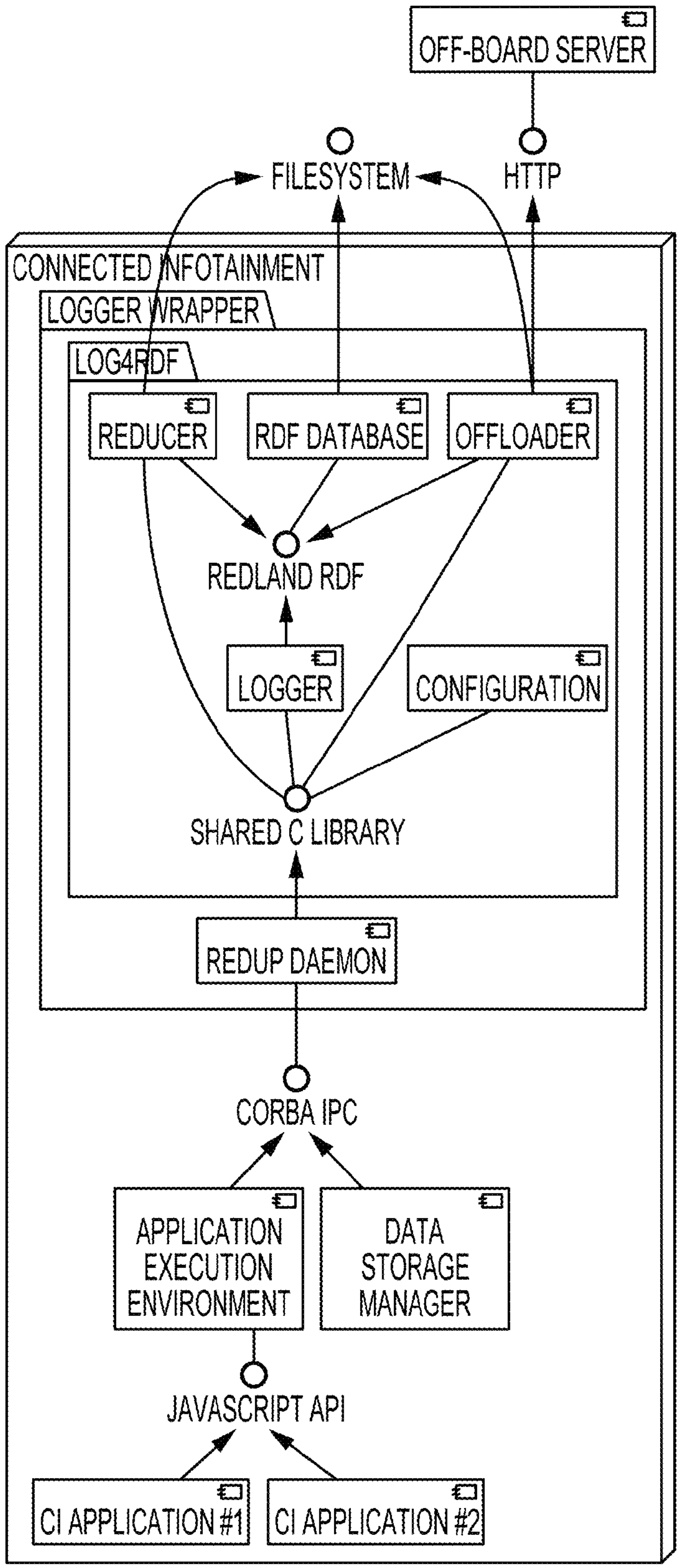

7. Connected Infotainment Components—See FIG. 111.

Connected Infotainment requires a modification of the LENC architecture. The LENC Daemon is embedded within the REDUP product, which itself is embedded within an "Update Client Wrapper" component.

The "Update Client Wrapper" provides an interface to the REDUP client and importantly includes a CORBA IPC API.

The CORBA API for logging includes a mirror of the LENC Logger API, acting as the Daemon component in the LENC sequences.

8. Connected Infotainment FIS

Connected Infotainment describe the flows an interactions between components as Feature Interaction Scenarios (FIS). LENC satisfies, or has partial involvement in some of these flows. This section describes the related FIS, and the role required by LENC.

Figure 112:
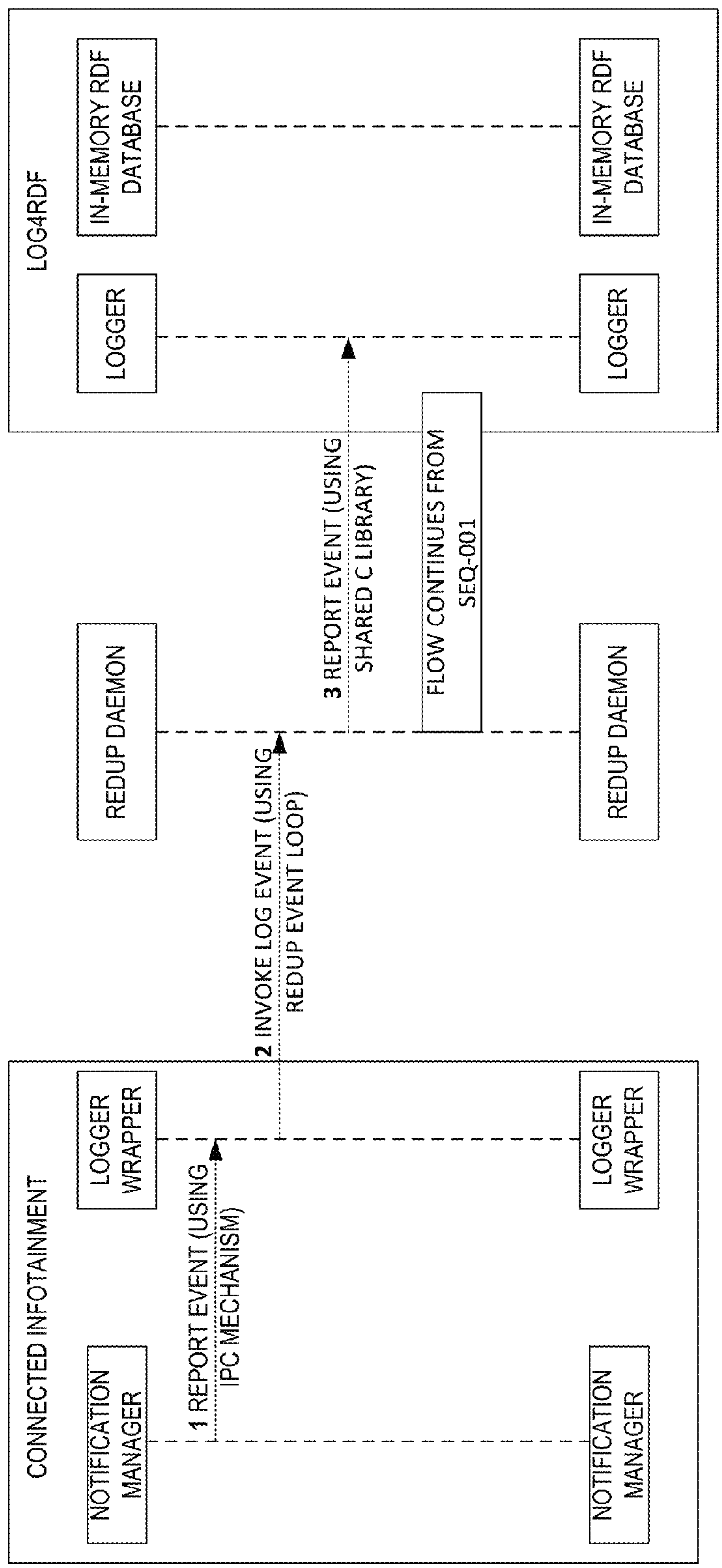

8.1. FIS_LG_001: Logging an issue—Application Execution Environment creates a log—Shown in FIG. 112.

8.2. FIS_LG_002: Logging an issue—Connected Infotainment Application Creates a Log 8.3. FIS_LG_003: Logging an Issue—Create Log Record The scope of logging is any component of the application environment, CI application or the update module installation process. Logs are in a structured format that supports analysis of the log events. Logs can be associated with any area of software organization and operation. These include, software faults, reporting of installation success or general application function. Log levels can be used to classify logging data and which levels are persisted can control the verbosity of logging and it is expected that the focus of logging will change at different stages of production. Preconditions: • The system is booted sufficiently for components to potentially log. Postconditions: Log has been created and stored on the file system Actors CI Component.

8.4. FIS_LG_004: Log Use Cases::Logging an Issue UC::Update Module Installation Process Creates Log 8.5. FIS_LG_005: Log Use Cases::Logging an Issue UC::Upload Log 8.6. FIS_LG_006: Trigger Log Upload—Manage Log Preference Reading global user settings for logging from Settings feature application.

8.7. FIS_LG_007: Log Use Cases::Trigger Log Upload UC::Trigger Log Update

Logs are collected by the log manager and stored temporarily in the file store until they can be uploaded to the server. The log manager will immediately try to send the logs if connectivity is present. Preconditions: Postconditions: Actors: logging server.

- Log files are uploaded periodically and when an internet connection is available
- Described by step 1 of SEQ-005—Upload log events to offboard server
- The period to which LENC will wait is determined by a configuration variable 8.8. FIS\LG_008: Remove Log Files After Upload

- The removal of log files after upload is described by the SEQ-005—Upload log events to offboard server
- The Offloader will periodically export files to a location on the filesystem. If an internet connection is not available then the Offloader will remove old versions of exported files, in order to prevent excessive usage of the storage space.
- Once a file has been successfully uploaded, the exported Turtle file is removed from disk 8.9. System Shutdown

- On the system shutdown the REDUP Proxy will be invoked
- The DaemonShutdown method will be called and will be returned once the database has been persisted to disk

Alternative Embodiment 6

In some alternative embodiments, the following exemplary REDUP—Client Server Scenarios may be utilized.

1. Installation on New Applications

This section covers scenarios when only new applications are installed, but no existing applications are updated.

1.1. Installation—Sunny Day Scenario 1.1.1. Sync 1: Server Informs Client of App1 as {random1}

1.1.1.1. Server->Client: Request List of Packages Node

The server requests the nodes within /Vendor/Website/Packages/.

GET ./Vendor/Website/Packages 1.1.1.2. Client->Server: Client Responds with Empty Local FUMO OMA-DM Tree

[empty]

1.1.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 1.1.2. Client Installs Update Successfully ./Vendor/Website/Packages/{random1}/State: UPDATE_SUCCESSFUL_HAVE_NO_DATA ./Vendor/Website/Packages/{random1}/Ext/State: POST_CUSTOM_INSTALL_OK 1.1.3. Sync 2: Client Indicates Installation is Successful 1.1.3.1. Server->Client: Request List of Packages Node GET ./Vendor/Website/Packages 1.1.3.2. Client->Server: Client Responds with a {random1} Node that Shows Update Successful ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_NO_DATA

./Vendor/Website/Packages/{random1}/EXT/FileVersionID: {uri: App1 v.1}

By default the client will remove the downloaded file after installation the FUMO State value will be UPDATE_SUCCESSFUL_HAVE_NO_DATA. If the downloaded file remains on disk, then the State value will be UPDATE_SUCCESSFUL_HAVE_DATA.

1.2. Multiple Attempts at Installing the Same Application 1.2.1. Sync 1: Initial Application of App1 as {random1}

1.2.1.1. Server->Client: Request List of Packages Node

The server requests the nodes within /Vendor/Website/Packages/.

GET ./Vendor/Website/Packages 1.2.1.2. Client->Server: Client Responds with Empty Local FUMO OMA-DM Tree

[empty]

1.2.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EX EC ./Vendor/Website/Packages/{random1}/DownloadAndUpdate 1.2.2. Client Applies the Update but Fails As a result of the installation, the client will set the ./State and ./Ext/State nodes respectively.

In this case it is assumed that the download of the ./DownloadAndUpdate/PkgURL has been successful and installation has failed during custom installation The ./Ext/State will temporarily be set to CUSTOM_ROLLBACK_OK and then be set to VERIFY_FAILED.

The state for the FUMO node will be set to UPDATE_FAILED_HAVE_NO_DATA if verification fails, because the downloaded file will be removed from the filesystem.

./Vendor/Website/Packages/{random1}/State: UPDATE_FAILED_HAVE_NO_DATA

./Vendor/Website/Packages/{random1}/Ext/State: VERIFY_FAILED 1.2.3. Sync 2: Server Discovers Installation of {random1} has Failed, and Creates {random2}

1.2.3.1. Server->Client: Request List of Packages Node

The server requests the nodes within /Vendor/Website/Packages/.

GET ./Vendor/Website/Packages 1.2.3.2. Client->Server: Report {random1} FUMO Node has Failed to Install The client responds with the updated FUMO ./Ext/State/ and ./State/ nodes indicating that the update has failed.

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_NO_DATA

./Vendor/Website/Packages/{random1}/EXT/FileVersionID: {uri: App1 v.1}

1.2.3.3. Server->Client: Delete {random1}, and ADD and EXEC {random2}

The server informs the client that it should remove the erroneous FUMO node in ./Vendor/Website/Packages/{random1}. It will also add a new FUMO node representing the App1 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App1 v.1}

EXEC ./Vendor/Website/Packages/{random2}/DownloadAndUpdate 1.2.4. Client Attempts to Apply Update, but Encounters Error and Rollbacks The client will remove the FUMO node for the {random1} FUMO node in its local OMA-DM tree.

If the ./DownloadAndUpdate URL for both {random1} and {random2} FUMO nodes is the same, then it is highly likely that the installation of App1 fails again. The client will update the {random2} FUMO node states.

./Vendor/Website/Packages/{random2}/State: UPDATE_FAILED_HAVE_NO_DATA

./Vendor/Website/Packages/{random2}/Ext/State: VERIFY_FAILED

These changes will not be apparent to the server until the next sync.

1.2.5. Sync 3: Server Discovers Installation of {random2} and {random1} has failed, and creates {random3}

1.2.5.1. Server->Client: Request List of Packages Node

The server requests the nodes within /Vendor/Website/Packages/.

GET ./Vendor/Website/Packages

1:2.52 Client->Server: Client Responds with {random1} and {random2}

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_NO_DATA

./Vendor/Website/Packages/{random1}/EXT/FileVersionID: {uri: App1 v.1}

./Vendor/Website/Packages/{random2}/PkgName: App1

./Vendor/Website/Packages/{random2}/PkgVersion: 1

./Vendor/Website/Packages/{random2}/State: UPDATE_FAILED_HAVE_NO_DATA

./Vendor/Website/Packages/{random2}/EXT/FileVersionID: {uri: App1 v.1}

1.2.5.3. Server->Client: Delete {random2} and {random1}. ADD and EXEC {random3}

DEL ./Vendor/Website/Packages/{random1}

DEL ./Vendor/Website/Packages/{random2}

ADD ./Vendor/Website/Packages/{random3}

ADD ./Vendor/Website/Packages/{random3}/State: IDLE

ADD ./Vendor/Website/Packages/{random3}/EXT/FileVersionID: {uri: App1 v.1}

EXEC ./Vendor/Website/Packages/{random3}/DownloadAndUpdate 1.2.6. Client Deletes FUMO Nodes for {random1} and {random2}

DEL ./Vendor/Website/Packages/{random1}: OK

DEL ./Vendor/Website/Packages/{random2}: OK 1.2.7. Client Attempts to Apply Update, but Encounters Error and Rollbacks ./Vendor/Website/Packages/{random3}/State: UPDATE_FAILED_HAVE_NO_DATA ./Vendor/Website/Packages/{random3}/Ext/State: VERIFY_FAILED 1.2.8. Sync 4: Server Discovers Installation of {random3}, {random2}, {random3} have failed, and creates {random4}

1.2.8.1. Server->Client: Request List of Packages Node

The server requests the nodes within /Vendor/Website/Packages/.

GET ./Vendor/Website/Packages 1.2.8.2. Client->Server: Client Responds with {random1}, {random2} and {random3}

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_NO_DATA

./Vendor/Website/Packages/{random1}/EXT/FileVersionID: {uri: App1 v.1}

./Vendor/Website/Packages/{random2}/PkgName: App1

./Vendor/Website/Packages/{random2}/PkgVersion: 1

./Vendor/Website/Packages/{random2}/State: UPDATE_FAILED_HAVE_NO_DATA

./Vendor/Website/Packages/{random2}/EXT/FileVersionID: {uri: App1 v.1}

./Vendor/Website/Packages/{random3}/PkgName: App1

./Vendor/Website/Packages/{random3}/PkgVersion: 1

./Vendor/Website/Packages/{random3}/State: UPDATE_FAILED_HAVE_NO_DATA

./Vendor/Website/Packages/{random3}/EXT/FileVersionID: {uri: App1 v.1}

1.2.8.3. Server->Client: Delete {random1}, {random2}, {random3} and Install {random4}

DEL ./Vendor/Website/Packages/{random1}

DEL ./Vendor/Website/Packages/{random2}

DEL ./Vendor/Website/Packages/{random3}

ADD ./Vendor/Website/Packages/{random4}

ADD ./Vendor/Website/Packages/{random4}/State: IDLE

ADD ./Vendor/Website/Packages/{random4}/EXT/FileVersionID: {uri: App1 v.1}

EXEC ./Vendor/Website/Packages/{random4}/DownloadAndUpdate 1.2.9. Client Deletes FUMO Nodes for {random1}, {random2} and {random3}

DEL ./Vendor/Website/Packages/{random1}: OK

DEL ./Vendor/Website/Packages/{random2}: OK

DEL ./Vendor/Website/Packages/{random3}: OK 1.2.10. Client Successfully Installs FUMO Node {random4}

./Vendor/Website/Packages/{random4}/State: UPDATE_SUCCESSFUL_HAVE_DATA

./Vendor/Website/Packages/{random4}/Ext/State: POST_CUSTOM_INSTALL_OK 1.2.11. Sync 5: Server Discovers {random4} Installed Successfully 1.2.11.1. Server->Client: Request List of Packages Node The server requests the nodes within /Vendor/Website/Packages/.

GET ./Vendor/Website/Packages 1.2.11.2. Client->Server: Report {random4} FUMO Node has Installed Successfully ./Vendor/Website/Packages/{random4}/PkgName: App1

./Vendor/Website/Packages/{random4}/PkgVersion: 1

./Vendor/Website/Packages/{random4}/State: UPDATE_SUCCESSFUL_HAVE_DATA

./Vendor/Website/Packages/{random4}/EXT/FileVersionID: {uri: App1 v.1}

1.3. An Application in an Update Fails Reverting All Other Applications in that Update 1.3.1. Sync 1: Server Sends Three Applications to the Client 1.3.1.1. Server->Client: Request List of Packages Node The server requests the nodes within /Vendor/Website/Packages/.

GET ./Vendor/Website/Packages 1.3.1.2. Client->Server: Client Responds with Empty Local FUMO OMA-DM Tree

[empty]

1.3.1.3. Server->Client: Server Sends FUMO Nodes Representing Three Applications ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App2 v.1}

EXEC ./Vendor/Website/Packages/{random2}/DownloadAndUpdate

ADD ./Vendor/Website/Packages/{random3}

ADD ./Vendor/Website/Packages/{random3}/State: IDLE

ADD ./Vendor/Website/Packages/{random3}/EXT/FileVersionID: {uri: App3 v.1}

EXEC ./Vendor/Website/Packages/{random3}/DownloadAndUpdate 1.3.2. Client Installs Two Applications but Fails on the Third, So Reverts All Updates Installation of App1 in ./Vendor/Website/Packages/{random1} is OK Installation of App2 in ./Vendor/Website/Packages/{random2} fails during verification of the downloaded file Installation of App3 in ./Vendor/Website/Packages/{random3} is not attempted because App2 has previously failed installation ./Vendor/Website/Packages/{random1}/State: UPDATE_FAILED_HAVE_DATA ./Vendor/Website/Packages/{random1}/Ext/State: VERIFY_OK ./Vendor/Website/Packages/{random2}/State: UPDATE_FAILED_HAVE_NO_DATA ./Vendor/Website/Packages/{random2}/Ext/State: VERIFY_FAILED ./Vendor/Website/Packages/{random3}/State: DOWNLOAD_COMPLETE ./Vendor/Website/Packages/{random3}/Ext/State: DOWNLOAD_COMPLETE 1.3.3. Sync 2: Server Discovers Installation of Applications has Failed and Re-sends FUMO Nodes 1.3.3.1. Server->Client: Request List of Packages Node The server requests the nodes within /Vendor/Website/Packages/.

GET ./Vendor/Website/Packages 1.3.3.2. Client->Server: Client Indicates in FUMO States that All Updates have Failed ./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_DATA

./Vendor/Website/Packages/{random1}/EXT/FileVersionID: {uri: App1 v.1}

./Vendor/Website/Packages/{random2}/PkgName: App2

./Vendor/Website/Packages/{random2}/PkgVersion: 1

./Vendor/Website/Packages/{random2}/State: UPDATE_FAILED_HAVE_NO_DATA

./Vendor/Website/Packages/{random2}/EXT/FileVersionID: {uri: App2 v.1}

./Vendor/Website/Packages/{random3}/PkgName: App3

./Vendor/Website/Packages/{random3}/PkgVersion: 1

./Vendor/Website/Packages/{random3}/State: DOWNLOAD_COMPLETE

./Vendor/Website/Packages/{random3}/EXT/FileVersionID: {uri: App3 v.1}

1.3.3.3. Server->Client: Server Deletes Previous FUMO Nodes and Creates New Ones DEL ./Vendor/Website/Packages/{random1} (App1)

DEL ./Vendor/Website/Packages/{random2} (App2)

DEL ./Vendor/Website/Packages/{random3} (App3)

ADD ./Vendor/Website/Packages/{random4} (App1)

ADD ./Vendor/Website/Packages/{random5} (App2)

ADD ./Vendor/Website/Packages/{random6} (App3)

1.3.4. Client Deletes FUMO Nodes Associated with Failed Updates

DEL ./Vendor/Website/Packages/{random1}: OK

DEL ./Vendor/Website/Packages/{random2}: OK

DEL ./Vendor/Website/Packages/{random3}: OK 1.3.5. Client Successfully Installs New FUMO Nodes ./Vendor/Website/Packages/{random4}/State: UPDATE_SUCCESSFUL_HAVE_DATA ./Vendor/Website/Packages/{random4}/Ext/State: POST_CUSTOM_INSTALL_OK ./Vendor/Website/Packages/{random5}/State: UPDATE_SUCCESSFUL_HAVE_DATA ./Vendor/Website/Packages/{random5}/Ext/State: POST_CUSTOM_INSTALL_OK ./Vendor/Website/Packages/{random6}/State: UPDATE_SUCCESSFUL_HAVE_DATA ./Vendor/Website/Packages/{random6}/Ext/State: POST_CUSTOM_INSTALL_OK 1.3.6. Sync 3: Server Discovers App1, App2 and App3 Installed Successfully 1.3.6.1. Server->Client: Request List of Packages Node The server requests the nodes within /Vendor/Website/Packages/.

GET ./Vendor/Website/Packages 1.3.6.2. Client->Server: Report {random4}, {random5}, {random6} Installed Successfully ./Vendor/Website/Packages/{random4}/PkgName: App1

./Vendor/Website/Packages/{random4}/PkgVersion: 1

./Vendor/Website/Packages/{random4}/State: UPDATE_SUCCESSFUL_HAVE_DATA

./Vendor/Website/Packages/{random4}/EXT/FileVersionID: {uri: App1 v.1}

./Vendor/Website/Packages/{random5}/PkgName: App2

./Vendor/Website/Packages/{random5}/PkgVersion: 1

./Vendor/Website/Packages/{random5}/State: UPDATE_SUCCESSFUL_HAVE_DATA

./Vendor/Website/Packages/{random5}/EXT/FileVersionID: {uri: App2 v.1}

./Vendor/Website/Packages/{random6}/PkgName: App3

./Vendor/Website/Packages/{random6}/PkgVersion: 1

./Vendor/Website/Packages/{random6}/State: UPDATE_SUCCESSFUL_HAVE_DATA

./Vendor/Website/Packages/{random6}/EXT/FileVersionID: {uri: App3 v.1}

1.4. Client Fails to Download File

For unknown reasons the client is unable to download the file described by ./DownloadAndUpdate/PkgURL 1.4.1. Sync 1: Initial Application of App1 as {random1}

1.4.1.1. Server->Client: Request List of Packages Node

The server requests the nodes within /Vendor/Website/Packages/.

GET ./Vendor/Website/Packages 1.4.1.2. Client->Server: Client Responds with Empty Local FUMO OMA-DM Tree

[empty]

1.4.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 1.4.2. Client Applies the Update but Fails As a result of the installation, the client will set the ./State and ./Ext/State nodes respectively.

./Vendor/Website/Packages/{random1}/State: DOWNLOAD_FAILED

./Vendor/Website/Packages/{random1}/Ext/State: DOWNLOAD_FAILED 1.4.3. Sync 2: Server Discovers Installation of {random1} has Failed, and Creates {random2}

1.4.3.1. Server->Client: Request List of Packages Node

The server requests the nodes within /Vendor/Website/Packages/.

GET ./Vendor/Website/Packages 1.4.3.2. Client->Server: Report {random1} FUMO Node has Failed to Install The client responds with the updated FUMO ./Ext/State/ and ./State/ nodes indicating that the update has failed.

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_DATA

./Vendor/Website/Packages/{random1}/EXT/FileVersionID: {uri: App1 v.1}

1.4.3.3. Server->Client: Delete {random1}, and ADD and EXEC {random2}

The server informs the client that it should remove the erroneous FUMO node in ./Vendor/Website/Packages/{random1}. It will also add a new FUMO node representing the App1 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App1 v.1}

EXEC ./Vendor/Website/Packages/{random2}/DownloadAndUpdate 1.4.4. Client Successfully Installs FUMO Node {random2}

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK 1.4.5. Sync 5: Server Discovers {random2} Installed Successfully 1.4.5.1. Server->Client: Request List of Packages Node The server requests the nodes within /Vendor/Website/Packages/.

GET ./Vendor/Website/Packages 1.4.5.2. Client->Server: Report {random2} FUMO Node has Installed Successfully ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK

./Vendor/Website/Packages/{random2}/EXT/FileVersionID: {uri: App1 v.1}

1.5. Client Fails to Update Application Paths

For unknown reasons the client is unable to update the symbolic link which points to the latest version of the application The server should see that the ./Ext/State node is CUSTOM_INSTALL_OK instead of POST_CUSTOM_INSTALL_OK.

Symbolic link creation may be handled by the custom installation process itself. In which case, there will be no difference between the CUSTOM_INSTALL_OK and POST_CUSTOM_INSTALL_OK states.

1.5.1. Sync 1: Initial Application of App1 as {random1}

1.5.1.1. Server->Client: Request List of Packages Node

The server requests the nodes within /Vendor/Website/Packages/.

GET ./Vendor/Website/Packages 1.5.1.2. Client->Server: Client Responds with Empty Local FUMO OMA-DM Tree

[empty]

1.5.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 1.5.2. Client Applies the Update but Fails As a result of the installation, the client will set the ./State and ./Ext/State nodes respectively.

./Vendor/Website/Packages/{random1}/State: UPDATE_FAILED_HAVE_DATA

./Vendor/Website/Packages/{random1}/Ext/State: CUSTOM_INSTALL_OK 1.5.3. Sync 2: Server Discovers Installation of {random1} has Failed, and Creates {random2}

1.5.3.1. Server->Client: Request List of Packages Node

The server requests the nodes within /Vendor/Website/Packages/.

GET ./Vendor/Website/Packages 1.5.3.2. Client->Server: Report {random1} FUMO Node has Failed to Install The client responds with the updated FUMO ./Ext/State/ and ./State/ nodes indicating that the update has failed.

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_DATA

./Vendor/Website/Packages/{random1}/Ext/State: CUSTOM_INSTALL_OK

./Vendor/Website/Packages/{random1}/Ext/FileVersionID: {uri: App1 v.1}

1.5.3.3. Server->Client: Delete {random1}, and ADD and EXEC {random2}

The server informs the client that it should remove the erroneous FUMO node in ./Vendor/Website/Packages/{random1}. It will also add a new FUMO node representing the App1 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/Ext/FileVersionID: {uri: App1 v.1}

EXEC ./Vendor/Website/Packages/{random2}/DownloadAndUpdate 1.5.4. Client Successfully Installs FUMO Node {random2}

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK 1.5.5. Sync 5: Server Discovers {random2} Installed Successfully 1.5.5.1. Server->Client: Request List of Packages Node The server requests the nodes within /Vendor/Website/Packages/.

GET ./Vendor/Website/Packages 1.5.5.2. Client->Server: Report {random2} FUMO Node has Installed Successfully ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK

./Vendor/Website/Packages/{random2}/Ext/FileVersionID: {uri: App1 v.1}

1.6. Client Fails to Verify Downloaded File

The client successfully downloads the file described by ./DownloadAndUpdate/PkgURL but the hash of the contents does not match the ./Ext/ApplicationHash.

1.6.1. Sync 1: Initial Application of App1 as {random1}

1.6.1.1. Server->Client: Request List of Packages Node

The server requests the nodes within /Vendor/Website/Packages/.

GET ./Vendor/Website/Packages 1.6.1.2. Client->Server: Client Responds with Empty Local FUMO OMA-DM Tree

[empty]

1.6.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 1.6.2. Client Applies the Update but Fails The downloaded file is removed from the filesystem, because it is deemed corrupt ./Vendor/Website/Packages/{random1}/State: UPDATE_FAILED_HAVE_NO_DATA ./Vendor/Website/Packages/{random1}/Ext/State: VERIFY_FAILED 1.6.3. Sync 2: Server Discovers Installation of {random1} has Failed, and Creates {random2}

1.6.3.1. Server->Client: Request List of Packages Node

The server requests the nodes within /Vendor/Website/Packages/.

GET ./Vendor/Website/Packages 1.6.3.2. Client->Server: Report {random1} FUMO Node has Failed to Install The client responds with the updated FUMO ./Ext/State/ and ./State/ nodes indicating that the update has failed.

./Vendor/Website/Packages/{random1}/PkgName: App1

./Vendor/Website/Packages/{random1}/PkgVersion: 1

./Vendor/Website/Packages/{random1}/State: UPDATE_FAILED_HAVE_NO_DATA

./Vendor/Website/Packages/{random1}/Ext/State: VERIFY_FAILED

./Vendor/Website/Packages/{random1}/Ext/FileVersionID: {uri: App1 v.1}

1.6.3.3. Server->Client: Delete {random1}, and ADD and EXEC {random2}

The server informs the client that it should remove the erroneous FUMO node in ./Vendor/Website/Packages/{random1}. It will also add a new FUMO node representing the App1 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/Ext/FileVersionID: {uri: App1 v.1}

EXEC ./Vendor/Website/Packages/{random2}/DownloadAndUpdate 1.6.4. Client Successfully Installs FUMO Node {random2}

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK 1.6.5. Sync 5: Server Discovers {random2} Installed Successfully 1.6.5.1. Server->Client: Request List of Packages Node The server requests the nodes within /Vendor/Website/Packages/.

GET ./Vendor/Website/Packages 1.6.5.2. Client->Server: Report {random2} FUMO Node has Installed Successfully ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK

./Vendor/Website/Packages/{random2}/Ext/FileVersionID: {uri: App1 v.1}

1.7. Client Fails Abnormally

A transient state may be reported by the client if it crashes during installation and a subsequent sync occurs.

1.7.1. Sync 1: Initial Application of App1 as {random1}

1.7.1.1. Server->Client: Request List of Packages Node

The server requests the nodes within /Vendor/Website/Packages/.

GET ./Vendor/Website/Packages 1.7.1.2. Client->Server: Client Responds with Empty Local FUMO OMA-DM Tree

[empty]

1.7.1.3. Server->Client: Server Adds FUMO Node Representing App1

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 1.7.2. Client Only Partially Installs App1

./Vendor/Website/Packages/{random1}/State: READY_TO_UPDATE 1.7.3. Sync 2: Server Discovers Installation of {random1} has Failed, and Creates {random2}

1.7.3.1. Server->Client: Request List of Packages Node

The server requests the nodes within /Vendor/Website/Packages/.

GET ./Vendor/Website/Packages 1.7.3.2. Client->Server: Report {random1} FUMO Node has Failed to Install The client responds with the updated FUMO ./Ext/State/ and ./State/ nodes indicating that the update has failed.

./Vendor/Website/Packages/{random1}/PkgName: App1

./Vendor/Website/Packages/{random1}/PkgVersion: 1

./Vendor/Website/Packages/{random1}/State: READY_TO_UPDATE

./Vendor/Website/Packages/{random1}/Ext/FileVersionID: {uri: App1 v.1}

1.7.3.3. Server->Client: Delete {random1}, and ADD and EXEC {random2}

The server informs the client that it should remove the erroneous FUMO node in ./Vendor/Website/Packages/{random1}. It will also add a new FUMO node representing the App1 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/Ext/FileVersionID: {uri: App1 v.1}

EXEC ./Vendor/Website/Packages/{random2}/DownloadAndUpdate 1.7.4. Client Successfully Installs FUMO Node {random2}

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK 1.7.5. Sync 5: Server Discovers {random2} Installed Successfully 1.7.5.1. Server->Client: Request List of Packages Node The server requests the nodes within /Vendor/Website/Packages/.

GET ./Vendor/Website/Packages 1.7.5.2. Client->Server: Report {random2} FUMO Node has Installed Successfully ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK

./Vendor/Website/Packages/{random2}/Ext/FileVersionID: {uri: App1 v.1}

2. Update of Existing Applications

This section covers scenarios when existing application are updated 2.1. Update—Sunny Day Scenario 2.1.1. Sync 1: Server Informs Client to Delete App1 v.1 as {random1} and Install App1 v.2 as {random2}

2.1.1.1. Server->Client: Request List of Packages Node

GET ./Vendor/Website/Packages 2.1.1.2. Client->Server: Client Responds with One FUMO Node Representing App1 in Version 1

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

2.1.1.3. Server->Client: Server Asks Client to Delete {random1} and Install App1 v.2 as {random2}

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App1 v.2}

EXEC ./Vendor/Website/Packages/{random2}/DownloadAndUpdate 2.1.2. Client Deletes FUMO Node for {random1}

DEL ./Vendor/Website/Packages/{random1}: OK 2.1.3. Client: Successfully Installs FUMO Node {random2}

./Vendor/Website/Packages/{random2}/State: UPDATE_SUCCESSFUL_HAVE_DATA

./Vendor/Website/Packages/{random2}/Ext/State: CUSTOM_INSTALL_OK

These changes will not be apparent to the server until the next sync.

2.1.4. Sync 2: Client Indicates Update was Successful 2.1.4.1. Server->Client: Request List of Packages Node The server requests the nodes within /Vendor/Website/Packages/.

GET ./Vendor/Website/Packages 2.1.4.2. Client->Server: Client Responds with a {random2} Node that Shows Update Successful ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_DATA

./Vendor/Website/Packages/{random2}/EXT/FileVersionID: {uri: App1 v.2}

2.2. Multiple Attempts at Updating the Same Application 2.2.1. Sync 1: Initial Attempt to Update App1 from Version 1 to Version 2 by Replacing {random1} with {random2}

2.2.1.1. Server->Client: Request List of Packages Node

The server requests the nodes within /Vendor/Website/Packages/.

GET ./Vendor/Website/Packages 2.2.1.2. Client->Server: Client Responds with {random1} Representing App1 v.1

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

2.2.1.3. Server->Client: Servers Asks for Deleting {random1} Representing App1 v.1 and Adds FUMO Node {random2} Representing App1 v.2

The server informs the client that it should remove FUMO {random1} representing App1 v.1 and add new FUMO node {random2} representing App1 v.2

DEL ./Vendor/Website/Packages/{random1}

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App1 v.2}

EXEC ./Vendor/Website/Packages/{random2}/DownloadAndUpdate 2.2.2. Client Deletes FUMO Node for {random1}

DEL ./Vendor/Website/Packages/{random1}: OK 2.2.3. Client: Applies the Update but Fails ./Vendor/Website/Packages/{random2}/State: UPDATE_FAILED_HAVE_DATA ./Vendor/Website/Packages/{random2}/Ext/State: VERIFY_FAILED These changes will not be apparent to the server until the next sync.

2.2.4. Sync 2: Server Discovers Update {random2} has Failed and Creates {random3}:

2.2.4.1. Server->Client: Request List of Packages Node

The server requests the nodes within /Vendor/Website/Packages/.

GET ./Vendor/Website/Packages 2.2.4.2. Client->Server: Client Responds with {random1} and {random2}

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

./Vendor/Website/Packages/{random2}/PkgName: App1

./Vendor/Website/Packages/{random2}/PkgVersion: 2

./Vendor/Website/Packages/{random2}/State: UPDATE_FAILED_HAVE_DATA

./Vendor/Website/Packages/{random2}/EXT/FileVersionID: {uri: App1 v.2}

2.2.4.3. Server->Client: Delete {random1}, {random2} and install {random3}

DEL ./Vendor/Website/Packages/{random1}

DEL ./Vendor/Website/Packages/{random2}

ADD ./Vendor/Website/Packages/{random3}

ADD ./Vendor/Website/Packages/{random3}/State: IDLE

ADD ./Vendor/Website/Packages/{random3}/EXT/FileVersionID: {uri: App1 v.2}

EXEC ./Vendor/Website/Packages/{random3}/DownloadAndUpdate 2.2.5. Client Deletes FUMO Nodes for {random1} and {random2}

DEL ./Vendor/Website/Packages/{random1}: OK

DEL ./Vendor/Website/Packages/{random2}: OK 2.2.6. Client Attempts to Apply Update, but Encounters Error and Rollbacks ./Vendor/Website/Packages/{random3}/State: UPDATE_FAILED_HAVE_DATA ./Vendor/Website/Packages/{random3}/Ext/State: VERIFY_FAILED These changes will not be apparent to the server until the next sync.

2.2.7. Sync 3: Server Discovers Updates {random2}, {random3} have Failed and Creates {random4}

2.2.7.1. Server->Client: Request List of Packages Node

The server requests the nodes within /Vendor/Website/Packages/.

GET ./Vendor/Website/Packages 2.2.7.2. Client->Server: Client Responds with random11, {random2} and {random3}

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

./Vendor/Website/Packages/{random2}/PkgName: App1

./Vendor/Website/Packages/{random2}/PkgVersion: 2

./Vendor/Website/Packages/{random2}/State: STATE_UPDATE_FAILED_HAVE_DATA

./Vendor/Website/Packages/{random2}/EXT/FileVersionID: {uri: App1 v.2}

./Vendor/Website/Packages/{random3}/PkgName: App1

./Vendor/Website/Packages/{random3}/PkgVersion: 2

./Vendor/Website/Packages/{random3}/State: UPDATE_FAILED_HAVE_DATA

./Vendor/Website/Packages/{random3}/EXT/FileVersionID: {uri: App1 v.2}

2.2.7.3. Server->Client: Delete {random1}, {random2}, {random3} and Install New Version as {random4}

DEL ./Vendor/Website/Packages/{random1}

DEL ./Vendor/Website/Packages/{random2}

DEL ./Vendor/Website/Packages/{random3}

ADD ./Vendor/Website/Packages/{random4}

ADD ./Vendor/Website/Packages/{random4}/State: IDLE

ADD ./Vendor/Website/Packages/{random4}/EXT/FileVersionID: {uri: App1 v.2}

EXEC ./Vendor/Website/Packages/{random4}/DownloadAndUpdate 2.2.8. Client Deletes FUMO Nodes for {random1}, {random2} and {random3}

DEL ./Vendor/Website/Packages/{random1}: OK

DEL ./Vendor/Website/Packages/{random2}: OK

DEL ./Vendor/Website/Packages/{random3}: OK 2.2.9. Client Attempts to Apply Update, but Encounters Error and Rollbacks ./Vendor/Website/Packages/{random4}/State: UPDATE_FAILED_HAVE_DATA ./Vendor/Website/Packages/{random4}/Ext/State: VERIFY_FAILED These changes will not be apparent to the server until the next sync.

2.2.10. Sync 4: Server Discovers Updates {random2}, {random3}, {random 4} have Failed and Creates {random5}:

2.2.10.1. Server->Client: Request List of Packages Node:

The server requests the nodes within /Vendor/Website/Packages/.

GET ./Vendor/Website/Packages 2.2.10.2. Client->Server: Client Responds with {random1}, {random2}, {random3} and {random4}

./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

./Vendor/Website/Packages/{random2}/PkgName: App1

./Vendor/Website/Packages/{random2}/PkgVersion: 2

./Vendor/Website/Packages/{random2}/State: UPDATE_FAILED_HAVE_DATA

./Vendor/Website/Packages/{random2}/EXT/FileVersionID: {uri: App1 v.2}

./Vendor/Website/Packages/{random3}/PkgName: App1

./Vendor/Website/Packages/{random3}/PkgVersion: 2

./Vendor/Website/Packages/{random3}/State: UPDATE_FAILED_HAVE_DATA

./Vendor/Website/Packages/{random3}/EXT/FileVersionID: {uri: App1 v.2}

./Vendor/Website/Packages/{random4}/PkgName: App1

./Vendor/Website/Packages/{random4}/PkgVersion: 2

./Vendor/Website/Packages/{random4}/State: UPDATE_FAILED_HAVE_DATA

./Vendor/Website/Packages/{random4}/EXT/FileVersionID: {uri: App1 v.2}

2.2.10.3. Server->Client: Delete {random1}, {random2}, {random3}, {random4} and Install New Version as {random5}

DEL ./Vendor/Website/Packages/{random1}

DEL ./Vendor/Website/Packages/{random2}

DEL ./Vendor/Website/Packages/{random3}

DEL ./Vendor/Website/Packages/{random4}

ADD ./Vendor/Website/Packages/{random5}

ADD ./Vendor/Website/Packages/{random5}/State: IDLE

ADD ./Vendor/Website/Packages/{random5}/EXT/FileVersionID: {uri: App1 v.2}

EXEC ./Vendor/Website/Packages/{random5}/DownloadAndUpdate 2.2.11. Client Deletes FUMO Nodes for {random1}, {random2}, {random3} and {random4}

DEL ./Vendor/Website/Packages/{random1}: OK

DEL ./Vendor/Website/Packages/{random2}: OK

DEL ./Vendor/Website/Packages/{random3}: OK

DEL ./Vendor/Website/Packages/{random4}: OK 2.2.12. Client: Successfully Installs FUMO Node {random5}

./Vendor/Website/Packages/{random5}/State: UPDATE_SUCCESSFUL_HAVE_DATA

./Vendor/Website/Packages/{random5}/Ext/State: POST_CUSTOM_INSTALL_OK

These changes will not be apparent to the server until the next sync.

2.2.13. Sync 5: Server Discovers {random5} Installed Successfully:

2.2.13.1. Server->Client: Request List of Packages Node

The server requests the nodes within /Vendor/Website/Packages/.

GET ./Vendor/Website/Packages 2.2.13.2. Client->Server: Reports {random5} FUMO Node:

./Vendor/Website/Packages/{random5}/PkgName: App1

./Vendor/Website/Packages/{random5}/PkgVersion: 2

./Vendor/Website/Packages/{random5}/State: UPDATE_SUCCESSFUL_HAVE_DATA

./Vendor/Website/Packages/{random5}/Ext/FileVersionID: {Lid: App1 v.2}

3 Mandatory/Critical Updates 3.1. Critical Update with Empty Local History 3.1.1. Sync 1: Server Informs Client of App1 as {random1}

3.1.1.1. Server->Client: Request List of Packages Node

The server requests the nodes within /Vendor/Website/Packages/.

GET ./Vendor/Website/Packages 3.1.1.2. Client->Server: Client Responds with Empty Local FUMO OMA-DM Tree

[empty]

3.1.1.3. Server->Client: Server Adds FUMO Node Representing App1

ADD ./Vendor/Website/Session/Critical: true

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 3.1.2. Client Installs Update Successfully ./Vendor/Website/Packages/{random1}/State: UPDATE_SUCCESSFUL_HAVE_DATA ./Vendor/Website/Packages/{random1}/Ext/State: STATE_CUSTOM_INSTALL_OK 3.1.3. Sync 2: Client Indicates Installation is Successful 3.1.3.1. Server->Client: Request List of Packages Node GET ./Vendor/Website/Packages 3.1.3.2. Client->Server: Client Responds with a {random1} Node that Shows Update Successful ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

3.2. Normal Application Update Followed by a Critical Update 3.2.1. Sync 1: Server Informs Client of App1 as {random1}

3.2.1.1. Server->Client: Request List of Packages Node

The server requests the nodes within /Vendor/Website/Packages/.

GET ./Vendor/Website/Packages 3.2.1.2. Client->Server: Client Responds with Empty Local FUMO OMA-DM Tree

[empty]

3.2.1.3. Server->Client: Server Adds FUMO Node Representing App1

ADD ./Vendor/Website/Session/Critical: false

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 3.2.2. Client Installs Update Successfully ./Vendor/Website/Packages/{random1}/State: UPDATE_SUCCESSFUL_HAVE_DATA ./Vendor/Website/Packages/{random1}/Ext/State: CUSTOM_INSTALL_OK 3.2.3. Sync 2: Client Indicates Installation is Successful 3.2.3.1. Server->Client: Request List of Packages Node GET ./Vendor/Website/Packages 3.2.3.2. Client->Server: Client Responds with a {random1} Node that Shows Update Successful ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

3.2.3.3. Server->Client: Server Responds with App2, which is a Critical Update

./Vendor/Website/Packages/{random2}remains unchanged.

ADD ./Vendor/Website/Session/Critical: true

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App1 v.1}

EXEC ./Vendor/Website/Packages/{random2}/DownloadAndUpdate 3.2.4. Client Successfully Installs App2

./Vendor/Website/Packages/{random1}/State: UPDATE_SUCCESSFUL_HAVE_DATA

./Vendor/Website/Packages/{random1}/Ext/State: CUSTOM_INSTALL_OK 3.3. Partial Installation Followed by Critical Update (Initial FUMO Preserved)

3.3.1. Sync 1: Server Informs Client of App1 as {random1}

3.3.1.1. Server->Client: Request List of Packages Node

The server requests the nodes within /Vendor/Website/Packages/.

GET ./Vendor/Website/Packages 3.3.1.2. Client->Server: Client Responds with Empty Local FUMO OMA-DM Tree

[empty]

3.3.1.3. Server->Client: Server Adds FUMO Node Representing App1

ADD ./Vendor/Website/Session/Critical: false

ADD ./Vendor/Website/Packages/{random1}

ADD ./Vendor/Website/Packages/{random1}/State: IDLE

ADD ./Vendor/Website/Packages/{random1}/EXT/FileVersionID: {uri: App1 v.1}

EXEC ./Vendor/Website/Packages/{random1}/DownloadAndUpdate 3.3.2. Client is Still Progressing with Download Before Next OMA-DM Sync Occurs ./Vendor/Website/Packages/{random1}/State: DOWNLOAD_IN_PROGRESS 3.3.3. Sync 2: Client Indicates Installation is In-progress 3.3.3.1. Server->Client: Request List of Packages Node GET ./Vendor/Website/Packages 3.3.3.2. Client->Server: Client Responds with a {random1} Node that Shows Download is in Progress ./Vendor/Website/Packages/{random1}/PkgName: App1

./Vendor/Website/Packages/{random1}/PkgVersion: 1

./Vendor/Website/Packages/{random1}/State: DOWNLOAD_IN_PROGRESS

./Vendor/Website/Packages/{random1}/EXT/FileVersionID: {uri: App1 v.1}

3.3.3.3. Server->Client: Server Responds with App2, which is a Critical Update

ADD ./Vendor/Website/Session/Critical: true

ADD ./Vendor/Website/Packages/{random2}

ADD ./Vendor/Website/Packages/{random2}/State: IDLE

ADD ./Vendor/Website/Packages/{random2}/EXT/FileVersionID: {uri: App2 v.1}

EXEC ./Vendor/Website/Packages/{random2}/DownloadAndUpdate 3.3.4. Client Successfully Installs App2

App1 should indicate that the download has been cancelled on completion of a new OMA-DM sync ./Vendor/Website/Packages/{random2}/State: UPDATE_SUCCESSFUL_HAVE_DATA ./Vendor/Website/Packages/{random2}/Ext/State: POST_CUSTOM_INSTALL_OK 3.3.5. Sync 3: Client Reports Critical Update Successful, Server Responds with Non-critical Update 3.3.5.1. Server->Client: Request List of Packages Node GET ./Vendor/Website/Packages 3.3.5.2. Client->Server: Client Responds with a {random2} Node that Shows it has Successfully Installed App1 should indicate that the download has been cancelled on completion of a new OMA-DM sync ./Vendor/Website/Packages/{random1}/PkgName: App1

./Vendor/Website/Packages/{random1}/PkgVersion: 1

./Vendor/Website/Packages/{random1}/State: DOWNLOAD_FAILED

./Vendor/Website/Packages/{random1}/EXT/FileVersionID: {uri: App1 v.1}

./Vendor/Website/Packages/{random2}/PkgName: App2

./Vendor/Website/Packages/{random2}/PkgVersion: 1

./Vendor/Website/Packages/{random2}/State: UPDATE_SUCCESSFUL_HAVE_DATA

./Vendor/Website/Packages/{random2}/EXT/FileVersionID: {uri: App2 v.1}

3.3.5.3. Server->Client: Server Requests Installation of App1, which is the Non Critical Update The {random1} FUMO node will be deleted, and a new FUMO node representing App1 will be created ADD ./Vendor/Website/Session/Critical: false DEL ./Vendor/Website/Packages/{random1}

ADD ./Vendor/Website/Packages/{random3}

ADD ./Vendor/Website/Packages/{random3}/State: IDLE

ADD ./Vendor/Website/Packages/{random3}/EXT/FileVersionID: {uri: App1 v.1}

EXEC ./Vendor/Website/Packages/{random3}/DownloadAndUpdate 3.3.6. Client Successfully Installs App1

The FUMO node for ={random1} is deleted. It is no longer necessary.

./Vendor/Website/Packages/{random3}/State: UPDATE_SUCCESSFUL_HAVE_DATA

./Vendor/Website/Packages/{random3}/Ext/State: POST_CUSTOM_INSTALL_OK 3.3.7. Sync 4: Client Reports that App1 Installation is Successful 3.3.7.1. Server->Client: Request List of Packages Node GET ./Vendor/Website/Packages 3.3.7.2. Client->Server: Client Responds with a {random3} Node that Shows it has Successfully Installed ./Vendor/Website/Packages/{random3}/PkgName: App1

./Vendor/Website/Packages/{random3}/PkgVersion: 1

./Vendor/Website/Packages/{random3}/State: UPDATE_SUCCESSFUL_HAVE_DATA

./Vendor/Website/Packages/{random3}/EXT/FileVersionID: {uri: App1 v.1}

./Vendor/Website/Packages/{random2}/PkgName: App2

./Vendor/Website/Packages/{random2}/PkgVersion: 1

./Vendor/Website/Packages/{random2}/State: UPDATE_SUCCESSFUL_HAVE_DATA

./Vendor/Website/Packages/{random2}/EXT/FileVersionID: {uri: App2 v.1}

3.4. OMA-DM Sync During Partial Download of Critical Update (Initial FUMO Preserved)

In this scenario App1 is a critical update, and the server provokes an OMA-DM sync because App2 is pending installation.

3.4.1. Sync 1: Server Informs Client of App1 as {random1}

3.4.1.1. Server Client: Request List of Packages Node

The server requests the nodes within /Vendor/Website/Packages/.

GET ./Vendor/Website/Packages 3.4.1.2. Server Client: Client Responds with Empty Local FUMO OMA-DM Tree

[empty]

3.4.1.3. Server Client: Server Adds FUMO Node Representing App1

ADD ./Vendor/Website/Session/Critical: true

ADD ./Vendor/Website/Packages/{random1}

ADD ./Vendor/Website/Packages/{random1}/State: IDLE

ADD ./Vendor/Website/Packages/{random1}/Ext/FileVersionID: {uri: App1 v.1}

EXEC ./Vendor/Website/Packages/{random1}/DownloadAndUpdate 3.4.2. Client Partially Downloads App1, and is Forced to Perform an OMA-DM Sync ./Vendor/Website/Packages/{random1}/State: DOWNLOAD_PROGRESSING ./Vendor/Website/Packages/{random1}/Ext/State: DOWNLOAD_PROGRESSING 3.4.3. Sync 2: Client Indicates App1 Download is in Progress During this sync, the server will prevent the publishing of a FUMO node for App2, because the installation of App1 is still in progress.

It is possible for the server to override the installation of App1 at this point by modifying the FUMO structure.

3.4.3.1. Server Client: Request List of Packages Node

GET ./Vendor/Website/Packages 3.4.3.2. Client Server: Client Responds with a {random1} Node that Shows Download is in Progress ./Vendor/Website/Packages/{random1}/PkgName: App1

./Vendor/Website/Packages/{random1}/PkgVersion: 1

./Vendor/Website/Packages/{random1}/State: DOWNLOAD_PROGRESSING

./Vendor/Website/Packages/{random1}/EXT/FileVersionID: {uri: App1 v.1}

3.4.3.3. Server Client: Server does not Modify the Tree and Resumes Update of App1

The server will reset the ./State to be IDLE and EXEC the ./DownloadAndUpdate.

ADD ./Vendor/Website/Session/Critical: true

UPDATE ./Vendor/Website/Packages/{random1}/State: IDLE

EXEC ./Vendor/Website/Packages/{random1}/DownloadAndUpdate 3.4.4. Client Successfully Resumes Installation App1

./Vendor/Website/Packages/{random1}/State: UPDATE_SUCCESSFUL_HAVE_NO_DATA

./Vendor/Website/Packages/{random1}/Ext/State: POST_CUSTOM_INSTALL_OK 3.4.5. Sync 3: Client Reports App1 Installation is Successful, Server Sends App2

3.4.5.1. Server Client: Request List of Packages Node

GET ./Vendor/Website/Packages 3.4.5.2. Client Server: Client Responds with a {random1} Node that Shows it has Successfully Installed ./Vendor/Website/Packages/{random1}/PkgName: App1

./Vendor/Website/Packages/{random1}/PkgVersion: 1

./Vendor/Website/Packages/{random1}/State: UPDATE_SUCCESSFUL_HAVE_DATA

./Vendor/Website/Packages/{random1}/EXT/FileVersionID: {uri: App1 v.1}

3.4.5.3. Client Server: Server Indicates that App2 is Available

ADD ./Vendor/Website/Session/Critical: false

ADD ./Vendor/Website/Packages/{random2}

ADD ./Vendor/Website/Packages/{random2}/PkgName: App2

ADD ./Vendor/Website/Packages/{random2}/State: IDLE

ADD ./Vendor/Website/Packages/{random2}/Ext/FileVersionID: {uri: App2 v.1}

EXEC ./Vendor/Website/Packages/{random2}/DownloadAndUpdate 3.5. OMA-DM Sync During Partial Download of Critical Update (New FUMO Created)

This scenario is similar to the one above, except that instead of re-using the same {random1} node for App1, it creates a new FUMO node App1, called {random2}

3.5.1. Sync 1: Server Informs Client of App1 as {random1}

3.5.1.1. Server Client: Request List of Packages Node

The server requests the nodes within /Vendor/Website/Packages/.

GET ./Vendor/Website/Packages 3.5.1.2. Server Client: Client Responds with Empty Local FUMO OMA-DM Tree

[empty]

3.5.1.3. Server Client: Server Adds FUMO Node Representing App1

ADD ./Vendor/Website/Session/Critical: true
ADD ./Vendor/Website/Packages/{random1}
ADD ./Vendor/Website/Packages/{random1}/State: IDLE
ADD ./Vendor/Website/Packages/{random1}/Ext/FileVersionID: {uri: App1 v.1}
EXEC ./Vendor/Website/Packages/{random1}/DownloadAndUpdate 3.5.2. Client Partially Downloads App1, and is Forced to Perform an OMA-DM Sync ./Vendor/Website/Packages/{random1}/State: DOWNLOAD_PROGRESSING
./Vendor/Website/Packages/{random1}/Ext/State: DOWNLOAD_PROGRESSING 3.5.3. Sync 2: Client Indicates App1 Download is in Progress 3.5.3.1. Server Client: Request List of Packages Node GET ./Vendor/Website/Packages 3.5.3.2. Client Server: Client Responds with a {random1} Node that Shows Download is in Progress ./Vendor/Website/Packages/{random1}/PkgName: App1
./Vendor/Website/Packages/{random1}/PkgVersion: 1
./Vendor/Website/Packages/{random1}/State: DOWNLOAD_PROGRESSING
./Vendor/Website/Packages/{random1}/EXT/FileVersionID: {uri: App1 v.1}

3.5.3.3. Server Client: Server Creates a New FUMO Node Representing App1

ADD ./Vendor/Website/Session/Critical: true
DEL ./Vendor/Website/Packages/{random1}
ADD ./Vendor/Website/Packages/{random2}/State: IDLE
ADD ./Vendor/Website/Packages/{random2}/Ext/FileVersionID: {uri: App1 v.1}
EXEC ./Vendor/Website/Packages/{random2}/DownloadAndUpdate 3.5.4. Client Successfully Resumes Installation App1

./Vendor/Website/Packages/{random2}/State: UPDATE_SUCCESSFUL_HAVE_NO_DATA
./Vendor/Website/Packages/{random2}/Ext/State: POST_CUSTOM_INSTALL_OK 3.5.5. Sync 3: Client Reports App1 Installation is Successful, Server Sends App2

3.5.5.1. Server Client: Request List of Packages Node

GET ./Vendor/Website/Packages 3.5.5.2. Client Server: Client Responds with a {random2} Node that Shows it has Successfully Installed ./Vendor/Website/Packages/{random2}/PkgName: App1
./Vendor/Website/Packages/{random2}/PkgVersion: 1
./Vendor/Website/Packages/{random2}/State: UPDATE_SUCCESSFUL_HAVE_DATA
./Vendor/Website/Packages/{random2}/Ext/FileVersionID: {uri: App1 v.1}

3.5.5.3. Client Server: Server Indicates that App2 is Available

ADD ./Vendor/Website/Session/Critical: false
ADD ./Vendor/Website/Packages/{random3}
ADD ./Vendor/Website/Packages/{random3}/PkgName: App2
ADD ./Vendor/Website/Packages/{random3}/State: IDLE
ADD ./Vendor/Website/Packages/{random3}/Ext/FileVersionID: {uri: App2 v.1}
EXEC ./Vendor/Website/Packages/{random3}/DownloadAndUpdate 3.6. OMA-DM Sync During Partial Download of Critical Update (New FUMO Created After Timeout has Been Reached)

This scenario is similar to the one above, except the creation of the new FUMO is postponed until the installation time exceeds a maximum allowable time.

The server can postpone sending new FUMO for a configurable amount of time or it can calculate estimated time to finish based on the application size etc.

This approach allows the client to finish current downloads without being interrupted by the server while on the other hand it allows the server to restart downloads on demand.

3.6.1. Sync 1: Server Informs Client of App1 as {random1}

3.6.1.1. Server Client: Request List of Packages Node

The server requests the nodes within /Vendor/Website/Packages/.

GET ./Vendor/Website/Packages 3.6.1.2. Server Client: Client Responds with Empty Local FUMO OMA-DM Tree

[empty]

3.6.1.3. Server Client: Server Adds FUMO Node Representing App1

ADD ./Vendor/Website/Session/Critical: true
ADD ./Vendor/Website/Packages/{random1}
ADD ./Vendor/Website/Packages/{random1}/State: IDLE
ADD ./Vendor/Website/Packages/{random1}/Ext/FileVersionID: {uri: App1 v.1}
EXEC ./Vendor/Website/Packages/{random1}/DownloadAndUpdate 3.6.2. Client Partially Downloads App1, and is Forced to Perform an OMA-DM Sync ./Vendor/Website/Packages/{random1}/State: DOWNLOAD_PROGRESSING
./Vendor/Website/Packages/{random1}/Ext/State: DOWNLOAD_PROGRESSING 3.6.3. Sync 2: Client Indicates App1 Download is in Progress 3.6.3.1. Server Client: Request List of Packages Node GET ./Vendor/Website/Packages 3.6.3.2. Client Server: Client Responds with a {random1} Node that Shows Download is in Progress ./Vendor/Website/Packages/{random1}/PkgName: App1
./Vendor/Website/Packages/{random1}/PkgVersion: 1
./Vendor/Website/Packages/{random1}/State: DOWNLOAD_PROGRESSING
./Vendor/Website/Packages/{random1}/EXT/FileVersionID: {uri: App1 v.1}

3.6.3.3. Server Client: Installation is in Progress, Timeout not Reached

The server calculates time difference between the EXEC command from the sync 1 and the current timestamp. For this sync the difference was below the maximum allowable value so server finishes sync without sending any command

[empty]

3.6.4. Sync 3: Client Indicates App1 Download is in Progress, but Installation Reached the Timeout Client was forced to perform yet another OMA-DM sync while progressing download of App1.

3.6.4.1. Server Client: Request List of Packages Node

GET ./Vendor/Website/Packages 3.6.4.2. Client Server: Client Responds with a {random1} Node that Shows Download is in Progress ./Vendor/Website/Packages/{random1}/PkgName: App1

./Vendor/Website/Packages/{random1}/PkgVersion: 1

./Vendor/Website/Packages/{random1}/State: DOWNLOAD_PROGRESSING

./Vendor/Website/Packages/{random1}/EXT/FileVersionID: {uri: App1 v.1}

3.6.4.3. Server Client: Installation is in Progress, Timeout for the Installation Reached The server found that installation already reached maximum allowable time and it is still in the DOWNLOAD_PROGRESSING state. The server decides to restart installation by either reusing {random1}FUMO and resets it's state to IDLE or replacing the {random1}FUMO with {random2}. Below the second option is considered.

ADD ./Vendor/Website/Session/Critical: true

DEL ./Vendor/Website/Packages/{random1}

ADD ./Vendor/Website/Packages/{random2}/State: IDLE

ADD ./Vendor/Website/Packages/{random2}/Ext/FileVersionID: {uri: App1 v.1}

EXEC ./Vendor/Website/Packages/{random2}/DownloadAndUpdate 3.6.5. Client Successfully Resumes Installation App1

./Vendor/Website/Packages/{random2}/State: UPDATE_SUCCESSFUL_HAVE_NO_DATA

./Vendor/Website/Packages/{random2}/Ext/State: POST_CUSTOM_INSTALL_OK 3.6.6. Sync 3: Client Reports App1 Installation is Successful, Server Sends App2

3.6.6.1. Server Client: Request List of Packages Node

GET ./Vendor/Website/Packages 3.6.6.2. Client Server: Client Responds with a {random2} Node that Shows it has Successfully Installed ./Vendor/Website/Packages/{random2}/PkgName: App1

./Vendor/Website/Packages/{random2}/PkgVersion: 1

./Vendor/Website/Packages/{random2}/State: UPDATE_SUCCESSFUL_HAVE_DATA

./Vendor/Website/Packages/{random2}/Ext/FileVersionID: {uri: App1 v.1}

3.6.6.3. Client Server: Server Indicates that App2 is Available

ADD ./Vendor/Website/Session/Critical: false

ADD ./Vendor/Website/Packages/{random3}

ADD ./Vendor/Website/Packages/{random3}/PkgName: App2

ADD ./Vendor/Website/Packages/{random3}/State: IDLE

ADD ./Vendor/Website/Packages/{random3}/Ext/FileVersionID: {uri: App2 v.1}

EXEC ./Vendor/Website/Packages/{random3}/DownloadAndUpdate

4. Log Events 4.1. External Interfaces FR1.2.2.18

4.1.1. Software Update Report

@prefix not: <http://website.com/notifications/>.

@prefix comp: <http://website.com/components/>.

@prefix esm: <http://website.com/esm/1.0/>.

@prefix log: <http://website.com/log2rdf/0.1/>.

@prefix cars: <http://website.com/cars/>.

@prefix ciapps: <http://website.com/ciapps/>.

@prefix xsd: <http://www.w3.org/2001/XMLSchema#>.

@prefix gr: <http://purl.org/goodrelations/v1#>.

@prefix rdfs: <http://www.w3.org/2000/01/rdf-schema#>.

#Software update notification cars: 1B7FL26N1YS842572 esm: notifies not: 1B7FL26N1YS842572-1373891691000.

not: 1B7FL26N1YS8425721373891691000 a esm: LogReport;

rdfs:label "Status Report Notification";

rdfs:comment "Status Report Notification for Vin: 1B7FL26N1YS842572 and timestamp: 1373891691000";

log:Timestamp "1373891691000"^^xsd:long;

log:extends not: 1B7FL26N1YS842572-1373891691000;

log:trim cars:Sport-Option-On-Vaillante-Vulcan-2013;

log:severity log:SEVLEVEL;

log:reportedBy comp:LoggerV1.

cars:1B7FL26N1Y5842572 esm: notifies not: 1B7FL26N1Y5842572-1373891691000.

cars:1B7FL26N1YS842572 log:reportsHaving <FileVersionID URI>.

not:1B7FL26N1YS842572-1373891691000 a esm: SoftwareUpdateReport;

rdfs:label "Software Update Report Notification"@en;

rdfs:comment "Software Update Report for Vin: 1B7FL26N1YS842572 and timestamp: $1373891691000"@en;

log:Timestamp "1373891691000"^^xsd:long;

log:reportedBy comp:UpdateManagerV1;

esm:regarding <FileVersionID URI>;

log:message "Application Weather has been updated"^^-xsd:string;

log:trace <FileVersionID URI>;

log:severity log:SEVLEVEL.

#End of software update notification 4.2. QNX Demo #1

4.3. Web Server Demo

@prefix not: <http://website.com/notifications/>.

@prefix comp:<http://website.com/components/>.

@prefix esm:<http://website.com/esm/1.0/>.

@prefix log:<http://website.com/log2rdf/0.1/>.

@prefix cars:<http://website.com/cars/>.

@prefix xsd:<http://www.w3.org/2001/XMLSchema#>.

@prefix rdfs:<http://www.w3.org/2000/01/rdf-schema#>.

cars: 1b7f126n1ys842572 esm:notifies not: 1b7f126n1ys842572-1395936227.

not: 1b7f126n1ys842572-1395936227 a esm:StatusReport;

log:timestamp "1395936227"^^xsd:long;

log:extends not: 1b7f126n1ys8425721395936227;

log:severity log:INFO;

log:reportedBy comp:Webserver_webserver1-5-g604c324.

cars:1b7f126n1ys842572 esm:notifies not: 1b7f126n1ys842572-1395936227.

not: 1b7f126n1ys842572-1395936227 a esm:FAIssueNotification;

log:Timestamp “1395936227”^^xsd:long;

log:reportedBy comp:Webserver_webserver1-5-g604c324;

esm:regarding <Unknown>;

log:message “me”@en;

log:severity log:INFO.

#End of Application Issue Notification 4.4. LENC Upload 4.4.1. Typical Log Events During Installation of HTML5 Application cars:WAUZZZ8DZWA123456 esm:notifies not:WAUZZZ8DZWA123456-12, not:WAUZZZ8DZWA123456-56, not:WAUZZZ8DZWA123456-57, not:WAUZZZ8DZWA123456-58, not:WAUZZZ8DZWA123456-60, not:WAUZZZ8DZWA123456-61.

not: WAUZZZ8DZWA123456-12 esm:regarding <http://website.com/components/REDUP/fr1.2.3.3-12-g10ddc47>;

log:Timestamp “1395940473”^^xsd:long;

log:message “OMA-DM sync completed.”^^xsd:string;

log:reportedAt “1395940473”^^xsd:long;

log:reportedBy <http://website.com/components/REDUP/fr1.2.3.3-12-g10ddc47>;

log:severity log:INFO;

a esm:OMA-DM_Sync.

not: WAUZZZ8DZWA123456-56 esm:regarding <http://website.com/components/REDUP/fr1.2.3.3-12-g10ddc47>;

log:Timestamp “1395941454”^^xsd:long;

log:message “User has accepted the update for update_id 1395941416596647, download is starting now.”^^xsd:string;

log:reportedAt “1395941454”^^xsd:long;

log:reportedBy <http://website.com/components/REDUP/fr1.2.3.3-12-g10ddc47>;

log:severity log:INFO;

a esm:StatusReport.

not: WAUZZZ8DZWA123456-57 esm:regarding <http://website.com/components/REDUP/fr1.2.3.3-12-g10ddc47>;

log:Timestamp “1395941463”^^xsd:long;

log:message “REDUP client starting installation of update 1395941416596647.”^^xsd:string;

log:reportedAt “1395941463”^^xsd:long;

log:reportedBy <http://website.com/components/REDUP/fr1.2.3.3-12-g10ddc47>;

log:severity log:INFO;

a esm:StatusReport.

not:WAUZZZ8DZWA123456-58 esm:regarding <http://website.com/components/REDUP/fr1.2.3.3-12-g10ddc47>;

log:Timestamp “1395941465”^^xsd:long;

log:message “Update verification successful for updateID 1395941416596647.”^^xsd:string;

log:reportedAt “1395941465”^^xsd:long;

log:reportedBy <http://website.com/components/REDUP/fr1.2.3.3-12-g10ddc47>;

log:severity log:INFO;

a esm:StatusReport.

not:WAUZZZ8DZWA123456-60 esm:regarding <http://website.com/components/REDUP/fr1.2.3.3-12-g10ddc47>;

log:Timestamp “1395941472”^^xsd:long;

log:message “Installation successful for updateID 1395941416596647 and uuid 1231231231233221.”^^xsd:string;

log:reportedAt “1395941472”^^xsd:long;

log:reportedBy <http://website.com/components/REDUP/fr1.2.3.3-12-g10ddc47>;

log:severity log:INFO;

a esm:StatusReport.

not: WAUZZZ8DZWA123456-61 esm:regarding <http://website.com/components/REDUP/fr1.2.3.3-12-g10ddc47>;

log:Timestamp “1395941473”^^xsd:long;

log:message “Update/Delete completed successfully.”^^-xsd:string;

log:reportedAt “1395941473”^^xsd:long;

log:reportedBy <http://website.com/components/REDUP/fr1.2.3.3-12-g10ddc47>;

log:severity log:INFO;

a esm:StatusReport.

4.4.2. Log Events Reported from Connected Infotainment’s LoggerWrapper

Logs Stored After API Call for a Native Component Logging an Event

@prefix rdf: <http://www.w3.org/1999/02/22-rdf-syntax-ns#>.

@prefix dlapps: <http://website.com/dlapps/>.

@prefix not: <http://website.com/notifications/>.

@prefix comp: <http://website.com/components/>.

@prefix esm: <http://website.com/esm/1.0/>.

@prefix log: <http://website.com/log2rdf/0.1/>.

@prefix cars: <http://website.com/cars/>.

@prefix ciapps: <http://website.com/ciapps/>.

@prefix xsd: <http://www.w3.org/2001/XMLSchema#>.

@prefix rdfs: <http://www.w3.org/2000/01/rdf-schema#>.

cars:WAUZZZ8DZWA123456 esm:notifies not:WAUZZZ8DZWA123456-61.

not: WAUZZZ8DZWA123456-61 esm:regarding ciapps:CIAM;

log:Timestamp “1234567002”^^xsd:long;

log:message “_lifecycle application manager startup complete”^^xsd:string;

log:reportedAt “1234560000”^^xsd:long;

log:reportedBy ciapps:CILW;

log:severity log:INFO;

a esm:Status.

Logs Stored After API Call for an HTML5 App Logging an Event

@prefix rdf: <http://www.w3.org/1999/02/22-rdf-syntax-ns#>.

@prefix dlapps: <http://website.com/dlapps/>.

@prefix not: <http://website.com/notifications/>.

@prefix comp: <http://website.com/components/>.

@prefix esm: <http://website.com/esm/1.0/>.

@prefix log: <http://website.com/log2rdf/0.1/>.

@prefix cars: <http://website.com/cars/>.

@prefix ciapps: <http://website.com/ciapps/>.

@prefix xsd: <http://www.w3.org/2001/XMLSchema#>.

@prefix rdfs: <http://www.w3.org/2000/01/rdf-schema#>.

cars:WAUZZZ8DZWA123456 esm:notifies not:WAUZZZ8DZWA123456-29.

not: WAUZZZ8DZWA123456-29 esm: regarding <http://website.com/ciapps/23BF1E34FFde45AF>;

log:Timestamp “1234560000”^^xsd:long;

log:message "flight tracker\\t2.1\\tDriver Zone\\t_performance: delay in response after blabla\\tUser: 123456\\n"^^xsd:string;
log:reportedAt "1234567002"^^xsd:long;
log:reportedBy ciapps:CILW;
log:severity log:WARNING;
a esm:Status.

4.4.3. EventsReduced

The EventReduced event is created when the LENC Reducer saves the current contents of the in-memory database to disk.

@prefix rdf: <http://www.w3.org/1999/02/22-rdf-syntax-ns#>.
@prefix dlapps: <http://website.com/dlapps/>.
@prefix not: <http://website.com/notifications/>.
@prefix comp: <http://website.com/components/>.
@prefix esm: <http://website.com/esm/1.0/>.
@prefix log: <http://website.com/log2rdf/0.1/>.
@prefix cars: <http://website.com/cars/>.
@prefix ciapps: <http://website.com/ciapps/>.
@prefix xsd: <http://www.w3.org/2001/XMLSchema#>.
@prefix rdfs: <http://www.w3.org/2000/01/rdf-schema#>.
cars:WAUZZZ8DZWA123456
esm:notifies not:WAUZZZ8DZWA123456-59.
not: WAUZZZ8DZWA123456-59
esm:regarding comp:LENC;
log:ReduceReason log:ReducedToDisk;
log:Timestamp "1395941471"^^xsd:long;
log:reportedAt "1395941471"^^xsd:long;
log:reportedBy comp:LENC;
log:severity log:INFO;
a esm:EventsReduced.

Alternative Embodiment 7

In some alternative embodiments, REDUP includes the following activities and/or components.

Figure 113:
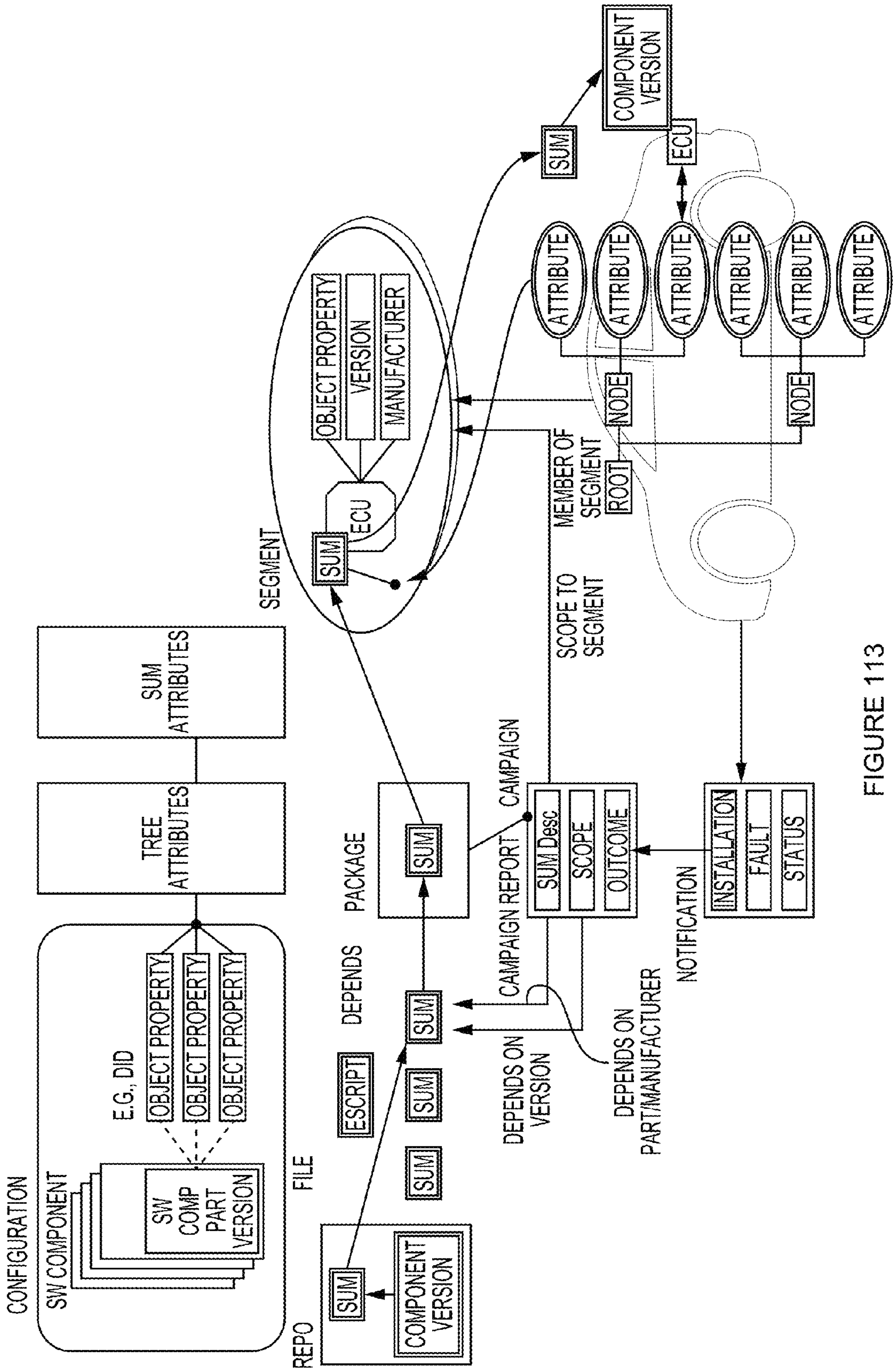

- IoT
- Graph-based Telematic Client—the Log Notification Client
  - RDF graph reports on device events
  - Sending priorities
  - In memory model mode with store to file on power down
- Notification Ontology for LENC
  - Notification report priority via 'Severity'
  - Supports chaining of notification reports
  - Notification classes are extendable: Function effecting issue, telematic report, user interactions, installation reports etc
- Embedded Systems Ontology
  - Supports structured configurations of devices including vehicles
  - Defines an 'ECU' model of hardware and software components
  - Software component update description
  - Reporting of installation results
- Vehicle strategy based around IoT principles
  - Data as a central driver for services
  - Decoupled vehicle from DB
  - Developed around linked data
  - NoSQL
  - Graph-based telematic client
  - Vehicle Ontologies
  - Databus
- Embedded Systems (ES) Ontology. See FIG. 31.
- Segment Management. See FIG. 113.
- Server manages updates via segment groups
- Segment groups can:
  - Have assigned vehicles
  - Can be linked to vehicles via attributes (Products)
- ECU's can be associated with Product segments groups
  - This means that segment groups are not only device groups but are descriptions of the product itself
- Packages of updates are delivered into segment groups
  - Packages can be targeted to product
  - Update manager experience is of updates to products (of which vehicles are members) rather than groups of vehicles
  - Packages can be validated against the ECUs linked to products
- As part of remote software management
  - Ability to manage software through product configurations
  - Ability to create segments and targeting updates
  - Ability to create segments and vehicle configuration
  - Ability to dynamically calculate files to download
  - A segment management tool as part of REDUP
  - Segment mapping to product configuration
  - A tool for validating packages passed to segments System Supports Multiple Campaigns of Software Updates

- Multiple campaigns means it is more difficult to visualize inter-campaign dependencies, thus the following tool was created
  - A slider widget that shows vehicle history
  - Slider has a 'Next Update point' which defines the 'Should Be' state of the vehicle
- Enables the Campaign manager to test what state each vehicles will be in after the publication of the update.
  - Takes into account parallel campaigns
- As part of remote software management
  - Ability to manage multiple campaigns with dependent software
  - Ability for each vehicle to identify which software will be downloaded.
  - A slider widget that shows vehicle history
  - Slider has a 'Next Update point'
- Vehicles are getting complex
  - Multiple Campaigns of updates across multiple ECUs
  - Campaigns need to manage dependencies—complex
  - Need to test what-if scenarios
  - Slider widget allows you to test what if for specific vehicles

Alternative Embodiment 8

Other alternative embodiments may include the following.

- System Related
- Apparatus that allows full remote management of large networks of disparate remote devices including software, configuration and user data
- Processes to create, configure and execute remote device software update campaigns
- Methods to link products to reported instances of products—use of graph for matching
- Methods to target product improvements by linking the results of analytics to the scope of the software components' use within products

- Methods to identify the scale of a software update by use of reported device information gathered via a telematics client
- Methods to manage multiple workflows for different types of software updates including FOTA/SOTA/AOTA
- Methods for applying rules to the dependencies of software update modules on each other and to the state of the device such as current software versions, parts numbers etc.
- Methods for the management of packages for software updates modules so that they can be assigned to segments
- Method for dynamically calculating which files to download during synchronization
- Methods for determining "should be" status, based on what will happen to a vehicle after the next synchronization, using last reported data
- Methods for determining "what if" based on next synchronization and if a package is added for the remote managed device
- Processes and methods for handling the logic to use multiple bearers for transmitting and receiving data related to a remote device management campaign in a dynamic and configurable manner (policy based)
- Methods and processes for combining data from a fleet of remote managed devices as well as additional data sources that can be associated with a specific type of remote managed devices in order to extract specific properties of the type of remote managed device that are not directly visible (e.g. might include detection of typical fault patterns, deficiencies in the product quality, relationships between different product properties, etc.)
- Dynamic reporting of data to minimize traffic payload from the remote managed device to the management backend Notification Related (Covers e.g. Also Implementations Like MQTT)

- Using a unique token for every device+application+user to differentiate between notification topics for application messages
- Using the payload of the notification to prompt an update of an OMA-DM tree
- Using the payload of the notification to update a serialized version of an OMA-DM sub-tree
- Send a serialized version of part of the OMA DM tree via a mobile device so that you can have the mobile device return downloads in an efficient manner
- Using MQTT payload to trigger an OMA-DM sync
- Use of OMA-DM tree to manage a list of notifications received during the application of a software update
- Publishing of graph data onto an MQTT topic to direct software updates /relay device component information (e.g. DTCs)
- Methods to dynamically configure structure, frequency and type of telemetry data reporting from the remote managed devices and use of a graph database to report notifications from the vehicles
- Methods to identify and report malfunction or abnormal behavior of remote devices and notification of remote device management system operator Synchronization Protocol Related (e.g. Extensions/New Uses of OMA-DM)

- Marking different sub-trees of OMA-DM for use with different application type installers
- Representation and management of the installation progress state in the OMA-tree
- Application of updates in an OMA-DM sub tree as a group; to be applied as a group, and to be rolled back as a group
- Use of multiple FUMO nodes to represent the same/different versions of the same application
- Use of extension attributes to determine the location of installation
- Interaction of an OMA-DM tree with an event-loop in the context of software updates
- Representation of sections of an OMA-DM tree as JSON—serialization of OMA-DM to JSON-LD
- Representation of an OMA-DM tree in a graph database Graph Data Related (Might Use e.g. Implementations Like RDF)

- Storage of log events locally on a device in a graph database and the management of prioritization of which events are uploaded and expired based on system resources
- Methods for applying a graph database for the description of embedded systems via ontologies
- Methods for applying a graph database for the description of notifications via ontologies
- Methods for applying a graph database for the description of OMA-DM via ontologies User Profiles Related

- Embedded user-specific JSON within OMA-DM tree
- Use of an expiry date attribute to define how long a users' information will be resident on the device
- User of an extension state to indicate that the FUMO node should be removed on a subsequent sync Applications Related

- Use of an application hash in the OMA-DM tree to verify downloaded updates
- Generation of an application hash based on the concatenated hash of all files in the application to verify the installation integrity of an application downloaded over OMA-DM
- Usage of the OMA-DM tree to maintain installation state during restart of application installation
- Management of application state in OMA-DM tree during invocation of 3rd party installers Data Related

- Methods for structuring a large, diverse set of devices in a way that allows to identify and address multiple devices of similar configurations
- Methods for decomposition of products into collections of segments where segments are groups whose members match specific parameters communicated by devices or by externally defined and linked data.
  - External data is linked to remote managed devices via any device parameter such as device ID/vehicle identification number (VIN) or similar. For example one could link a VIN to the registration district and only update remote managed devices that come from the specific district.
  - Software components and their embedded systems are assigned to segments so that packages of software updates can be channeled to remote managed devices that are comprised of such components
- Methods to identify and resolve dependencies related to the software configuration that allows for providing update packages including multiple software components
  - This includes resolving dependencies via attributes of e.g. a OMA-DM tree which are communicated from each installer

- Methods to manage installation of update packages on the remote device
  - This includes management of multiple installers in the client which could act as gateways to their own domains
- Methods to query and report device data in order to create a representation of the remote device state in a managed database
- Methods to expose a large amount of collected remote managed device data through a standard interface for further processing which includes but is not limited to predictive analytics methods Notes:

- A remote managed device can be any type of device including vehicles, smart sensors, consumer equipment, industrial equipment, etc.
- OTA refers to Over-The-Air provisioning of information which could be software or data thereby FOTA refers to Firmware-OTA, SOTA refers to Software-OTA, AOTA refers to Application-OTA

DETAILED VIEWS OF EMBODIMENTS

Figure 114:
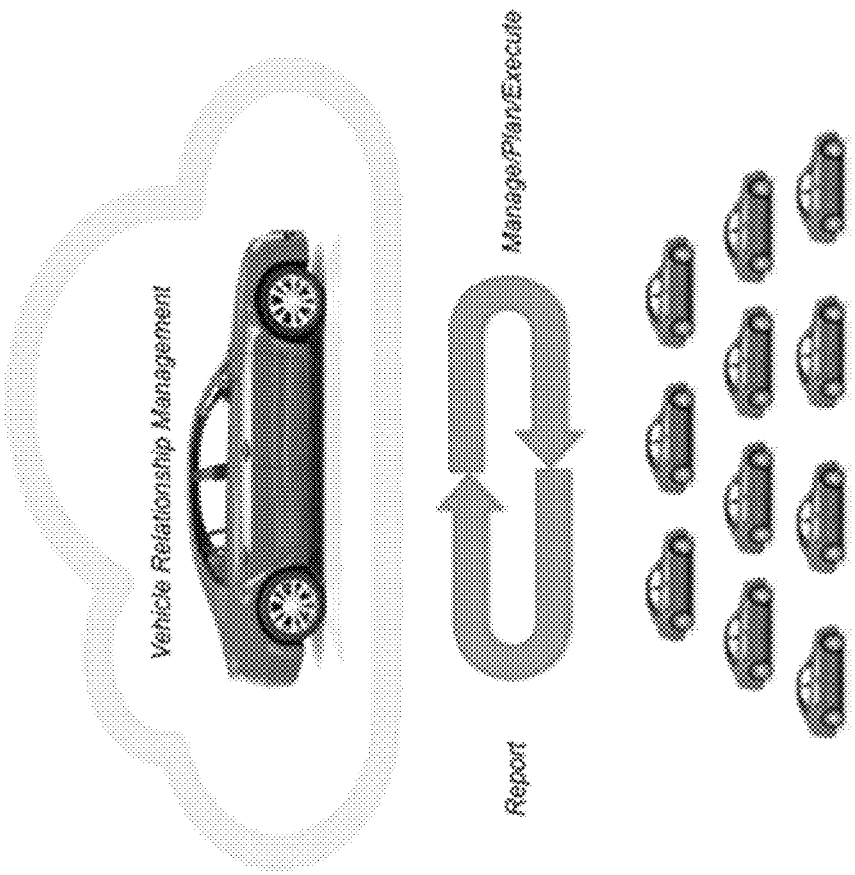

1 Methods to Link Products to Reported Instances of Products—Use of Graph for Matching This idea relates to the capability within the platform to treat the car as a managed product where instances of the product are updated by virtue of their membership to segments derived from the Bill Of Materials for each model/variant/option. See FIG. 114.

Vehicle relationship management provides tools for remotely managing cars. Managing large numbers of vehicles on the road is facilitated by understanding their state in order to make decisions about how software or hardware improvements can be made. Each vehicle reports small amounts of information about the real-time performance and usage of the car. Together, the information can be used to form a complete view of the state of the product. From this view decisions can be made about software or configuration changes that could be made.

Vehicle relationship management is not the same as customer relationship management. The relationship is strictly between the OEM and the vehicle in a similar way to that currently where the dealer maintains a vehicle in good working by physically connecting a diagnostics tool to read data and facilitate software updates. The difference is that the diagnostics is done remotely for the convenience and benefit of the vehicle owner.

REDUP handles the relationship between product and devices (vehicles).

1.1 Data

VRM is driven by data from the vehicle. As such, it is part of the Internet of Things Vehicle configuration information for the product is linked to telematic reports from the vehicle. This enables live information about the vehicle to be collected and matched against product.

1.2 Files

REDUP is a platform that facilitates managing files, delivering these to their target set of vehicles and installing them. In practice, this end-to-end process is complicated. Vehicles have changed from electro-mechanical devices to software-based electro-mechanical devices. The scope and variety of software within vehicles is immense and this creates a complex environment for software management. The aforementioned files are termed Software Update Modules. They can be

- Multiple embedded OS ECU firmware images
- Binary applications, middleware, drivers etc.
- End user applications, HTML5, Android, QT etc.
- Configuration files, libraries and scripts, and user profiles How each SUM is installed differs depending on the SUM type and which installer is employed.

1.3 Packages

SUMs can be managed in isolation but are often managed as sets. The sets could be the following:

- A group of delta files taking a component from one of a set of previous versions to a new version.
- A bag of RPM files; perhaps, the main RPM and its dependent RPMs
- A set of user applications
- A firmware image with a dependent firmware image plus installation script and process file.

Packages therefore conveniently group files so that they can be managed and published together.

1.4 Segments

Another requirement of software management is the ability to notify vehicles in a timely manner and as appropriate when updates are published. This targeted notification is a means of requesting vehicles to contact the server to ascertain whether there are updates available. It is a means of avoiding having every vehicle contact the server each day to check for updates. It is also a means of controlling from the server the priority, ordering and load spreading for updates.

Ideally, notifications would only go out to specific vehicles that require the update. However, with variations in vehicle product (model, trim levels, customizations), production and, subsequently, with changes to vehicles over their lifetime identifying exactly which vehicles to notify is a matter of smart vehicle group management.

This grouping of vehicles is done though a process of Segmentation. Segments group vehicles together via combinations of attributes of the vehicle. It is possible to create segment groups by listing Vehicle Identification Numbers but it is also useful to group vehicles by attributes such as base model, trim level, etc.

A vehicle can belong to multi segments. This is illustrated in FIG. 10.

In this way each vehicle can be defined by the collection of segments it belongs to. When a package of updates is published, it is published to a segment. There are two types of segments that allow us to target packages of updates in two ways.

1.4.1 Product Segments

For product (a.k.a. Model Range) segments the vehicle product is defined by the collection of ECUs that are used in its construction. Software management targets changes to the software components of ECUs. The objective of product segments is to divide up the software management task into groups for base model, variants/trim levels and features etc. For example a base model involves a collection of ECUs may be the same across all variants. A segment would be defined for this. A second segment could be defined for each trim level where the ECU configurations are different. Other segments could manage applications for the IVI for each trim. Segmentation therefore divides up the task of software management and, importantly, simplifies the process of vehicle notification and update load handling.

Within each segment it is possible to explicitly manage the ECUs to which the software updates are targeted. Software update modules can be configured to define dependencies. One type of dependency is between the versions of a software component of the target ECU with the software version of another ECU. By grouping ECUs by segment it is possible for the rules checker to warn the product manager if a dependent ECU is not present with a segment.

1.4.2 Device Segments

Another type of segment is the device segment. Whereas product segments are defined to describe the vehicle product as a way of managing the software level of vehicles according to product, device segments work differently. Device segments are a means of identifying specific lists of vehicles to which to target updates. The segments are most often based on VIN number but could be based on any vehicle attribute including parameters identifying test vehicles.

One example use of a device segment is during production where a small batch of vehicles may have been manufactured using an older part number and may require a custom software fix. A device segment could be created identifying the target vehicles for the update.

Because device segments are not focused on products but specific vehicles there is no explicit grouping of ECUs within these types of segments. Any ECU dependencies will be resolved when each vehicle connects to the server.

If a vehicle is a member of a device segment then it may be removed from product segments. The reason is to avoid the situation where Device Segments come into conflict with Product Segments.

1.4.3 Segment Examples

Figure 115:
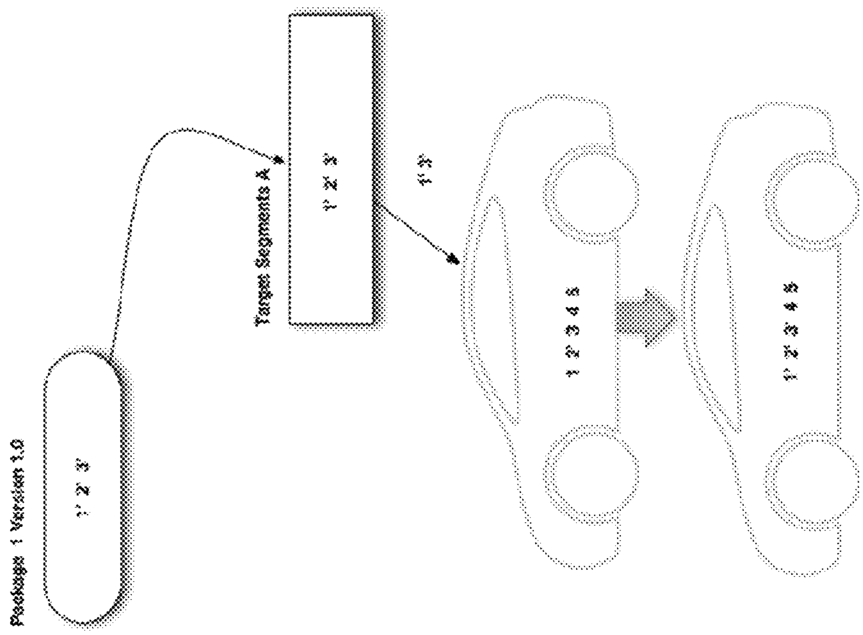

In the first example a vehicle starts in a specific software state. This means that the reported versions of components are as indicated in FIG. 115.

The vehicle starts with versions 1, 2', 3, 4 and 5. The (') character denotes an updated version of the previous version of software. E.g. 2' is the next version of component 2.

The vehicle belongs to segment A by virtue of the parameters that the vehicle communicates via OMA-DM to the server. A package is added to the segment and activated. The vehicle is notified and the rule defines 2 modules that will be delivered to the vehicle and installed.

This results in the vehicle being told to download two new version of software—1' and 3'. Note that 2' was not downloaded even though it was part of the update package because it was already installed.

In a second example a new version of the package is created which is intended to provide updates to the application set. See FIG. 21.

In this case an upgrade package of SUMs is added to a segment. Previously version 1 of the package was present on the segment and now some SUMs are upgraded. The result is that vehicles that belong to the segment are notified and will receive the updated SUMs.

In a third example the vehicle belongs to two segments by virtue of the parameter is reported to the server. New versions of each package are uploaded to the server and activated. The vehicle is given updates from both packages. See FIG. 22.

This results in a new set of software component versions in the vehicle. The components could be delivered and installed in the vehicle via multiple installers.

2 Methods for the Management of Packages for Software Updates Modules So that they can be Assigned to Segments Packages are collections of update files that are targeted to vehicles via segments. Package are targeted indirectly to vehicles through the product description. The packages are created using an administrator console function.

2.1.1 The Package View

The package view shows the table of packages. Packages contain collections of files. A package can be assigned to one or more segments.

When creating packages you can either set up a new package or a new version of a package. When creating new versions you have the option to clone the set of files in the previous version or start with an empty package.

When a new version package is added to a segment which has an older version, the old package is replaced with the new package version.

Figure 116:
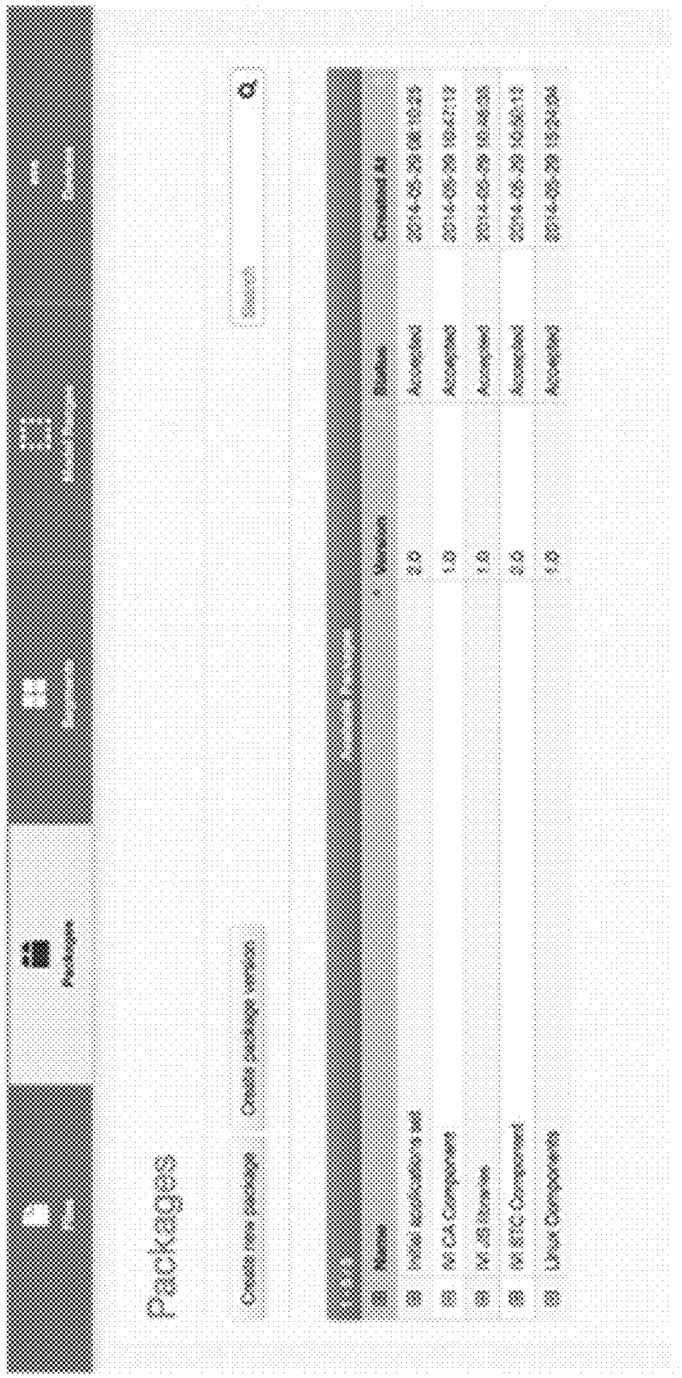

As shown in FIG. 116, there is the option to create a package.

2.1.2 Creating a Package

Figure 117:
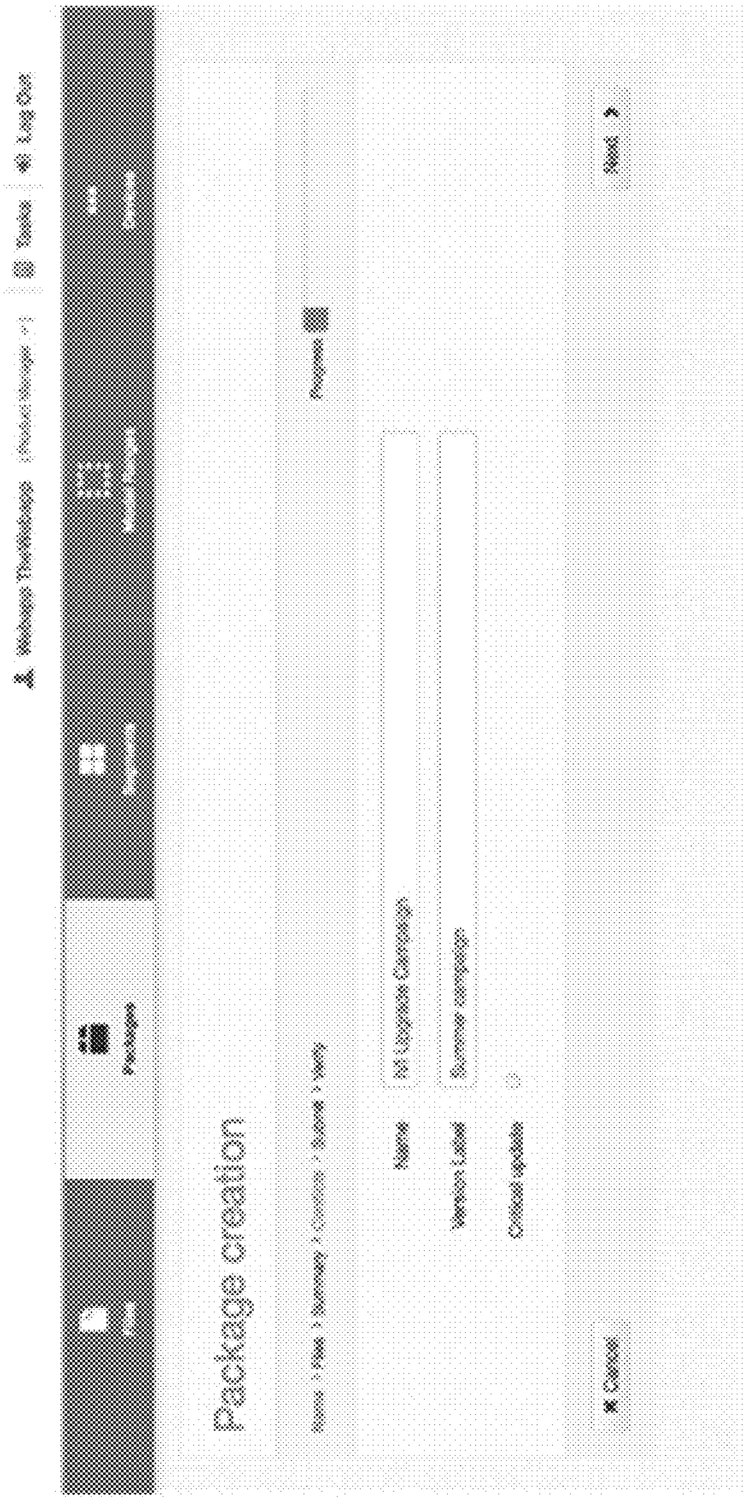

Creating a package starts with the package name and canonical version string. Any version label can be added. See FIG. 117.

Figure 118:
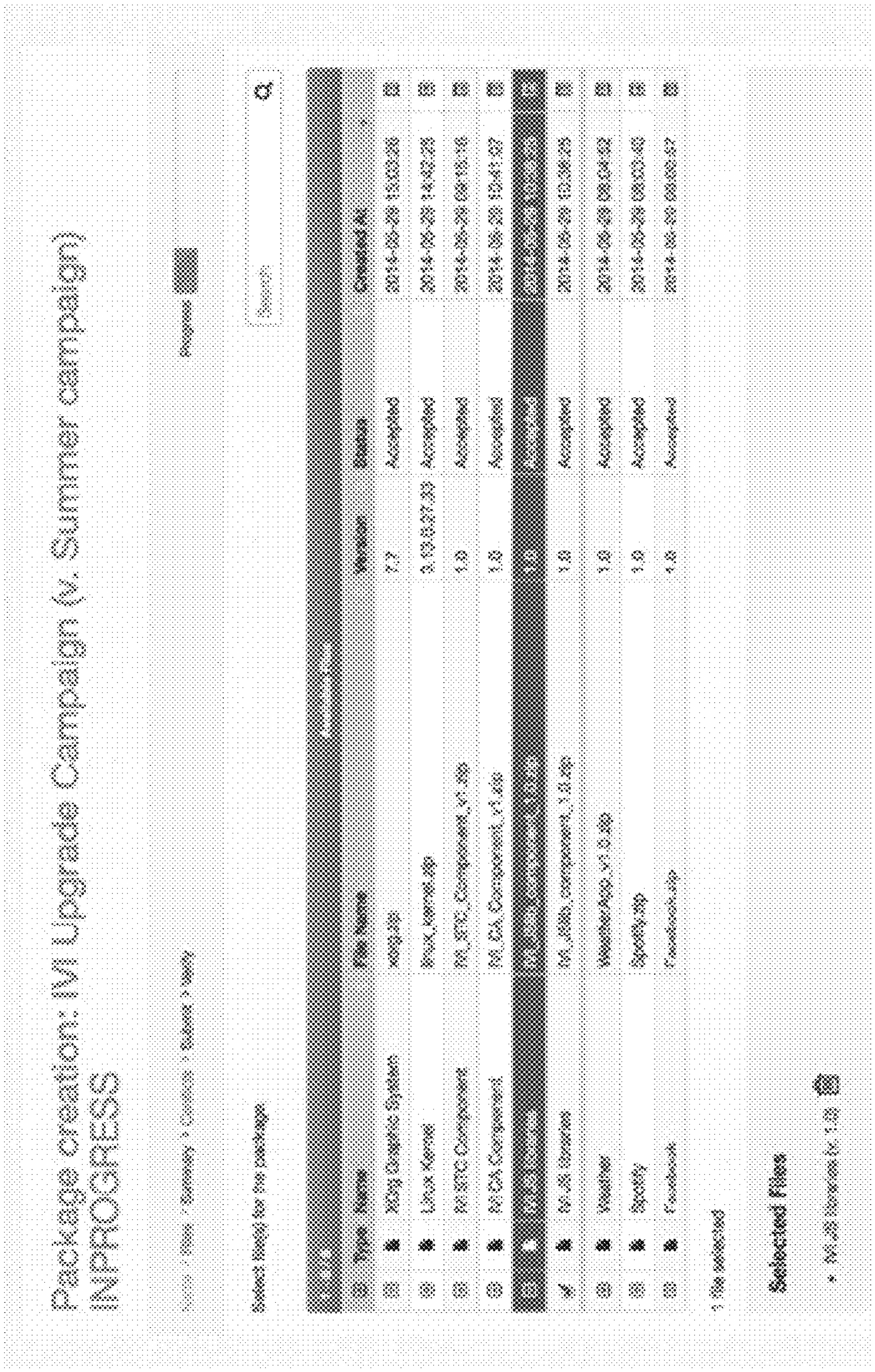

The next stage allows the user to add files to the package. See FIG. 118.

Figure 119:
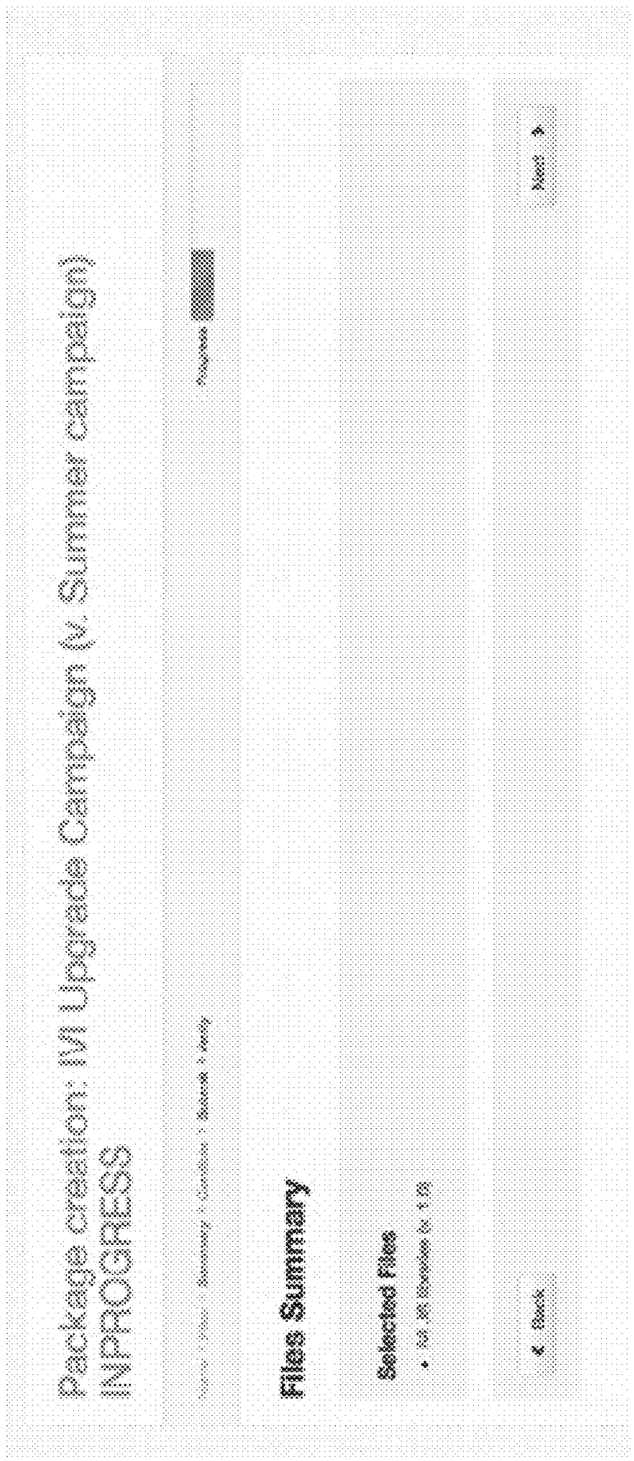

A summary of the selected files is shown in FIG. 119.

Figure 120:
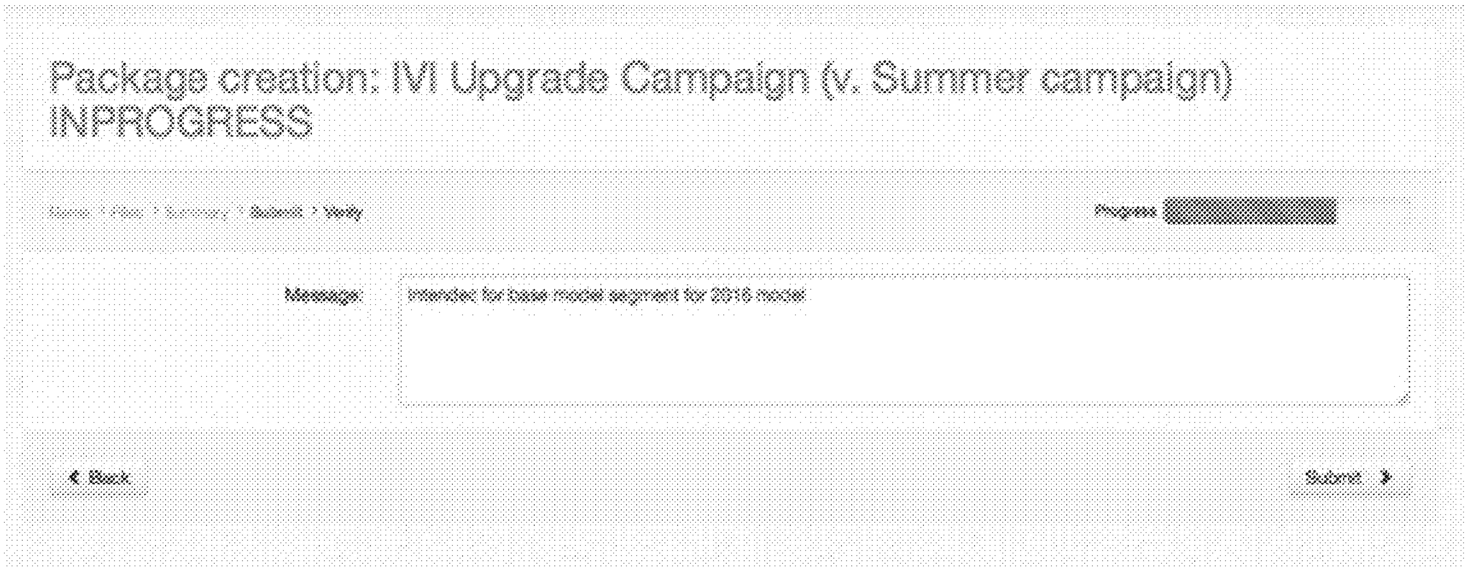

The user has the option to create a not to go with the package. This note could, for example, inform QA about the target vehicle models. See FIG. 120.

Figure 121:
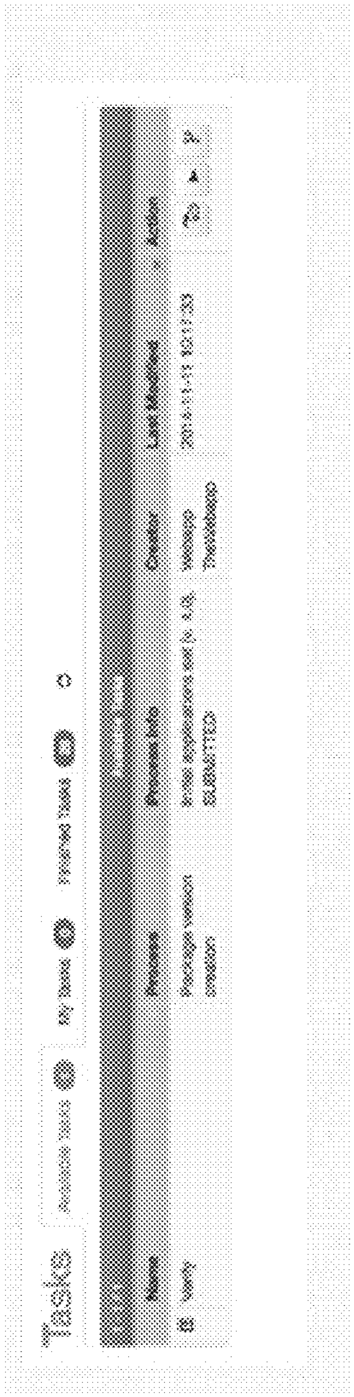

The package is then passed onto QA. See FIG. 121.

The QA role can then accept the package and perform tests on the entire package of files.

The workflow for QA is extendable. It allows QA to engage in additional steps in testing. For example QA could run smoke tests on the package or download it and test it using external checking tools or a vehicle.

Figure 122:

At the end of the process QA is able to accept or reject the package. If rejected a message is written to provide information on why the package was rejected. See FIG. 122.

The package is passed back to the submitter it and is not able to progress.

Note, this is a similar process to the case of file testing except the test are performed on a group of files that are managed together.

Figure 123:
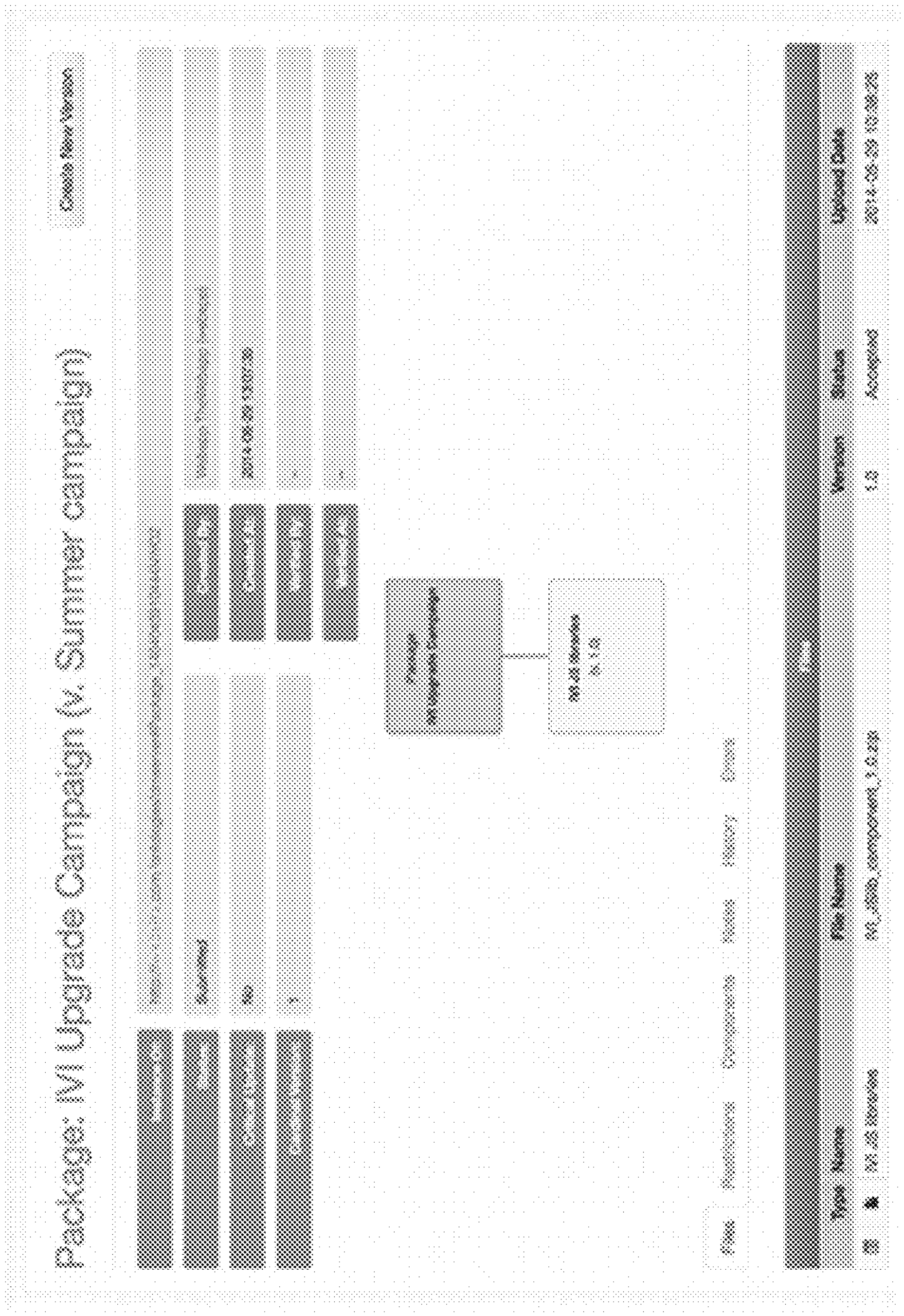

At the end of the package process the package may be presented. See FIG. 123.

3 Method for Dynamically Calculating which Files to Download During Synchronization In one implementation, rules for which files to download are attached to files directly. This means that the collection of files that are downloaded are done so at the point of synchronization with the vehicle.

The administration console has function for handling rules as part of file ingestion.

Figure 124:

3.1.1 Files Management—See FIG. 124.

3.1.2 AOTA SUM Handling

Figure 125:
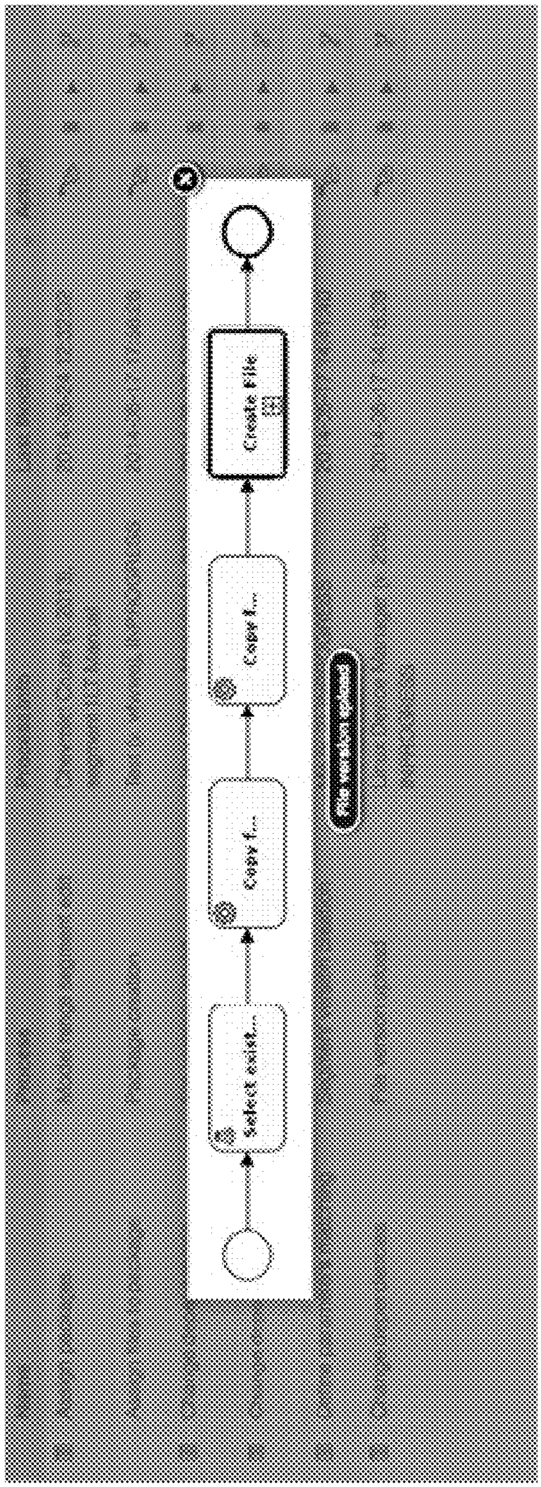

The file upload workflow for a new file version is shown in FIG. 125.

3.1.2.1 Uploading New Version Example

The following example flow is for uploading a new file version. In this case a previous version of the software update module has been uploaded and this new version is intended as a replacement under certain rules.

Figure 126:
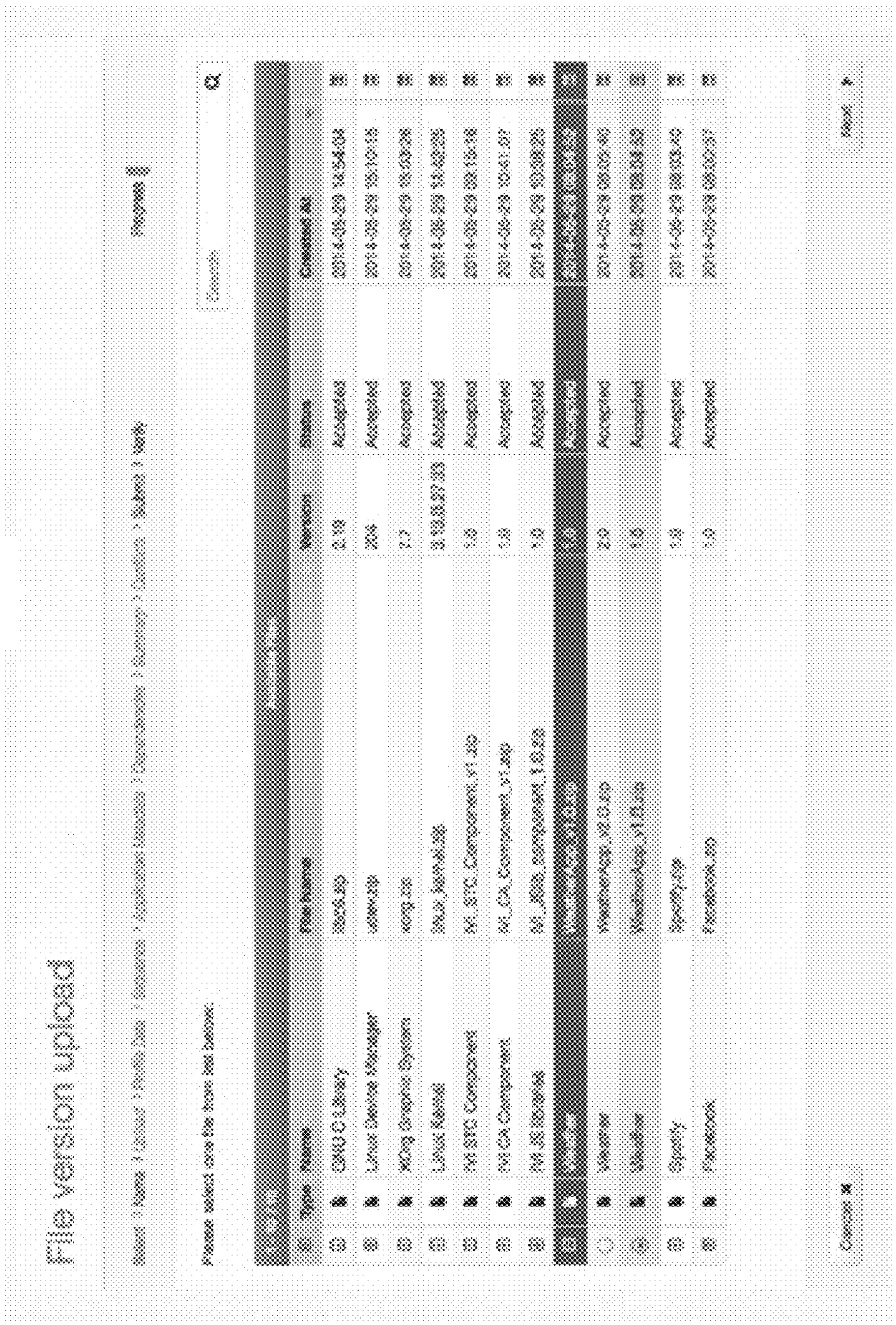

The first stage is to select the previous file version. See FIG. 126.

Figure 127:
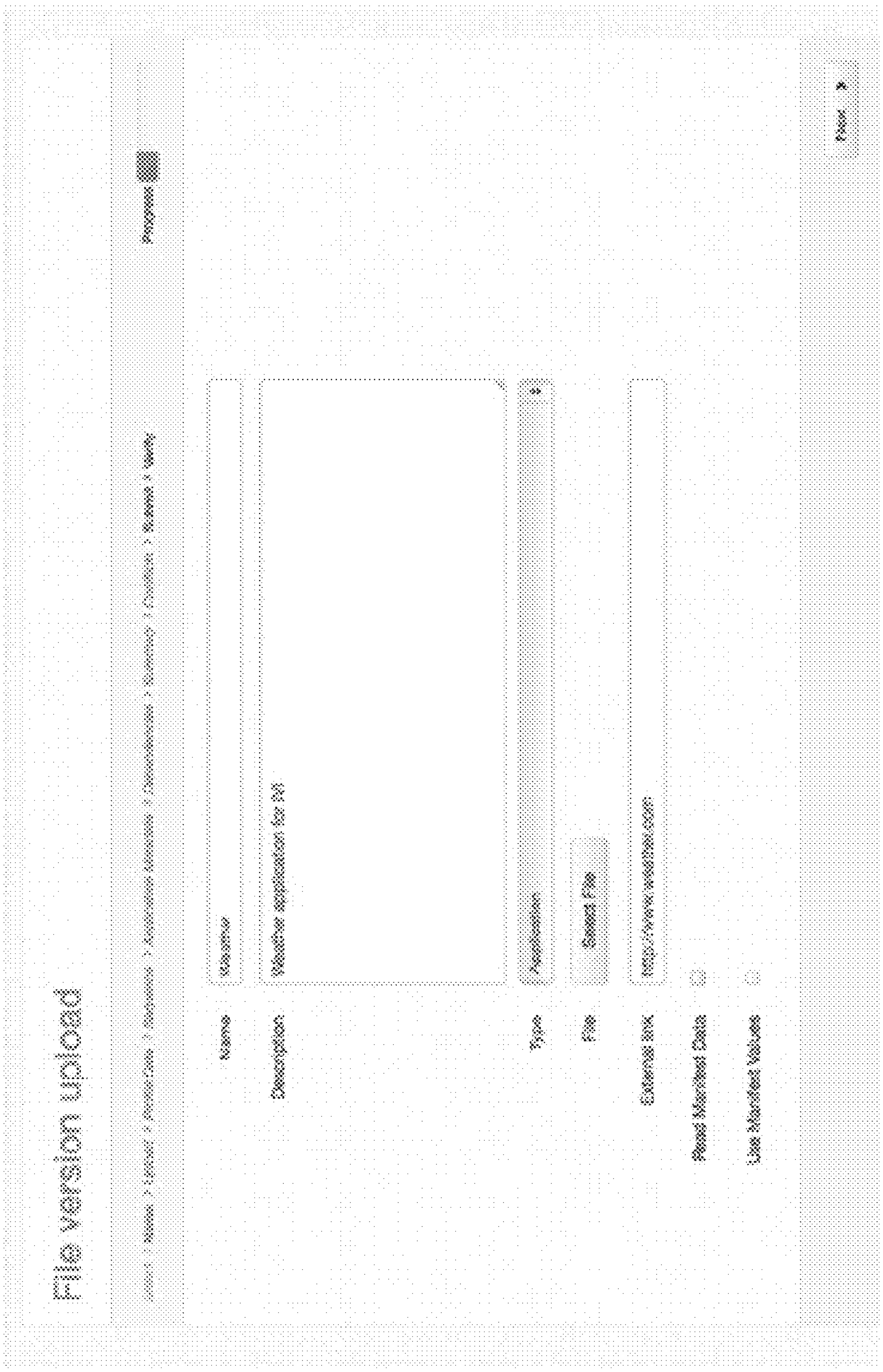

Details may be edited and a file may be selected for uploading. See FIG. 127.

Figure 128:
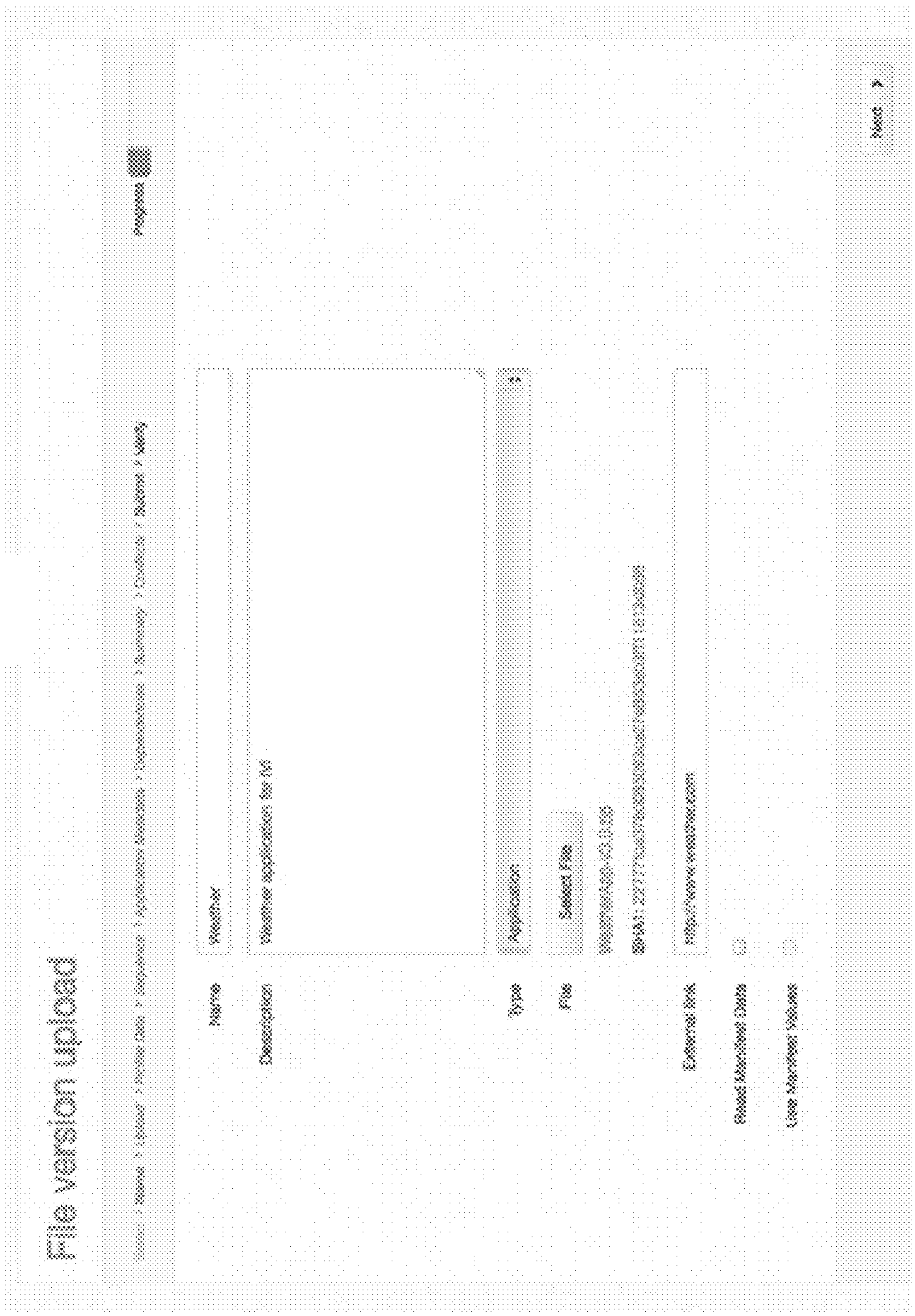

After file upload the generated hash key may be presented. See FIG. 128.

Figure 129:
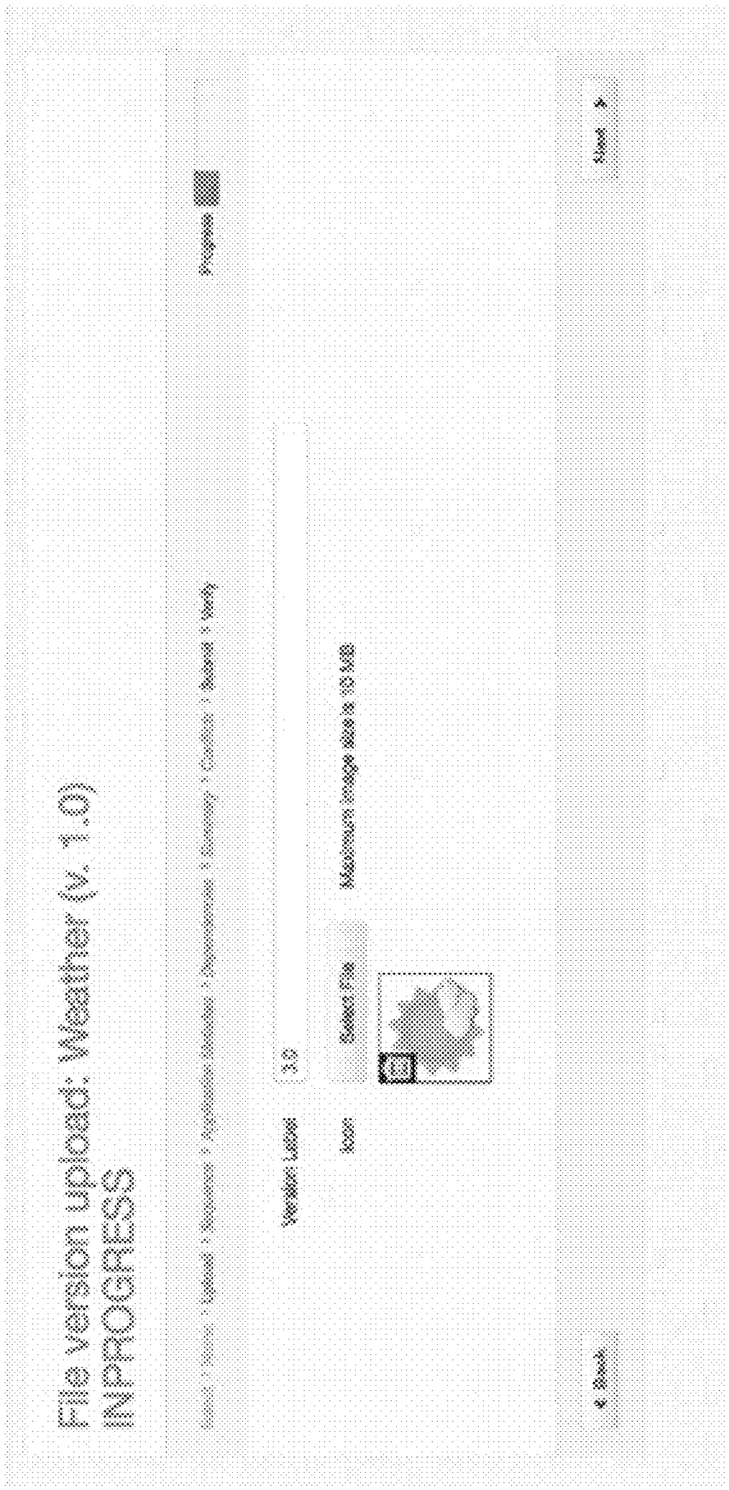

Additional metadata is added and a version number is created based on the previous version. See FIG. 129.

The version label is used to tag the version. Note that for rules the version label is not used to order the versions.

The version label that is added is referred to as the Canonical Version, a natural unique representation of a version, or a preferred notation for the version. It is a string that can be read from the file metadata or added manually.

Separately there is a Cardinal version number, which is the ordering number for the version. In the case of a new file version, the cardinal version places the file in a sequence after the old version that is selected and before its original successor.

Figure 130:
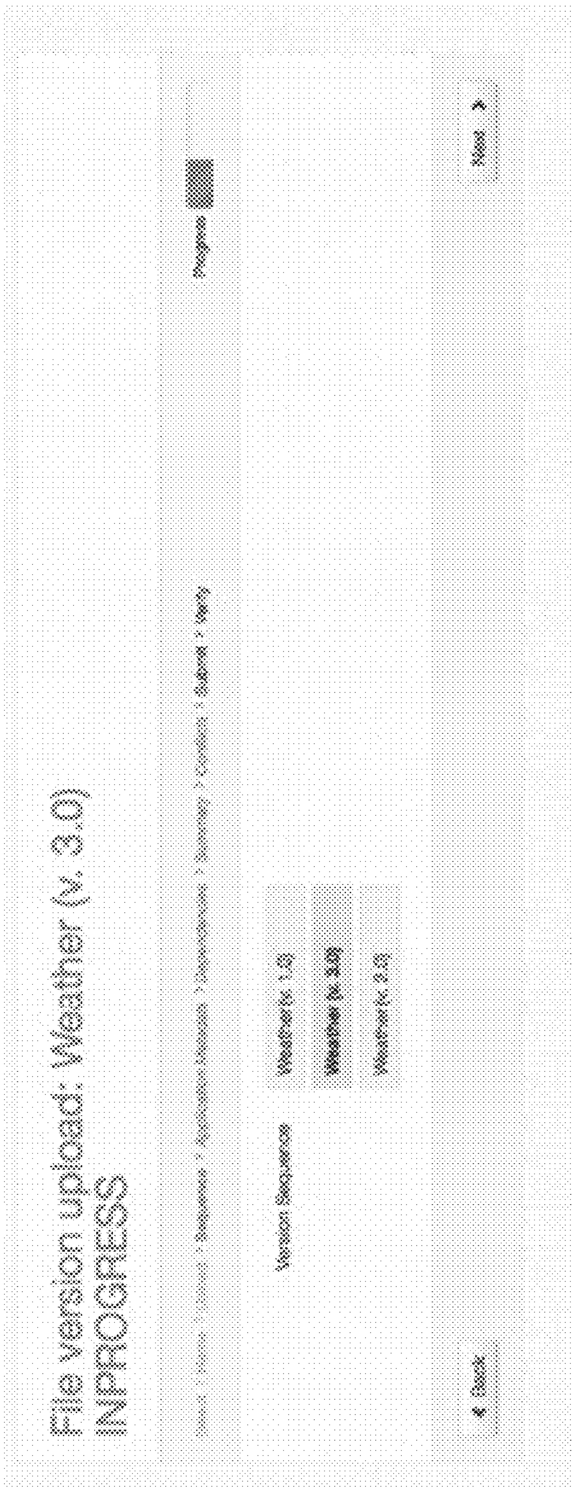

The order of the version is presented as shown in FIG. 130. Note in the example the issue discussed above is illustrated. The canonical version 3.0 was added after version 1.0. The ordering therefore places the new version cardinally between version 1.0 and version 2.0. In reality the cardinal and canonical versions are managed by the user so that the sequence and version numbers are properly aligned.

Figure 131:

Hash and file size metadata may be shown and/or reviewed. See FIG. 131.

Figure 132:

The next stage in the workflow is to manage the dependencies of the file. See FIG. 132.

Dependencies may be set on:

1. Other Files
2. Vehicle Attributes
3. Attributes of ECUs

Figure 133:

The dependencies on components may be managed by selecting the component. See FIG. 133.

Figure 134:
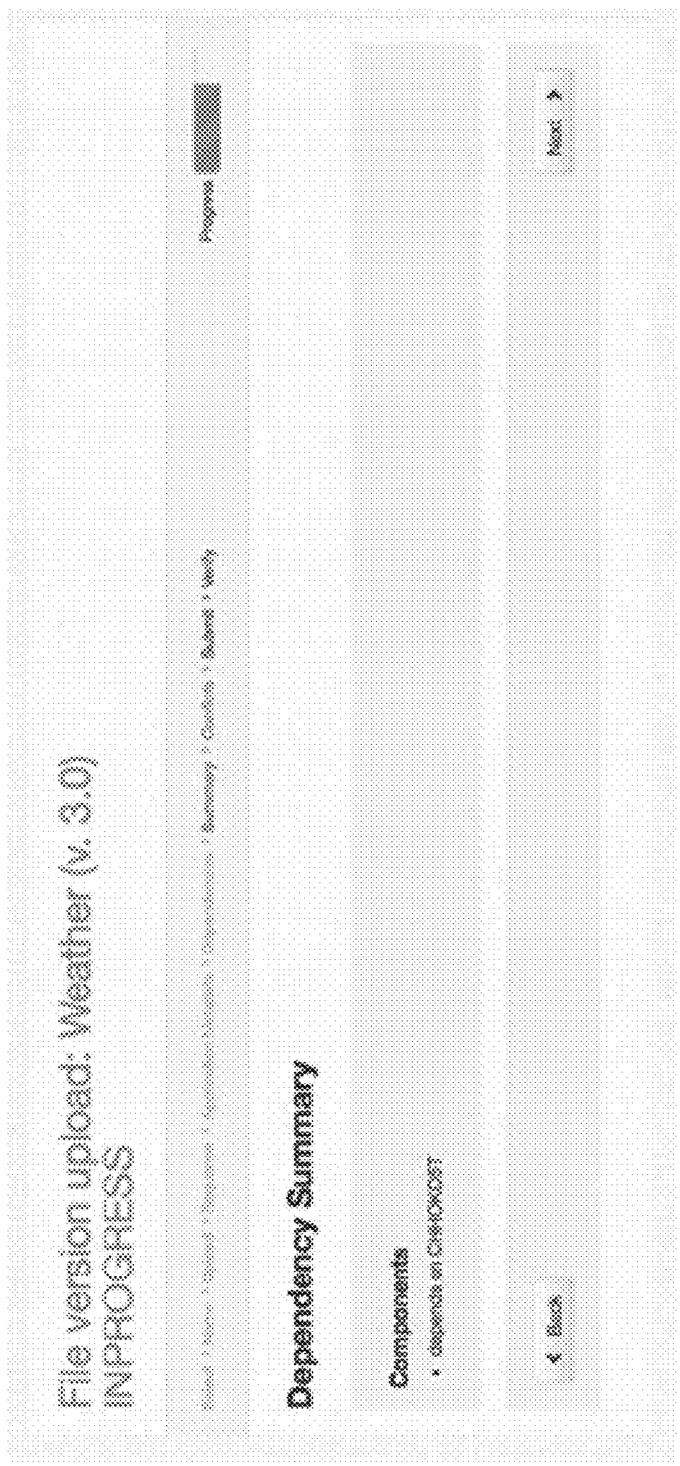

Summary of dependencies is shown in FIG. 134.

Figure 135:
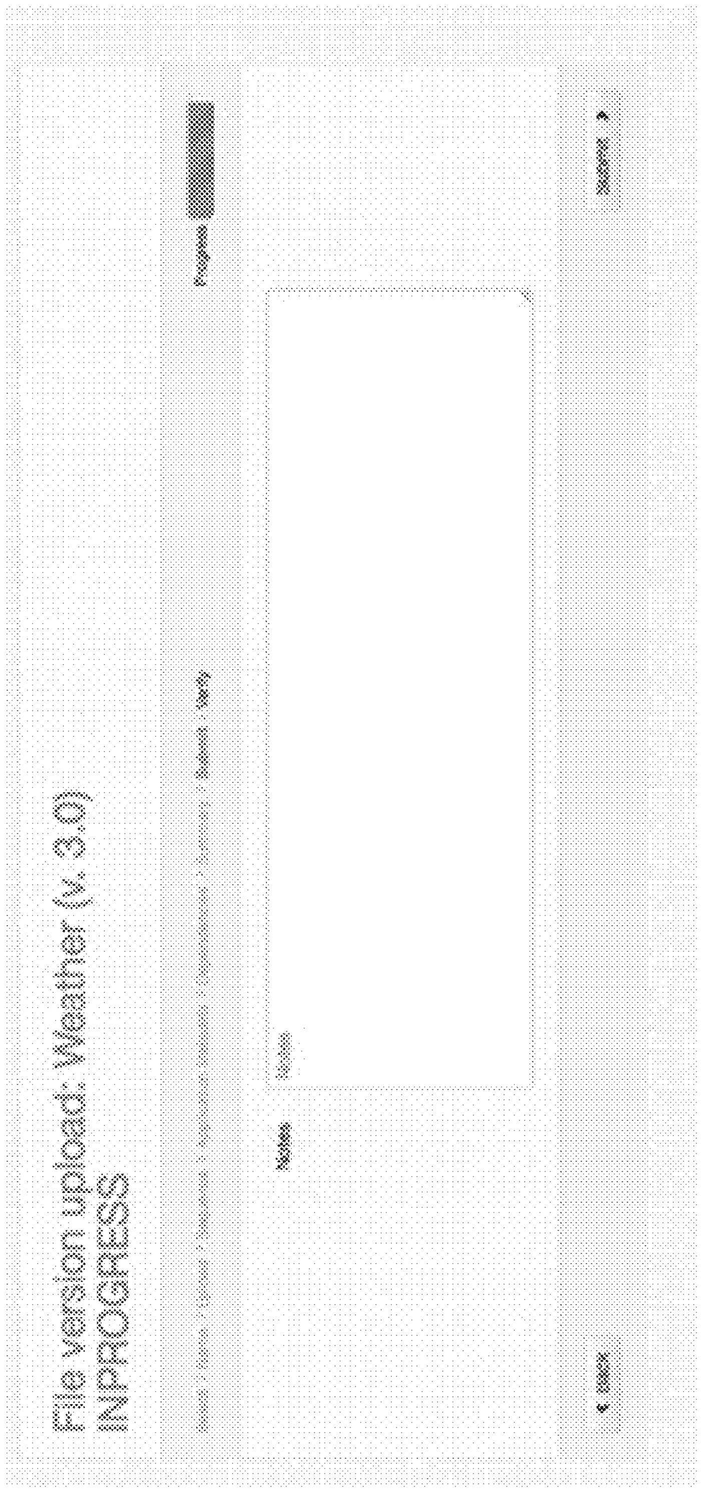

After selecting a dependency a box to write notes about the file may be presented. The notes can be used to collect and coordinate update files. See FIG. 135.

The summary page shows attributes of the uploaded file. See FIG. 17.

The file that was uploaded submitted is in a SUBMITTED state. The next stage is under the control of QA.

Figure 136:
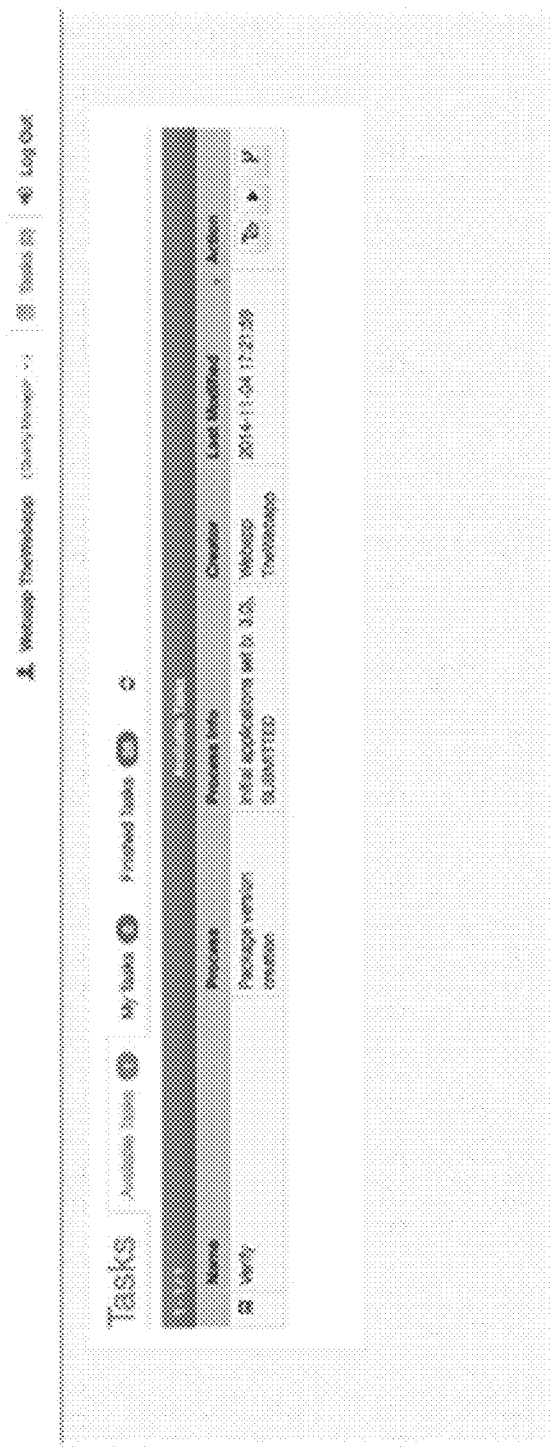

Logging in as a member of QA an additional task is added to the available tasks. The available tasks allows any member of QA to perform the tests. See FIG. 136.

If the task is accepted the files is made available. See FIG. 18.

This task allows QA to manage the uploaded file to provide initial application testing.

The workflow for QA is extendable. It allows QA to engage in additional steps in testing. For example QA could run smoke tests on the file or download it and test it using external checking tools.

Figure 137:
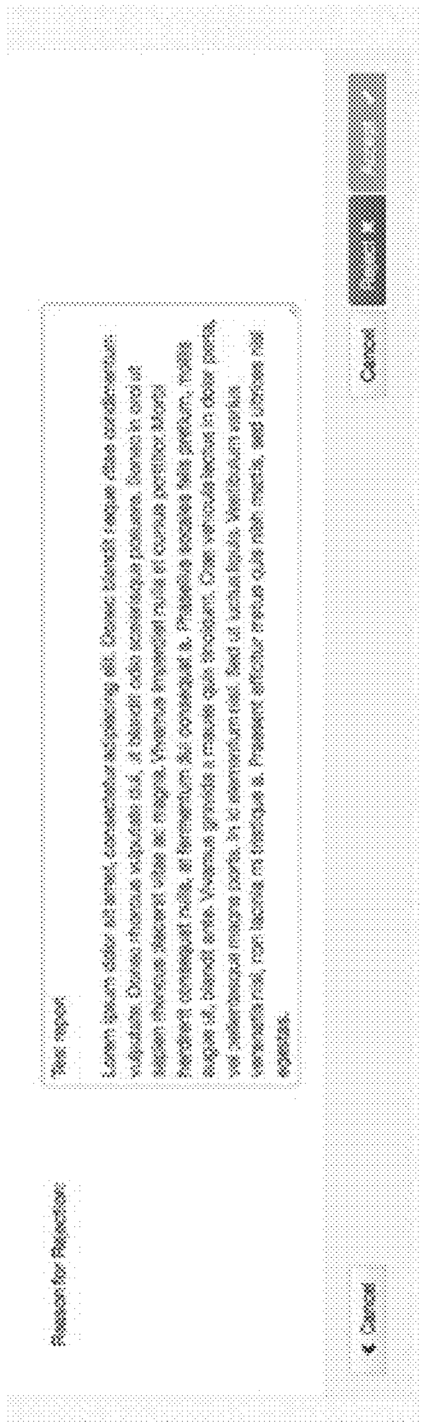

At the end of the process QA is able to accept or reject the file. If rejected a message may be written to provide information on why the file was rejected. See FIG. 137.

Note, in the case above there are two dependent files.

If rejected, the file is passed back to the submitter and is not able to progress.

If accepted, the file is passed back in the ACCEPTED state and can progress onto the package phase.

Similar workflows may handle the following additional cases:

FOTA SUM handling

SFOTA SUM Creation

RPM Multi-package handling

4 Methods for Determining "Should be" Status, Based on what will Happen to a Vehicle After the Next Synchronization, Using Last Reported Data Method for dynamically calculating which files to download during synchronization In some implementations, the REDUP may include the capability to pre-search vehicles based on the attributes that will be used in the download rules plus the ability after package assignment to identify for each vehicle while files will be downloaded.

4.1.1 Searching Devices—See FIGS. 23-25

5 Representation of an Vehicle State Via OMA-DM Tree in a Graph Format

In some implementations, the OMA-DM tree can model the current state of ECUs.

OMA-DM and the Attribute model is shown in FIG. 12.

OMA-DM is used to synchronize information between the server and vehicles. OMA-DM supports two main functions. The first is to share data. The vehicle passes attributes back to the server to formally report the device state. This means that the installers should be capable of reporting ECU attributes back to the server via the OMA-DM business logic installer API.

Segments manage specific ECUs. This means that a SUM can make use of the report attributes to resolve dependencies on the target ECU and any dependent ECUs.

FIG. 20 shows the overall model for relationship management.

Component software versions are managed via SW lifecycle management process on the backend. This is usually done in third party organizations. Software update modules (SUM) are created that change the version of a component from one to another. These SUMs can be created on the third party site and possibly signed or, in some cases, they can be created on REDUP via a workflow. For example a workflow exists for creating a BSDIFF delta SFOTA SUM.

SUMS when uploaded to the server or created may have dependencies. Dependencies link the SUM to the ECU components or to other SUMs or to any parameter on the OMA-DM tree including VIN.

SUMs are organized in packages. Packages provide a convenient bag for SUMs managed and published at the same time.

Packages are published onto segments. The segment manages the ECUs for the SUMS in a package. Packages are linked to update campaigns. This means that the campaign for a software update is passed to the vehicle and subsequently reported back to the cloud.

Publishing a package sends out notifications for vehicles that are members of the segment. Vehicles when contacted will request installers to update the attributes in the tree and then request the server to download any SUMs. SUMs are routed to the correct installers and executed.

An installation report is delivered back to the cloud indicating success of failure of the update session. It also enables the cloud to measure the effectiveness of the campaign in general.

Methods for decomposition of products into collections of segments where segments are groups whose members match specific parameters communicated by devices or by externally defined and linked data External data is linked to remote managed devices via any device parameter such as device ID/vehicle identification number (VIN) or similar. For example one could link a VIN to the registration district and only update remote managed devices that come from the specific district.

Software components and their embedded systems are assigned to segments so that packages of software updates can be channeled to remote managed devices that are comprised of such components.

In some implementations, the REDUP may include the ability to add vehicle attributes into the OMA-DM tree that can be used in file rules.

6.1 ECU Model

ECUs are vehicle parts comprising hardware and software components. The REDUP VRM manages software component versions. Software components can be embedded system, binary applications, middleware and user applications or content. Updating software components involves changing the component software from one version to another in a planned manner and as part of campaigns.

REDUP models ECUs, components and attributes as shown in FIG. 11.

An ECU, also referred to as an Embedded System, is modeled as a part consisting of multiple SW and HW components. A set of attributes of the part is also modeled. The attributes are values formally reported by an ECU. In the case of CAN bus modules the values might be reported via Data Identifiers (DID). Alternatively, if the system is a Tizen IVI the updatable components data items are can be managed via the RPM database or via an HTML5 execution environment.

The attributes are collected in the OMA-DM tree and communicated to the server during sync. The attributes can then be used to define dependencies between each SUMs and the state of the vehicle.

Figure 138:
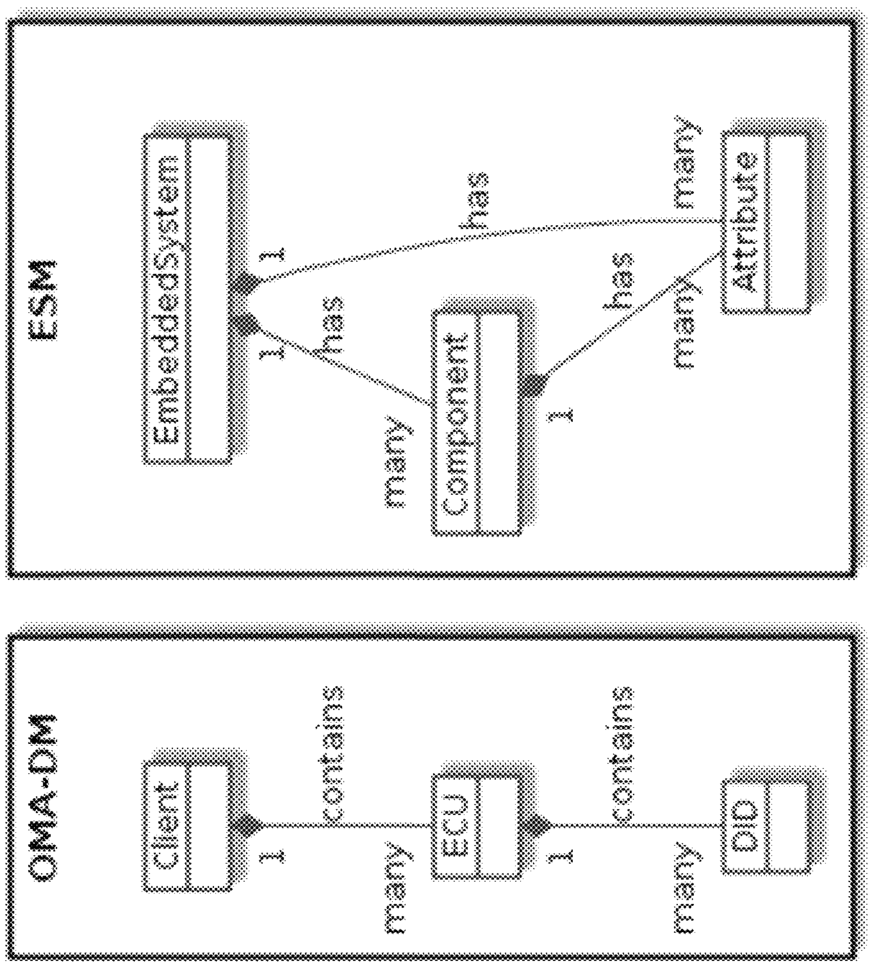

Each vehicle reports the state of its components as a collection of DIDs grouped by ECUs, while on the server side we want to model state of clients using graph structure similar to one described by the ESM ontology. This approach creates a data model mismatch and a need for a solution which will provide bidirectional mapping between two different domains See FIG. 138.

DID-Component mapping addresses the following problems and/or specifications:

- devices use raw codes (memory addresses) to name ECUs and DIDs, while the ESM ontology uses meaningful names for all classes and attributes
- mapping between DID and embedded system/component attribute may be changed by updating new version of mapping rules
- new version of mappings should not break previously uploaded device data or SUM definitions
- uploading a new version of mapping rules should not require processing or updating of already uploaded device data
- provide support for unknown attributes:
  - allow creation of rules based on unknown attributes
  - rules created with an unknown attribute (DID based) should be represented as an attribute after providing required mapping
  - properly handle unknown DIDs and ECUs in components reports
- the same DID may have different meaning (represent a different attribute) if defined in contexts of different ECUs
- ESM ontology allows embedded systems to have flexible structure, components may be optional, not required or not reported by the device
- device may report only subset of available ECUs and DIDs
- some attributes may not be reported by the device but it should be possible to create rules and restrictions for such attributes.

Solution Overview:

Solution for the described problem was created as an implementation of the below rule:

{DIDs}+{DID_mapping}+{component_definitions}={device_components}

Where:

- {DIDs}—list of ECUs with associated DIDs, that was reported by the device (or provided to the server in any other way)
- {DID_mapping}—collection of mappings between DIDs and embedded system/Component attributes
- {component_definitions}—pre-loaded individuals representing embedded systems/components structure and default values for attributes
- device_components—components with their attributes calculated for a particular device Mappings Mappings are provided as a list of triplets where each triplet has structure as shown in the below examples:

{ES_ID} {MAPS_DID_TO} {attribute} or

{COMPONENT_ID} {MAPS_DID_TO} {attribute}

Where:

- {ES_ID}—id of an embedded system definition
- {COMPONENT_ID}—id of a component definition
- {MAPS_DID_TO}—predicate representing connection between embedded system and its attribute in the OMA-DM domain
- {attribute}—id of a predicate that represents target attribute Mappings are also used to indicate that ECU contains (reports) particular component. Mapping for such relation can be expressed by providing the below triplet:

{ES_ID} {MAPS_DID_TO} {COMPONENT_ID}

Where:

- {ES_ID}—id of an embedded system definition
- {MAPS_DID_TO}—predicate representing connection between embedded system and its component in the OMA-DM domain
- {COMPONENT_ID}—id of a component definition Knowing that attributes of embedded systems (or components) are strictly related to (ECU_ID, DID_ID) pair allows creating a bidirectional mapping between client and server domain models. With such mapping, it is possible to implement rules and restrictions that are created in the server domain (components & attributes) but being stored as a client model (ECUs and DIDs). This approach works properly with mappings that are versioned and updated. It also allows creation of rules for which mapping is not defined yet. The server applies mappings while reading data so each time device details are accessed it uses the most recent version of the mapping to convert DIDs into components and attributes. In case of missing mappings, server represents reported data as a set of unknown attributes.

Assumptions

The following may be assumed:

- esmId is unique and can be used to identify the ECU/Embedded System
- mapping rules are validated before uploading to the server
- mapping rules do not contain internal conflicts, duplicates etc
- one DID can be mapped to an attribute within a single embedded system Specifications DID-Component mapping facilitates implementation of the following specifications:

- 1894.9.1 It should be possible to create dependencies on any ECU attribute based on their type
- 1894.9.2: It should be possible to create a dependency on an ECU attribute not currently reported or managed
- 1894.13.1: ECUs reported by the LENC appear on the device view
- 1894.13.2: ECUs attributes modified by a 3rd party system
- 1894.13.3: ECU attributes reported by using DIDs/PIDs/LIDs can map to attribute names
- 1894.13.4: ECU attributes reported by DIDs/PIDs/LIDs can indicate the presence of components
- 1894.13.5: DIDs/PIDs/LIDs reported can indicate ECUs
- 1894.13.6: DIDs/PIDs/LIDs can report the same component/ECU but with different versions 1894.13.5: DIDs/PIDs/LIDs reported can indicate ECUs
1. Device D1 reports DID1
2. Server maps DID1 to the ECU1
3. SUMs can evaluate the dependency ECU1

In some implementations it may be assumed that DIDs reported by a device are already in context of ECU (grouped by ECU).

DID-component mapping allows to map DIDs to any combination of components within context of a ECU.

1894.13.6: DIDs/PIDs/LIDs can report the same component/ECU but with different versions
Device D1 reports ECU1 with DID1
1. Server maps DID1 to the component Comp1
2. SUMs can evaluate the dependency ECU1 (hasComponents Comp1)
3. ECU1 changes, which results in the DID1 being replaced with DID2, but the component is the same The server allows to create SUMs restrictions (dependencies) on components and their attributes (server data model), and definitions of those restrictions are saved using did paths ({ECU}.{DID}), using the client data model. Thus, it is possible to provide support for restrictions based on unknown attributes and seamless updates of mapping rules.

It's possible to map multiple DIDs into the same component or attribute:

vrm:ABSHardwareComponent vrm:mapsF188to esm:productionYear.

vrm:ABSHardwareComponent vrm:mapsF181to esm:productionYear

However such mapping configuration may result with random values assigned to attributes if a device reports both DIDs.

Sources of Data

Device Component Reports

System accepts device component reports from various sources such as:

OMA-DM tree

LENC reports

3rd party repositories data pushed by REST API etc

Each report upload refreshes last known state of the device. Device component reports from different sources are treated evenly, however data from some sources may be used to overwrite data from others etc.

Scenarios of DID-Component Mapping

Example Ontology and Individuals

Individuals

Scenarios are based on the below set of individuals:

vrm:ABS a esm:EmbeddedSystem;
esm:name "Anti-lock Braking System";
esm:esmId "746";
esm:manufacturer "Hirondel";
esm:hasComponents vrm:ABSHardwareComponent, vrm:ABSSoftwareComponent.

vrm:ABSSoftwareComponent a esm:SWComponent;
esm:appliesTo esm:ABSHardwareComponent;
esm:name "H345S".

vrm:ABSHardwareComponent a esm:HWComponent;
esm:executes vrm:ABSSoftwareComponent;
esm:name "H806H";
esm:manufacturer "Hirondel";
esm:partNumber "2WEW334D";
esm:description "ABS HW Component";
esm:productionYear 2012.

vrm:GPS a esm:EmbeddedSystem;
esm:name "Hirondel GPS unit";
esm:esmId "798";
esm:manufacturer "Hirondel";
esm:hasComponents vrm:GPSHardwareComponent, vrm:GPSSoftwareComponent.

vrm:GPSSoftwareComponent a esm:SWComponent;
esm:appliesTo esm:GPSHardwareComponent;
esm:name "H104TR".

vrm:GPSHardwareComponent a esm:HWComponent;
esm:executes vrm:GPSSoftwareComponent;
esm:name "G8987";
esm:manufacturer "Hirondel";
esm:partNumber "DF26HS2G";
esm:description "GPS HW Component";
esm:productionYear 2013.

Figure 139:
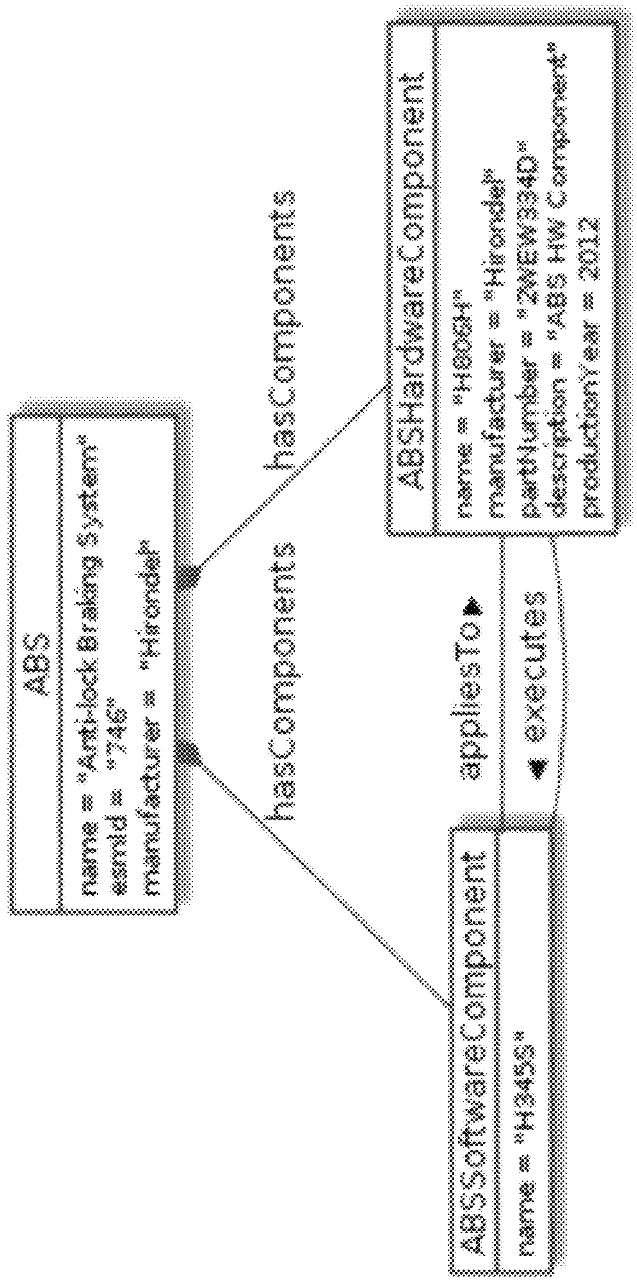
Figure 140:
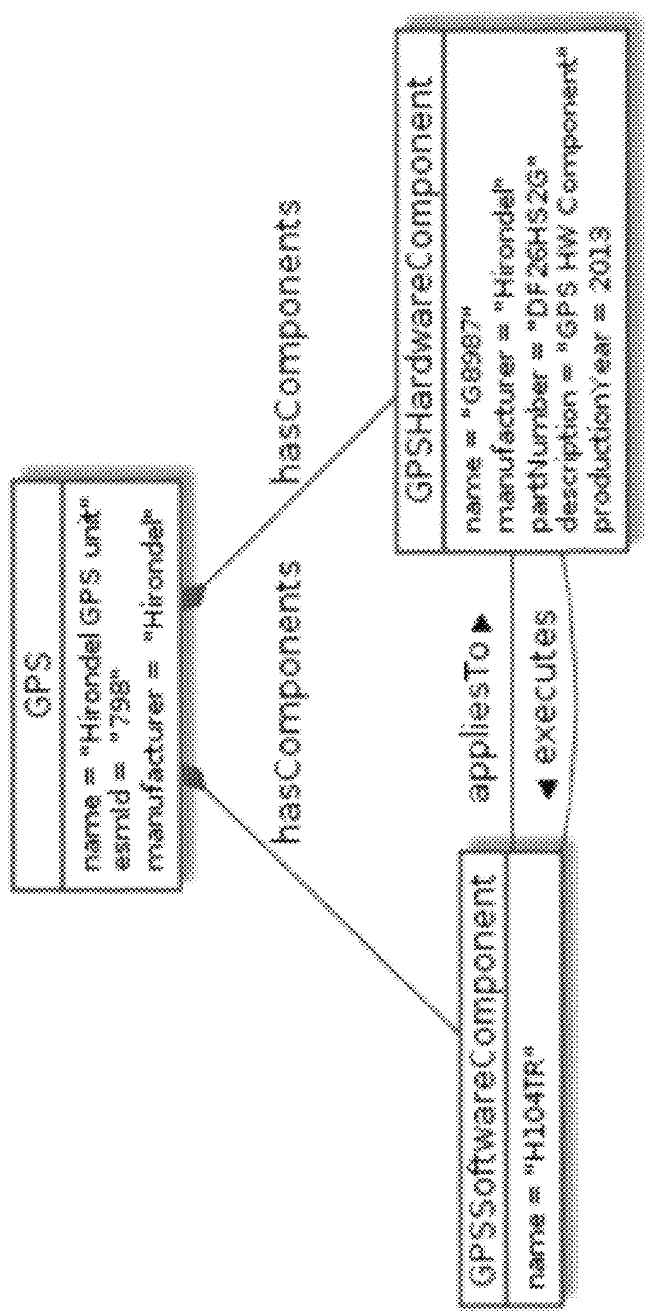

Graphical representation of the above triplets is shown in FIGS. 139 and 140.

Attributes

List of Example Attributes Used:

esm:productionYear rdf:type esm:Attribute;
rdfs:range xsd:integer;
esm:attributeName "productionYear";
rdfs:comment "Production Year".

esm:description rdf:type esm:Attribute;
rdfs:range xsd:string;
esm:attributeName "description";
rdfs:comment "Description".

esm:manufacturer rdf:type esm:Attribute;
rdfs:range xsd:string;
esm:attributeName "manufacturer";
rdfs:comment "Manufacturer".

esm:name rdf:type esm:Attribute;
rdfs:range xsd:string;
esm:attributeName "name";
rdfs:comment "Name".

esm:partNumber rdf:type esm:Attribute;
rdfs:range xsd:string;
esm:attributeName "partNumber";
rdfs:comment "Part number".

Definitions of Mapping Rules:

vrm:mapsF181to a esm:DidMapping;
esm:didCode "F181".

vrm:mapsF182to a esm:DidMapping;
esm:didCode "F182".

vrm:mapsF183to a esm:DidMapping;
esm:didCode "F183".

vrm:mapsF184to a esm:DidMapping;
esm:didCode "F184".

vrm:mapsF185to a esm:DidMapping;
esm:didCode "F185".

vrm:mapsF186to a esm:DidMapping;
esm:didCode "F186".

vrm:mapsF187to a esm:DidMapping;
esm:didCode "F187".

Mappings

Examples Assume that Server Uses the Below Set of Mapping Rules:

vrm:ABS vrm:mapsF111to vrm:ABSHardwareComponent.

vrm:ABS vrm:mapsF180to vrm:ABSSoftwareComponent.

vrm:ABS vrm:mapsF186to esm:manufacturer.

vrm:ABS vrm:mapsF110to esm:name.

vrm:ABSHardwareComponent vrm:mapsF181to esm:productionYear.

vrm:ABSHardwareComponent vrm:mapsF183to esm:description.

vrm:ABSHardwareComponent vrm:mapsF184to esm:manufacturer.

vrm:ABSHardwareComponent vrm:mapsF185to esm:name.

vrm:ABSHardwareComponent vrm:mapsF187to esm:partNumber.

vrm:ABSSoftwareComponent vrm:mapsF112to esm:name.

Mapping rules used by the server can be changed or updated if that would be required by the scenario.

The above set of mapping rules uses DIDs: F111 and F180 to find if a device reports components like vrm:ABSHardwareComponent or vrm:ABSSoftwareComponent. It means that value associated with those DIDs is ignored. It's possible to use a single DID to provide both:

component existence attribute value but that means adding a pair of rules like:

vrm:ABS vrm:mapsF111to vrm:ABSHardwareComponent vrm:ABSHardwareComponent vrm:mapsF111to esm:revision Scenarios Device Reported Complete Set of Components and Attributes:

The device sends complete set of components and attributes, so the values in the mapping result originate from the device, however some of values provided by the device are not used. Values for paths like: /Vendor/Website/Components/Nodes/746/DID/F111/Value or /Vendor/Website/Components/Nodes/746/DID/F180/Value are ignored because of mapping rules configuration.

Data reported by the device is shown in FIG. 141.

Figure 142:
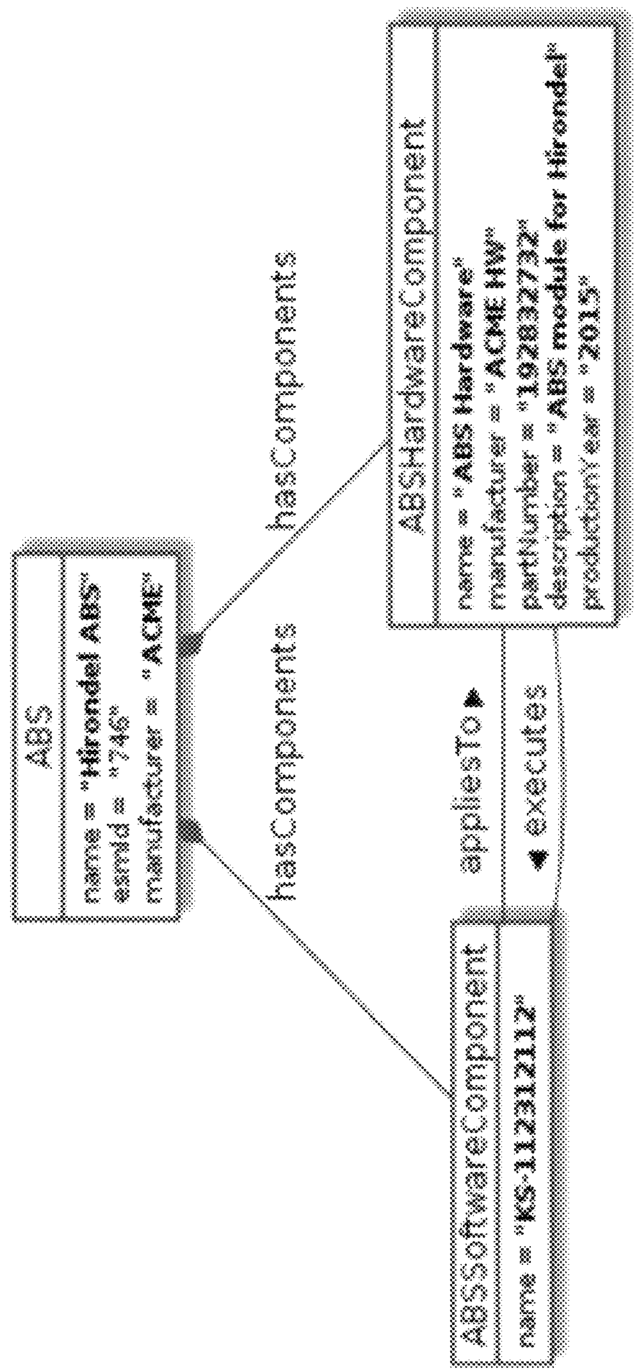

Result after applying component mappings is shown in FIG. 142.

Device Reported Only Part of Components and Attributes:

The device sends only part of data describing its state, so the mapping result contains data that originates from the ontology along with data uploaded within the components report.

Data reported by the device is shown in FIG. 143.

Figure 144:
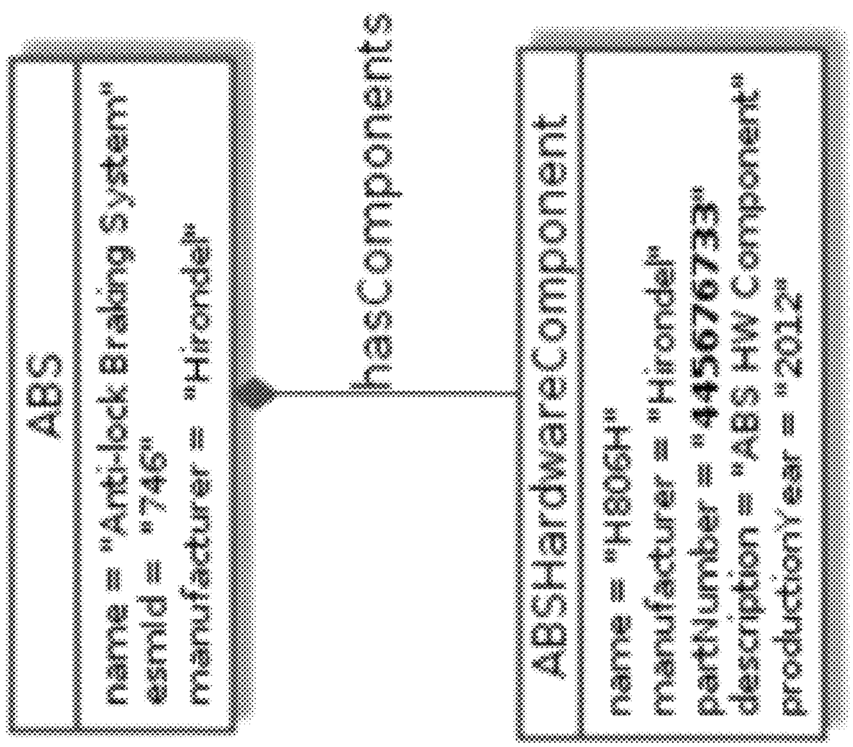

Result after applying component mappings is shown in FIG. 144.

The mapping result contains one component because the DID that represents the other component was not reported by the device. Attributes of the reported component have been merged with values found in the component definition.

Device Reported Unknown Components and Attributes:

This scenario illustrates server behavior when client reports ECUs and DIDs that are not described by any available mapping. In such case server should accept data that was uploaded by the client and treat it as a collection of unknown attributes. After updating new version of mapping rules those unknown attributes should be correctly represented as EmbeddedSystems with components and attributes.

Data reported by the device is shown in FIG. 145.

Device Reports Two ECUs:

746—described by mappings used currently by the server

798—not described by the current version of mappings

Figure 146:
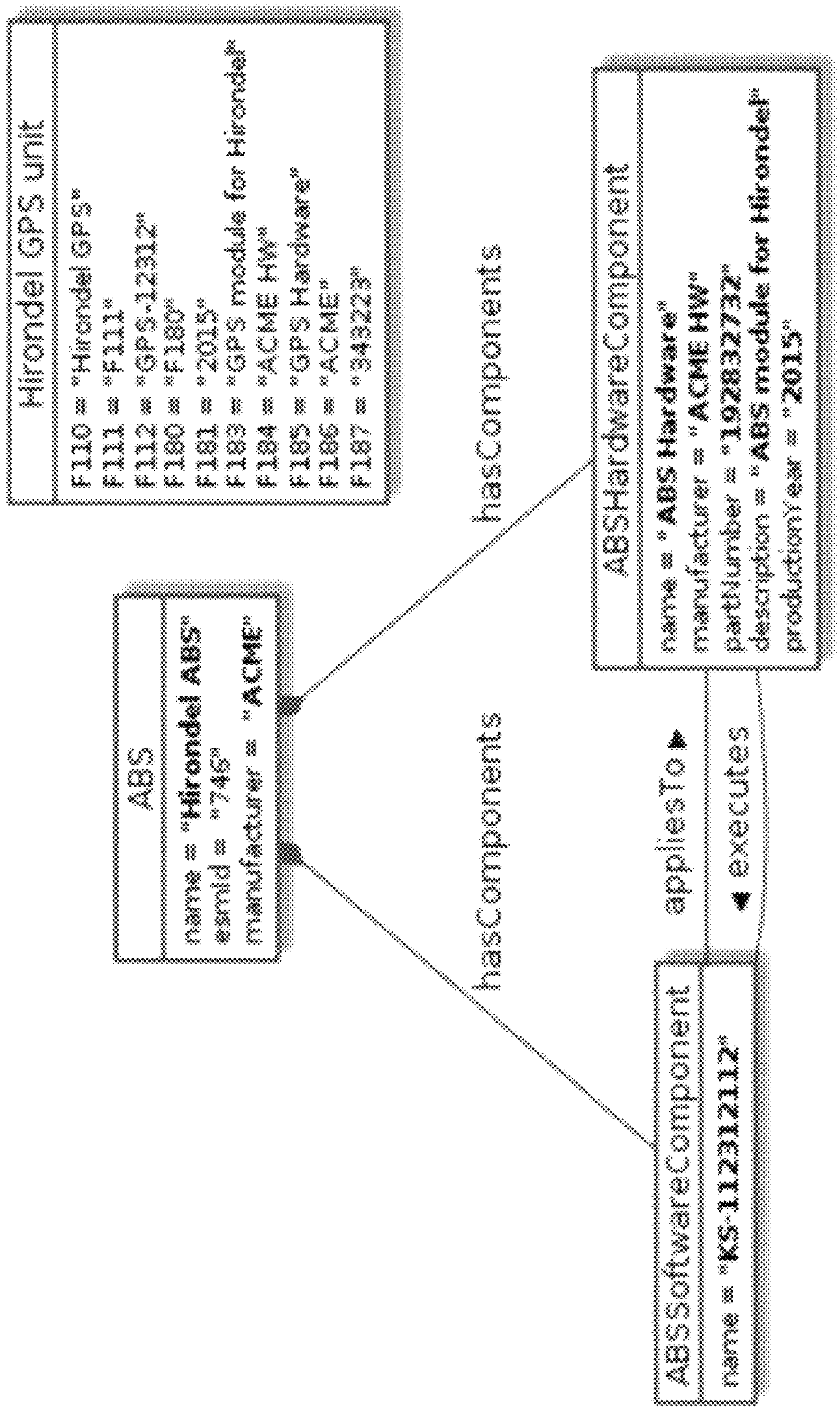

Result after applying component mappings is shown in FIG. 146.

Applying current version of mappings results in one ECU being properly mapped to an EmbeddedSystem and the other represented as a group of unknown (unmapped) attributes.

Additional Mappings are Added to the Server

Mapping rules can be updated or extend during runtime. In this scenario new set of mappings is added to the existing set.

vrm:GPS vrm:mapsF111to vrm:GPSHardwareComponent.

vrm:GPS vrm:mapsF180to vrm:GPSSoftwareComponent.

vrm:GPS vrm:mapsF186to esm:manufacturer.

vrm:GPS vrm:mapsF110to esm:name.

vrm:GPSHardwareComponent vrm:mapsF181to esm:productionYear.

vrm:GPSHardwareComponent vrm:mapsF183to esm:description.

vrm:GPSHardwareComponent vrm:mapsF184to esm:manufacturer.

vrm:GPSHardwareComponent vrm:mapsF185to esm:name.

vrm:GPSHardwareComponent vrm:mapsF187to esm:partNumber.

vrm:GPSSoftwareComponent vrm:mapsF112to esm:name.

Unknown DIDS are Now Components and Attributes

Figure 147:
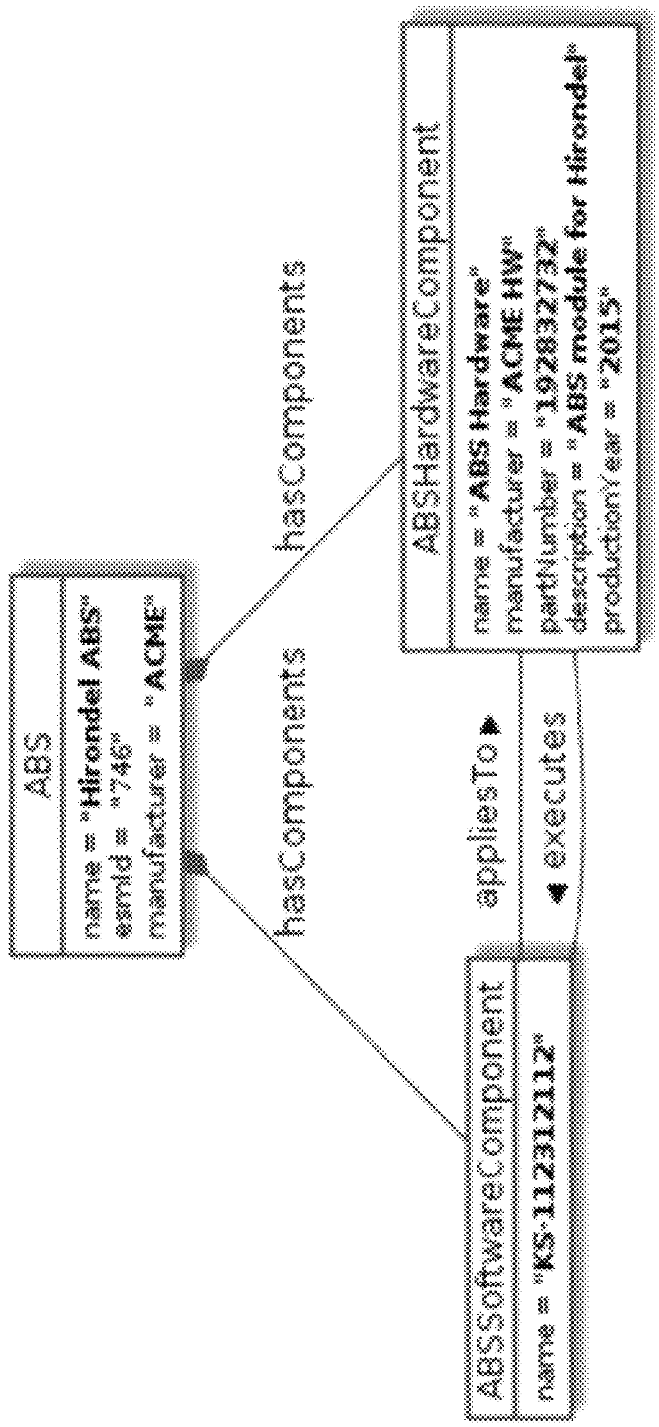
Figure 148:
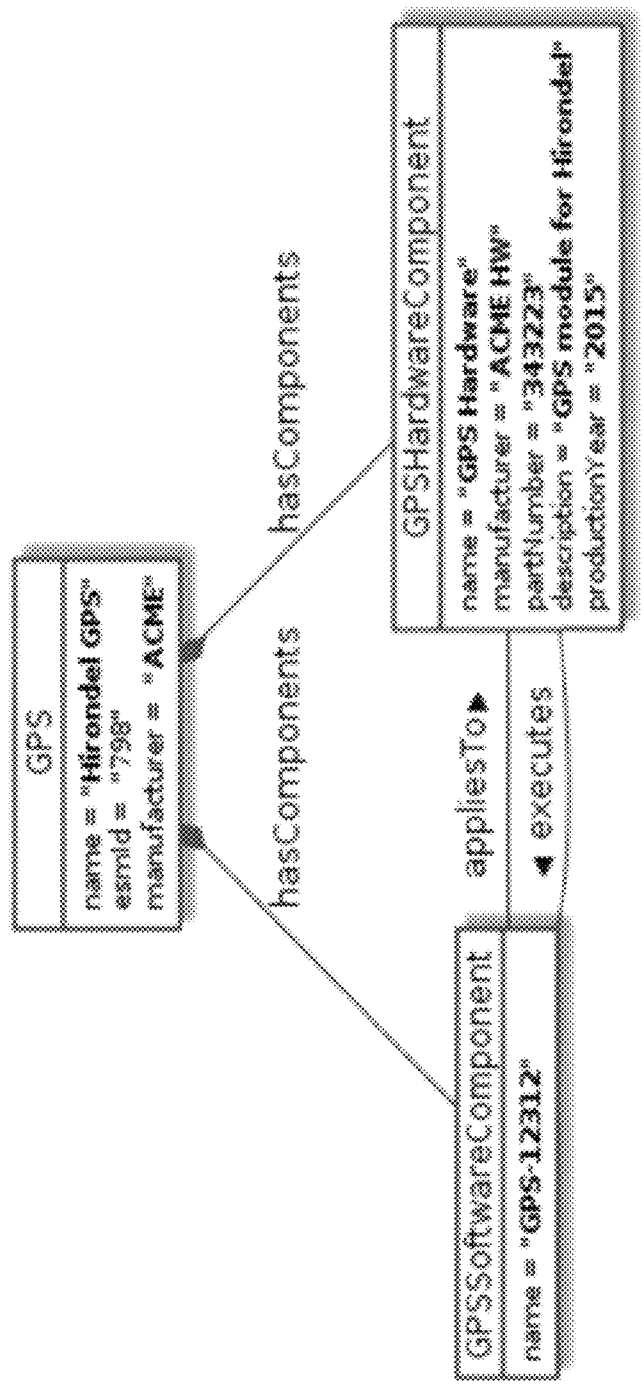

Adding new set of mapping rules allows server to properly map both ECU to EmbeddedSystems. See FIGS. 147 and 148.

DID Import Conflict:

The device sends a complete set of components and attributes, so the values in the mapping result originate from the device, however one of the DIDs (F181) has a value that conflicts with the attributes ontology.

Data reported by the device is shown in FIG. 149.

Figure 150:
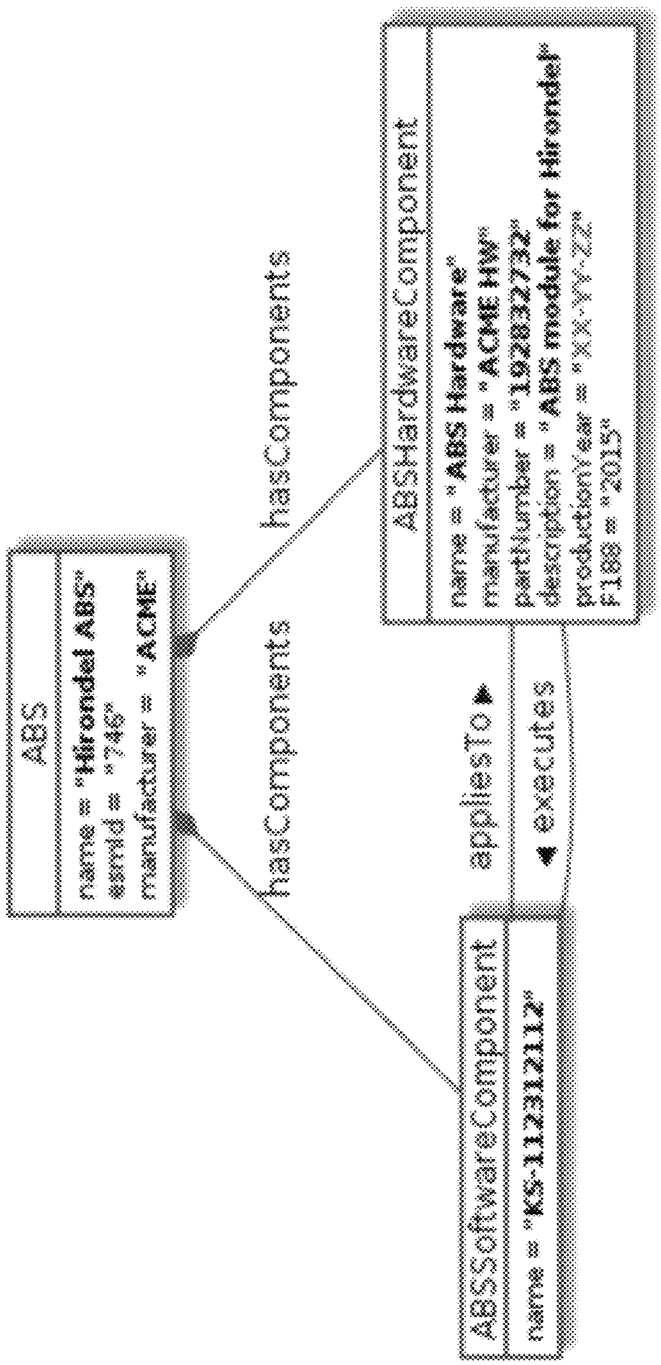

Result after applying component mappings is shown in FIG. 150.

Values that conflict with attribute definitions are displayed despite the incorrect value. This situation may be improved by uploading a new version of the ESM ontology or mapping rules (depends on type of data mismatch).

Mappings are Updated

Mapping rules can be updated or extended during runtime. This scenario assumes updating rules that are related to data that causes conflicts.

vrm:ABSHardwareComponent vrm:mapsF181to esm:serviceCode.

vrm:ABSHardwareComponent vrm:mapsF188to esm:productionYear.

Figure 151:
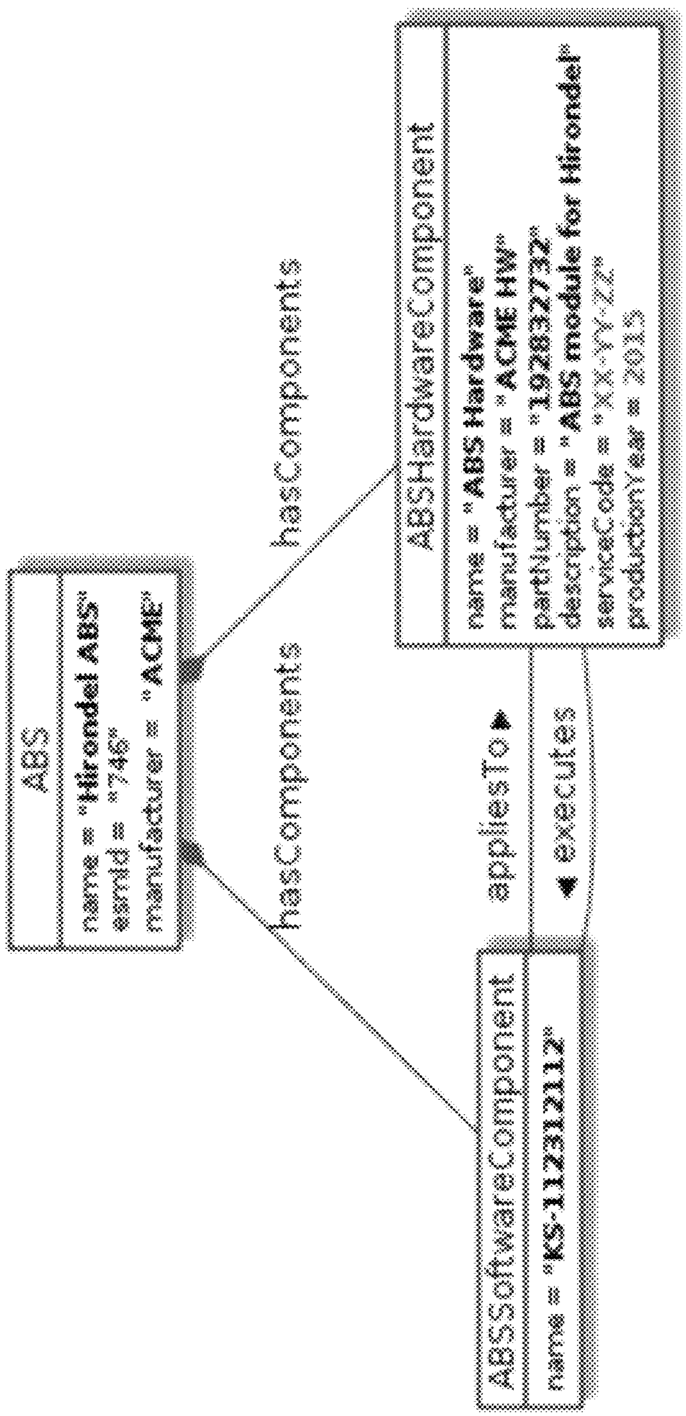

Conflicting DIDS are now mapped to proper attributes—see FIG. 151.

7 Graph-based Telematic Reporting Client

8 Methods to Dynamically Configure Structure, Frequency and Type of Telemetry Data Reporting from the Remote Managed Devices and Use of a Graph Database to Report Notifications from the Vehicles 9 Methods to Identify and Report Malfunction or Abnormal Behavior of Remote Devices and Notification of Remote Device Management System Operator

REDUP Controller

Figure 35:
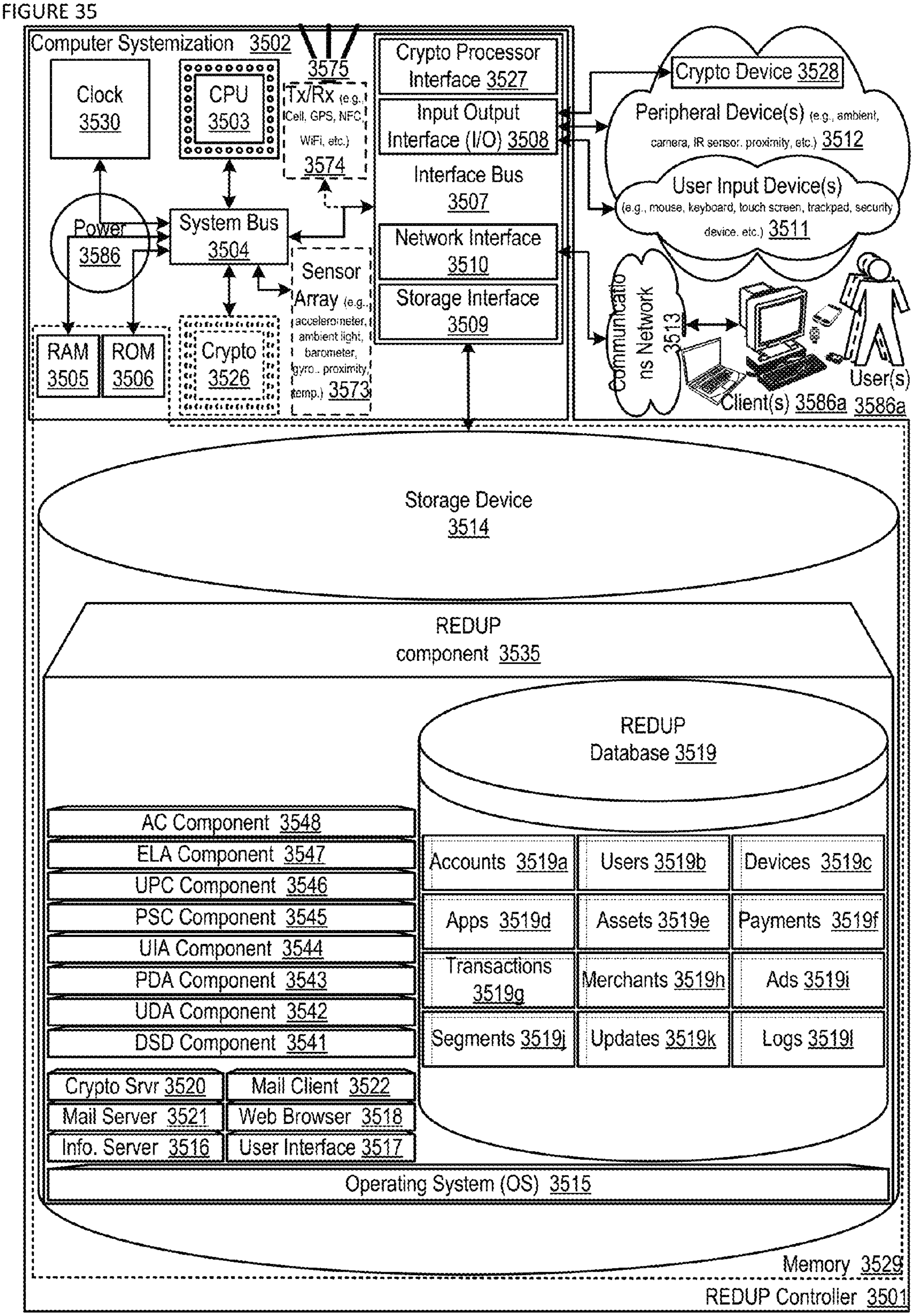
FIG. 35 shows a block diagram illustrating embodiments of a REDUP controller.

FIG. 35 shows a block diagram illustrating embodiments of a REDUP controller. In this embodiment, the REDUP controller 3501 may serve to aggregate, process, store, search, serve, identify, instruct, generate, match, and/or facilitate interactions with a computer through embedded software technologies, and/or other related data.

Typically, users, which may be people and/or other systems, may engage information technology systems (e.g., computers) to facilitate information processing. In turn, computers employ processors to process information; such processors 3503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the REDUP controller 3501 may be connected to and/or communicate with entities such as, but not limited to: one or more users from peripheral devices 3512 (e.g., user input devices 3511); an optional cryptographic processor device 3528; and/or a communications network 3513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The REDUP controller 3501 may be based on computer systems that may comprise, but are not limited to, components such as: a computer systemization 3502 connected to memory 3529.

Computer Systemization

A computer systemization 3502 may comprise a clock 3530, central processing unit ("CPU(s)" and/or "processor(s)" (these terms are used interchangeable throughout the disclosure unless noted to the contrary)) 3503, a memory 3529 (e.g., a read only memory (ROM) 3506, a random access memory (RAM) 3505, etc.), and/or an interface bus 3507, and most frequently, although not necessarily, are all interconnected and/or communicating through a system bus 3504 on one or more (mother)board(s) 3502 having conductive and/or otherwise transportive circuit pathways through which instructions (e.g., binary encoded signals) may travel to effectuate communications, operations, storage, etc. The computer systemization may be connected to a power source 3586; e.g., optionally the power source may be internal. Optionally, a cryptographic processor 3526 may be connected to the system bus. In another embodiment, the cryptographic processor, transceivers (e.g., ICs) 3574, and/or sensor array (e.g., accelerometer, altimeter, ambient light, barometer, global positioning system (GPS) (thereby allowing REDUP controller to determine its location), gyroscope, magnetometer, pedometer, proximity, ultra-violet sensor, etc.) 3573 may be connected as either internal and/or external peripheral devices 3512 via the interface bus I/O 3508 (not pictured) and/or directly via the interface bus 3507. In turn, the transceivers may be connected to antenna(s) 3575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that is will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the REDUP controller and beyond through various interfaces. Should processing requirements dictate a greater amount speed and/or capacity, distributed processors (e.g., see Distributed REDUP below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the REDUP may be achieved by implementing a microcontroller such as CAST's R8051XC2 microcontroller; Intel's MCS 51 (i.e., 8051 microcontroller); and/or the like. Also, to implement certain features of the REDUP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the REDUP component collection (distributed or otherwise) and/or features may be implemented via the microprocessor and/or via embedded components; e.g., via ASIC, coprocessor, DSP, FPGA, and/or the like. Alternately, some implementations of the REDUP may be implemented with embedded components that are configured and used to achieve a variety of features or signal processing.

Depending on the particular implementation, the embedded components may include software solutions, hardware solutions, and/or some combination of both hardware/software solutions. For example, REDUP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the REDUP features. A hierarchy of programmable interconnects allow logic blocks to be interconnected as needed by the REDUP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the REDUP may be developed on regular FPGAs and then migrated into a fixed version that more resembles ASIC implementations. Alternate or coordinating implementations may migrate REDUP controller features to a final ASIC instead of or in addition to FPGAs. Depending on the implementation all of the aforementioned embedded components and microprocessors may be considered the "CPU" and/or "processor" for the REDUP.

Power Source

The power source 3586 may be of any standard form for powering small electronic circuit board devices such as the following power cells-alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3586 is connected to at least one of the interconnected subsequent components of the REDUP thereby providing an electric current to all subsequent components. In one example, the power source 3586 is connected to the system bus component 3504. In an alternative embodiment, an outside power source 3586 is provided through a connection across the I/O 3508 interface. For example, a USB and/or IEEE 1394 connection carries both data and power across the connection and is therefore a suitable source of power.

Interface Adapters

Interface bus(ses) 3507 may accept, connect, and/or communicate to a number of interface adapters, conventionally although not necessarily in the form of adapter cards, such as but not limited to: input output interfaces (I/O) 3508, storage interfaces 3509, network interfaces 3510, and/or the like. Optionally, cryptographic processor interfaces 3527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 3509 may accept, communicate, and/or connect to a number of storage devices such as, but not limited to: storage devices 3514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3510 may accept, communicate, and/or connect to a communications network 3513. Through a communications network 3513, the REDUP controller is accessible through remote clients 3533*b* (e.g., computers with web browsers) by users 3533*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed REDUP below), architectures may similarly be employed to pool, load balance, and/or otherwise decrease/increase the communicative bandwidth required by the REDUP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 3510 may be used to engage with various communications network types 3513. For example, multiple network interfaces may be employed to allow for the communication over broadcast, multicast, and/or unicast networks.

Input Output interfaces (I/O) 3508 may accept, communicate, and/or connect to user, peripheral devices 3512 (e.g., input devices 3511), cryptographic processor devices 3528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 3512 may be connected and/or communicate to I/O and/or other facilities of the like such as network interfaces, storage interfaces, directly to the interface bus, system bus, the CPU, and/or the like. Peripheral devices may be external, internal and/or part of the REDUP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 3511 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the REDUP controller may be embodied as an embedded, dedicated, and/or monitor-less (i.e., headless) device, wherein access would be provided over a network interface connection.

Cryptographic units such as, but not limited to, microcontrollers, processors 3526, interfaces 3527, and/or devices 3528 may be attached, and/or communicate with the REDUP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications'

40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3529. However, memory is a fungible technology and resource, thus, any number of memory embodiments may be employed in lieu of or in concert with one another. It is to be understood that the REDUP controller and/or a computer systemization may employ various forms of memory 3529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3529 will include ROM 3506, RAM 3505, and a storage device 3514. A storage device 3514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 3529 may contain a collection of program and/or database components and/or data such as, but not limited to: operating system component(s) 3515 (operating system); information server component(s) 3516 (information server); user interface component(s) 3517 (user interface); Web browser component(s) 3518 (Web browser); database(s) 3519; mail server component(s) 3521; mail client component(s) 3522; cryptographic server component(s) 3520 (cryptographic server); the REDUP component(s) 3535; and/or the like (i.e., collectively a component collection). These components may be stored and accessed from the storage devices and/or from storage devices accessible through an interface bus. Although non-conventional program components such as those in the component collection, typically, are stored in a local storage device 3514, they may also be loaded and/or stored in memory such as: peripheral devices, RAM, remote storage facilities through a communications network, ROM, various forms of memory, and/or the like.

Operating System

The operating system component 3515 is an executable program component facilitating the operation of the REDUP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the REDUP controller to communicate with other entities through a communications network 3513. Various communication protocols may be used by the REDUP controller as a subcarrier transport mechanism for interaction, such as, but not limited to: multicast, TCP/IP, UDP, unicast, and/or the like.

Information Server

An information server component 3516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS)

resolution portion of an HTTP request is resolved to a particular information server, the information server resolves requests for information at specified locations on the REDUP controller based on the remainder of the HTTP request. For example, a request such as http://123.124.125.126/myInformation html might have the IP portion of the request "123.124.125.126" resolved by a DNS server to an information server at that IP address; that information server might in turn further parse the http request for the "/myInformation html" portion of the request and resolve it to a location in memory containing the information "myInformation.html" Additionally, other information serving protocols may be employed across various ports, e.g., FTP communications across port 21, and/or the like. An information server may communicate to and/or with other components in a component collection, including itself, and/or facilities of the like. Most frequently, the information server communicates with the REDUP database 3519, operating systems, other program components, user interfaces, Web browsers, and/or the like.

Access to the REDUP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the REDUP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the REDUP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the REDUP enabled nodes. The combined application may be nugatory on systems employing standard Web browsers.

Mail Server

A mail server component 3521 is a stored program component that is executed by a CPU 3503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the REDUP. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the REDUP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3522 is a stored program component that is executed by a CPU 3503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3520 is a stored program component that is executed by a CPU 3503, cryptographic processor 3526, cryptographic processor interface 3527, cryptographic processor device 3528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the REDUP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the REDUP component to engage in secure transactions if so desired. The cryptographic component facilitates the secure accessing of resources on the REDUP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The REDUP Database

The REDUP database component 3519 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the REDUP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the REDUP database is implemented as a data-structure, the use of the REDUP database 3519 may be integrated into another component such as the REDUP component 3535. Also, the database may be implemented as a mix of data structures, objects, and relational structures. Databases may be consolidated and/or distributed in countless variations (e.g., see Distributed REDUP below). Portions of databases, e.g., tables, may be exported and/or imported and thus decentralized and/or integrated.

In one embodiment, the database component 3519 includes several tables **3519*a*-1**:

An accounts table **3519*a*** includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table **3519*b*** includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a REDUP);

An devices table **3519*c*** includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storagelocation, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, segmentIDs, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table **3519*d*** includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table **3519*e*** includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table **3519*f*** includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table **3519*g*** includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table **3519*h*** includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **3519*i*** includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A segments table **3519*j*** includes fields such as, but not limited to: segmentID, segmentName, segmentParameters, segmentDevicesList, componentList, and/or the like;

An updates table **3519*k*** includes fields such as, but not limited to: updateID, updateDescription, updatePackageID, updatePackageVersion, updatePackagePriority, updatePackageSUMsData, and/or the like;

A logs table 35191 includes fields such as, but not limited to: logID, logData, logTimestamp, logOntology, and/or the like.

In one embodiment, the REDUP database may interact with other database systems. For example, employing a distributed database system, queries and data access by search REDUP component may treat the combination of the REDUP database, an integrated data security layer database as a single database entity (e.g., see Distributed REDUP below).

In one embodiment, user programs may contain various user interface primitives, which may serve to update the REDUP. Also, various accounts may require custom database tables depending upon the environments and the types of clients the REDUP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components **3519*a*-1**. The REDUP may be configured to keep track of various settings, inputs, and parameters via database controllers.

The REDUP database may communicate to and/or with other components in a component collection, including itself, and/or facilities of the like. Most frequently, the REDUP database communicates with the REDUP component, other program components, and/or the like. The database may contain, retain, and provide information regarding other nodes and data.

The REDUPs

The REDUP component 3535 is a stored program component that is executed by a CPU. In one embodiment, the REDUP component incorporates any and/or all combinations of the aspects of the REDUP that was discussed in the previous figures. As such, the REDUP affects accessing, obtaining and the provision of information, services, transactions, and/or the like across various communications networks. The features and embodiments of the REDUP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the REDUP's features and facilities, and in many cases reduce the costs, energy consumption/requirements, and extend the life of REDUP's underlying infrastructure; this has the added benefit of making the REDUP more reliable. Similarly, many of the features and mechanisms are designed to be easier for users to use and access, thereby broadening the audience that may enjoy/employ and exploit the feature sets of the REDUP; such ease of use also helps to increase the reliability of the REDUP. In addition, the feature sets include heightened security as noted via the Cryptographic components 3520, 3526, 3528 and throughout, making access to the features and data more reliable and secure.

The REDUP transforms telemetry inputs, via REDUP components (e.g., DSD, UDA, PDA, UTA, PSC, UPC, ELA, AC), into remote embedded updates outputs.

The REDUP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the REDUP server employs a cryptographic server to encrypt and decrypt communications. The REDUP component may communicate to and/or with other components in a component collection, including itself, and/or facilities of the like. Most frequently, the REDUP component communicates with the REDUP database, operating systems, other program components, and/or the like. The REDUP may contain, communicate, generate, obtain, and/or provide program component, system, user, and/or data communications, requests, and/or responses.

Distributed REDUPs

The structure and/or operation of any of the REDUP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the REDUP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for REDUP controller and/or REDUP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the REDUP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A remote embedded device component package and segment management apparatus, comprising:

a memory;

a component collection in the memory, including:

a device segment determining component, and a package download administering component;

a processor disposed in communication with the memory, and configured to issue a plurality of processing instructions from the component collection stored in the memory, wherein the processor issues instructions from the device segment determining component, stored in the memory, to:

obtain, via network, a connection notification message from a remote connected device, wherein the connection notification message includes a device identifier of the remote connected device, and device status data that includes information regarding components installed in the remote connected device and versions of the installed components;

analyze, via processor, the connection notification message to determine the device identifier;

determine, via processor, segment identifiers of segments associated with the remote connected device based on the device identifier;

determine, via processor, for each of the associated segments, segment component identifiers of segment components associated with the respective segment based on the respective segment identifier of the respective segment;

determine, via processor, for each of the associated segment components, whether an applicable update, which is available for the respective segment component and which is applicable to the respective segment, is available based on the respective segment component identifier of the respective segment component;

generate, via processor, an update notification message, wherein the update notification message includes information regarding the determined applicable updates;

send, via network, the update notification message to the remote connected device;

wherein the processor issues instructions from the package download administering component, stored in the memory, to:

obtain, via network, an update download request message from the remote connected device, wherein the update download request message includes an update identifier of an applicable update associated with the sent update notification message;

analyze, via processor, the update download request message to determine the update identifier;

determine, via processor, an update package associated with the update identifier; and send, via processor, the determined update package to the remote connected device.

2. The apparatus of embodiment 1, further comprising:

the processor issues instructions from a component, stored in the memory, to:

obtain, via network, an update installation report log message associated with the update identifier from the remote connected device; and store data associated with the update installation report log message in a storage repository.

3. The apparatus of embodiment 1, wherein a segment is configured to link a group of devices that are specified as a set.

4. The apparatus of embodiment 1, wherein a segment is configured to link a group of devices that have specified segment components.

5. The apparatus of embodiment 4, wherein a segment is configured to link a group of devices that have specified attribute values associated with the specified segment components.

6. The apparatus of embodiment 5, wherein a specified attribute value is a specified version label associated with hardware or software or firmware of a segment component.

7. The apparatus of embodiment 1, wherein a segment component is an embedded hardware component.

8. The apparatus of embodiment 1, wherein a segment component is a software or firmware component.

9. The apparatus of embodiment 1, wherein instructions to determine whether an applicable update is available for a segment component further comprise instructions to:

determine whether an applicable update is available for the version of the segment component installed in the remote connected device.

10. The apparatus of embodiment 1, wherein the update notification message includes priority data associated for each of the determined applicable updates.

11. The apparatus of embodiment 1, further comprising:

the processor issues instructions from the package download administering component, stored in the memory, to:

determine, via processor, whether the remote connected device is authorized to get the update package associated with the update identifier.

12. The apparatus of embodiment 1, wherein the update package comprises a plurality of software update modules.

13. The apparatus of embodiment 12, wherein a rule is associated with a software update module.

14. The apparatus of embodiment 13, wherein the rule specifies whether the software update module may be installed on a component.

15. The apparatus of embodiment 13, wherein the rule specifies how the software update module should be installed on a component.

16. The apparatus of embodiment 13, wherein the rule specifies a dependency between the software update module and another software update module in the update package.

17. The apparatus of embodiment 12, wherein a software update module is associated with parameters including version label, timestamp, checksum, and associated component of the remote connected device.

18. The apparatus of embodiment 1, further comprising:

the processor issues instructions from a component, stored in the memory, to:

configure, via processor, the update package for the remote connected device based on information regarding components installed in the remote connected device and versions of the installed components.

19. The apparatus of embodiment 18, wherein instructions to configure the update package further comprise instructions to:

exclude a software update module previously installed on the remote connected device from the update package.

20. The apparatus of embodiment 1, wherein priority data associated with the update package determines whether user approval should be obtained from a user of the remote connected device before installing the update package.

21. A processor-readable remote embedded device component package and segment management non-transient physical medium storing processor-executable components, the components, comprising:

a component collection stored in the medium, including:

a device segment determining component, and a package download administering component;

wherein the device segment determining component, stored in the medium, includes processor-issuable instructions to:

obtain, via network, a connection notification message from a remote connected device, wherein the connection notification message includes a device identifier of the remote connected device, and device status data that includes information regarding components installed in the remote connected device and versions of the installed components;

analyze, via processor, the connection notification message to determine the device identifier;

determine, via processor, segment identifiers of segments associated with the remote connected device based on the device identifier;

determine, via processor, for each of the associated segments, segment component identifiers of segment components associated with the respective segment based on the respective segment identifier of the respective segment;

determine, via processor, for each of the associated segment components, whether an applicable update, which is available for the respective segment component and which is applicable to the respective segment, is available based on the respective segment component identifier of the respective segment component;

generate, via processor, an update notification message, wherein the update notification message includes information regarding the determined applicable updates;

send, via network, the update notification message to the remote connected device;

wherein the package download administering component, stored in the medium, includes processor-issuable instructions to:

obtain, via network, an update download request message from the remote connected device, wherein the update download request message includes an update identifier of an applicable update associated with the sent update notification message;

analyze, via processor, the update download request message to determine the update identifier;

determine, via processor, an update package associated with the update identifier; and send, via processor, the determined update package to the remote connected device.

22. The medium of embodiment 21, further comprising:

a component, stored in the medium, includes processor-issuable instructions to:

obtain, via network, an update installation report log message associated with the update identifier from the remote connected device; and store data associated with the update installation report log message in a storage repository.

23. The medium of embodiment 21, wherein a segment is configured to link a group of devices that are specified as a set.

24. The medium of embodiment 21, wherein a segment is configured to link a group of devices that have specified segment components.

25. The medium of embodiment 24, wherein a segment is configured to link a group of devices that have specified attribute values associated with the specified segment components.

26. The medium of embodiment 25, wherein a specified attribute value is a specified version label associated with hardware or software or firmware of a segment component.

27. The medium of embodiment 21, wherein a segment component is an embedded hardware component.

28. The medium of embodiment 21, wherein a segment component is a software or firmware component.

29. The medium of embodiment 21, wherein instructions to determine whether an applicable update is available for a segment component further comprise instructions to:

determine whether an applicable update is available for the version of the segment component installed in the remote connected device.

30. The medium of embodiment 21, wherein the update notification message includes priority data associated for each of the determined applicable updates.

31. The medium of embodiment 21, further comprising:

the package download administering component, stored in the medium, includes processor-issuable instructions to:

determine, via processor, whether the remote connected device is authorized to get the update package associated with the update identifier.

32. The medium of embodiment 21, wherein the update package comprises a plurality of software update modules.

33. The medium of embodiment 32, wherein a rule is associated with a software update module.

34. The medium of embodiment 33, wherein the rule specifies whether the software update module may be installed on a component.

35. The medium of embodiment 33, wherein the rule specifies how the software update module should be installed on a component.

36. The medium of embodiment 33, wherein the rule specifies a dependency between the software update module and another software update module in the update package.

37. The medium of embodiment 32, wherein a software update module is associated with parameters including version label, timestamp, checksum, and associated component of the remote connected device.

38. The medium of embodiment 21, further comprising:

a component, stored in the medium, includes processor-issuable instructions to:

configure, via processor, the update package for the remote connected device based on information regarding components installed in the remote connected device and versions of the installed components.

39. The medium of embodiment 38, wherein instructions to configure the update package further comprise instructions to:

exclude a software update module previously installed on the remote connected device from the update package.

40. The medium of embodiment 21, wherein priority data associated with the update package determines whether user approval should be obtained from a user of the remote connected device before installing the update package.

41. A processor-implemented remote embedded device component package and segment management system, comprising:

a device segment determining component means, to:

obtain, via network, a connection notification message from a remote connected device, wherein the connection notification message includes a device identifier of the remote connected device, and device status data that includes information regarding components installed in the remote connected device and versions of the installed components;

analyze, via processor, the connection notification message to determine the device identifier;

determine, via processor, segment identifiers of segments associated with the remote connected device based on the device identifier;

determine, via processor, for each of the associated segments, segment component identifiers of segment components associated with the respective segment based on the respective segment identifier of the respective segment;

determine, via processor, for each of the associated segment components, whether an applicable update, which is available for the respective segment component and which is applicable to the respective segment, is available based on the respective segment component identifier of the respective segment component;

generate, via processor, an update notification message, wherein the update notification message includes information regarding the determined applicable updates;

send, via network, the update notification message to the remote connected device;

a package download administering component means, to:

obtain, via network, an update download request message from the remote connected device, wherein the update download request message includes an update identifier of an applicable update associated with the sent update notification message;

analyze, via processor, the update download request message to determine the update identifier;

determine, via processor, an update package associated with the update identifier; and send, via processor, the determined update package to the remote connected device.

42. The system of embodiment 41, further comprising:

component means, to:

obtain, via network, an update installation report log message associated with the update identifier from the remote connected device; and store data associated with the update installation report log message in a storage repository.

43. The system of embodiment 41, wherein a segment is configured to link a group of devices that are specified as a set.

44. The system of embodiment 41, wherein a segment is configured to link a group of devices that have specified segment components.

45. The system of embodiment 44, wherein a segment is configured to link a group of devices that have specified attribute values associated with the specified segment components.

46. The system of embodiment 45, wherein a specified attribute value is a specified version label associated with hardware or software or firmware of a segment component.

47. The system of embodiment 41, wherein a segment component is an embedded hardware component.

48. The system of embodiment 41, wherein a segment component is a software or firmware component.

49. The system of embodiment 41, wherein means to determine whether an applicable update is available for a segment component further comprise means to:

determine whether an applicable update is available for the version of the segment component installed in the remote connected device.

50. The system of embodiment 41, wherein the update notification message includes priority data associated for each of the determined applicable updates.

51. The system of embodiment 41, further comprising:

the package download administering component means, to:

determine, via processor, whether the remote connected device is authorized to get the update package associated with the update identifier.

52. The system of embodiment 41, wherein the update package comprises a plurality of software update modules.

53. The system of embodiment 52, wherein a rule is associated with a software update module.

54. The system of embodiment 53, wherein the rule specifies whether the software update module may be installed on a component.

55. The system of embodiment 53, wherein the rule specifies how the software update module should be installed on a component.

56. The system of embodiment 53, wherein the rule specifies a dependency between the software update module and another software update module in the update package.

57. The system of embodiment 52, wherein a software update module is associated with parameters including version label, timestamp, checksum, and associated component of the remote connected device.

58. The system of embodiment 41, further comprising:

component means, to:

configure, via processor, the update package for the remote connected device based on information regarding components installed in the remote connected device and versions of the installed components.

59. The system of embodiment 58, wherein means to configure the update package further comprise means to:

exclude a software update module previously installed on the remote connected device from the update package.

60. The system of embodiment 41, wherein priority data associated with the update package determines whether user approval should be obtained from a user of the remote connected device before installing the update package.

61. A processor-implemented remote embedded device component package and segment management method, comprising:

executing processor-implemented device segment determining component instructions to:

obtain, via network, a connection notification message from a remote connected device, wherein the connection notification message includes a device identifier of the remote connected device, and device status data that includes information regarding components installed in the remote connected device and versions of the installed components;

analyze, via processor, the connection notification message to determine the device identifier;

determine, via processor, segment identifiers of segments associated with the remote connected device based on the device identifier;

determine, via processor, for each of the associated segments, segment component identifiers of segment components associated with the respective segment based on the respective segment identifier of the respective segment;

determine, via processor, for each of the associated segment components, whether an applicable update, which is available for the respective segment component and which is applicable to the respective segment, is available based on the respective segment component identifier of the respective segment component;

generate, via processor, an update notification message, wherein the update notification message includes information regarding the determined applicable updates;

send, via network, the update notification message to the remote connected device;

executing processor-implemented package download administering component instructions to:

obtain, via network, an update download request message from the remote connected device, wherein the update download request message includes an update identifier of an applicable update associated with the sent update notification message;

analyze, via processor, the update download request message to determine the update identifier;

determine, via processor, an update package associated with the update identifier; and send, via processor, the determined update package to the remote connected device.

62. The method of embodiment 61, further comprising:

executing processor-implemented component instructions to:

obtain, via network, an update installation report log message associated with the update identifier from the remote connected device; and store data associated with the update installation report log message in a storage repository.

63. The method of embodiment 61, wherein a segment is configured to link a group of devices that are specified as a set.

64. The method of embodiment 61, wherein a segment is configured to link a group of devices that have specified segment components.

65. The method of embodiment 64, wherein a segment is configured to link a group of devices that have specified attribute values associated with the specified segment components.

66. The method of embodiment 65, wherein a specified attribute value is a specified version label associated with hardware or software or firmware of a segment component.

67. The method of embodiment 61, wherein a segment component is an embedded hardware component.

68. The method of embodiment 61, wherein a segment component is a software or firmware component.

69. The method of embodiment 61, wherein instructions to determine whether an applicable update is available for a segment component further comprise instructions to:

determine whether an applicable update is available for the version of the segment component installed in the remote connected device.

70. The method of embodiment 61, wherein the update notification message includes priority data associated for each of the determined applicable updates.

71. The method of embodiment 61, further comprising:

executing processor-implemented package download administering component instructions to:

determine, via processor, whether the remote connected device is authorized to get the update package associated with the update identifier.

72. The method of embodiment 61, wherein the update package comprises a plurality of software update modules.

73. The method of embodiment 72, wherein a rule is associated with a software update module.

74. The method of embodiment 73, wherein the rule specifies whether the software update module may be installed on a component.

75. The method of embodiment 73, wherein the rule specifies how the software update module should be installed on a component.

76. The method of embodiment 73, wherein the rule specifies a dependency between the software update module and another software update module in the update package.

77. The method of embodiment 72, wherein a software update module is associated with parameters including version label, timestamp, checksum, and associated component of the remote connected device.

78. The method of embodiment 61, further comprising:

executing processor-implemented component instructions to:

configure, via processor, the update package for the remote connected device based on information regarding components installed in the remote connected device and versions of the installed components.

79. The method of embodiment 78, wherein instructions to configure the update package further comprise instructions to:

exclude a software update module previously installed on the remote connected device from the update package.

80. The method of embodiment 61, wherein priority data associated with the update package determines whether user approval should be obtained from a user of the remote connected device before installing the update package.

81. An device component analytics improvement and decisioning apparatus, comprising:

a memory;

a component collection in the memory, including:

an analytics conducting component;

a processor disposed in communication with the memory, and configured to issue a plurality of processing instructions from the component collection stored in the memory, wherein the processor issues instructions from the analytics conducting component, stored in the memory, to:

obtain, via network, analytics data associated with an analytics application from a plurality of remote connected devices;

analyze, via processor, the obtained analytics data to determine an issue affecting at least some of the plurality of remote connected devices;

determine, via processor, based on the analysis, a device component of the affected remote connected devices that is at least in part responsible for causing the issue;

determine, via processor, a segment associated with the device component, wherein the segment is affected by the issue;

generate, via processor, an update package for the segment that includes an updated software or firmware component that updates the device component and remedies the issue; and facilitate, via processor, notification of remote connected devices associated with the segment regarding the update package.

82. The apparatus of embodiment 81, wherein the analytics data comprises event data reported by the plurality of remote connected devices.

83. The apparatus of embodiment 81, wherein the analytics data is obtained in a graph format.

84. The apparatus of embodiment 81, wherein the analytics data is obtained directly from a remote connected device via an adapter.

85. The apparatus of embodiment 81, wherein the analytics data is obtained indirectly from a remote connected device via a cloud data storage repository.

86. The apparatus of embodiment 81, further comprising:

the processor issues instructions from the analytics conducting component, stored in the memory, to:

obtain, via network, analytics data associated with an analytics application from a third party database.

87. The apparatus of embodiment 81, further comprising:

the processor issues instructions from the analytics conducting component, stored in the memory, to:

utilize, via processor, a federated query to obtain analytics data associated with an analytics application by combining analytics data from a plurality of sources.

88. The apparatus of embodiment 81, wherein the plurality of remote connected devices are vehicles.

89. The apparatus of embodiment 88, wherein the device component is an electronic control unit of a vehicle.

90. The apparatus of embodiment 88, wherein the device component is an app installed on an infotainment unit of a vehicle.

91. The apparatus of embodiment 81, further comprising:

the processor issues instructions from the analytics conducting component, stored in the memory, to:

determine, via processor, a second segment associated with the device component, wherein the second segment is affected by the issue;

generate, via processor, a second update package for the second segment that includes an updated software or firmware component that updates the device component and remedies the issue, wherein the second update package includes different software update modules than the update package; and facilitate, via processor, notification of remote connected devices associated with the second segment regarding the second update package.

92. The apparatus of embodiment 81, further comprising:

the component collection in the memory, including:

an update package configuring component;

the processor issues instructions from the update package configuring component, stored in the memory, to:

determine, via processor, a priority for the update package based on the severity of the issue; and associate, via processor, the priority with the update package.

93. The apparatus of embodiment 81, further comprising:

the component collection in the memory, including:

an update package configuring component;

the processor issues instructions from the update package configuring component, stored in the memory, to:

determine, via processor, software update modules for the update package;

determine, via processor, dependencies between the software update modules; and generate, via processor, a script file that facilitates installation of the software update modules in accordance with the determined dependencies.

94. The apparatus of embodiment 93, wherein the script file is a software update module associated with the update package.

95. The apparatus of embodiment 93, further comprising:

the processor issues instructions from the update package configuring component, stored in the memory, to:

validate, via processor, configuration of the update package based on the determined dependencies.

96. A processor-readable device component analytics improvement and decisioning non-transient physical medium storing processor-executable components, the components, comprising:

a component collection stored in the medium, including:

an analytics conducting component;

wherein the analytics conducting component, stored in the medium, includes processor-issuable instructions to:

obtain, via network, analytics data associated with an analytics application from a plurality of remote connected devices;

analyze, via processor, the obtained analytics data to determine an issue affecting at least some of the plurality of remote connected devices;

determine, via processor, based on the analysis, a device component of the affected remote connected devices that is at least in part responsible for causing the issue;

determine, via processor, a segment associated with the device component, wherein the segment is affected by the issue;

generate, via processor, an update package for the segment that includes an updated software or firmware component that updates the device component and remedies the issue; and facilitate, via processor, notification of remote connected devices associated with the segment regarding the update package.

97. The medium of embodiment 96, wherein the analytics data comprises event data reported by the plurality of remote connected devices.

98. The medium of embodiment 96, wherein the analytics data is obtained in a graph format.

99. The medium of embodiment 96, wherein the analytics data is obtained directly from a remote connected device via an adapter.

100. The medium of embodiment 96, wherein the analytics data is obtained indirectly from a remote connected device via a cloud data storage repository.

101. The medium of embodiment 96, further comprising: the analytics conducting component, stored in the medium, includes processor-issuable instructions to: obtain, via network, analytics data associated with an analytics application from a third party database.

102. The medium of embodiment 96, further comprising: the analytics conducting component, stored in the medium, includes processor-issuable instructions to: utilize, via processor, a federated query to obtain analytics data associated with an analytics application by combining analytics data from a plurality of sources.

103. The medium of embodiment 96, wherein the plurality of remote connected devices are vehicles.

104. The medium of embodiment 103, wherein the device component is an electronic control unit of a vehicle.

105. The medium of embodiment 103, wherein the device component is an app installed on an infotainment unit of a vehicle.

106. The medium of embodiment 96, further comprising: the analytics conducting component, stored in the medium, includes processor-issuable instructions to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

107. The medium of embodiment 96, further comprising: a component collection stored in the medium, including: an update package configuring component;
wherein the update package configuring component, stored in the medium, includes processor-issuable instructions to:
determine, via processor, a priority for the update package based on the severity of the issue; and
associate, via processor, the priority with the update package.

108. The medium of embodiment 96, further comprising: a component collection stored in the medium, including: an update package configuring component;
wherein the update package configuring component, stored in the medium, includes processor-issuable instructions to:
determine, via processor, software update modules for the update package;
determine, via processor, dependencies between the software update modules; and
generate, via processor, a script file that facilitates installation of the software update modules in accordance with the determined dependencies.

109. The medium of embodiment 108, wherein the script file is a software update module associated with the update package.

110. The medium of embodiment 108, further comprising: the update package configuring component, stored in the medium, includes processor-issuable instructions to:
validate, via processor, configuration of the update package based on the determined dependencies.

111. A processor-implemented device component analytics improvement and decisioning system, comprising:
an analytics conducting component means, to:
obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

112. The system of embodiment 111, wherein the analytics data comprises event data reported by the plurality of remote connected devices.

113. The system of embodiment 111, wherein the analytics data is obtained in a graph format.

114. The system of embodiment 111, wherein the analytics data is obtained directly from a remote connected device via an adapter.

115. The system of embodiment 111, wherein the analytics data is obtained indirectly from a remote connected device via a cloud data storage repository.

116. The system of embodiment 111, further comprising: the analytics conducting component means, to:
obtain, via network, analytics data associated with an analytics application from a third party database.

117. The system of embodiment 111, further comprising: the analytics conducting component means, to:
utilize, via processor, a federated query to obtain analytics data associated with an analytics application by combining analytics data from a plurality of sources.

118. The system of embodiment 111, wherein the plurality of remote connected devices are vehicles.

119. The system of embodiment 118, wherein the device component is an electronic control unit of a vehicle.

120. The system of embodiment 118, wherein the device component is an app installed on an infotainment unit of a vehicle.

121. The system of embodiment 111, further comprising: the analytics conducting component means, to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

122. The system of embodiment 111, further comprising:
an update package configuring component means, to:
determine, via processor, a priority for the update package based on the severity of the issue; and
associate, via processor, the priority with the update package.

123. The system of embodiment 111, further comprising:
an update package configuring component means, to:
determine, via processor, software update modules for the update package;
determine, via processor, dependencies between the software update modules; and
generate, via processor, a script file that facilitates installation of the software update modules in accordance with the determined dependencies.

124. The system of embodiment 123, wherein the script file is a software update module associated with the update package.

125. The system of embodiment 123, further comprising:
the update package configuring component means, to:
validate, via processor, configuration of the update package based on the determined dependencies.

126. A processor-implemented device component analytics improvement and decisioning method, comprising:
executing processor-implemented analytics conducting component instructions to:
obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

127. The method of embodiment 126, wherein the analytics data comprises event data reported by the plurality of remote connected devices.

128. The method of embodiment 126, wherein the analytics data is obtained in a graph format.

129. The method of embodiment 126, wherein the analytics data is obtained directly from a remote connected device via an adapter.

130. The method of embodiment 126, wherein the analytics data is obtained indirectly from a remote connected device via a cloud data storage repository.

131. The method of embodiment 126, further comprising:
executing processor-implemented analytics conducting component instructions to:
obtain, via network, analytics data associated with an analytics application from a third party database.

132. The method of embodiment 126, further comprising:
executing processor-implemented analytics conducting component instructions to:
utilize, via processor, a federated query to obtain analytics data associated with an analytics application by combining analytics data from a plurality of sources.

133. The method of embodiment 126, wherein the plurality of remote connected devices are vehicles.

134. The method of embodiment 133, wherein the device component is an electronic control unit of a vehicle.

135. The method of embodiment 133, wherein the device component is an app installed on an infotainment unit of a vehicle.

136. The method of embodiment 126, further comprising:
executing processor-implemented analytics conducting component instructions to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

137. The method of embodiment 126, further comprising:
executing processor-implemented update package configuring component instructions to:
determine, via processor, a priority for the update package based on the severity of the issue; and
associate, via processor, the priority with the update package.

138. The method of embodiment 126, further comprising:
executing processor-implemented update package configuring component instructions to:
determine, via processor, software update modules for the update package;
determine, via processor, dependencies between the software update modules; and
generate, via processor, a script file that facilitates installation of the software update modules in accordance with the determined dependencies.

139. The method of embodiment 138, wherein the script file is a software update module associated with the update package.

140. The method of embodiment 138, further comprising:
executing processor-implemented update package configuring component instructions to:
validate, via processor, configuration of the update package based on the determined dependencies.

141. A device component status detection and illustration apparatus, comprising:
a memory;
a component collection in the memory, including:
a device status tool component, and
a processor disposed in communication with the memory, and configured to issue a plurality of processing instructions from the component collection stored in the memory,
wherein the processor issues instructions from the device status tool component, stored in the memory, to:
obtain, via processor, device selection parameters;
determine, via processor, one or more remote connected devices that satisfy the device selection parameters;

identify, via processor, a remote connected device selected from the one or more remote connected devices by a user using a user interface;

generate, via processor, a first visualization that illustrates an updates timeline associated with the identified remote connected device, a first update time selected from the updates timeline, and information regarding device components associated with the identified remote connected device as of the first update time;

obtain, via processor, a selection of a second update time from the updates timeline from the user; and generate, via processor, a second visualization that illustrates an updates timeline associated with the identified remote connected device, the second update time selected from the updates timeline, and information regarding device components associated with the identified remote connected device as of the second update time.

142. The apparatus of embodiment 141, wherein the device selection parameters are obtained from the user via the user interface.

143. The apparatus of embodiment 141, wherein the device selection parameters are obtained from a configuration file.

144. The apparatus of embodiment 141, wherein the device selection parameters include a vehicle VIN number or a vehicle model.

145. The apparatus of embodiment 141, wherein the device selection parameters include a specified reported error associated with a remote connected device or a last update timestamp associated with a remote connected device.

146. The apparatus of embodiment 141, wherein information regarding device components includes identifiers of device components associated with the remote connected device and version labels of the device components associated with the remote connected 147. The apparatus of embodiment 141, wherein information regarding the device components is illustrated in a tree format.

148. The apparatus of embodiment 141, wherein a slider widget is utilized to illustrate the updates timeline.

149. The apparatus of embodiment 141, wherein the first update time is the update time associated with the latest update to the remote connected device.

150. The apparatus of embodiment 141, wherein the second update time is an update time associated with a past update to the remote connected device.

151. The apparatus of embodiment 141, wherein the second update time is an update time associated with a future anticipated update to the remote connected device.

152. The apparatus of embodiment 151, further comprising:

the processor issues instructions from the device status tool component, stored in the memory, to:

determine, via processor, software update modules of an update package associated with the future anticipated update that should be downloaded by the remote connected device; and generate, via processor, a visualization that illustrates which software update modules should be downloaded.

153. The apparatus of embodiment 151, further comprising:

the processor issues instructions from the device status tool component, stored in the memory, to:

determine, via processor, software update modules of an update package associated with the future anticipated update that should not be downloaded by the remote connected device; and generate, via processor, a visualization that illustrates which software update modules should not be downloaded.

154. The apparatus of embodiment 151, wherein the second visualization illustrates which device components changed between the first update time and the second update time.

155. The apparatus of embodiment 151, wherein the second visualization illustrates which device components changed between the second update time and the update time preceding 156. A processor-readable device component status detection and illustration non-transient physical medium storing processor-executable components, the components, comprising:

a component collection stored in the medium, including:

a device status tool component, and wherein the device status tool component, stored in the medium, includes processor-issuable instructions to:

obtain, via processor, device selection parameters;

determine, via processor, one or more remote connected devices that satisfy the device selection parameters;

identify, via processor, a remote connected device selected from the one or more remote connected devices by a user using a user interface;

generate, via processor, a first visualization that illustrates an updates timeline associated with the identified remote connected device, a first update time selected from the updates timeline, and information regarding device components associated with the identified remote connected device as of the first update time;

obtain, via processor, a selection of a second update time from the updates timeline from the user; and generate, via processor, a second visualization that illustrates an updates timeline associated with the identified remote connected device, the second update time selected from the updates timeline, and information regarding device components associated with the identified remote connected device as of the second update time.

157. The medium of embodiment 156, wherein the device selection parameters are obtained from the user via the user interface.

158. The medium of embodiment 156, wherein the device selection parameters are obtained from a configuration file.

159. The medium of embodiment 156, wherein the device selection parameters include a vehicle VIN number or a vehicle model.

160. The medium of embodiment 156, wherein the device selection parameters include a specified reported error associated with a remote connected device or a last update timestamp 161. The medium of embodiment 156, wherein information regarding device components includes identifiers of device components associated with the remote connected device and version labels of the device components associated with the remote connected device.

162. The medium of embodiment 156, wherein information regarding the device components is illustrated in a tree format.

163. The medium of embodiment 156, wherein a slider widget is utilized to illustrate the updates timeline.

164. The medium of embodiment 156, wherein the first update time is the update time associated with the latest update to the remote connected device.
165. The medium of embodiment 156, wherein the second update time is an update time associated with a past update to the remote connected device.
166. The medium of embodiment 156, wherein the second update time is an update time associated with a future anticipated update to the remote connected device.
167. The medium of embodiment 166, further comprising:
the device status tool component, stored in the medium, includes processor-issuable instructions to:
determine, via processor, software update modules of an update package associated with the future anticipated update that should be downloaded by the remote connected device; and
generate, via processor, a visualization that illustrates which software update modules should be downloaded.
168. The medium of embodiment 166, further comprising:
the device status tool component, stored in the medium, includes processor-issuable instructions to:
determine, via processor, software update modules of an update package associated with the future anticipated update that should not be downloaded by the remote connected device; and
generate, via processor, a visualization that illustrates which software update modules should not be downloaded.
169. The medium of embodiment 166, wherein the second visualization illustrates which device components changed between the first update time and the second update time.
170. The medium of embodiment 166, wherein the second visualization illustrates which device components changed between the second update time and the update time preceding the second update time.
171. A processor-implemented device component status detection and illustration system, comprising:
a device status tool component means, to:
obtain, via processor, device selection parameters;
determine, via processor, one or more remote connected devices that satisfy the device selection parameters;
identify, via processor, a remote connected device selected from the one or more remote connected devices by a user using a user interface;
generate, via processor, a first visualization that illustrates an updates timeline associated with the identified remote connected device, a first update time selected from the updates timeline, and information regarding device components associated with the identified remote connected device as of the first update time;
obtain, via processor, a selection of a second update time from the updates timeline from the user; and
generate, via processor, a second visualization that illustrates an updates timeline associated with the identified remote connected device, the second update time selected from the updates timeline, and information regarding device components associated with the identified remote connected device as of the second update time.
172. The system of embodiment 171, wherein the device selection parameters are obtained from the user via the user interface.
173. The system of embodiment 171, wherein the device selection parameters are obtained from a configuration file.
174. The system of embodiment 171, wherein the device selection parameters include a vehicle VIN number or a vehicle model.
175. The system of embodiment 171, wherein the device selection parameters include a specified reported error associated with a remote connected device or a last update timestamp
176. The system of embodiment 171, wherein information regarding device components includes identifiers of device components associated with the remote connected device and version labels of the device components associated with the remote connected device.
177. The system of embodiment 171, wherein information regarding the device components is illustrated in a tree format.
178. The system of embodiment 171, wherein a slider widget is utilized to illustrate the updates timeline.
179. The system of embodiment 171, wherein the first update time is the update time associated with the latest update to the remote connected device.
180. The system of embodiment 171, wherein the second update time is an update time associated with a past update to the remote connected device.
181. The system of embodiment 171, wherein the second update time is an update time associated with a future anticipated update to the remote connected device.
182. The system of embodiment 181, further comprising:
the device status tool component means, to:
determine, via processor, software update modules of an update package associated with the future anticipated update that should be downloaded by the remote connected device; and
generate, via processor, a visualization that illustrates which software update modules should be downloaded.
183. The system of embodiment 181, further comprising:
the device status tool component means, to:
determine, via processor, software update modules of an update package associated with the future anticipated update that should not be downloaded by the remote connected device; and
generate, via processor, a visualization that illustrates which software update modules should not be downloaded.
184. The system of embodiment 181, wherein the second visualization illustrates which device components changed between the first update time and the second update time.
185. The system of embodiment 181, wherein the second visualization illustrates which device components changed between the second update time and the update time preceding the second update time.
186. A processor-implemented device component status detection and illustration method, comprising:
executing processor-implemented device status tool component instructions to:
obtain, via processor, device selection parameters;
determine, via processor, one or more remote connected devices that satisfy the device selection parameters;
identify, via processor, a remote connected device selected from the one or more remote connected devices by a user using a user interface;

generate, via processor, a first visualization that illustrates an updates timeline associated with the identified remote connected device, a first update time selected from the updates timeline, and information regarding device components associated with the identified remote connected device as of the first update time;

obtain, via processor, a selection of a second update time from the updates timeline from the user; and generate, via processor, a second visualization that illustrates an updates timeline associated with the identified remote connected device, the second update time selected from the updates timeline, and information regarding device components associated with the identified remote connected device as of the second update time.

187. The method of embodiment 186, wherein the device selection parameters are obtained from the user via the user interface.

188. The method of embodiment 186, wherein the device selection parameters are obtained from a configuration file.

189. The method of embodiment 186, wherein the device selection parameters include a vehicle VIN number or a vehicle model.

190. The method of embodiment 186, wherein the device selection parameters include a specified reported error associated with a remote connected device or a last update timestamp 191. The method of embodiment 186, wherein information regarding device components includes identifiers of device components associated with the remote connected device and version labels of the device components associated with the remote connected device.

192. The method of embodiment 186, wherein information regarding the device components is illustrated in a tree format.

193. The method of embodiment 186, wherein a slider widget is utilized to illustrate the updates timeline.

194. The method of embodiment 186, wherein the first update time is the update time associated with the latest update to the remote connected device.

195. The method of embodiment 186, wherein the second update time is an update time associated with a past update to the remote connected device.

196. The method of embodiment 186, wherein the second update time is an update time associated with a future anticipated update to the remote connected device.

197. The method of embodiment 196, further comprising:

executing processor-implemented device status tool component instructions to:

determine, via processor, software update modules of an update package associated with the future anticipated update that should be downloaded by the remote connected device; and generate, via processor, a visualization that illustrates which software update modules should be downloaded.

198. The method of embodiment 196, further comprising:

executing processor-implemented device status tool component instructions to:

determine, via processor, software update modules of an update package associated with the future anticipated update that should not be downloaded by the remote connected device; and generate, via processor, a visualization that illustrates which software update modules should not be downloaded.

199. The method of embodiment 196, wherein the second visualization illustrates which device components changed between the first update time and the second update time.

200. The method of embodiment 196, wherein the second visualization illustrates which device components changed between the second update time and the update time preceding the second update time.

301. The apparatus of embodiment 1, wherein the device identifier is associated with a device manufacturer from a plurality of device manufacturers, and wherein the segments associated with the remote connected device are associated with the device manufacturer.

302. The apparatus of embodiment 1, wherein the remote connected device and the update package are associated with a segment, and wherein the update package is generated based on analysis of data and settings from a plurality of other devices that are associated with the segment.

303. The apparatus of embodiment 302, wherein the other devices are associated with the device manufacturer of the remote connected device, and the data and settings are not shared with other device manufacturers.

304. The apparatus of embodiment 302, wherein the other devices are associated with a plurality of device manufacturers, and the data and settings are shared among the plurality of device manufacturers.

311. The medium of embodiment 21, wherein the device identifier is associated with a device manufacturer from a plurality of device manufacturers, and wherein the segments associated with the remote connected device are associated with the device manufacturer.

312. The medium of embodiment 21, wherein the remote connected device and the update package are associated with a segment, and wherein the update package is generated based on analysis of data and settings from a plurality of other devices that are associated with the segment.

313. The medium of embodiment 312, wherein the other devices are associated with the device manufacturer of the remote connected device, and the data and settings are not shared with other device manufacturers.

314. The medium of embodiment 312, wherein the other devices are associated with a plurality of device manufacturers, and the data and settings are shared among the plurality of 321. The system of embodiment 41, wherein the device identifier is associated with a device manufacturer from a plurality of device manufacturers, and wherein the segments associated with the remote connected device are associated with the device manufacturer.

322. The system of embodiment 41, wherein the remote connected device and the update package are associated with a segment, and wherein the update package is generated based on analysis of data and settings from a plurality of other devices that are associated with the segment.

323. The system of embodiment 322, wherein the other devices are associated with the device manufacturer of the remote connected device, and the data and settings are not shared with other device manufacturers.

324. The system of embodiment 322, wherein the other devices are associated with a plurality of device manufacturers, and the data and settings are shared among the plurality of device manufacturers.

331. The method of embodiment 61, wherein the device identifier is associated with a device manufacturer from a plurality of device manufacturers, and wherein the segments associated with the remote connected device are associated with the device manufacturer.

332. The method of embodiment 61, wherein the remote connected device and the update package are associated with a segment, and wherein the update package is generated based on analysis of data and settings from a plurality of other devices that are associated with the segment.

333. The method of embodiment 332, wherein the other devices are associated with the device manufacturer of the remote connected device, and the data and settings are not shared with other device manufacturers.

334. The method of embodiment 332, wherein the other devices are associated with a plurality of device manufacturers, and the data and settings are shared among the plurality of device manufacturers.

401. The apparatus of embodiment 81, wherein the plurality of remote connected devices are associated with a device manufacturer, and the analytics data are not shared with other device manufacturers.

402. The apparatus of embodiment 81, wherein the plurality of remote connected devices are associated with a plurality of device manufacturers, and the analytics data are shared among the plurality of device manufacturers.

411. The medium of embodiment 96, wherein the plurality of remote connected devices are associated with a device manufacturer, and the analytics data are not shared with other device manufacturers.

412. The medium of embodiment 96, wherein the plurality of remote connected devices are associated with a plurality of device manufacturers, and the analytics data are shared among the plurality of device manufacturers.

421. The system of embodiment 111, wherein the plurality of remote connected devices are associated with a device manufacturer, and the analytics data are not shared with other device manufacturers.

422. The system of embodiment 111, wherein the plurality of remote connected devices are associated with a plurality of device manufacturers, and the analytics data are shared among the plurality of device manufacturers.

431. The method of embodiment 126, wherein the plurality of remote connected devices are associated with a device manufacturer, and the analytics data are not shared with other device manufacturers.

432. The method of embodiment 126, wherein the plurality of remote connected devices are associated with a plurality of device manufacturers, and the analytics data are shared among the plurality of device manufacturers.

501. The apparatus of embodiment 141, further comprising:
the processor issues instructions from the device status tool component, stored in the memory, to:
analyze, via processor, differences between data associated with the first visualization and data associated with the second visualization for reductions or improvements to performance of the remote connected device.

502. The apparatus of embodiment 501, further comprising:
the processor issues instructions from the device status tool component, stored in the memory, to:
generate, via processor, a third visualization that illustrates results of the analysis.

503. The apparatus of embodiment 501, wherein the remote connected device is associated with a segment, and wherein results of the analysis are utilized to generate a refined update package for other devices that are associated with the segment.

511. The medium of embodiment 156, further comprising:
the device status tool component, stored in the medium, includes processor-issuable instructions to:
analyze, via processor, differences between data associated with the first visualization and data associated with the second visualization for reductions or improvements to performance of the remote connected device.

512. The medium of embodiment 501, further comprising:
the device status tool component, stored in the medium, includes processor-issuable instructions to:
generate, via processor, a third visualization that illustrates results of the analysis.

513. The medium of embodiment 501, wherein the remote connected device is associated with a segment, and wherein results of the analysis are utilized to generate a refined update package for other devices that are associated with the segment.

521. The system of embodiment 171, further comprising:
the device status tool component means, to:
analyze, via processor, differences between data associated with the first visualization and data associated with the second visualization for reductions or improvements to performance of the remote connected device.

522. The system of embodiment 501, further comprising:
the device status tool component means, to:
generate, via processor, a third visualization that illustrates results of the analysis.

523. The system of embodiment 501, wherein the remote connected device is associated with a segment, and wherein results of the analysis are utilized to generate a refined update package for other devices that are associated with the segment.

531. The method of embodiment 186, further comprising:
executing processor-implemented device status tool component instructions to:
analyze, via processor, differences between data associated with the first visualization and data associated with the second visualization for reductions or improvements to performance of the remote connected device.

532. The method of embodiment 501, further comprising:
executing processor-implemented device status tool component instructions to:
generate, via processor, a third visualization that illustrates results of the analysis.

533. The method of embodiment 501, wherein the remote connected device is associated with a segment, and wherein results of the analysis are utilized to generate a refined update package for other devices that are associated with the segment.

601. A remote connected device event data administering apparatus, comprising:
a memory;
a component collection in the memory, including:
an event logging administering component;
a processor disposed in communication with the memory, and configured to issue a plurality of processing instructions from the component collection stored in the memory, wherein the processor issues instructions from the event logging administering component, stored in the memory, to:

retrieve, via processor, event logging configuration settings for a device, wherein the event logging configuration settings include data regarding what kinds of events to log and an event data format in which to log events data;

obtaining, via processor, event data for a reported event associated with a device component of the device;

ascertain, via processor, whether a network connection to a remote server is available;

determine, via processor, upon ascertaining that a network connection is available, an offloadable event to upload to the remote server;

generate, via processor, an event message that includes event data for the offloadable event, wherein the event data for the offloadable event is formatted in accordance with the event data format; and send, via network, the event message to the remote server.

602. The apparatus of embodiment 601, wherein the event logging configuration settings include data regarding memory usage thresholds.

603. The apparatus of embodiment 601, wherein the device is a vehicle.

604. The apparatus of embodiment 603, wherein the device component is an electronic control unit of the vehicle.

605. The apparatus of embodiment 603, wherein the device component is an app installed on an infotainment unit of the vehicle.

606. The apparatus of embodiment 601, wherein, upon ascertaining that a network connection is not available, the device opportunistically looks to establish a network connection with the remote server using any of a plurality of network interfaces available to the device.

607. The apparatus of embodiment 606, wherein the device periodically checks for network connectivity at any of the plurality of network interfaces.

608. The apparatus of embodiment 601, further comprising:

the processor issues instructions from the event logging administering component, stored in the memory, to:

store, via processor, upon ascertaining that a network connection is not available, event data for the reported event in the memory.

609. The apparatus of embodiment 608, wherein the event data for the reported event is stored in volatile memory.

610. The apparatus of embodiment 609, further comprising:

the processor issues instructions from the event logging administering component, stored in the memory, to:

transfer, via processor, event data for an event from volatile memory to non-volatile memory upon determining that a memory usage threshold associated with the volatile memory has been exceeded.

611. The apparatus of embodiment 610, wherein event data for the oldest event with the lowest priority is transferred.

612. The apparatus of embodiment 608, further comprising:

the processor issues instructions from the event logging administering component, stored in the memory, to:

delete, via processor, event data for an event from the memory upon determining that a memory usage threshold associated with the memory has been exceeded.

613. The apparatus of embodiment 601, wherein the offloadable event is the newest event with the highest priority.

614. The apparatus of embodiment 601, wherein the remote server is associated with a device manufacturer of the device, and the sent event data are not shared with other device manufacturers.

615. The apparatus of embodiment 601, wherein the remote server is associated with a plurality of device manufacturers, and the sent event data are shared among the plurality of device manufacturers.

616. A processor-readable remote connected device event data administering non-transient physical medium storing processor-executable components, the components, comprising:

a component collection stored in the medium, including:

an event logging administering component;

wherein the event logging administering component, stored in the medium, includes processor-issuable instructions to:

retrieve, via processor, event logging configuration settings for a device, wherein the event logging configuration settings include data regarding what kinds of events to log and an event data format in which to log events data;

obtaining, via processor, event data for a reported event associated with a device component of the device;

ascertain, via processor, whether a network connection to a remote server is available;

determine, via processor, upon ascertaining that a network connection is available, an offloadable event to upload to the remote server;

generate, via processor, an event message that includes event data for the offloadable event, wherein the event data for the offloadable event is formatted in accordance with the event data format; and send, via network, the event message to the remote server.

617. The medium of embodiment 616, wherein the event logging configuration settings include data regarding memory usage thresholds.

618. The medium of embodiment 616, wherein the device is a vehicle.

619. The medium of embodiment 618, wherein the device component is an electronic control unit of the vehicle.

620. The medium of embodiment 618, wherein the device component is an app installed on an infotainment unit of the vehicle.

621. The medium of embodiment 616, wherein, upon ascertaining that a network connection is not available, the device opportunistically looks to establish a network connection with the remote server using any of a plurality of network interfaces available to the device.

622. The medium of embodiment 621, wherein the device periodically checks for network connectivity at any of the plurality of network interfaces.

623. The medium of embodiment 616, further comprising:

the event logging administering component, stored in the medium, includes processor-issuable instructions to:

store, via processor, upon ascertaining that a network connection is not available, event data for the reported event in the memory.

624. The medium of embodiment 623, wherein the event data for the reported event is stored in volatile memory.

625. The medium of embodiment 624, further comprising:

the event logging administering component, stored in the medium, includes processor-issuable instructions to:

transfer, via processor, event data for an event from volatile memory to non-volatile memory upon determining that a memory usage threshold associated with the volatile memory has been exceeded.

626. The medium of embodiment 625, wherein event data for the oldest event with the lowest priority is transferred.

627. The medium of embodiment 623, further comprising: the event logging administering component, stored in the medium, includes processor-issuable instructions to: delete, via processor, event data for an event from the memory upon determining that a memory usage threshold associated with the memory has been exceeded.

628. The medium of embodiment 616, wherein the offloadable event is the newest event with the highest priority.

629. The medium of embodiment 616, wherein the remote server is associated with a device manufacturer of the device, and the sent event data are not shared with other device manufacturers.

630. The medium of embodiment 616, wherein the remote server is associated with a plurality of device manufacturers, and the sent event data are shared among the plurality of device manufacturers.

631. A processor-implemented remote connected device event data administering system, comprising:
an event logging administering component means, to:
retrieve, via processor, event logging configuration settings for a device, wherein the event logging configuration settings include data regarding what kinds of events to log and an event data format in which to log events data;
obtaining, via processor, event data for a reported event associated with a device component of the device;
ascertain, via processor, whether a network connection to a remote server is available;
determine, via processor, upon ascertaining that a network connection is available, an offloadable event to upload to the remote server;
generate, via processor, an event message that includes event data for the offloadable event, wherein the event data for the offloadable event is formatted in accordance with the event data format; and
send, via network, the event message to the remote server.

632. The system of embodiment 631, wherein the event logging configuration settings include data regarding memory usage thresholds.

633. The system of embodiment 631, wherein the device is a vehicle.

634. The system of embodiment 633, wherein the device component is an electronic control unit of the vehicle.

635. The system of embodiment 633, wherein the device component is an app installed on an infotainment unit of the vehicle.

636. The system of embodiment 631, wherein, upon ascertaining that a network connection is not available, the device opportunistically looks to establish a network connection with the remote server using any of a plurality of network interfaces available to the device.

637. The system of embodiment 636, wherein the device periodically checks for network connectivity at any of the plurality of network interfaces.

638. The system of embodiment 631, further comprising: the event logging administering component means, to: store, via processor, upon ascertaining that a network connection is not available, event data for the reported event in the memory.

639. The system of embodiment 638, wherein the event data for the reported event is stored in volatile memory.

640. The system of embodiment 639, further comprising: the event logging administering component means, to: transfer, via processor, event data for an event from volatile memory to non-volatile memory upon determining that a memory usage threshold associated with the volatile memory has been exceeded.

641. The system of embodiment 640, wherein event data for the oldest event with the lowest priority is transferred.

642. The system of embodiment 638, further comprising: the event logging administering component means, to: delete, via processor, event data for an event from the memory upon determining that a memory usage threshold associated with the memory has been exceeded.

643. The system of embodiment 631, wherein the offloadable event is the newest event with the highest priority.

644. The system of embodiment 631, wherein the remote server is associated with a device manufacturer of the device, and the sent event data are not shared with other device manufacturers.

645. The system of embodiment 631, wherein the remote server is associated with a plurality of device manufacturers, and the sent event data are shared among the plurality of device manufacturers.

646. A processor-implemented remote connected device event data administering method, comprising:
executing processor-implemented event logging administering component instructions to:
retrieve, via processor, event logging configuration settings for a device, wherein the event logging configuration settings include data regarding what kinds of events to log and an event data format in which to log events data;
obtaining, via processor, event data for a reported event associated with a device component of the device;
ascertain, via processor, whether a network connection to a remote server is available;
determine, via processor, upon ascertaining that a network connection is available, an offloadable event to upload to the remote server;
generate, via processor, an event message that includes event data for the offloadable event, wherein the event data for the offloadable event is formatted in accordance with the event data format; and
send, via network, the event message to the remote server.

647. The method of embodiment 646, wherein the event logging configuration settings include data regarding memory usage thresholds.

648. The method of embodiment 646, wherein the device is a vehicle.

649. The method of embodiment 648, wherein the device component is an electronic control unit of the vehicle.

650. The method of embodiment 648, wherein the device component is an app installed on an infotainment unit of the vehicle.

651. The method of embodiment 646, wherein, upon ascertaining that a network connection is not available, the device opportunistically looks to establish a network connection with the remote server using any of a plurality of network interfaces available to the device.

652. The method of embodiment 651, wherein the device periodically checks for network connectivity at any of the plurality of network interfaces.

653. The method of embodiment 646, further comprising: executing processor-implemented event logging administering component instructions to:

store, via processor, upon ascertaining that a network connection is not available, event data for the reported event in the memory.

654. The method of embodiment 653, wherein the event data for the reported event is stored in volatile memory.

655. The method of embodiment 654, further comprising: executing processor-implemented event logging administering component instructions to:

transfer, via processor, event data for an event from volatile memory to non-volatile memory upon determining that a memory usage threshold associated with the volatile memory has been exceeded.

656. The method of embodiment 655, wherein event data for the oldest event with the lowest priority is transferred.

657. The method of embodiment 653, further comprising: executing processor-implemented event logging administering component instructions to:

delete, via processor, event data for an event from the memory upon determining that a memory usage threshold associated with the memory has been exceeded.

658. The method of embodiment 646, wherein the offloadable event is the newest event with the highest priority.

659. The method of embodiment 646, wherein the remote server is associated with a device manufacturer of the device, and the sent event data are not shared with other device manufacturers.

660. The method of embodiment 646, wherein the remote server is associated with a plurality of device manufacturers, and the sent event data are shared among the plurality of device manufacturers.

701. A remote connected device update installation administering apparatus, comprising:

a memory;

a component collection in the memory, including:

an update installation administering component;

a processor disposed in communication with the memory, and configured to issue a plurality of processing instructions from the component collection stored in the memory, wherein the processor issues instructions from the update installation administering component, stored in the memory, to:

obtain, via network, an update package for a remote connected device from a remote server;

ascertain, via processor, software update modules provided in the update package;

determine, via processor, a first rule associated with a first software update module from the provided software update modules, wherein the first rule specifies a state of a first device component of the remote connected device required for installation of the first software update module;

verify, via processor, that the state of the first device component complies with the first rule; and install, via processor, the first software update module.

702. The apparatus of embodiment 701, wherein the remote connected device is a vehicle.

703. The apparatus of embodiment 702, wherein the first device component is an electronic control unit of the vehicle.

704. The apparatus of embodiment 702, wherein the first device component is an app installed on an infotainment unit of the vehicle.

705. The apparatus of embodiment 701, wherein the remote server is associated with a device manufacturer of the remote connected device, and the obtained update package is not applicable to remote connected devices of other device manufacturers.

706. The apparatus of embodiment 701, wherein the remote server is associated with a plurality of device manufacturers, and the obtained update package is applicable to remote connected devices of other device manufacturers.

707. The apparatus of embodiment 701, further comprising: the processor issues instructions from the update installation administering component, stored in the memory, to:

determine, via processor, a second rule associated with the first software update module, wherein the second rule specifies a state of a second device component of the remote connected device required for installation of the first software update module;

verify, via processor, that the first rule and the second rule are satisfied before proceeding with installation of the first software update module.

708. The apparatus of embodiment 701, further comprising: the processor issues instructions from the update installation administering component, stored in the memory, to:

determine, via processor, a second rule associated with a first software update module from the provided software update modules, wherein the second rule specifies a dependency on installation of a second software update module associated with a second device component of the remote connected device for installation of the first software update module;

verify, via processor, that the first rule and the second rule are satisfied before proceeding with installation of the first software update module, wherein a first installer is used to install the first software update module and a second installer is used to install the second software update module.

709. The apparatus of embodiment 701, further comprising: the processor issues instructions from the update installation administering component, stored in the memory, to:

report, via processor, an event associated with installation of the update package, wherein event data of the event specifies whether installation of the update package was successful.

710. The apparatus of embodiment 701, further comprising: the processor issues instructions from the update installation administering component, stored in the memory, to:

report, via processor, an event associated with performance of the remote connected device after installation of the update package, wherein event data of the event specifies reductions or improvements to performance of the remote connected device.

711. A processor-readable remote connected device update installation administering non-transient physical medium storing processor-executable components, the components, comprising:

a component collection stored in the medium, including:

an update installation administering component;

wherein the update installation administering component, stored in the medium, includes processor-issuable instructions to:

obtain, via network, an update package for a remote connected device from a remote server;

ascertain, via processor, software update modules provided in the update package;

determine, via processor, a first rule associated with a first software update module from the provided software update modules, wherein the first rule specifies a state of a first device component of the remote connected device required for installation of the first software update module;

verify, via processor, that the state of the first device component complies with the first rule; and install, via processor, the first software update module.

712. The medium of embodiment 711, wherein the remote connected device is a vehicle.

713. The medium of embodiment 712, wherein the first device component is an electronic control unit of the vehicle.

714. The medium of embodiment 712, wherein the first device component is an app installed on an infotainment unit of the vehicle.

715. The medium of embodiment 711, wherein the remote server is associated with a device manufacturer of the remote connected device, and the obtained update package is not applicable to remote connected devices of other device manufacturers.

716. The medium of embodiment 711, wherein the remote server is associated with a plurality of device manufacturers, and the obtained update package is applicable to remote connected devices of other device manufacturers.

717. The medium of embodiment 711, further comprising:

the update installation administering component, stored in the medium, includes processor-issuable instructions to:

determine, via processor, a second rule associated with the first software update module, wherein the second rule specifies a state of a second device component of the remote connected device required for installation of the first software update module;

verify, via processor, that the first rule and the second rule are satisfied before proceeding with installation of the first software update module.

718. The medium of embodiment 711, further comprising:

the update installation administering component, stored in the medium, includes processor-issuable instructions to:

determine, via processor, a second rule associated with a first software update module from the provided software update modules, wherein the second rule specifies a dependency on installation of a second software update module associated with a second device component of the remote connected device for installation of the first software update module;

verify, via processor, that the first rule and the second rule are satisfied before proceeding with installation of the first software update module, wherein a first installer is used to install the first software update module and a second installer is used to install the second software update module.

719. The medium of embodiment 711, further comprising:

the update installation administering component, stored in the medium, includes processor-issuable instructions to:

report, via processor, an event associated with installation of the update package, wherein event data of the event specifies whether installation of the update package was successful.

720. The medium of embodiment 711, further comprising:

the update installation administering component, stored in the medium, includes processor-issuable instructions to:

report, via processor, an event associated with performance of the remote connected device after installation of the update package, wherein event data of the event specifies reductions or improvements to performance of the remote connected device.

721. A processor-implemented remote connected device update installation administering system, comprising:

an update installation administering component means, to:

obtain, via network, an update package for a remote connected device from a remote server;

ascertain, via processor, software update modules provided in the update package;

determine, via processor, a first rule associated with a first software update module from the provided software update modules, wherein the first rule specifies a state of a first device component of the remote connected device required for installation of the first software update module;

verify, via processor, that the state of the first device component complies with the first rule; and install, via processor, the first software update module.

722. The system of embodiment 721, wherein the remote connected device is a vehicle.

723. The system of embodiment 722, wherein the first device component is an electronic control unit of the vehicle.

724. The system of embodiment 722, wherein the first device component is an app installed on an infotainment unit of the vehicle.

725. The system of embodiment 721, wherein the remote server is associated with a device manufacturer of the remote connected device, and the obtained update package is not applicable to remote connected devices of other device manufacturers.

726. The system of embodiment 721, wherein the remote server is associated with a plurality of device manufacturers, and the obtained update package is applicable to remote connected devices of other device manufacturers.

727. The system of embodiment 721, further comprising:

the update installation administering component means, to:

determine, via processor, a second rule associated with the first software update module, wherein the second rule specifies a state of a second device component of the remote connected device required for installation of the first software update module;

verify, via processor, that the first rule and the second rule are satisfied before proceeding with installation of the first software update module.

728. The system of embodiment 721, further comprising:

the update installation administering component means, to:

determine, via processor, a second rule associated with a first software update module from the provided software update modules, wherein the second rule specifies a dependency on installation of a second software update module associated with a second device component of the remote connected device for installation of the first software update module;

verify, via processor, that the first rule and the second rule are satisfied before proceeding with installation of the first software update module, wherein a first installer is used to install the first software update module and a second installer is used to install the second software update module.

729. The system of embodiment 721, further comprising:
the update installation administering component means, to:
report, via processor, an event associated with installation of the update package, wherein event data of the event specifies whether installation of the update package was successful.

730. The system of embodiment 721, further comprising:
the update installation administering component means, to:
report, via processor, an event associated with performance of the remote connected device after installation of the update package, wherein event data of the event specifies reductions or improvements to performance of the remote connected device.

731. A processor-implemented remote connected device update installation administering method, comprising:
executing processor-implemented update installation administering component instructions to:
obtain, via network, an update package for a remote connected device from a remote server;
ascertain, via processor, software update modules provided in the update package;
determine, via processor, a first rule associated with a first software update module from the provided software update modules, wherein the first rule specifies a state of a first device component of the remote connected device required for installation of the first software update module;
verify, via processor, that the state of the first device component complies with the first rule; and
install, via processor, the first software update module.

732. The method of embodiment 731, wherein the remote connected device is a vehicle.

733. The method of embodiment 732, wherein the first device component is an electronic control unit of the vehicle.

734. The method of embodiment 732, wherein the first device component is an app installed on an infotainment unit of the vehicle.

735. The method of embodiment 731, wherein the remote server is associated with a device manufacturer of the remote connected device, and the obtained update package is not applicable to remote connected devices of other device manufacturers.

736. The method of embodiment 731, wherein the remote server is associated with a plurality of device manufacturers, and the obtained update package is applicable to remote connected devices of other device manufacturers.

737. The method of embodiment 731, further comprising:
executing processor-implemented update installation administering component instructions to:
determine, via processor, a second rule associated with the first software update module, wherein the second rule specifies a state of a second device component of the remote connected device required for installation of the first software update module;
verify, via processor, that the first rule and the second rule are satisfied before proceeding with installation of the first software update module.

738. The method of embodiment 731, further comprising:
executing processor-implemented update installation administering component instructions to:
determine, via processor, a second rule associated with a first software update module from the provided software update modules, wherein the second rule specifies a dependency on installation of a second software update module associated with a second device component of the remote connected device for installation of the first software update module;
verify, via processor, that the first rule and the second rule are satisfied before proceeding with installation of the first software update module, wherein a first installer is used to install the first software update module and a second installer is used to install the second software update module.

739. The method of embodiment 731, further comprising:
executing processor-implemented update installation administering component instructions to:
report, via processor, an event associated with installation of the update package, wherein event data of the event specifies whether installation of the update package was successful.

740. The method of embodiment 731, further comprising:
executing processor-implemented update installation administering component instructions to:
report, via processor, an event associated with performance of the remote connected device after installation of the update package, wherein event data of the event specifies reductions or improvements to performance of the remote connected device.

801. A remote connected device segments administering apparatus, comprising:
a memory;
a component collection in the memory, including:
a product segment configuring component;
a processor disposed in communication with the memory, and configured to issue a plurality of processing instructions from the component collection stored in the memory,
wherein the processor issues instructions from the product segment configuring component, stored in the memory, to:
obtain, via processor, a device identifier of a remote connected device;
retrieve, via processor, device settings data for the remote connected device based on the device identifier;
determine, via processor, device segments associated with the remote connected device by matching the retrieved device settings data with settings data of predefined device segments;
retrieve, via processor, information regarding device components of the remote connected device based on the device identifier;
determine, via processor, parameter segments associated with the remote connected device by matching the retrieved information regarding the device components with settings data of predefined parameter segments; and
associate, via processor, the determined device segments and the determined parameter segments with the remote connected device.

802. The apparatus of embodiment 801, wherein the remote connected device is a vehicle.

803. The apparatus of embodiment 802, wherein the device components are electronic control units of the vehicle.

804. The apparatus of embodiment 802, wherein the device components are apps installed on an infotainment unit of the vehicle.

805. The apparatus of embodiment 801, wherein the predefined device segments and the predefined parameter segments are associated with a device manufacturer of the remote connected device and are not applicable to remote connected devices of other device manufacturers.

806. The apparatus of embodiment 801, wherein the predefined device segments and the predefined parameter segments are associated with a plurality of device manufacturers and are applicable to remote connected devices of the plurality of device manufacturers.

807. The apparatus of embodiment 801, wherein the device settings data identify the remote connected device as belonging to a device segment associated with a set of devices.

808. The apparatus of embodiment 807, wherein the set of devices is one of: a set of devices used by a manufacturer for testing purposes, a set of devices manufactured in a particular way, a set of devices that are associated with a geographic location.

809. The apparatus of embodiment 801, wherein the information regarding the device components includes attributes associated with the device components.

810. The apparatus of embodiment 809, wherein matching the retrieved information regarding the device components with the settings data of the predefined parameter segments further includes matching attributes associated with the device components with attributes specified in the settings data of the predefined parameter segments.

811. A processor-readable remote connected device segments administering non-transient physical medium storing processor-executable components, the components, comprising:

a component collection stored in the medium, including:
  a product segment configuring component;

a processor disposed in communication with the memory, and configured to issue a plurality of processing instructions from the component collection stored in the memory,
  wherein the product segment configuring component, stored in the medium, includes processor-issuable instructions to:
    obtain, via processor, a device identifier of a remote connected device;
    retrieve, via processor, device settings data for the remote connected device based on the device identifier;
    determine, via processor, device segments associated with the remote connected device by matching the retrieved device settings data with settings data of predefined device segments;
    retrieve, via processor, information regarding device components of the remote connected device based on the device identifier;
    determine, via processor, parameter segments associated with the remote connected device by matching the retrieved information regarding the device components with settings data of predefined parameter segments; and
    associate, via processor, the determined device segments and the determined parameter segments with the remote connected device.

812. The medium of embodiment 811, wherein the remote connected device is a vehicle.

813. The medium of embodiment 812, wherein the device components are electronic control units of the vehicle.

814. The medium of embodiment 812, wherein the device components are apps installed on an infotainment unit of the vehicle.

815. The medium of embodiment 811, wherein the predefined device segments and the predefined parameter segments are associated with a device manufacturer of the remote connected device and are not applicable to remote connected devices of other device manufacturers.

816. The medium of embodiment 811, wherein the predefined device segments and the predefined parameter segments are associated with a plurality of device manufacturers and are applicable to remote connected devices of the plurality of device manufacturers.

817. The medium of embodiment 811, wherein the device settings data identify the remote connected device as belonging to a device segment associated with a set of devices.

818. The medium of embodiment 817, wherein the set of devices is one of: a set of devices used by a manufacturer for testing purposes, a set of devices manufactured in a particular way, a set of devices that are associated with a geographic location.

819. The medium of embodiment 811, wherein the information regarding the device components includes attributes associated with the device components.

820. The medium of embodiment 819, wherein matching the retrieved information regarding the device components with the settings data of the predefined parameter segments further includes matching attributes associated with the device components with attributes specified in the settings data of the predefined parameter segments.

821. A processor-implemented remote connected device segments administering system, comprising:

a product segment configuring component means, to:
  obtain, via processor, a device identifier of a remote connected device;
  retrieve, via processor, device settings data for the remote connected device based on the device identifier;
  determine, via processor, device segments associated with the remote connected device by matching the retrieved device settings data with settings data of predefined device segments;
  retrieve, via processor, information regarding device components of the remote connected device based on the device identifier;
  determine, via processor, parameter segments associated with the remote connected device by matching the retrieved information regarding the device components with settings data of predefined parameter segments; and associate, via processor, the determined device segments and the determined parameter segments with the remote connected device.

822. The system of embodiment 821, wherein the remote connected device is a vehicle.

823. The system of embodiment 822, wherein the device components are electronic control units of the vehicle.

824. The system of embodiment 822, wherein the device components are apps installed on an infotainment unit of the vehicle.

825. The system of embodiment 821, wherein the predefined device segments and the predefined parameter segments are associated with a device manufacturer of the remote connected device and are not applicable to remote connected devices of other device manufacturers.

826. The system of embodiment 821, wherein the predefined device segments and the predefined parameter segments are associated with a plurality of device manufacturers and are applicable to remote connected devices of the plurality of device manufacturers.

827. The system of embodiment 821, wherein the device settings data identify the remote connected device as belonging to a device segment associated with a set of devices.

828. The system of embodiment 827, wherein the set of devices is one of: a set of devices used by a manufacturer for testing purposes, a set of devices manufactured in a particular way, a set of devices that are associated with a geographic location.

829. The system of embodiment 821, wherein the information regarding the device components includes attributes associated with the device components.

830. The system of embodiment 829, wherein matching the retrieved information regarding the device components with the settings data of the predefined parameter segments further includes matching attributes associated with the device components with attributes specified in the settings data of the predefined parameter segments.

831. A processor-implemented remote connected device segments administering method, comprising:

executing processor-implemented product segment configuring component instructions to:

obtain, via processor, a device identifier of a remote connected device;

retrieve, via processor, device settings data for the remote connected device based on the device identifier;

determine, via processor, device segments associated with the remote connected device by matching the retrieved device settings data with settings data of predefined device segments;

retrieve, via processor, information regarding device components of the remote connected device based on the device identifier;

determine, via processor, parameter segments associated with the remote connected device by matching the retrieved information regarding the device components with settings data of predefined parameter segments; and associate, via processor, the determined device segments and the determined parameter segments with the remote connected device.

832. The method of embodiment 831, wherein the remote connected device is a vehicle.

833. The method of embodiment 832, wherein the device components are electronic control units of the vehicle.

834. The method of embodiment 832, wherein the device components are apps installed on an infotainment unit of the vehicle.

835. The method of embodiment 831, wherein the predefined device segments and the predefined parameter segments are associated with a device manufacturer of the remote connected device and are not applicable to remote connected devices of other device manufacturers.

836. The method of embodiment 831, wherein the predefined device segments and the predefined parameter segments are associated with a plurality of device manufacturers and are applicable to remote connected devices of the plurality of device manufacturers.

837. The method of embodiment 831, wherein the device settings data identify the remote connected device as belonging to a device segment associated with a set of devices.

838. The method of embodiment 837, wherein the set of devices is one of: a set of devices used by a manufacturer for testing purposes, a set of devices manufactured in a particular way, a set of devices that are associated with a geographic location.

839. The method of embodiment 831, wherein the information regarding the device components includes attributes associated with the device components.

840. The method of embodiment 839, wherein matching the retrieved information regarding the device components with the settings data of the predefined parameter segments further includes matching attributes associated with the device components with attributes specified in the settings data of the predefined parameter segments.

In order to address various issues and advance the art, the entirety of this application for Remote Embedded Device Update Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a REDUP individual and/or enterprise user, database configuration and/or relational model, data type, data transmission and/or network framework, syntax structure, and/or the like, various embodiments of the REDUP, may be implemented that enable a great deal of flexibility and customization. For example, aspects of the REDUP may be adapted for appliances, avionics, environmental control systems, etc. While various embodiments and discussions of the REDUP have included embedded software, however, it is to be understood that the embodiments described herein may be readily configured and/or customized for a wide variety of other applications and/or implementations.

What is claimed is:

1. A device component status detection and illustration apparatus, comprising:
- a memory; and
- a component collection stored in the memory, including:
  - a device status tool component, and
  - a processor disposed in communication with the memory, and configured to issue a plurality of processing instructions from the component collection stored in the memory,
  - wherein the processor issues instructions from the device status tool component, stored in the memory, to:
    - obtain, via the processor, device selection parameters;
    - determine, via the processor, one or more remote connected devices that satisfy the device selection parameters;
    - identify, via the processor, a remote connected device selected from the one or more remote connected devices by a user using a user interface;
    - generate, via the processor, a first visualization that illustrates an updates timeline associated with the identified remote connected device, a first update time selected from the updates timeline associated with the identified remote connected device, and information regarding device components associated with the identified remote connected device as of the first update time, wherein the updates timeline associated with the identified remote connected device shows different points in time that are selectable to view information regarding a vehicle status at a selected point in time, and wherein the updates timeline associated with the identified remote connected device shows a future status as of a future anticipated update of a vehicle and a past status as of a past update of the vehicle;
    - obtain, via the processor, a selection of a second update time from the updates timeline associated with the identified remote connected device from the user; and
    - generate, via the processor, a second visualization that illustrates the updates timeline associated with the identified remote connected device, the second update time selected from the updates timeline associated with the identified remote connected device, and information regarding device components associated with the identified remote connected device as of the second update time.

2. The device component status detection and illustration apparatus of claim 1, wherein the device selection parameters are obtained from the user via the user interface.

3. The device component status detection and illustration apparatus of claim 1, wherein the device selection parameters are obtained from a configuration file.

4. The device component status detection and illustration apparatus of claim 1, wherein the device selection parameters include a vehicle VIN number or a vehicle model.

5. The device component status detection and illustration apparatus of claim 1, wherein the device selection parameters include a specified reported error associated with a remote connected device or a last update timestamp associated with a remote connected device.

6. The device component status detection and illustration apparatus of claim 1, wherein information regarding the device components includes identifiers of device components associated with the remote connected device and version labels of the device components associated with the remote connected device.

7. The device component status detection and illustration apparatus of claim 1, wherein information regarding the device components is illustrated in a tree format.

8. The device component status detection and illustration apparatus of claim 1, wherein a slider widget is utilized to illustrate the updates timeline associated with the identified remote connected device, wherein the slider widget is actuatable to select different points in time on the updates timeline associated with the identified remote connected device to view information of a vehicle as of a selected point in time.

9. The device component status detection and illustration apparatus of claim 1, wherein the first update time is an update time associated with a latest update to the remote connected device.

10. The device component status detection and illustration apparatus of claim 1, wherein the second update time is an update time associated with a past update to the remote connected device.

11. The device component status detection and illustration apparatus of claim 1, wherein the second update time is an update time associated with a future anticipated update to the remote connected device.

12. The device component status detection and illustration apparatus of claim 11, wherein the processor issues instructions from the device status tool component, stored in the memory, to:

determine, via the processor, software update modules of an update package associated with the future anticipated update that should be downloaded by the remote connected device; and generate, via the processor, a visualization that illustrates which software update modules should be downloaded.

13. The device component status detection and illustration apparatus of claim 11, wherein the processor issues instructions from the device status tool component, stored in the memory, to:

determine, via the processor, software update modules of an update package associated with the future anticipated update that should not be downloaded by the remote connected device; and generate, via the processor, a visualization that illustrates which software update modules should not be downloaded.

14. The device component status detection and illustration apparatus of claim 11, wherein the second visualization illustrates which device components changed between the first update time and the second update time.

15. The device component status detection and illustration apparatus of claim 11, wherein the second visualization illustrates which device components changed between the second update time and an update time preceding the second update time.

16. The device component status detection and illustration apparatus of claim 1, wherein the processor issues instructions from the device status tool component, stored in the memory, to:

analyze, via the processor, differences between data associated with the first visualization and data associated with the second visualization for reductions or improvements to performance of the remote connected device.

17. The device component status detection and illustration apparatus of claim 16, wherein the processor issues instructions from the device status tool component, stored in the memory, to:

generate, via the processor, a third visualization that illustrates results of the analysis.

18. The device component status detection and illustration apparatus of claim 16, wherein the remote connected device is associated with a segment, and wherein results of the analysis are utilized to generate a refined update package for other remote connected devices that are associated with the segment.

19. A processor-readable device component status detection and illustration non-transient physical medium storing processor-executable components, the processor-executable components comprising:

a component collection stored in the processor-readable device component status detection and illustration non-transient physical medium, including:

a device status tool component, and wherein the device status tool component, stored in the processor-readable device component status detection and illustration non-transient physical medium, includes processor-issuable instructions to:

obtain, via a processor, device selection parameters;

determine, via the processor, one or more remote connected devices that satisfy the device selection parameters;

identify, via the processor, a remote connected device selected from the one or more remote connected devices by a user using a user interface;

generate, via the processor, a first visualization that illustrates an updates timeline associated with the identified remote connected device, a first update time selected from the updates timeline associated with the identified remote connected device, and information regarding device components associated with the identified remote connected device as of the first update time, wherein the updates timeline associated with the identified remote connected device shows different points in time that are selectable to view information regarding a vehicle status at a selected point in time, and wherein the updates timeline associated with the identified remote connected device shows a future status as of a future anticipated update of a vehicle and a past status as of a past update of the vehicle;

obtain, via the processor, a selection of a second update time from the updates timeline associated with the identified remote connected device from the user; and generate, via the processor, a second visualization that illustrates the updates timeline associated with the identified remote connected device, the second update time selected from the updates timeline associated with the identified remote connected device, and information regarding device components associated with the identified remote connected device as of the second update time.

20. A processor-implemented device component status detection and illustration system, comprising:

a device status tool component including a processor and a memory storing instructions executable to:

obtain, via the processor, device selection parameters;

determine, via the processor, one or more remote connected devices that satisfy the device selection parameters;

identify, via the processor, a remote connected device selected from the one or more remote connected devices by a user using a user interface;

generate, via the processor, a first visualization that illustrates an updates timeline associated with the identified remote connected device, a first update time selected from the updates timeline associated with the identified remote connected device, and information regarding device components associated with the identified remote connected device as of the first update time, wherein the updates timeline associated with the identified remote connected device shows different points in time that are selectable to view information regarding a vehicle status at a selected point in time, and wherein the updates timeline associated with the identified remote connected device shows a future status as of a future anticipated update of a vehicle and a past status as of a past update of the vehicle;

obtain, via the processor, a selection of a second update time from the updates timeline associated with the identified remote connected device from the user; and generate, via the processor, a second visualization that illustrates the updates timeline associated with the identified remote connected device, the second update time selected from the updates timeline associated with the identified remote connected device, and information regarding device components associated with the identified remote connected device as of the second update time.

21. A processor-implemented device component status detection and illustration method, comprising:

executing processor-implemented device status tool component instructions to:

obtain, via a processor, device selection parameters;

determine, via the processor, one or more remote connected devices that satisfy the device selection parameters;

identify, via the processor, a remote connected device selected from the one or more remote connected devices by a user using a user interface;

generate, via the processor, a first visualization that illustrates an updates timeline associated with the identified remote connected device, a first update time selected from the updates timeline associated with the identified remote connected device, and information regarding device components associated with the identified remote connected device as of the first update time, wherein the updates timeline associated with the identified remote connected device shows different points in time that are selectable to view information regarding a vehicle status at a selected point in time, and wherein the updates timeline associated with the identified remote connected device shows a future status as of a future anticipated update of a vehicle and a past status as of a past update of the vehicle;

obtain, via the processor, a selection of a second update time from the updates timeline associated with the identified remote connected device from the user; and generate, via the processor, a second visualization that illustrates the updates timeline associated with the identified remote connected device, the second update time selected from the updates timeline associated with the identified remote connected device, and information regarding device components associated with the identified remote connected device as of the second update time.

* * * * *